US012554140B2

(12) United States Patent
Davidson et al.

(10) Patent No.: US 12,554,140 B2
(45) Date of Patent: Feb. 17, 2026

(54) POSITIONING, STABILISING, AND INTERFACING STRUCTURES AND SYSTEM INCORPORATING SAME

(71) Applicant: RESMED PTY LTD, Bella Vista (AU)

(72) Inventors: Aaron Samuel Davidson, Sydney (AU); Ian Andrew Law, Sydney (AU); David James Braund, Sydney (AU); Stewart Joseph Wagner, Hawkesbury (AU)

(73) Assignee: ResMed Pty Ltd, Bella Vista (AU)

( * ) Notice: Subject to any disclaimer, the term of this patent is extended or adjusted under 35 U.S.C. 154(b) by 596 days.

(21) Appl. No.: 17/915,024

(22) PCT Filed: Mar. 29, 2021

(86) PCT No.: PCT/AU2021/050277

§ 371 (c)(1),
(2) Date: Sep. 27, 2022

(87) PCT Pub. No.: WO2021/189114

PCT Pub. Date: Sep. 30, 2021

(65) Prior Publication Data

US 2023/0152594 A1 May 18, 2023

Related U.S. Application Data

(63) Continuation-in-part of application No. 16/865,480, filed on May 4, 2020, now Pat. No. 11,243,405, and
(Continued)

(30) Foreign Application Priority Data

Mar. 27, 2020 (AU) ................................ 2020900953
May 5, 2020 (AU) ................................ 2020901432
(Continued)

(51) Int. Cl.
*G02B 27/01* (2006.01)
*G06F 1/16* (2006.01)

(52) U.S. Cl.
CPC ......... *G02B 27/0176* (2013.01); *G06F 1/163* (2013.01); *G02B 2027/0152* (2013.01); *G02B 27/0172* (2013.01); *G02B 2027/0178* (2013.01)

(58) Field of Classification Search
CPC ........ G02B 27/0176; G02B 2027/0152; G06F 1/163
See application file for complete search history.

(56) References Cited

U.S. PATENT DOCUMENTS 4,470,674 A 9/1984 Piampiano
4,913,135 A 4/1990 Mattingly
(Continued)

FOREIGN PATENT DOCUMENTS

CN 201826192 U 5/2011
CN 105148374 12/2015
(Continued)

OTHER PUBLICATIONS

Machine translation of CN 206657145 (Year: 2017).*
(Continued)

*Primary Examiner* — Xuemei Zheng
(74) *Attorney, Agent, or Firm* — Nixon & Vanderhye P.C.

(57) ABSTRACT

A head-mounted display system includes a head-mounted display unit having a display, a battery pack for powering the head-mounted display system, and a positioning and stabilising structure configured to hold the head-mounted display unit anterior to a user's eyes such that the display is viewable by the user in use and configured to hold the battery pack posterior to the user's head in use. In an embodiment, the positioning and stabilizing structure includes a posterior support portion configured to engage a posterior portion of
(Continued)

a user's head, the posterior support portion having a parietal strap portion configured to overlie the parietal bones of the user's head in use and an occipital strap portion configured to overlie or lie below an occipital bone of the user's head in use. The positioning and stabilizing structure further includes a pair of lateral strap portions configured to connect between the posterior support portion and the head-mounted display unit, each configured to be located on a respective lateral side of the user's head in use.

17 Claims, 167 Drawing Sheets

Related U.S. Application Data a continuation-in-part of application No. 16/865,526, filed on May 4, 2020, now Pat. No. 11,262,589, and a continuation-in-part of application No. PCT/AU2020/051158, filed on Oct. 28, 2020, and a continuation-in-part of application No. PCT/AU2020/051081, filed on Oct. 18, 2020.

(30) Foreign Application Priority Data

| | | |
|---|---|---|
| May 6, 2020 | (AU) | 2020901437 |
| Jul. 20, 2020 | (AU) | 2020902514 |
| Aug. 26, 2020 | (AU) | 2020903055 |
| Aug. 31, 2020 | (AU) | 2020903112 |
| Sep. 22, 2020 | (AU) | 2020903395 |
| Sep. 29, 2020 | (AU) | 2020903502 |
| Oct. 7, 2020 | (AU) | 2020903638 |
| Oct. 26, 2020 | (AU) | 2020903876 |
| Dec. 15, 2020 | (AU) | 2020904664 |
| Dec. 24, 2020 | (AU) | 2020904849 |
| Mar. 24, 2021 | (AU) | 2021900871 |

(56) References Cited

U.S. PATENT DOCUMENTS

| | | | | |
|---|---|---|---|---|
| 5,538,000 | A | 7/1996 | Rudolph | |
| 5,671,037 | A | 9/1997 | Ogasawara et al. | |
| 5,793,835 | A | 8/1998 | Blanck | |
| 5,796,374 | A | 8/1998 | Cone et al. | |
| 5,832,926 | A | 11/1998 | Towlen | |
| 6,084,555 | A | 7/2000 | Mizoguchi et al. | |
| 6,560,029 | B1 | 5/2003 | Dobbie et al. | |
| 7,120,939 | B1 | 10/2006 | Howard | |
| 7,390,286 | B1 | 6/2008 | Edgeton | |
| 8,537,200 | B2 | 9/2013 | Zhang et al. | |
| 8,553,910 | B1 | 10/2013 | Dong | |
| 9,703,103 | B2 | 7/2017 | Araki | |
| 9,731,090 | B2 | 8/2017 | Ovizinsky et al. | |
| 9,763,342 | B2 | 9/2017 | Long et al. | |
| 9,878,118 | B2 | 1/2018 | Formica et al. | |
| 9,897,812 | B2 | 2/2018 | Miller et al. | |
| 9,901,132 | B2 | 2/2018 | Hairston | |
| 9,927,618 | B2 | 3/2018 | Allin et al. | |
| 9,981,104 | B1 | 5/2018 | Groll | |
| 9,989,998 | B1 | 6/2018 | Yee | |
| 10,078,349 | B1 | 9/2018 | Morris et al. | |
| 10,095,275 | B2 | 10/2018 | Byun et al. | |
| 10,130,785 | B2 | 11/2018 | Dravitzki | |
| 10,133,305 | B1 | 11/2018 | Sulllivan et al. | |
| 10,146,262 | B1 | 12/2018 | Magrath et al. | |
| 10,261,555 | B1 | 4/2019 | Cooper et al. | |
| 10,317,682 | B2 | 6/2019 | Drinkwater et al. | |
| 10,379,366 | B1 | 8/2019 | Bristol et al. | |
| 10,470,512 | B1 | 11/2019 | Yee | |
| 10,496,130 | B1 | 12/2019 | Yee | |
| 10,502,363 | B2 | 12/2019 | Edwards et al. | |
| 10,560,769 | B2 | 2/2020 | Bristol et al. | |
| 10,571,691 | B1 | 2/2020 | Yee et al. | |
| 10,591,736 | B1 | 3/2020 | Bristol et al. | |
| 10,659,869 | B1 | 5/2020 | Bobuk | |
| 10,663,737 | B1 | 5/2020 | Magrath et al. | |
| 10,739,600 | B1 | 8/2020 | Yee | |
| 10,746,351 | B1 | 8/2020 | Ellis et al. | |
| 10,754,175 | B2 | 8/2020 | Lee | |
| 10,761,567 | B2 | 9/2020 | Ellis et al. | |
| 10,798,370 | B2 | 10/2020 | Zhang et al. | |
| 10,860,100 | B2 | 12/2020 | Osterhout et al. | |
| 11,169,384 | B2 | 11/2021 | Law et al. | |
| 11,262,589 | B2 | 3/2022 | Law et al. | |
| 11,353,923 | B2 * | 6/2022 | Han | G02B 27/01 |
| 2004/0058780 | A1 | 3/2004 | Edgeton | |
| 2004/0097839 | A1 | 5/2004 | Epley | |
| 2006/0118117 | A1 | 6/2006 | Berthon-Jones | |
| 2011/0247628 | A1 | 10/2011 | Ho | |
| 2012/0192337 | A1 | 8/2012 | Divine | |
| 2014/0026890 | A1 | 1/2014 | Haskard | |
| 2014/0109911 | A1 | 4/2014 | Asvadi et al. | |
| 2014/0209098 | A1 | 7/2014 | Dunn et al. | |
| 2016/0019423 | A1 | 1/2016 | Ortiz et al. | |
| 2016/0044981 | A1 | 2/2016 | Frank et al. | |
| 2016/0045701 | A1 | 2/2016 | Arcilla et al. | |
| 2016/0054570 | A1 | 2/2016 | Bosveld et al. | |
| 2016/0062125 | A1 | 3/2016 | Baek et al. | |
| 2016/0082214 | A1 | 3/2016 | Barlow | |
| 2016/0140887 | A1 | 5/2016 | Kim | |
| 2016/0216512 | A1 | 7/2016 | Miller et al. | |
| 2016/0235875 | A1 | 8/2016 | Schmidt et al. | |
| 2016/0261300 | A1 | 9/2016 | Fei et al. | |
| 2016/0370590 | A1 | 12/2016 | Fujishiro | |
| 2017/0017085 | A1 | 1/2017 | Araki | |
| 2017/0049983 | A1 | 2/2017 | Ellis | |
| 2017/0153672 | A1 * | 6/2017 | Shin | H04M 1/724097 |
| 2017/0168303 | A1 | 6/2017 | Petrov | |
| 2017/0185140 | A1 | 6/2017 | Bailey et al. | |
| 2017/0242262 | A1 | 8/2017 | Fuchs et al. | |
| 2017/0261656 | A1 | 9/2017 | Kim et al. | |
| 2017/0281893 | A1 | 10/2017 | Kwok et al. | |
| 2017/0337737 | A1 | 11/2017 | Edwards et al. | |
| 2017/0367423 | A1 | 12/2017 | Reitz et al. | |
| 2018/0055202 | A1 | 3/2018 | Miller et al. | |
| 2018/0095497 | A1 | 4/2018 | Hsu et al. | |
| 2018/0095498 | A1 | 4/2018 | Raffle et al. | |
| 2018/0239430 | A1 | 8/2018 | Tadi | |
| 2018/0292674 | A1 | 10/2018 | Bond | |
| 2018/0307282 | A1 | 10/2018 | Allin et al. | |
| 2018/0335632 | A1 | 11/2018 | Cho et al. | |
| 2018/0338130 | A1 | 11/2018 | Miller et al. | |
| 2018/0364491 | A1 | 12/2018 | Park et al. | |
| 2019/0041899 | A1 | 2/2019 | Ellis | |
| 2019/0056601 | A1 | 2/2019 | Lee | |
| 2019/0075689 | A1 | 3/2019 | Selvakumar et al. | |
| 2019/0091431 | A1 | 3/2019 | Formica et al. | |
| 2019/0243145 | A1 | 8/2019 | Ellis et al. | |
| 2019/0243414 | A1 | 8/2019 | Bae et al. | |
| 2019/0258061 | A1 | 8/2019 | Solomon | |
| 2019/0258065 | A1 | 8/2019 | Yun et al. | |
| 2019/0290878 | A1 | 9/2019 | Romagnoli et al. | |
| 2019/0333480 | A1 | 10/2019 | Lang | |
| 2019/0339736 | A1 | 11/2019 | Chang | |
| 2020/0033601 | A1 | 1/2020 | Magrath et al. | |
| 2020/0042035 | A1 | 2/2020 | Chen et al. | |
| 2020/0089007 | A1 | 3/2020 | Maric | |
| 2020/0159040 | A1 | 5/2020 | Kiritz et al. | |
| 2020/0233453 | A1 | 7/2020 | Hatfield | |
| 2020/0257333 | A1 | 8/2020 | Han et al. | |
| 2020/0353196 | A1 | 11/2020 | Cullen et al. | |
| 2020/0371365 | A1 | 11/2020 | Kamakura | |
| 2020/0409150 | A1 * | 12/2020 | Lee | G02B 7/02 |
| 2021/0041706 | A1 | 2/2021 | Hatfield et al. | |
| 2021/0080996 | A1 | 3/2021 | Hudman | |
| 2021/0263323 | A1 | 8/2021 | Ellis | |
| 2021/0263333 | A1 | 8/2021 | Amano et al. | |
| 2021/0302748 | A1 | 9/2021 | Law | |
| 2021/0302749 | A1 | 9/2021 | Law | |

(56) References Cited

U.S. PATENT DOCUMENTS

| | | | |
|---|---|---|---|
| 2021/0302750 A1 | 9/2021 | Law | |
| 2022/0176055 A1 | 6/2022 | Eves et al. | |
| 2023/0106307 A1 | 4/2023 | Wells et al. | |

FOREIGN PATENT DOCUMENTS

| | | | | |
|---|---|---|---|---|
| CN | 105404004 A | | 3/2016 | |
| CN | 205720878 U | | 11/2016 | |
| CN | 106324840 A | * | 1/2017 | ......... G02B 27/0176 |
| CN | 205958850 U | | 2/2017 | |
| CN | 106802484 A | | 6/2017 | |
| CN | 106842577 A | | 6/2017 | |
| CN | 206657145 U | * | 11/2017 | |
| CN | 107577049 A | | 1/2018 | |
| CN | 207216156 U | | 4/2018 | |
| CN | 107995957 A | | 5/2018 | |
| CN | 207689758 U | | 8/2018 | |
| CN | 109061822 A | | 12/2018 | |
| CN | 208607439 U | | 3/2019 | |
| CN | 209417425 U | | 9/2019 | |
| CN | 110346934 A | | 10/2019 | |
| CN | 110800389 A | | 2/2020 | |
| CN | 111857328 A | | 10/2020 | |
| CN | 112255797 A | | 1/2021 | |
| CN | 112255806 A | | 1/2021 | |
| EP | 3 287 865 A2 | | 2/2018 | |
| EP | 3 848 078 A1 | | 7/2021 | |
| FR | 2 944 416 A1 | | 10/2010 | |
| JP | 2011-209472 A | | 10/2011 | |
| JP | 2012-511341 A | | 5/2012 | |
| JP | 2014-142654 A | | 8/2014 | |
| JP | 2014-533185 A | | 12/2014 | |
| JP | 2014-534030 A | | 12/2014 | |
| JP | 2015-522381 A | | 8/2015 | |
| JP | 2016-503699 A | | 2/2016 | |
| JP | 2019-129484 A | | 8/2019 | |
| KR | 10-2014-0025121 A | | 3/2014 | |
| KR | 10-2014-0066258 | | 5/2014 | |
| KR | 10-2017-0037355 | | 4/2017 | |
| KR | 10-2018-0136222 | | 12/2018 | |
| TW | 233859 | | 11/1994 | |
| TW | 201918830 A | | 5/2019 | |
| TW | 202009554 A | | 3/2020 | |
| TW | M631312 U | | 9/2022 | |
| TW | M631313 U | | 9/2022 | |
| TW | M631315 U | | 9/2022 | |
| WO | 2010/073142 A1 | | 7/2010 | |
| WO | 2012/027792 A1 | | 3/2012 | |
| WO | 2013/0005615 A1 | | 1/2013 | |
| WO | 2013/049248 | | 4/2014 | |
| WO | 2016/142840 A1 | | 9/2016 | |
| WO | 2017/185140 A1 | | 11/2017 | |
| WO | WO 2018/053509 A1 | | 3/2018 | |
| WO | 2018/064712 A2 | | 4/2018 | |
| WO | 2018/067752 A1 | | 4/2018 | |
| WO | WO 2018/067421 A1 | | 4/2018 | |
| WO | 2018/179094 A1 | | 10/2018 | |
| WO | 2018/219241 A1 | | 12/2018 | |
| WO | 2019/000556 A1 | | 1/2019 | |
| WO | WO 2019/190448 A1 | | 10/2019 | |
| WO | 2019/212591 | | 11/2019 | |
| WO | 2020/0017627 A1 | | 1/2020 | |

OTHER PUBLICATIONS

Machine translation of CN-106324840. (Year: 2017).*

Office Action dated Jan. 5, 2023 issued in Taiwanese Application No. 110131574 with English translation (18 pages).

Search Report dated Jan. 31, 2023 issued in Malaysian Application No. PI 2022005337 (1 page).

Office Action and Search Report dated Mar. 8, 2023 issued in Taiwanese Application No. 111201214 with English translation (29 Pages).

Office Action dated Feb. 26, 2024 issued in Japanese Application No. 2022-558254 with English translation (15 pages).

Office Action dated Mar. 20, 2023 issued in Japanese Application No. 2022-558257 with English translation (6 pages).

Office Action dated May 12, 2023 issued in Taiwanese Application No. 111103857 with English translation (8 pages).

Office Action dated May 18, 2023 issued in U.S. Appl. No. 18/100,676 (21 pages).

Notice of Allowance dated Jun. 2, 2023 issued in Taiwanese Application No. 110131602 (3 pages).

Office Action dated Jun. 14, 2023 issued in U.S. Appl. No. 17/789,711 (17 pages).

International Preliminary Report on Patentability dated Aug. 10, 2023 issued in International Application No. PCT/AU2022/050043 (13 pages).

International Preliminary Report on Patentability dated Aug. 10, 2023 issued in International Application No. PCT/AU2022/050045 (11 pages).

Decision of Refusal dated Jul. 31, 2023 issued in Taiwanese Application No. 110131601 with English translation (11 pages).

Decision of Refusal dated Aug. 8, 2023 issued in Taiwanese Application No. 110131604 with English translation (11 pages).

Office Action dated Aug. 16, 2023 issued in Chinese Application No. 202320571641.7 with English translation (6 pages).

Notice of Allowance dated Sep. 20, 2023 issued in U.S. Appl. No. 18/100,676 (13 pages).

International Preliminary Report on Patentability dated Sep. 22, 2022 issued in International Application No. PCT/AU2021/050277 (14 pages).

Office Action dated Sep. 22, 2022 issued in Taiwanese Application No. 11120928410 (11 pages).

Office Action dated Sep. 22, 2022 issued in Taiwanese Application No. 11120925760 (9 pages).

Notice of Allowance dated Jan. 25, 2024 issued in U.S. Appl. No. 18/133,711 (10 pages).

Notice of Grant dated Mar. 16, 2024 issued in Chinese Application No. 202321228955.3 (2 pages).

Office Action dated Mar. 25, 2024 issued in U.S. Appl. No. 18/263,303 (15 pages).

Office Action dated Sep. 15, 2022 issued in Taiwanese Application No. 111103857 with English translation (43 pages).

International Search Report dated Apr. 26, 2022 issued in International Application No. PCT/AU2022/050043 (8 pages).

Written Opinion of the International Searching Authority dated Apr. 26, 2022 issued in International Application No. PCT/AU2022/050043 (11 pages).

International Search Report dated Apr. 27, 2022 issued in International Application No. PCT/AU2022/050045 (8 pages).

Written Opinion of the International Searching Authority dated Apr. 27, 2022 issued in International Application No. PCT/AU2022/050045 (9 pages).

International Search Report dated Jun. 21, 2021 issued in International Application No. PCT/AU2021/050277 (7 pages).

Written Opinion dated Jun. 21, 2021 issued in International Application No. PCT/AU2021/050277 (13 pages).

Notice of Allowance mailed Oct. 25, 2021 issued in U.S. Appl. No. 16/865,526 (12 pages).

Office Action Mailed May 14, 2021 in U.S. Appl. No. 16/865,526, 23 pages.

Office Action mailed Apr. 8, 2021 in U.S. Appl. No. 17/082,071, 25 pages.

Notification of Transmittal of the International Search Report and the Written Opinion of the International Search Authority mailed Feb. 4, 2021 in International Application No. PCT/AU2020/051081, 7 pages.

Written Opinion of the International Search Authority mailed Feb. 4, 2021 in International Application No. PCT/AU2020/051081, 8 pages.

Notification of Transmittal of the International Search Report and the Written Opinion of the International Search Authority mailed Dec. 24, 2020 in International Application No. PCT/AU2020/051158, 9 pages.

(56) References Cited

OTHER PUBLICATIONS

Written Opinion of the International Search Authority mailed Dec. 24, 2020 in International Application No. PCT/AU2020/051158, 10 pages.
Office Action mailed Dec. 31, 2020 in U.S. Appl. No. 17/082,071, 17 pages.
Office Action dated May 2, 2022 issued in Korean Application No. 10-2022-7001969 with English translation (34 pages).
Office Action dated May 31, 2022 issued in Chinese Application No. 202080038956.4 with English translation (8 pages).
International Preliminary Report on Patentability dated Jul. 5, 2022 issued in International Application No. PCT/SG2020/050793 (12 pages).
Office Action dated Dec. 22, 2021 issued in U.S. Appl. No. 17/498,808 (26 pages).
Office Action dated Mar. 29, 2022 issued in U.S. Appl. No. 17/498,808 (22 pages).
Notification of Transmittal of the International Search Report and the Written Opinion of the International Searching Authority mailed Apr. 6, 2021 in International Application No. PCT/SG2020/050793, 21 pages.
U.S. Office Action mailed May 14, 2021 in U.S. Appl. No. 16/865,526, 27 pages.
U.S. Office Action mailed Jun. 17, 2021 in U.S. Appl. No. 16/865,480, 33 pages.
Office Action dated Sep. 14, 2022 issued in Taiwanese Application No. 110131602 with English translation (17 pages).

* cited by examiner

POSITIONING, STABILISING, AND INTERFACING STRUCTURES AND SYSTEM INCORPORATING SAME

1 CROSS-REFERENCE TO RELATED APPLICATIONS

This application is the U.S. national phase of International Application No. PCT/AU2021/050277 filed Mar. 29, 2021 which designated the U.S. and is a continuation-in-part of U.S. application Ser. No. 16/865,480, filed May 4, 2020, now U.S. Pat. No. 11,243,405, and is also a continuation-in-part of U.S. application Ser. No. 16/865,526, filed May 4, 2020, now U.S. Pat. No. 11,262,589, and is also a continuation-in-part of International Application No. PCT/AU2020/051158, filed Oct. 28, 2020, and is a continuation-in part of International Application No. PCT/AU2020/051081, filed Oct. 18, 2020, the entire contents of each of which are hereby incorporated by reference. This application also claims priority to Australian Application No. 2020900953, filed Mar. 27, 2020, Australian Application No. 2020901432, filed May 5, 2020, Australian Application No. 2020901437, filed May 6, 2020, Australian Application No. 2020902514, filed Jul. 20, 2020, Australian Application No. 2020903055, filed Aug. 26, 2020, Australian Application No. 2020903112, filed Aug. 31, 2020, Australian Application No. 2020903502, filed Sep. 29, 2020, Australian Application No. 2020903638, filed Oct. 7, 2020, Australian Application No. 2020903876, filed Oct. 26, 2020. Australian Application No. 2020904664, filed Dec. 15, 2020, Australian Application No. 2020904849, filed Dec. 24, 2020, Australian Application No. 2020903395, filed Sep. 22, 2020, and Australian Application No. 2021900871, filed Mar. 24, 2021, the entire contents of each of which are hereby incorporated by reference.

2 BACKGROUND OF THE TECHNOLOGY

2.1 Field of the Technology

The present technology relates generally to head mounted displays, positioning and stabilizing structures, user interfacing structures, and other components for use in head mounted displays, associated head-mounted display assemblies and systems including a display unit and positioning and stabilizing structure, interfacing structures and or components, and methods. The present technology finds particular application in the use of immersive reality head mounted displays and is herein described in that context. It is to be appreciated that the present technology may have broader application and may be used in any type of head-mounted display arrangement including, but not limited to, virtual reality displays, augmented reality displays, and/or mixed reality displays.

2.2 Description of the Related Art

It is to be understood that, if any prior art is referred to herein, such reference does not constitute an admission that the prior art forms a part of the common general knowledge in the art, in Australia or any other country.

2.2.1 Immersive Technology

An immersive technology refers to technology that attempts to replicate or augment a physical environment through the means of a digital or virtual environment by creating a surrounding sensory feeling, thereby creating a sense of immersion.

In particular, an immersive technology provides the user visual immersion, and creates virtual objects and/or a virtual environment. The immersive technology may also provide immersion for at least one of the other five senses.

2.2.2 Virtual Reality

Virtual reality (VR) is a computer-generated three-dimensional image or environment that is presented to a user. In other words, the environment may be entirely virtual. Specifically, the user observes an electronic screen in order to observe virtual or computer generated images in a virtual environment. Since the created environment is entirely virtual, the user may be blocked and/or obstructed from interacting with their physical environment (e.g., they may be unable to hear and/or see the physical objects in the physical environment that they are currently located).

The electronic screen may be supported in the user's line of sight (e.g., mounted to the user's head). While observing the electronic screen, visual feedback output by the electronic screen and observed by the user may produce a virtual environment intended to simulate an actual environment. For example, the user may be able to look around (e.g., 360°) by pivoting their head or their entire body, and interact with virtual objects observable by the user through the electronic screen. This may provide the user with an immersive experience where the virtual environment provides stimuli to at least one of the user's five senses, and replaces the corresponding stimuli of the physical environment while the user uses the VR device. Typically, the stimuli relates at least to the user's sense of sight (i.e., because they are viewing an electronic screen), but other senses may also be included. The electronic screens are typically mounted to the user's head so that they may be positioned in close proximity to the user's eyes, which allows the user to easily observe the virtual environment.

The VR device may produce other forms of feedback in addition to, or aside from, visual feedback. For example, the VR device may include and/or be connected to a speaker in order to provide auditory feedback. The VR device may also include tactile feedback (e.g., in the form of haptic response), which may correspond to the visual and/or auditory feedback. This may create a more immersive virtual environment, because the user receives stimuli corresponding to more than one of the user's senses.

While using a VR device, a user may wish to limit to block ambient stimulation. For example, the user may want to avoid seeing and/or hearing the ambient environment in order to better process stimuli from the VR device in the virtual environment. Thus, VR devices may limit and/or prevent the user's eyes from receiving ambient light. In some examples, this may be done by providing a seal against the user's face. In some examples, a shield may be disposed proximate to (e.g., in contact or close contact with) the user's face, but may not seal against the user's face. In either example, ambient light may not reach the user's eyes, so that the only light observable by the user is from the electronic screen.

In other examples, the VR devices may limit and/or prevent the user's ears from hearing ambient noise. In some examples, this may be done by providing the user with headphones (e.g., noise cancelling headphones), which may output sounds from the VR device and/or limit the user from hearing noises from their physical environment. In some examples, the VR device may output sounds at a volume sufficient to limit the user from hearing ambient noise.

In any example, the user may not want to become overstimulated (e.g., by both their physical environment and the virtual environment). Therefore, blocking and/or limiting the ambient from stimulating the user assists the user in focusing on the virtual environment, without possible distractions from the ambient.

Different types of VR devices are described below. Generally, a single VR device may include at least two different classifications. For example, the VR device may be classified by its portability and by how the display unit is coupled to the rest of the interface. These classifications may be independent, so that classification in one group (e.g., the portability of the unit) does not predetermine classification into another group. There may also be additional categories to classify VR devices, which are not explicitly listed below.

2.2.2.1 Portability 2.2.2.1.1 Fixed Unit

In some forms, a VR device may be used in conjunction with a separate device, like a computer or video game console. This type of VR device may be fixed, since it cannot be used without the computer or video game console, and thus locations where it can be used are limited (e.g., by the location of the computer or video game console).

Since the VR device can be used in conjunction with the computer or video game console, the VR device may be connected to the computer or video game console. For example, an electrical cord may tether the two systems together. This may further "fix" the location of the VR device, since the user wearing the VR device cannot move further from the computer or video game console than the length of the electrical cord. In other examples, the VR device may be wirelessly connected (e.g., via Bluetooth, Wi-Fi, etc.), but may still be relatively fixed by the strength of the wireless signal.

The connection to the computer or video game console may provide control functions to the VR device. The controls may be communicated (i.e., through a wired connector or wirelessly) in order to help operate the VR device. In examples of a fixed unit VR device, these controls may be necessary in order to operate the display screen, and the VR device may not be operable without the connection to the computer or video game console.

In some forms, the computer or video game console may provide electrical power to the VR device, so that the user does not need to support a battery on their head. This may make the VR device more comfortable to wear, since the user does not need to support the weight of a battery.

The user may also receive outputs from the computer or video game console at least partially through the VR device, as opposed to through a television or monitor, which may provide the user with a more immersive experience while using the computer or video game console (e.g., playing a video game). In other words, the display output of the VR device may be substantially the same as the output from a computer monitor or television. Some controls and/or sensors necessary to output these images may be housed in the computer or video game console, which may further reduce the weight that the user is required to support on their body.

In some forms, movement sensors may be positioned remote from the VR device, and connected to the computer or video game console. For example, at least one camera may face the user in order to track movements of the user's head. The processing of the data recorded by the camera(s) may be done by the computer or video game console, before being transmitted to the VR device. While this may assist in weight reduction of the VR device, it may also further limit where the VR device can be used. In other words, the VR device must be in the sight line of the camera(s).

2.2.2.1.2 Portable Unit

In some forms, the VR device may be a self-contained unit, which includes a power source and sensors, so that the VR device does not need to be connected to a computer or video game console. This provides the user more freedom of use and movement. For example, the user is not limited to using the VR device near a computer or video game console, and could use the VR device outdoors, or in other environments that do not include computers or televisions.

Since the VR device is not connected to a computer or video game console in use, the VR device is required to support all necessary electronic components. This includes batteries, sensors, and processors. These components add weight to the VR device, which the user must support on their body. Appropriate weight distribution may be needed so that this added weight does not increase discomfort to a user wearing the VR device.

In some forms, the electrical components of the VR device are contained in a single housing, which may be disposed directly in front of the user's face, in use. This configuration may be referred to as a "brick." In this configuration, the center of gravity of the VR device without the positioning and stabilizing structure is directly in front of the user's face. In order to oppose the moment created by the force of gravity, the positioning and stabilizing structure coupled to the brick configuration must provide a force directed into the user's face, for example created by tension in headgear straps. While the brick configuration may be beneficial for manufacturing (e.g., since all electrical components are in close proximity) and may allow interchangeability of positioning and stabilizing structures (e.g., because they include no electrical connections), the force necessary to maintain the position of the VR device (e.g. tensile forces in headgear) may be uncomfortable to the user. Specifically, the VR device may dig into the user's face, leading to irritation and markings on the user's skin. The combination of forces may feel like "clamping" as the user's head receives force from the display housing on their face and force from headgear on the back of their head. This may make a user less likely to wear the VR device.

As VR and other mixed reality devices may be used in a manner involving vigorous movement of the user's head and/or their entire body (for example during gaming), there may be significant forces/moments tending to disrupt the position of the device on the user's head. Simply forcing the device more tightly against the user's head to tolerate large disruptive forces may not be acceptable as it may be uncomfortable for the user or become uncomfortable after only a short period of time.

In some forms, electrical components may be spaced apart throughout the VR device, instead of entirely in front of the user's face. For example, some electrical components (e.g., the battery) may be disposed on the positioning and stabilizing structure, particularly on a posterior contacting portion. In this way, the weight of the battery (or other electrical components) may create a moment directed in the opposite direction from the moment created by the remainder of the VR device (e.g., the display). Thus, it may be sufficient for the positioning and stabilizing structure to apply a lower clamping force, which in turn creates a lower force against the user's face (e.g., fewer marks on their skin). However, cleaning and/or replacing the positioning and stabilizing structure may be more difficult in some such existing devices because of the electrical connections.

In some forms, spacing the electrical components apart may involve positioning some of the electrical components separate from the rest of the VR device. For example, a battery and/or a processor may be electrically connected, but carried separately from the rest of the VR device. Unlike in the "fixed units" described above, the battery and/or processor may be portable, along with the remainder of the VR device. For example, the battery and/or the processor may be carried on the user's belt or in the user's pocket. This may provide the benefit of reduced weight on the user's head, but would not provide a counteracting moment. The tensile force provided by the positioning and stabilizing structure may still be less than the "brick" configuration, since the total weight supported by the head is less.

2.2.2.2 Display Connection 2.2.2.2.1 Integrated Display Screen

In some forms, the display screen is an integral piece of the VR device, and generally cannot be detached or removed from the rest of the VR device.

The display screen may be fixed within a housing, and protected from damage. For example, the display screen may be completely covered by the housing, which may reduce the occurrence of scratches. Additionally, integrating display screen with the rest of the VR device eliminates the occurrence of losing the display screen.

In these forms, the display screen functions purely as an immersive technology display. The vast majority of "fixed units" will include an integrated display screen. "Portable units" may include an integrated display screen, or may include a removable display screen (described below).

2.2.2.2.2 Removable Display Screen

In some forms, the display screen is a separate structure that can be removed from the VR device, and used separately.

In some forms, a portable electronic device (e.g., a cell phone) may be selectively inserted into a housing of the VR device. The portable electronic device may include most or all of the sensors and/or processors, and may create a virtual environment through a downloadable app.

Portable electronic devices are generally light weight, and may not require the positioning and stabilizing structure to apply a large force to the user's head.

2.2.3 Augmented Reality

In some forms, augmented reality (AR) is a computer-generated three-dimensional image or environment that is presented to a user.

While similar to VR, AR differs in that the virtual environment created at least in part by the electronic screen is observed in combination with the user's physical environment. In other words, AR creates virtual objects in order to alter and/or enhance the user's physical environment with elements of a virtual environment. The result of AR is a combined environment that includes physical and virtual objects, and therefore an environment that is both physical and virtual.

For example, images created by the electronic screen may be overlayed into the user's physical environment. Only a portion of an AR combination environment presented to the user includes is virtual. Thus, the user may wish to continue to receive ambient stimulation from their physical environment while using an AR device (e.g., in order to continue to observe the physical or non-virtual component of the combination environment).

Since AR may be used with the user's physical environment, an AR device may not be electrically connected, or otherwise tethered, to a computer or video game console. Instead the AR device may include a battery, or other power source. This may provide the user with the greatest freedom of movement, so that they can explore a variety of physical environments while using the AR device.

This key difference between VR and AR may lead to different types of wearable electronic screens. As described above, a user of a VR device may wish to block ambient light, so the housing of the electronic screen may be opaque in order to limit or prevent ambient light from reaching the user. However, the user of an AR device may want to see the virtual environment blended with their actual environment. The electronic screen in an AR device may be similarly supported in front of the user's eyes, but, screens in AR devices may be transparent or translucent, and the screens may not be supported by an opaque housing (or opaque material may not substantially obstruct the user's line of sight). This may allow the user to continue receiving ambient stimulation, where the virtual environment is simultaneously present. Notwithstanding, some VR devices that do not have a transparent screen through which the user can see their real world surroundings may be configurable for AR by acquiring real-time video of the user's real-world surroundings from the user's perspective (e.g. with cameras on the display housing) and displaying it on the display screen.

Additionally, a person using an AR device may be more mobile than a person using a VR device (e.g., because an AR user can see their physical environment and/or are not tethered to a computer or video game console). Thus, a person using an AR device may wish to wear the device for an extended period of time, while also moving around (e.g., walking, running, biking, etc.). Including components, like batteries, on the AR device may make the AR device uncomfortable for the user's head and/or neck, and may discourage the user from wearing the AR device for long periods of time.

2.2.4 Mixed Reality

Mixed reality (MR) is similar to AR but may be more immersive because the MR device may provide the user more ways to interact with virtual objects or environment than an AR device. The virtual reality in MR may also be overlayed and/or blended with the user's physical environment. Unlike AR however, a user may be able to interact with the virtual environment akin to what occurs in VR. In other words, while AR may present only an computer generated image in the physical environment, MR may present the user with the same or similar computer generated image but allow for interaction with the image in the physical environment (e.g., using a hand to "grab" an object produced virtually). Thus, the virtual environment may further merge with a physical environment so that the combined environment better replicates an actual environment.

2.2.5 Head-Mounted Display Interface

A head-mounted display interface enables a user to have an immersive experience of a virtual environment and have broad application in fields such as communications, training, medical and surgical practice, engineering, and video gaming.

Different head-mounted display interfaces can each provide a different level of immersion. For example, some head-mounted display interfaces can provide the user with a total immersive experience. One example of a total immersive experience is virtual reality (VR). The head-mounted display interface can also provide partial immersion consistent with using an AR device.

VR head-mounted display interfaces typically are provided as a system that includes a display unit which is arranged to be held in an operational position in front of a user's face. The display unit typically includes a housing containing a display and a user interface structure constructed and arranged to be in opposing relation with the user's face. The user interface structure may extend about the display and define, in conjunction with the housing, a viewing opening to the display. The user interfacing structure may engage with the face and include a cushion for user comfort and/or be light sealing to block ambient light from the display. The head-mounted display system further comprises a positioning and stabilizing structure that is disposed on the user's head to maintain the display unit in position.

Other head-mounted display interfaces can provide a less than total immersive experience. In other words, the user can experience elements of their physical environment, as well as a virtual environment. Examples of a less than total immersive experience are augmented reality (AR) and mixed reality (MR).

AR and/or MR head-mounted display interfaces are also typically provided as a system that includes a display unit which is arranged to be held in an operational position in front of a user's face. Likewise, the display unit typically includes a housing containing a display and a user interface structure constructed and arranged to be in opposing relation with the user's face. The head-mounted display system of the AR and/or MR head-mounted display is also similar to VR in that it further comprises a positioning and stabilizing structure that is disposed on the user's head to maintain the display unit in position. However, AR and/or MR head-mounted displays do not include a cushion that totally seals ambient light from the display, since these less than total immersive experience require an element of the physical environment. Instead, head-mounted displays in augmented and/or mixed allow the user to see the physical environment in combination with the virtual environment.

In any types of immersive technology, it is important that the head-mounted display interface is comfortable in order to allow the user to wear the head-mounted display for extended periods of time. Additionally, it is important that the display is able to provide changing images with changing position and/or orientation of the user's head in order to create an environment, whether partially or entirely virtual, that is similar to or replicates one that is entirely physical.

2.2.5.1 Interfacing Structure

The head-mounted displays may include a user interfacing structure. Since it is in direct contact with the user's face, the shape and configuration of the interfacing portion can have a direct impact on the effectiveness and comfort of the display unit.

The design of a user interfacing structure presents a number of challenges. The face has a complex three-dimensional shape. The size and shape of noses and heads varies considerably between individuals. Since the head includes bone, cartilage and soft tissue, different regions of the face respond differently to mechanical forces.

One type of interfacing structure extends around the periphery of the display unit and is intended to seal against the user's face when force is applied to the user interface with the interfacing structure in confronting engagement with the user's face. The interfacing structure may include a pad made of a polyurethane (PU). With this type of interfacing structure, there may be gaps between the interfacing structure and the face, and additional force may be required to force the display unit against the face in order to achieve the desired contact.

The regions not engaged at all by the user interface may allow gaps to form between the facial interface and the user's face through which undesirable light pollution may ingress into the display unit (e.g., particularly when using virtual reality). The light pollution or "light leak" may decrease the efficacy and enjoyment of the overall immersive experience for the user. In addition, previous systems may be difficult to adjust to enable application for a wide variety of head sizes. Further still, the display unit and associated stabilizing structure may often be relatively heavy and may be difficult to clean which may thus further limit the comfort and useability of the system.

Another type of interfacing structure incorporates a flap seal of thin material positioned about a portion of the periphery of the display unit so as to provide a sealing action against the face of the user. Like the previous style of interfacing structure, if the match between the face and the interfacing structure is not good, additional force may be required to achieve a seal, or light may leak into the display unit in-use. Furthermore, if the shape of the interfacing structure does not match that of the user, it may crease or buckle in-use, giving rise to undesirable light penetration.

A user interface may be partly characterised according to the design intent of where the interfacing structure is to engage with the face in-use. Some interfacing structures may be limited to engaging with regions of the user's face that protrude beyond the arc of curvature of the face engaging surface of the interfacing structure. These regions may typically include the user's forehead and cheek bones. This may result in user discomfort at localised stress points. Other facial regions may not be engaged at all by the interfacing structure or may only be engaged in a negligible manner that may thus be insufficient to increase the translation distance of the clamping pressure. These regions may typically include the sides of the user's face, or the region adjacent and surrounding the users nose. To the extent to which there is a mismatch between the shape of the users' face and the interfacing structure, it is advantageous for the interfacing structure or a related component to be adaptable in order for an appropriate contact or other relationship to form.

2.2.5.2 Positioning and Stabilizing

To hold the display unit in its correct operational position, the head-mounted display system further comprises a positioning and stabilizing structure that is disposed on the user's head. These structures may be responsible for providing forces to counter gravitational forces of the head-mounted display and/or interfacing structure. In the past these structures have been formed from expandable rigid structures that are typically applied to the head under tension to maintain the display unit in its operational position. Such systems have been prone to exert a clamping pressure on the user's face which can result in user discomfort at localised stress points. Also, previous systems may be difficult to adjust to allow wide application head sizes. Further, the display unit and associated stabilizing structure are often heavy, difficult to clean which further limit the comfort and useability of the system.

Certain other head mounted display systems may be functionally unsuitable for the present field. For example, positioning and stabilizing structures designed for ornamental and visual aesthetics may not have the structural capabilities to maintain a suitable pressure around the face. For example, an excess of clamping pressure may cause discomfort to the user, or alternatively, insufficient clamping pressure on the users' face may not effectively seal the display from ambient light.

Certain other head mounted display systems may be uncomfortable or impractical for the present technology. For example, if the system is used for prolonged time periods.

As a consequence of these challenges, some head mounted displays suffer from being one or more of obtrusive, aesthetically undesirable, costly, poorly fitting, difficult to use, and uncomfortable especially when worn for long periods of time or when a user is unfamiliar with a system. Wrongly sized positioning and stabilizing structures can give rise reduced comfort and in turn, shortened periods of use.

Therefore, an interfacing portion of a user interface used for the fully immersive experience of a virtual environment are subject to forces corresponding to the movement of a user during the experience.

2.2.5.3 Materials

Materials used in head mounted display assemblies have included dense foams for contacting portions in the interfacing structures, rigid shells for the housings, and positioning and stabilizing structures formed from rigid plastic clamping structures. These materials have various drawbacks including not permitting the skin covered by the material to breath, being inflexible, difficult to clean and to prone trapping bacteria. As a result, products made with such material may be uncomfortable to wear for extended periods of time, causes skin irritation in some individuals and limit the application of the products.

3 BRIEF SUMMARY OF THE TECHNOLOGY

The present technology may be directed toward providing positioning and stabilizing structures used in the supporting, stabilizing, mounting, utilizing, and/or securing of a head-mounted display having one or more of improved comfort, cost, efficacy, ease of use and manufacturability.

A first aspect of the present technology relates to apparatuses used in the supporting, stabilizing, mounting, utilizing, and/or securing of a head-mounted display.

Another aspect of the present technology relates to methods used in the supporting, stabilizing, mounting, utilizing, and/or securing of a head-mounted display.

3.1 Head-Mounted Display System with Lateral Strap Portions and Parietal and Occipital Strap Portions Another aspect of the present technology relates to a head-mounted display system comprising:

- a head-mounted display unit comprising a display;
- a battery pack for powering the head-mounted display system;
- a positioning and stabilising structure configured to hold the head-mounted display unit anterior to a user's eyes such that the display is viewable by the user in use and configured to hold the battery pack posterior to the user's head in use, the positioning and stabilizing structure comprising:
  - a posterior support portion configured to engage a posterior portion of a user's head, the posterior support portion comprising a parietal strap portion configured to overlie the parietal bones of the user's head in use and an occipital strap portion configured to overlie or lie below an occipital bone of the user's head in use;
  - a pair of lateral strap portions configured to connect between the posterior support portion and the head-mounted display unit, each configured to be located on a respective lateral side of the user's head in use;

In some examples, the head-mounted display system comprises a top strap portion configured to overlie a superior portion of the user's head in use. In some examples the top strap portion is configured to connect between the battery pack and the head-mounted display unit.

3.1.1 Parietal Strap Portion

In examples: (a) the position of the parietal strap portion is moveable with respect to the top strap portion in an anterior direction and a posterior direction; (b) an angle between the parietal strap portion and the occipital strap portion is able to be adjusted by the user; (c) the parietal strap portion lies underneath the top strap portion; (d) the top strap portion passes through a buckle connected to the parietal strap portion, the buckle configured to limit lateral movement of the top strap portion; and/or (e) the buckle is located in the sagittal plane of the user's head in use.

3.1.2 Top Strap Portion

In further examples: (a) the top strap portion is connected to the occipital strap portion; (b) the top strap portion is adjustable in length between the head-mounted display unit and the battery; (c) the top strap portion is connected to the head-mounted display unit through an eyelet connected to the head-mounted display unit and looped back and secured to itself; (d) an outer layer of the top strap portion is configured to be passed through the eyelet and looped back and secured to itself; (e) A user-facing layer does not pass through the eyelet; (f) the top strap portion comprises a textile user-facing layer, a textile outer layer and a substantially inextensible layer between the user-facing layer and the outer layer; (g) a user-facing layer of the top strap portion is configured to be passed through the eyelet and looped back and secured to itself; (h) the top strap portion is substantially inextensible; (i) the top strap portion comprises a layered construction; (j) the top strap portion comprises a substantially inextensible layer; (k) an anterior end of the substantially inextensible layer is spaced along the length of the top strap portion from the head-mounted display unit; (l) the top strap portion comprises a textile user-facing layer; (m) the top strap portion comprises a textile outer layer; (n) the top strap portion comprises a power cable connecting the battery pack to the head-mounted display unit to provide power from the battery to the head-mounted display unit in use; (o) the power cable is internal to the top strap portion; (p) the power cable is insertable through an interior of the top strap portion by the user; and/or (q) the power cable is insertable through the top strap portion between the substantially inextensible layer and the textile outer layer.

3.1.3 Anterior Portion and Posterior Portion of Top Strap Portion

In further examples: (a) the top strap portion comprises an anterior portion and a posterior portion, the posterior portion being configured to engage the user's head in use, and the anterior portion being configured to not engage the user's head in use; (b) the top strap portion comprises a shape having a bend between the posterior portion of the top strap portion and the anterior portion of the top strap portion; (c) the top strap portion is shaped to follow a curvature of the user's head in the posterior portion of the top strap portion and deviate from the curvature of the user's head in the anterior portion of the top strap portion; (d) the top strap portion is rigidised to support the anterior portion in spaced relation to the user's head in use; (e) the anterior portion of the top strap portion curves inferiorly towards the head-mounted display unit; (f) the anterior portion of the top strap portion extends in a partially superior direction from the posterior portion of the top strap portion; (g) the anterior portion of the top strap portion is connected to the posterior portion of the top strap portion at an anterior end of the posterior portion, the anterior end of the posterior portion being located posteriorly to a fringe region of the user's head; (h) the anterior end of the posterior portion of the top strap portion is located posteriorly of the frontal bone of the user's head in use; (i) the anterior end of the posterior portion of the top strap portion is located proximate a coronal plane of the user in use, the coronal plane aligned with each otobasion superior of the user; (j) the anterior end of the posterior portion of the top strap portion is located posteriorly of the coronal plane in use; and/or (k) the anterior end of the posterior portion of the top strap portion is located proximate the parietal strap portion in use.

3.1.4 Battery Pack

In further examples: (a) the battery pack is connected to the top strap portion at a superior location and an inferior location; (b) the battery pack is removably connected to the top strap portion; (c) the battery pack is connected to the top strap portion by a hook-and-loop connection; (d) the inferior location is at or proximate the occipital strap portion; (e) the inferior location is spaced from the occipital strap portion to allow the top strap portion to deform between the inferior location and the occipital strap portion; (f) the battery pack is connected to the top strap portion at a superior side of the battery pack and is connected to the occipital strap portion at an inferior side of the battery pack; (g) the battery pack is connected to the occipital strap portion by an inferior battery pack strap portion; (h) the battery pack comprises a battery pack housing and a plurality of cells contained within the housing; (i) the cells are spaced equidistantly in the battery pack housing from an anterior wall of the battery pack housing; (j) one of more of the cells are spaced further from an anterior wall of the battery pack housing than another one or more of the cells; (k) each of plurality of cells are spaced from an anterior wall of the battery pack housing; (l) the battery pack housing contains a counterweight configured to contribute to a balance of weight between the battery pack and the head-mounted display unit; (m) the battery pack housing is spaced from a posterior surface of the user's head; and/or (n) the head-mounted display system comprises a pad configured to contact a posterior surface of the user's head, the battery pack housing being spaced from the posterior surface of the user's head by the pad.

3.1.4.1 Vertically Oriented Battery Pack

In further examples: (a) the positioning and stabilising structure is configured to hold the battery pack in a vertical orientation in use; (b) the battery pack has a length, a width and a depth, the length being longer than the width and the depth; (c) the positioning and stabilising structure is configured to hold the battery pack in an orientation in which the length of the battery pack is aligned substantially vertically in use; and/or (d) the length of the battery pack is aligned with the sagittal plane of the user's head in use.

3.1.4.2 Horizontally Orientated Battery Pack

In further examples: (a) the parietal strap portion is configured to overlie a region of the user's head in use at or proximate a junction between the parietal bones and the occipital bone; (b) the parietal strap portion and the lateral strap portions are configured to lie in a common plane in use; (c) the positioning and stabilising structure is configured to hold the battery pack in a horizontal orientation in use; (d) the battery pack has a length, a width and a depth, the length being longer than the width and the depth; (e) the positioning and stabilising structure is configured to hold the battery pack in an orientation in which the length of the battery pack is aligned substantially horizontally in use; (f) the length of the battery pack is aligned parallel to the parietal strap portion in use; and/or (g) the battery pack is connected to the parietal strap portion.

3.1.5 Additional Battery Pack Examples

In further examples: (a) the battery pack is supported by the top strap portion and/or the parietal strap portion; (b) the head-mounted display system comprises an opening aligned in the sagittal plane of the user's head in use between the battery pack and the occipital strap portion; (c) the head-mounted display system is configured to allow hair of the user to pass through the opening; (d) the occipital strap portion is formed in two portions each located on a respective lateral side of the sagittal plane of the user's head in use; (e) the two portions of the occipital strap portion are releasably attachable to each other at a pair of connection points, each connection point provided to a respective one of the two portions of the occipital strap portion; (f) each connection point is located at or proximate the sagittal plane of the user's head in use when the two portions of the occipital strap portion are connected to each other; (g) the connection points are spaced laterally of the sagittal plane in use when the two portions of the occipital strap portion are connected to each other; (h) the head-mounted display system comprises two battery packs, each battery pack supported on to a respective one of the two portions of the occipital strap portion; (i) the battery packs are spaced apart in use to allow the two portions of the occipital strap portion to connect to each other at or proximate the sagittal plane of the user's head in use; (j) the occipital strap portion is formed in two portions each located on a respective lateral side of the sagittal plane of the user's head in use, wherein the two portions of the occipital strap portion are not connected to each other in use, wherein medial ends of the two portions of the occipital strap portion are spaced apart from each other and are each spaced laterally from the sagittal plane in use; (k) the head-mounted display system comprises two battery packs, each battery pack provided to a respective one of the two portions of the occipital strap portion; (l) the positioning and stabilising structure is configured to hold the battery pack in a location overlying the occipital bone of the user's head in use; and/or (m) the positioning and stabilising structure is configured to hold the battery pack in a location proximate the occipital bone of the user' head and at or proximate a vertical axis of rotation of the user's head.

3.1.6 Retractable Power Cable

In further examples: (a) a portion of the power cable is located within the battery pack and is able to be extended from and retracted into the battery pack; (b) one or more layers of the top strap portion are partially located within the battery pack and are able to be extended from and retracted into the battery pack together with the power cable; (c) an outer layer of the top strap portion is located within the battery pack and is able to be extended from and retracted into the battery pack together with the power cable; (d) a substantially inextensible layer of the top strap portion is located within the battery pack and is able to be extended from and retracted into the battery pack together with the power cable (e) a user contacting layer of the top strap portion is located between the battery pack and the user's head; (f) the portion of the power cable located within the battery pack and the one or more layers of the top strap portion partially located within the battery pack form a retractable portion of the top strap portion able to be extended from and retracted into the battery pack to adjust a length of the top strap portion between the battery pack and the head-mounted display unit; (g) the retractable portion is able to be selectively moved between a plurality of predetermined positions with respect to the battery pack at which the position of the retractable portion is able to be fixed with respect to the battery pack; and/or (h) the retractable portion is able to move continuously within a range of positions with respect to the battery pack.

3.1.7 Arms

In further examples:

The head-mounted display unit comprises a display unit housing and a pair of arms extending from the display unit housing, the lateral strap portions each connecting to a respective one of the arms;

Each lateral strap portion connects to a posterior end of a respective one of the pair of arms;

Each lateral strap portion passes through an eyelet at the posterior end of the respective arm and is fastened back onto itself;

Each lateral strap portion connects to a respective one of the pair of arms proximate an anterior end of the arm;

Each lateral strap portion passes through an eyelet at or proximate the posterior end of the respective arm and through a hole proximate the anterior end of the arm and is fastened to the arm;

Each lateral strap portion is fastened to a laterally facing side of the arm;

Each lateral strap portion is fastened to an exposed portion of itself within the arm;

The eyelet at or proximate the posterior end of the arm is partially open allowing the strap to move in a transverse direction with respect to the strap into/out of the eyelet;

Each arm is covered in a sock, each lateral strap portion being fastened to the sock;

Each arm comprises a substantially rigid portion overmoulded to a textile portion; and/or Each of the pair of arms is able to pivot with respect to the display unit housing.

3.1.8 Adjustment Rigidiser

In further examples:

the positioning and stabilising structure further comprises an adjustment rigidiser comprising a substantially inextensible member configured to connect to the occipital strap portion, the adjustment rigidiser configured to reduce a length of the occipital strap portion;

the occipital strap portion comprises three or more occipital strap connection points, the adjustment rigidiser being selectively connectable to a first pair of the occipital strap connection points and to a second pair of the occipital strap connection points, wherein when the adjustment rigidiser is connected to the first pair of the occipital strap connection points the occipital strap portion has a first effective length and wherein when the adjustment rigidiser is connected to the second pair of the occipital strap connection points the occipital strap portion has a second effective length longer than the first effective length;

the adjustment rigidiser constrains the occipital strap portion to the first effective length when the adjustment rigidiser is connected to the first pair of the occipital strap connection points;

the adjustment rigidiser comprises a pair of adjustment rigidiser connection points configured to connect to the occipital strap connection points;

the occipital strap portion comprises four occipital strap connection points;

the second pair of occipital strap connection points are located medially of the first pair of occipital strap connection points;

the occipital strap portion comprises a left portion separated from a right portion, the adjustment rigidiser being configured to connect the left portion and the right portion;

the adjustment rigidiser comprises a medial rigidising portion and a pair of lateral rigidising portions extending laterally from the medial rigidising portion, the adjustment rigidiser connection points located on the lateral rigidising portions;

one adjustment rigidiser connection point is located on each lateral rigidising portion;

the medial rigidising portion is configured to be located in use overlying the user's occipital bone and overlying a junction between the user's parietal bones;

the medial rigidising portion is configured to be located on the user's head at or proximate the user's frontal bone, overlying a junction between the user's parietal bones and connecting to the occipital strap portion;

the adjustment rigidiser forms part of the top strap portion of the positioning and stabilising structure;

the adjustment rigidiser forms a substantially inextensible layer of the top strap portion;

the adjustment rigidiser is permanently attached within the top strap portion;

the adjustment rigidiser is permanently attached to a user-facing layer of the top strap portion;

the battery pack is configured to connect to the adjustment rigidiser;

a power cable is located in use between the adjustment rigidiser and an outer layer of the top strap portion;

the power cable is insertable between the adjustment rigidiser and the outer layer of the top strap portion;

the adjustment rigidiser is separable from a user-facing layer of the top strap portion;

the adjustment rigidiser is insertable between the user-facing layer and an outer layer of the top strap portion;

the adjustment rigidiser is configured to connect to the user-facing layer;

the adjustment rigidiser comprises hook material configured to form a hook-and-loop connection to the user-facing layer of the top strap portion;

the power cable is permanently attached to the adjustment rigidiser;

the battery pack is permanently attached to the adjustment rigidiser;

the adjustment rigidiser comprises an inferior cutout between the pair of lateral rigidising portions allowing the adjustment rigidiser to flex at or proximate the connection of the lateral rigidising portions to the medial rigidising portion;

the adjustment rigidiser comprises lateral cutouts on opposing lateral sides of the medial rigidising portion proximate the lateral rigidizing portions allowing the adjustment rigidiser to flex proximate the lateral cutouts; and/or the user-facing layer of the top strap portion comprises a cutout corresponding to (e.g. aligned with) the inferior cutout in the adjustment rigidiser.

3.1.9 Lockable Extendable Connection Portion

In further examples:

the positioning and stabilising structure comprises a first strap portion and a second strap portion connected by a lockable extendable connection portion comprising:

an elastically extendable connector strap portion configured to allow a predetermined amount of separation of the first strap portion from the second strap portion; and a substantially inextensible connector strap portion configured to releaseably attach the first strap portion to the second strap portion to prevent separation of the first strap portion from the second strap portion.

the substantially inextensible connector strap portion is able to be adjusted in length;

the substantially inextensible connector strap portion comprises a magnetic clip configured to magnetically attach to a connection point on the positioning and stabilising structure;

the positioning and stabilising structure comprises a lockable extendable connection portion in each lateral strap portion;

each lockable extendable connection portion is located at an arm extending posteriorly from the head-mounted display unit;

each lockable extendable connection portion is located proximate a junction between each lateral strap portion, the parietal strap portion and the occipital strap portion; and/or the positioning and stabilising structure comprises a lockable extendable connection portion in the occipital strap portion.

3.1.10 Power Cable Strap Portion

In further examples:

the head-mounted display system comprises a power cable connected between the battery pack and the head-mounted display unit;

the power cable may be located within the top strap portion in use;

the power cable may be located alongside the top strap portion in use;

the power is cable attached to a power cable strap portion proximate the head-mounted display unit;

the power cable strap portion is extendable in length and a serpentine portion of the power cable is attached to the power cable strap portion in a serpentine pattern enabling the power cable strap portion and the serpentine portion of the power cable to extend in length; and/or the power cable is attached to the parietal strap portion.

3.1.11 Rigidised Parietal and/or Occipital Strap Portions

In further examples:

the parietal strap portion comprises a layered construction;

the parietal strap portion is substantially inextensible;

the parietal strap portion comprises a user contacting layer and a substantially inextensible layer;

the user-contacting layer of the parietal strap portion is formed from a textile material;

an anterior end of the substantially inextensible layer of the parietal strap portion is located at or proximate a junction between the parietal strap portion and the occipital strap portion;

the occipital strap portion comprises a layered construction;

the occipital strap portion is substantially inextensible;

the occipital strap portion comprises a user contacting layer and a substantially inextensible layer;

the user-contacting layer of the occipital strap portion is formed from a textile material;

an anterior end of the substantially inextensible layer of the occipital strap portion is located at or proximate a junction between the parietal strap portion and the occipital strap portion; and/or the substantially inextensible layer of the parietal strap portion is connected to the substantially inextensible layer of the occipital strap portion.

3.2 Lockable Extendable Connection Portion

Another aspect of the present technology relates to a positioning and stabilising structure configured to hold a head-mounted display unit in an operable position on a user's head in use, the positioning and stabilizing structure comprising:

a posterior support portion configured to engage a posterior portion of a user's head;

a pair of lateral strap portions configured to connect between the posterior support portion and the head-mounted display unit, each configured to be located on a respective lateral side of the user's head in use;

wherein a first strap portion and a second strap portion of the positioning and stabilising structure are connected by a lockable extendable connection portion comprising:

an elastically extendable connector strap portion configured to allow a predetermined amount of separation of the first strap portion from the second strap portion; and a substantially inextensible connector strap portion configured to releaseably attach the first strap portion to the second strap portion to prevent separation of the first strap portion from the second strap portion.

In examples:

the substantially inextensible connector strap portion is able to be adjusted in length;

the substantially inextensible connector strap portion comprises a magnetic clip configured to magnetically attach to a connection point on the positioning and stabilising structure;

the positioning and stabilising structure comprises a lockable extendable connection portion in each lateral strap portion;

each lockable extendable connection portion is located at an arm extending posteriorly from the head-mounted display unit;

the posterior support portion comprises a parietal strap portion configured to overlie the parietal bones of the user's head in use and an occipital strap portion configured to overlie or lie below an occipital bone of the user's head in use;

each lockable extendable connection portion is located proximate a junction between each lateral strap portion, the parietal strap portion and the occipital strap portion;

the positioning and stabilising structure comprises a lockable extendable connection portion in the occipital strap portion;

the occipital strap portion comprises a medial occipital strap portion and at least one lateral occipital strap portion configured to connect to the medial occipital strap portion, the lateral occipital strap portion forming the substantially inextensible strap portion, the elastically extendable connector strap portion connecting between the lateral occipital strap portion and the medial occipital strap portion;

the elastically extendable connector strap portion connects between the medial occipital strap portion and a junction between the lateral occipital strap portion and the parietal strap portion;

the positioning and stabilizing structure comprises a lockable extendable portion in at least one of the lateral strap portions; and/or the elastically extendable connector strap portion is configured to connect between an arm of the head-mounted display unit and a junction between one of the pair of lateral strap portions and the parietal strap portion, the lateral strap portion forming the substantially inextensible connector strap portion.

3.3 Anterior and Posterior Portions of Top Strap Portion

Another aspect of the present technology relates to a positioning and stabilising structure configured to hold a head-mounted display unit in an operable position on a user's head in use, the positioning and stabilizing structure comprising:

- a posterior support portion configured to engage a posterior portion of a user's head;
- a pair of lateral strap portions configured to connect between the posterior support portion and the head-mounted display unit, each configured to be located on a respective lateral side of the user's head in use; and
- a top strap portion configured to connect between the posterior support portion and the head-mounted display unit, the top strap portion configured to overlie a superior portion of the user's head in use;
- wherein the top strap portion comprises an anterior portion and a posterior portion, the posterior portion being configured to engage the user's head in use, and the anterior portion being configured to not engage the user's head in use.

In examples:

- The top strap portion comprises a shape having a bend between the posterior portion of the top strap portion and the anterior portion of the top strap portion;

The top strap portion is shaped to follow a curvature of the user's head in the posterior portion of the top strap portion and deviate from the curvature of the user's head in the anterior portion of the top strap portion;

- The top strap portion is rigidised to support the anterior portion in spaced relation to the user's head in use;
- The anterior portion of the top strap portion curves inferiorly towards the head-mounted display unit;
- The anterior portion of the top strap portion extends in a partially superior direction from the anterior end of the posterior portion of the top strap portion;
- The anterior portion of the top strap portion is connected to the posterior portion of the top strap portion at an anterior end of the posterior portion, the anterior end of the posterior portion being located posteriorly to a fringe region of the user's head;
- The anterior end of the posterior portion of the top strap portion is located posteriorly of the user's frontal bone in use;
- The anterior end of the posterior portion of the top strap portion is located proximate a coronal plane of the user in use, the coronal plane aligned with each otobasion superior of the user;
- The anterior end of the posterior portion of the top strap portion is located posteriorly of the coronal plane in use; and/or
- The anterior end of the posterior portion of the top strap portion is located proximate the parietal strap portion in use.

In further examples:

- The top strap portion is configured to connect between the head-mounted display unit and a battery pack of the head-mounted display system for powering the head-mounted display system.
- The top strap portion is adjustable in length;
- The top strap portion is configured to be connected to the head-mounted display unit through an eyelet connected to a display unit housing of the head-mounted display unit and looped back and secured to itself;
- A user-facing layer of the top strap portion is configured to be passed through the eyelet and looped back and secured to itself, wherein an outer layer of the top strap portion does not pass through the eyelet;
- The top strap portion is substantially inextensible;
- The top strap portion comprises a layered construction;
- The top strap portion comprises a substantially inextensible layer;
- An anterior end of the substantially inextensible layer is spaced along the length of the top strap portion from the head-mounted display unit;
- The top strap portion comprises a textile user-facing layer;
- The top strap portion comprises a textile outer layer;
- The top strap portion comprises a power cable for connecting the battery pack to the head-mounted display unit to provide power from the battery to the head-mounted display unit in use;
- The power cable is internal to the top strap portion;
- The power cable is insertable through an interior of the top strap portion by the user; and/or
- The power cable is insertable through the top strap portion between the substantially inextensible layer and the textile outer layer.

Another aspect of the present technology relates to a head-mounted display system comprising:

- a head-mounted display unit comprising a display;
- a battery pack for powering the head-mounted display system;
- a positioning and stabilising structure according to any one of the above aspects or examples, configured to hold the head-mounted display unit in an operable position in use and configured to hold the battery posterior to the user's head in use.

3.4 Power Cable Management

Another aspect of the present technology relates to a head-mounted display system, comprising:

- a head-mounted display unit comprising:
  - a display unit housing comprising a display; and
  - an interfacing structure constructed and arranged to be in opposing relation with the user's face and engage the user's face;
- a positioning and stabilising structure structured and arranged to hold the head-mounted display unit in an operational position over a user's face in use;
- a battery pack for powering the head-mounted display system; and
- a power cable connecting the head-mounted display unit and the battery pack.

In examples:

- wherein the power cable enters the display unit housing outside of a periphery of the interfacing structure;
- the display unit housing comprises a posterior-facing side and an interfacing structure extending posteriorly from the posterior-facing side, the posterior-facing side being larger than the periphery of the interfacing structure, wherein the power cable enters the display unit housing through an opening in the posterior-facing side;
- the opening is inside of a periphery of the display unit housing;
- the opening is at a periphery of the display unit housing;
- the posterior facing side comprises a rectangular shape and the interfacing structure comprises a rounded shape, wherein the opening in the posterior-facing side is located proximate a corner of the rectangular shape of the posterior-facing side;

the head-mounted display unit comprises one or more power cable retention features configured to restrain the positioning and/or orientation of the power cable within the display unit housing;

the head-mounted display unit comprises two power cable retention features;

the power cable retention features are annular shaped rigid portions through which the power cable passes;

wherein the positioning and stabilising structure comprises:

a posterior support portion comprising a parietal strap portion configured to overlie the parietal bones of the user's head in use and an occipital strap portion configured to overlie or lie below an occipital bone of the user's head in use;

a pair of lateral strap portions configured to connect between the posterior support portion and the head-mounted display unit, each configured to be located on a respective lateral side of the user's head in use; and a top strap portion configured to connect between the battery pack and the head-mounted display unit, the top strap portion configured to overlie a superior portion of the user's head in use;

wherein the power cable runs along the top strap portion from the battery pack to the head-mounted display unit;

wherein the power cable runs along the parietal strap portion and one of the lateral strap portions from the battery pack to the head-mounted display unit;

wherein the power cable connects to the head-mounted display unit at a laterally-facing side thereof;

wherein the power cable runs along the occipital strap portion and one of the lateral strap portions; and/or wherein the power cable comprises a slack portion configured to tolerate movement between the head-mounted display unit and the battery pack.

3.5 Interfacing Structures

A head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a resilient and flexible face engaging portion having a curved cross-section, wherein the face engaging portion comprises an anterior portion extending in a radially outward posterior direction, curving around into a posterior portion extending in a radially inward posterior direction, wherein a posterior facing surface of the posterior portion provides a user contact surface.

Another aspect of the present technology relates to an interfacing structure for a head-mounted display unit constructed and arranged to be in opposing relation with a user's face, the interfacing structure comprising a resilient and flexible face engaging portion having a curved cross-section, wherein the face engaging portion comprises an anterior portion extending in a radially outward posterior direction, curving around into a posterior portion extending in a radially inward posterior direction, wherein a posterior facing surface of the posterior portion provides a user contact surface.

Another aspect of the present technology relates to an interfacing structure for a head-mounted display unit constructed and arranged to be in opposing relation with a user's face, the interfacing structure comprising a resilient and flexible face engaging portion having a curved cross-section, wherein the face engaging portion comprises an anterior portion extending in a radially outward posterior In examples: (a) the face engaging portion is configured such that the posterior portion is biased towards engagement with the user's face, in use; (b) the face engaging portion comprises at least one closed loop portion having an enclosed cross-section; (c) the face engaging portion comprises a first closed loop portion and a second closed loop portion; (d) the first closed loop portion and the second closed loop portion are provided on respective sides of the user's nose in use; (e) the first closed loop portion and the second closed loop portion are provided proximate the user's cheeks in use; (f) the face engaging portion bends around and overlaps itself to provide the at least one closed loop portion; (g) the face engaging portion comprises a base portion and a loop portion comprising a loop flange, wherein the loop flange overlaps the base portion to provide the closed loop portion; (h) the loop portion extends from an anterior position to a posterior position; (i) a cross-section of the loop portion tapers off between the anterior position and the posterior position; (j) the loop portion includes an arcuate portion between the anterior position and the loop flange; (k) the loop flange overlaps an anterior facing surface of the base portion; (l) the loop flange is secured to the base portion; (m) the base portion and the loop portion are integrally formed as a single component; (n) the interfacing structure comprises a light-blocking nasal portion spanning between cheek portions of the face engaging portion, wherein the light-blocking nasal portion comprises a pronasale portion extending radially and in a superior direction over the pronasale of the user's nose, wherein the light-blocking nasal portion further comprises a first bridge portion and a second bridge portion extending in a superior direction from the pronasal portion, the first bridge portion and the second bridge portion having a slot therebetween, the slot extending from a posterior edge of the light-blocking nasal portion towards the pronasale portion, and wherein the first bridge portion and the second bridge portion are configured to rest on respective sides of the user's nose bridge in use; (o) the interfacing structure comprises a foam cushion, wherein the posterior portion extends over the foam cushion; (p) the face engaging portion comprises a cushion support flange extending from a radially inwardly facing surface of the face engaging portion; (q) the foam cushion is provided between the cushion support flange and the posterior portion; (r) the face engaging portion comprises a plurality of regions, each of the plurality of regions having a respective cross-sectional thickness; (s) the face engaging portion comprises a forehead portion, two cheek portions, and two side portions proximate the user's sphenoid regions in use and connecting the forehead portion to the respective cheek portions; (t) the plurality of regions of the face engaging portion comprises: a first region extending around the inner periphery of the face engaging portion; a second region extending around the outer periphery of the face engaging portion; a third region extending around the inner periphery of the face engaging portion, positioned between the first region and the second region; fourth regions in each cheek portion, bounded by the first region and the third region; (u) the first region comprises a posterior forehead portion in the forehead portion, extending in a superior direction from the inner periphery of the face engaging portion; (v) the third region comprises a superior forehead portion in the forehead portion, extending over the centre of the forehead portion into an anterior forehead portion; (w) the second region comprises superior lateral portions, each extending from a respective side portion towards the superior forehead portion; (x) the second region comprises an outer periphery forehead portion; (y) the first region has a greater thickness than the fourth regions; (z) the fourth regions have a greater thickness than the third region; (aa) the third region has a greater thickness than the second region; (ab) a width of the first region in an anterior-posterior direction is greater through the forehead portion than at the cheek portions or the side portions; and/or (ac) a width of the second region in an anterior-posterior direction is greater through the forehead portion than at the cheek portions.

Another aspect of the present technology relates to a head-mounted display system, comprising:

- a head-mounted display unit; and
- a positioning and stabilising structure structured and arranged to hold the head-mounted display unit in an operational position over a user's face in use,
- the head-mounted display unit comprising an interfacing structure constructed and arranged to be in opposing relation with the user's face,
- wherein the interfacing structure comprises a rigid support portion and a flexible and resilient face engaging portion provided to the rigid support portion, and wherein the face engaging portion has a curved cross-section.

Another aspect of the present technology relates to an interfacing structure for a head-mounted display unit constructed and arranged to be in opposing relation with a user's face, the interfacing structure comprising a rigid support portion and a flexible and resilient face engaging portion provided to the rigid support portion, wherein the face engaging portion has a curved cross-section.

In examples: (a) the face engaging portion comprises a support flange and an integral face engaging flange having a face engaging surface; (b) an overlapping portion of the face engaging portion is secured to the rigid support portion; (c) the rigid support portion comprises a locating portion; (d) the face engaging portion comprises a biasing portion configured to provide a biasing force to the face engaging portion in the direction of the user's face; (e) the biasing portion comprises a spring; (f) the biasing portion is received within the locating portion; and/or (g) the face engaging portion comprises a concertina section between the rigid support portion and the face engaging flange.

In further examples: (a) he interfacing structure comprises a foam portion supported by the resilient and flexible face engaging portion, wherein the foam portion provides the face engaging surface; (b) the foam portion is permanently attached to the face engaging flange; (c) the foam portion is releasably attached to the face engaging flange; and/or (d) the foam cushion comprises one of a textile-foam composite, a flocked foam, or a raw foam.

In further examples: (a) the interfacing structure comprises a textile layer provided to the resilient and flexible face engaging portion, wherein the textile layer provides the face engaging surface; (b) the textile layer is releasably attached to the face engaging portion; and/or (c) the textile layer is permanently attached to the face engaging portion.

Another aspect of the present technology relates to a head-mounted display system, comprising:

- a head-mounted display unit; and
- a positioning and stabilising structure structured and arranged to hold the head-mounted display unit in an operational position over a user's face in use,
- the head-mounted display unit comprising an interfacing structure constructed and arranged to be in opposing relation with the user's face,
- wherein the interfacing structure comprises a face engaging portion supported by a more rigid support portion, wherein the face engaging portion comprises a foam cushion and an elastomeric cover over the foam cushion.

Another aspect of the present technology relates to an interfacing structure for a head-mounted display unit constructed and arranged to be in opposing relation with a user's face, the interfacing structure comprising a face engaging portion supported by a more rigid support portion, wherein the face engaging portion comprises a foam cushion and an elastomeric cover over the foam cushion.

In examples: (a) he face engaging portion comprises a support flange, and a cushion support flange extending from the support flange; (b) the foam cushion is provided on the cushion support flange; (c) the cushion cover is releasably attached to the interfacing structure; (d) the cushion cover is permanently attached to the interfacing structure; he cushion cover is integrally formed with the support flange and cushion support flange (for example, being integrally formed); (e) the cushion cover does not extend around the foam cushion so far as to reach the cushion support flange; (f) the cushion support flange extends from the rigid support portion, and is made of a more rigid material than the cushion cover; (g) the cushion cover extends from a position on the cushion support flange proximal to the user's face in use; (h) the face engaging portion comprises an overlapping portion secured to the rigid support portion; (i) the cushion cover overlays the foam cushion and the support flange; (j) an edge of the cushion cover sits proximal to the rigid support portion; and/or (k) the cushion cover is connected to the rigid support portion.

Another aspect of the present technology relates to a head-mounted display system, comprising:

- a head-mounted display unit; and
- a positioning and stabilising structure structured and arranged to hold the head-mounted display unit in an operational position over a user's face in use,
- the head-mounted display unit comprising an interfacing structure constructed and arranged to be in opposing relation with the user's face,
- wherein the interfacing structure comprises a support structure and a face engaging portion integrally formed as a single component comprising varying thicknesses so as to provide desired levels of rigidity and/or cushioning effect at face engaging surfaces.

Another aspect of the present technology relates to an interfacing structure for a head-mounted display unit constructed and arranged to be in opposing relation with a user's face, the interfacing structure comprising a support structure and a face engaging portion integrally formed as a single component comprising varying thicknesses so as to provide desired levels of rigidity and/or cushioning effect at face engaging surfaces.

In examples: (a) the interfacing structure comprises a forehead portion, two cheek portions, and two side portions proximate the user's sphenoid regions in use and connecting the forehead portion to the respective cheek portions; (b) a tab extends from a free end of each cheek portion; (c) the interfacing structure comprises a first region extending around the inner periphery of the interfacing structure; (d) the interfacing structure comprises a second region extending around the outer periphery of the interfacing structure; (e) the interfacing structure comprises a third region extending around the inner periphery of the interfacing structure, positioned between the first region and the second region; (f) the interfacing structure comprises fourth regions in each cheek portion, bounded by the first region and the third region; (g) the first region comprises a posterior forehead portion in the forehead portion, extending in a superior direction from the inner periphery of the interfacing structure; (h) the third region comprises a superior forehead portion in the forehead portion, extending over the centre of the forehead portion into an anterior forehead portion; (i) the second region comprises superior lateral portions, each extending from a respective side portion towards the superior forehead portion; (j) the second region comprises an outer periphery forehead portion; (k) the first region has a greater thickness than the fourth regions; (l) the fourth regions have a greater thickness than the third region; (m) the third region has a greater thickness than the second region; (n) the first region has a thickness of between 1.9 mm to 2.3 mm; (o) the first region has a thickness of about 2 mm; (p) the fourth regions have a thickness of between 1.4 mm to 1.8 mm; (q) the fourth regions have a thickness of about 1.5 mm; (r) the second region has a thickness of between 0.9 mm to 1.2 mm; (s) the second region has a thickness of about 1 mm; (t) the third region has a thickness of between 0.4 mm to 0.8 mm; (u) the third region has a thickness of about 0.7 mm; (v) the width of the first region is wider through the forehead portion than at the cheek portions, or side portions; and/or (w) the width of the second region is greater through the forehead portion than at the cheek portions.

Another aspect of the present technology relates to a head-mounted display system, comprising:

- a head-mounted display unit; and
- a positioning and stabilising structure structured and arranged to hold the head-mounted display unit in an operational position over a user's face in use,
- the head-mounted display unit comprising an interfacing structure constructed and arranged to be in opposing relation with the user's face,
- wherein the interfacing structure comprises a face engaging portion configured to be biased towards engagement with a user's face, in use.

Another aspect of the present technology relates to an interfacing structure for a head-mounted display unit constructed and arranged to be in opposing relation with a user's face, the interfacing structure comprising a face engaging portion configured to be biased towards engagement with a user's face, in use.

In examples: (a) only selected regions of the face engaging portion are biased towards engagement with a user's face; (b) the interfacing structure is shaped such that, when unloaded, regions of the face engaging portion extend towards the user at an angle non-parallel to the surface of the user's face with which the face engaging portion is intended to engage; (c) a first interface portion corresponding to a typically recessed region of the user's face is shaped to bias a face engaging flange towards engagement with the user's face; and/or (d) a second interface portion corresponding to a typically protruding region of the user's face is shaped to avoid biasing a face engaging flange towards engagement with the user's face.

Another aspect of the present technology relates to a head-mounted display system, comprising:

- a head-mounted display unit; and
- a positioning and stabilising structure structured and arranged to hold the head-mounted display unit in an operational position over a user's face in use,
- the head-mounted display unit comprising an interfacing structure constructed and arranged to be in opposing relation with the user's face,
- wherein the interfacing structure comprises a chassis configured to permit airflow into the space between the interfacing structure and the user.

Another aspect of the present technology relates to an interfacing structure for a head-mounted display unit constructed and arranged to be in opposing relation with a user's face, the interfacing structure comprising a chassis configured to permit airflow into the space between the interfacing structure and the user.

In examples: (a) the chassis comprises at least one opening; (b) the chassis comprises one or more of: a lateral opening, a superior opening, and an inferior opening; (c) the chassis comprises a main chassis portion configured to extend laterally across the user's face in use, and side chassis portions configured to extend in a generally posterior direction; (d) the chassis comprises at least one opening between the main chassis portion and each side chassis portion; (e) the head-mounted display unit comprises a display unit housing, and an air pathway is provided between the interfacing structure and the display unit housing to the at least one opening; (f) the chassis comprises reinforcing provided between the main chassis portion and each side chassis portion; (g) the chassis comprises one or more reinforcing members spanning between the main chassis portion and each side chassis portion; (h) the interfacing structure comprises a face engaging portion; and/or (i) the face engaging portion is integral with the chassis.

3.6 Frontal Support Portion

Another aspect of the present technology relates to a head-mounted display system comprising:

- a head-mounted display unit comprising a display;
- a positioning and stabilising structure configured to hold the head-mounted display unit in an operable position on the user's head in use, the positioning and stabilizing structure comprising:
  - a posterior support portion configured to engage a posterior portion of a user's head;
  - a pair of lateral strap portions configured to connect between the posterior support portion and the head-mounted display unit, each configured to be located on a respective lateral side of the user's head in use;
  - a frontal support portion configured to engage the user's head at a location overlying a frontal bone of the user's head in use;
  - wherein the frontal support portion is connected to the head-mounted display unit.

3.6.1 Frontal Support Portion Connects to Head-Mounted Display Unit

In examples:

- the positioning and stabilising structure comprises a frontal connector connected between the frontal support portion and the head-mounted display unit;
- the frontal connector is located substantially in the sagittal plane of the user's head;
- the frontal connector is formed from a flexible material;
- the flexible material comprises a flexible inelastic material, such as a thermoplastic material;
- the flexible material comprises an elastic material, such as one of silicone, TPE or an elastic textile strap; and/or
- the frontal connector is formed from a substantially rigid material, such as a thermoplastic material.

3.6.2 Frontal Support Portion Connects to Posterior Support Portion

In further examples:

the positioning and stabilising structure comprises a pair of lateral connectors each connected between the frontal support portion and the posterior support portion;

the posterior support portion comprises a parietal strap portion configured to overlie the parietal bones of the user's head in use and an occipital strap portion configured to overlie or lie below an occipital bone of the user's head in use;

each of the lateral connectors is connected to a respective side of the posterior support portion proximate the occipital strap portion, or connected to a respective side of the occipital strap portion;

each lateral connector is elastically extendable;

each lateral connector is adjustable in length;

each lateral connector is fixedly connected to the frontal support portion and releasably attachable to the posterior support portion;

each lateral connector is connected to the posterior support portion by a snap button, a clip or a hook-and-loop connection;

each lateral connector is releasably attachable to the frontal support portion and releasably attachable to the posterior support portion; and/or each lateral connector is releasably attachable to the frontal support portion and fixedly connected to the posterior support portion.

3.6.3 Frontal Support Portion Connects to Arms

In further examples:

the head-mounted display unit comprises a display unit housing and a pair of arms extending from the display unit housing, the lateral strap portions each connecting to a respective one of the arms;

each lateral strap portion connects to a posterior end of a respective one of the pair of arms;

each lateral strap portion passes through an eyelet at the posterior end of the respective arm and is fastened back onto itself; and/or each of the pair of arms is able to pivot with respect to the display unit housing.

In further examples:

the positioning and stabilising structure comprises a pair of lateral connectors each connected between the frontal support portion and a respective one of the pair of arms;

each lateral connector is elastically extendable;

each lateral connector is adjustable in length;

each lateral connector is fixedly connected to the frontal support portion and releasably attachable to a respective one of the arms;

each lateral connector is connected to a respective one of the arms by a snap button, a clip or a hook-and-loop connection;

each lateral connector is releasably attachable to the frontal support portion and releasably attachable to a respective one of the arms; and/or each lateral connector is releasably attachable to the frontal support portion and fixedly connected to a respective one of the arms.

3.7 Hair Strap Portion

A positioning and stabilizing structure for a head-mounted display system, the positioning and stabilizing structure configured to hold a head-mounted display unit in an operable position on the user's head in use, the positioning and stabilizing structure comprising:

a posterior support portion configured to engage a posterior portion of a user's head;

one or more anterior support portions configured to connect the posterior support portion and the head-mounted display unit in use; and a hair strap portion connected to the posterior support portion, the hair strap portion being positionable in use between the user's head and hair descending from the posterior portion of the user's head.

In examples:

The one or more anterior support portions comprises a pair of lateral strap portions connecting the posterior support portion to the head-mounted display unit;

the hair strap portion comprises a pair of ends connected to respective lateral sides of the posterior support portion;

each end of the hair strap portion is located proximate the Frankfort horizontal plane of the user's head in use;

the hair strap portion is removably attachable at one or both ends to the posterior support portion;

the hair strap portion comprises a left strap portion and a right strap portion removably attached thereto;

the left strap portion is removably attached to the right strap portion proximate a sagittal plane of the user's head in use;

the hair strap portion is elastically extendable;

the hair strap portion is substantially non-extendable;

the posterior support portion comprises a parietal strap portion configured to overlie the parietal bones of the user's head in use and an occipital strap portion configured to overlie or lie below an occipital bone of the user's head in use;

the hair strap portion is connected to the occipital strap portion in use; and/or the hair strap portion is connected to the occipital strap portion proximate ends of the occipital strap portion.

3.8 Inwardly Biased Interfacing Structure

Another aspect of the present technology relates to an interfacing structure for a head-mounted display unit constructed and arranged to be in opposing relation with a user's face, the interfacing structure comprising:

a chassis comprising a main chassis portion configured to extend laterally across the user's face in use, and side chassis portions configured to extend in a generally posterior direction;

a face engaging portion connected about at a periphery of the chassis, the face engaging portion configured to contact the user's face in use;

wherein each of the side chassis portions is biased medially towards the user's head to bias the face engaging portion into contact with the user's head on each side of the user's head at or proximate the user's sphenoid bone.

In examples:

The chassis is flexible allowing the side chassis portions to be spread laterally to a splayed configuration by the user's head and biased medially towards an unsplayed configuration in use;

The side chassis portions are flexible so as to flex or pivot with respect to the main chassis portion allowing the side chassis portions to be spread laterally to a splayed configuration by the user's head and biased medially towards an unsplayed configuration in use;

The side chassis portions are able to flex or pivot with respect to the main chassis portion allowing the side chassis portions to be spread laterally to a splayed configuration by the user's head and biased medially towards an unsplayed configuration in use, each side chassis portion biased medially by a biasing component;

The biasing component comprises a spring element configured to pull each side chassis portion medially;

The biasing component comprises a spring element configured to push each side chassis portion medially;

The face engaging portion comprises a face engaging flange;

The face engaging flange curves inwardly from the chassis;

The face engaging flange is formed from silicone;

The chassis comprises at least one opening between the main chassis portion and each side chassis portion; and/or the head-mounted display unit comprises a display unit housing, and an air pathway is provided between the interfacing structure and the display unit housing to the at least one opening.

3.9 Positioning and Stabilising Structure that Connects to Interfacing Structure Another aspect of the present technology relates to a head-mounted display system comprising:

a head-mounted display unit comprising:

a display unit housing comprising a display; and an interfacing structure configured to contact the user's face in use;

a positioning and stabilising structure configured to hold the head-mounted display unit in an operable position on the user's head in use, the positioning and stabilising structure comprising:

a posterior support portion configured to engage a posterior portion of a user's head; and a pair of lateral strap portions connected to the posterior support portion and configured to connect to the interfacing structure of the head-mounted display.

3.10 Positioning and Stabilising Structure Pulls Sides of Chassis Inwards

Another aspect of the present technology relates to a head-mounted display system comprising:

a head-mounted display unit comprising a display and an interfacing structure, the interfacing structure comprising:

a chassis comprising a main chassis portion configured to extend laterally across the user's face in use, and a pair of side chassis portions each configured to extend in a generally posterior direction from a respective lateral side of the main chassis portion;

a face engaging portion connected about at a periphery of the chassis, the face engaging portion configured to contact the user's face in use;

a positioning and stabilising structure configured to hold the head-mounted display unit in an operable position on the user's head in use, the positioning and stabilising structure comprising:

a posterior support portion configured to engage a posterior portion of a user's head;

a pair of lateral strap portions configured to connect the posterior support portion and the head-mounted display unit in use;

wherein in use the positioning and stabilising structure is connected to the head-mounted display unit such that in use the side chassis portions are urged medially towards the user's head by the lateral strap portions to urge the face engaging portion into contact with the user's head on each side of the user's head at or proximate the user's sphenoid bone.

In examples:

each lateral strap portion is configured to connect to a respective one of the side chassis portions;

each lateral strap portion is configured to pull the respective side chassis portion rearwardly causing the side chassis portion to flex or pivot medially to urge the face engaging portion into contact with the user's head at or proximate the user's sphenoid bone;

each lateral strap portion is configured to push the respective side chassis portion medially causing the side chassis portion to flex or pivot medially to urge the face engaging portion into contact with the user's head at or proximate the user's sphenoid bone;

each lateral strap portion is configured to push the respective side chassis portion medially via a substantially rigid member;

the posterior support portion comprises a parietal strap portion configured to overlie the parietal bones of the user's head in use and an occipital strap portion configured to overlie or lie below an occipital bone of the user's head in use;

the anterior support portion comprises a pair of upper lateral strap portions each configured to connect between the posterior support portion and the head-mounted display unit on a respective side of the user's head in use and a pair of lower lateral strap portions each configured to connect between the posterior support portion and the head-mounted display unit on a respective side of the user's head in use;

the upper lateral strap portions are each configured to apply a force to the head-mounted display unit having both a superior and posterior component;

the lower lateral strap portions are each configured to be removably connected to a respective side chassis portion with a magnetic connection; and/or the posterior support portion comprises a loop strap portion having a superior portion overlying the parietal bones of the user's skull and an inferior portion overlying the occipital bone of the user's skull.

3.11 Interfacing Structure Comprising Two or More Components

Another aspect of the present technology relates to a head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a chassis and a face engaging portion, wherein at least a portion of the face engaging portion is configured to be releasably attached to the chassis.

Another aspect of the present technology relates to an interfacing structure for a head-mounted display unit constructed and arranged to be in opposing relation with a user's face, the interfacing structure comprising a chassis and a face engaging portion, wherein at least a portion of the face engaging portion is configured to be releasably attached to the chassis.

In examples: (a) the releasably attached portion(s) of the face engaging portion may be provided at discrete locations to the chassis; (b) the releasably attached portion(s) may be provided in one or more of: a forehead region, and/or one or more cheek regions, of the interfacing structure; (c) the releasably attached portion(s) of the interfacing structure may be provided to the entire periphery of the chassis, or at least a substantial portion thereof; (d) the releasably attached portion(s) of the interfacing structure may be made of one or more of: a foam material, an elastomeric material, a textile material, and a composite material; (e) the face engaging portion of the interfacing structure may comprise at least one elastomeric portion, and at least one foam portion; (f) the at least one foam portion may be attached to the interfacing structure such that the elastomeric portion covers the foam portion to provide a face engaging surface; (g) the at least one foam portion may be attached to the chassis, the elastomeric portion, or both the chassis and the elastomeric portion; (h) a portion of the face engaging portion of the interfacing structure may be permanently attached to the chassis; and/or (i) spaces in the permanently attached portion of the face engaging portion may be provided in which the removeably attached portions may be positioned and attached relative to the chassis.

3.12 Side Arms Inside of Housing Periphery

Another aspect of the present technology relates to a head-mounted display system comprising:

a head-mounted display unit;

a positioning and stabilising structure structured and arranged to hold the head-mounted display unit in an operational position over a user's face in use, the positioning and stabilising structure comprising:

a posterior support portion configured to engage a posterior portion of a user's head;

a pair of lateral strap portions configured to connect between the posterior support portion and the head-mounted display unit, each configured to be located on a respective lateral side of the user's head in use;

wherein the head-mounted display unit comprises:

a display unit housing comprising a display;

an interfacing structure configured to contact the user's face in use;

a pair of arms, each arm extending posteriorly from the display unit housing, the arms each being configured for attachment to a respective one of the lateral strap portions of the positioning and stabilising structure;

wherein the display unit housing has a posterior side having a periphery, each of the arms extending from the display unit housing from within the periphery of the posterior side of the display unit housing.

Another aspect of the present technology relates to a head-mounted display unit therefor.

In examples:

The interfacing structure has a periphery, and each of the arms is located between the periphery of the posterior side of the display unit housing and the periphery of the interfacing structure;

Each of the arms comprises an eyelet configured to receive a respective one of the lateral strap portions of the positioning and stabilising structure;

The eyelet of each arm is located at or proximate a posterior end of the respective arm;

Each of the pair of arms is able to pivot with respect to the display unit housing;

Each of the arms is configured to pivot about a horizontal axis perpendicular to the sagittal plane of the user's head in use;

Each of the arms is configured to pivot through an angular range of at least 9 degrees; and/or The angular range is at least 19 degrees.

In further examples:

Each of the arms has a predetermined resistance to pivotal movement with respect to the display unit housing;

Each of the arms is configured to pivot between a plurality of predetermined incremental orientations, the predetermined resistance to pivotal movement being required to be overcome before the arms are able to pivot from one predetermined incremental orientation to another;

Each of the arms comprises one or more first engagement features configured to engage sequentially with a plurality of second engagement features of the head-mounted display unit during pivoting of the arms between the predetermined incremental orientations;

Each of the arms comprises a single first engagement feature;

Each of the arms comprises a plurality of first engagement features, each first engagement feature configured to engage with a respective one of the second engagement features at a time and configured to move sequentially between the second engagement features during pivoting of the arms;

Each of the arms comprises a plurality of first engagement features configured to engage with one or more second engagement features of the head-mounted display unit, the one or more second engagement features being configured to engage sequentially with the first engagement features during pivoting of the arms between the predetermined incremental orientations;

The first engagement features are protrusions and the second engagement features are recesses; and/or The first engagement features are recesses and the second engagement features are protrusions.

In further examples:

Each arm comprises a hub portion pivotably connected to the display unit housing and an elongate portion extending from the hub portion;

The one or more first engagement features of each arm are provided to the elongate portion of the arm;

Each arm is configured to deform to allow the one or more first engagement features to move sequentially between the second engagement features during pivoting of the arms; and/or Each arm comprises a spring configured to bias the elongate portion of the arm towards the second engagement features such that the one or more first engagement features are biased into engagement with the second engagement features.

In further examples:

The one or more first engagement features of each arm are provided to the hub portion of the arm in a circular arrangement and configured to rotate with the hub portion about a pivot point of the arm;

The first engagement features of each arm face radially away from the pivot point, and the second engagement features face radially towards the pivot point;

The first engagement features of each arm face radially towards the pivot point, and the second engagement features face radially away from the pivot point;

The first engagement features are provided to a deformable portion of the hub portion, the deformable portion being configured to deform to allow the first engagement features to move sequentially between second engagement features when the arm is pivoted;

The hub portion comprises a raised portion being raised with respect to the arm and comprising the deformable portions and the first engagement features, the raised portion comprising a hole adjacent each deformable portion, the holes allowing the deformable portions and first engagement features to deform towards the holes to allow the first engagement features to move sequentially between second engagement features when the arm is pivoted;

Each deformable portion comprises one or more cantilever arm portions having at least one of the first engagement features thereon, the cantilever arm portions configured to deform to allow the first engagement features to move sequentially between second engagement features when the arm is pivoted;

Each cantilever arm portion has a single first engagement feature at the end thereof;

Each cantilever arm portion has multiple first engagement features thereon;

The raised portion has an S-shape; and/or

The first engagement features of the arm form a snap-fit connection to the head-mounted display unit to connect the arm to the head-mounted display unit.

In further examples:

The first engagement features face away from the hub portion of the arm and towards the second engagement features in a direction parallel to the axis of rotation of the arm.

The hub portion is configured to move parallel to the axis of rotation of the arm to move away from the second engagement features to allow the first engagement features to move sequentially between second engagement features when the arm is pivoted; and/or The hub portion is biased towards the second engagement features by a spring.

In further examples:

Each of the arms is connected to the display unit housing such that a predetermined static torque resistance is required to be overcome for each arm to pivot with respect to the display unit housing;

The predetermined static torque resistance is provided by static friction;

The head-mounted display system comprises a pair of friction rings, each of which is mounted in contact with a respective one of the arms and with an adjacent surface within the head-mounted display unit to provide static friction required to be overcome for each arm to pivot with respect to the display unit housing;

Each of the friction rings is located within a friction ring cavity defined partially by the respective arm and partially by a portion of the head-mounted display unit to which the arm is mounted;

Each arm is attached to a respective one of a pair of arm mounting portions;

Each of the arms is attached to a respective one of a pair of arm mounting portions, the display unit housing comprises a pair of lateral portions on opposing lateral sides of the display unit housing, each of the arm mounting portions being attached to a medial side of a respective one of the lateral portions;

Each of the arms is located between a respective arm mounting portion and a respective lateral portion of the display unit housing;

Each of the arms has a transverse cross sectional shape comprising a major axis and a minor axis, each arm being larger in the major axis than in the minor axis, wherein at a point along the length of each arm located interior to the display unit housing, the major axis is oriented at an oblique angle to the sagittal plane of the user's head in use;

At the point along the length of each arm located interior to the display unit housing, the major axis of the transverse cross sectional shape has a superomedial-inferolateral orientation in use;

Each of the arms is shaped such that the major axis of the transverse cross section changes orientation along the length of the arm; and/or At a point along the length of each arm located exterior to the display unit housing, the major axis is oriented substantially parallel to the sagittal plane of the user's head in use.

In further examples:

The head-mounted display unit comprises a pair of electronics volumes, each electronics volume located on a respective side of the head-mounted display unit and proximate a respective one of the arms, each electronics volume comprises one or more electronic components;

Each arm comprises a hub portion pivotably connected to the display unit housing at a pivot point and an elongate portion extending from the hub portion;

The elongate portion is curved to avoid interference with the electronics volume;

Each arm comprises an eyelet for connection with a lateral strap portion, the elongate portion comprising an offset portion being offset from an axis through the eyelet and the pivot point; and/or The electronics volume contains one or more of a sensor, a battery, a processor or an audio speaker.

3.13 Arms Having Elastic Connector Elements Connected to Lateral Strap Portions

Another aspect of the present technology relates to a head-mounted display system comprising:

a head-mounted display unit;

a positioning and stabilising structure structured and arranged to hold the head-mounted display unit in an operational position over a user's face in use, the positioning and stabilising structure comprising:

a posterior support portion configured to engage a posterior portion of a user's head;

a pair of lateral strap portions configured to connect between the posterior support portion and the head-mounted display unit, each configured to be located on a respective lateral side of the user's head in use;

wherein the head-mounted display unit comprises:

a display unit housing comprising a display;

an interfacing structure configured to contact the user's face in use;

a pair of arms, each arm extending posteriorly from the display unit housing, the arms each being configured for releaseable direct attachment to a respective one of the lateral strap portions of the positioning and stabilising structure, a pair of elastic connectors, each elastic connector configured to form an elastic connection connecting a respective one of the lateral strap portions to a respective one of the arms, wherein the elastic connectors are configured to stretch during donning and doffing of the head-mounted display system when the lateral strap portions are not directly attached to the arms while maintaining the elastic connection between the lateral strap portions and the arms.

In examples:

Each arm comprises a hub portion and an elongate portion, the elastic connector being connected to the elongate portion at an elastic connector connection point;

Each arm comprises an eyelet at a posterior end of the arm configured to connect to a respective lateral strap portion;

The elastic connector connection point is located anterior to the eyelet;

Each elastic connector is permanently connected to the respective arm; and/or

Each elastic connector is removably attached to the respective lateral strap portion.

3.14 Arms Configured to Pivot Through Predetermined Incremental Orientations

Another aspect of the present technology relates to a head-mounted display system comprising:

a head-mounted display unit;

a positioning and stabilising structure structured and arranged to hold the head-mounted display unit in an operational position over a user's face in use, the positioning and stabilising structure comprising:

a posterior support portion configured to engage a posterior portion of a user's head;

a pair of lateral strap portions configured to connect between the posterior support portion and the head-mounted display unit, each configured to be located on a respective lateral side of the user's head in use;

wherein the head-mounted display unit comprises:

a display unit housing comprising a display;

an interfacing structure configured to contact the user's face in use;

a pair of arms, each arm extending posteriorly from the display unit housing, the arms each being configured for attachment to a respective one of the lateral strap portions of the positioning and stabilising structure, wherein each of the arms is configured to pivot with respect to the display unit housing between a plurality of predetermined incremental orientations, and wherein the predetermined resistance to pivotal movement is required to be overcome before the arms are able to pivot from one predetermined incremental orientation to another.

In examples:

the display unit housing has a posterior side having a periphery, each of the arms extending from the display unit housing from within the periphery of the posterior side of the display unit housing;

Each of the arms comprises one or more first engagement features configured to engage sequentially with a plurality of second engagement features of the head-mounted display unit during pivoting of the arms between the predetermined incremental orientations;

Each of the arms comprises a single first engagement feature;

Each of the arms comprises a plurality of first engagement features, each first engagement feature configured to engage with a respective one of the second engagement features at a time and configured to move sequentially between the second engagement features during pivoting of the arms;

Each of the arms comprises a plurality of first engagement features configured to engage with one or more second engagement features of the head-mounted display unit, the one or more second engagement features being configured to engage sequentially with the first engagement features during pivoting of the arms between the predetermined incremental orientations;

The first engagement features are protrusions and the second engagement features are recesses; and/or The first engagement features are recesses and the second engagement features are protrusions.

In further examples:

Each arm comprises a hub portion pivotably connected to the display unit housing and an elongate portion extending from the hub portion;

The one or more first engagement features of each arm are provided to the elongate portion of the arm;

Each arm is configured to deform to allow the one or more first engagement features to move sequentially between the second engagement features during pivoting of the arms; and/or Each arm comprises a spring configured to bias the elongate portion of the arm towards the second engagement features such that the one or more first engagement features are biased into engagement with the second engagement features.

In further examples:

The one or more first engagement features of each arm are provided to the hub portion of the arm in a circular arrangement and configured to rotate with the hub portion about a pivot point of the arm;

The first engagement features of each arm face radially away from the pivot point, and the second engagement features face radially towards the pivot point;

The first engagement features of each arm face radially towards the pivot point, and the second engagement features face radially away from the pivot point;

The first engagement features are provided to a deformable portion of the hub portion, the deformable portion being configured to deform to allow the first engagement features to move sequentially between second engagement features when the arm is pivoted;

The hub portion comprises a raised portion being raised with respect to the arm and comprising the deformable portions and the first engagement features, the raised portion comprising a hole adjacent each deformable portion, the holes allowing the deformable portions and first engagement features to deform towards the holes to allow the first engagement features to move sequentially between second engagement features when the arm is pivoted;

Each deformable portion comprises one or more cantilever arm portions having at least one of the first engagement features thereon, the cantilever arm portions configured to deform to allow the first engagement features to move sequentially between second engagement features when the arm is pivoted;

Each cantilever arm portion has a single first engagement feature at the end thereof;

Each cantilever arm portion has multiple first engagement features thereon;

The raised portion has an S-shape; and/or

The first engagement features of the arm form a snap-fit connection to the head-mounted display unit to connect the arm to the head-mounted display unit.

In further examples:

The first engagement features face away from the hub portion of the arm and towards the second engagement features in a direction parallel to the axis of rotation of the arm;

The hub portion is configured to move parallel to the axis of rotation of the arm to move away from the second engagement features to allow the first engagement features to move sequentially between second engagement features when the arm is pivoted; and/or The hub portion is biased towards the second engagement features by a spring.

3.15 Arms Slidably and Pivotably Connected to Display Unit Housing

Another aspect of the present technology relates to a head-mounted display system comprising:

a head-mounted display unit;

a positioning and stabilising structure structured and arranged to hold the head-mounted display unit in an operational position over a user's face in use, the positioning and stabilising structure comprising:

a posterior support portion configured to engage a posterior portion of a user's head;

a pair of lateral strap portions configured to connect between the posterior support portion and the head-mounted display unit, each configured to be located on a respective lateral side of the user's head in use;

wherein the head-mounted display unit comprises:

a display unit housing comprising a display;

an interfacing structure configured to contact the user's face in use;

a pair of arms, each arm extending posteriorly from the display unit housing, the arms each being configured for attachment to a respective one of the lateral strap portions of the positioning and stabilising structure;

wherein each arm is slidably connected to the display unit housing and configured to be slidably moved to pivot about a pivot point.

Another aspect of the present technology relates to a head-mounted display unit therefor.

In examples:

each arm is slidably connected to the display unit housing at a location spaced from the respective pivot point;

each arm is slidably connected to a respective one of a pair of guides of the display unit housing so as to slide along the respective guide and pivot about the respective pivot point;

each guide is elongate and curved;

an anterior end of each arm is located proximate a respective one of the guides;

the display unit housing has a pair of posterior-most points, the posterior-most points being located on respective lateral sides of the display unit housing, and each guide is located proximate a respective one of the posterior-most points of the display unit housing;

the display unit housing has a posterior side having a periphery, each of the arms extending from the display unit housing from within the periphery of the posterior side of the display unit housing;

the interfacing structure has a periphery, and each of the arms is located between the periphery of the posterior side of the display unit housing and the periphery of the interfacing structure;

each of the arms is attached to a respective one of a pair of arm mounting portions, the display unit housing comprises a pair of lateral portions on opposing lateral sides of the display unit housing, each of the arm mounting portions being attached to a medial side of a respective one of the lateral portions;

each of the arms is located between a respective arm mounting portion and a respective lateral portion of the display unit housing;

each of the arms is configured to pivot about a horizontal axis perpendicular to the sagittal plane of the user's head in use;

each of the arms is configured to pivot through an angular range of at least 9 degrees;

the angular range is at least 19 degrees;

each of the arms has a predetermined resistance to pivotal movement with respect to the display unit housing;

each of the arms comprises an eyelet configured to receive a respective one of the lateral strap portions of the positioning and stabilising structure;

the eyelet of each arm is located at or proximate a posterior end of the respective arm;

each of the arms has a predetermined resistance to pivotal movement with respect to the display unit housing;

each of the arms is configured to pivot between a plurality of predetermined incremental orientations, the predetermined resistance to pivotal movement being required to be overcome before the arms are able to pivot from one predetermined incremental orientation to another;

the display unit housing comprises a plurality of recesses corresponding to the predetermined incremental orientations, each of the arms comprises a protrusion configured to fit to each of the recesses;

each of the arms is connected to the display unit housing such that a predetermined static torque resistance is required to be overcome for each arm to pivot with respect to the display unit housing; and/or the predetermined static torque resistance is provided by static friction.

3.16 Headgear Buckle Integrated into Interface Structure

Another aspect of the present technology relates to a head-mounted display system, comprising:

a head-mounted display unit; and a positioning and stabilising structure structured and arranged to hold the head-mounted display unit in an operational position over a user's face in use, the positioning and stabilising structure comprising:

a posterior support portion configured to engage a posterior portion of a user's head; and a pair of lateral strap portions configured to connect between the posterior support portion and the head-mounted display unit, each configured to be located on a respective lateral side of the user's head in use;

a top strap portion configured to connect between the posterior support portion and the head-mounted display unit;

wherein the head-mounted display unit comprises:

a display unit housing; and an interfacing structure constructed and arranged to be in opposing relation with the user's face, the interfacing structure comprising:

a face-engaging portion configured to engage the user's face in use; and a chassis connected to the face-engaging portion, the chassis further connected to the display unit housing to attach the interfacing structure to the display unit housing;

wherein the chassis is configured for attachment to the top strap portion.

Another aspect of the present technology relates to a head-mounted display unit therefor.

In examples:

The chassis comprises an eyelet through which the top strap portion is able to be looped back and secured to itself;

The eyelet is formed by both the chassis and the display unit housing such that the top strap portion is able to be looped around both a portion of the chassis and a portion of the display unit housing;

The eyelet is formed in a superiorly projecting portion of the chassis; and/or

The superiorly projecting portion projects through an opening in the display unit housing.

3.17 Lateral Occipital Strap Portions Attached Using Releasable Fasteners

Another aspect of the present technology relates to a head-mounted display system comprising:

a head-mounted display unit comprising a display;

a positioning and stabilising structure configured to hold the head-mounted display unit in an operable position on the user's head in use, the positioning and stabilizing structure comprising:

a posterior support portion configured to engage a posterior portion of a user's head, the posterior support portion comprising:

a parietal strap portion configured to overlie the parietal bones of the user's head in use;

a medial occipital portion configured to overlie or lie below an occipital bone of the user's head in use;

a pair of lateral occipital strap portions configured to connect between the parietal strap portion and the medial occipital portion, each lateral occipital strap portion configured to be located on a respective lateral side of the user's head in use;

a pair of lateral strap portions configured to connect between the posterior support portion and the head-mounted display unit, each configured to be located on a respective lateral side of the user's head in use; and a top strap portion configured to connect between the posterior support portion and the head-mounted display unit, the top strap portion configured to overlie a superior portion of the user's head in use;

wherein each of the pair of lateral occipital strap portions is configured to be releasably attached to the medial occipital portion.

In examples:

The head-mounted display system comprises a battery pack for powering the head-mounted display system, the battery pack configured to be located posteriorly to the user's head in use;

The battery pack is configured to be connected to the top strap portion in use;

The medial occipital portion comprises an occipital rigidiser;

The medial occipital portion forms part of the top strap portion of the positioning and stabilising structure;

The medial occipital portion comprises a medial occipital portion strap;

The medial occipital portion forms a substantially inextensible layer of the top strap portion;

The medial occipital portion is permanently attached within the top strap portion;

The medial occipital portion is permanently attached to a user-facing layer of the top strap portion;

The positioning and stabilising structure comprises a releasable fastener between each of the pair of lateral occipital strap portions and the medial occipital portion;

Each releasable fastener comprises a fastener portion configured to be attached to a corresponding connection point;

The medial occipital portion comprises a pair of connection points configured to connect to corresponding fastener portions provided to the respective lateral occipital strap portions;

Each releasable fastener comprises a magnetic fastener;

Each magnetic fastener comprises a magnetic clip portion configured to magnetically attach to a respective one of the connection points;

Each of the pair of lateral occipital strap portions are configured to be adjustable in length; and/or Each releasable fastener comprises an eyelet, and a portion of each of the pair of lateral occipital strap portions is threaded through a respective one of the eyelets and fastened back onto itself.

3.18 Washable User-Contacting Layer Separable from Outer Layer of Top Strap Portion Another aspect of the present technology relates to a head-mounted display system comprising:

a head-mounted display unit comprising a display;

a positioning and stabilising structure configured to hold the head-mounted display unit in an operable position on the user's head in use, the positioning and stabilizing structure comprising:

a posterior support portion configured to engage a posterior portion of a user's head, the posterior support portion comprising a parietal strap portion configured to overlie the parietal bones of the user's head in use and an occipital strap portion configured to overlie or lie below an occipital bone of the user's head in use;

a pair of lateral strap portions configured to connect between the posterior support portion and the head-mounted display unit, each configured to be located on a respective lateral side of the user's head in use;

a top strap portion configured to connect between the posterior support portion and the head-mounted display unit, the top strap portion configured to overlie a superior portion of the user's head in use, the top strap portion comprising a user-facing layer and an outer layer;

wherein the user-facing layer of the top strap portion, the parietal strap portion, the occipital strap portion and lateral strap portions are separable from the outer layer of the top strap portion.

In examples:

the user-facing layer of the top strap portion, the parietal strap portion, the occipital strap portion and lateral strap portions form a washable portion of the positioning and stabilising structure, the washable portion being separable from the outer layer of the top strap portion for washing;

the outer layer of the top strap portion is configured to connect to the head-mounted display unit;

the occipital strap portion is removably connectable to the top strap portion;

the top strap portion is configured to connect to the occipital strap portion via a pivotable connection;

the pivotable connection comprises a press stud connection;

the occipital strap portion comprises a pair of lateral occipital strap portions configured to connect between the parietal strap portion and the top strap portion, each lateral occipital strap portion configured to be located on a respective lateral side of the user's head in use;

each of the lateral occipital strap portions is adjustable in length;

each of the lateral occipital strap portions is configured to connect to the top strap portion via a magnetic fastener;

the occipital strap portion is permanently connected to the top strap portion;

the occipital strap portion comprises an occipital connection tab, the top strap portion comprises an occipital connection tab hole, the occipital connection tab configured to be passed through the occipital connection tab hole and secured to the top strap portion; and/or the occipital connection tab is connectable to the top strap portion by a press stud connection.

In further examples:

the head-mounted display system comprises a battery pack for powering the head-mounted display system, the battery pack configured to be located posteriorly to the user's head in use, the top strap portion being connected to the battery pack in use;

the top strap portion comprises an outer sleeve forming the outer layer of the top strap portion;

the outer sleeve is connected to the battery pack;

the head-mounted display system comprises a power cable connected between the battery pack and the head-mounted display unit in user, the power cable located within the outer sleeve;

the power cable is able to slide within the outer sleeve along a length of the outer sleeve;

the washable portion is releasably attached to the outer sleeve by one or more hook-and-loop connections;

the outer sleeve comprises a plurality of hook portions;

the washable portion comprises a surface formed from unbroken loop material to which the hook portions are able to be attached;

the washable portion comprises a plurality of unbroken loop portions corresponding to the hook portions and to which the hook portions are able to be attached;

the top strap portion comprises a substantially inextensible layer located between the outer layer and the user-facing layer in use;

the substantially inextensible layer is semi-rigid;

the battery pack is removably connected to the substantially inextensible layer; and/or the substantially inextensible layer and the battery pack comprise corresponding first and second fastener portions configured to removably connect the battery pack to the substantially inextensible layer.

In further examples:

the substantially inextensible layer is located within the outer sleeve; and/or the washable portion is separable from the substantially inextensible layer.

In further examples:

the substantially inextensible layer forms part of the washable portion;

the top strap portion comprises a user-contacting portion forming the user-facing layer, the substantially inextensible layer being provided to the user-contacting portion;

the user-contacting portion comprises a user-contacting sleeve, the substantially inextensible layer being located within the user-contacting sleeve;

the user contacting sleeve comprises a rigidiser opening through which the substantially inextensible layer is able to be removably inserted;

the battery pack covers the rigidiser opening in use;

the user contacting sleeve comprises a fastener opening through which the battery pack is able to be removably attached to the substantially inextensible layer;

the substantially inextensible layer comprises a first fastener portion extending through the fastener opening and configured to connect to a corresponding second fastener portion of the battery pack;

the battery pack covers the fastener opening in use;

the occipital connection tab is configured to connect to the user contacting sleeve on a non-user-facing side of the user contacting sleeve;

the occipital connection tab is configured to pass through a first user-contacting sleeve hole on a user-facing side of the user-contacting sleeve and through a second user-contacting sleeve hole on the non-user-facing side of the user-contacting sleeve; and/or the occipital connection tab is configured to connect to the user-contacting sleeve with a hook-and-loop connection.

3.18.1 Battery Pack Construction

In further examples:

The battery pack comprises a battery pack housing connected to a battery pack base;

The top strap portion comprises a user-contacting portion forming the user-facing layer;

The battery pack base is configured to connect to the user-contacting portion of the top strap portion;

The battery pack comprises a cable guide configured to guide the power cable;

The cable guide comprises an elongate portion through which the power cable is able to slide into and out of the battery pack housing;

The elongate portion is rigid;

The cable guide comprises a cable guide mounting portion configured to be connected to the battery pack base;

The battery pack base comprises a cable guide mount for the cable guide, the cable guide mount configured to connect to the cable guide mounting portion;

The cable guide comprises one or more teeth configured to engage the top strap portion;

the top strap portion comprises an outer sleeve forming the outer layer of the top strap portion, the outer sleeve connected to the battery pack;

the power cable is located within the outer sleeve;

the power cable is able to slide within the outer sleeve along a length of the outer sleeve;

the teeth of the cable guide are configured to engage the outer sleeve to fix the outer sleeve to the battery pack;

the cable guide comprises a plurality of teeth;

the teeth are located on the elongate portion of the cable guide and face outwardly;

the teeth of the cable guide clamp the outer sleeve against the battery pack base;

at least a portion of the elongate portion of the cable guide is located within the outer sleeve in use;

the cable guide mount comprises one or more teeth configured to engage the top strap portion;

the teeth of the cable guide mount are configured to engage the outer sleeve to fix the outer sleeve to the battery pack;

the teeth of the cable guide mount clamp the outer sleeve against the cable guide;

the battery pack base comprises a base recess configured to receive an occipital strap portion connection tab configured to connect the occipital strap portion to the user-contacting portion of the top strap portion;

the battery pack comprises a cable stop fixed to the power cable inside the battery pack, the cable stop configured to limit the extent to which the power cable is able to be extended from the battery pack;

the cable stop is annularly shaped and comprises an adjustment screw configured to allow a diameter of the cable stop to be reduced to engage the power cable; and/or the cable stop comprises an internal thread configured to engage the power cable.

In further examples:

the battery pack housing comprises a power cable opening through which the cable guide extends out of the battery pack housing;

the battery pack housing comprises a power cable partition configured to house a portion of the power cable and one or more cell partitions configured to house battery cells;

the battery pack housing comprises one or more partition walls separating the power cable partition from the one or more cell partitions;

the power cable opening is aligned with the power cable partition;

the battery pack comprises two cell partitions, the power cable partition being located between the two cell partitions;

the battery pack comprises cells oriented vertically and aligned in series along a left-right axis in use; and/or the cells are canted inwardly at a posterior side of the battery back.

In further examples:

the power cable comprises a service loop inside of the battery pack configured to provide for extension from and retraction into the battery pack of the power cable;

the power cable enters the battery pack in a direction substantially parallel to the battery pack base and curves away from the battery pack base to form the service loop;

the power cable enters the battery pack in a direction oblique to the battery pack base and curves towards the battery pack base to form the service loop;

the cable guide comprises a fabric sleeve;

the cable guide comprises one or more lead-in features configured to guide the power cable into the fabric sleeve;

the cable guide comprises one or more rollers configured to reduce friction acting on the power cable at an entrance to the fabric sleeve;

the fabric sleeve is located interior of the battery pack;

the fabric sleeve is located exterior of the battery pack;

the battery pack comprises one or more standoffs configured to restrain shape and/or movement of the power cable within the battery pack;

one or more portions of the power cable between the service loop and one or more battery cells to which the power cable is connected are fixed in place within the battery pack; and/or the service loop of the power cable is shaped in a curve with a bend radius sufficiently small that the service loop does not experience frictional contact with the battery pack housing radially outward of the curve.

3.19 Hook-and-Loop Connection within Top Strap Portion

Another aspect of the present technology relates to a head-mounted display system comprising:

a head-mounted display unit comprising a display;

a positioning and stabilising structure configured to hold the head-mounted display unit in an operable position on the user's head in use, the positioning and stabilizing structure comprising:

a posterior support portion configured to engage a posterior portion of a user's head;

a pair of lateral strap portions configured to connect between the posterior support portion and the head-mounted display unit, each configured to be located on a respective lateral side of the user's head in use;

a top strap portion configured to connect between the posterior support portion and the head-mounted display unit, the top strap portion configured to overlie a superior portion of the user's head in use, the top strap portion comprising a user-contacting portion and an outer layer;

wherein the user-contacting portion of the top strap portion and the outer layer of the top strap portion are detachably connected by one or more hook-and-loop connections.

In examples:

the posterior support portion comprises a parietal strap portion configured to overlie the parietal bones of the user's head in use and an occipital strap portion configured to overlie or lie below an occipital bone of the user's head in use;

the parietal strap portion, the occipital strap portion and lateral strap portions are separable from the outer layer of the top strap portion together with the user-contacting portion by separation of the hook-and-loop connections;

the user-contacting portion of the top strap portion, the parietal strap portion, the occipital strap portion and lateral strap portions form a washable portion of the positioning and stabilising structure, the washable portion being separable from the outer layer of the top strap portion for washing;

the outer layer of the top strap portion is configured to connect to the head-mounted display unit;

the occipital strap portion is removably connectable to the user-contacting portion of the top strap portion;

the head-mounted display system comprises a battery pack for powering the head-mounted display system, the battery pack configured to be located posteriorly to the user's head in use, the top strap portion being connected to the battery pack in use;

the top strap portion comprises an outer sleeve forming the outer layer of the top strap portion, the outer sleeve connected to the battery pack;

the head-mounted display system comprises a power cable connected between the battery pack and the head-mounted display unit, the power cable located within the outer sleeve;

the outer sleeve comprises a plurality of hook portions;

the user-contacting portion comprises a surface formed from unbroken loop material to which the hook portions are able to be attached;

the user-contacting portion comprises a plurality of unbroken loop portions corresponding to the hook portions and to which the hook portions are able to be attached;

the outer sleeve comprises a plurality of loop portions and the user-contacting portion comprises a plurality of hook portions corresponding to the loop portions and configured to attach to the loop portions;

the top strap portion comprises a substantially inextensible layer; and/or the substantially inextensible layer is semi-rigid.

3.20 Interfacing Structures Comprising Foam Components

Another aspect of the present technology relates to a head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a support portion and a face engaging portion provided to the support portion, wherein the support portion comprises a first foam portion and the face engaging portion comprises a second foam portion, wherein the first foam portion has a greater rigidity than the second foam portion.

Another aspect of the present technology relates to an interfacing structure for a head-mounted display unit constructed and arranged to be in opposing relation with a user's face, the interfacing structure comprising a support portion and a face engaging portion provided to the support portion, wherein the support portion comprises a first foam portion and the face engaging portion comprises a second foam portion, and wherein the first foam portion has a greater rigidity than the second foam portion.

In further examples: (a) the first foam portion and the second foam portion may be made of the same material, but at different densities; (b) the first foam portion may have a first density, and the second foam portion may have a second density lower than the first density; (c) the foam portions may be made of a viscoelastic foam or polyurethane foam; (d) the face engaging portion may comprise one of: a raw foam, a textile-foam composite, or a flocked foam; (e) the support portion may have a first support portion extending in a first direction, and a second support portion extending from the first support portion in a second direction; and/or (f) the first support portion may extend in a generally radial direction across the face of the user, while the second support portion may extend in a generally posterior direction towards the face of the user.

Another aspect of the present technology relates to a head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a support portion and a face engaging portion provided to the support portion, wherein the support portion and a face engaging portion are integrally formed as a single component, the support portion and the face engaging portion being made of a foam material.

Another aspect of the present technology relates to an interfacing structure for a head-mounted display unit constructed and arranged to be in opposing relation with a user's face, the interfacing structure comprising a support portion and a face engaging portion provided to the support portion, wherein the support portion and a face engaging portion are integrally formed as a single component, the support portion and the face engaging portion being made of a foam material.

In further examples: (a) the face engaging portion may be curved; (b) the interfacing structure may comprise a recurve transition between the support portion and the face engaging portion to produce a generally hook shaped cross-section; (c) the integral form of the support portion and the face engaging portion may be thermoformed; and/or (d) the foam material may comprise one of: a raw foam, a textile-foam composite, or a flocked foam.

3.21 Interfacing Structures Comprising at Least One Loop Portion

Another aspect of the present technology relates to a head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a flexible and resilient face engaging portion, the face engaging portion having a curved cross-section, wherein the face engaging portion comprises at least one closed loop portion having an enclosed cross-section.

Another aspect of the present technology relates to an interfacing structure for a head-mounted display unit constructed and arranged to be in opposing relation with a user's face, the interfacing structure comprises a flexible and resilient face engaging portion, the face engaging portion having a curved cross-section, wherein the face engaging portion comprises at least one closed loop portion having an enclosed cross-section.

In further examples: (a) the face engaging portion comprises a first closed loop portion and a second closed loop portion; (b) the first closed loop portion and the second closed loop portion are provided on respective sides of the user's nose in use; (c) the first closed loop portion and the second closed loop portion are provided proximate the user's cheeks in use; (d) the face engaging portion bends around and overlaps itself to provide the closed loop portion; (e) the face engaging portion comprises a base portion and a loop portion comprising a loop flange, wherein the loop flange overlaps the base portion to provide the closed loop portion; (f) the loop portion extends from an anterior position to a posterior position; (g) the cross-section of the loop portion tapers off between the anterior position and the posterior position; (h) the loop portion includes an arcuate portion between the anterior position and the loop flange; (i) the loop portion includes an arcuate portion between the anterior position and the loop flange; (j) the cross-section of the arcuate tapers off between the anterior position and the loop flange; (k) the loop flange overlaps an anterior facing surface of the base portion; (l) the loop flange is secured to the base portion; (m) the base portion and the loop portion are provided as separate parts, and are secured relative to each other to provide the closed loop portion; and/or (n) the base portion and the loop portion are integrally formed as a single component.

3.22 Interfacing Structures Comprising a Light-Blocking Nasal Portion

Another aspect of the present technology relates to a head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a support portion and a face engaging portion provided to the support portion, wherein the interfacing structure comprises a light-blocking nasal portion spanning between cheek portions of the face engaging portion, wherein the light-blocking nasal portion comprises a pronasale portion extending radially and in a superior direction over the pronasale of the user's nose, wherein the light-blocking nasal portion further comprises a first bridge portion and a second bridge portion extending in a superior direction from the pronasal portion, the first bridge portion and the second bridge portion having a slot therebetween, the slot extending from a posterior edge of the light-blocking nasal portion towards the pronasale portion, and wherein the first bridge portion and the second bridge portion are configured to rest on respective sides of the user's nose bridge in use.

Another aspect of the present technology relates to an interfacing structure for a head-mounted display unit constructed and arranged to be in opposing relation with a user's face, wherein the interfacing structure comprises a support portion and a face engaging portion provided to the support portion, wherein the interfacing structure comprises a light-blocking nasal portion spanning between cheek portions of the face engaging portion, wherein the light-blocking nasal portion comprises a pronasale portion extending radially and in a superior direction over the pronasale of the user's nose, wherein the light-blocking nasal portion further comprises a first bridge portion and a second bridge portion extending in a superior direction from the pronasal portion, the first bridge portion and the second bridge portion having a slot therebetween, the slot extending from a posterior edge of the light-blocking nasal portion towards the pronasale portion, and wherein the first bridge portion and the second bridge portion are configured to rest on respective sides of the user's nose bridge in use.

3.23 Interface Structures Releasably Attached Relative to Head-Mounted Display Unit Another aspect of the present technology relates to a head-mounted display system, comprising:

a head-mounted display unit; and a positioning and stabilising structure structured and arranged to hold the head-mounted display unit in an operational position over a user's face in use, wherein the head-mounted display unit comprises:

an interfacing structure constructed and arranged to be in opposing relation with the user's face, the interfacing structure comprising:

a face-engaging portion configured to engage the user's face in use; and a chassis connected to the face-engaging portion, the chassis releasably attached to a chassis mounting portion of the head-mounted display unit;

wherein the chassis comprises a plurality of chassis catch portions, and the chassis mounting portion comprises a plurality of mounting catch portions, wherein the chassis catch portions are configured to engage the mounting catch portions to attach the chassis to the chassis mounting portion.

In examples: (a) the chassis catch portion comprises a catch projection; (b) the catch projection comprises a posterior facing catch surface; (c) the posterior facing catch surface is angled in a radially outward anterior direction; (d) the catch projection comprises an anterior facing guide surface; (e) the anterior facing guide surface is angled in a radially inward anterior direction from the posterior facing catch surface; (f) the chassis catch portion comprises a flange extending in an anterior direction from the catch projection; (g) the flange extends in a radially inward direction; (h) the mounting catch portion comprises an anterior facing catch surface; (i) the anterior facing catch surface is angled in a radially inward anterior direction; (j) the mounting catch portion comprises a posterior facing guide surface; (k) the mounting catch portion comprises a transition surface between the posterior facing guide surface and the anterior facing catch surface; (l) the transition surface is angled in a radially inward posterior direction from the anterior facing catch surface; (m) the angle between the transition surface and the anterior facing catch surface is acute; (n) gap is provided between the posterior facing catch surface and the anterior facing catch surface in the posterior-anterior direction, when the chassis is fully inserted into the chassis mounting portion in the anterior direction; (o) the chassis comprises a main body portion, and the chassis mounting portion comprises a chassis receiving portion configured to receive the main body portion; (p) the main body portion comprises a U channel cross-section; and/or (q) the chassis receiving portion comprises an L channel cross-section.

3.24 Ventilation of Interface Structure Via Tortuous Path

Another aspect of the present technology relates to a head-mounted display system, comprising:

a head-mounted display unit; and a positioning and stabilising structure structured and arranged to hold the head-mounted display unit in an operational position over a user's face in use, wherein the head-mounted display unit comprises:

a display unit housing;

an interfacing structure constructed and arranged to be in opposing relation with the user's face, the interfacing structure comprising a face-engaging portion configured to engage the user's face in use;

at least one tortuous airflow path between an interior of the interfacing structure and an exterior of the head-mounted display unit, wherein the at least one tortuous airflow path passes between an exterior of the interfacing structure and an interior of the display unit housing.

In examples: (a) the interfacing structure comprises a chassis connected to the face-engaging portion, and wherein the head-mounted display unit comprises at least one airflow port through which the at least one tortuous airflow path passes, wherein the at least one airflow port is provided anterior to the connection between the chassis and the face-engaging portion; (b) the at least one airflow port comprises at least one chassis port provided in the chassis; (c) the chassis is releasably attached to a chassis mounting portion of the head-mounted display unit, wherein the at least one airflow port comprises at least one chassis mounting port provided in the chassis mounting; (d) the at least one airflow port is provided in a radially facing wall; (e) the interfacing structure comprises a flexible and resilient portion comprising the face engaging portion, and wherein the flexible and resilient portion comprises one or more interface ports through which the at least one tortuous airflow path passes; (f) the one or more interface ports of the interfacing structure are provided in at least one anterior facing portion of the flexible and resilient portion; (g) the one or more interface ports of the interfacing structure are provided in at least one of: a superior portion of the flexible and resilient portion, and an inferior portion of the flexible and resilient portion; (h) the one or more interface ports of the interfacing structure are provided in at least one side portion of the flexible and resilient portion proximate the user's sphenoid regions in use; and/or (i) the display unit housing extends in a posterior direction over the one or more interface ports of the flexible and resilient portion.

Further disclosed is a head mounted-display system including a positioning and stabilising structure and/or an interfacing structure in any form described above, and a display unit connected thereto.

Another aspect is a positioning and stabilizing structure for a head-mounted display that comprising a rear (or posterior) support structure (or portion) arranged, in use, to contact a posterior region of the user's head.

In some forms, the posterior support portion is disposed posterior of the otobasion superior of the user.

In some forms, the posterior support portion is biased into contact with the occipital region of the user.

In some forms, the positioning and stabilizing structure further comprises opposing connectors that are disposed on opposing sides of, and extending along the temporal regions of, the user's head to interconnect the posterior support portion to the head-mounted display unit. In some forms the positioning and stabilising structure comprises an anterior support portion connecting the posterior support portion to the head-mounted display unit.

The present technology may also be directed toward providing interfacing structures used in the supporting, cushioning, stabilizing, positioning, and/or sealing a head-mounted display in opposing relation with the user's face.

Another aspect relates to apparatuses used in the supporting, cushioning, stabilizing, positioning, and/or sealing a head-mounted display in opposing relation with the user's face.

Another aspect relates to methods used in supporting, cushioning, stabilizing, positioning, and/or sealing a head-mounted display in opposing relation with the user's face.

Another form of the present technology comprises a head mounted display system for a person comprising:

- a head-mounted display unit comprising a display;
- a control system for operation of the head-mounted display system; and
- a positioning and stabilizing structure configured to configured to hold the head-mounted display unit anterior to a user's eyes such that the display is viewable by the user in use.

The head-mounted display system may be helmet mounted, may be configured for virtual reality display, may be configured for augmented reality display, may be configured for mixed reality display.

Another form of the present technology comprises a head-mounted display system for a person comprising:

- a head-mounted display unit comprising a display;
- a control system for operation of the head-mounted display system; and
- a positioning and stabilizing structure comprising an anterior support portion and a posterior support portion, wherein:
  - the posterior portion is configured to engage in use a posterior region of the person's head;
  - the anterior support portion comprises:
    - a left lateral portion configured to interconnect the posterior support portion and the head-mounted display system; and
    - a right lateral portion configured to interconnect the posterior portion and the head-mounted display system.

In some examples: a) the head mounted display apparatus further comprises a light shield; b) the light shield is constructed and arranged to substantially obstruct in use the receipt of ambient light upon an eye region of the person; c) the light shield is configured for use in virtual reality display; d) the head-mounted display system comprises an interfacing structure constructed and arranged to contact in use an eye region of the person's face; e) the interfacing structure is constructed from foam, silicone, and/or gel; f) the interfacing structure is constructed from a light absorbing material; and/or g) the interfacing structure is configured to function as a light shield.

In some examples: a) the head mounted display apparatus further comprises a sound system; b) a left ear transducer; and/or c) a right ear transducer.

In some examples: a) the head-mounted display unit comprises a binocular display unit; and/or b) the positioning and stabilizing structure is configured to maintain the binocular display unit in an operation position in use.

In some examples: a) the control system comprises a visual display controller and at least one battery; b) the at least one battery includes a first battery and a second battery; c) the first battery is a lower power system battery configured to power an RT clock; d) the second battery is a main battery; e) a battery support configured to retain the battery; f) the battery support is connected to the positioning and stabilizing structure using a tether; g) an orientation sensor configured to sense the orientation of the person's head in use; and/or h) a control support system.

In some examples: a) the positioning and stabilising structure comprises a frontal support portion configured to contact a region overlying a frontal bone of the person's head; and/or (b) the positioning and stabilising structure comprises a length adjustment mechanism for adjusting a length of a portion of the positioning and stabilising structure.

Another form of the present technology comprises a head mounted display apparatus for a person comprising: a display unit; a light shield; a control system comprising a visual display controller, at least one battery, a battery support, an orientation sensor, and a control support system; a sound system; and a positioning and stabilizing structure comprising an anterior portion, a frontal portion, a left lateral portion, a right lateral portion, a posterior portion, and a length adjustment mechanism, wherein: the anterior portion comprises an eye cushion constructed and arranged to contact in use an eye region of the user; the posterior portion is configured to engage in use a region of the person's head adjacent to a junction between the occipital bone and the trapezius muscle; the left lateral portion is configured to interconnect the anterior portion and the posterior portion; the right lateral portion is configured to interconnect the anterior portion and the posterior portion; the frontal portion configured to interconnect the anterior portion and the posterior portion; and the length adjustment mechanism adjustable to a first position and to a second position; wherein: the display unit comprises a binocular display unit; the light shield is constructed and arranged to substantially obstruct in use the receipt of ambient light upon an eye region of the person; the orientation sensor configured to sense the orientation of the person's head in use the sound system comprises a left ear transducer and a right ear transducer; and the positioning and stabilizing structure is configured to maintain the binocular display unit in an operational position in use. The head-mounted display apparatus may comprise a positioning and stabilising structure and/or an interfacing structure substantially as described in any example disclosed herein.

Another form of the present technology comprises a head mounted display interface comprising:

an electronic display screen configured to output multiple images to a user;

a display housing configured to at least partially house the electronic display screen; and a positioning and stabilizing structure coupled to the display housing and supporting the display housing and the electronic display screen in an operating position, the positioning and stabilizing structure being configured to provide a force against a user's head in order to counteract a moment produced by a combined weight of the electronic display screen and the display housing, and maintain a position of the electronic display screen anterior to the user's eyes while in the operating position;

wherein the positioning and stabilising structure is substantially as described in any example disclosed herein.

Another form of the present technology comprises a positioning and stabilizing structure for supporting an electronic display screen of a head-mounted display interface, the positioning and stabilizing structure being configured to provide a force against a user's head in order to counteract a moment produced by a weight of the electronic display screen, and maintain a position of the electronic display screen anterior to the user's eyes while in use, the positioning and stabilizing structure comprising:

a rear strap configured to contact a region of the user's head posterior to the coronal plane of the user's head, the rear strap configured to anchor the head-mounted display interface to the user's head.

Another form of the present technology comprises a positioning and stabilizing structure for supporting an electronic display unit, the positioning and stabilizing structure being configured to provide a force against a user's head in order to counteract a moment produced by a weight of the electronic display unit, and maintain a position of the electronic display unit anterior to the user's eyes while in use, the positioning and stabilizing structure comprising:

headgear configured to be coupled to a housing of the electronic display unit and engage the user's head in order to support the housing.

Another aspect of the present technology comprises a display interface comprising:

a display screen configured to output a computer generated image observable by a user;

a display housing at least partially supporting the display screen;

an interfacing structure coupled to the display screen and/or the display housing, the interfacing structure configured to be positioned and/or arranged to conform to at least a portion of the user's face;

a positioning and stabilizing structure configured to maintain a position of the display screen and/or the display housing relative to the user's eyes, the positioning and stabilizing structure configured to provide a force against a user's head in order to counteract a moment produced by a weight of the display screen and/or the display housing; and a control system configured to assist in controlling the computer generated image observable by the user, the control system including at least one sensor.

Another aspect of the present technology comprises a virtual reality display interface comprising:

a display screen configured to output a computer generated image observable by a user;

a display housing at least partially supporting the display screen;

an interface structure coupled to the display housing, the interfacing structure configured to be positioned and/or arranged to conform to at least a portion of a user's face, the interface structure including a light shield configured to at least partially block ambient light from reaching the user's eyes;

a positioning and stabilizing structure coupled to the display housing and configured to provide a force against a user's head in order to counteract a moment produced by a weight of the display screen and/or the display housing, the positioning and stabilizing structure comprising, a pair of temporal connectors, each temporal connector of the pair of temporal connectors being directly coupled to the display housing, each temporal connector configured to overlay a respective temporal bone when in contact the user's head, and a rear support coupled to each of the temporal connectors, the rear support configured to contact a posterior portion of the user's head; and a control system configured to assist in controlling the computer generated image observable by the user, the control system including at least one sensor configured to measure movement of the user.

In some forms, the light shield is configured to seal against the user's face and prevent ambient light from reaching the user's eyes.

In some forms, the display screen is completely enclosed within the display housing.

In some forms, the light shield is constructed from an opaque material.

In some forms, the interfacing structure is constructed from a resilient material.

In some forms, the positioning and stabilizing structure includes a rotational control configured to allow the display housing and/or the display interface to pivot relative to the rear support.

For example, the temporal arms may rotate with the display housing and/or the display interface. In other examples, the rotational control may couple the display housing to each of the temporal connectors, so that the display housing and/or the display interface pivots relative to the temporal connectors.

In some forms, the temporal connectors may include an adjustable length.

Another aspect of the present technology comprises an augmented reality display interface comprising:

a display screen configured to output a computer generated image observable by a user, the display screen including at least one optical lens constructed from a transparent and/or translucent material configured to allow a user to observe their physical environment while observing the computer generated image;

a display housing at least partially supporting the display screen;

an interface structure coupled to the display housing and/or the display interface, the interfacing structure configured to be positioned and/or arranged to conform to at least a portion of a user's face;

a positioning and stabilizing structure coupled to the display housing and configured to provide a force against a user's head in order to counteract a moment produced by a weight of the display screen and/or the display housing, the positioning and stabilizing structure comprising, a pair of temporal connectors, each temporal connector of the pair of temporal connectors being directly coupled to the display housing, each temporal connector configured to overlay a respective temporal bone when in contact the user's head; and a control system configured to assist in controlling the computer generated image observable by the user, the control system including at least one sensor configured to measure movement of the user.

In some forms, the positioning and stabilizing structure further includes a rear support configured to overlay the user's occiput, each temporal connector coupled to the rear support.

In some forms, the augmented reality display interface further comprises a power source coupled to the display interface and/or to the positioning and stabilizing structure.

For example, the power source may be a rechargeable battery.

In some forms, the display screen configured to selectively output a computer generated image observable by a user.

For example, the computer generated image may be displayed on the transparent and/or translucent material. The user may be able to see observe their physical environment regardless of whether the computer generated image is displayed on the transparent and/or translucent material.

Another aspect of the present technology comprises a virtual reality display interface comprising examples of the aspects of the head-mounted display system described above.

In examples of the aspects of the head-mounted display system described above, the display unit comprises a display configured to selectively output computer generated images that are visible to the user in an operational position.

In examples of the aspects of the head-mounted display system described above, the display unit comprises a housing.

In some forms, the housing supports a display.

In examples of the aspects of the head-mounted display system described above, the display unit comprises an interfacing structure coupled to the housing and arranged to be in opposing relation with the user's face in the operational position.

In some forms, the interfacing structure at least partially forms a viewing opening configured to at least partially receive the user's face in the operational position.

In some forms, the interfacing structure being constructed at least partially from an opaque material configured to at least partially block ambient light from reaching the viewing opening in the operational position.

In examples of the aspects of the head-mounted display system described above, the display unit comprises at least one lens coupled to the housing and disposed within the viewing opening and aligned with the display so that in the operational position.

In some forms, the user can view the display through the at least one lens.

In examples of the aspects of the head-mounted display system described above, a control system having at least one sensor in communication with a processor.

In some forms, the at least one sensor configured to measure a parameter and communicate a measured value to the processor.

In some forms, the processor configured to change the computer generated images output by the display based on the measured value.

Another aspect of the present technology comprises an augmented reality display interface comprising examples of the aspects of the head-mounted display system described above.

In examples of the aspects of the head-mounted display system described above, the display unit comprises a display constructed from a transparent or translucent material and configured to selectively provide computer generated images viewable by the user.

In examples of the aspects of the head-mounted display system described above, the display unit comprises a housing.

In some forms, the housing that supports a display.

In examples of the aspects of the head-mounted display system described above, the display unit comprises an interfacing structure coupled to the housing and arranged to be in opposing relation with the user's face in the operational position.

In examples of the aspects of the head-mounted display system described above, in an operational position, the positioning and stabilizing structure configured to support the display unit.

In examples of the aspects of the head-mounted display system described above, the display configured to be aligned with the user's eyes in an operation position such that the user may at least partially view a physical environment through the display regardless of the computer generated images output by the display.

In examples of the aspects of the head-mounted display system described above, the head-mounted display system further comprising a control system having at least one sensor in communication with a processor.

In some forms, the at least one sensor configured to measure a parameter and communicate a measured value to the processor.

In some forms, the processor configured to change the computer generated images output by the display based on the measured value.

In some forms, the at least one lens includes a first lens configured to be aligned with the user's left eye in the operational position and a second lens configured to be aligned with the user's right eye in the operational position In some forms, the first lens and the second lens are Fresnel lenses.

In some forms, the display comprises a binocular display partitioned into a first second and a second section, the first section aligned with the first lens and the second section aligned with the second lens.

In some forms, a controller having at least one button selectively engageable by a user's finger, the controller being in communication with the processor and configured to send a signal to the processor when the at least one button is engaged, the processor configured to change the computer generated images output by the display based on the signal.

In some forms, the at least one lens includes a first lens configured to be aligned with the user's left eye in the operational position and a second lens configured to be aligned with the user's right eye in the operational position.

Another aspect of one form of the present technology is a positioning and stabilizing structure that is constructed with a shape which is complementary to that of an intended wearer.

Another aspect of one form of the present technology is an interfacing structure that is constructed with a shape which is complementary to that of an intended wearer.

An aspect of one form of the present technology is a method of manufacturing apparatus.

An aspect of certain forms of the present technology is a positioning and stabilizing structure that is easy to use, e.g. by a person who has limited dexterity, vision or by a person with limited experience in using a head-mounted display.

An aspect of certain forms of the present technology is an interfacing structure that is easy to use, e.g. by a person who has limited dexterity, vision or by a person with limited experience in using a head-mounted display.

The methods, systems, devices and apparatus described may be implemented so as to improve the functionality of a head-mounted display, such as an electronic display or computer. Moreover, the described methods, systems, devices and apparatus can provide improvements in the technological field of virtual reality, augmented reality, and/or mixed reality.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the figures of the accompanying drawings, in which like reference numerals refer to similar elements including:

4.1 Head-Mounted Display Systems

4.2 Display System and Facial Anatomy

Figure 2A:
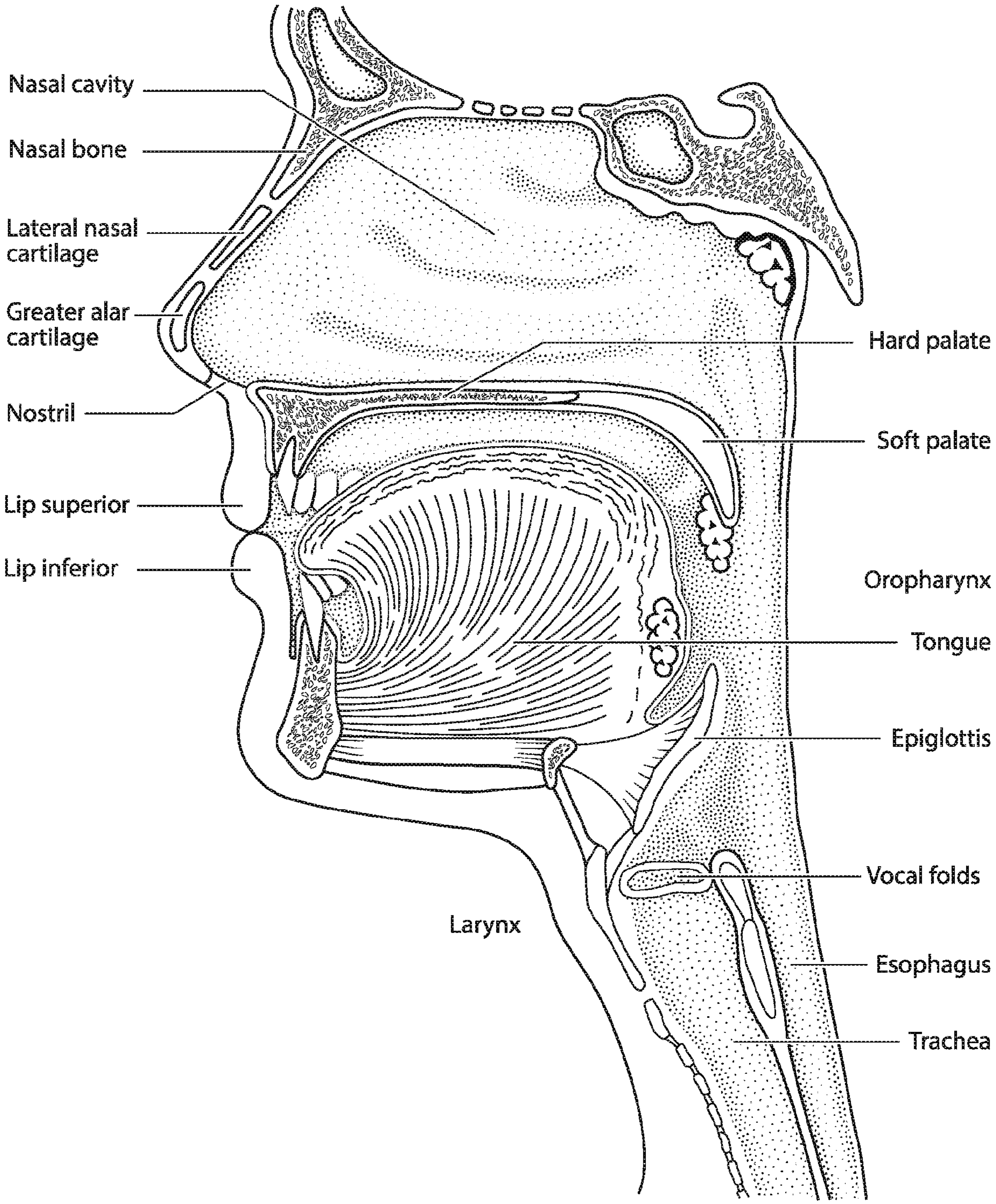

FIG. 2A shows a view of a human upper airway including the nasal cavity, nasal bone, lateral nasal cartilage, greater alar cartilage, nostril, lip superior, lip inferior, larynx, hard palate, soft palate, oropharynx, tongue, epiglottis, vocal folds, oesophagus and trachea.

Figure 2B:
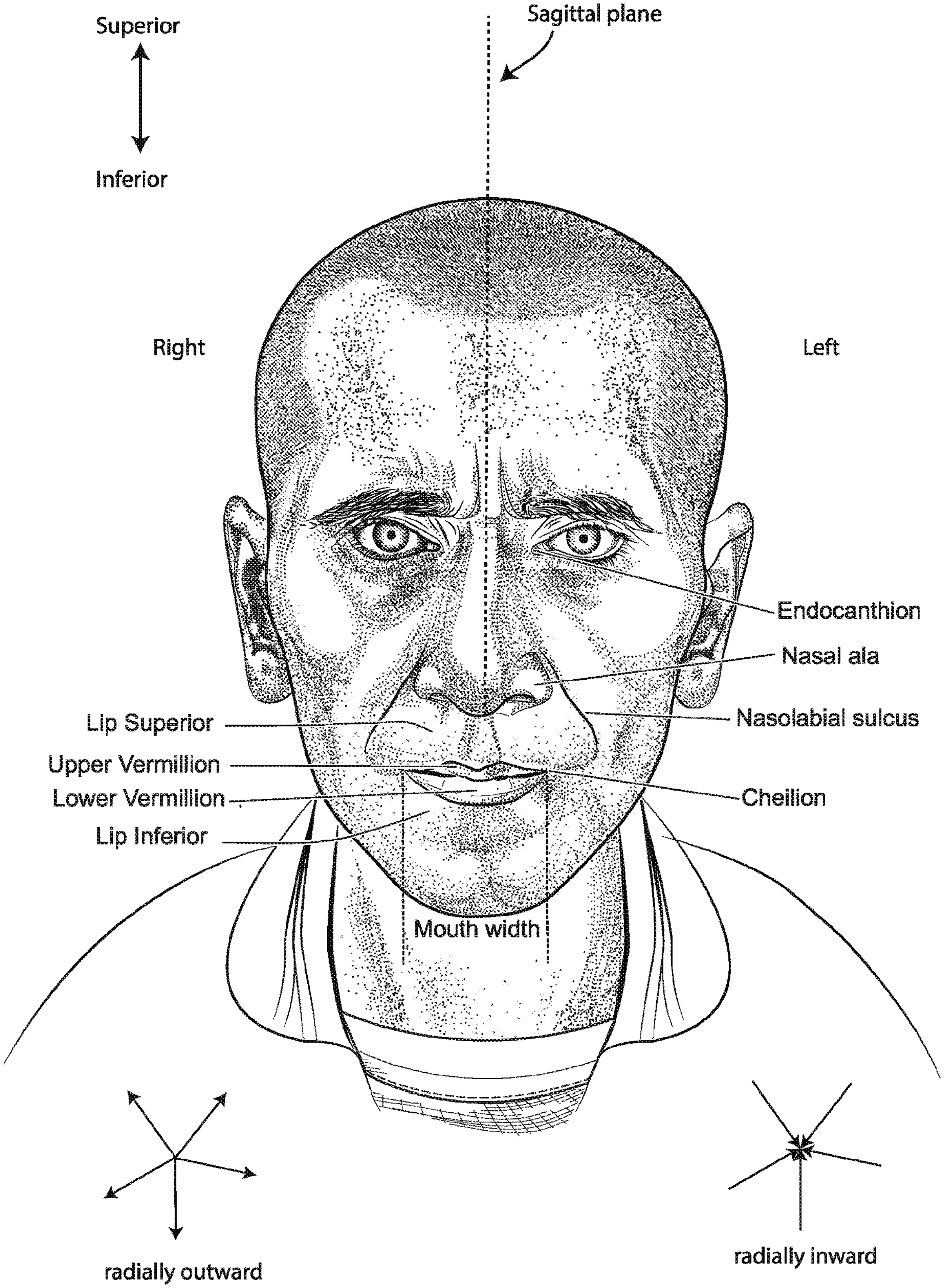

FIG. 2B is a front view of a face with several features of surface anatomy identified including the lip superior, upper vermilion, lower vermilion, lip inferior, mouth width, endocanthion, a nasal ala, nasolabial sulcus and cheilion. Also indicated are the directions superior, inferior, radially inward and radially outward.

Figure 2C:
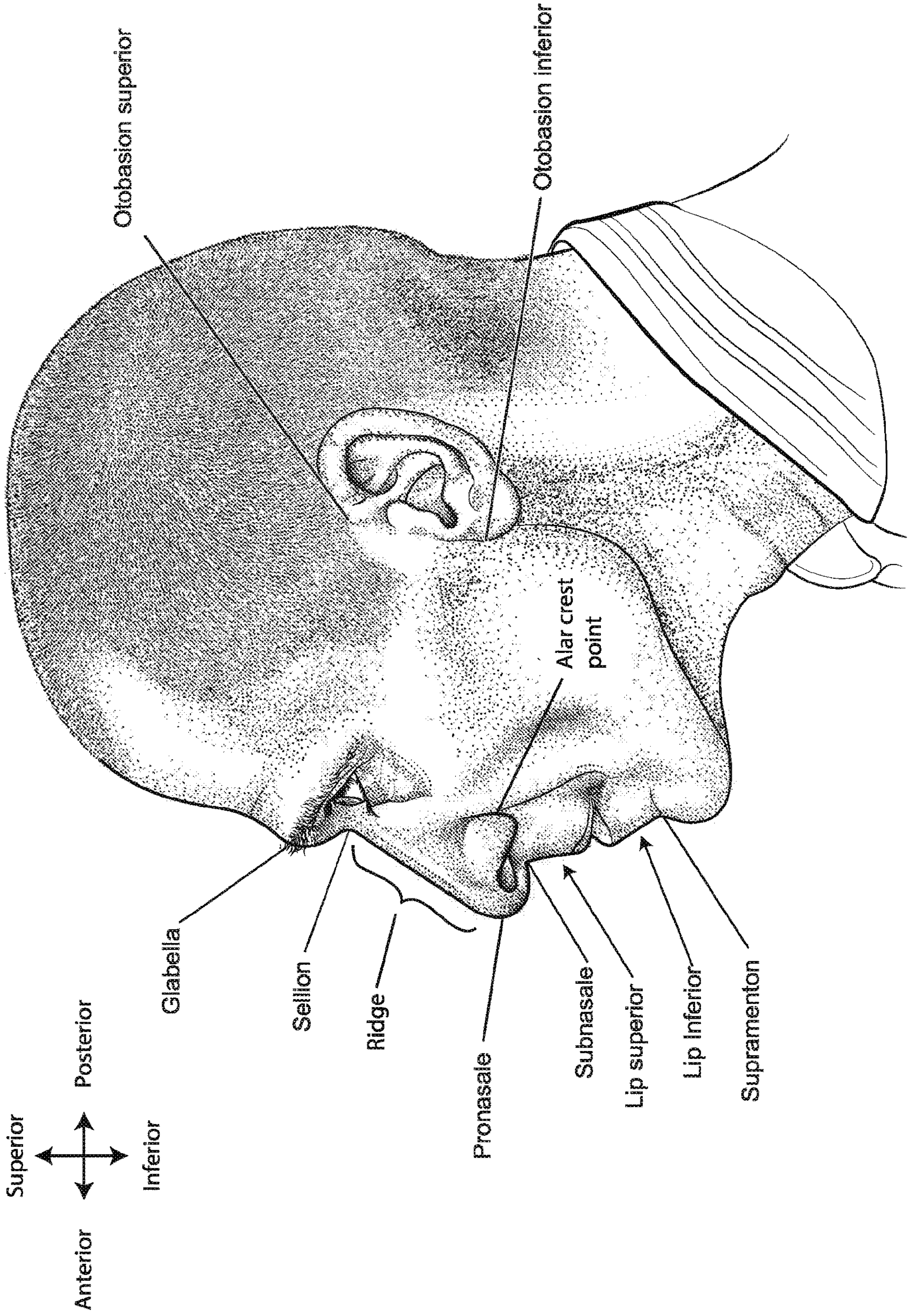

FIG. 2C is a side view of a head with several features of surface anatomy identified including *glabella*, sellion, pronasale, subnasale, lip superior, lip inferior, supramenton, nasal ridge, alar crest point, otobasion superior and otobasion inferior. Also indicated are the directions superior & inferior, and anterior & posterior.

Figure 2D:
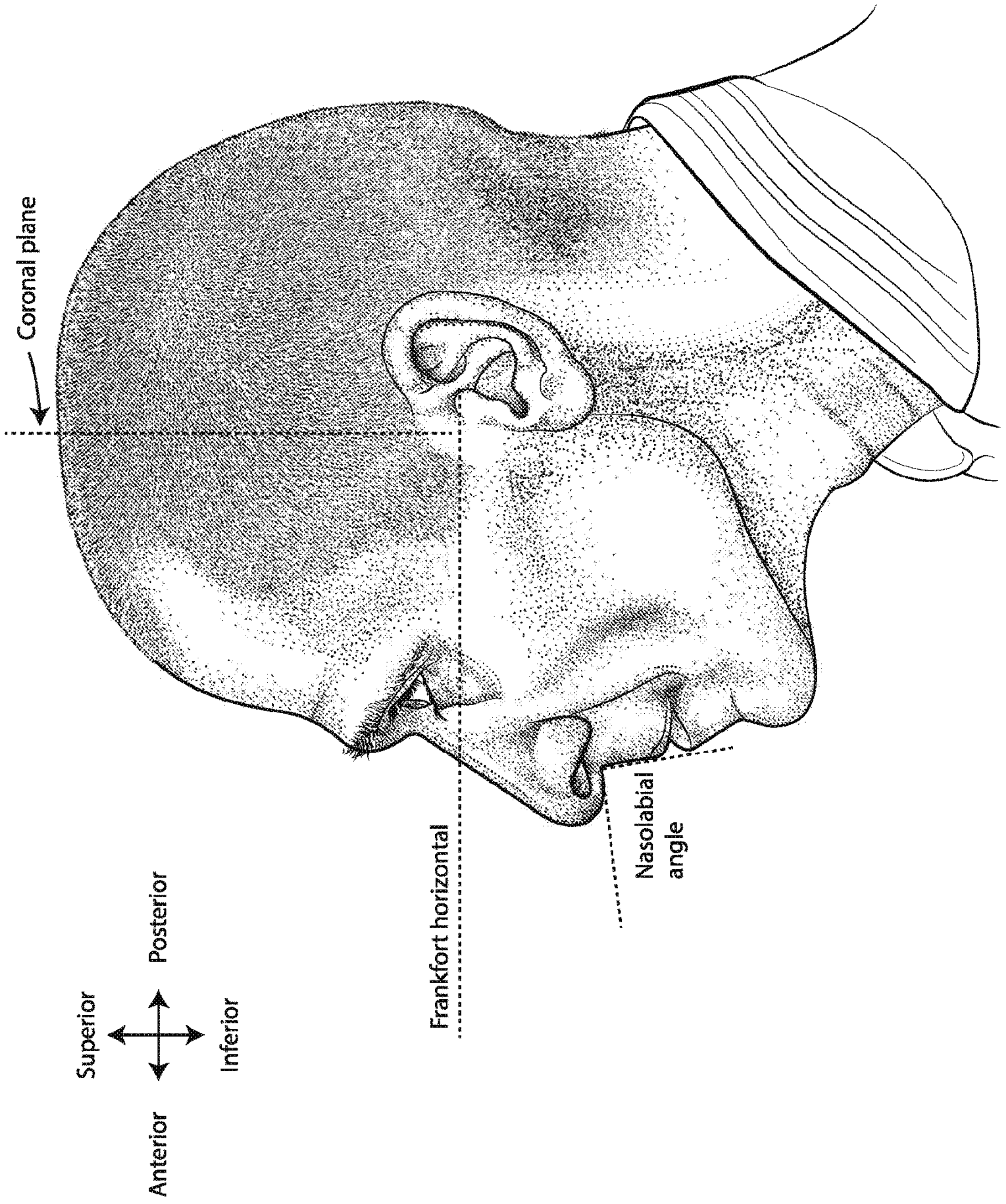

FIG. 2D is a further side view of a head. The approximate locations of the Frankfort horizontal and nasolabial angle are indicated. The coronal plane is also indicated.

Figure 2E:
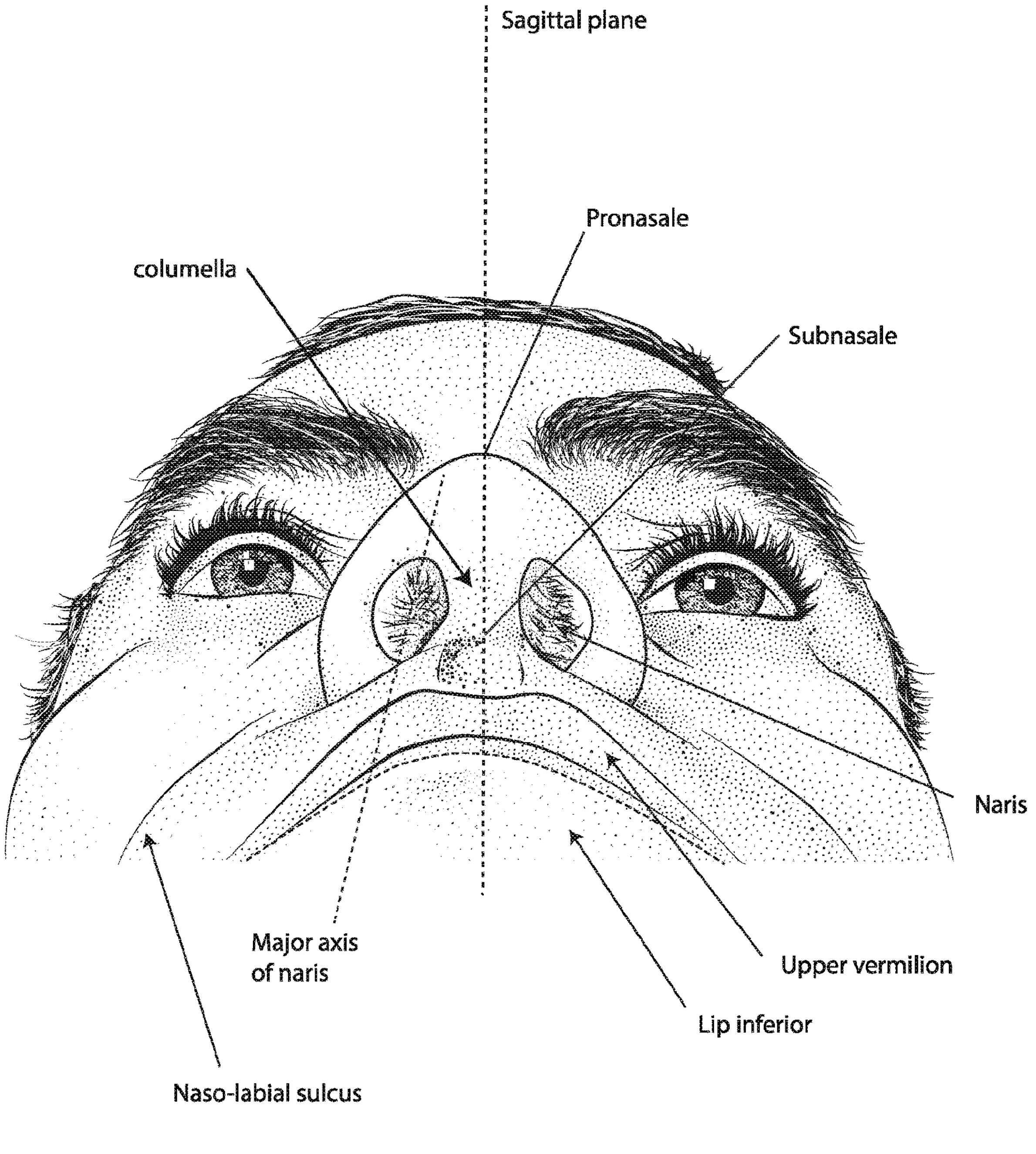

FIG. 2E shows a base view of a nose with several features identified including naso-labial sulcus, lip inferior, upper Vermilion, naris, subnasale, columella, pronasale, the major axis of a naris and the midsagittal plane.

Figure 2F:
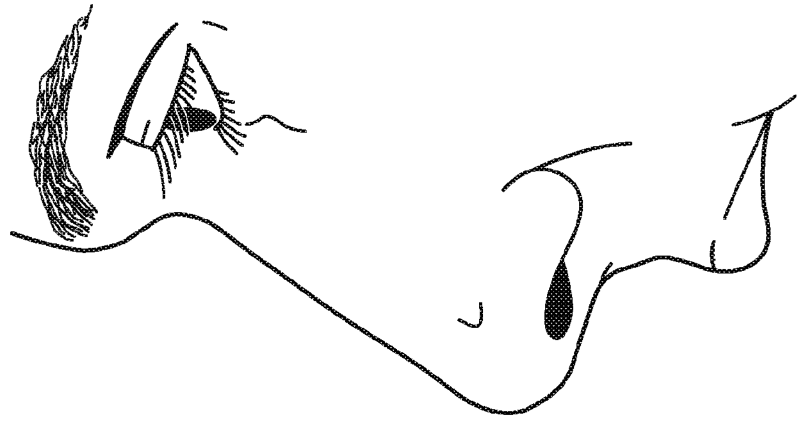

FIG. 2F shows a side view of the superficial features of a nose.

Figure 2G:
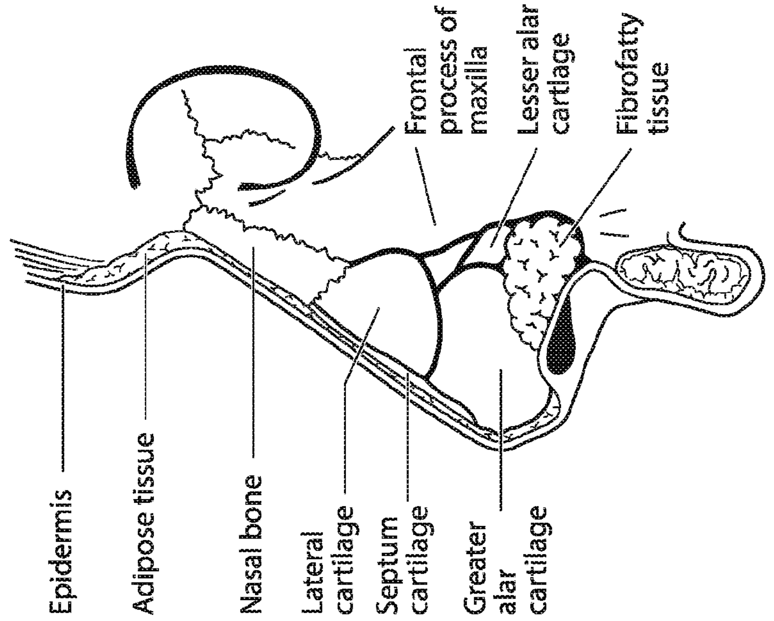

FIG. 2G shows subcutaneal structures of the nose, including lateral cartilage, septum cartilage, greater alar cartilage, lesser alar cartilage, sesamoid cartilage, nasal bone, epidermis, adipose tissue, frontal process of the maxilla and fibrofatty tissue.

Figure 2H:
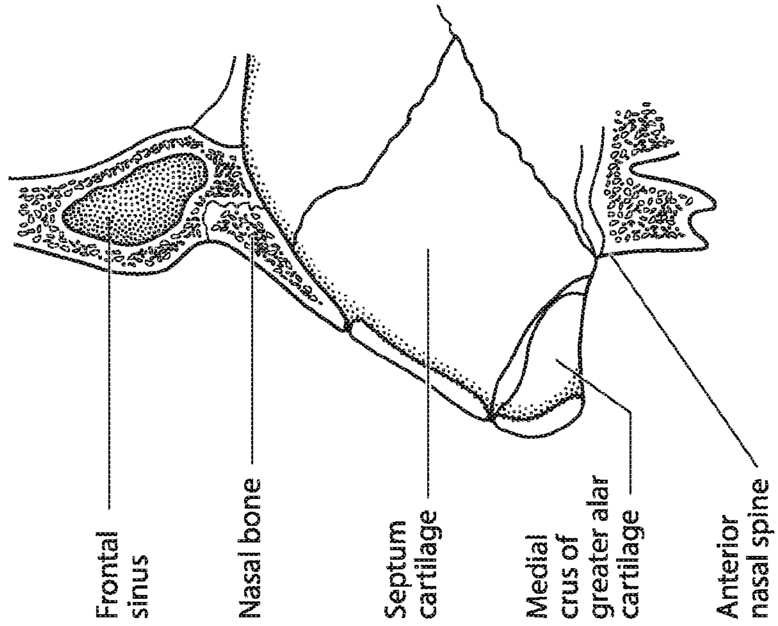

FIG. 2H shows a medial dissection of a nose, approximately several millimeters from the midsagittal plane, amongst other things showing the septum cartilage and medial crus of greater alar cartilage.

Figures 2I, 2J:
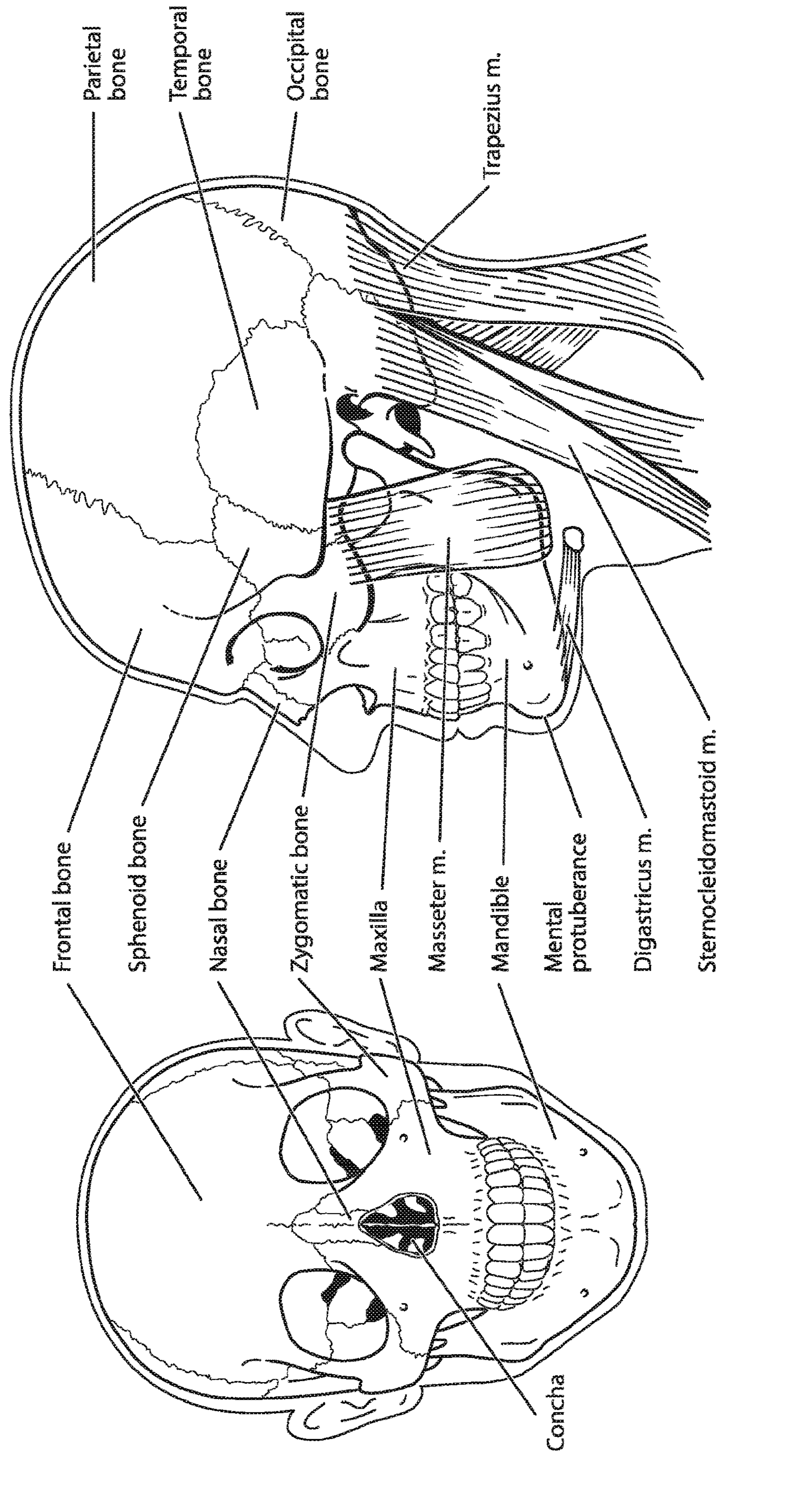

FIG. 2I shows a front view of the bones of a skull including the frontal, nasal and zygomatic bones. Nasal concha are indicated, as are the maxilla, and mandible.

FIG. 2J shows a lateral view of a skull with the outline of the surface of a head, as well as several muscles. The following bones are shown: frontal, sphenoid, nasal, zygomatic, maxilla, mandible, parietal, temporal and occipital. The mental protuberance is indicated. The following muscles are shown: digastricus, masseter, sternocleidomastoid and trapezius.

Figure 2K:
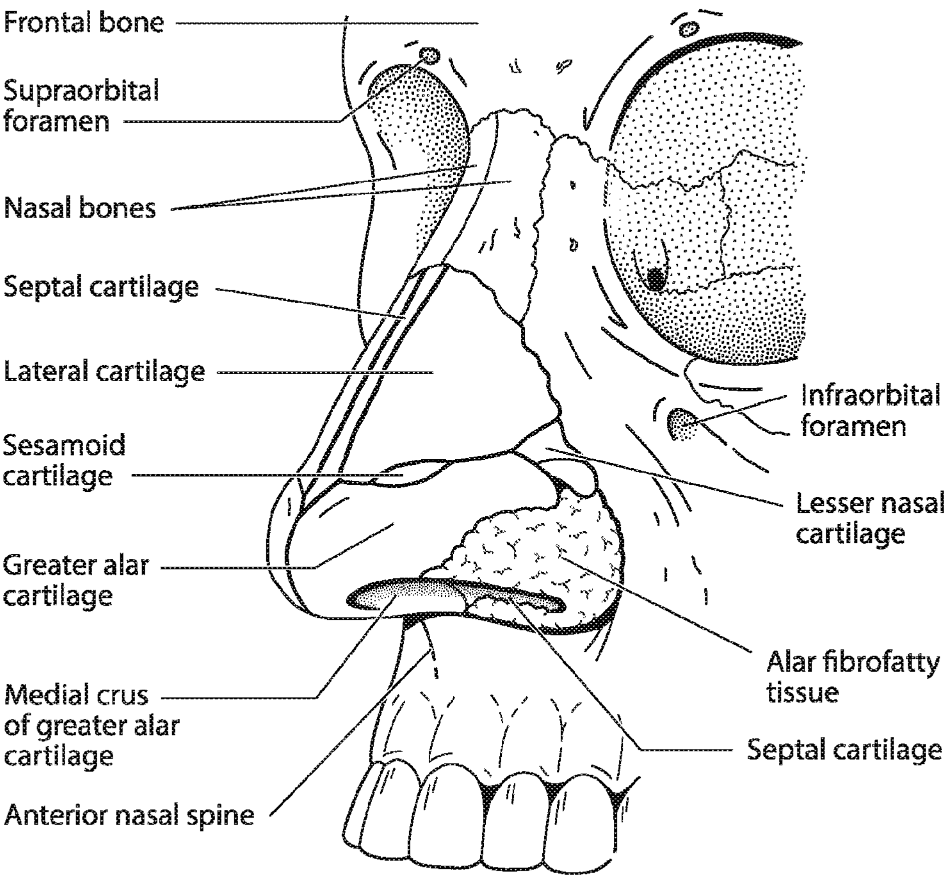

FIG. 2K shows an anterolateral view of a nose. The following bones are shown: frontal, supraorbital foramen, nasal, septal cartilage, lateral cartilage, orbit and infraorbital foramen.

Figure 2L:
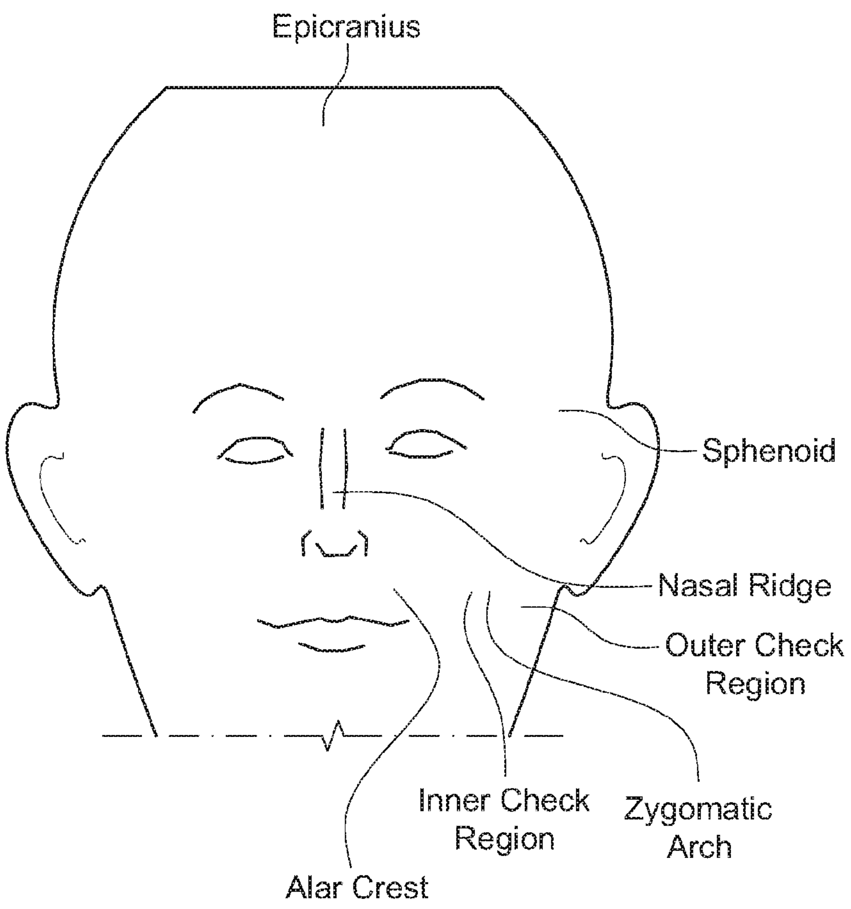

FIG. 2L shows another front view of the face with several features of surface anatomy identified including the epicranius, the sphenoid, the nasal ridge, the outer and inner cheek regions, the zygomatic arch, and the alar crest.

Figure 2M:
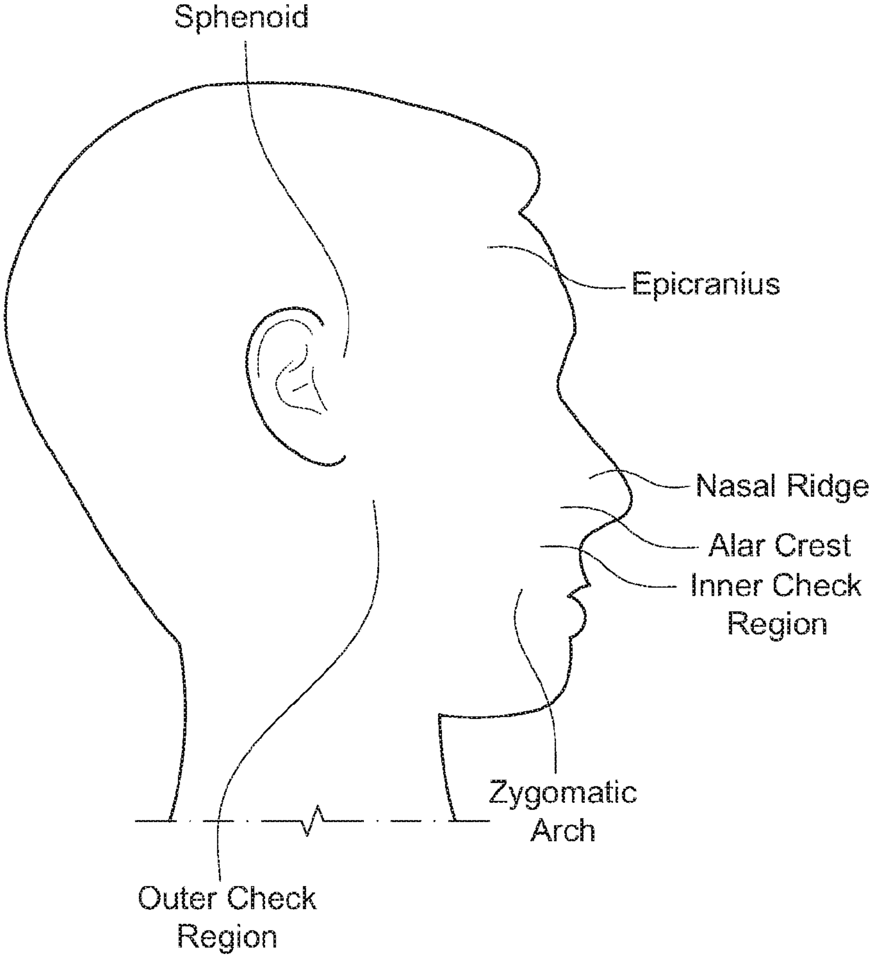

FIG. 2M shows another side view of the face with several features of surface anatomy identified including the epicranius, the sphenoid, the nasal ridge, the outer and inner cheek regions, the zygomatic arch, and the alar crest.

4.3 Shape of Structures

Figure 3A:
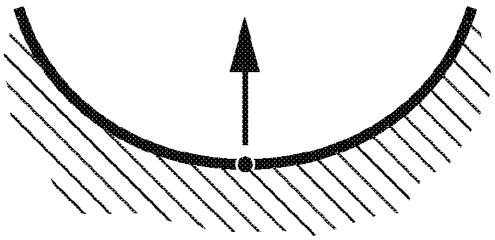

FIG. 3A shows a schematic of a cross-section through a structure at a point. An outward normal at the point is indicated. The curvature at the point has a positive sign, and a relatively large magnitude when compared to the magnitude of the curvature shown in FIG. 3B.

Figure 3B:
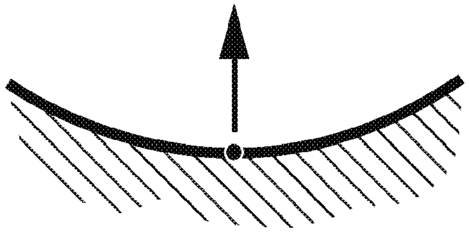

FIG. 3B shows a schematic of a cross-section through a structure at a point. An outward normal at the point is indicated. The curvature at the point has a positive sign, and a relatively small magnitude when compared to the magnitude of the curvature shown in FIG. 3A.

Figure 3C:
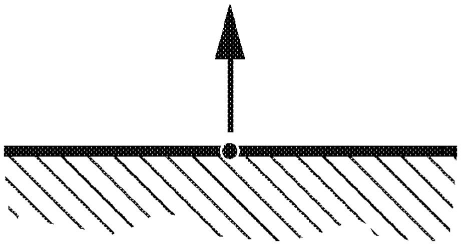

FIG. 3C shows a schematic of a cross-section through a structure at a point. An outward normal at the point is indicated. The curvature at the point has a value of zero.

Figure 3D:
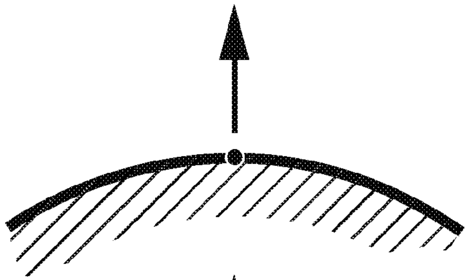

FIG. 3D shows a schematic of a cross-section through a structure at a point. An outward normal at the point is indicated. The curvature at the point has a negative sign, and a relatively small magnitude when compared to the magnitude of the curvature shown in FIG. 3E.

Figure 3E:
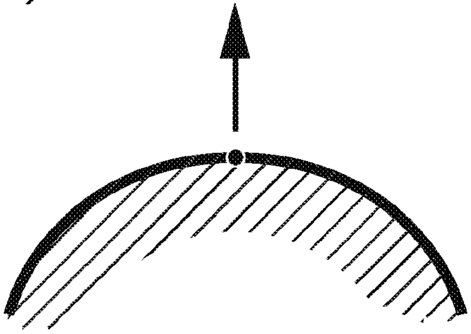

FIG. 3E shows a schematic of a cross-section through a structure at a point. An outward normal at the point is indicated. The curvature at the point has a negative sign, and a relatively large magnitude when compared to the magnitude of the curvature shown in FIG. 3D.

Figure 3F:
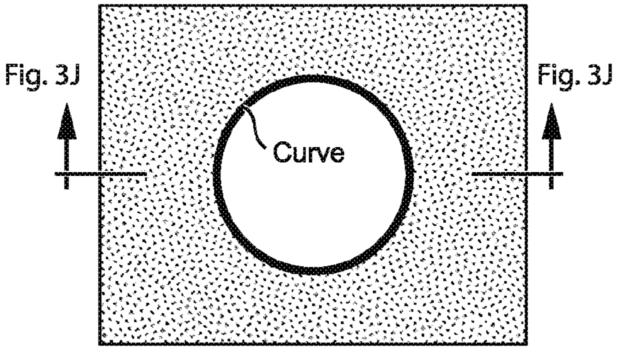

FIG. 3F shows the surface of a structure, with a one dimensional hole in the surface. The illustrated plane curve forms the boundary of a one dimensional hole.

Figure 3G:
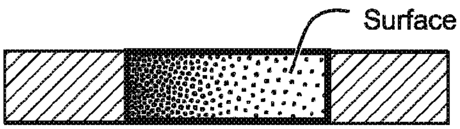

FIG. 3G shows a cross-section through the structure of FIG. 3F. The illustrated surface bounds a two dimensional hole in the structure of FIG. 3F.

Figure 3H:
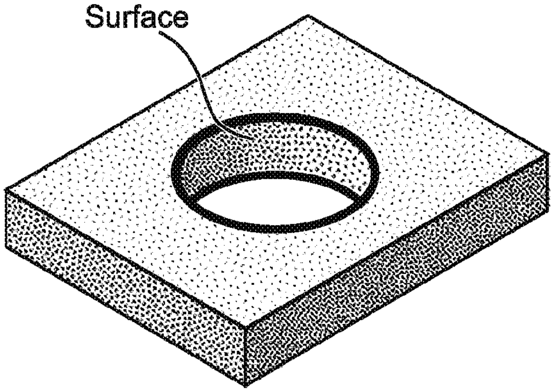

FIG. 3H shows a perspective view of the structure of FIG. 3F, including the two dimensional hole and the one dimensional hole. Also shown is the surface that bounds a two dimensional hole in the structure of FIG. 3F.

Figure 3J:
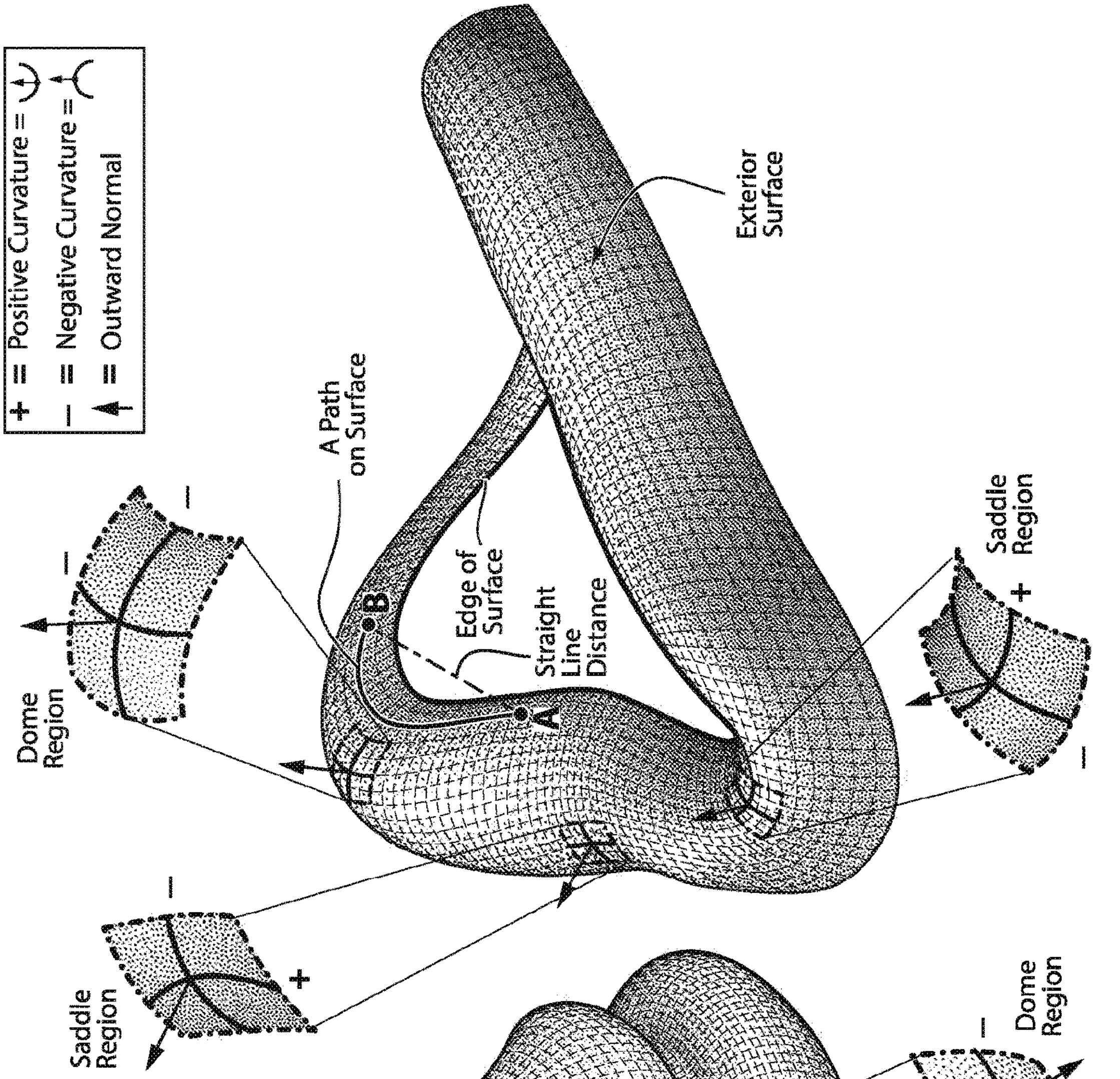
Figure 3I:
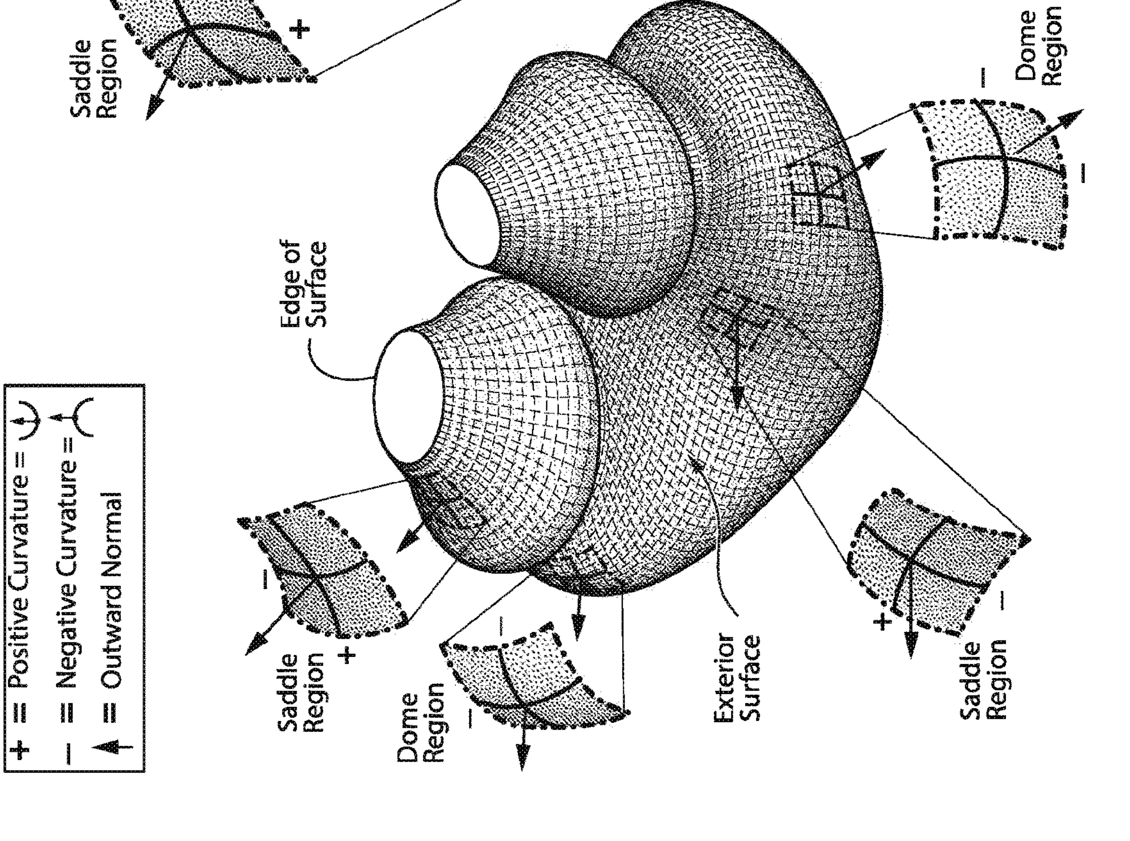

FIGS. 3I-3J shows a seal forming structure. An exterior surface of the cushion is indicated. An edge of the surface is indicated. A path on the surface between points A and B is indicated. A straight-line distance between A and B is indicated. Two saddle regions and a dome region are indicated.

Figure 3K:
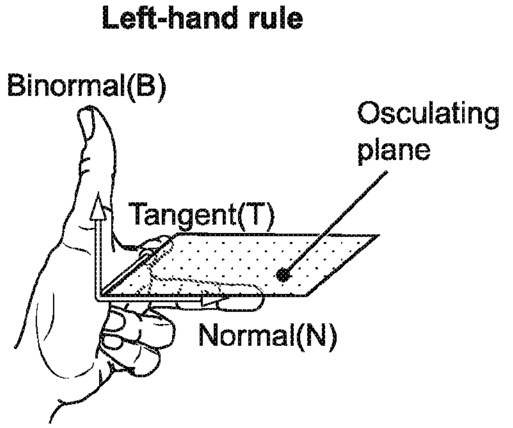

FIG. 3K illustrates a left-hand rule.

Figure 3L:
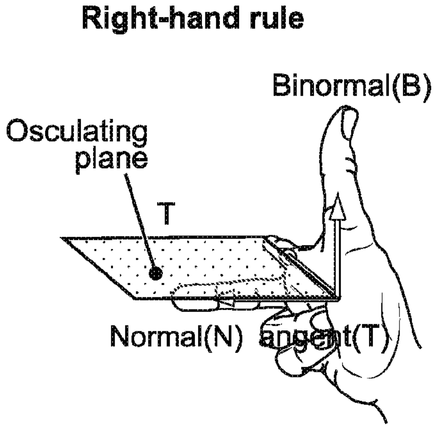

FIG. 3L illustrates a right-hand rule.

Figure 3M:
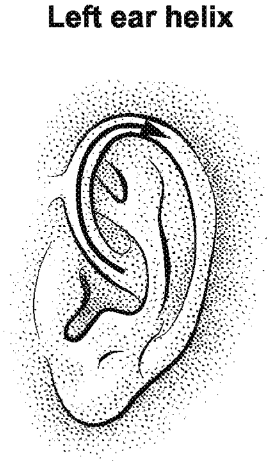

FIG. 3M shows a left ear, including the left ear helix.

Figure 3N:
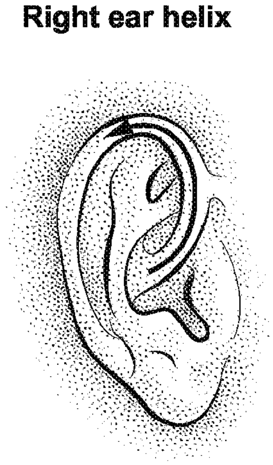

FIG. 3N shows a right ear, including the right ear helix.

Figure 3O:
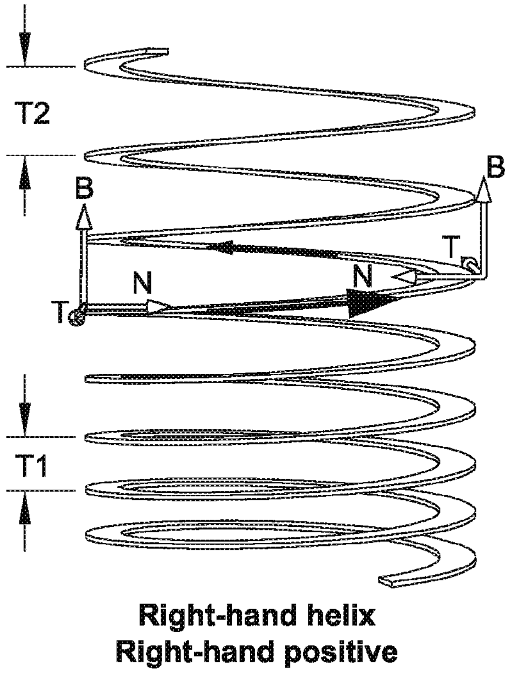

FIG. 3O shows a right-hand helix.

4.4 Head-Mounted Virtual Reality Display

Figure 4A:
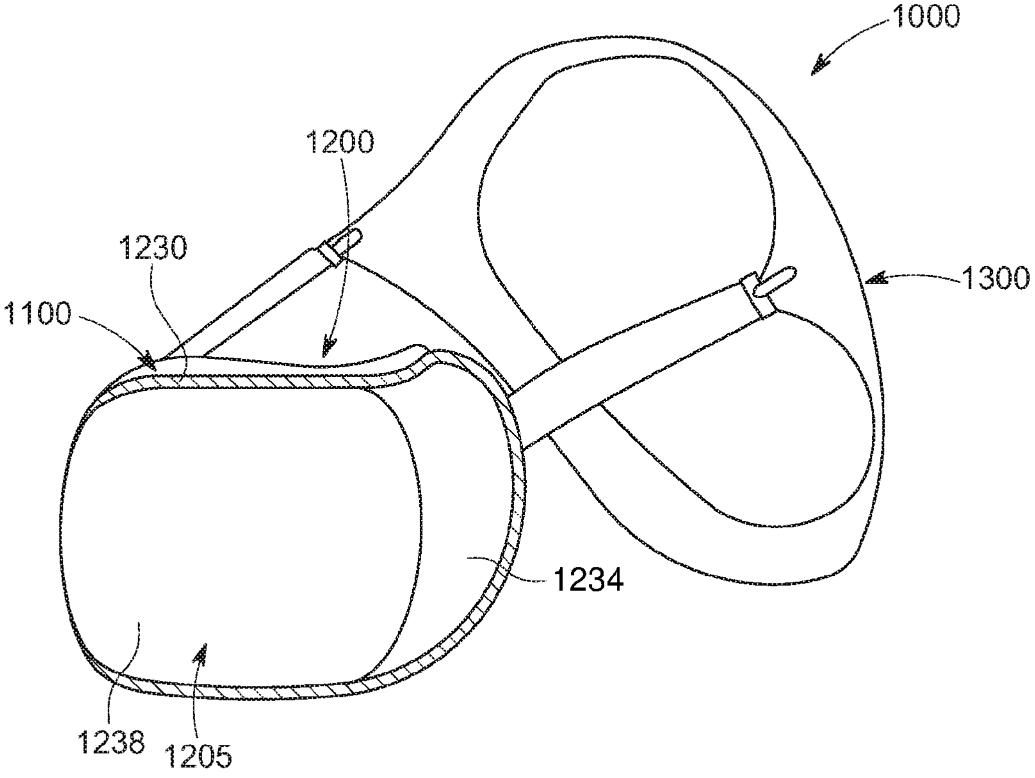

FIG. 4A shows a front perspective view of a head-mounted display interface in accordance with one form of the present technology.

Figure 4B:
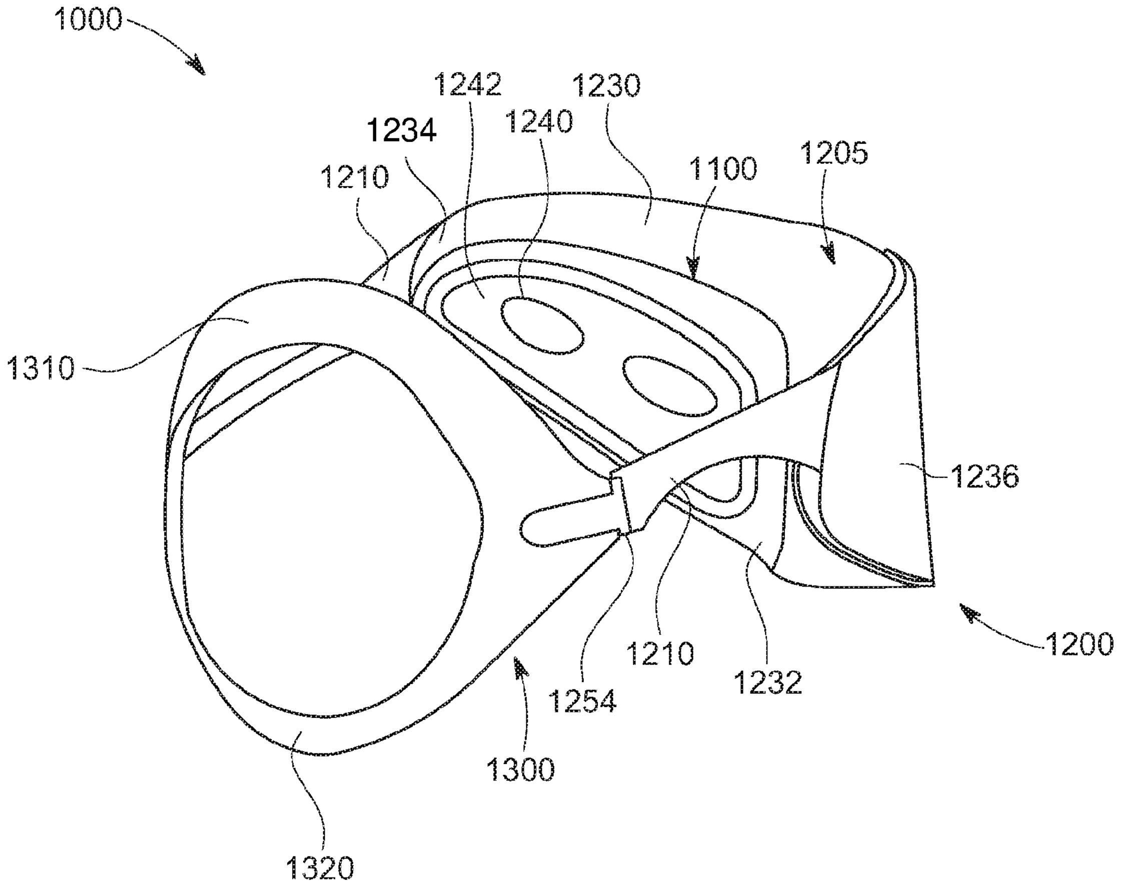

FIG. 4B shows a rear perspective view of the head-mounted display of FIG. 4A.

Figure 4C:
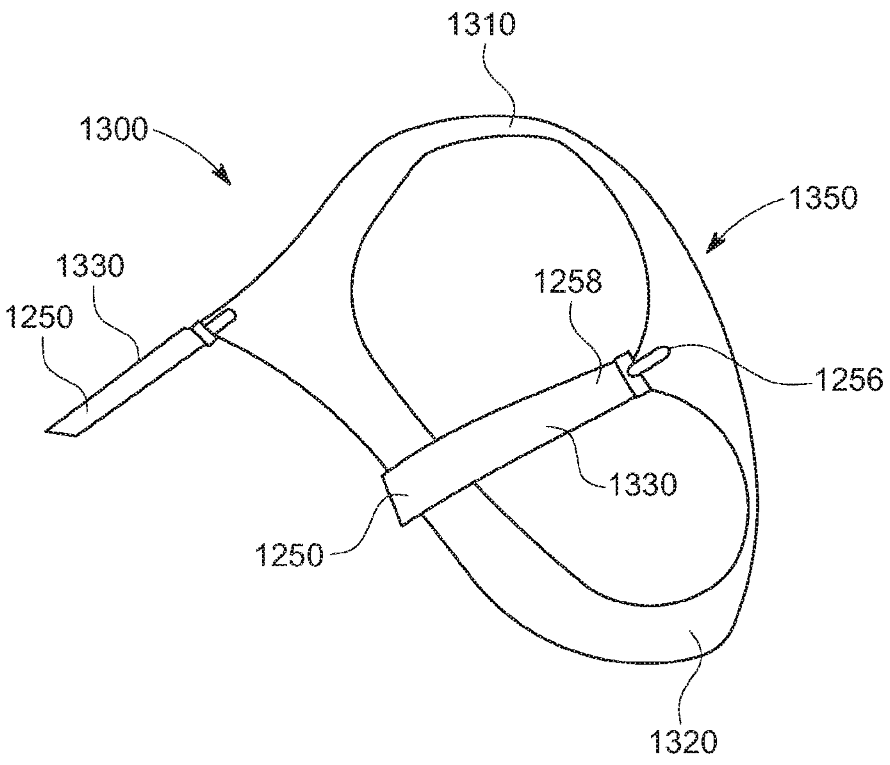

FIG. 4C shows a perspective view of a positioning and stabilizing structure used with the head-mounted display of FIG. 4A.

Figure 4D:
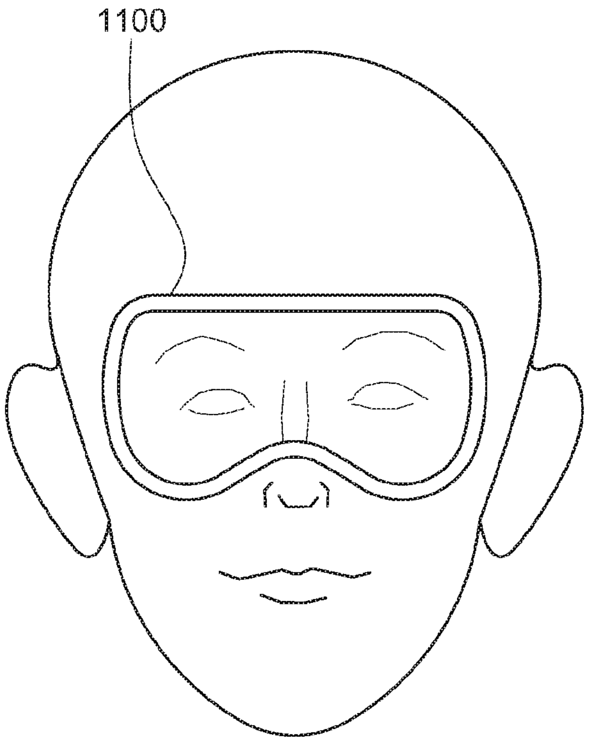

FIG. 4D shows a front view of a user's face, illustrating a location of an interfacing structure, in use.

4.5 Head-Mounted Augmented Reality Display

Figure 5A:
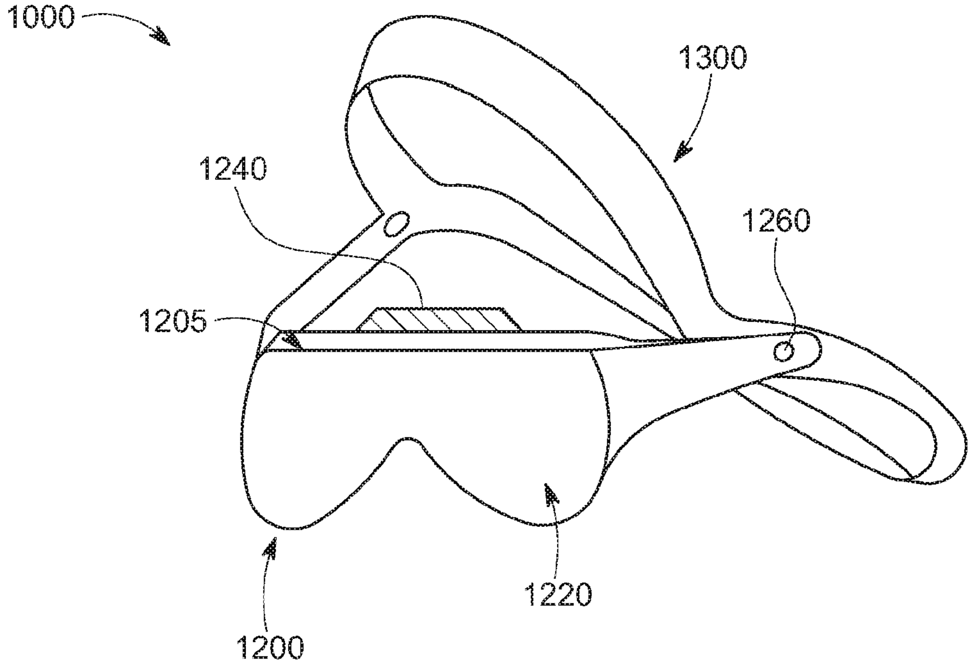

FIG. 5A shows a front perspective view of a head-mounted display interface in accordance with one form of the present technology.

Figure 5B:
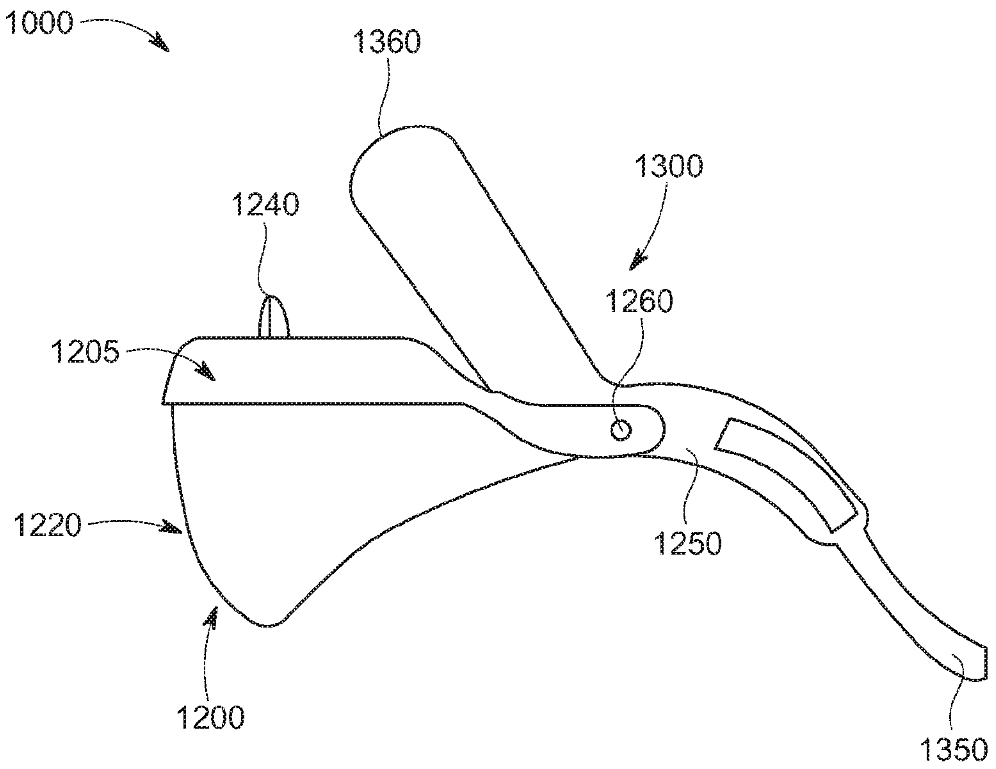

FIG. 5B shows a side view of the head-mounted display interface of FIG. 5A.

4.6 Controls

Figure 6:
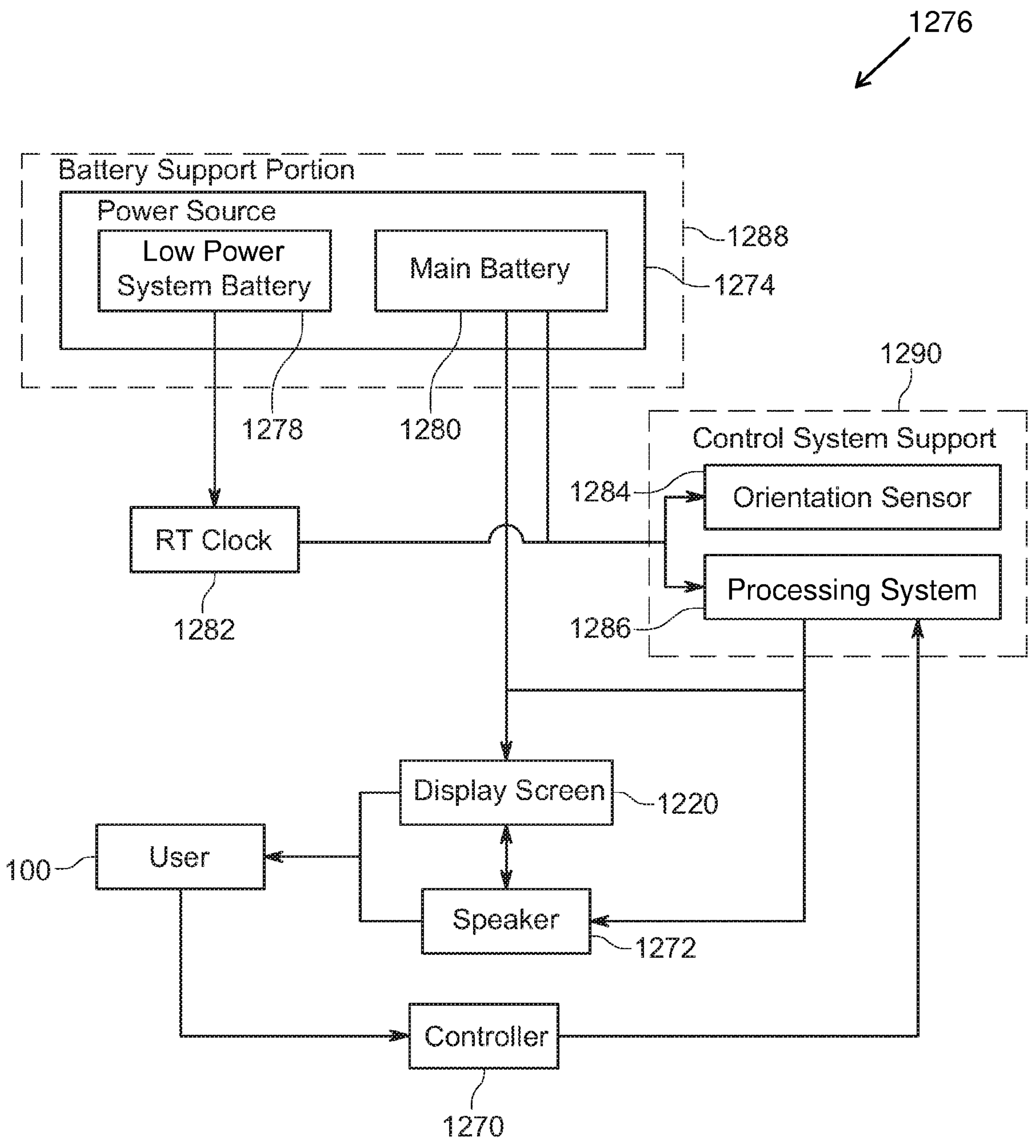

FIG. 6 shows a schematic view of a control system of one form of the present technology.

4.7 Head-Mounted Display System of the Present Technology

Figure 7A:
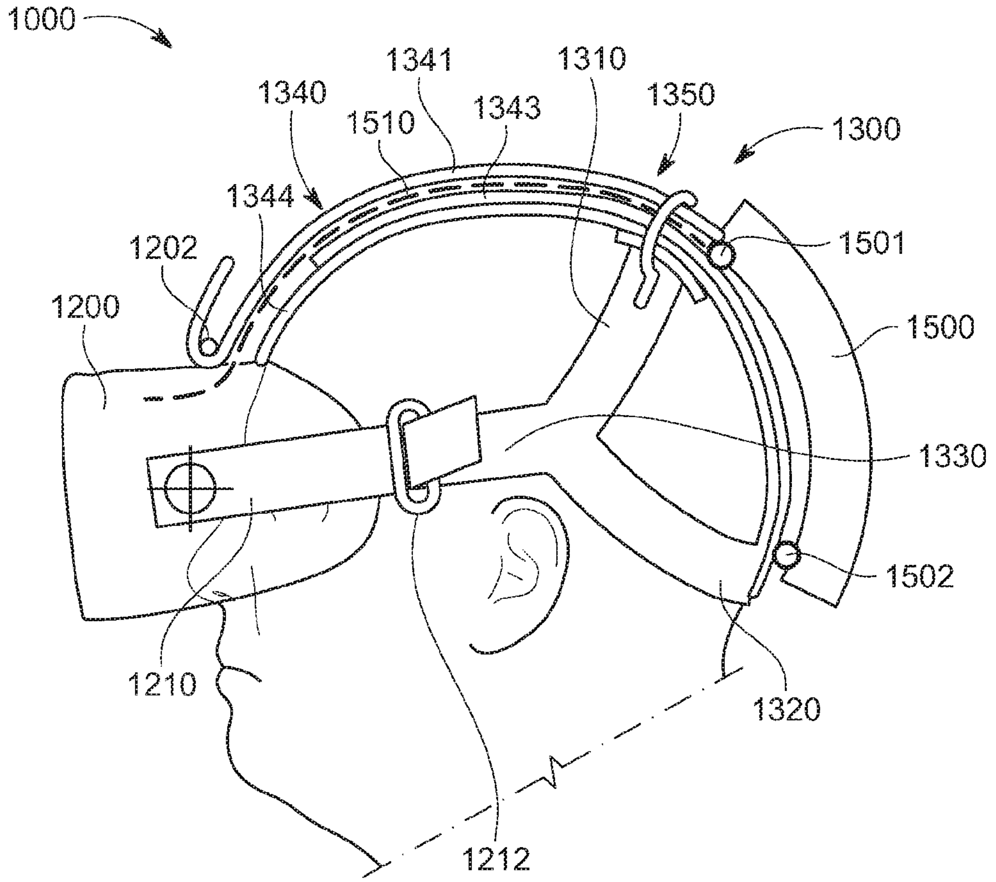

FIG. 7A is a schematic side view of a head-mounted display system according to another example of the present technology, in use.

Figure 7B:
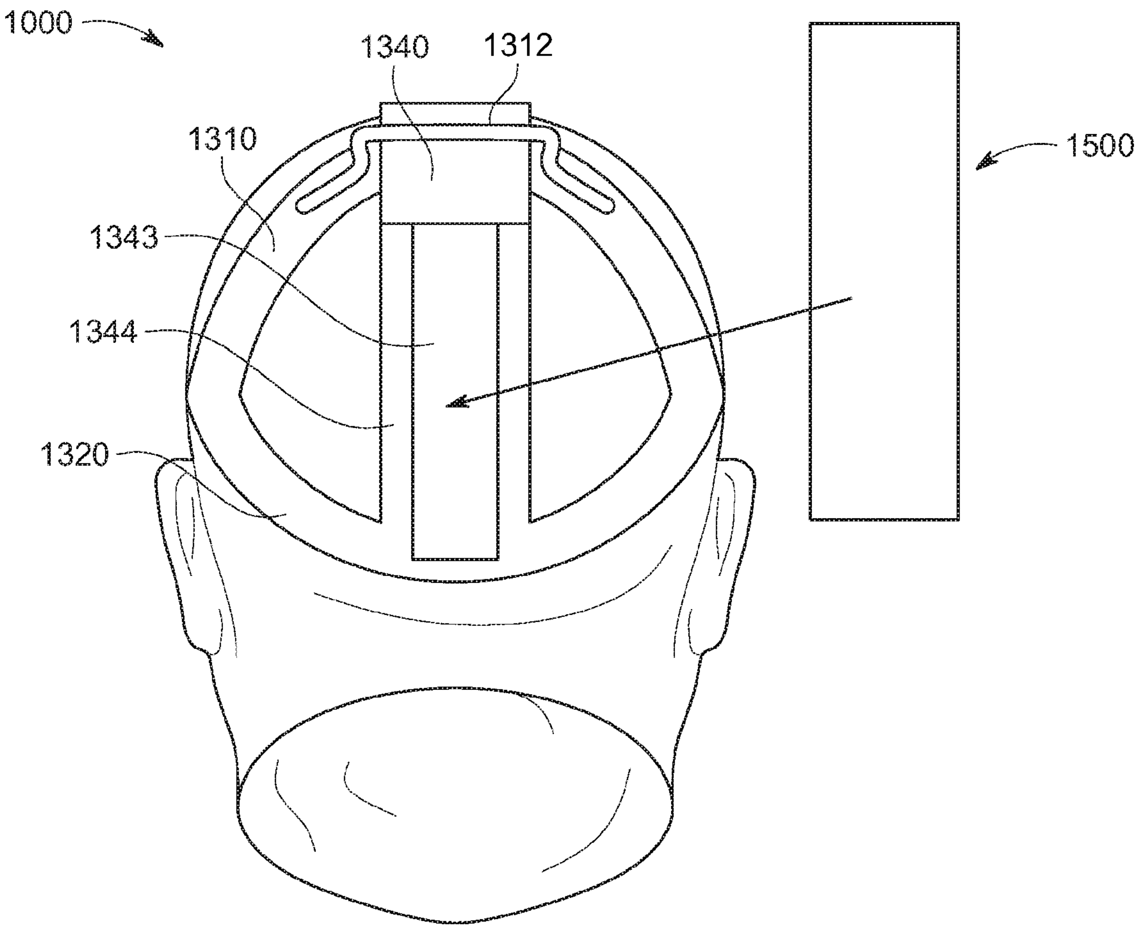

FIG. 7B is a schematic rear view of the head-mounted display system shown in FIG. 7A, in use.

Figure 7C:
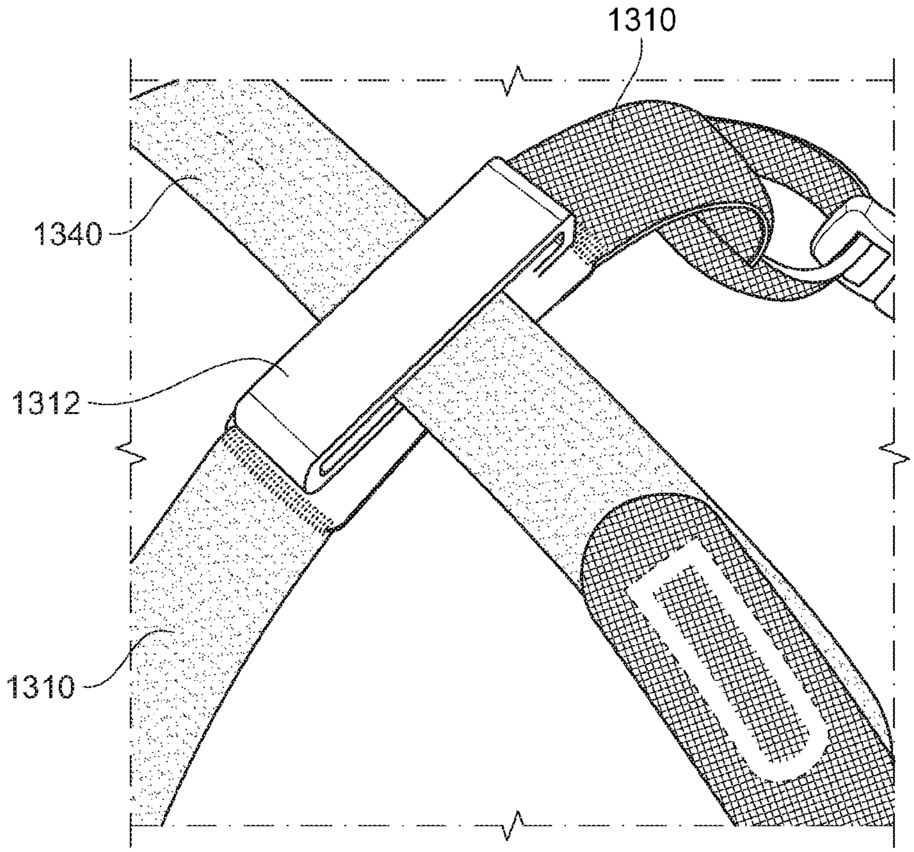
Figure 28A:
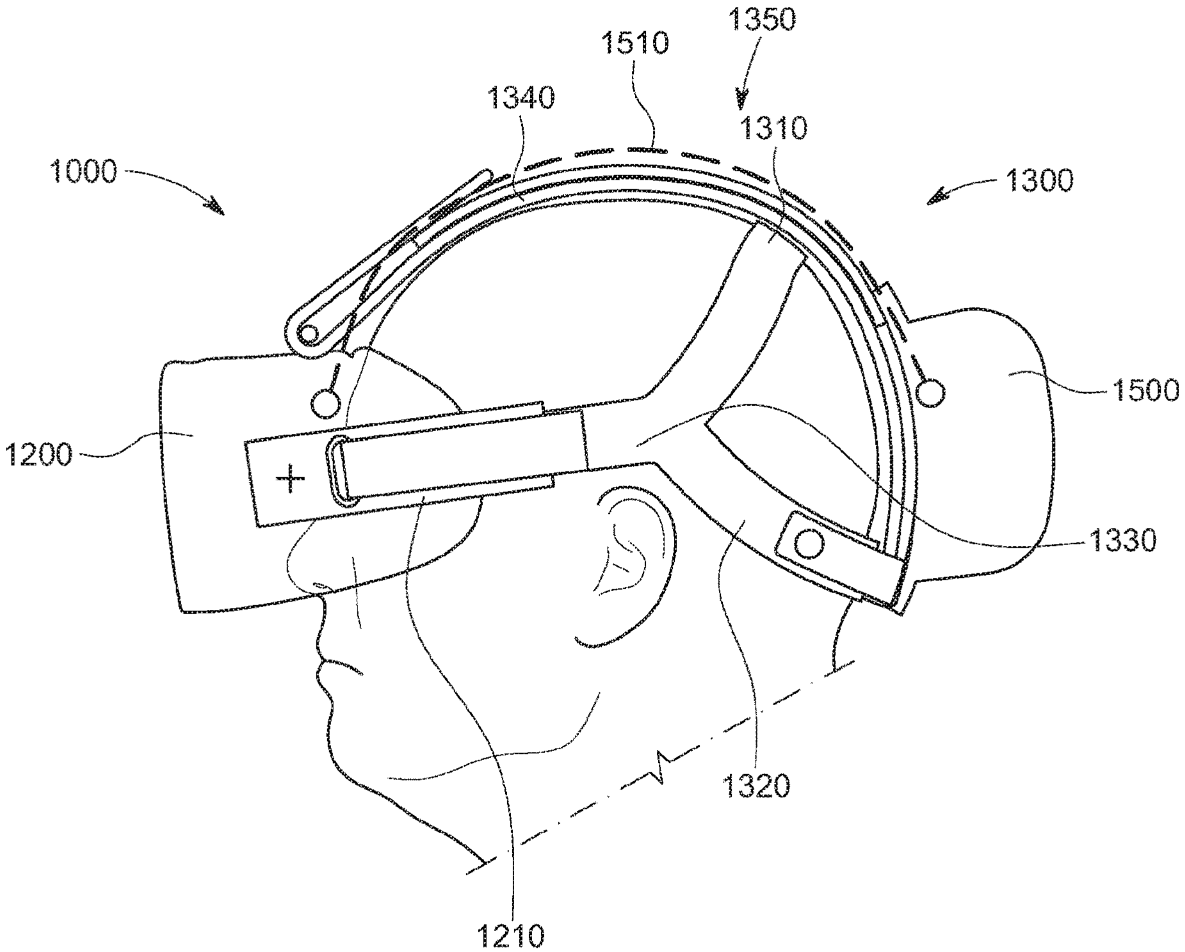

FIG. 7C shows components of a positioning and stabilising structure of the head-mounted display system shown in FIG. 28A.

Figure 8:
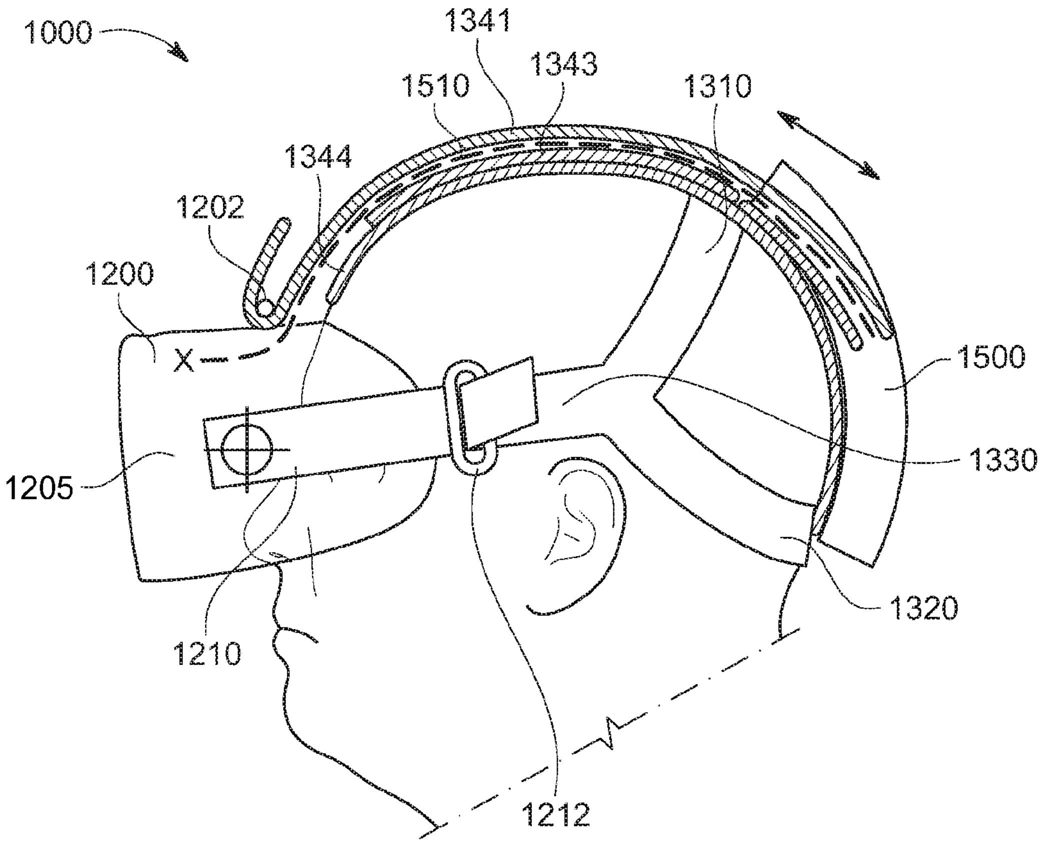

FIG. 8 shows a schematic side view of a head-mounted display system according to another example of the present technology, in use.

Figure 9:
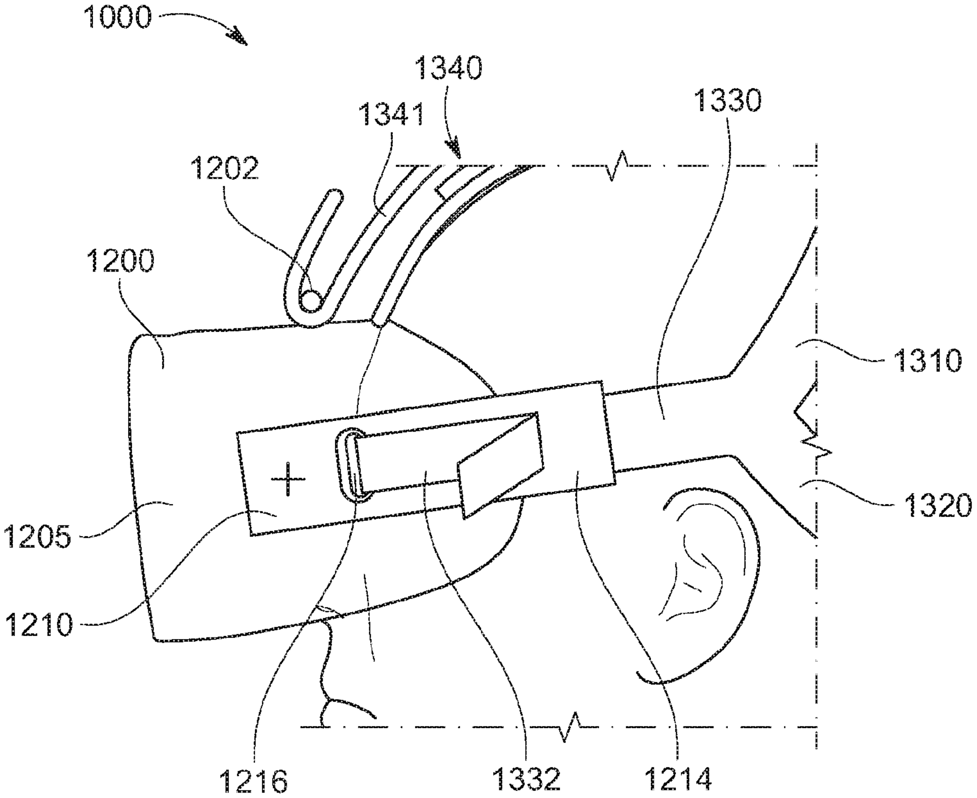

FIG. 9 shows a schematic side view of a portion of a head-mounted display system according to another example of the present technology, in use.

Figure 10A:
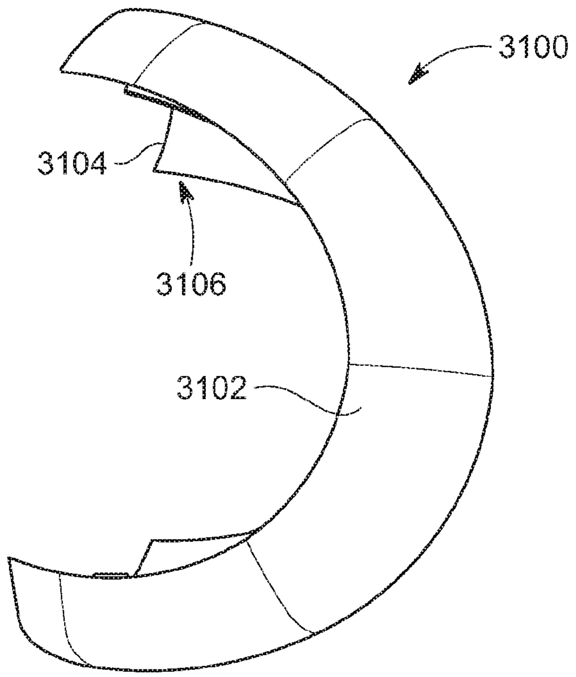
Figure 10B:
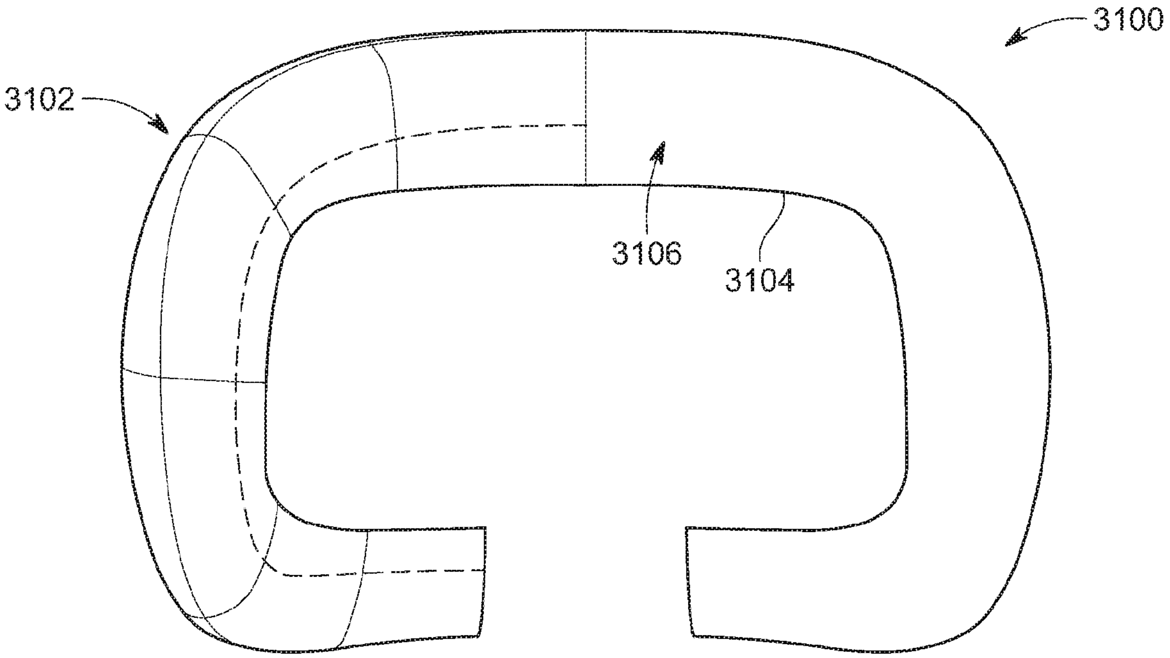
Figure 10C:
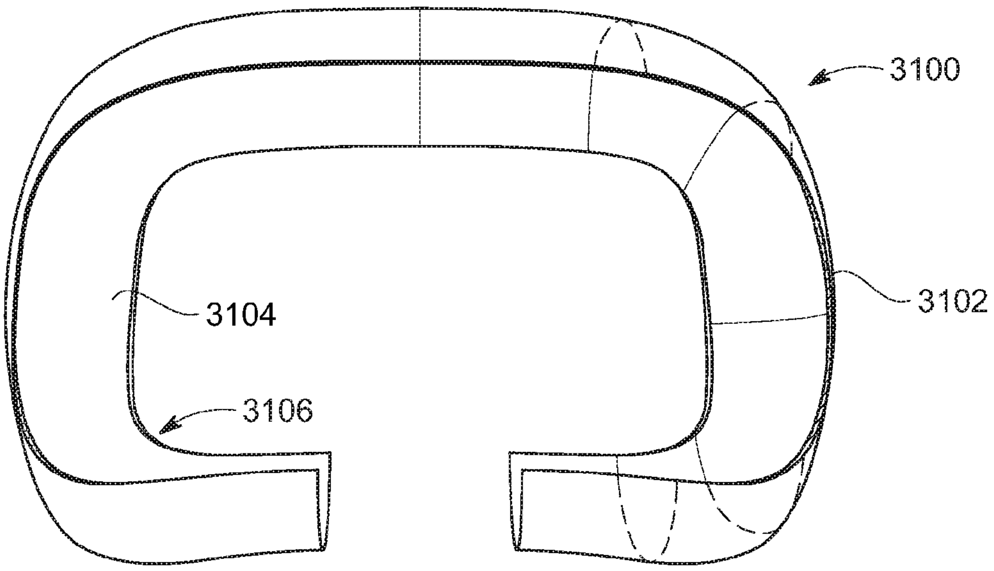

FIGS. 10A, 10B, and 10C are side, rear, and frontal views, respectively, of a further embodiment of an interfacing structure.

Figure 11A:
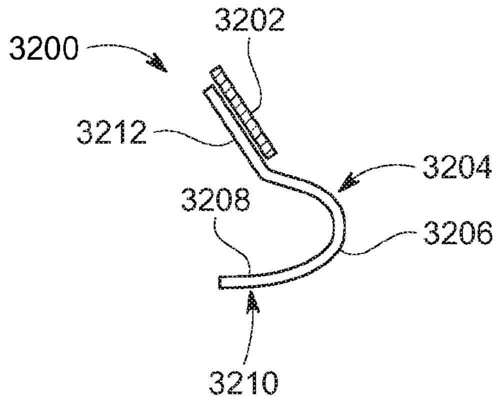
Figure 11B:
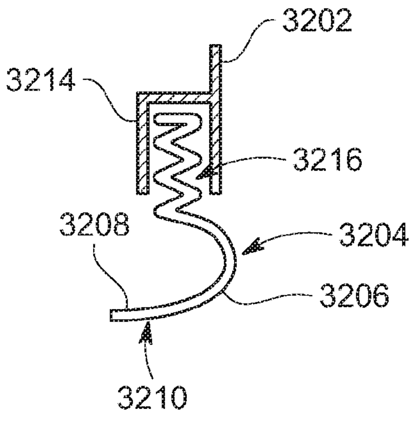
Figure 11C:
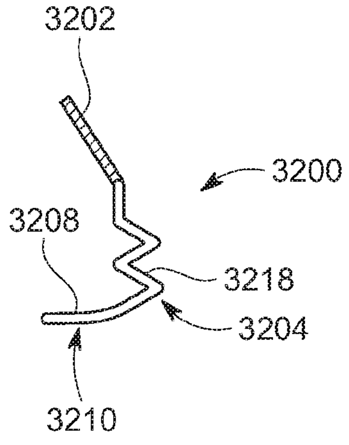

FIGS. 11A-11C are side cross-section views showing further embodiments of interfacing structures according to another example of the present technology.

Figure 12A:
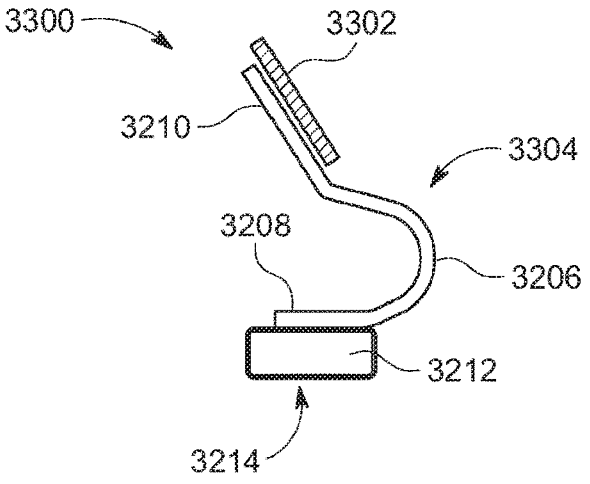
Figure 12B:
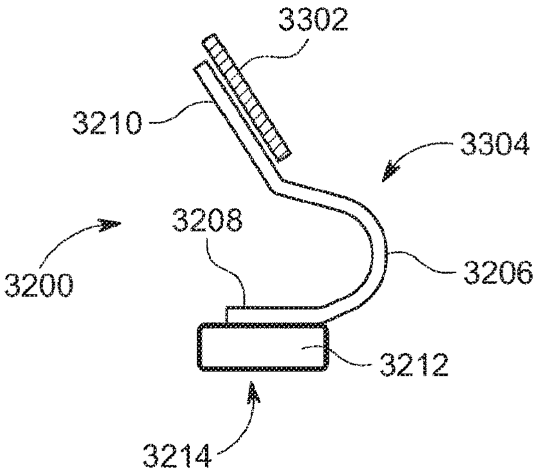
Figure 12C:
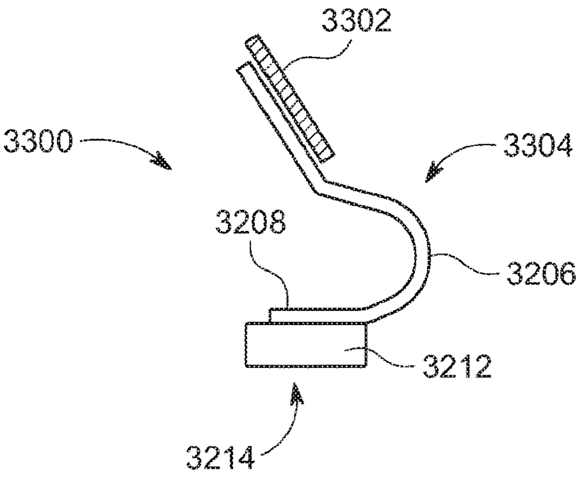

FIGS. 12A-12C are side cross-section views showing further embodiments of interfacing structures according to another example of the present technology.

Figure 13A:
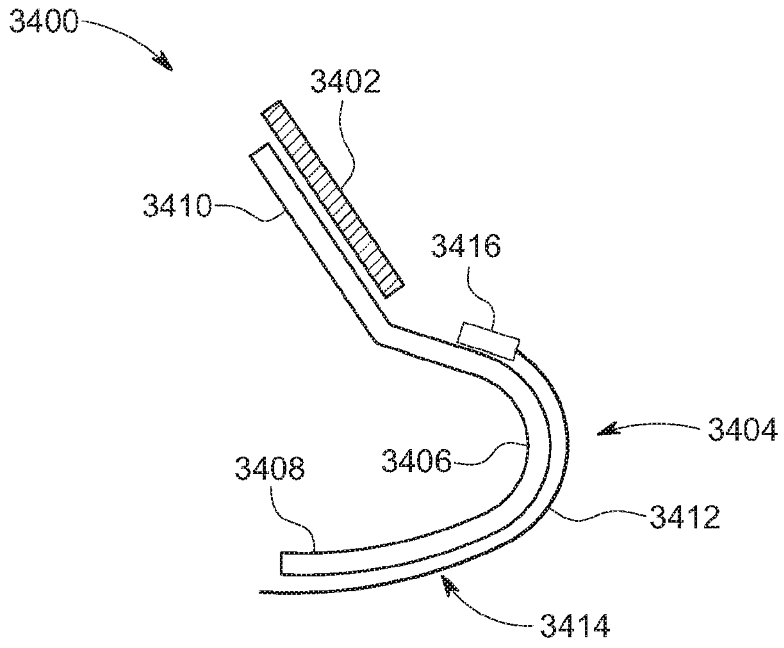
Figure 13B:
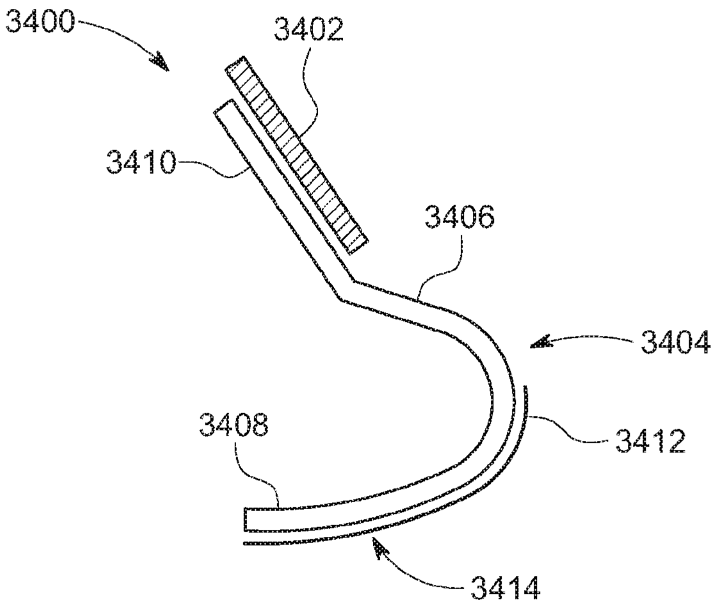

FIGS. 13A and 13B are side cross-section views showing further embodiments of interfacing structures according to another example of the present technology.

FIGS. 14A-14E are side cross-section views showing further embodiments of interfacing structures according to another example of the present technology.

FIGS. 15A-15E show a further embodiment of an interfacing structure according to another example of the present technology.

FIGS. 15F-15K show a further embodiment of an interfacing structure according to another example of the present technology.

Figure 16A:
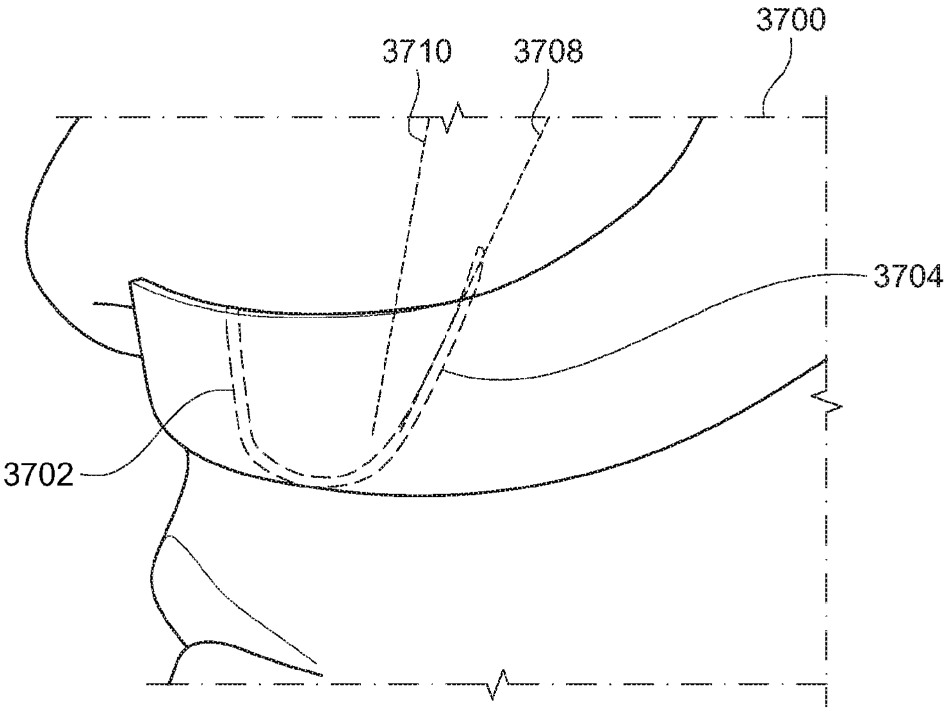
Figure 16B:
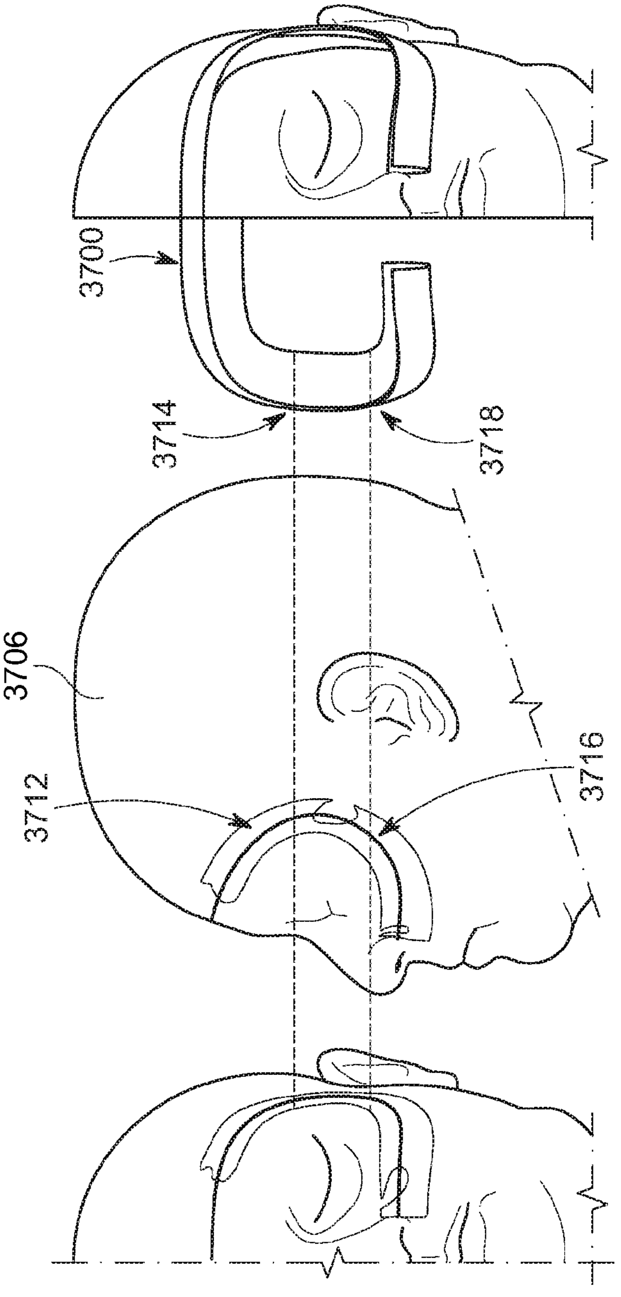

FIGS. 16A and 16B show a further embodiment of an interfacing structure according to another example of the present technology.

Figure 17A:
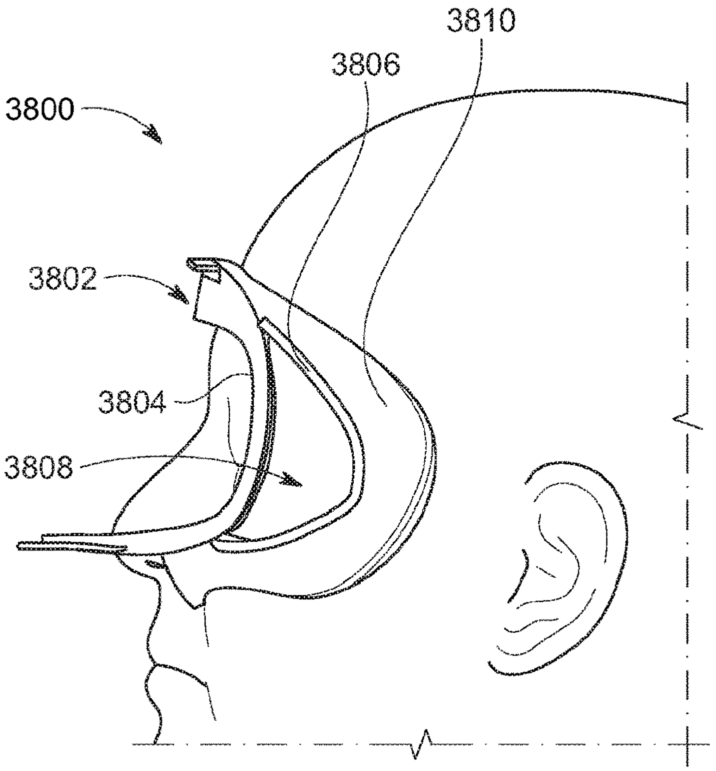
Figure 17B:
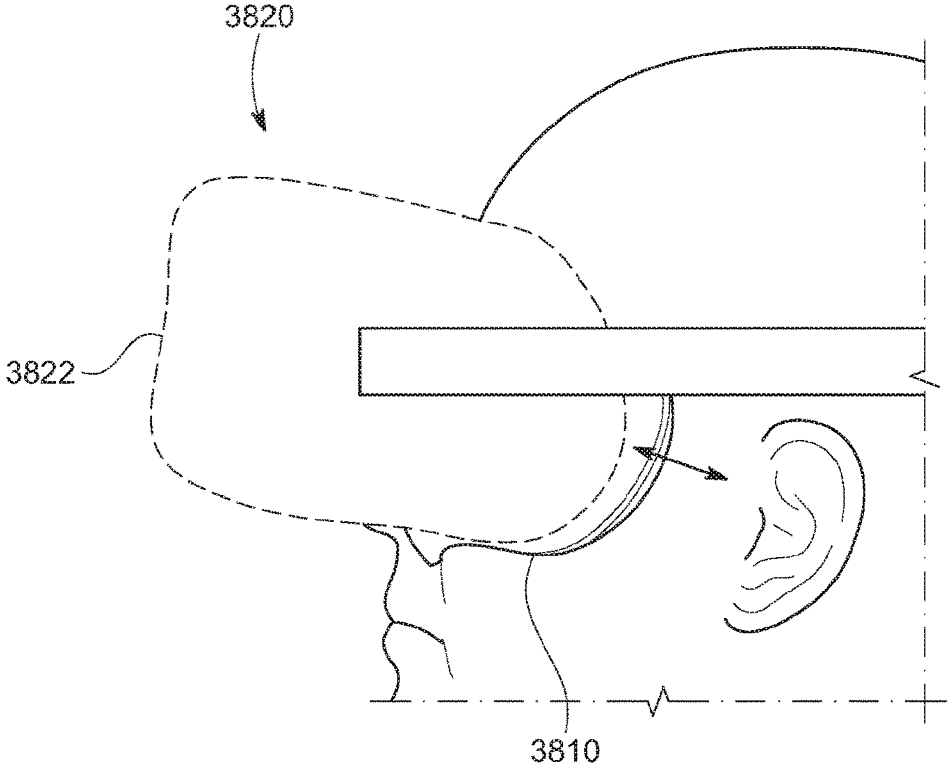
Figure 17C:
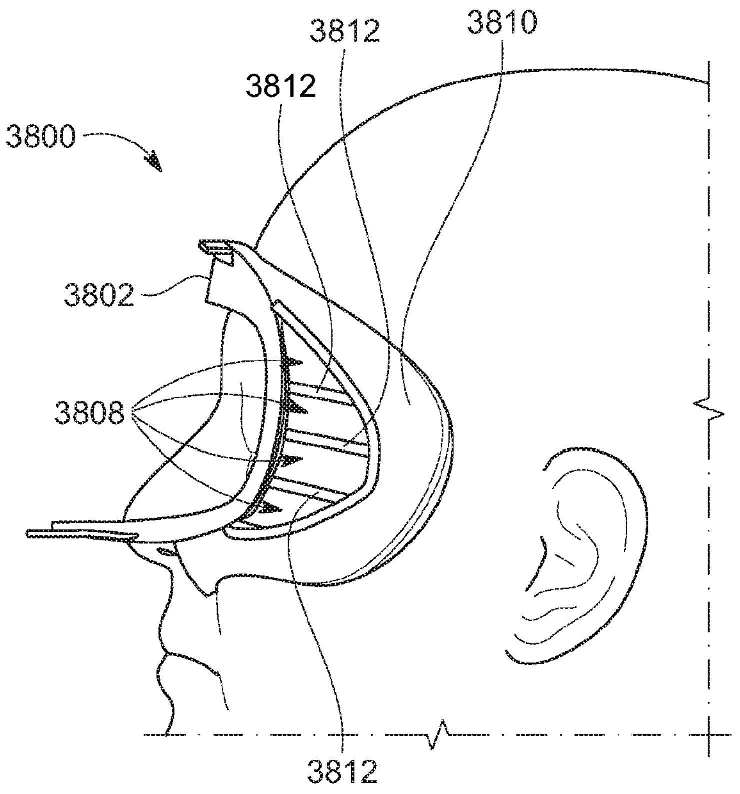

FIGS. 17A-17C show further embodiments of interfacing structures according to another example of the present technology.

Figure 17D:
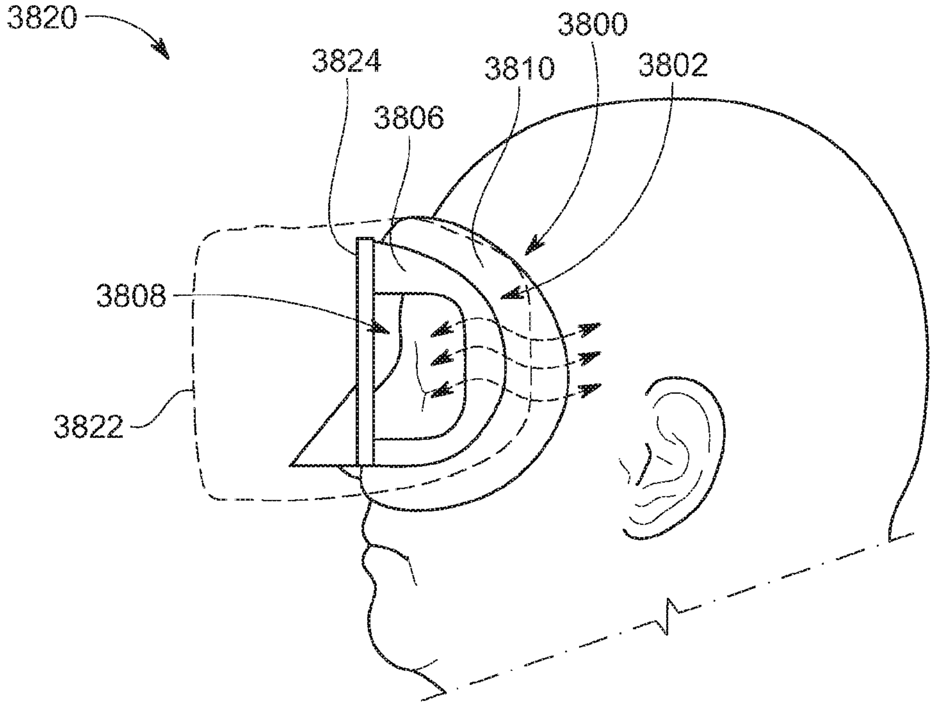
Figure 17E:
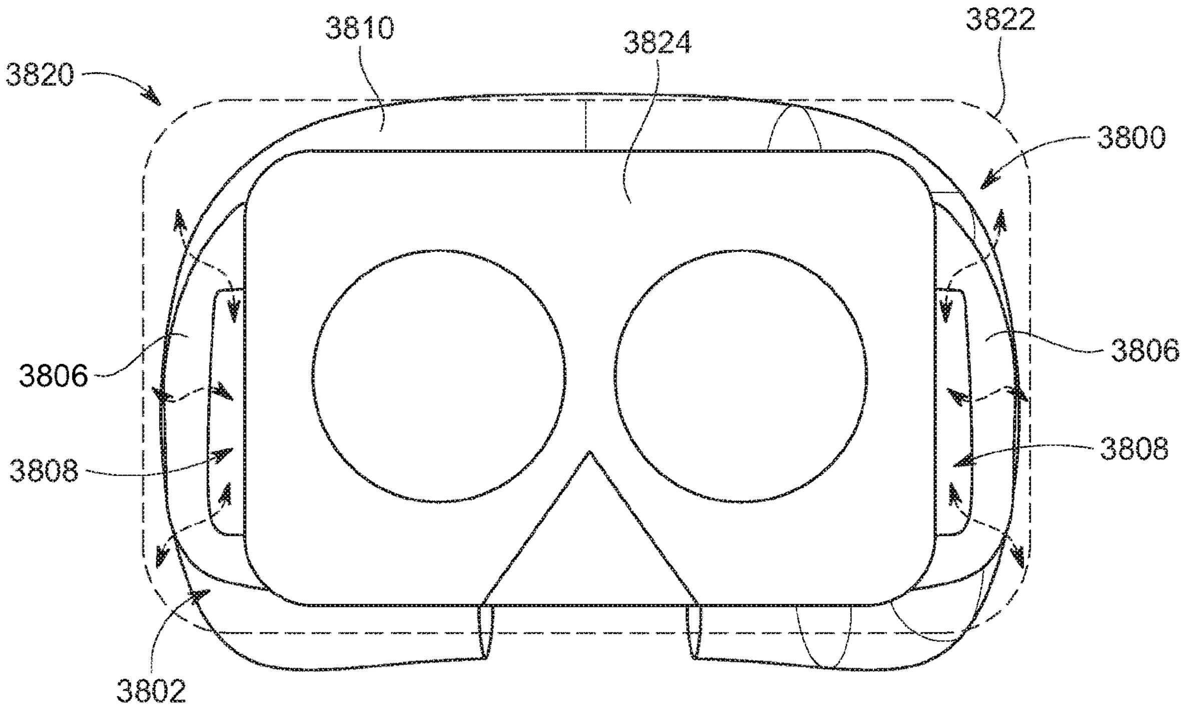

FIGS. 17D and 17E show a further embodiment of an interfacing structure according to another example of the present technology.

Figure 18A:
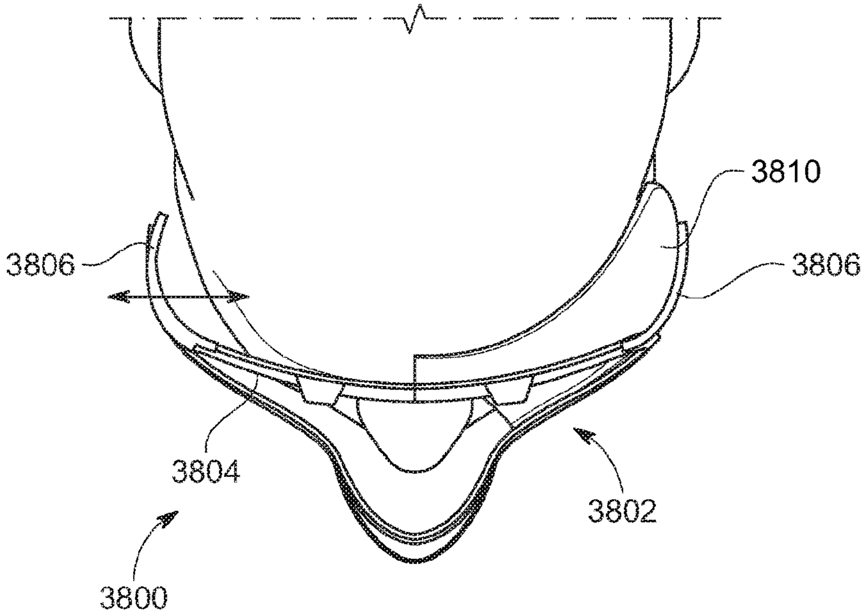

FIG. 18A shows an interfacing structure according to another example of the present technology.

Figure 18B:
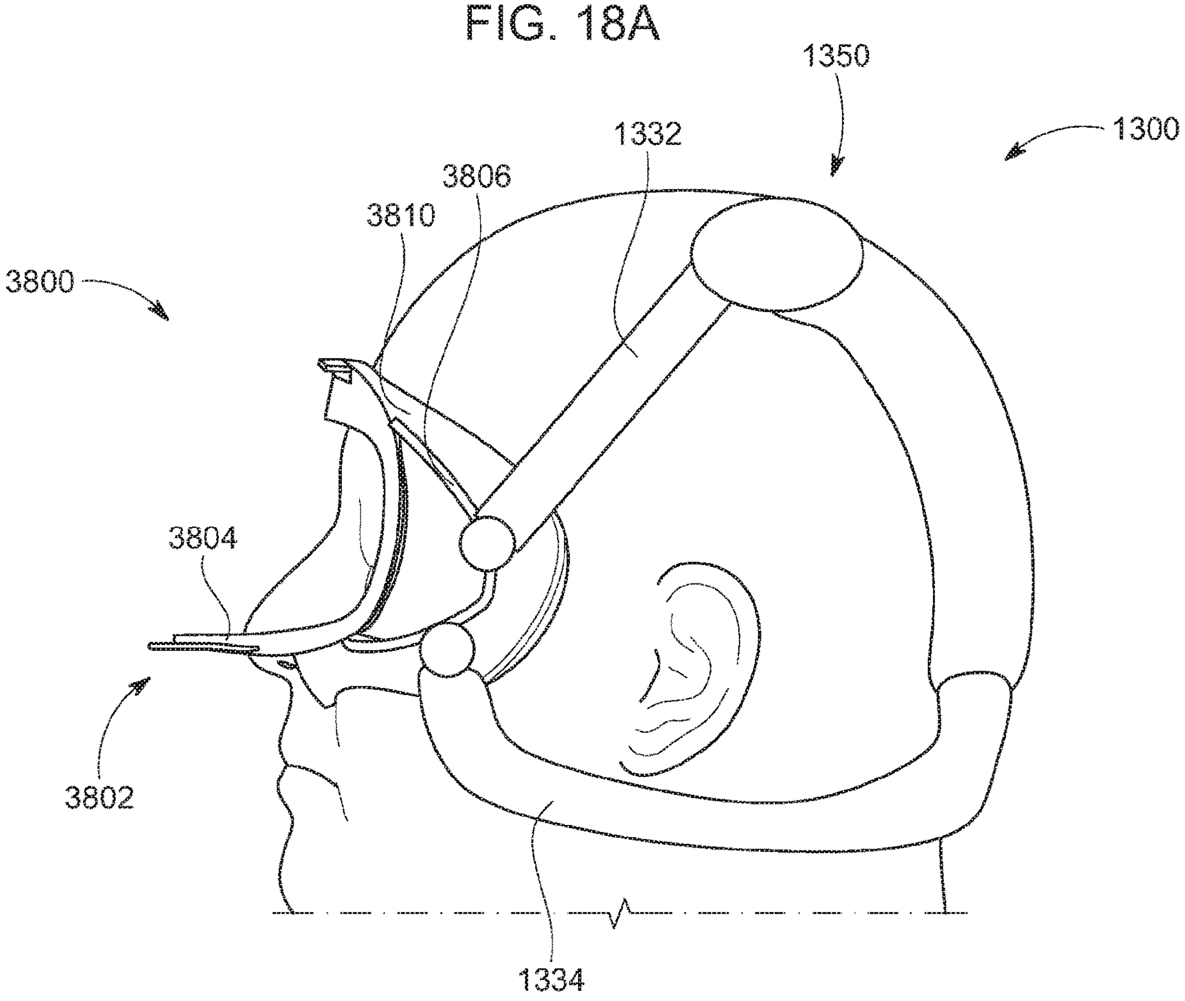
Figure 18C:
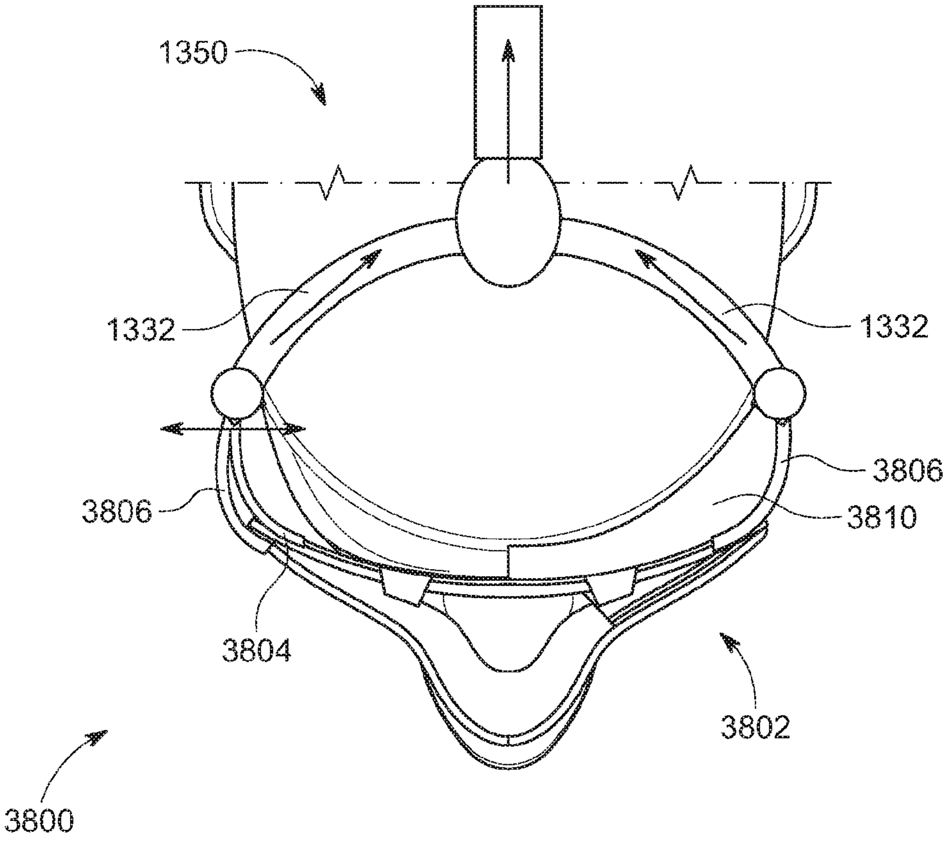

FIG. 18B-18C show an interfacing structure and positioning and stabilising structure according to another example of the present technology.

Figure 18D:
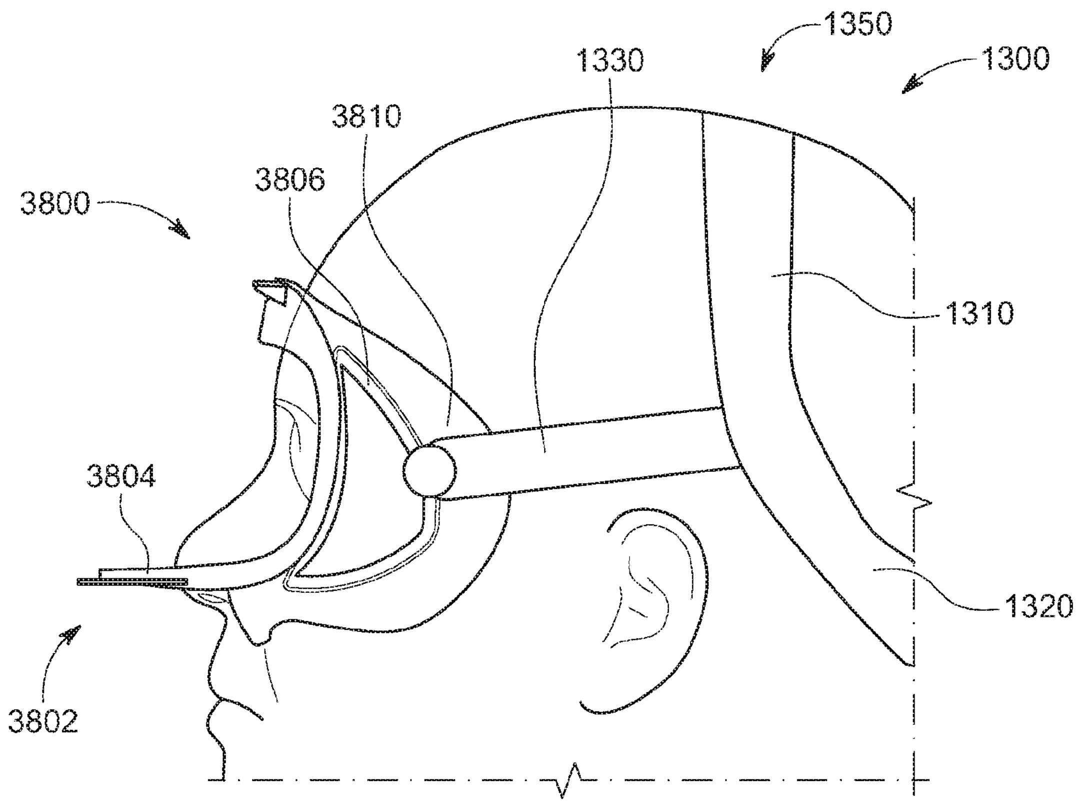

FIG. 18D shows an interfacing structure and positioning and stabilising structure according to another example of the present technology.

Figure 19A:
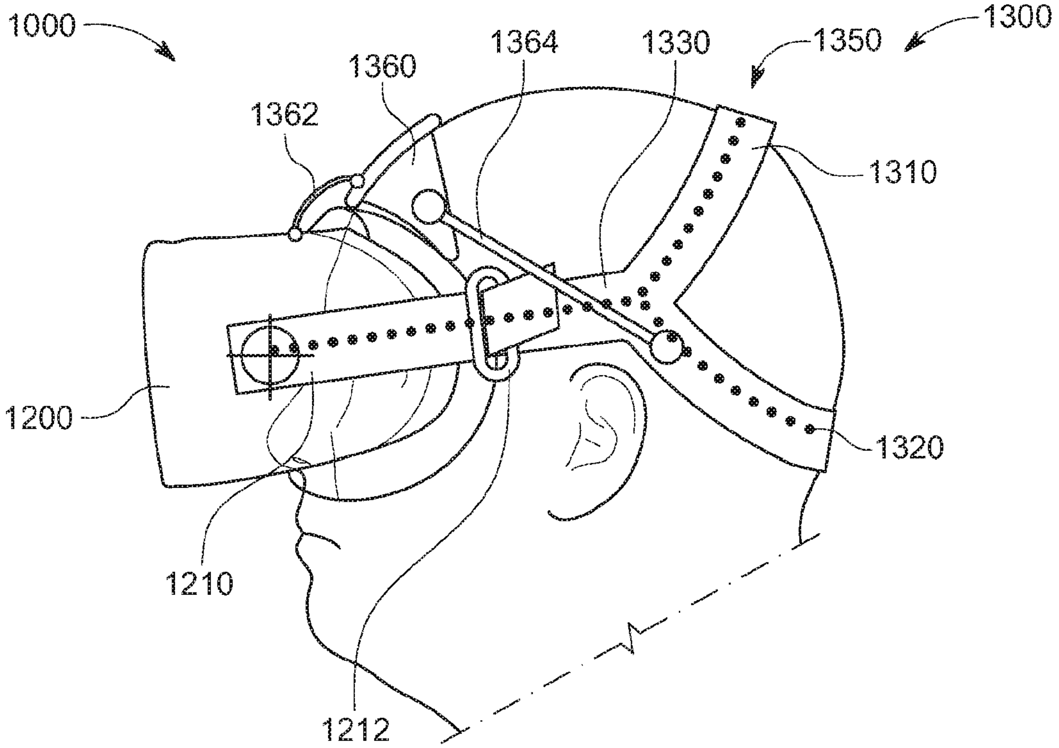

FIG. 19A shows a head-mounted display system according to another example of the present technology.

Figure 19B:
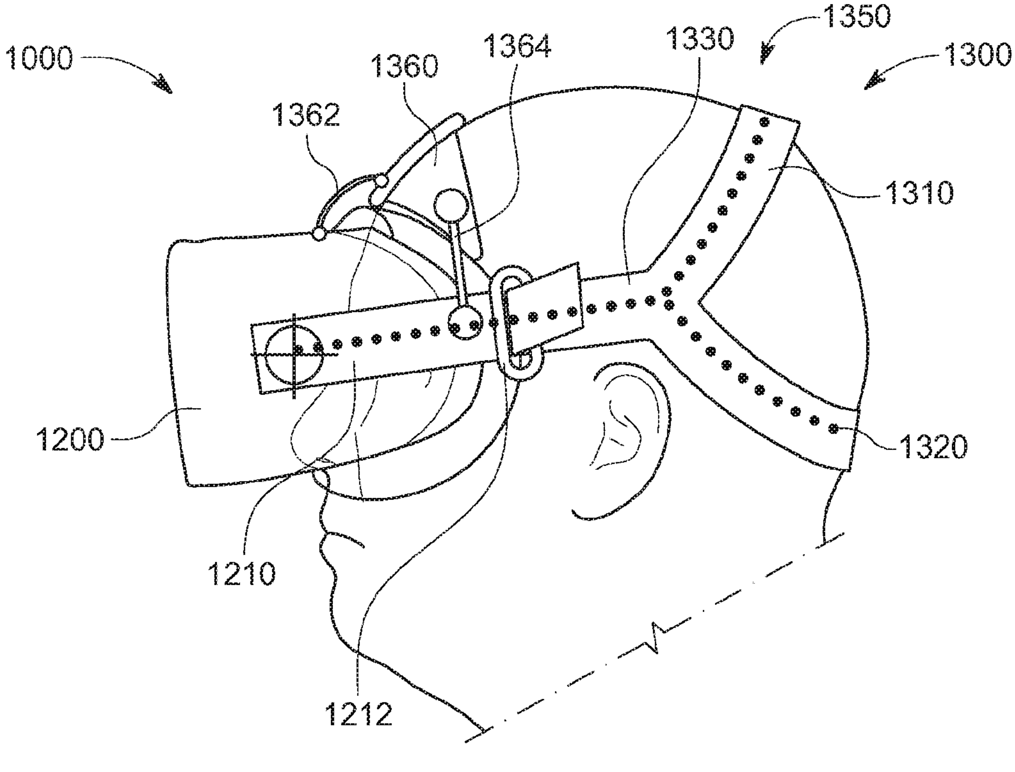

FIG. 19B shows a head-mounted display system according to another example of the present technology.

Figure 20A:
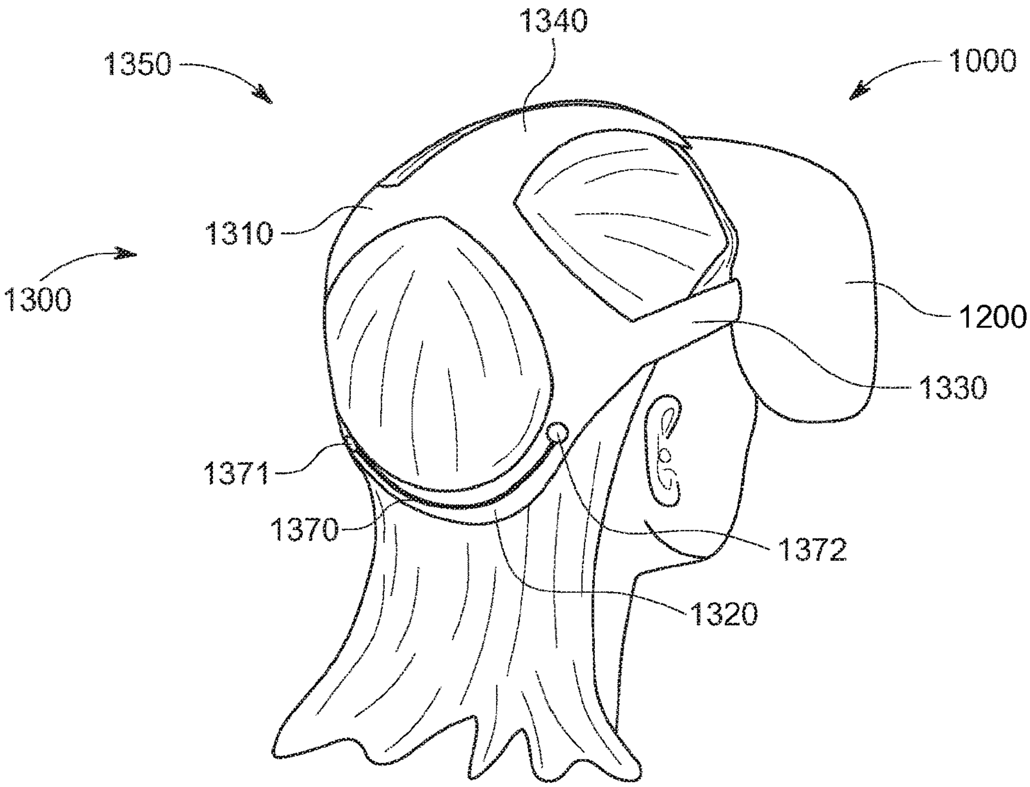
Figure 20B:
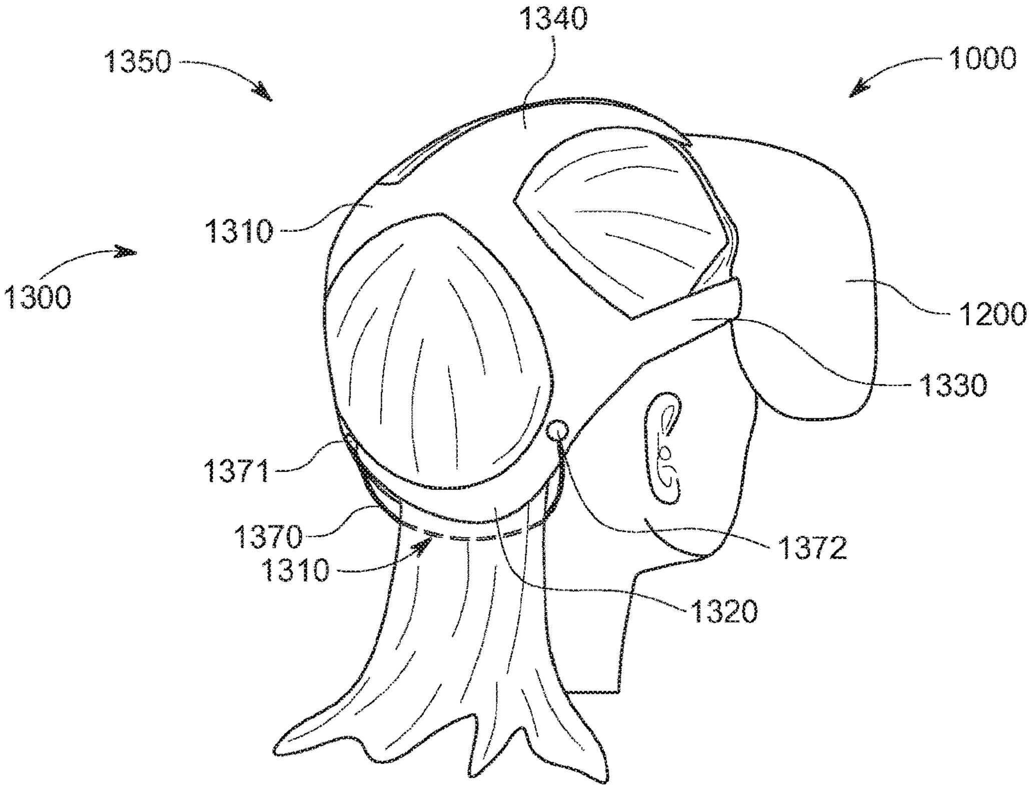

FIGS. 20A-20B show a head-mounted display system according to another example of the present technology.

FIGS. 21A-21E show a head-mounted display system according to another example of the present technology.

Figure 22C:
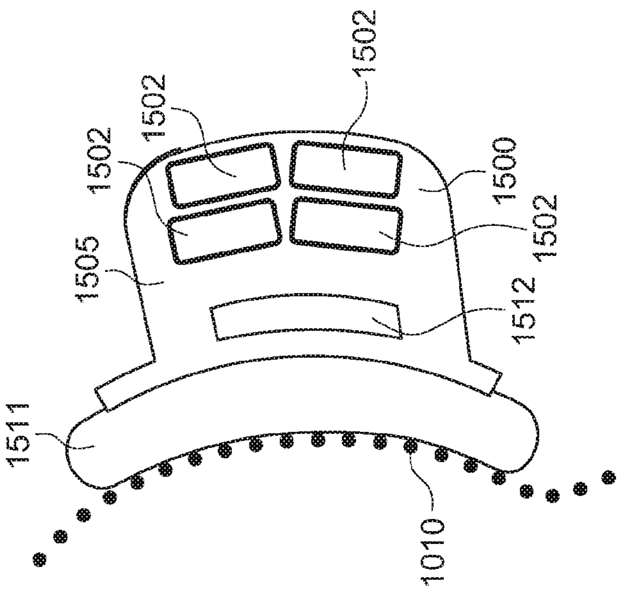
Figure 22B:
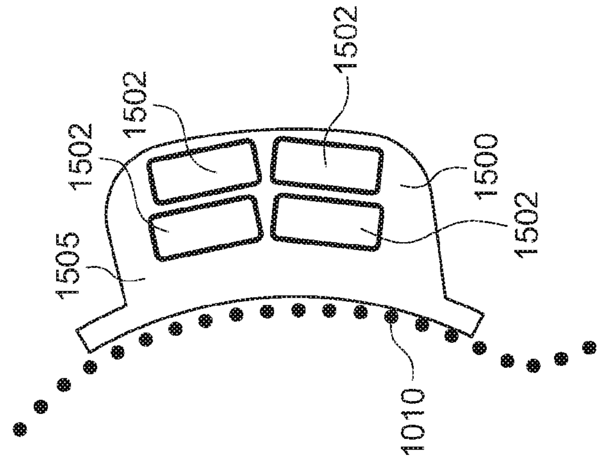
Figure 22A:
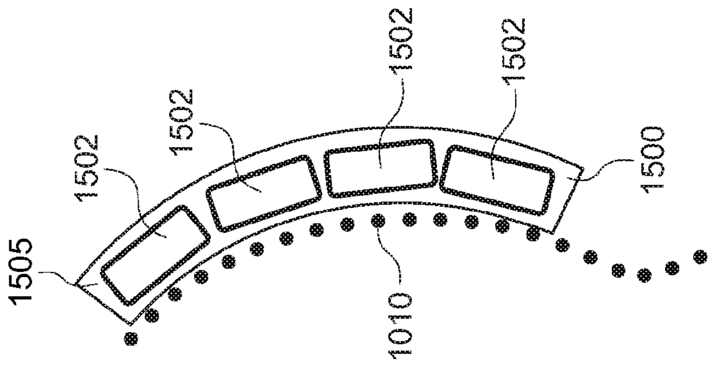

FIGS. 22A-22C show battery packs according to examples of the present technology.

FIGS. 23A-23D show a head-mounted display system according to another example of the present technology.

FIGS. 24A-24D show components of positioning and stabilising structures according to examples of the present technology.

Figure 25A:
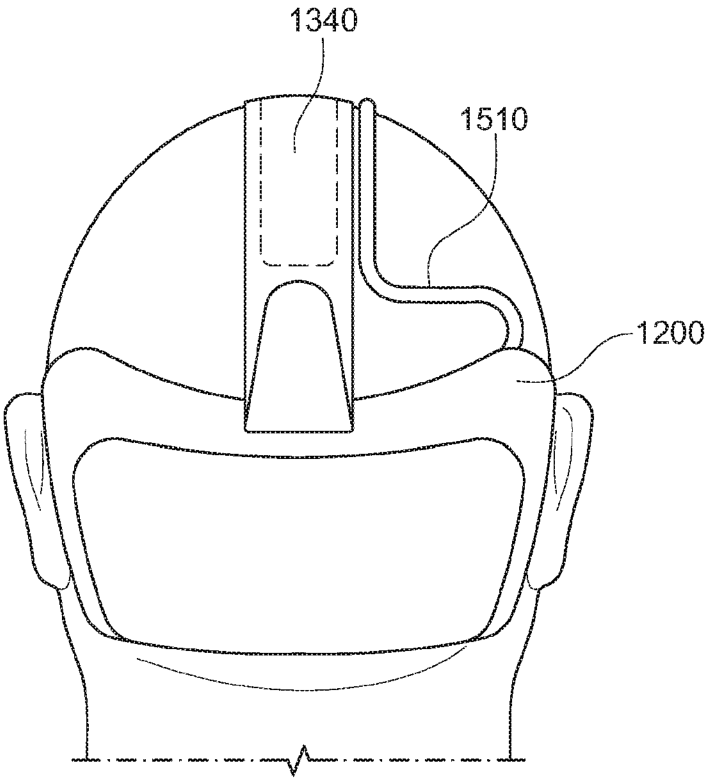
Figure 25B:
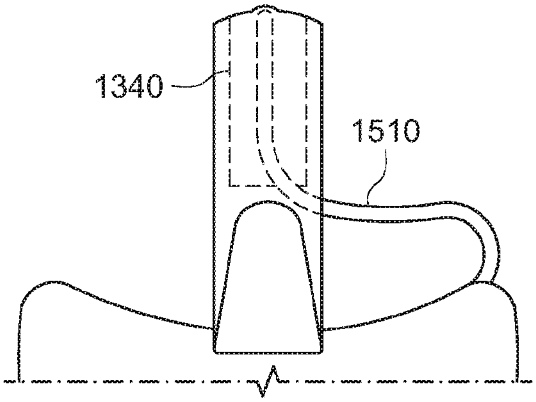
Figure 25C:
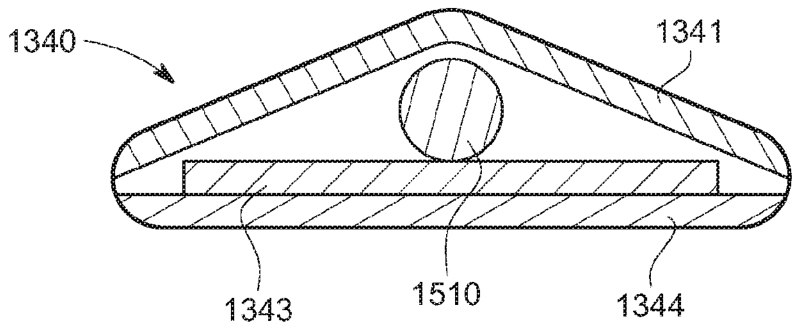

FIGS. 25A-25C show a head-mounted display system according to another example of the present technology.

Figure 26A:
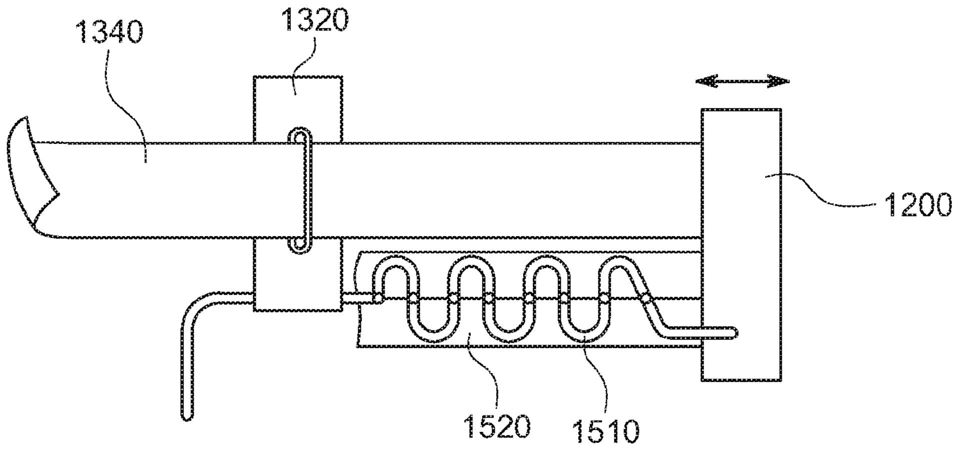
Figure 26B:
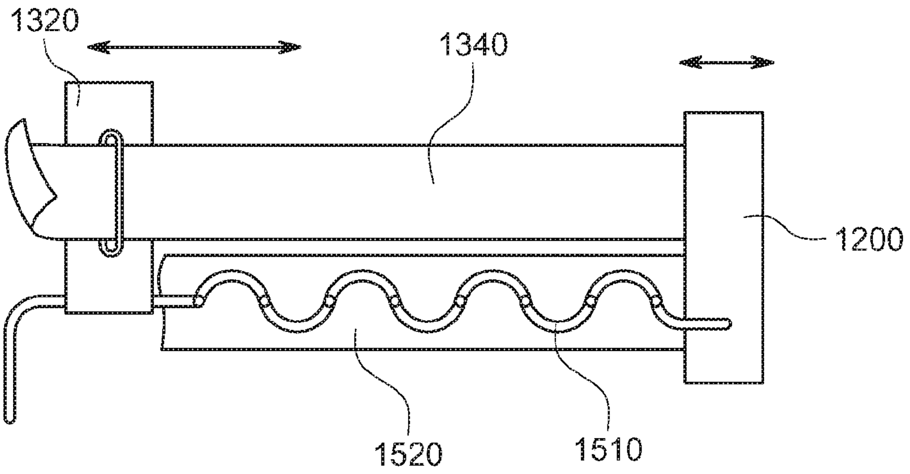

FIGS. 26A-26B show a power cord strap portion according to an example of the present technology.

Figure 27:
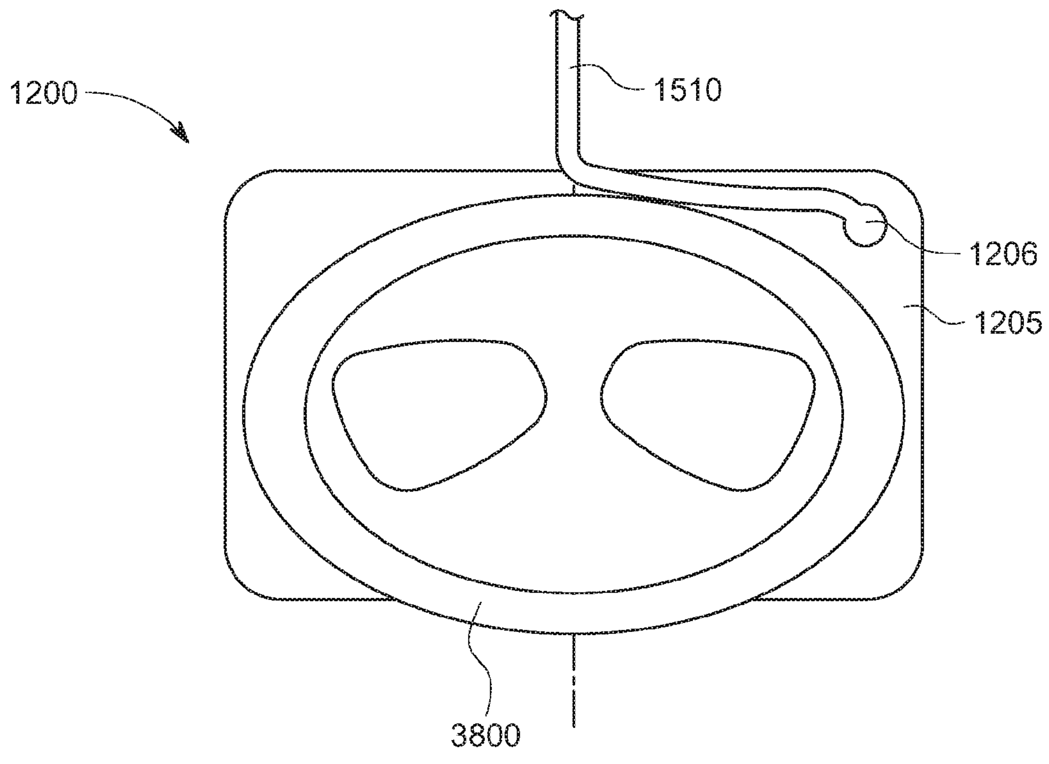

FIG. 27 shows a head-mounted display unit according to an example of the present technology.

FIGS. 28A-28E show head-mounted display systems according to examples of the present technology having power cords.

FIGS. 29A-29D show arms according to examples of the present technology.

Figure 30A:
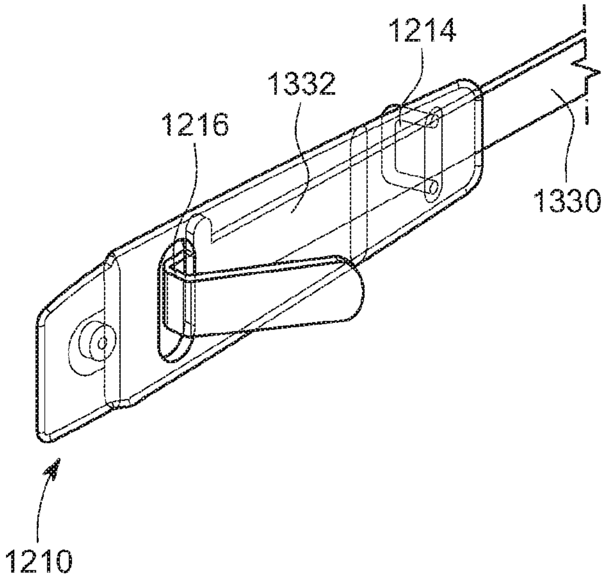
Figure 30B:
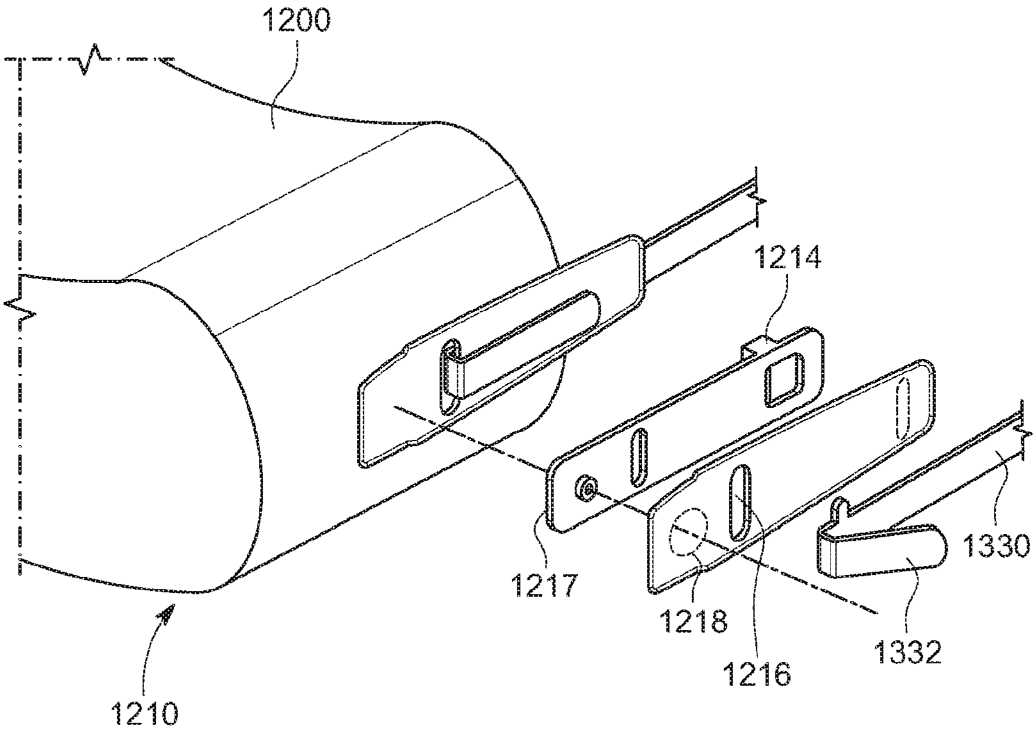

FIGS. 30A-30B show an arm according to a further example of the present technology.

Figure 31A:
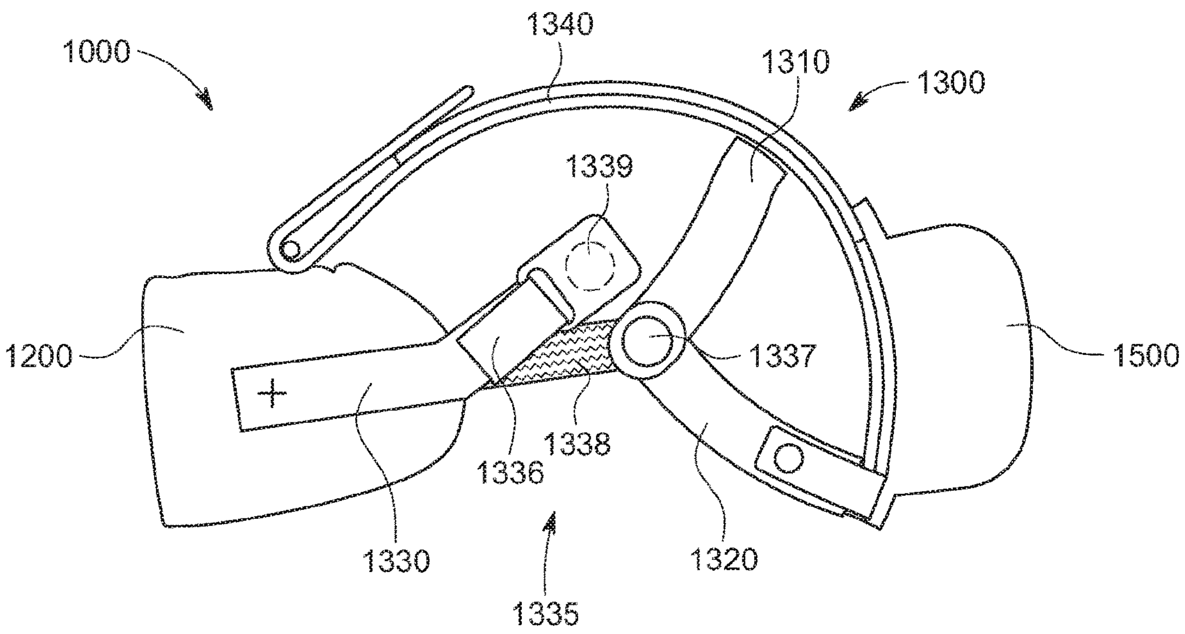
Figure 31B:
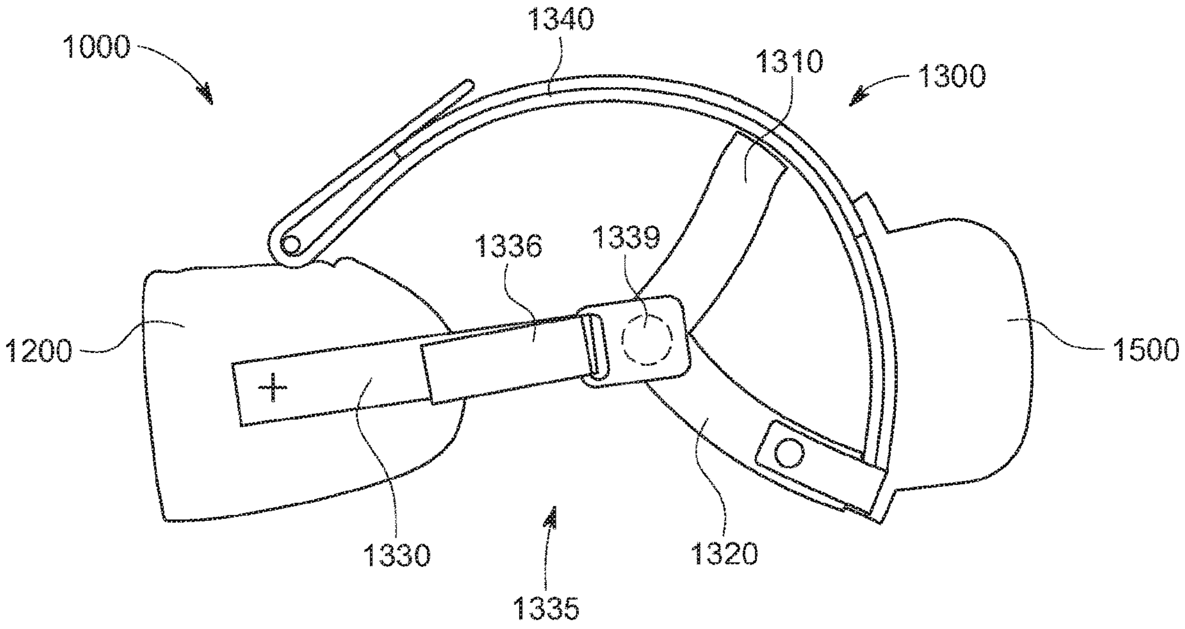

FIGS. 31A-31B show a head-mounted display system according to another example of the present technology.

FIGS. 32A-32H show head-mounted display systems according to examples of the present technology.

Figure 33:
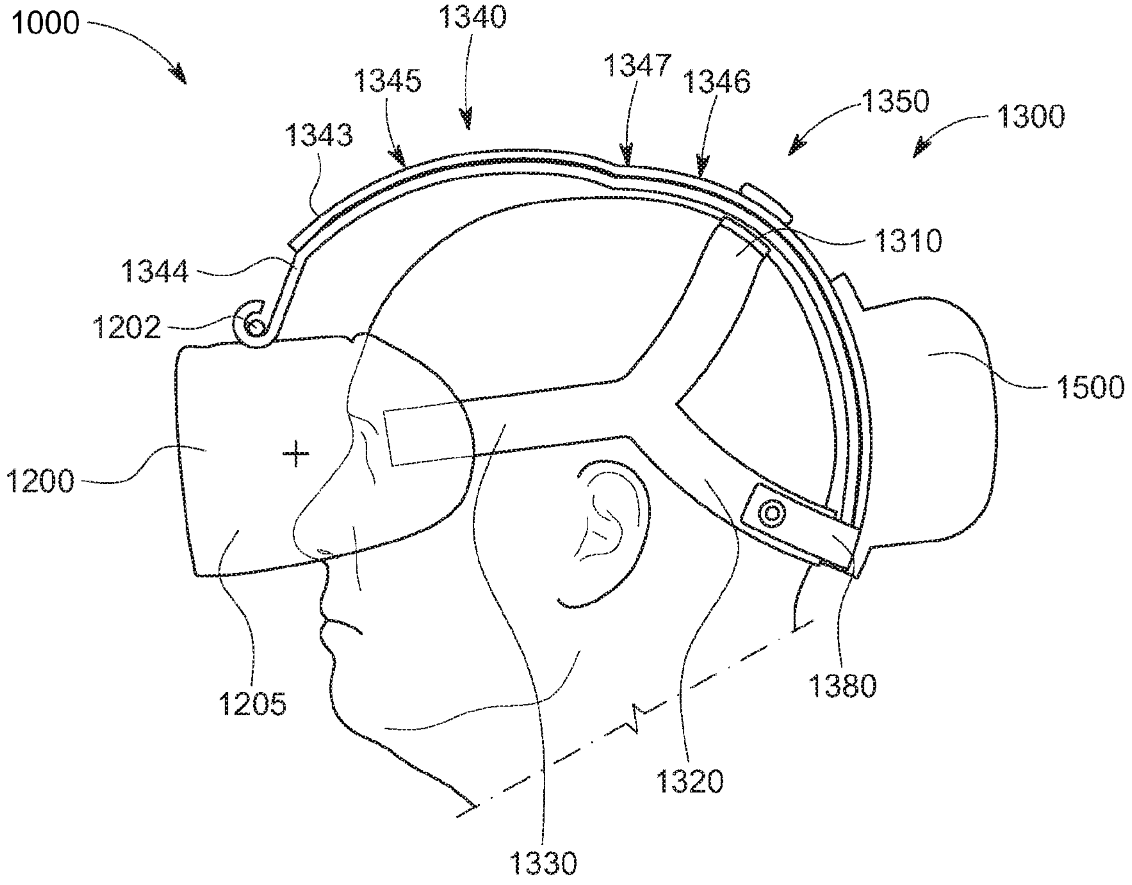

FIG. 33 shows a head-mounted display system according to another example of the present technology.

FIGS. 34A-34I show a head-mounted display unit according to another example of the present technology.

Figure 34A:
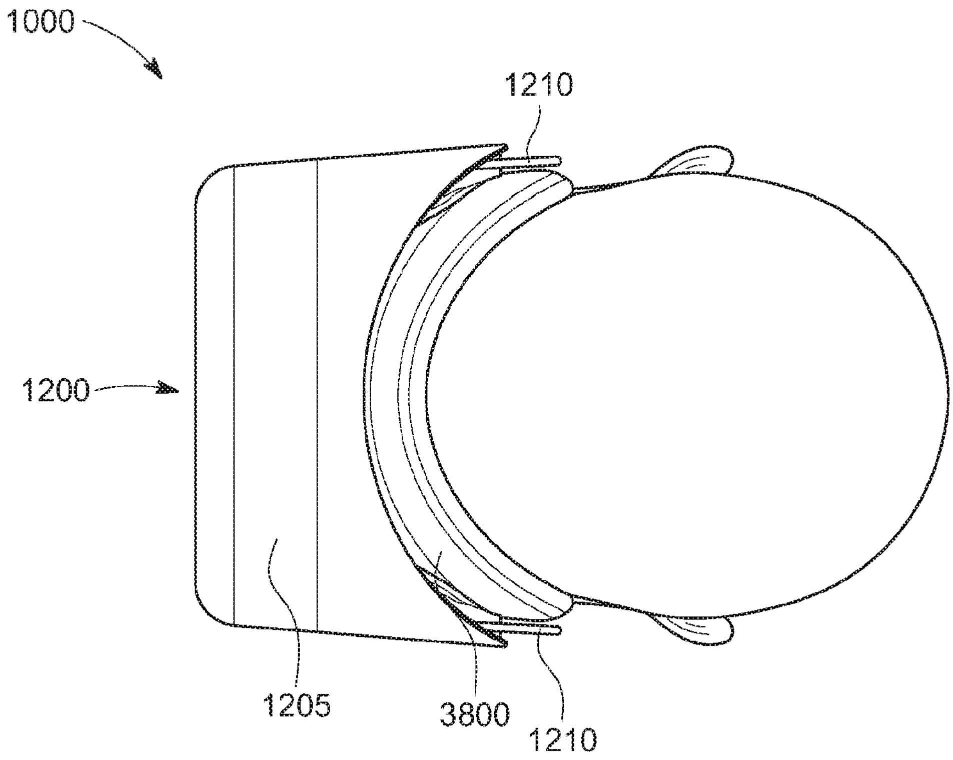
Figure 34B:
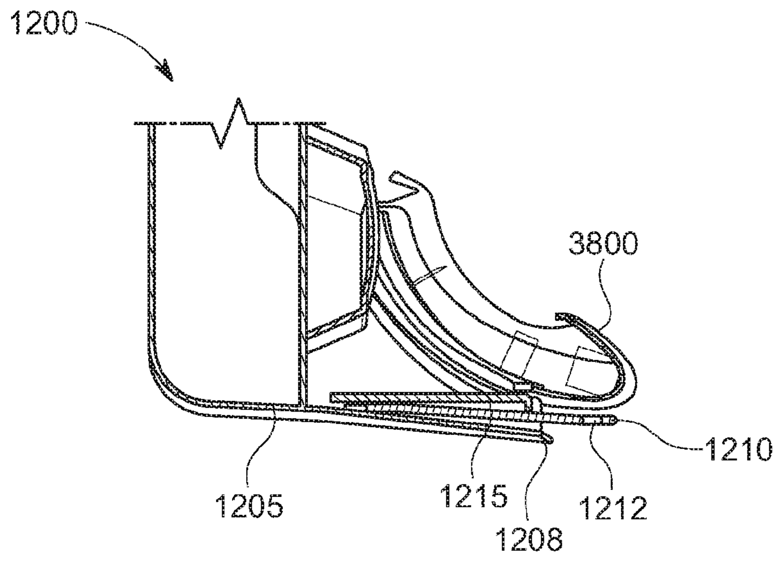
Figure 34C:
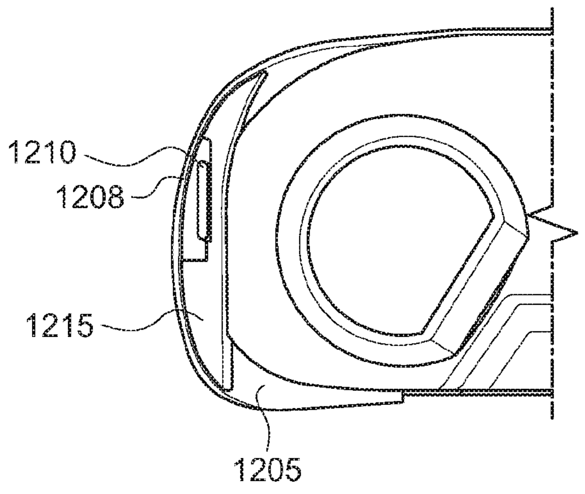
Figure 34E:
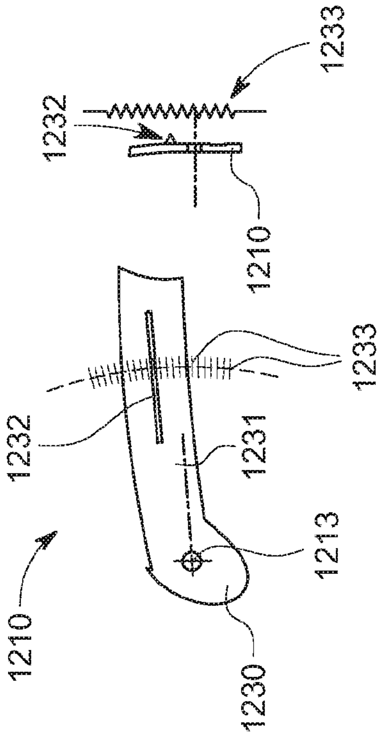
Figure 34D:
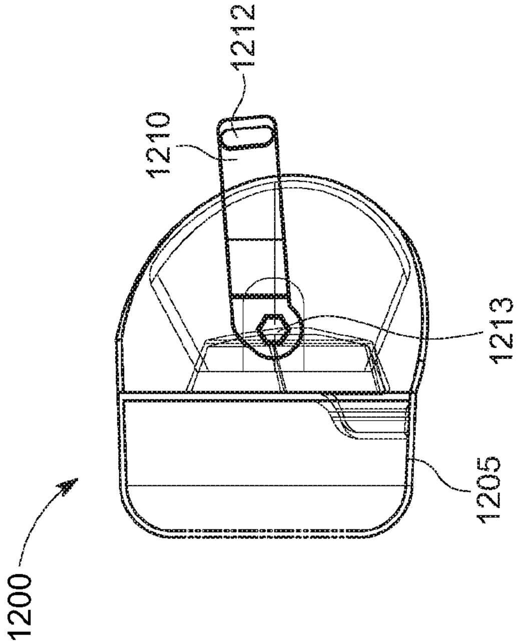
Figure 34G:
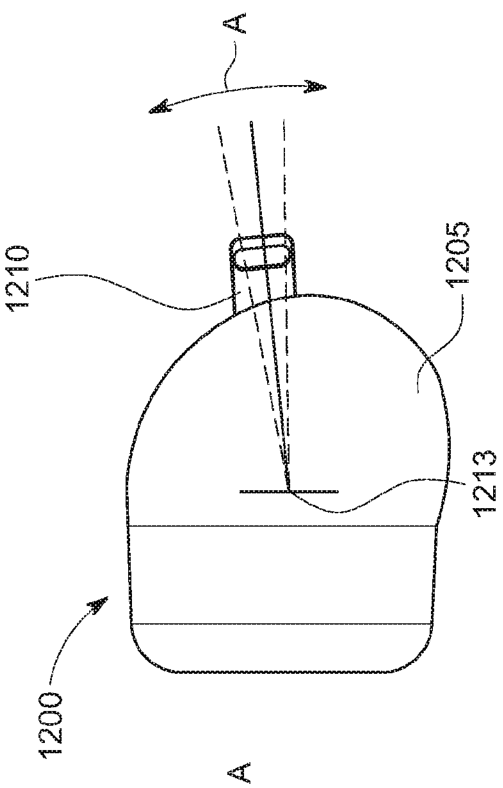
Figure 34F:
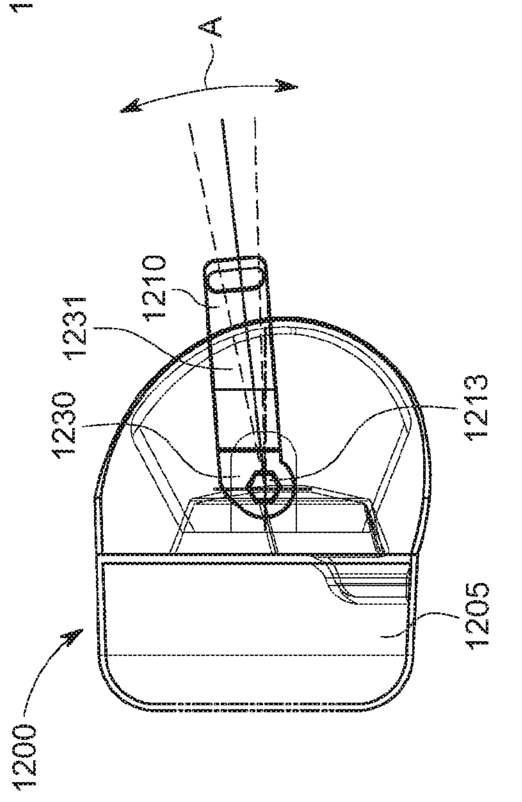
Figure 34H:
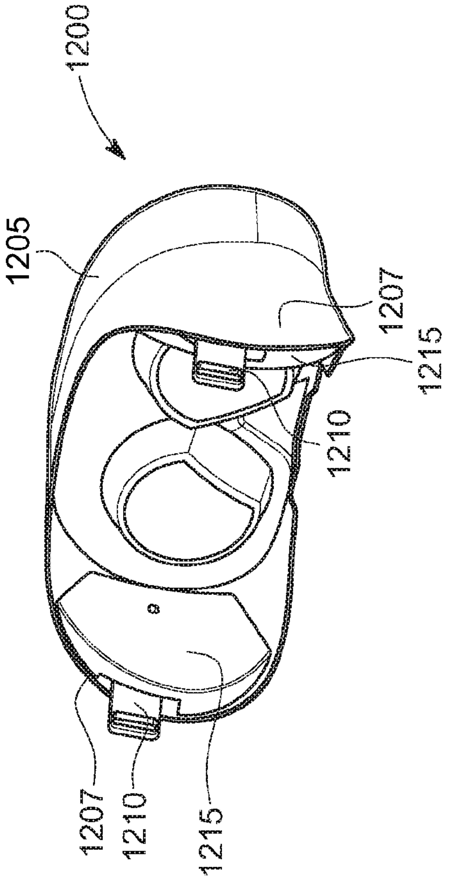
Figure 34I:
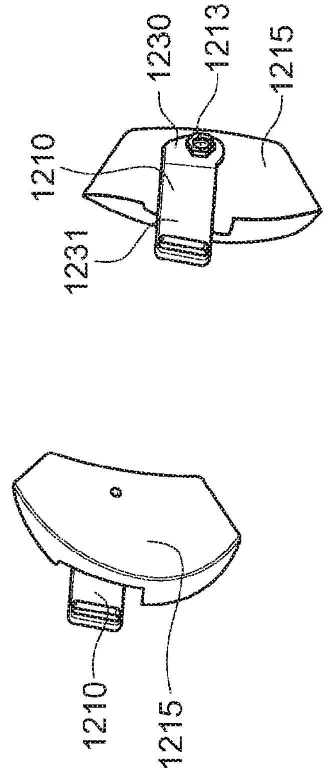
Figure 34J:
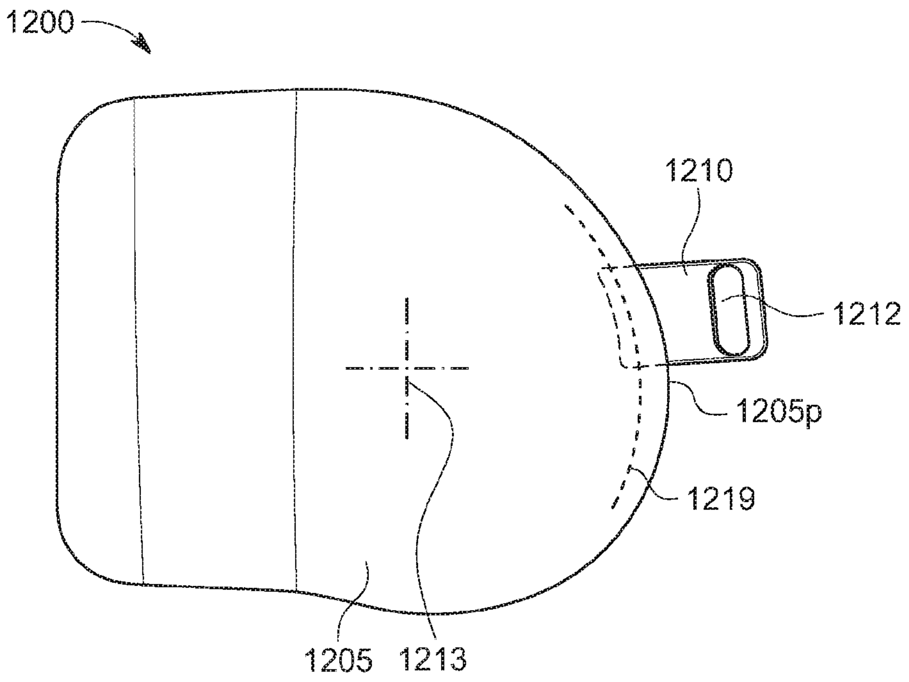

FIG. 34J shows a head-mounted display unit according to another example of the present technology.

Figure 34K:
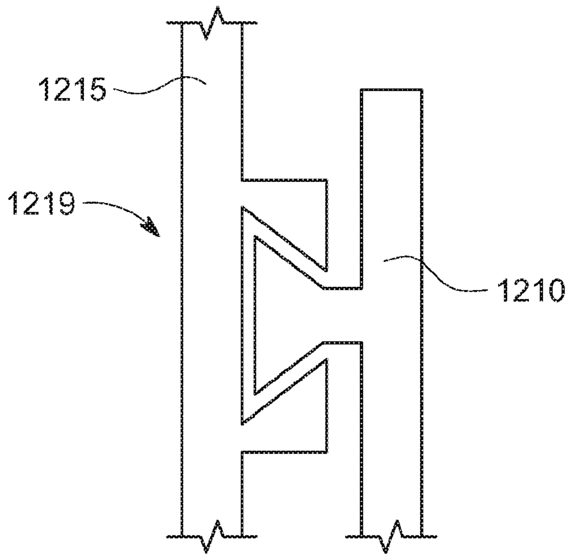
Figure 34L:
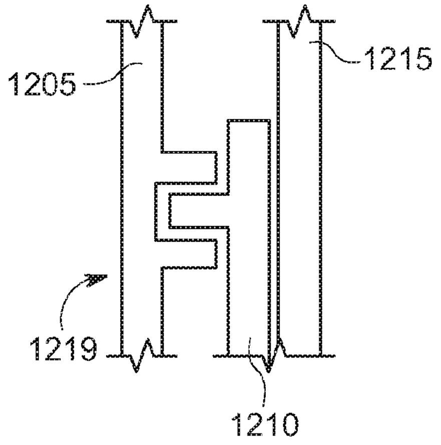
Figure 34M:
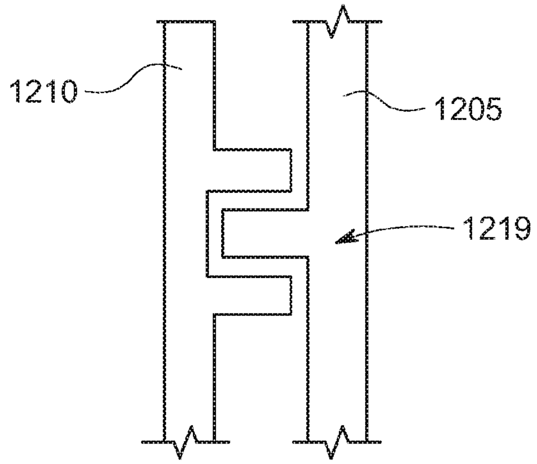

FIGS. 34K-34M show connections between an arm and a guide of head-mounted display units according to examples of the present technology.

Figure 35A:
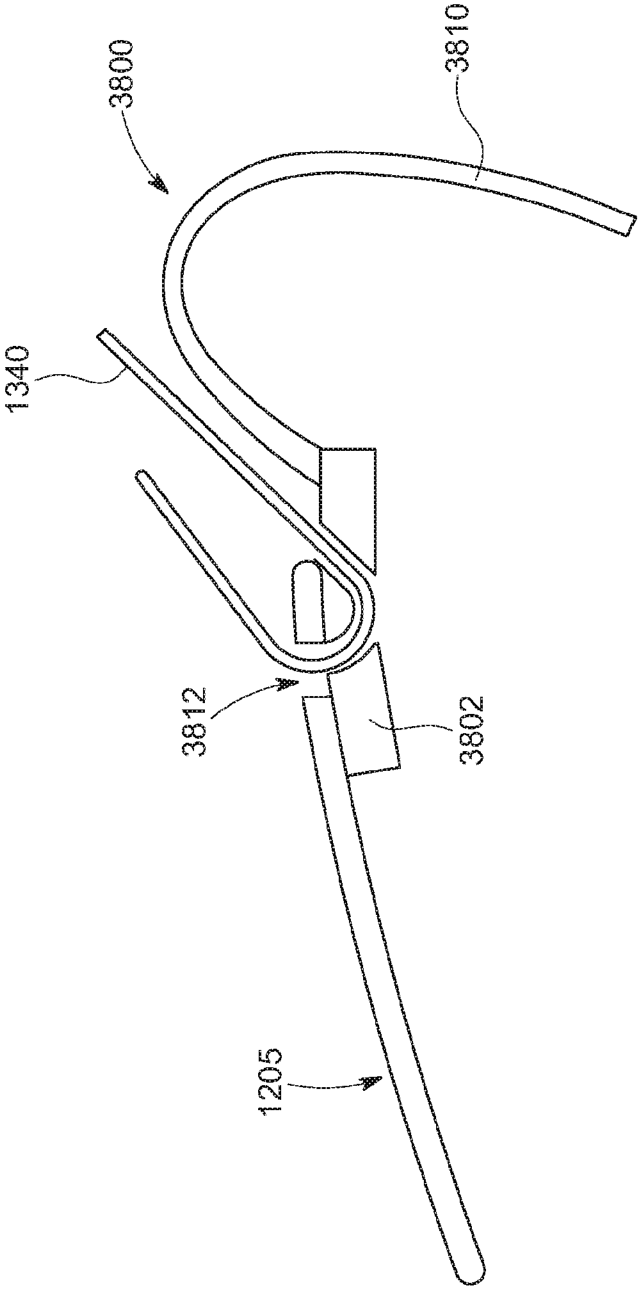
Figure 35B:
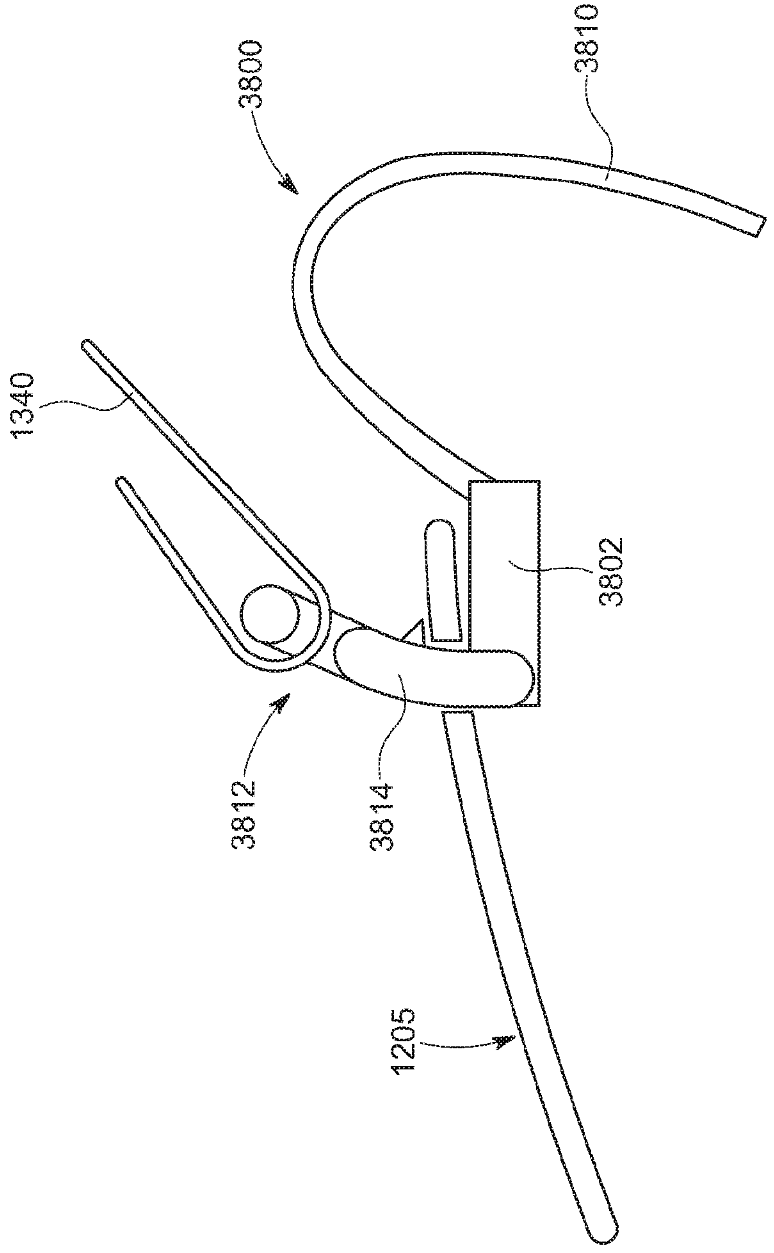

FIGS. 35A-35B show connections between a top strap portion and a display unit housing according to examples of the present technology.

FIGS. 36A-36D show a head-mounted display system according to another example of the present technology.

Figure 37B:
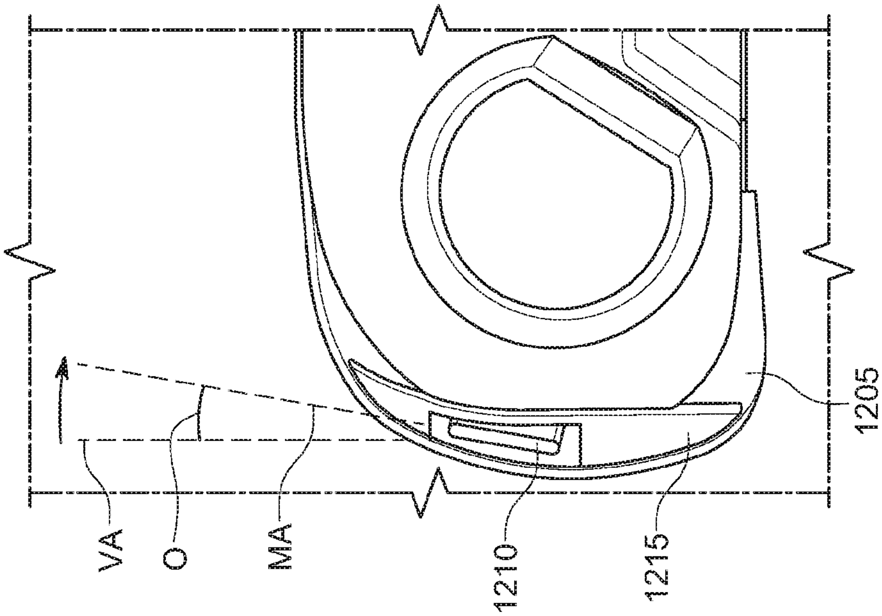
Figure 37A:
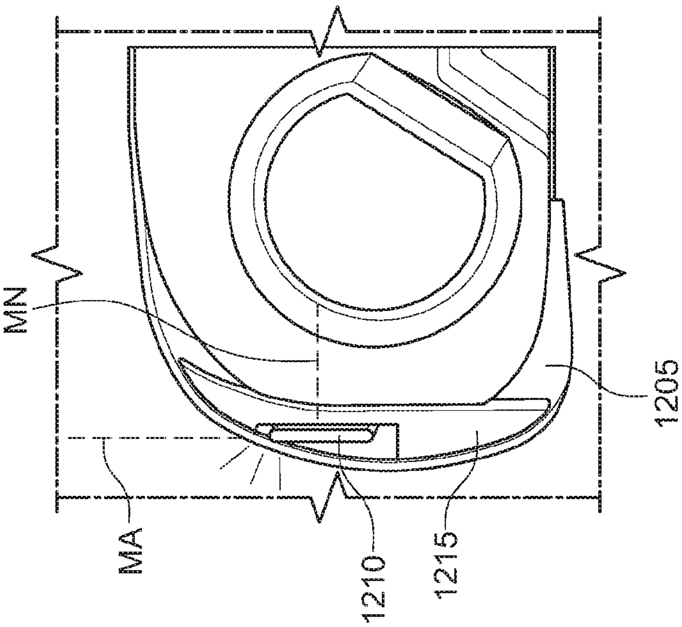

FIGS. 37A-37B show a display unit housing according to further examples of the present technology.

Figure 38A:
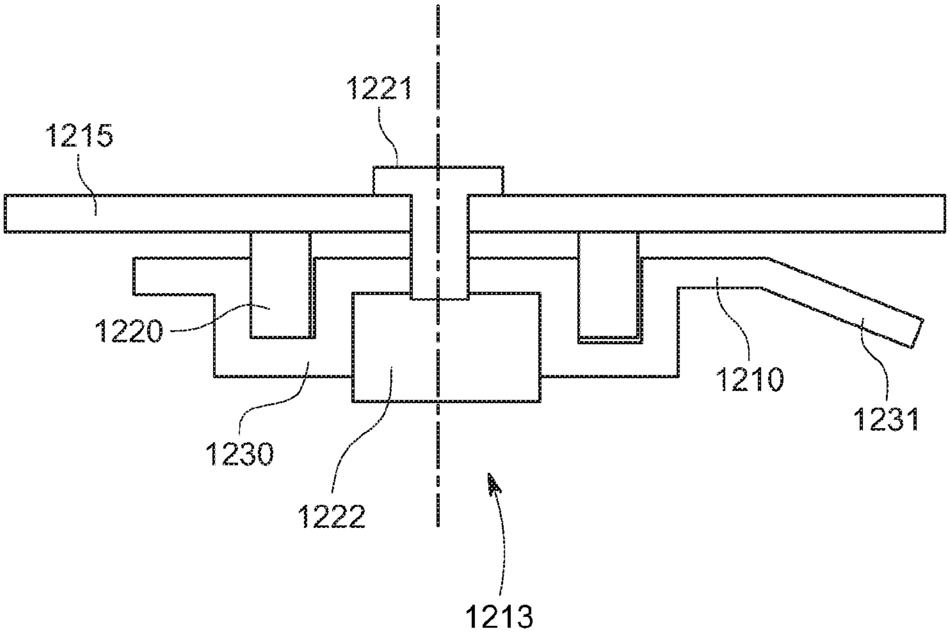
Figure 38B:
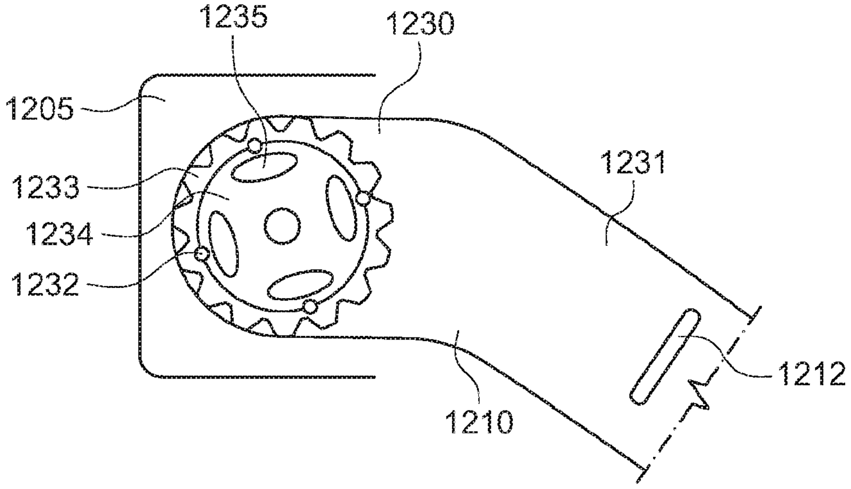

FIG. 38A shows an arm and arm mounting portion according to another example of the present technology.

FIGS. 38B-38N show connections between arms and display unit housings according to examples of the present technology.

Figure 39A:
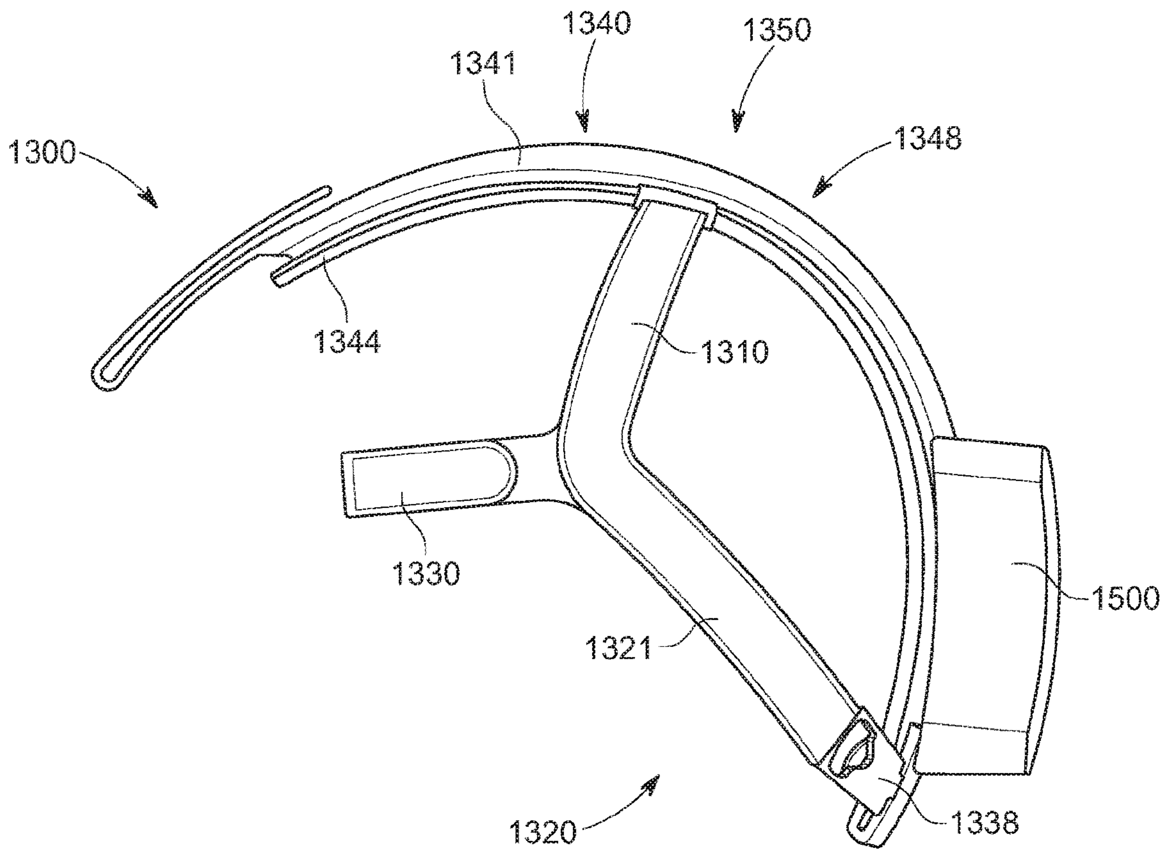
Figure 39B:
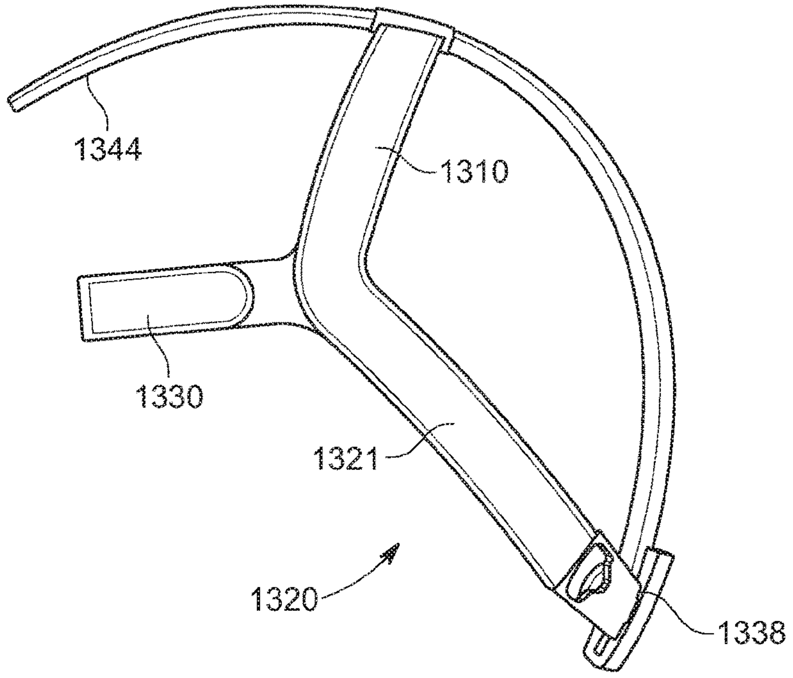
Figure 39C:
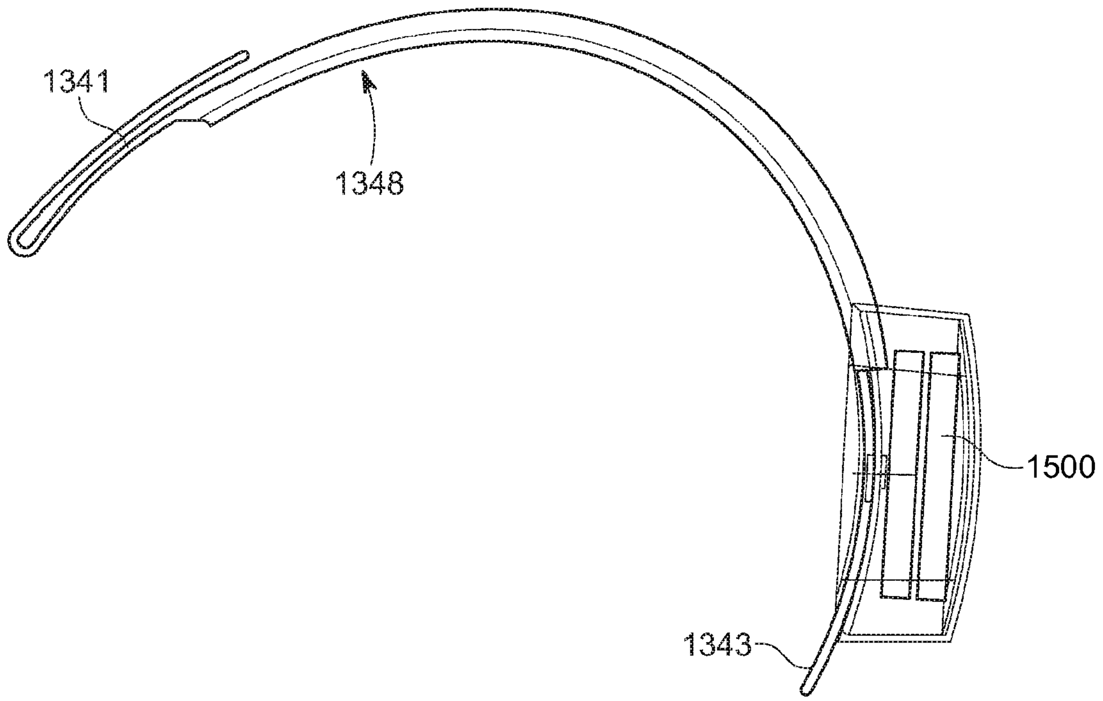

FIGS. 39A-39C show, in isolation, the positioning and stabilising structure of the head-mounted display system shown in FIGS. 36A-36D.

Figure 40A:
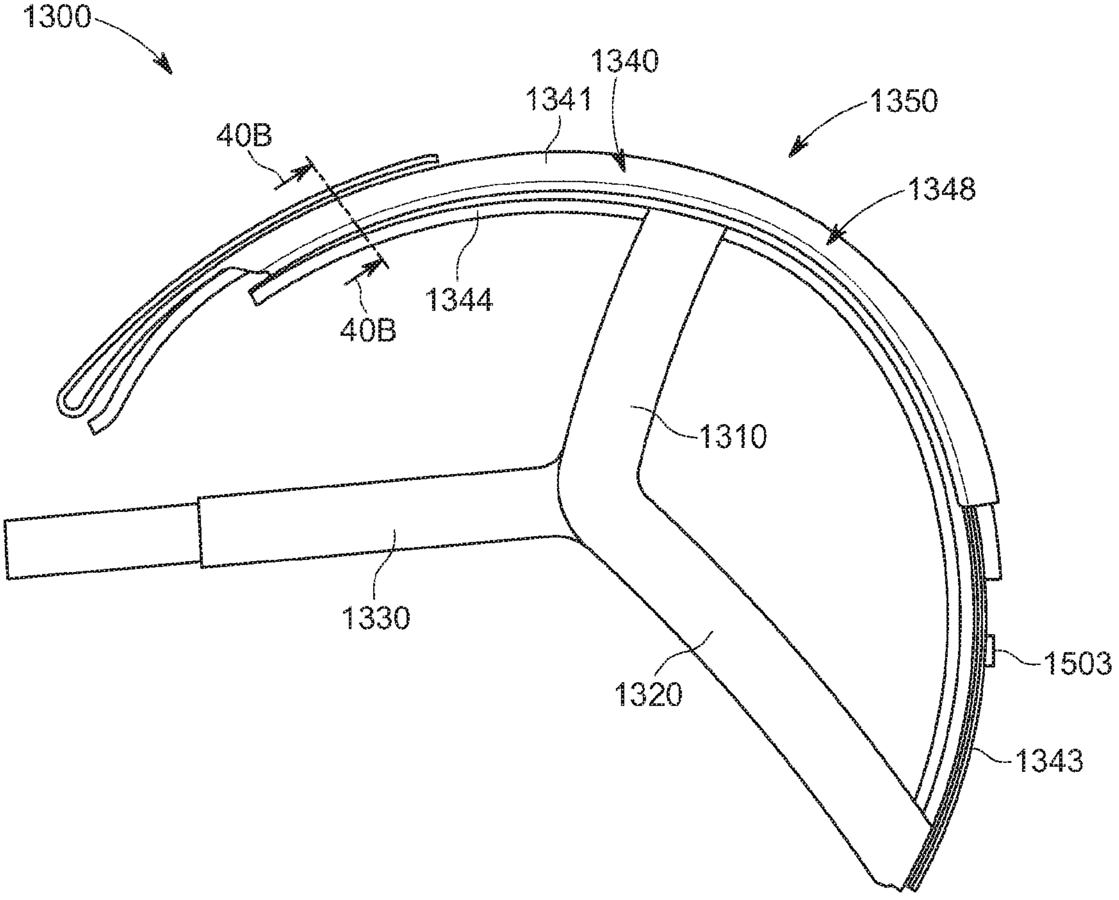
Figure 40B:
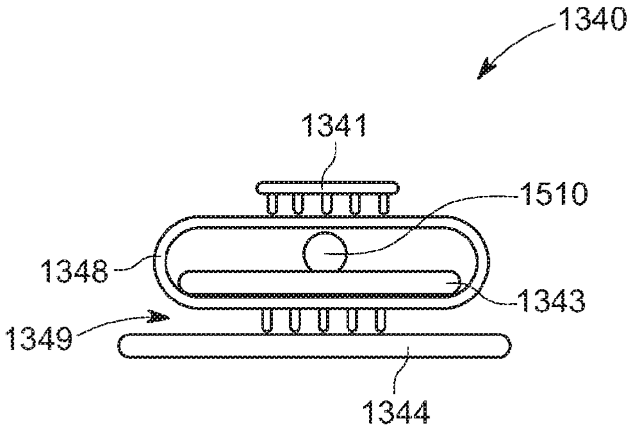

FIGS. 40A-40B show a positioning and stabilising structure according to another example of the present technology.

Figure 41A:
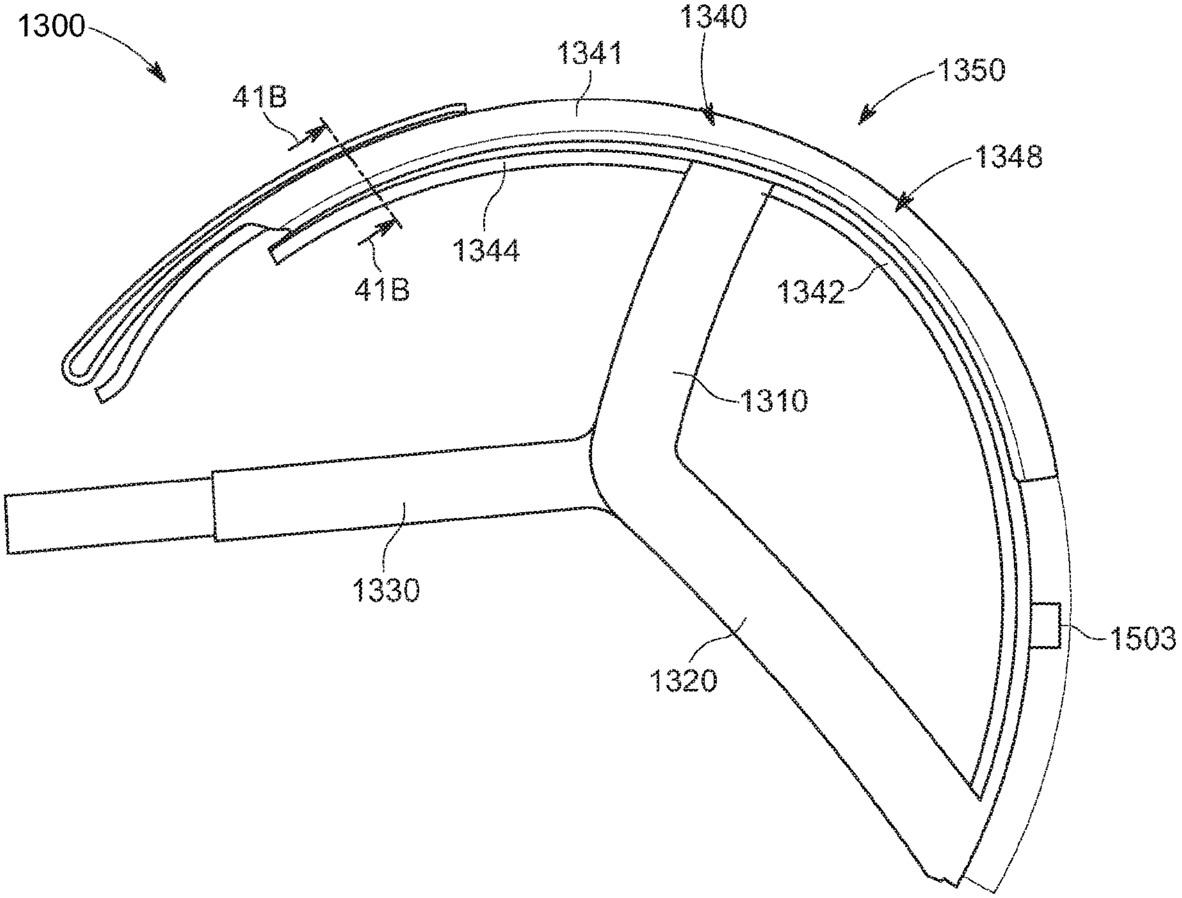
Figure 41B:
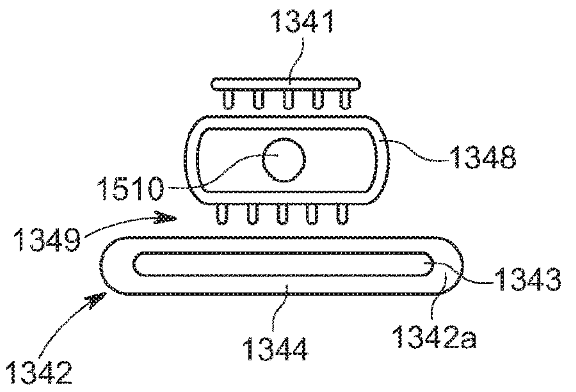

FIGS. 41A-41B show a positioning and stabilising structure according to another example of the present technology.

FIGS. 42A-42D show components of the positioning and stabilising structure show in FIGS. 41A-41B.

Figure 43A:
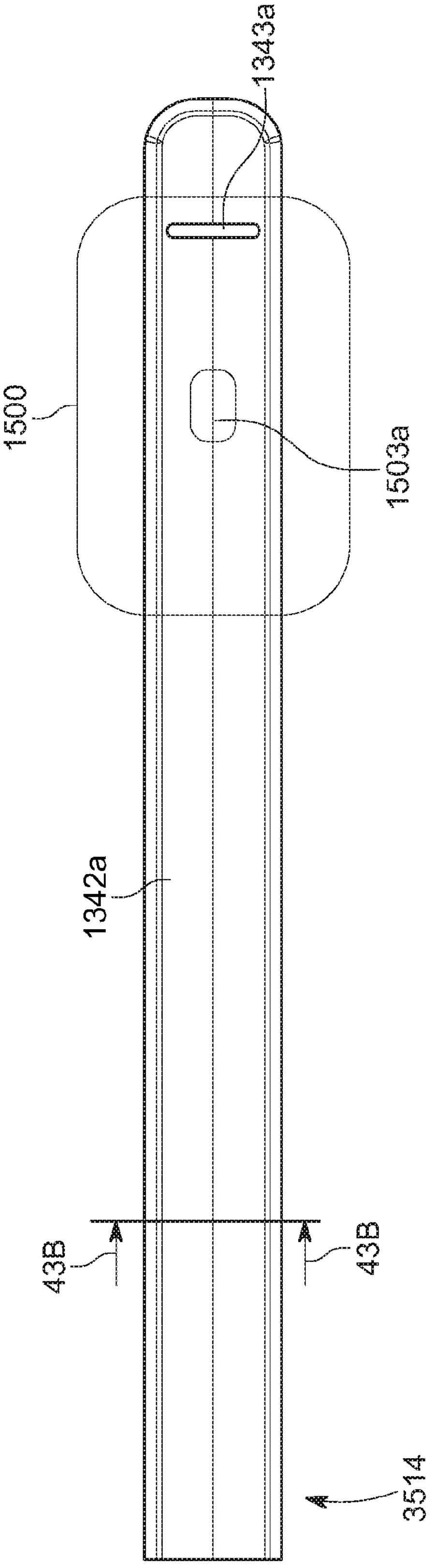
Figure 43B:
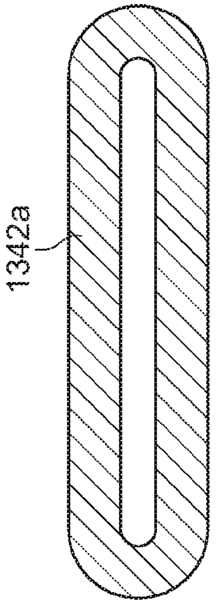
Figure 43C:
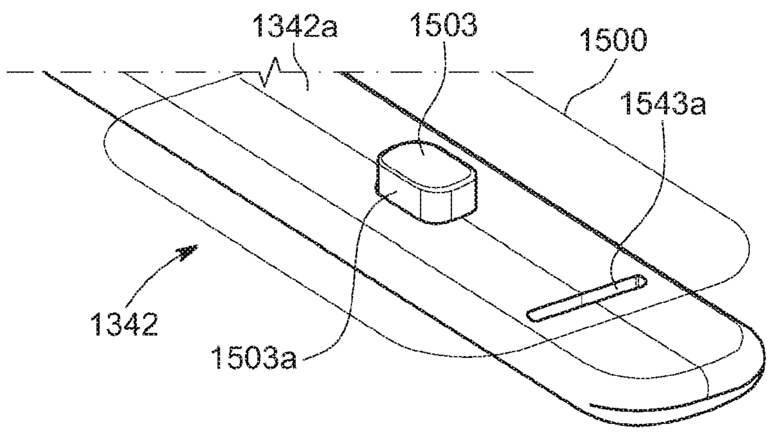

FIGS. 43A-43C show a sleeve of the positioning and stabilising structure shown in FIGS. 41A-41B.

Figure 43D:
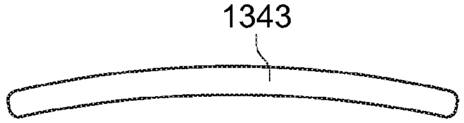

FIG. 43D is a cross section view of a substantially inextensible member according to another example of the present technology.

FIG. 44A-44D show an interfacing structure according to another example of the present technology.

Figure 45A:
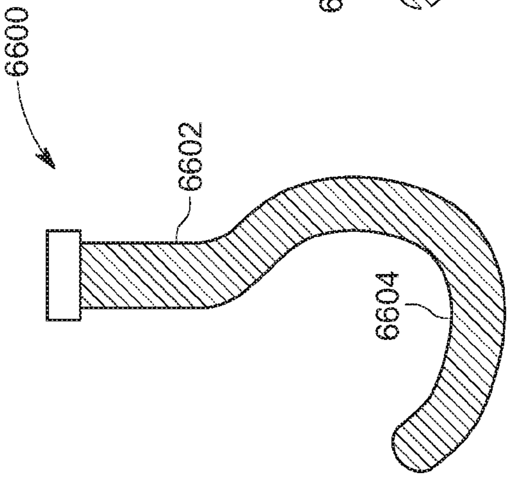
Figure 45B:
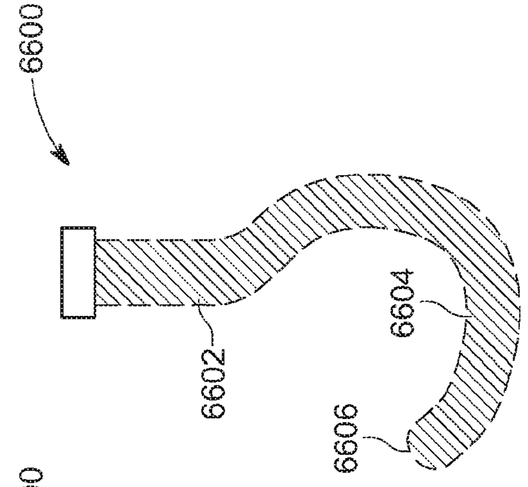

FIGS. 45A and 45B show an interfacing structure according to another example of the present technology.

Figure 46:
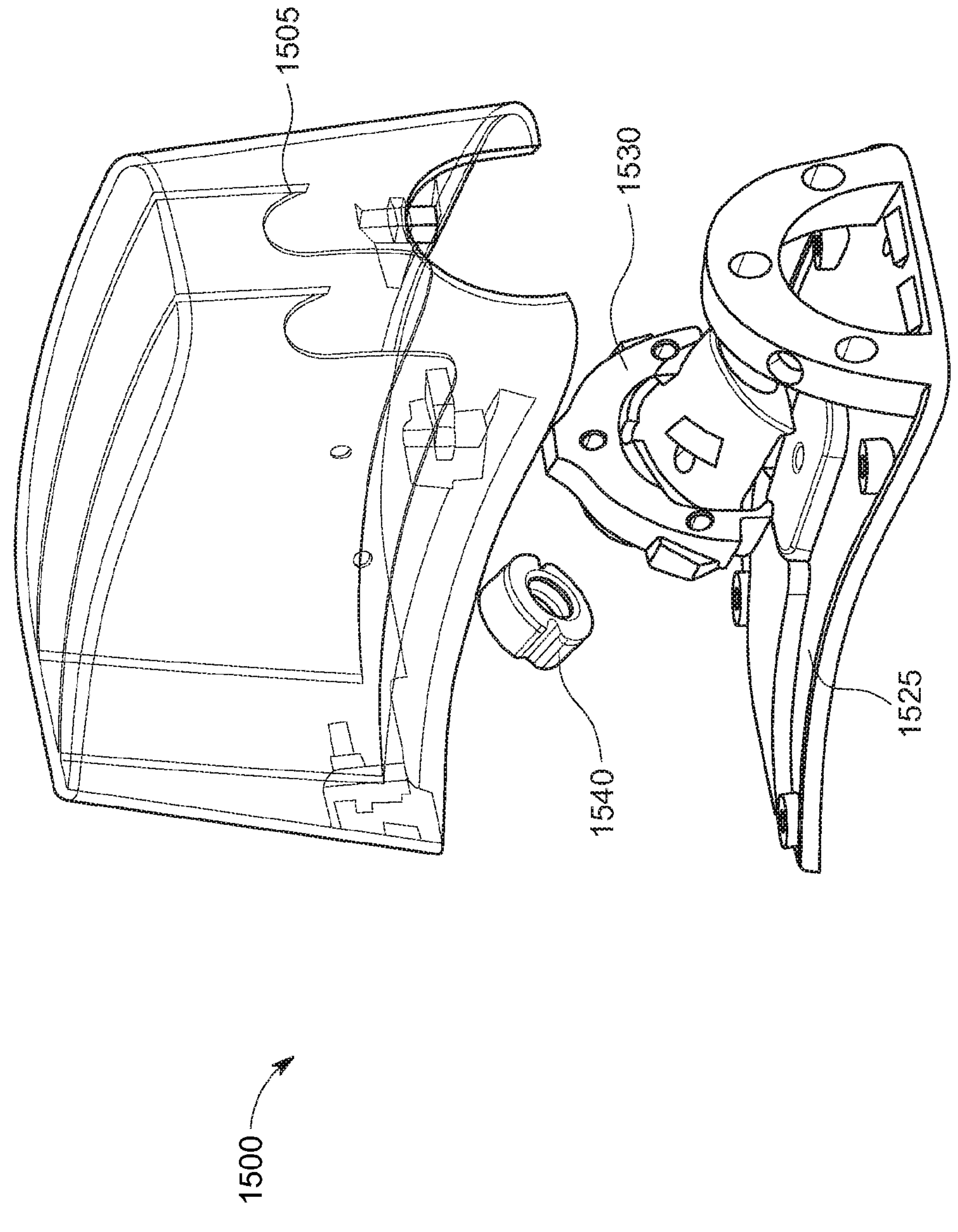

FIG. 46 shows an exploded view of a battery pack according to an example of the present technology.

Figure 47A:
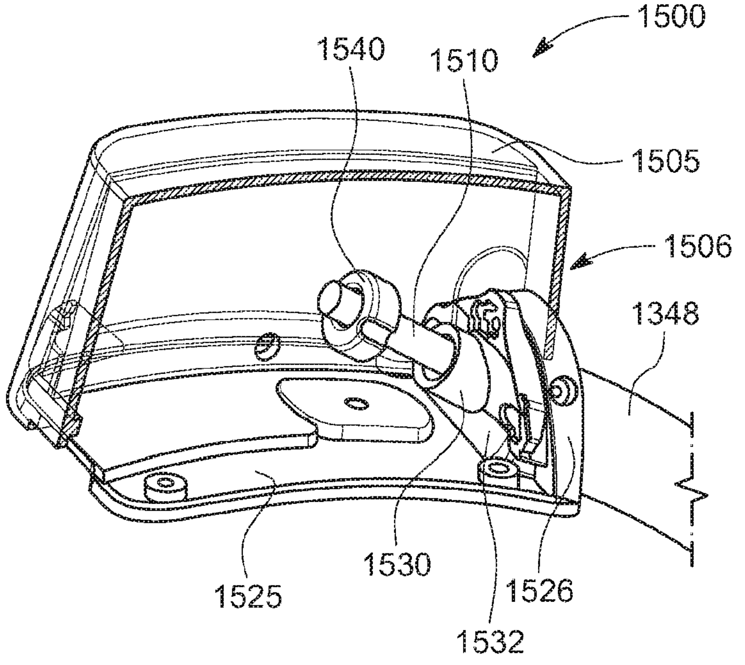
Figure 47B:
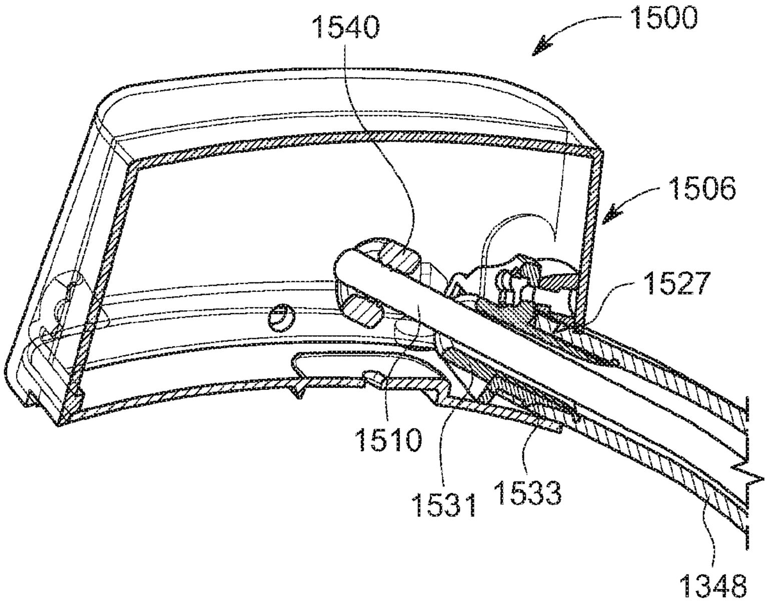

FIGS. 47A and 47B show internal views of the battery pack shown in FIG. 67.

Figure 48B:
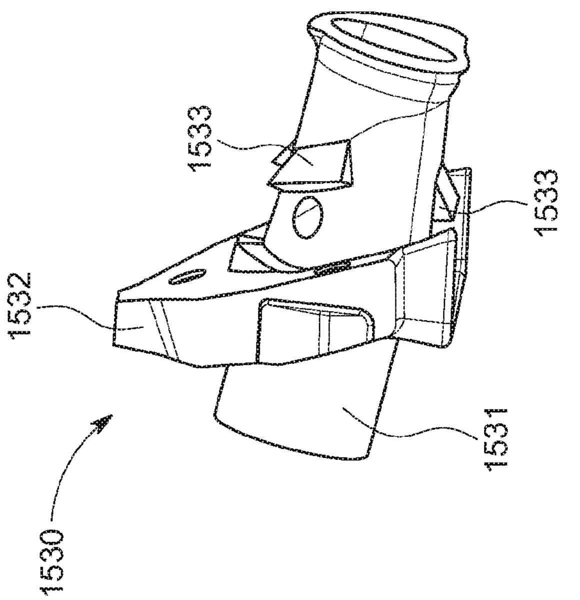
Figure 48A:
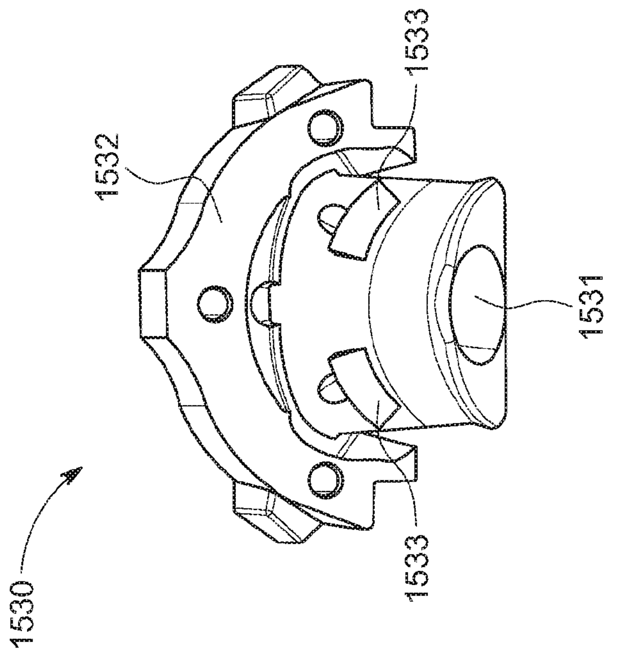

FIGS. 48A and 48B show a cable guide of the battery pack shown in FIG. 67.

Figure 49B:
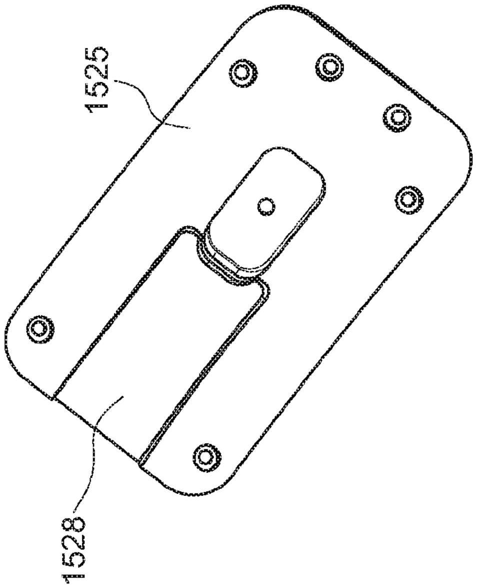
Figure 49A:
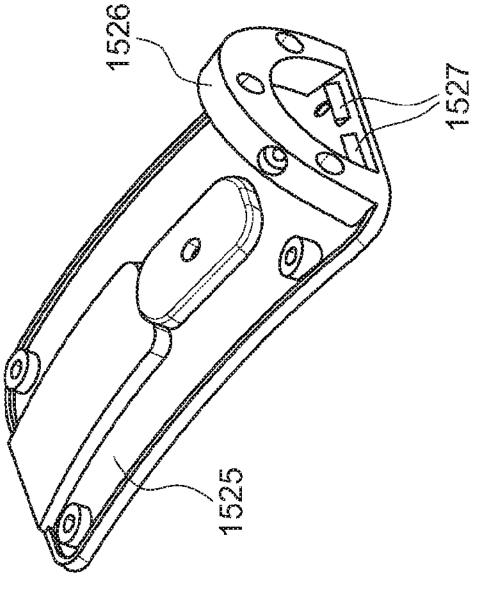

FIGS. 49A and 49B show a mounting portion of the battery pack shown in FIG. 46.

Figure 50:
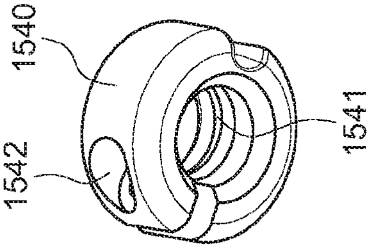

FIG. 50 shows a cable stop of the battery pack shown in FIG. 46.

FIGS. 51A-51D show a housing of the battery pack shown in FIG. 46

Figure 52B:
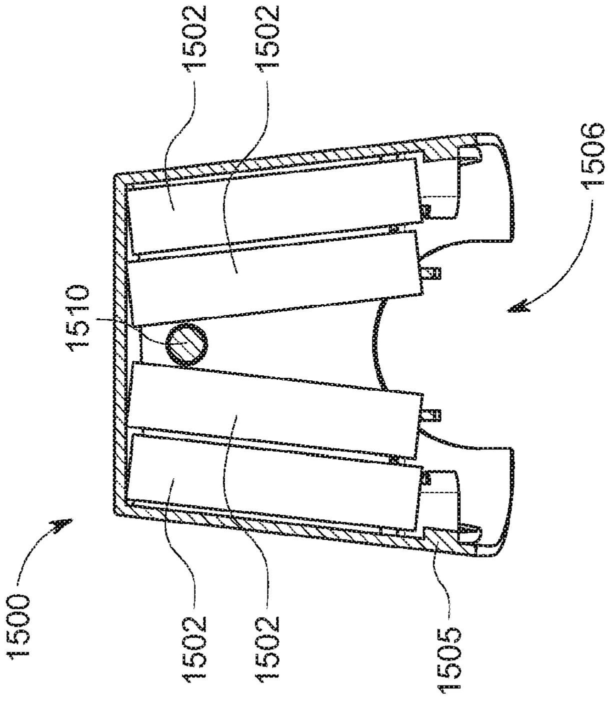
Figure 52A:
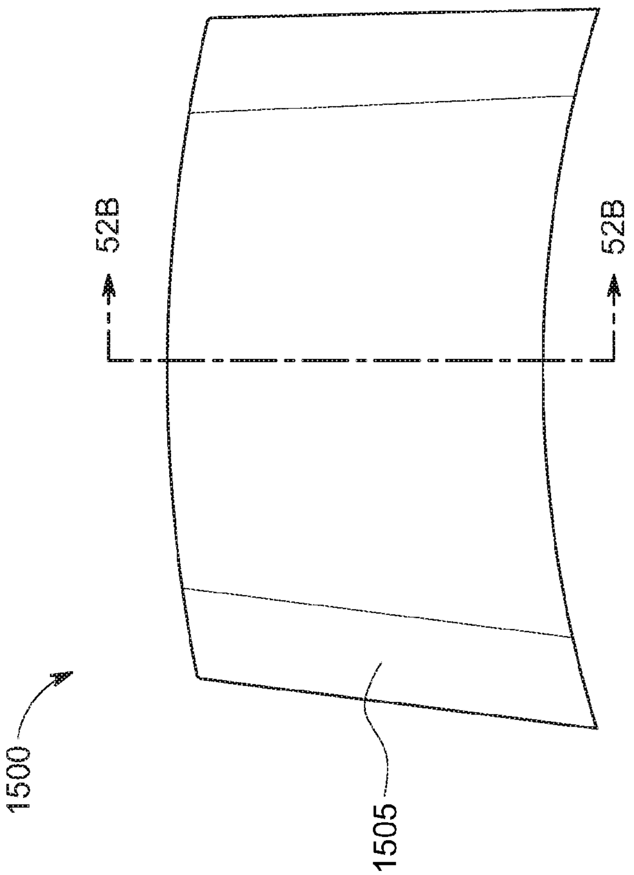

FIGS. 52A and 52B show a housing for a battery pack according to another example of the present technology.

FIGS. 53A-53G show internal views of battery packs according to further examples of the present technology.

Figure 54:
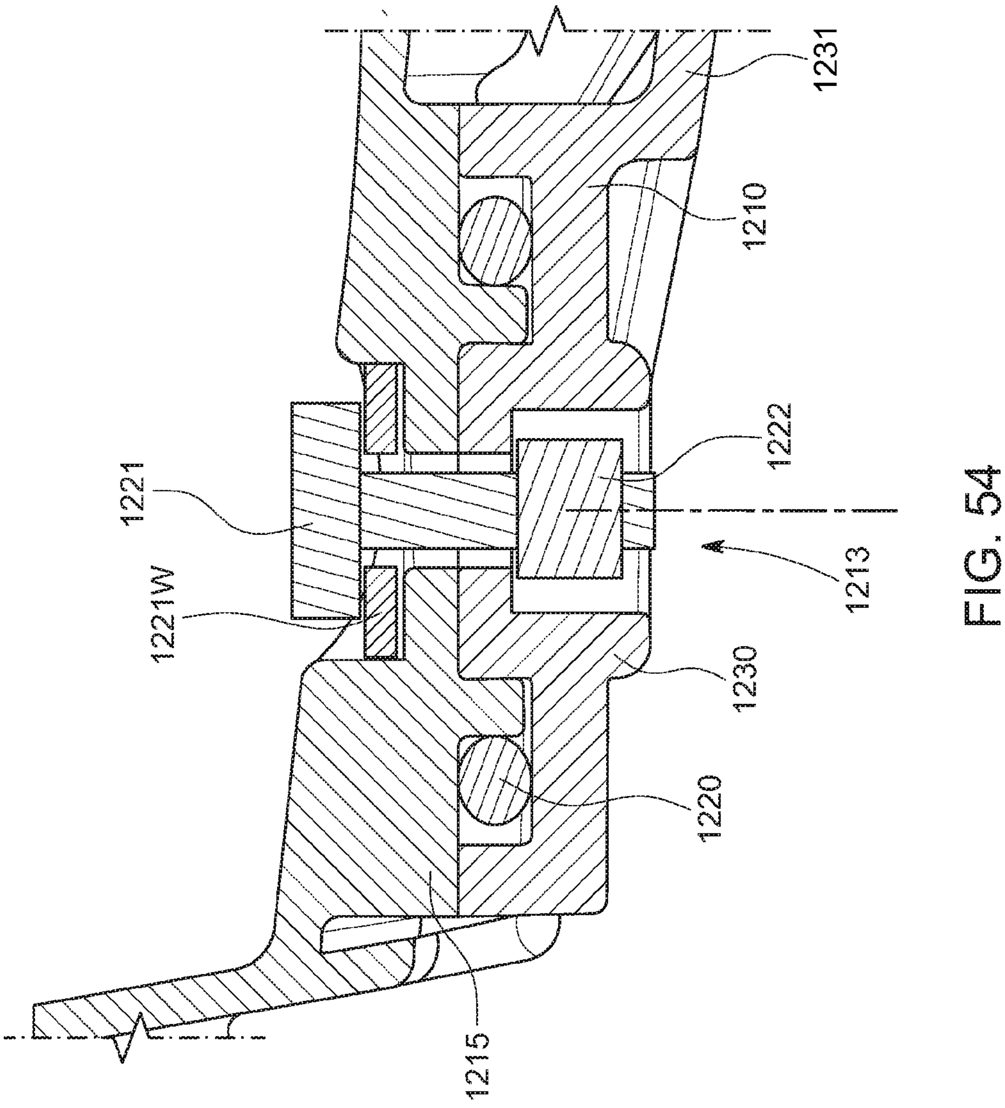

FIG. 54 shows a cross section view of a side arm joint according to another example of the present technology.

Figure 55A:
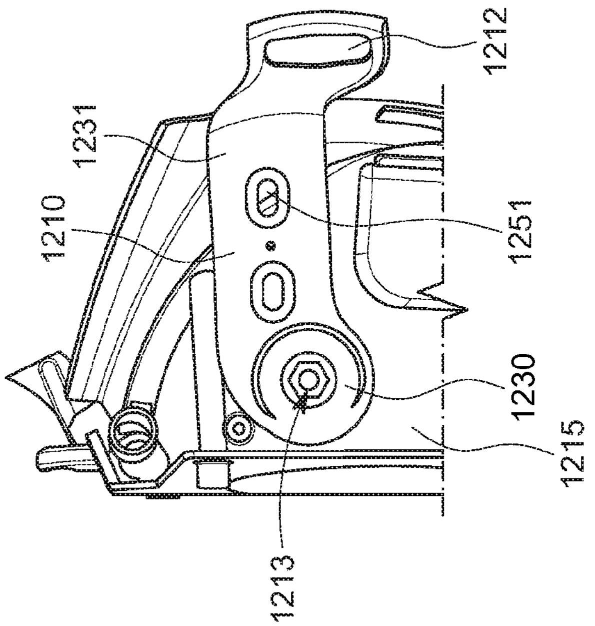
Figure 55B:
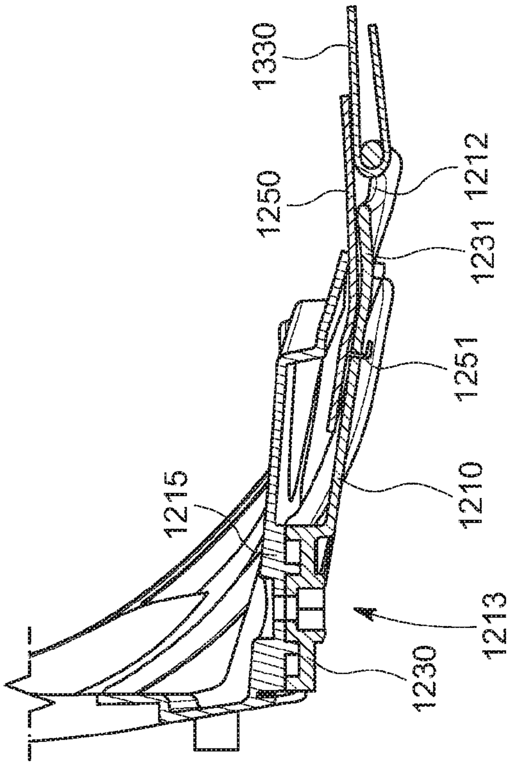
Figure 55C:
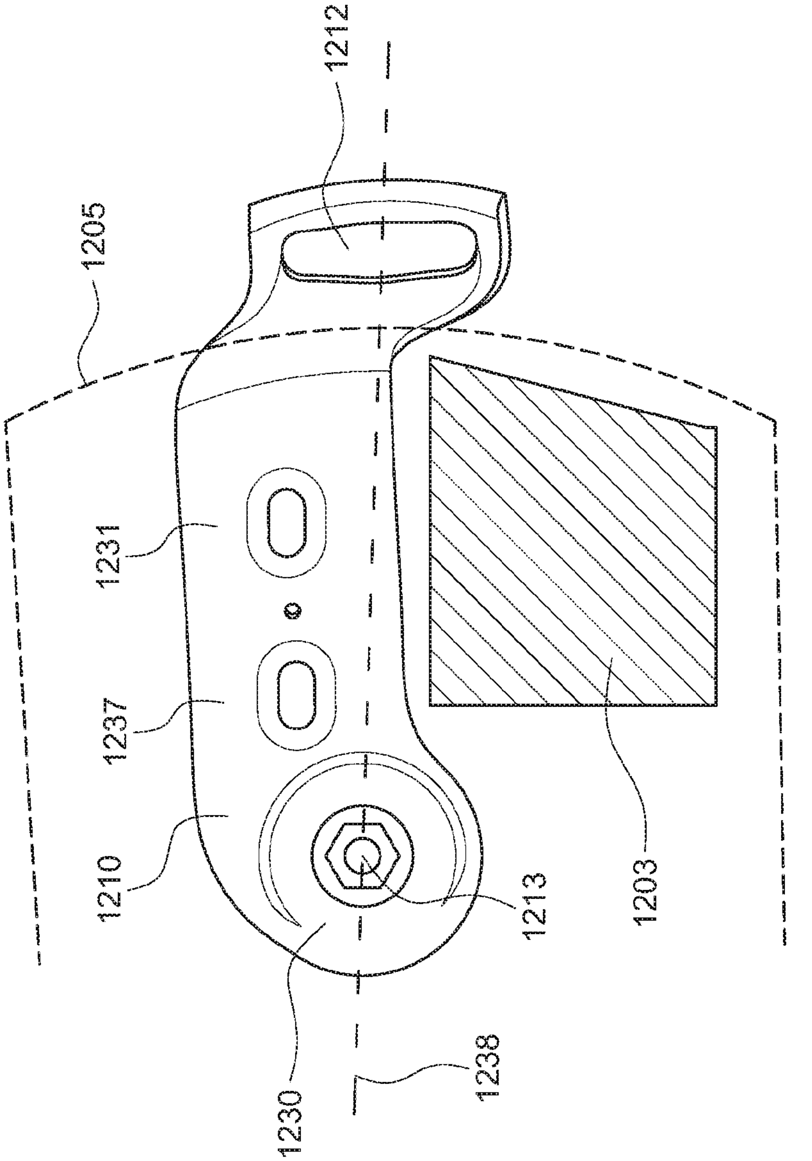

FIGS. 55A-55C show views of portions of a head-mounted display unit according to another example of the present technology.

Figure 56C:
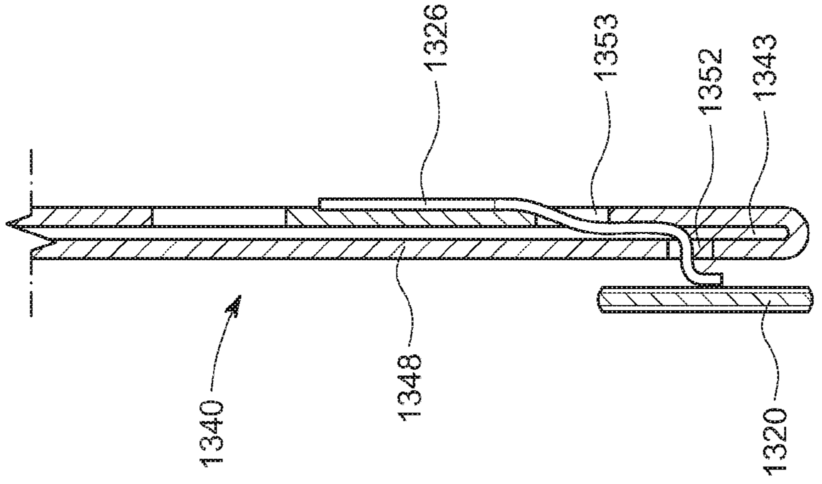
Figure 56B:
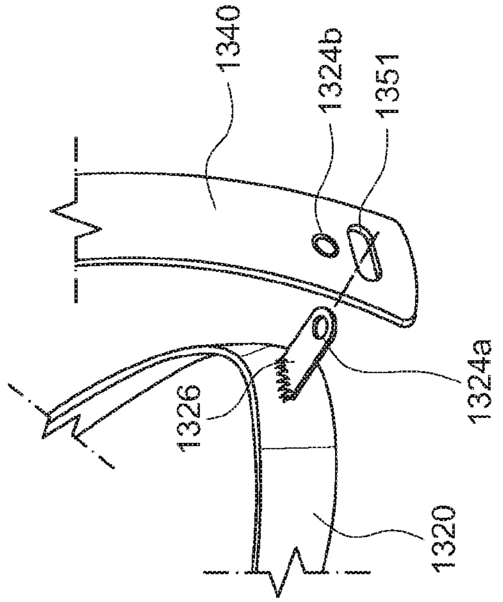
Figure 56A:
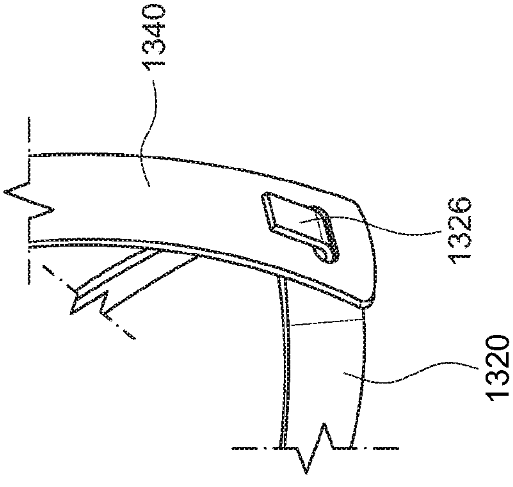

FIGS. 56A-56B show a connection between an occipital strap portion and a top strap portion according to another example of the present technology.

FIG. 56C shows a connection between an occipital strap portion and a top strap portion according to yet another example of the present technology.

Figure 57:
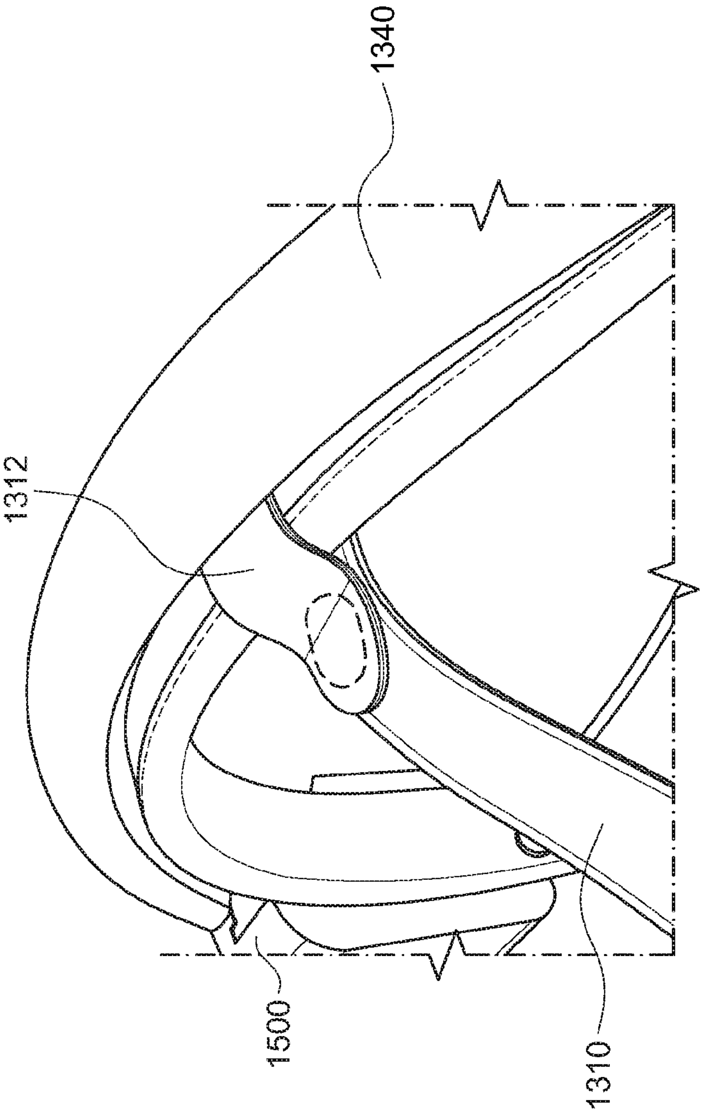

FIG. 57 shows a buckle according to another example of the present technology.

Figure 58A:
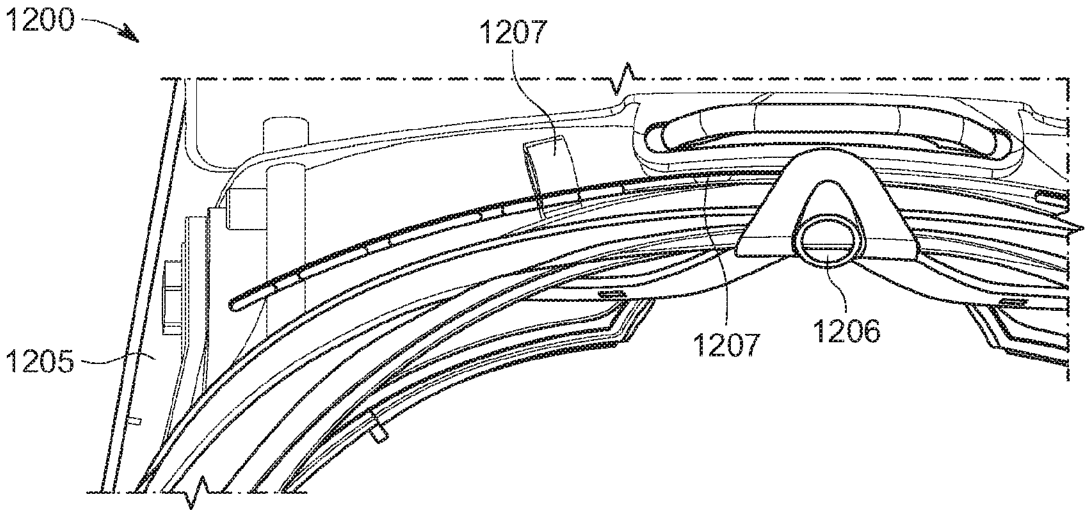
Figure 58B:
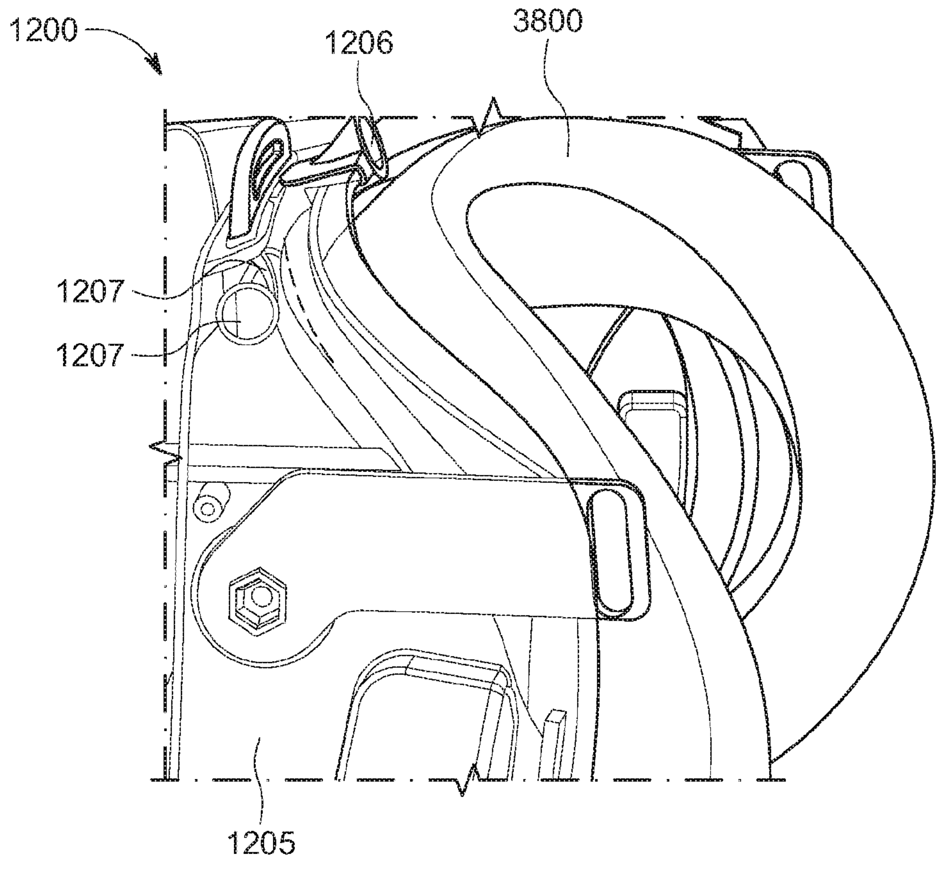

FIGS. 58A and 58B show views of portions of a head mounted display unit according to another example of the present technology.

FIGS. 59A-59H show views of portions of a head mounted display unit according to another example of the present technology.

FIGS. 60A-60H show views of a chassis of an interfacing structure according to another example of the present technology.

FIGS. 61A-61G show views of portions of a head mounted display unit according to another example of the present technology.

Figure 62A:
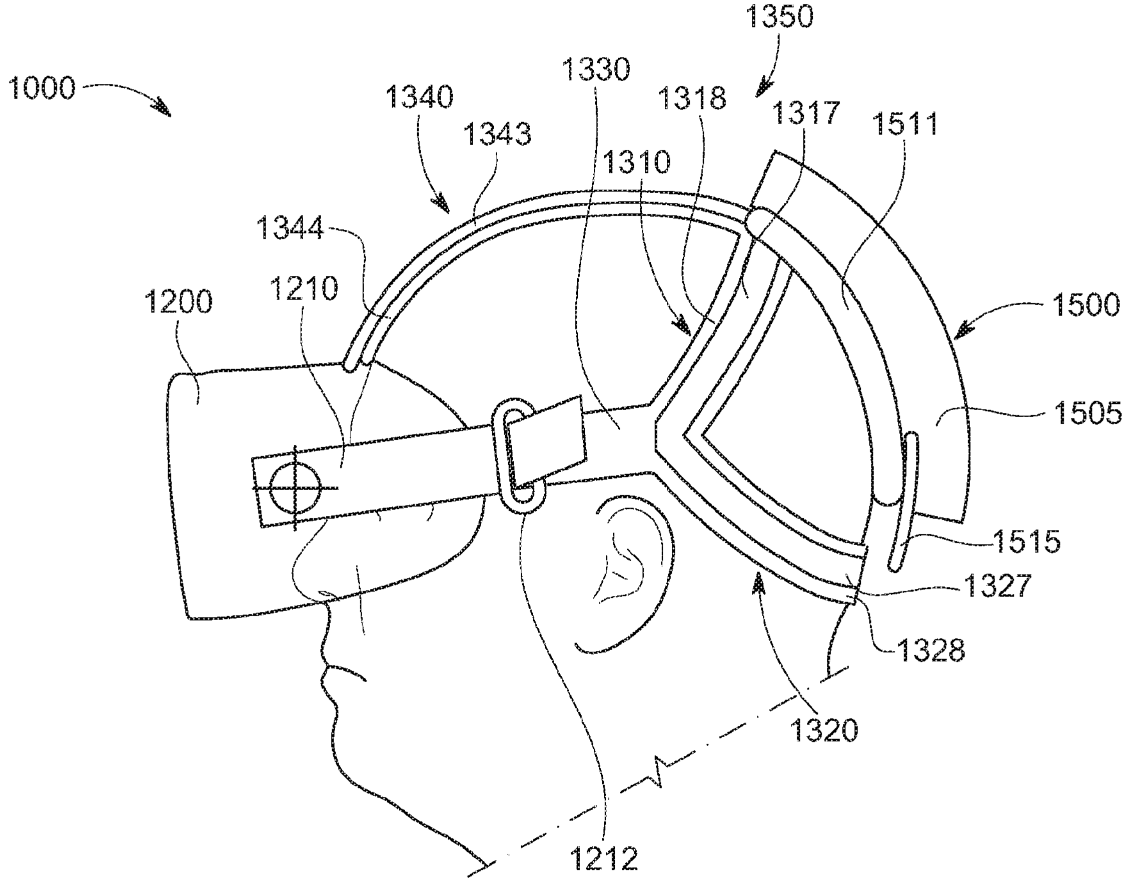
Figure 62B:
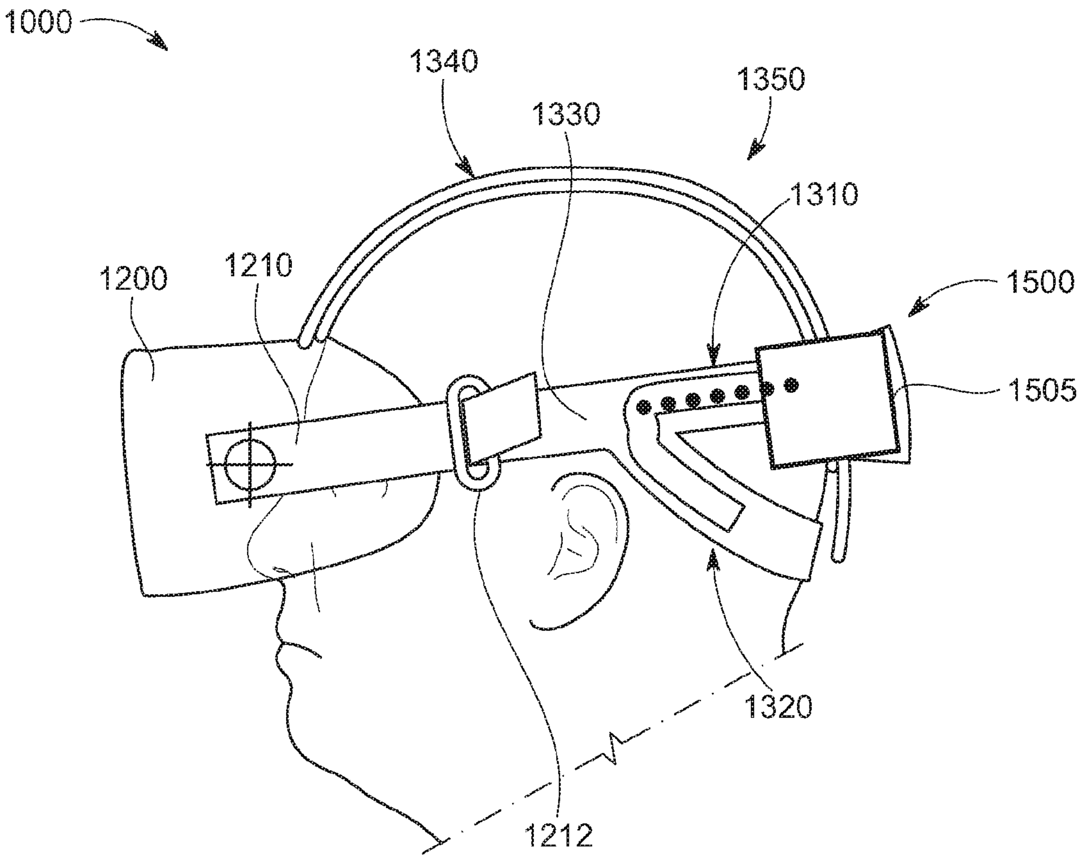
Figure 62C:
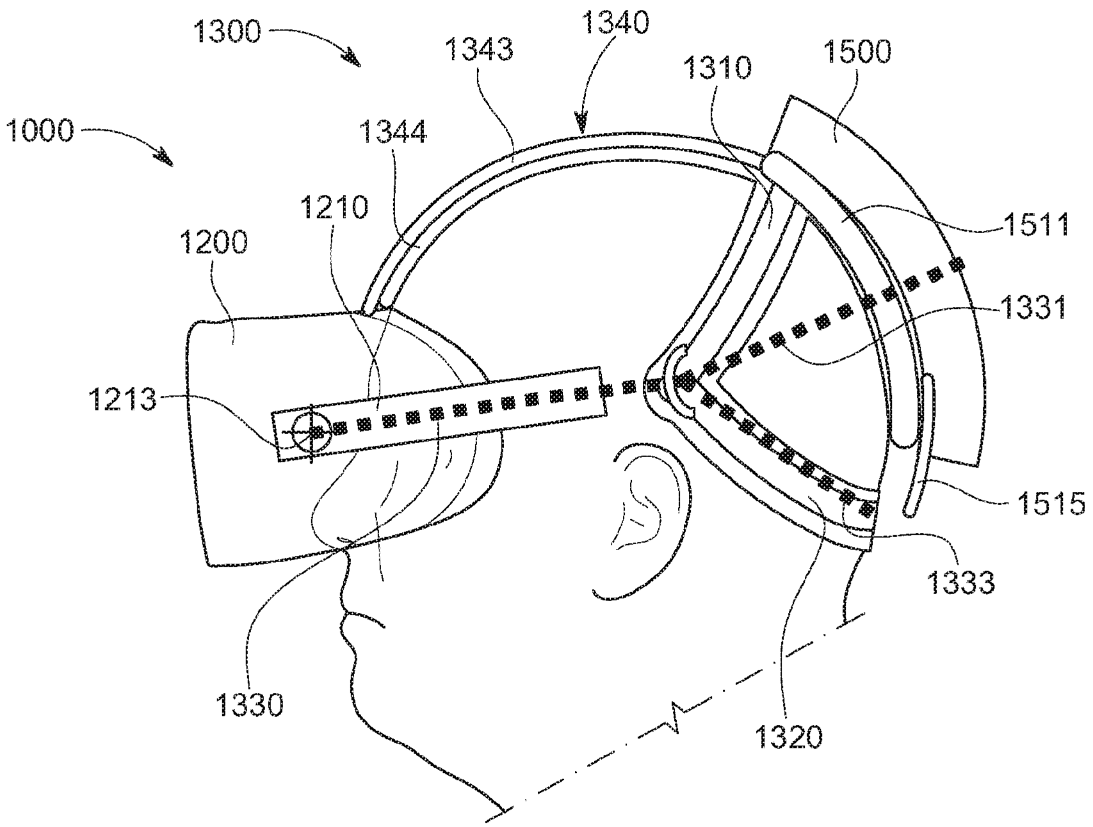

FIGS. 62A-62C show head-mounted display systems according to further examples of the present technology.

Figure 63:
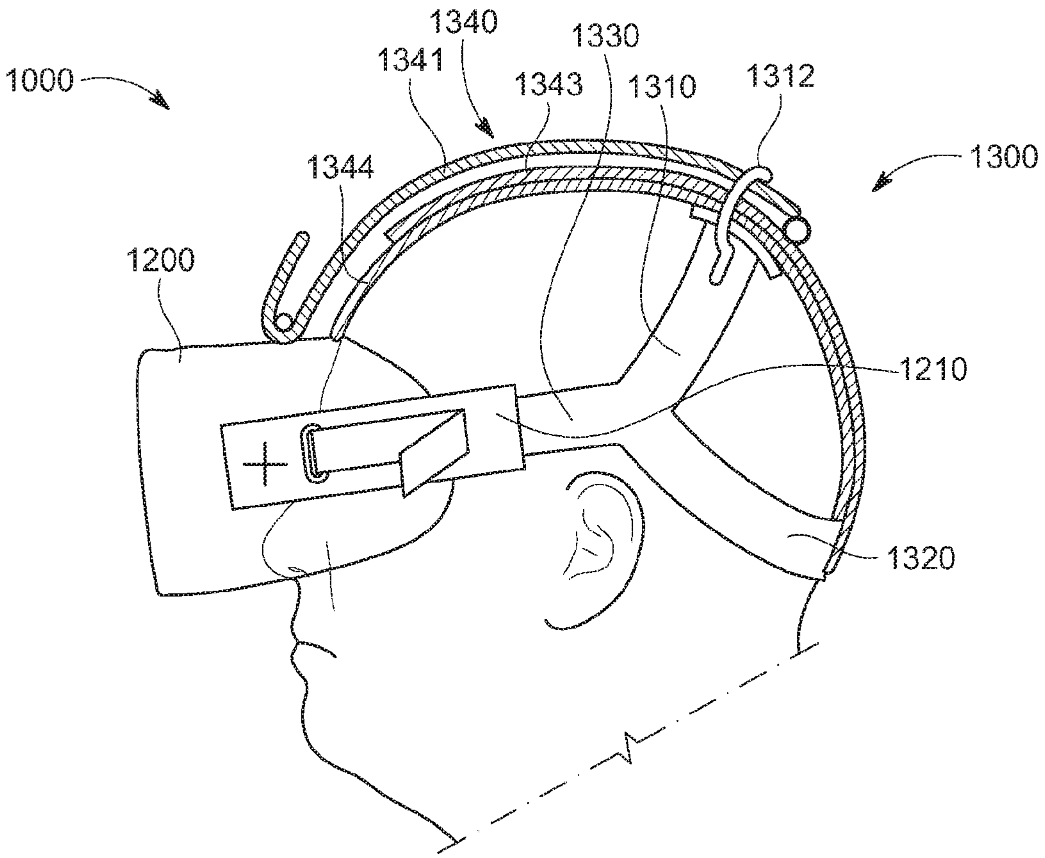

FIG. 63 shows a head-mounted display system according to a further example of the present technology.

Figure 64A:
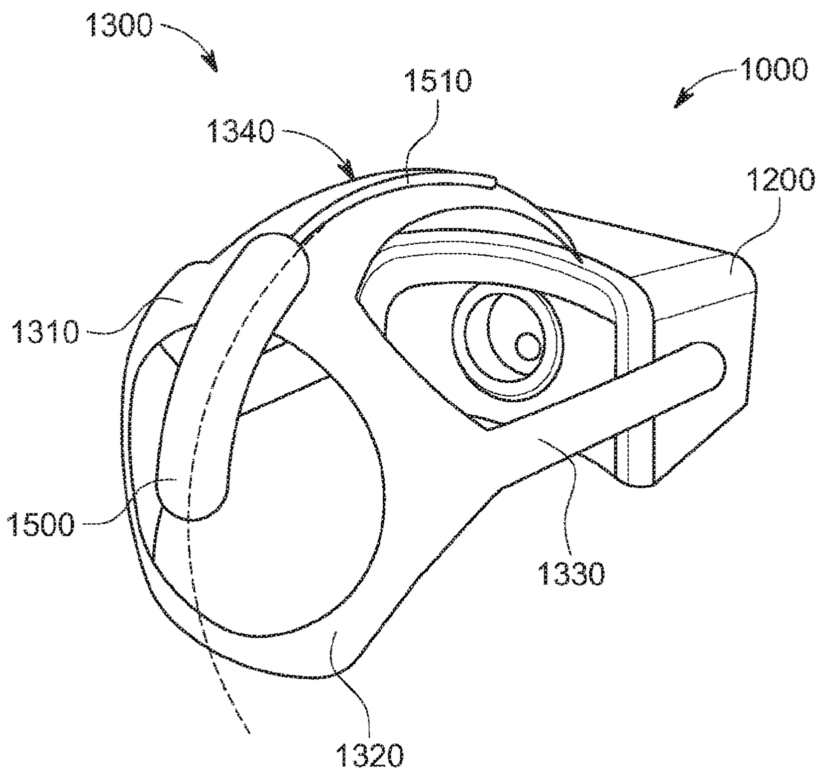
Figure 64B:
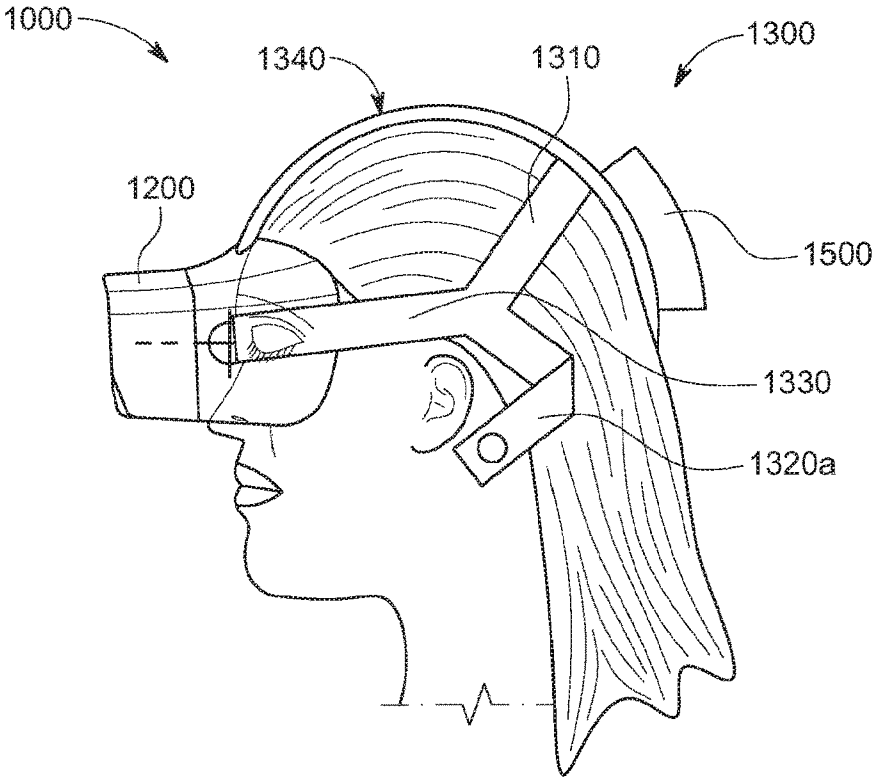

FIG. 64A shows a head-mounted display system according to a further example of the present technology, FIG. 64B shows a head-mounted display system according to a further example of the present technology.

Figure 64C:
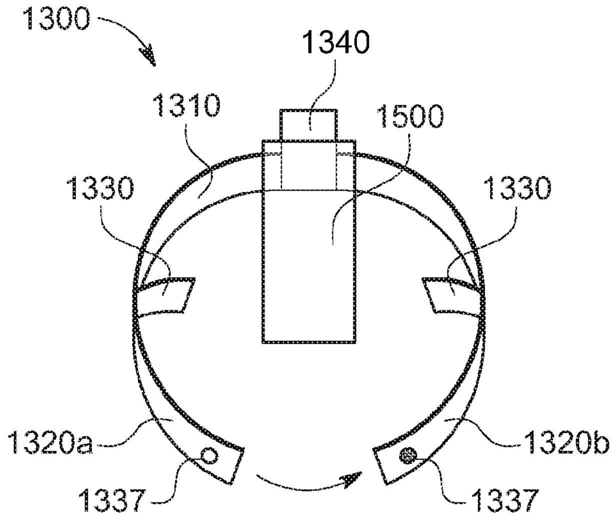

FIG. 64C shows a positioning and stabilising structure of the head-mounted display system of FIG. 64B in isolation.

Figure 64D:
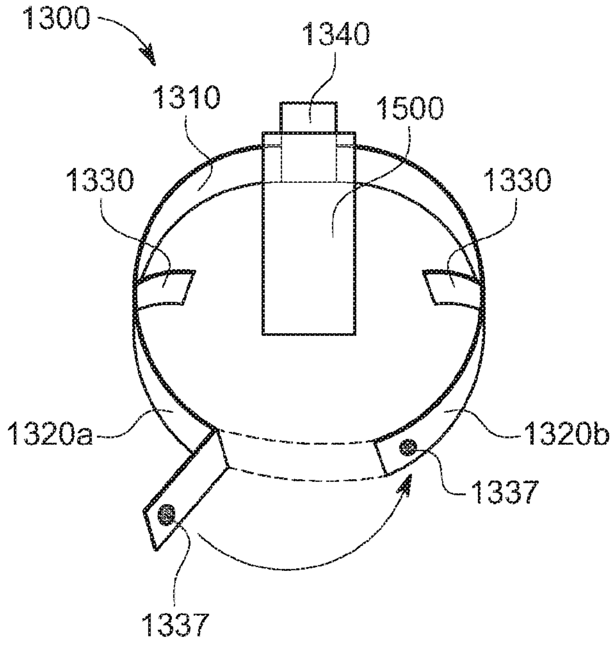

FIG. 64D shows a positioning and stabilising structure according to a further example of the present technology.

Figure 64E:
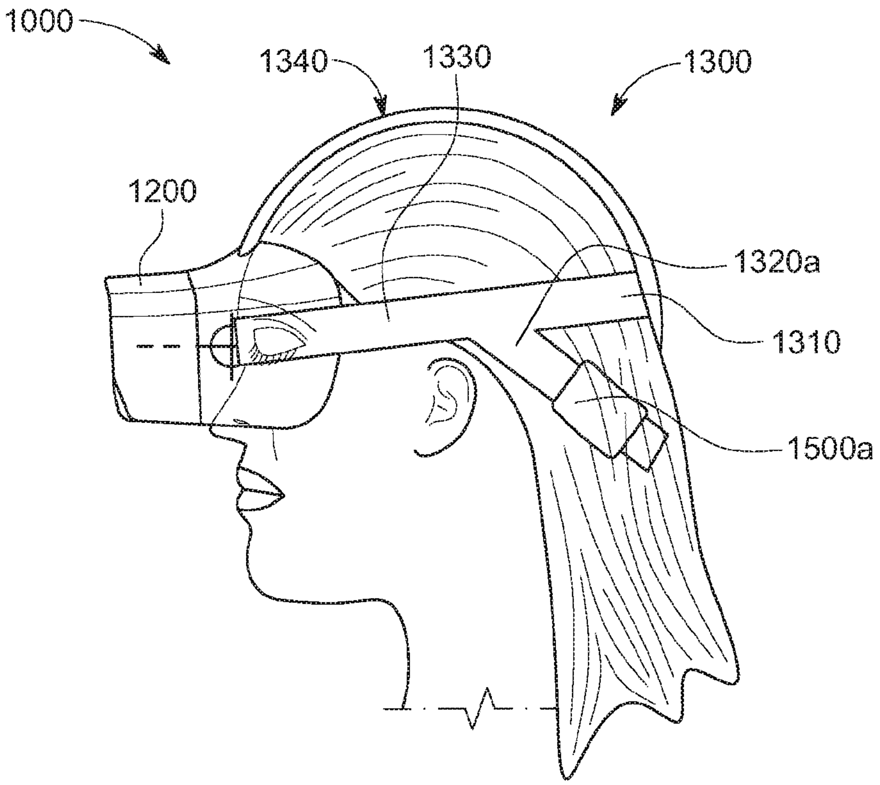

FIG. 64E shows a head-mounted display system according to a further example of the present technology.

Figure 64F:
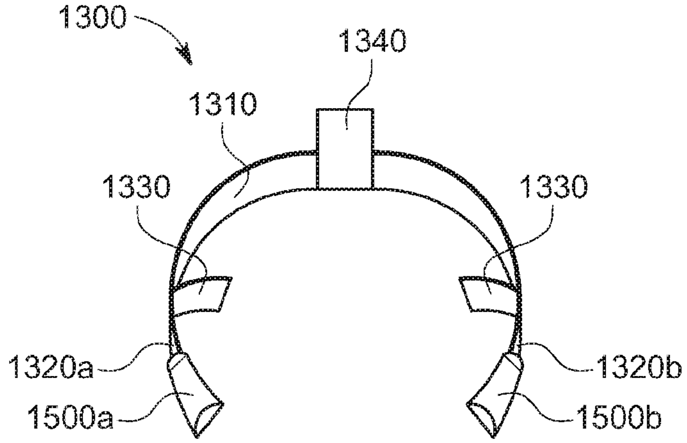

FIG. 64F shows a positioning and stabilising structure of the head-mounted display system of FIG. 64E in isolation.

Figure 64G:
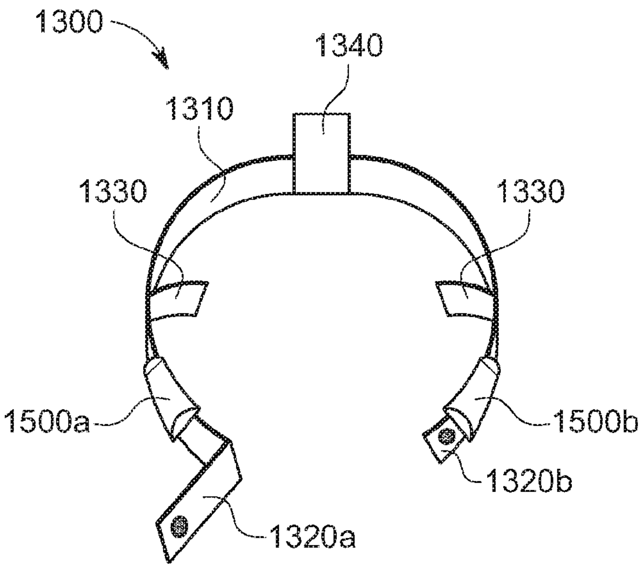

FIG. 64G shows a positioning and stabilising structure according to a further example of the present technology.

Figure 65A:
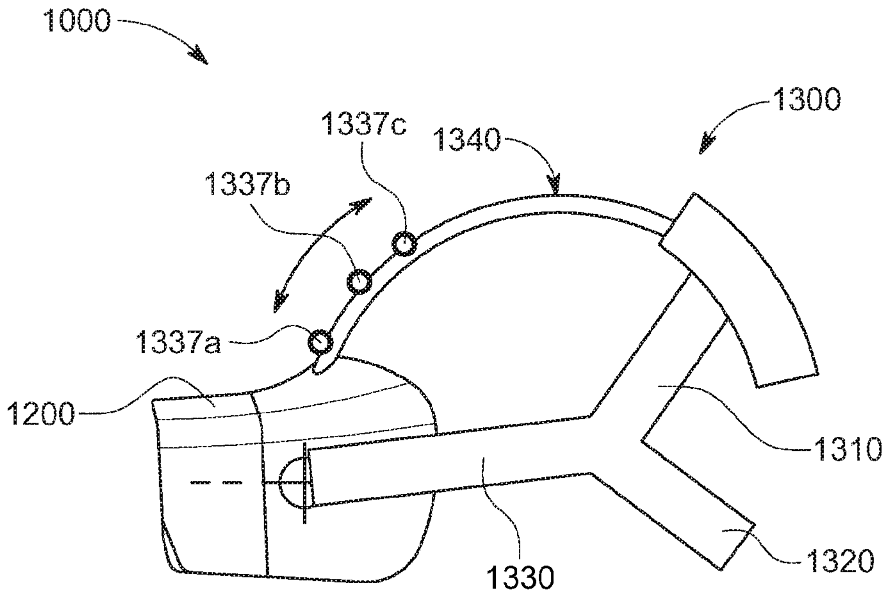
Figure 65B:
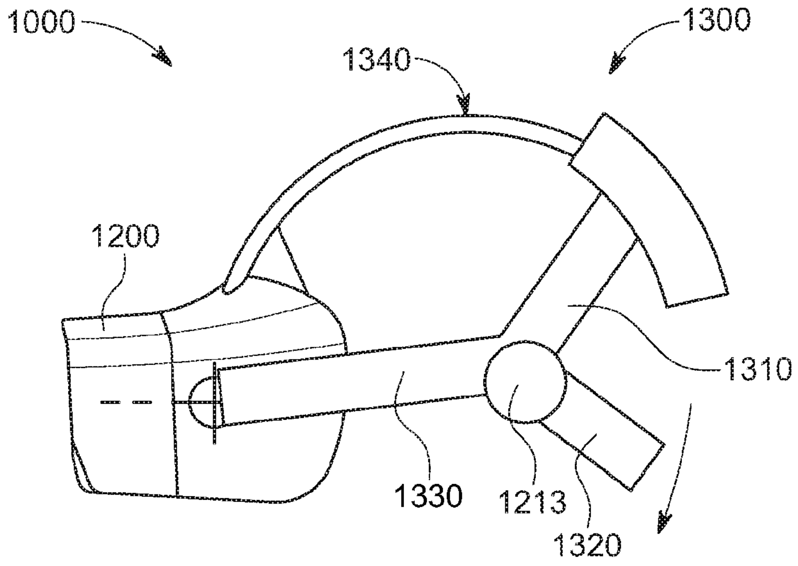

FIGS. 65A and 65B show head-mounted display systems according to further examples of the present technology.

Figure 66:
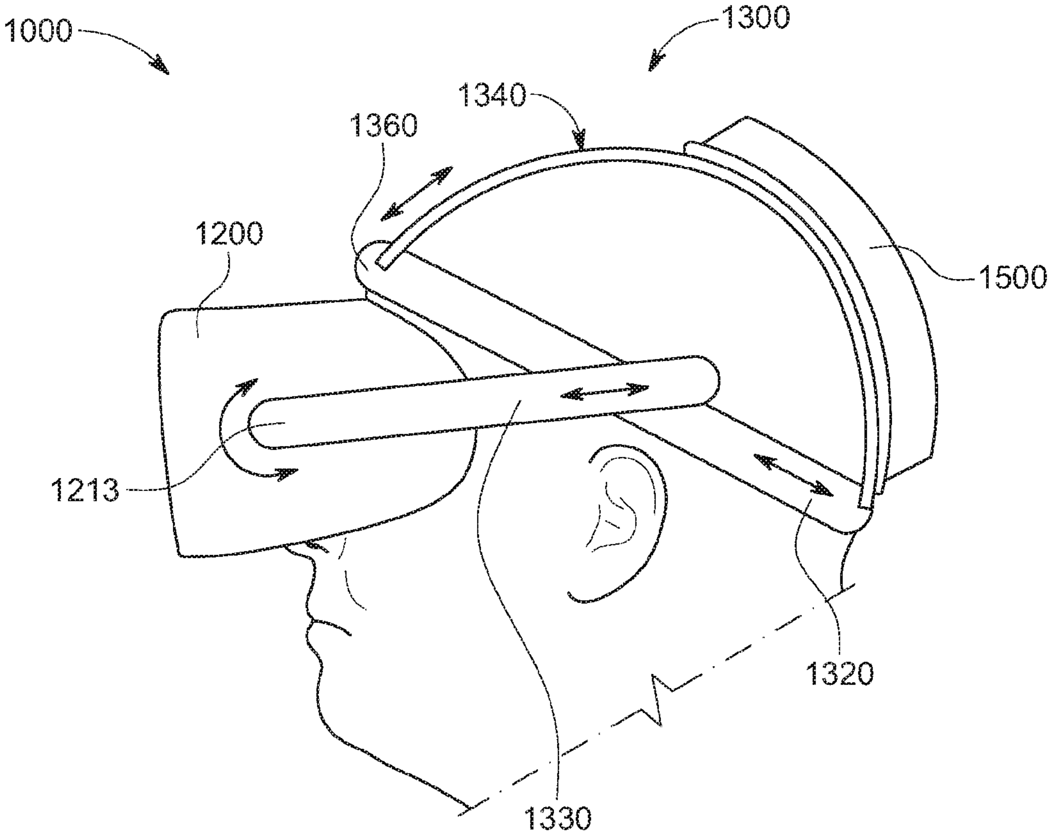

FIG. 66 shows a head-mounted display system according to another example of the present technology.

Figure 67A:
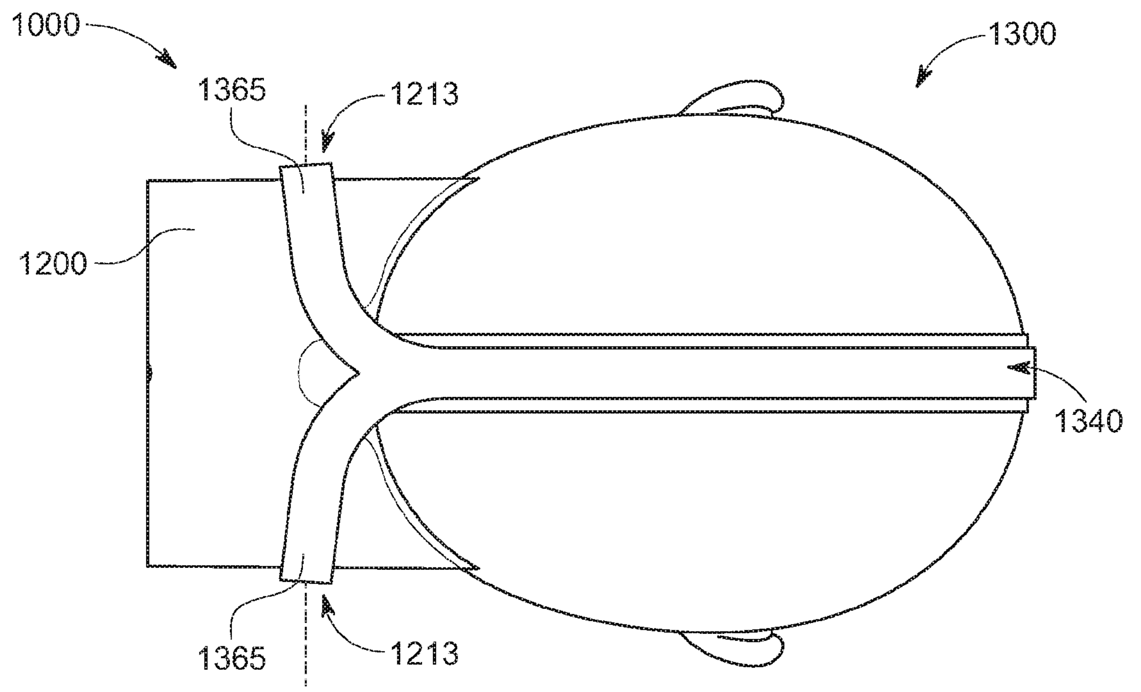
Figure 67B:
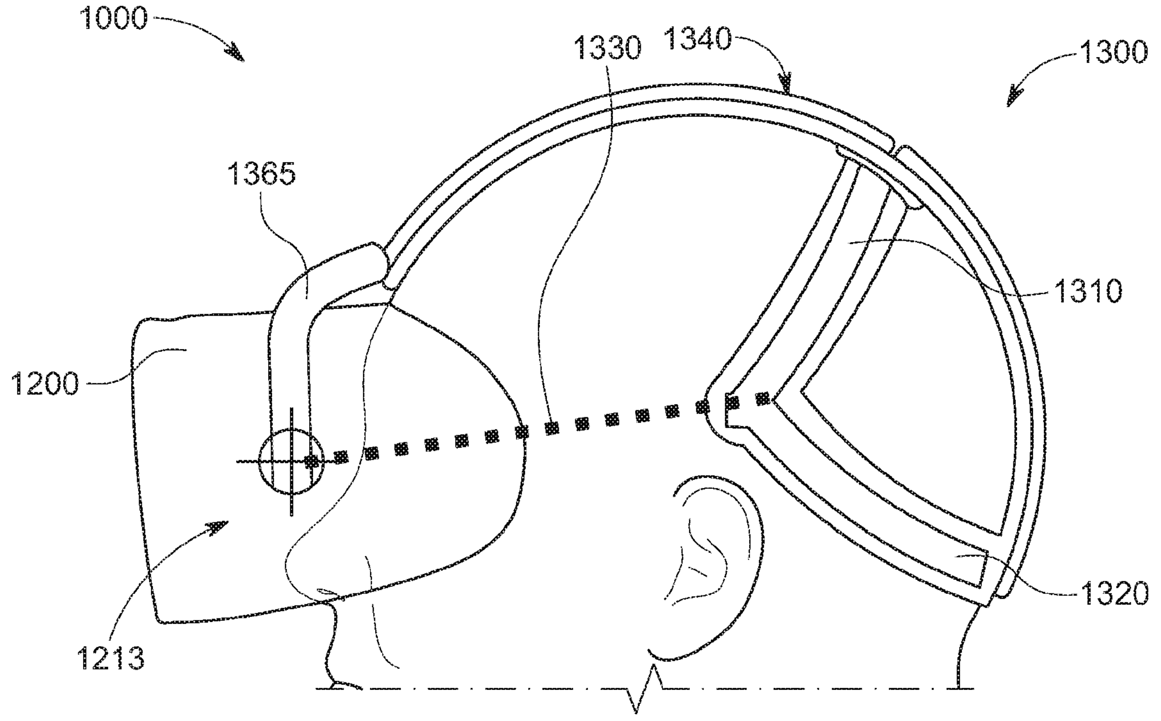

FIGS. 67A and 67B show a head-mounted display system according to another example of the present technology.

Figure 68A:
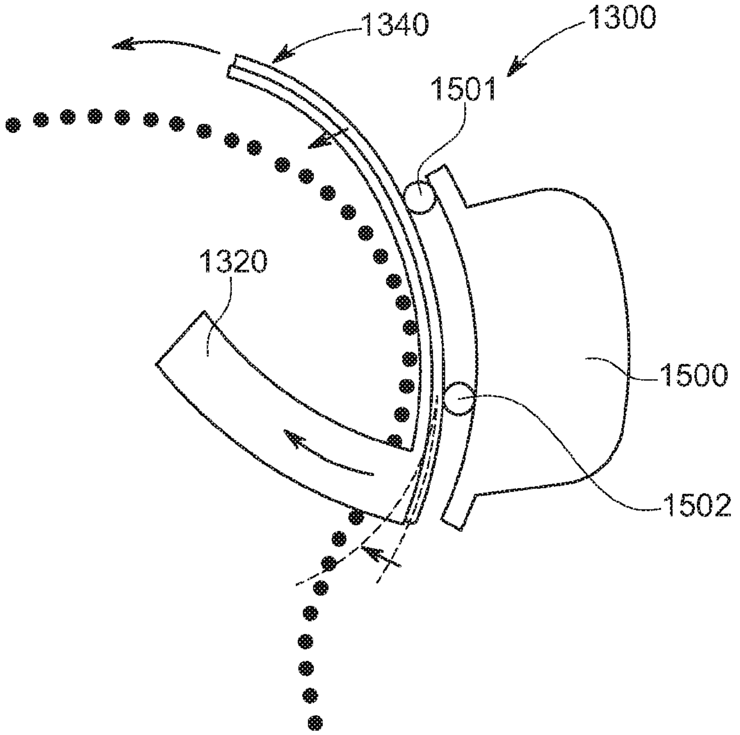
Figure 68B:
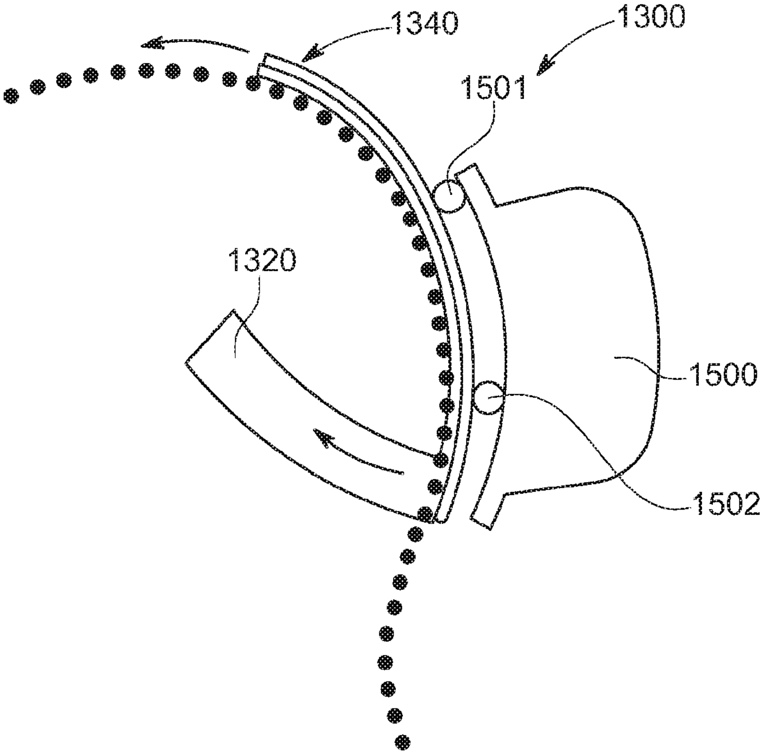

FIGS. 68A and 68B show a positioning and stabilising structure according to a further example of the present technology.

Figure 68C:
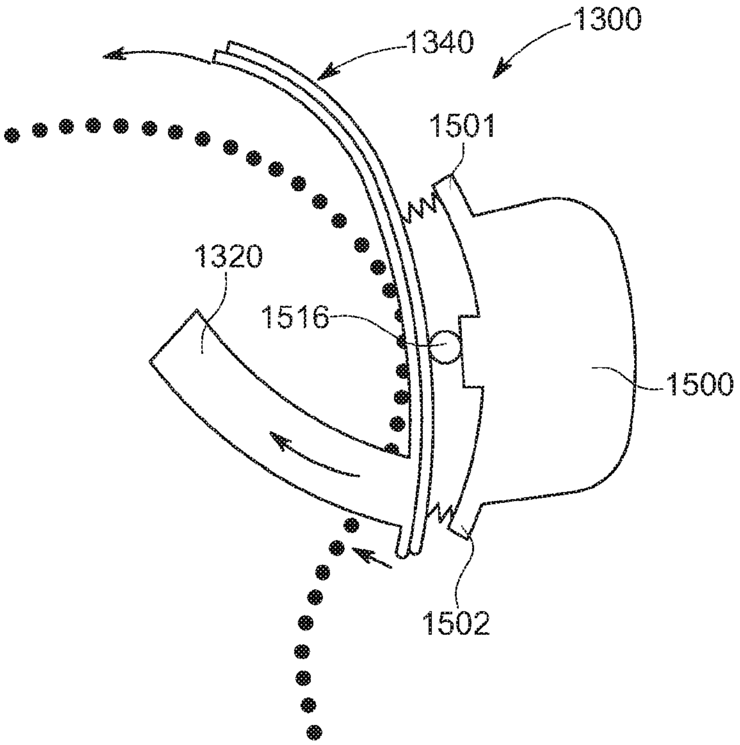
Figure 68D:
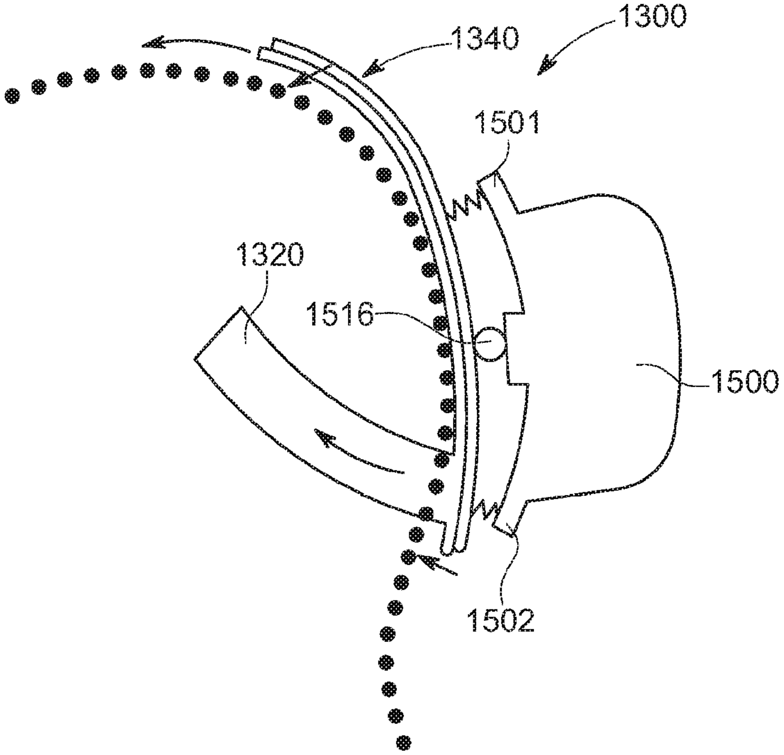

FIGS. 68C and 68D show a positioning and stabilising structure according to a further example of the present technology.

Figure 69A:
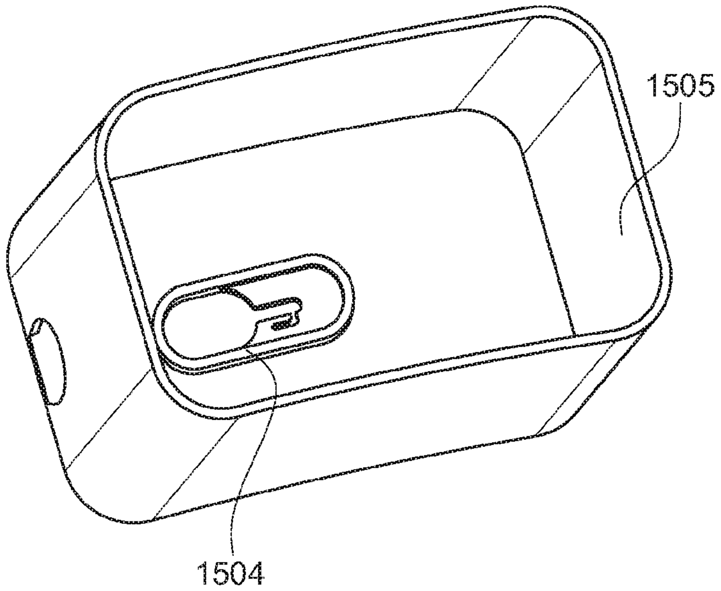
Figure 69B:
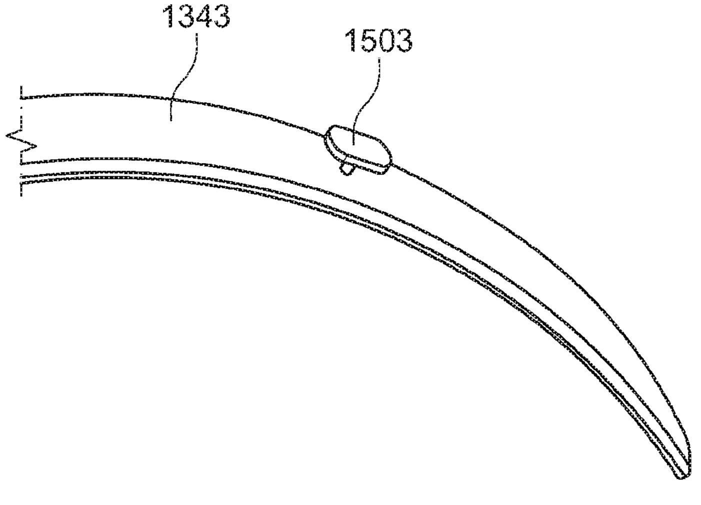

FIGS. 69A and 69B show a connection between a substantially inextensible layer of a top strap portion and a battery pack housing in a further example of the present technology.

Figure 70A:
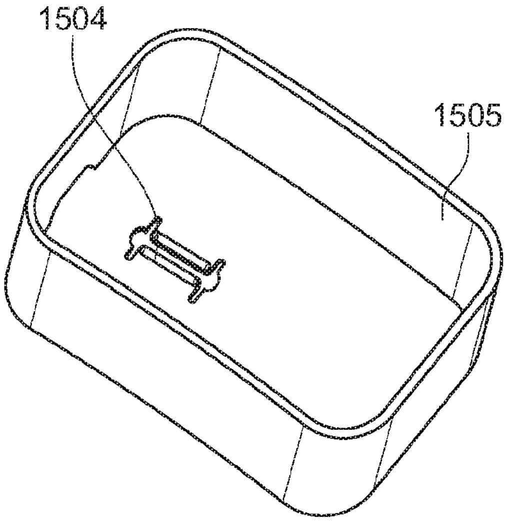
Figure 70B:
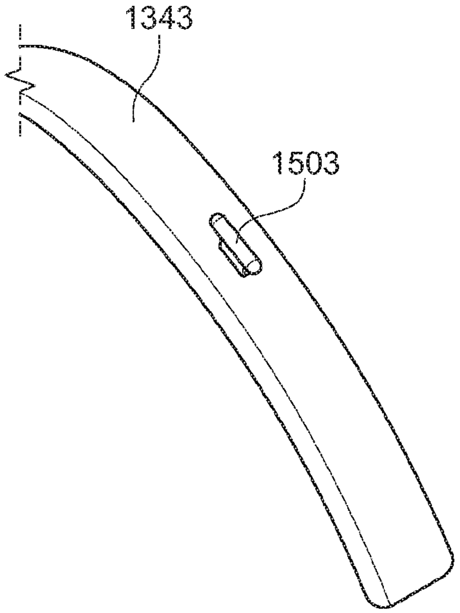

FIGS. 70A and 70B show a connection between a substantially inextensible layer of a top strap portion and a battery pack housing in a further example of the present technology.

Figure 71A:
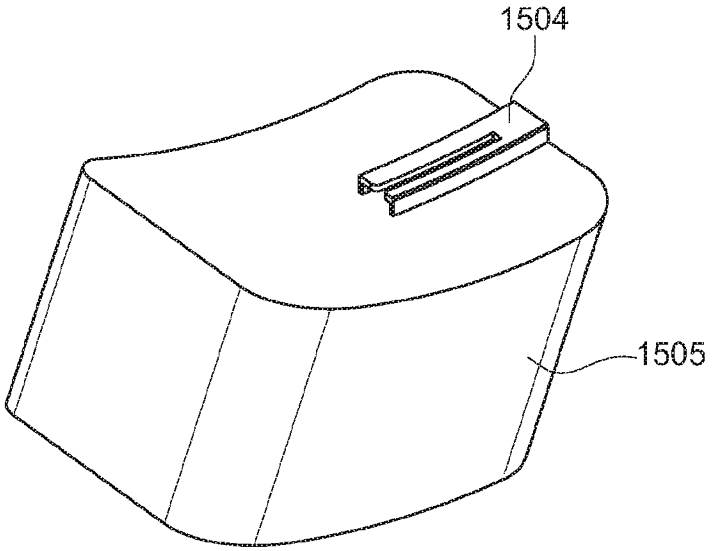
Figure 71B:
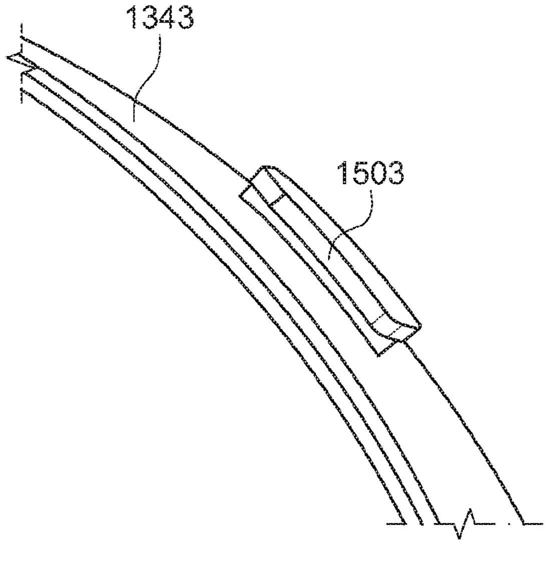

FIGS. 71A and 71B show a connection between a substantially inextensible layer of a top strap portion and a battery pack housing in a further example of the present technology.

Figure 72A:
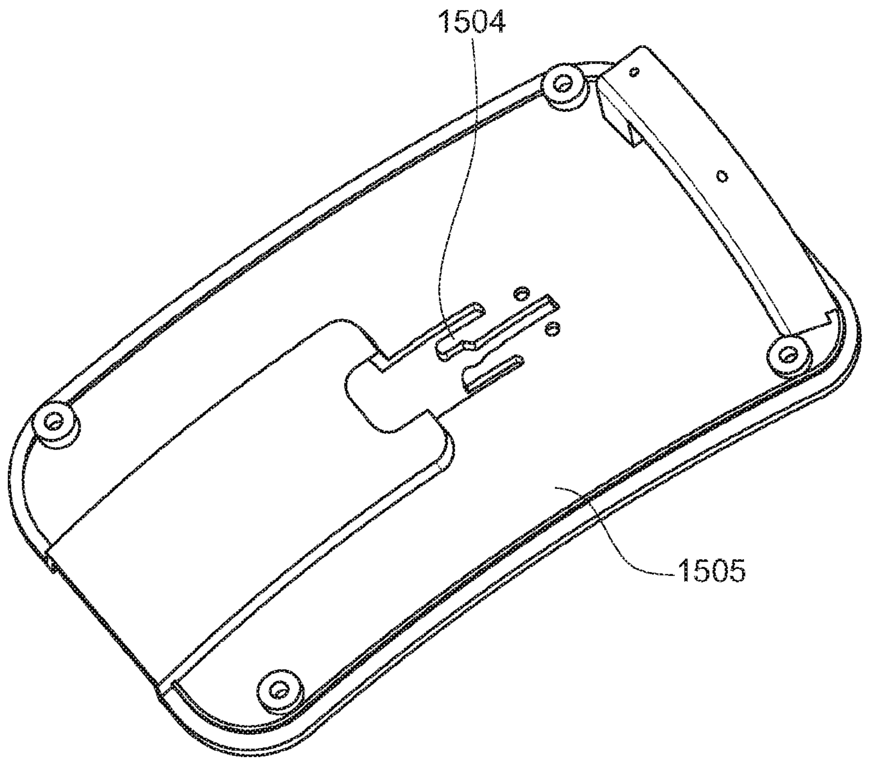
Figure 72B:
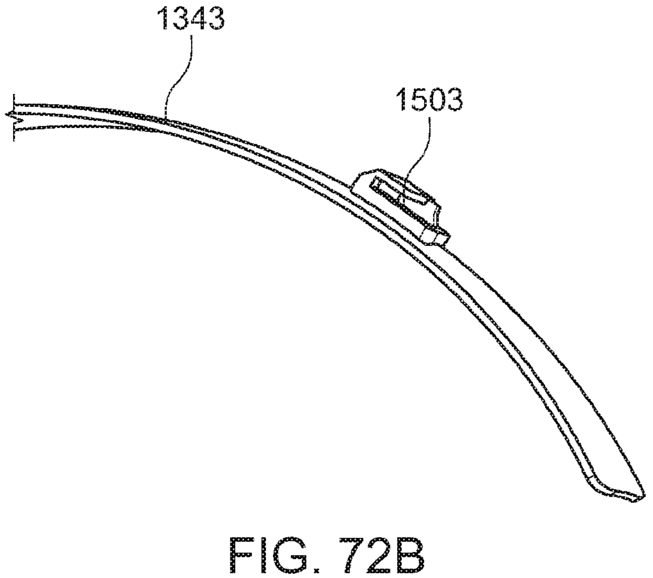

FIGS. 72A and 72B show a connection between a substantially inextensible layer of a top strap portion and a battery pack housing in a further example of the present technology.

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

5.1 Immersive Technologies

Immersive technologies may present a user with a combination of a virtual environment and the user's physical environment, or the real world. The user may interact with the resulting immersive or combined reality.

The device immerses the user by augmenting or replacing stimuli associated with one of the user's five senses with a virtual stimuli. Typically this is a virtual stimuli, although there could be additional stimuli that augment or replace stimuli associated with one of the additional four senses.

In some forms, a particular immersive technology may present a user with a combination of a virtual environment and the user's environment. At least a portion of the resulting environment may include a virtual environment. In some examples, the entire resulting environment may be a virtual environment (e.g., meaning the user's environment may be block from view or otherwise obstructed). In other forms, at least a portion of the user's physical environment may still be visually observable.

In some forms, the user may use different types of immersive technologies, which may include, but are not limited to, virtual reality (VR), augmented reality (AR), or mixed reality (MR). Each type of immersive technology may present the user with a different environment and/or a different way to interact with the environment.

In some forms, a display system may be used with each type of immersive technology. A display screen of the display system may provide a virtual environment component to the combination environment (i.e., the combination of the virtual and user's environments). In certain forms, the display screen may be an electronic screen.

In at least some types of immersive technologies (e.g., VR, AR, MR, etc.), positioning and stabilizing the electronic screen may be useful in operating a respective device. For example, the user may desire the electronic screen to be positioned close enough to their eyes to allow for easy viewing, but far enough away so as not to cause discomfort. Additionally, the electronic screen may need to be spaced far enough away so that users may simultaneously wear corrective lenses, like glasses. In addition, users may seek to maintain the orientation of the electronic screen relative to their eyes. In other words, users who walk, or otherwise move, while using these devices may not want the device to bounce or otherwise move on their head (e.g., particularly relative to their eyes), as this may cause dizziness and/or discomfort to the user. Therefore, these devices may be supported snuggly against the user's head in order to limit relative movement between the user's eyes and the device.

In one form, the present technology comprises a method for using a VR device comprising supporting the device on the user's head proximate to at least one of the user's eyes, and within the user's line of sight.

In certain examples of the present technology, a head-mounted display unit is supported in front of both of the user's eyes in order to block, obstruct, and/or limit ambient light from reaching the user's eyes.

Any features disclosed below in the context of a device configured for VR are to be understood as being applicable to devices configured for AR, unless the context clearly requires otherwise. Likewise features disclosed below in the context of a device configured for AR are to be understood as being applicable to devices configured for VR, unless the context clearly requires otherwise. For the avoidance of doubt, a feature disclosed in the context of a device that does not have a transparent display, through which the user can view the real world, is to be understood as being applicable to a device having such a transparent display unless the context clearly requires otherwise. Likewise a feature disclosed in the context of a device that has a transparent display, through which the real-world can be viewed, is to be understood to be applicable to a device in which the display is electronic and through which the real-world cannot be viewed directly through a transparent material.

5.2 Virtual Reality Display Interface

As shown in FIGS. 4A and 4B, a display apparatus, display system, display interface or head-mounted display system 1000 in accordance with one aspect of the present technology comprises the following functional aspects: an interfacing structure 1100, a head-mounted display unit 1200, and a positioning and stabilizing structure 1300. In some forms, a functional aspect may provide one or more physical components. In some forms, one or more physical components may provide one or more functional aspects. The head-mounted display unit 1200 may comprise a display. In use, the head-mounted display unit 1200 is arranged to be positioned proximate and anterior to the user's eyes, so as to allow the user to view the display.

In other aspects, the head-mounted display system 1000 may also include a display unit housing 1205, an optical lens 1240, a controller 1270, a speaker 1272, a power source 1274, and/or a control system 1276. In some examples, these may be integral pieces of the head-mounted display system 1000, while in other examples, these may be modular and incorporated into the head-mounted display system 1000 as desired by the user.

5.2.1 Head-Mounted Display Unit

The head-mounted display unit 1200 may include a structure for providing an observable output to a user. Specifically, the head-mounted display unit 1200 is arranged to be held (e.g., manually, by a positioning and stabilizing structure, etc.) in an operational position in front of a user's face.

In some examples, the head-mounted display unit 1200 may include a display screen 1220, a display unit housing 1205, an interfacing structure 1100, and/or an optical lens 1240. These components may be permanently assembled in a single head-mounted display unit 1200, or they may be separable and selectively connected by the user to form the head-mounted display unit 1200. Additionally, the display screen 1220, the display unit housing 1205, the interfacing structure 1100, and/or the optical lens 1240 may be included in the head-mounted display system 1000, but may not be part of the head-mounted display unit 1200.

5.2.1.1 Display Screen

Some forms of the head-mounted display unit 1200 include a display, for example a display screen—not shown in FIG. 4B, but provided within the display housing 1205. The display screen may include electrical components that provide an observable output to the user.

In one form of the present technology, a display screen provides an optical output observable by the user. The optical output allows the user to observe a virtual environment and/or a virtual object.

The display screen may be positioned proximate to the user's eyes, in order to allow the user to view the display screen. For example, the display screen may be positioned anterior to the user's eyes. The display screen can output computer generated images and/or a virtual environment.

In some forms, the display screen is an electronic display. The display screen may be a liquid crystal display (LCD), or a light emitting diode (LED) screen.

In certain forms, the display screen may include a backlight, which may assist in illuminating the display screen. This may be particularly beneficial when the display screen is viewed in a dark environment.

In some forms, the display screen may extend wider a distance between the user's pupils. The display screen may also be wider than a distance between the user's cheeks.

In some forms, the display screen may display at least one image that is observable by the user. For example, the display screen may display images that change based on predetermined conditions (e.g., passage of time, movement of the user, input from the user, etc.).

In certain forms, portions of the display screen may be visible to only one of the user's eyes. In other words, a portion of the display screen may be positioned proximate and anterior to only one of the user's eyes (e.g., the right eye), and is blocked from view from the other eye (e.g., the left eye).

In one example, the display screen may be divided into two sides (e.g., a left side and a right side), and may display two images at a time (e.g., one image on either side).

Each side of the display screen may display a similar image. In some examples, the images may be identical, while in other examples, the images may be slightly different.

Together, the two images on the display screen may form a binocular display, which may provide the user with a more realistic VR experience. In other words, the user's brain may process the two images from the display screen 1220 together as a single image. Providing two (e.g., un-identical) images may allow the user to view virtual objects on their periphery, and expand their field of view in the virtual environment.

In certain forms, the display screen may be positioned in order to be visible by both of the user's eyes. The display screen may output a single image at a time, which is viewable by both eyes. This may simplify the processing as compared to the multi-image display screen.

5.2.1.2 Display Housing

In some forms of the present technology as shown in FIGS. 4A and 4B, a display unit housing 1205 provides a support structure for the display screen, in order to maintain a position of at least some of the components of the display screen relative to one another, and may additionally protect the display screen and/or other components of the head-mounted display unit 1200. The display unit housing 1205 may be constructed from a material suitable to provide protection from impact forces to the display screen. The display unit housing 1205 may also contact the user's face, and may be constructed from a biocompatible material suitable for limiting irritation to the user.

A display unit housing 1205 in accordance with some forms of the present technology may be constructed from a hard, rigid or semi-rigid material, such as plastic.

In certain forms, the rigid or semi-rigid material may be at least partially covered with a soft and/or flexible material (e.g., a textile, silicone, etc.). This may improve biocompatibility and/or user comfort because the at least a portion of the display unit housing 1205 that the user engages (e.g., grabs with their hands) includes the soft and/or flexible material.

A display unit housing 1205 in accordance with other forms of the present technology may be constructed from a soft, flexible, resilient material, such as silicone rubber.

In some forms, the display unit housing 1205 may have a substantially rectangular or substantially elliptical profile. The display unit housing 1205 may have a three-dimensional shape with the substantially rectangular or substantially elliptical profile.

In certain forms, the display unit housing 1205 may include a superior face 1230, an inferior face 1232, a lateral left face 1234, a lateral right face 1236, and an anterior face 1238. The display screen 1220 may be held within the faces in use.

In certain forms, the superior face 1230 and the inferior face 1232 may have substantially the same shape.

In one form, the superior face 1230 and the inferior face 1232 may be substantially flat, and extend along parallel planes (e.g., substantially parallel to the Frankfort horizontal in use).

In certain forms, the lateral left face 1234 and the lateral right face 1236 may have substantially the same shape.

In one form, the lateral left face 1234 and the lateral right face 1236 may be curved and/or rounded between the superior and inferior faces 1230, 1232. The rounded and/or curved faces 1234, 1236 may be more comfortable for a user to grab and hold while donning and/or doffing the head-mounted display system 1000.

In certain forms, the anterior face 1238 may extend between the superior and inferior faces 1230, 1232. The anterior face 1238 may form the anterior most portion of the head-mounted display system 1000.

In one form, the anterior face 1238 may be a substantially planar surface, and may be substantially parallel to the coronal plane, while the head-mounted display system 1000 is worn by the user.

In one form, the anterior face 1238 may not have a corresponding opposite face (e.g., a posterior face) with substantially the same shape as the anterior face 1238. The posterior portion of the display unit housing 1205 may be at least partially open (e.g., recessed in the anterior direction) in order to receive the user's face.

In some forms, the display screen is permanently integrated into the head-mounted display system 1000. The display screen may be a device usable only as a part of the head-mounted display system 1000.

In some forms, the display unit housing 1205 may enclose the display screen, which may protect the display screen and/or limit user interference (e.g., moving and/or breaking) with the components of the display screen.

In certain forms, the display screen may be substantially sealed within the display unit housing 1205, in order to limit the collection of dirt or other debris on the surface of the display screen, which could negatively affect the user's ability to view an image output by the display screen. The user may not be required to break the seal and access the display screen, since the display screen is not removable from the display unit housing 1205.

In some forms, the display screen is removably integrated into the head-mounted display system 1000. The display screen may be a device usable independently of the head-mounted display system 1000 as a whole. For example, the display screen may be provided on a smart phone, or other portable electronic device.

In some forms, the display unit housing 1205 may include a compartment. A portion of the display screen may be removably receivable within the compartment. For example, the user may removably position the display screen in the compartment. This may be useful if the display screen performs additional functions outside of the head-mounted display unit 1200 (e.g., is a portable electronic device like a cell phone). Additionally, removing the display screen from the display unit housing 1205 may assist the user in cleaning and/or replacing the display screen.

Certain forms of the display housing include an opening to the compartment, allowing the user to more easily insert and remove the display screen from the compartment. The display screen may be retained within the compartment via a frictional engagement.

In certain forms, a cover may selectively cover the compartment, and may provide additional protection and/or security to the display screen 1220 while positioned within the compartment.

In certain forms, the compartment may open on the superior face. The display screen may be inserted into the compartment in a substantially vertical direction while the display interface 3000 is worn by the user.

5.2.1.3 Interfacing Structure

As shown in FIGS. 4A and 4B, some forms of the present technology include an interfacing structure 1100 is positioned and/or arranged in order to conform to a shape of a user's face, and may provide the user with added comfort while wearing and/or using the head-mounted display system 1000.

In some forms, the interfacing structure 1100 is coupled to a surface of the display unit housing 1205.

In some forms, the interfacing structure 1100 may extent at least partially around the display unit housing 1205, and may form a viewing opening. The viewing opening may at least partially receive the user's face in use. Specifically, the user's eyes may be received within the viewing opening formed by the interfacing structure 1100.

In some forms, the interfacing structure 1100 in accordance with the present technology may be constructed from a biocompatible material.

In some forms, the interfacing structure 1100 in accordance with the present technology may be constructed from a soft, flexible, and/or resilient material.

In certain forms, the interfacing structure 1100 in accordance with the present technology may be constructed from silicone rubber and/or foam.

In some forms, the interfacing structure 1100 may contact sensitive regions of the user's face, which may be locations of discomfort. The material forming the interfacing structure 1100 may cushion these sensitive regions, and limit user discomfort while wearing the head-mounted display system 1000.

In certain forms, these sensitive regions may include the user's forehead. Specifically, this may include the region of the user's head that is proximate to the frontal bone, like the Epicranius and/or the *glabella*. This region may be sensitive because there is limited natural cushioning from muscle and/or fat between the user's skin and the bone. Similarly, the ridge of the user's nose may also include little to no natural cushioning.

In some forms, the interfacing structure 1100 may comprise a single element. In some embodiments the interfacing structure 1100 may be designed for mass manufacture. For example, the interfacing structure 1100 may be designed to comfortably fit a wide range of different face shapes and sizes.

In some forms, the interfacing structure 1100 may include different elements that overlay different regions of the user's face. The different portions of the interfacing structure 1100 may be constructed from different materials, and provide the user with different textures and/or cushioning at different regions.

5.2.1.3.1 Light Shield

Some forms of the head-mounted display system 1000 may include a light shield that may be constructed from an opaque material and can block ambient light from reaching the user's eyes. The light shield may be part of the interfacing structure 1100 or may be a separate element. In some examples the interfacing structure 1100 may form a light shield by shielding the user's eyes from ambient light, in addition to providing a comfortable contacting portion for contact between the head-mounted display 1200 and the user's face. In some examples a light shield may be formed from multiple components working together to block ambient light.

In certain forms, the light shield can obstruct ambient light from reaching an eye region, which may be formed on regions of the Epicranius, the user's sphenoid, across the outer cheek region between the sphenoid to the left or right zygomatic arch, over the zygomatic arch, across the inner cheek region from the zygomatic arches towards the alar crests, and on the users' nasal ridge inferior to the sellion to enclose a portion of the users' face therebetween.

In one form, the light shield may not contact the user's face around its entire perimeter. For example, the light shield may be spaced from the user's nasal rigid. The width of this spacing may be substantially small, so as to substantially limit the ingress of ambient light. However, the user's nasal ridge may be sensitive and easily irritated. Thus, avoiding direct contact with the user's nasal ridge may improve user comfort while wearing the head-mounted display system 1000.

In certain forms, the light shield may be a portion of the display unit housing 1205, and may be integrally or removably coupled to the display unit housing 1205. In one form, if the display unit housing 1205 is usable with a display screen outputting AR or MR, and VR, the light shield may be removable from the display unit housing 1205, and only coupled to the display unit housing 1205 while using VR.

5.2.1.3.1.1 Seal-Forming Structure

As shown in FIG. 4D, in one form of the present technology, the interfacing structure 1100 acts as a seal-forming structure, and provides a target seal-forming region. The target seal-forming region is a region on the seal-forming structure where sealing may occur. The region where sealing actually occurs—the actual sealing surface—may change within a given session, from day to day, and from user to user, depending on a range of factors including but not limited to, where the display unit housing 1205 is placed on the face, tension in the positioning and stabilizing structure 1300, and/or the shape of a user's face.

In one form the target seal-forming region is located on an outside surface of the interfacing structure 1100.

In some forms, the light shield may form the seal-forming structure and seal against the user's face.

In certain forms, the entire perimeter of the light shield or interfacing structure 1100 may seal against the user's skin, and can block ambient light from reaching an eye region. The eye region may be formed on regions of the Epicranius, the user's sphenoid, across the outer cheek region between the sphenoid to the left or right zygomatic arch, over the zygomatic arch, across the inner cheek region from the zygomatic arches towards the alar crests, and on the users' nasal ridge inferior to the sellion to enclose a portion of the users' face therebetween.

When acting as a seal-forming structure, the light shield or interfacing structure 1100 may contact sensitive areas the user's face, like the user's nasal rigid. This contact may entirely prevent the ingress of ambient light. Sealing around the entire perimeter of the display unit housing 1205 may improve performance of the head-mounted display system 1000. Additionally, biocompatible materials may be selected so that direct contact with the user's nasal ridge does not significantly reduce user comfort while wearing the head-mounted display system 1000.

In certain forms of the present technology, a system is provided comprising more than one interfacing structure 1100, each being configured to correspond to a different size and/or shape range. For example the system may comprise one form of interfacing structure 1100 suitable for a large sized head, but not a small sized head and another suitable for a small sized head, but not a large sized head. The different interfacing structures 1100 may be removable and replaceable so that different users with different sized heads may use the same head-mounted display system 1000.

In some forms, the seal-forming structure the may be formed on regions of the Epicranius, the user's sphenoid, across the outer cheek region between the sphenoid to the left or right zygomatic arch, over the zygomatic arch, across the inner cheek region from the zygomatic arches towards the alar crests, and on the users' nasal ridge inferior to the sellion to enclose a portion of the users' face therebetween. This defined region may be an eye region.

In certain forms, this may seal around the user's eyes. The seal created by the seal-forming structure or interfacing structure 1100 may create a light seal, in order to limit ambient light from reaching the user's eyes.

5.2.1.3.2 Material Biocompatibility

Biocompatible materials are considered to be materials that undergo a full evaluation of their biological responses, relevant to their safety in use, according to ISO 10993-1 standard. The evaluation considers the nature and duration of anticipated contact with human tissues when in-use. In some forms of the present technology, the materials utilised in the positioning and stabilizing structure and interfacing structure may undergo at least some of the following biocompatibility tests: Cytotoxicity—Elution Test (MeM Extract): ANSI/AAMI/ISO 10993-5; Skin Sensitisation: ISO 10993-10; Irritation: ISO 10993-10; Genotoxicity—Bacterial Mutagenicity Test: ISO 10993-3; Implantation: ISO 10993-6.

5.2.1.4 Optical Lenses

As shown in FIG. 4B, at least one lens 1240 may be disposed between the user's eyes and the display screen 1220. The user may view an image provided by the display screen 1220 through the lens 1240. The at least one lens 1240 may assist in spacing the display screen 1220 away from the user's face to limit eye strain. The at least one lens 1240 may also assist in better observing the image being displayed by the display screen 1220.

In some forms, the lenses 1240 are Fresnel lenses.

In some forms, the lens 1240 may have a substantially frustoconical shape. A wider end of the lens 1240 may be disposed proximate to the display screen 1220, and a narrower end of the lens 1240 may be disposed proximate to the user's eyes, in use.

In some forms, the lens 1240 may have a substantially cylindrical shape, and may have substantially the same width proximate to the display screen 1220, and proximate to the user's eyes, in use.

In some forms, the at least one lens 1240 may also magnify the image of the display screen 1220, in order to assist the user in viewing the image.

In some forms, the head-mounted display system 1000 includes two lenses 1240 (e.g., binocular display), one for each of the user's eyes. In other words, each of the user's eyes may look through a separate lens positioned anterior to the respective pupil. Each of the lenses 1240 may be identical, although in some examples, one lens 1240 may be different than the other lens 1240 (e.g., have a different magnification).

In certain forms, the display screen 1220 may output two images simultaneously. Each of the user's eyes may be able to see only one of the two images. The images may be displayed side-by-side on the display screen 1220. Each lens 1240 permits each eye to observe only the image proximate to the respective eye. The user may observe these two images together as a single image.

In some forms, the posterior perimeter of each lens 1240 may be approximately the size of the user's orbit. The posterior perimeter may be slightly larger than the size of the user's orbit in order to ensure that the user's entire eye can see into the respective lens 1240. For example, the outer edge of the each lens 1240 may be aligned with the user's frontal bone in the superior direction (e.g., proximate the user's eyebrow), and may be aligned with the user's maxilla in the inferior direction (e.g., proximate the outer cheek region).

The positioning and/or sizing of the lenses 1240 may allow the user to have approximately 360° of peripheral vision in the virtual environment, in order to closely simulate the physical environment.

In some forms, the head-mounted display system 1000 includes a single lens 1240 (e.g., monocular display). The lens 1240 may be positioned anterior to both eyes (e.g., so that both eyes view the image from the display screen 1220 through the lens 1240), or may be positioned anterior to only one eye (e.g., when the image from the displace screen 1220 is viewable by only one eye).

5.2.1.4.1 Lens Mounting

The lenses 1240 may be coupled to a spacer positioned proximate to the display screen 1220 (e.g., between the display screen 1220 and the interfacing structure 1100), so that the lenses 1240 are not in direct contact with the display screen 1220 (e.g., in order to limit the lenses 1240 from scratching the display screen 1220).

For example, the lenses 1240 may be recessed relative to the interfacing structure 1100 so that the lenses 1240 are disposed within the viewing opening. In use, each of the user's eyes are aligned with the respective lens 1240 while the user's face is received within the viewing opening (e.g., an operational position).

In some forms, the anterior perimeter of each lens 1240 may encompass approximately half of the display screen 1220. A substantially small gap may exist between the two lenses 1240 along a center line of the display screen 1220. This may allow a user looking through both lenses 1240 to be able to view substantially the entire display screen 1220, and all of the images being output to the user.

In certain forms, the center of the display screen 1220 (e.g., along the center line between the two lenses 1240) may not output an image. For example, in a binocular display (e.g., where each side of the display screen 1220 outputs substantially the same image), each image may be spaced apart on the display screen 1220. This may allow two lenses 1240 to be positioned in close proximity to the display screen 1220, while allowing the user to view the entirety of the image displayed on the display screen 1220.

In some forms, a protective layer 1242 may be formed around at least a portion of the lenses 1240. In use, the protective layer 1242 may be positioned between the user's face and the display screen 1220.

In some forms, a portion of each lens 1240 may project through the protective layer 1242 in the posterior direction. For example, the narrow end of each lens 1240 may project more posterior than the protective layer 1242 in use.

In some forms, the protective layer 1242 may be opaque so that light from the display screen 1220 is unable to pass through. Additionally, the user may be unable to view the display screen 1220 without looking through the lenses 1240.

In some forms, the protective layer 1242 may be non-planar, and may include contours that substantially match contours of the user's face. For example, a portion of the protective layer 1242 may be recessed in the anterior direction in order to accommodate the user's nose.

In certain forms, the user may not contact the protective layer 1242 while wearing the head-mounted display system 1000. This may assist in reducing irritation from additional contact with the user's face (e.g., against the sensitive nasal ridge region).

5.2.1.4.2 Corrective Lenses

In some examples, additional lenses may be coupled to the lenses 1240 so that the user looks through both the lens 1240 and the additional lens in order to view the image output by the display screen 1220.

In some forms, the additional lenses are more posterior than the lenses 1240, in use. Thus, the additional lenses are positioned closer to the user's eyes, and the user looks through the additional lenses before looking through the lenses 1240.

In some forms, the additional lenses may have a different magnification than the lenses 1240.

In some forms, the additional lenses, may be prescription strength lenses. The additional lenses may allow a user to view the display screen 1220 without glasses, which may be uncomfortable to wear while using the head-mounted display system 1000. The additional lenses may be removable so that users that do not require the additional lenses may still clearly view the display screen 1220.

5.2.2 Positioning and Stabilizing Structure

As shown in FIGS. 4A and 4B, the display screen 1220 and/or the display unit housing 1205 of the head-mounted display system 1000 of the present technology may be held in position in use by the positioning and stabilizing structure 1300.

To hold the display screen 1220 and/or the display unit housing 1205 in its correct operational position, the positioning and stabilizing structure 1300 is ideally comfortable against the user's head in order to accommodate the induced loading from the weight of the display unit in a manner that minimise facial markings and/or pain from prolonged use. There is also need to allow for a universal fit without trading off comfort, usability and cost of manufacture. The design criteria may include adjustability over a predetermined range with low-touch simple set up solutions that have a low dexterity threshold. Further considerations include catering for the dynamic environment in which the head-mounted display system 1000 may be used. As part of the immersive experience of a virtual environment, users may communicate, i.e. speak, while using the head-mounted display system 1000. In this way, the jaw or mandible of the user may move relative to other bones of the skull. Additionally, the whole head may move during the course of a period of use of the head-mounted display system 1000. For example, movement of a user's upper body, and in some cases lower body, and in particular, movement of the head relative to the upper and lower body.

In one form the positioning and stabilizing structure 1300 provides a retention force to overcome the effect of the gravitational force on the display screen 1220 and/or the display unit housing 1205.

In one form of the present technology, a positioning and stabilizing structure 1300 is provided that is configured in a manner consistent with being comfortably worn by a user. In one example the positioning and stabilizing structure 1300 has a low profile, or cross-sectional thickness, to reduce the perceived or actual bulk of the apparatus. In one example, the positioning and stabilizing structure 1300 comprises at least one strap having a rectangular cross-section. In one example the positioning and stabilizing structure 1300 comprises at least one flat strap.

In one form of the present technology, a positioning and stabilizing structure 1300 is provided that is configured so as not to be too large and bulky to prevent the user from comfortably moving their head from side to side.

In one form of the present technology, a positioning and stabilizing structure 1300 comprises a strap constructed from a laminate of a textile user-contacting layer, a foam inner layer and a textile outer layer. In one form, the foam is porous to allow moisture, (e.g., sweat), to pass through the strap. In one form, a skin contacting layer of the strap is formed from a material that helps wick moisture away from the user's face. In one form, the textile outer layer comprises loop material to engage with a hook material portion.

In certain forms of the present technology, a positioning and stabilizing structure 1300 comprises a strap that is extensible, e.g. resiliently extensible. For example the strap may be configured in use to be in tension, and to direct a force to draw the display screen 1220 and/or the display unit housing 1205 toward a portion of a user's face, particularly proximate to the user's eyes and in line with their field of vision. In an example the strap may be configured as a tie.

In one form of the present technology, the positioning and stabilizing structure 1300 comprises a first tie, the first tie being constructed and arranged so that in use at least a portion of an inferior edge thereof passes superior to an otobasion superior of the user's head and overlays a portion of a parietal bone without overlaying the occipital bone.

In one form of the present technology, the positioning and stabilizing structure 1300 includes a second tie, the second tie being constructed and arranged so that in use at least a portion of a superior edge thereof passes inferior to an otobasion inferior of the user's head and overlays or lies inferior to the occipital bone of the user's head.

In one form of the present technology, the positioning and stabilizing structure 1300 includes a third tie that is constructed and arranged to interconnect the first tie and the second tie to reduce a tendency of the first tie and the second tie to move apart from one another.

In certain forms of the present technology, a positioning and stabilizing structure 1300 comprises a strap that is bendable and e.g. non-rigid. An advantage of this aspect is that the strap is more comfortable against a user's head.

In certain forms of the present technology, a positioning and stabilizing structure 1300 comprises a strap constructed to be breathable to allow moisture vapour to be transmitted through the strap, In certain forms of the present technology, a system is provided comprising more than one positioning and stabilizing structure 1300, each being configured to provide a retaining force to correspond to a different size and/or shape range. For example the system may comprise one form of positioning and stabilizing structure 1300 suitable for a large sized head, but not a small sized head, and another. suitable for a small sized head, but not a large sized head.

In some forms, the positioning and stabilizing structure 1300 may include cushioning material (e.g., a foam pad) for contacting the user's skin. The cushioning material may provide added wearability to the positioning and stabilizing structure 1300, particularly if positioning and stabilizing structure 1300 is constructed from a rigid or semi-rigid material.

5.2.2.1 Temporal Connectors

As shown in FIG. 4C, some forms of the head-mounted display system 1000 or positioning and stabilizing structure 1300 include temporal connectors 1250, each of which may overlay a respective one of the user's temporal bones in use. A portion of the temporal connectors 1250, in-use, are in contact with a region of the user's head proximal to the otobasion superior, i.e. above each of the user's ears. In some examples, temporal connectors are strap portions of a positioning and stabilising structure 1300. In other examples, temporal connectors are arms of a head-mounted display unit 1200. In some examples a temporal connector of a head-mounted display system 1000 may be formed partially by a strap portion (e.g. a lateral strap portion 1330) of a positioning and stabilising structure 1300 and partially by an arm 1210 of a head-mounted display unit 1200.

The temporal connectors 1250 may be lateral portions of the positioning and stabilizing structure 1300, as each temporal connector 1250 is positioned on either the left or the right side of the user's head.

In some forms, the temporal connectors 1250 may extend in an anterior-posterior direction, and may be substantially parallel to the sagittal plane.

In some forms, the temporal connectors 1250 may be coupled to the display unit housing 1205. For example, the temporal connectors 1250 may be connected to lateral sides of the display unit housing 1205. For example, each temporal connector 1250 may be coupled to a respective one of the lateral left face 1234 and the lateral right face 1236.

In certain forms, the temporal connectors 1250 may be pivotally connected to the display unit housing 1205, and may provide relative rotation between each temporal connector 1250, and the display unit housing 1205.

In certain forms, the temporal connectors 1250 may be removably connected to the display unit housing 1205 (e.g., via a magnet, a mechanical fastener, hook and loop material, etc.).

In some forms, the temporal connectors 1250 may be arranged in-use to run generally along or parallel to the Frankfort Horizontal plane of the head and superior to the zygomatic bone (e.g., above the user's cheek bone).

In some forms, the temporal connectors 1250 may be positioned against the user's head similar to arms of eyeglasses, and be positioned more superior than the anti-helix of each respective ear.

In some forms, the temporal connectors 1250 may have a generally elongate and flat configuration. In other words, each temporal connector 1250 is far longer and wider (direction from top to bottom in the paper plane) than thick (direction into the paper plane).

In some forms, the temporal connectors 1250 may each have a three-dimensional shape which has curvature in all three axes (X, Y and Z). Although the thickness of each temporal connector 1250 may be substantially uniform, its height varies throughout its length. The purpose of the shape and dimension of each temporal connector 1250 is to conform closely to the head of the user in order to remain unobtrusive and maintain a low profile (e.g., not appear overly bulky).

In some forms, the temporal connectors 1250 may be constructed from a rigid or semi-rigid material, which may include plastic, hytrel (thermoplastic polyester elastomer), or another similar material. The rigid or semi-rigid material may be self-supporting and/or able to hold its shape without being worn. This can make it more intuitive or obvious for users to understand how to use the positioning and stabilizing structure 1300 and may contrast with a positioning and stabilizing structure 1300 that is entirely floppy and does not retain a shape. Maintaining the temporal connectors 1250 in the in-use state prior to use may prevent or limit distortion whilst the user is donning the positioning and stabilizing structure 1300 and allow a user to quickly fit or wear the head-mounted display system 1000.

In certain forms, the temporal connectors 1250 may be rigidizers, which may allow for a more effective (e.g., direct) translation of tension through the temporal connectors 1250 because rigidizers limit the magnitude of elongation or deformation of the arm while in-use.

In certain forms, the positioning and stabilizing structure 1300 may be designed so that the positioning and stabilizing structure 1300 springs 'out of the box' and generally into its in-use configuration. In addition, the positioning and stabilizing structure 1300 may be arranged to hold its in-use shape once out of the box (e.g., because rigidizers may be formed to maintain the shape of some or part of the positioning and stabilizing structure 1300). Advantageously, the orientation of the positioning and stabilizing structure 1300 is made clear to the user as the shape of the positioning and stabilizing structure 1300 is generally curved much like the rear portion of the user's head. That is, the positioning and stabilizing structure 1300 is generally dome shaped.

In certain forms, a flexible and/or resilient material may be disposed around the rigid or semi-rigid material of the temporal connectors 1250. The flexible material may be more comfortable against the user's head, in order to improve wearability and provide soft contact with the user's face. In one form, the flexible material is a textile sleeve at is permanently or removably coupled to each temporal connector 1250.

In one form, a textile may be over-moulded onto at least one side of the rigidizer. In one form, the rigidizer may be formed separately to the resilient component and then a sock of user contacting material (e.g., Breath-O-Prene™) may be wrapped or slid over the rigidizer. In alternative forms, the user contacting material may be provided to the rigidizer by adhesive, ultrasonic welding, sewing, hook and loop material, and/or stud connectors.

In some forms, the user contacting material may be on both sides of the rigidizer, or alternatively may only be on the user contacting side (e.g., the user contacting side) of the rigidizer to reduce bulk and cost of materials.

In some forms, the temporal connectors 1250 are constructed from a flexible material (e.g., a textile), which may be comfortable against the user's skin, and may not require an added layer to increase comfort.

5.2.2.2 Posterior Support Portion

As shown in FIG. 4C, some forms of the positioning and stabilizing structure 1300 may include a posterior support portion 1350 for assisting in supporting the display screen and/or the display unit housing 1205 (shown in FIG. 4B) proximate to the user's eyes. The posterior support portion 1350 may assist in anchoring the display screen and/or the display unit housing 1205 to the user's head in order to appropriately orient the display screen proximate to the user's eyes.

In some forms, the posterior support portion 1350 may be coupled to the display unit housing 1205 via the temporal connectors 1250.

In certain forms, the temporal connectors 1250 may be directly coupled to the display unit housing 1205 and to the posterior support portion 1350.

In some forms, the posterior support portion 1350 may have a three-dimensional contour curve to fit to the shape of a user's head. For example, the three-dimensional shape of the posterior support portion 1350 may have a generally round three-dimensional shape adapted to overlay a portion of the parietal bone and the occipital bone of the user's head, in use.

In some forms, the posterior support portion 1350 may be a posterior portion of the positioning and stabilizing structure 1300. The posterior support portion 1350 may provide an anchoring force directed at least partially in the anterior direction.

In certain forms, the posterior support portion 1350 is the inferior-most portion of the positioning and stabilizing structure 1300. For example, the posterior support portion 1350 may contact a region of the user's head between the occipital bone and the trapezius muscle. The rear support 3008 may hook against an inferior edge of the occipital bone (e.g., the occiput). The posterior support portion 1350 may provide a force directed in the superior direction and/or the anterior direction in order to maintain contact with the user's occiput.

In certain forms, the posterior support portion 1350 is the inferior-most portion of the entire head-mounted display system 1000. For example, the posterior support portion 1350 may be positioned at the base of the user's neck (e.g., overlaying the occipital bone and the trapezius muscle more inferior than the user's eyes) so that the posterior support portion 1350 is more inferior than the display screen 1220 and/or the display unit housing 1205.

In some forms, the posterior support portion 1350 may include a padded material, which may contact the user's head (e.g., overlaying the region between the occipital bone and the trapezius muscle). The padded material may provide additional comfort to the user, and limit marks caused by the posterior support portion 1350 pulling against the user's head.

5.2.2.3 Forehead Support

Some forms of the positioning and stabilizing structure 1300 may include a forehead support or frontal support portion 1360 that configured to contact the user's head superior to the user's eyes, while in use. The positioning and stabilising structure 1300 shown in FIG. 5B includes a forehead support 1360. In some examples the positioning and stabilising structure 1300 shown in FIG. 4A may include a forehead support 1360. The forehead support 1360 may overlay the frontal bone of the user's head. In certain forms, the forehead support 1360 may also be more superior than the sphenoid bones and/or the temporal bones. This may also position the forehead support 1360 more superior than the user's eyebrows.

In some forms, the forehead support 1360 may be an anterior portion of the positioning and stabilizing structure 1300, and may be disposed more anterior on the user's head than any other portion of the positioning and stabilizing structure 1300. The posterior support portion 1350 may provide a force directed at least partially in the posterior direction.

In some forms, the forehead support 1360 may include a cushioning material (e.g., textile, foam, silicone, etc.) that may contact the user, and may help to limit marks caused by the straps of the positioning and stabilizing structure 1300. The forehead support 1360 and the interfacing structure 1100 may work together in order to provide comfort to the user.

In some forms, the forehead support 1360 may be separate from the display unit housing 1205, and may contact the user's head at a different location (e.g., more superior) than the display unit housing 1205.

In some forms, the forehead support 1360 can be adjusted to allow the positioning and stabilizing structure 3000 to accommodate the shape and/or configuration of a user's face.

In some forms, the temporal connectors 1250 may be coupled to the forehead support 1360 (e.g., on lateral sides of the forehead support 1360). The temporal connectors 1250 may extend at least partially in the inferior direction in order to couple to the posterior support portion 1350.

In certain forms, the positioning and stabilizing structure 1300 may include multiple pairs of temporal connectors 1250. For example, one pair of temporal connectors 1250 may be coupled to the forehead support 1360, and one pair of temporal connectors 1250 may be coupled to the display unit housing 1205.

In some forms, the forehead support 1360 can be presented at an angle which is generally parallel to the user's forehead to provide improved comfort to the user. For example, the forehead support 1360 may position the user in an orientation that overlays the frontal bone, and is substantially parallel to the coronal plane. Positioning the forehead support substantially parallel to the coronal plane can reduce the likelihood of pressure sores which may result from an uneven presentation.

In some forms, the forehead support 1360 may be offset from a rear support or posterior support portion that contacts a posterior region of the user's head (e.g., an area overlaying the occipital bone and the trapezius muscle). In other words, an axis along a rear strap would not intersect the forehead support 1360, which may be disposed more inferior and anterior than the axis along the rear strap. The resulting offset between the forehead support 1360 and the rear strap may create moments that oppose the weight force of the display screen 1220 and/or the display unit housing 1205. A larger offset may create a larger moment, and therefore more assistance in maintaining a proper position of the display screen 1220 and/or the display unit housing 1205. The offset may be increased by moving the forehead support 1360 closer to the user's eyes (e.g., more anterior and inferior along the user's head), and/or increasing the angle of the rear strap so that it is more vertical.

5.2.2.4 Adjustable Straps

As shown in FIG. 4C, portions of the positioning and stabilizing structure 1300 may be adjustable, in order to impart a selective tensile force on the display screen 1220 and/or the display unit housing 1205 in order to secure a position of the display screen 1220 and/or the display unit housing 1205.

In some forms, the display unit housing 1205 may include at least one loop or eyelet 1254, and at least one of the temporal connectors 1250 may be threaded through that loop, and doubled back on itself. The length of the temporal connector 1250 threaded through the respective eyelet 1254 may be selected by the user in order to adjust the tensile force provided by the positioning and stabilizing structure 1300. For example, threading a greater length of the temporal connector 1250 through the eyelet 1254 may supply a greater tensile force.

In some forms, at least one of the temporal connectors 1250 may include an adjustment portion 1256 and a receiving portion 1258. The adjustment portion 1256 may be positioned through the eyelet 1254 on the display unit housing 1205, and may be coupled to the receiving portion 1258 (e.g., by doubling back on itself). The adjustment portion 1256 may include a hook material, and the receiving portion 1258 may include a loop material (or vice versa), so that the adjustment portion 1256 may be removably held in the desired position. In some examples, the hook material and the loop material may be Velcro.

In certain forms, adjusting the position of the adjustment portion 1256 relative to the receiving portion 1258 may apply a posterior force to the display screen 1220 and/or the display unit housing 1205, and increase or decrease a sealing force of the light shield against the user's head (e.g., when the light shield acts as a seal-forming structure).

In certain forms, the adjustment portion 1256 may be constructed from a flexible and/or resilient material, which may conform to a shape of the user's head and/or may allow the adjustment portion to be threaded through the eyelet 1254. For example, the adjustment portion(s) 1256 may be constructed from an elastic textile, which may provide an elastic, tensile force. The remainder of the temporal connectors 1250 may be constructed from the rigid or semi-rigid material described above (although it is contemplated that additional sections of the temporal connectors 1250 may also be constructed from a flexible material).

5.2.2.4.1 Head Strap

In some forms, the positioning and stabilizing structure 3000 may include a top strap portion 1340, which may overlay a superior region of the user's head.

In some forms, the top strap portion 1340 may extend between an anterior portion of the head-mounted display system 1000 and a posterior region of the head-mounted display system 1000.

In some forms, the top strap portion 1340 may be constructed from a flexible material, and may be configured to compliment the shape of the user's head.

In certain forms, the top strap portion 1340 may be connected to the display unit housing 1205. For example, the top strap portion 1340 may be coupled to the superior face 1230. The top strap portion 1340 may also be coupled to the display unit housing 1205 proximate to a posterior end of the display unit housing 1205.

In certain forms, the top strap portion 1340 may be coupled to the forehead support 1360. For example, the top strap portion 1340 may be coupled to the forehead support 1360 proximate to a superior edge. The top strap portion 1340 may be connected to the display unit housing 1205 through the forehead support 1360.

In some forms, the top strap portion 1340 may be connected to the posterior support portion 1350. For example, the top strap portion 1340 may be connected proximate to a superior edge of the posterior support portion 1350.

In some forms, the top strap portion 1340 may overlay the frontal bone and the parietal bone of the user's head.

In certain forms, the top strap portion 1340 may extend along the sagittal plane as it extends between the anterior and posterior portions of the head-mounted display system 1000.

In certain forms, the top strap portion 1340 may apply a tensile force oriented at least partially in the superior direction, which may oppose the force of gravity.

In certain forms, the top strap portion 1340 may apply a tensile force oriented at least partially in the posterior direction, which may pull the interfacing structure 1100 toward the user's face (and supply a portion of the sealing force when the light shield 3304 acts as a seal-forming structure).

In some forms, the top strap portion 1340 may be adjustable in order to impart a selective tensile force on the display screen 1220 and/or the display unit housing 1205 in order to secure a position of the display screen 1220 and/or the display unit housing 1205.

In certain forms, the display unit housing 1205 and/or the forehead support 1360 (as the case may be) may include at least one loop or eyelet 1254, and the top strap portion 1340 may be threaded through that eyelet 1254, and doubled back on itself. The length of the top strap portion 1340 threaded through the eyelet 1254 may be selected by the user in order to adjust the tensile force provided by the positioning and stabilizing structure 1300. For example, threading a greater length of the top strap portion 1340 through the eyelet 1254 may supply a greater tensile force.

In some forms, the top strap portion 1340 may include an adjustment portion and a receiving portion. The adjustment portion may be positioned through the eyelet 1254, and may be coupled to the receiving portion (e.g., by doubling back on itself). The adjustment portion may include a hook material, and the receiving portion may include a loop material (or vice versa), so that the adjustment portion may be removably held in the desired position. In some examples, the hook material and the loop material may be Velcro.

5.2.2.5 Rotational Control

In some forms, the display unit housing 1205 and/or the display screen 1220 may pivot relative to the user's face while the user has donned the positioning and stabilizing structure. This may allow the user to see the physical environment while still wearing the user interface 3000. This may be useful for users who want to take a break for viewing the virtual environment, but do not wish to doff the positioning and stabilizing structure 1300.

In some forms, a pivot connection 1260 may be formed between a superior portion of the display unit housing 1205 and the positioning and stabilizing structure 1300. For example, the pivot connection 1260 may be formed on the superior face 1230 of the display unit housing 1205.

In certain forms, the pivot connection 1260 may be coupled to the forehead support 1360. The display unit housing 1205 may be able to pivot about an inferior edge of the forehead support 1360.

In one form, the temporal connectors 1250 may be coupled to the forehead support 1360 in order to allow the display unit housing 1205 to pivot.

In some forms, the pivot connection 1260 may be a ratchet connection, and may maintain the display unit housing 1205 in a raised position without additional user intervention.

5.2.3 Controller

As shown in FIG. 6, some forms of the head-mounted display system 1000 include a controller 1270 that can be engageable by the user in order to provide user input to the virtual environment and/or to control the operation of the head-mounted display system 1000. The controller 1270 can be connected to the head-mounted display unit 1200, and provide the user the ability to interact with virtual objects output to the user from the head-mounted display unit 1200.

5.2.3.1 Handheld Controller

In some forms, the controller 1270 may include a handheld device, and may be easily grasped by a user with a single hand.

In certain forms, the head-mounted display system 1000 may include two handheld controllers. The handheld controllers may be substantially identical to one another, and each handheld controller may be actuatable by a respective one of the user's hands.

In some forms, the user may interact with the handheld controller(s) in order to control and/or interact with virtual objects in the virtual environment.

In some forms, the handheld controller includes a button that may be actuatable by the user. For example, the user's fingers may be able to press the button while grasping the handheld controller.

In some forms, the handheld controller may include a directional control (e.g., a joystick, a control pad, etc.). The user's thumb may be able to engage the directional control while grasping the handheld controller.

In certain forms, the controller 1270 may be wirelessly connected to the head-mounted display unit 1200. For example, the controller 1270 and the head-mounted display unit 1200 may be connected via Bluetooth, Wi-Fi, or any similar means.

In certain forms, the controller 1270 and the head-mounted display unit 1200 may be connected with a wired connection.

5.2.3.2 Fixed Controller

In some forms, at least a portion of the controller 1270 may be integrally formed on the display unit housing 1205.

In some forms, the controller 1270 may include control buttons that are integrally formed on the display unit housing 1205. For example, the control buttons may be formed on the superior face 1230 and/or the inferior face 1232, so as to be engageable by the user's fingers when holding the user's palm rests against the lateral left or right face 1234, 1236 of the display unit housing 1205. Control buttons may also be disposed on other faces of the display unit housing 1205.

In some forms, the user may interact with the control buttons in order to control at least one operation of the head-mounted display system 1000. For example, the control button may be an On/Off button, which may selectively control whether the display screen 1220 is outputting an image to the user.

In certain forms, the control buttons and the head-mounted display unit 1200 may be connected with a wired connection.

In some forms, the head-mounted display system 1000 may include both the handheld controller and the control buttons.

5.2.4 Speaker

With reference to FIG. 6, in some forms the head-mounted display system 1000 includes a sound system or speakers 1272 that may be connected to the head-mounted display unit 1200 and positionable proximate to the user's ears in order to provide the user with an auditory output.

In some forms, the speakers 1272 may be positionable around the user's ears, and may block or limit the user from hearing ambient noise.

In certain forms, the speakers 1272 may be wirelessly connected to the head-mounted display unit 1200. For example, the speakers 1272 and the head-mounted display unit 1200 may be connected via Bluetooth, Wi-Fi, or any similar means.

In some forms, the speaker 1272 includes a left ear transducer and a right ear transducer. In some forms, the left and right ear transducers may output different signals, so that the volume and or noise heard by the user in one ear (e.g., the left ear) may be different than the volume and or noise heard by the user in the other ear (e.g., the right ear).

In some forms, the speaker 1272 (e.g., the volume of the speaker 1272) may be controlled using the controller 1270.

5.2.5 Power Source

With reference to FIG. 6, some forms of the head-mounted display system 1000 may include an electrical power source 1274 can provide electrical power to the head-mounted display unit 1200 and any other electrical components of the head-mounted display system 1000.

In certain forms, the power source 1274 may include a wired electrical connection that may be coupled to an external power source, which may be fixed to a particular location.

In certain forms, the power source 1274 may include a portable battery that may provide power to the head-mounted display unit 1200. The portable battery may allow the user greater mobility than compared to a wired electrical connection.

In certain forms, the head-mounted display system 1000 and/or other electronic components of the head-mounted display system 1000 may include internal batteries, and may be usable without the power source 1274.

In some forms, the head-mounted display system 1000 may include the power source 1274 in a position remote from the head-mounted display unit 1200. Electrical wires may extend from the distal location to the display unit housing 1205 in order to electrically connect the power source 1274 to the head-mounted display unit 1200.

In certain forms, the power source 1274 may be coupled to the positioning and stabilizing structure 1300. For example, the power source 1274 may be coupled to a strap of the positioning and stabilizing structure 1300, either permanently or removably. The power supply 1274 may be coupled to a posterior portion of the positioning and stabilizing structure 1300, so that it may be generally opposite the display unit housing 1205 and/or the head-mounted display unit 1200. The weight of the power source 1274, and the weight of the head-mounted display unit 1200 and the display unit housing 1205 may therefore be spread throughout the head-mounted display system 1000, instead of concentrated at the anterior portion of the head-mounted display system 1000. Shifting weight to the posterior portion of the head-mounted display system 1000 may limit the moment created at the user's face, which may improve comfort and allow the user to wear the head-mounted display system 1000 for longer periods of time.

In certain forms, the power source 1274 may be supported by a user distal to the user's head. For example, the power source 1274 may connected to the head-mounted display unit 1200 and/or the display unit housing 1205 only through an electrical connector (e.g., a wire). The power source 1274 may be stored in the user's pants pocket, on a belt clip, or a similar way which supports the weight of the power source 1274. This removes weight that the user's head is required to support, and may make wearing the head-mounted display system 1000 more comfortable for the user.

In some forms, the head-mounted display unit 1200 may include the power source 1274. For example, the display unit 1220 may be a cell phone, or other similar electronic device, which includes an internal power source 1274.

5.2.6 Control System

With reference to FIG. 6, some forms of the head-mounted display system 1000 include a control system 1276 that assists in controlling the output received by the user. Specifically, the control system 1276 can control visual output from the display screen 1220 and/or auditory output from the speakers 1272.

In some forms, the control system 1276 may include sensors that monitor different parameters (e.g., in the physical environment), and communicates measured parameters to a processor. The output received by the user may be affected by the measured parameters.

In some forms, the control system 1276 is integrated into the head-mounted display unit 1200. In other forms, the control system 1276 is housed in a control system support 1290 that is separate from, but connected to (e.g., electrically connected to) the head-mounted display unit 1200.

5.2.6.1 Power Source

In some forms, the control system 1276 may be powered by the power source 1274, which may be at least one battery used for powering components of the control system 1276. For example, sensors of the control system 1276 may be powered by the power source 1274.

In some forms, the at least one battery of the power source 1274 may be a low power system battery 1278 and a main battery 7008.

In certain forms, the low power system battery 1278 may be used to power a real time (RT) clock 1282 of the control system 1276.

5.2.6.1.1 Integrated Power Support Portion

In some forms, a battery support portion 1288 may support the low power system battery 1278 and/or the main battery 7008. The battery support portion 1288 may be directly supported on the head-mounted display system 1000.

In some forms, the battery support portion 1288 may be disposed within the display unit housing 1205.

In some forms, the battery support portion 1288 may be disposed on the positioning and stabilizing structure 1300. For example, the battery support portion 1288 may be coupled to the posterior support portion 1350. The weight of the head-mounted display system 1000 may be better balanced around the user's head. One form of a battery support portion 1288 is a battery pack housing, which will be described in more detail herein.

5.2.6.1.2 Remote Power Support Portion

In some forms, a battery support portion 1288 may support the low power system battery 1278 and/or the main battery 7008. The battery support portion 1288 may be coupled to the user independently of the positioning and stabilizing structure 1300 and/or the display unit housing 1205 (e.g., it may be coupled via a belt clip). The battery support portion 1288 also may be supported remote from the user's body (e.g., if the head-mounted display system 1000 receives power from a computer or video game console). A tether may couple the battery support portion 1288 to the control system 1276 and/or other electronics. The positioning of the battery support portion may improve comfort for the user, since the weight of the low power system battery 1278 and/or the main battery 7008 are not supported by the user's head.

5.2.6.2 Orientation Sensor

In some forms, the control system 1276 includes an orientation sensor 1284 that can sense the orientation of the user's body. For example, the orientation sensor 1284 may sense when the user rotates their body as a whole, and/or their head individually. In other words, the orientation sensor 1284 may measure an angular position (or any similar parameter) of the user's body. By sensing the rotation, the sensor 1284 may communicate to the display screen 1220 to output a different image.

In some examples, an external orientation sensor may be positioned in the physical environment where the user is wearing the head-mounted display system 1000. The external position sensor may track the user's movements similar to the orientation sensor 1284 described above. Using an external orientation sensor may reduce the weight required to be supported by the user.

5.2.6.2.1 Camera

In some forms, the control system 1276 may include at least one camera, which may be positioned to view the physical environment of the user.

In some forms, the orientation sensor 1284 is a camera, which may be configured to observe the user's physical environment in order to determine the orientation of the user's head (e.g., in what direction the user's head has tilted).

In some forms, the orientation sensor 1284 includes multiple cameras positioned throughout the head-mounted display system 1000 in order to provide a more complete view of the user's physical environment, and more accurately measure the orientation of the user's head.

In some forms, the cameras 1284 are coupled to the anterior face 1238 of the display unit housing 1205. The cameras 1284 may be positioned in order to in order to provide a "first-person" view.

In certain forms, the display screen 1220 may display the user's physical environment by using the cameras 1284, so that the user may feel as though they are viewing their physical environment without assistance from the head-mounted display system 1000 (i.e., the first person view). This may allow the user to move around their physical environment without removing the head-mounted display system 1000.

In one form, virtual objects may be displayed while the display screen 1220 is displaying the user's physical environment. The cameras 1284 may allow the head-mounted display system 1000 to operate as an MR device. The control system 1276 may include a control to switch operation between a VR device and an MR device.

5.2.6.3 Eye Sensor

In some forms, the control system 1276 may include an eye sensor that can track movement of the user's eyes. For example, the eye sensor may be able to measure a position of at least one of the user's eyes, and determine which direction at least one of the user's eyes are looking.

In some forms, the control system 1276 may include two eye sensors. Each sensor may correspond to one of the user's eyes.

In some forms, the eye sensors may be disposed in or proximate to the lenses 1240.

In some forms, the eye sensors may measure an angular position of the user's ears in order to determine the visual output from the display screen 1220.

5.2.6.4 Processing System

In some forms, the control system 1276 includes a processing system that may receive the measurements from the various sensors of the control system 1276.

In some forms, the processing system may receive measurements recorded by the orientation sensor 1284 and/or the eye sensors. Based on these measured values, the processor can communicate with the display screen 1220 in order to change the image being output. For example, if the user's eyes and/or the user's head pivots in the superior direction, the display screen 1220 may display a more superior portion of the virtual environment (e.g., in response to direction from the processing system).

5.3 Augmented Reality Display Interface

As shown in FIGS. 5A and 5B, a display apparatus or head-mounted display system 1000 in accordance with one aspect of the present technology comprises the following functional aspects: a display screen 1220, a display housing 3200, and a positioning and stabilizing structure 1300. In some forms, a functional aspect may provide one or more physical components. In some forms, one or more physical components may provide one or more functional aspects. In use, the display 3100 is arranged to be positioned proximate and anterior to the user's eyes, so as to allow the user to view the display 3100.

In other aspects, the head-mounted display system 1000 may also include an interfacing structure 1100, a controller 1270, a speaker 1272, a power source 1274, and/or a control system 1276. In some examples, these may be integral pieces of the head-mounted display system 1000, while in other examples, these may be modular and incorporated into the head-mounted display system 1000 as desired by the user.

5.3.1 Display Unit

The head-mounted display unit 1200 may include a structure for providing an observable output to a user. Specifically, the head-mounted display unit 1200 is arranged to be held (e.g., manually, by a positioning and stabilizing structure, etc.) in an operational position in front of a user's face.

In some examples, the head-mounted display unit 1200 may include a display screen 1220, a display unit housing 1205, and/or an interfacing structure 1100. These components may be integrally formed in a single head-mounted display unit 1200, or they may be separable and selectively connected by the user to form the head-mounted display unit 1200. Additionally, the display screen 1220, the display unit housing 1205, and/or the interfacing structure 1100 may be included in the head-mounted display system 1000, but may not be part of the head-mounted display unit 1200.

5.3.1.1 Display Screen

As shown in FIG. 5A, some forms of the head-mounted display unit 1200 include a display screen 1220. The display screen 1220 may include electrical components that provide an observable output to the user.

In one form of the present technology shown in FIG. 5A and FIG. 5B, a display screen 1220 provides an optical output observable by the user. The optical output allows the user to observe a virtual environment and/or a virtual object.

The display screen 1220 may be positioned proximate to the user's eyes, in order to allow the user to view the display screen 1220. For example, the display screen 1220 may be positioned anterior to the user's eyes. The display screen 1220 can display computer generated images that can be view by the user in order to augment the user's physical environment (e.g., the computer generated images may appear as though they are present in the user's physical environment).

In some forms, the display screen 1220 is an electronic display. The display screen 1220 may be a liquid crystal display (LCD), or a light emitting diode (LED) screen.

In some forms, the computer generated image may be projected onto the display screen 1220.

In some forms, the display screen 1220 may extend wider a distance between the user's pupils. The display screen 1220 may also be wider than a distance between the user's cheeks.

In some forms, the display screen 1220 may display at least one image that is observable by the user. For example, the display screen 1220 may display images that change based on predetermined conditions (e.g., passage of time, movement of the user, input from the user, etc.).

In certain forms, portions of the display screen 1220 may be visible to only one of the user's eyes. In other words, a portion of the display screen 1220 may be positioned proximate and anterior to only one of the user's eyes (e.g., the right eye), and is blocked from view from the other eye (e.g., the left eye).

In one example, the display screen 1220 may be divided into two sides (e.g., a left side and a right side), and may display two images at a time (e.g., one image on either side).

Each side of the display screen 1220 may display a similar image. In some examples, the images may be identical, while in other examples, the images may be slightly different.

Together, the two images on the display screen 1220 may form a binocular display, which may provide the user with a more realistic AR or MR experience. In other words, the user's brain may process the two images from the display screen 1220 together as a single image. Providing two (e.g., un-identical) images may allow the user to view virtual objects on their periphery, and expand their field of view in the virtual environment.

In certain forms, the display screen 1220 may be positioned in order to be visible by both of the user's eyes. The display screen 1220 may output a single image at a time, which is viewable by both eyes. This may simplify the processing as compared to the multi-image display screen 1220.

In some forms, the head-mounted display system 1000 includes a single lens 1240 (e.g., monocular display). The lens 1240 may be positioned anterior to both eyes (e.g., so that both eyes view the image from the display screen 1220 through the lens 1240), or may be positioned anterior to only one eye (e.g., when the image from the displace screen 1220 is viewable by only one eye). This may be particularly useful in AR or MR, where the user may want limited virtual stimulation, and may wish to observe the physical environment without an overlayed virtual object.

In certain forms, particularly when using the display screen 1220 in an AR or MR environment, the display screen 1220 may be turned off while the user continues to wear the display screen 1220 and interact with the physical environment. This may allow the user to selectively choose when to receive the virtual stimulation, and when to observe only the physical environment.

In certain forms, the display screen 1220 may be transparent (or translucent). For example, the display screen 1220 may be glass, so the user can see through the display screen 1220. This may be particularly beneficial in AR or MR applications, so that the user can continue to see the physical environment.

5.3.1.1.1 Optical Lenses

As shown in FIG. 5A, the display screen 1220 may be disposed within a lens 1240. The user may view an image provided by the display screen 1220 through the lens 1240. The lens 1240 may be transparent and/or translucent along with the display screen 1220 so that the user may observe their physical environment while looking through the lens 1240. In some examples, the user may be able to observe (e.g., visually observe) their physical environment regardless of the presence or absence of a computer generated image output by the display screen 1220.

In some forms, the head-mounted display system 1000 includes two lenses 1240, one for each of the user's eyes. In other words, each of the user's eyes may look through a separate lens positioned anterior to the respective pupil. Each of the lenses 1240 may be identical, although in some examples, one lens 1240 may be different than the other lens 1240 (e.g., have a different magnification). For example, the lenses 1240 may be prescription lenses 1240, and each of the user's eyes may have a different prescription.

In certain forms, the display screen 1220 may output two images simultaneously. Each of the user's eyes may be able to see only one of the two images. The images may be displayed side-by-side on the display screen 1220. Each lens 1240 permits each eye to observe only the image proximate to the respective eye. The user may observe these two images together as a single image.

In certain forms, each lens 1240 may include a separate display screen 1220 that outputs different images. For example, different computer generated images may be displayed to the user's eyes.

In one form, the user may control whether both, one, or none of the display screens 1220 are outputting simultaneously. This may be beneficial to a user if they wish to switch which eye is observing the computer generated images.

In some forms, the head-mounted display system 1000 includes a single lens 1240 (e.g., monocular display). The lens 1240 may be positioned anterior to both eyes (e.g., so that both eyes view the image from the display screen 1220 through the lens 1240), or may be positioned anterior to only one eye (e.g., when the image from the displace screen 1220 is viewable by only one eye).

5.3.1.2 Display Housing

In some forms of the present technology as shown in FIGS. 5A and 5B, a display unit housing 1205 provides a support structure for the display screen 1220, in order to maintain a position of at least some of the components of the display screen 1220 relative to one another, and may additionally protect the display screen 1220 and/or other components of the head-mounted display unit 1200. The display unit housing 1205 may be constructed from a material suitable to provide protection from impact forces to the display screen 1220. The display unit housing 1205 may also contact the user's face, and may be constructed from a biocompatible material suitable for limiting irritation to the user.

A display unit housing 1205 in accordance with some forms of the present technology may be constructed from a hard, rigid or semi-rigid material, such as plastic.

In certain forms, the rigid or semi-rigid material may be at least partially covered with a soft and/or flexible material (e.g., a textile, silicone, etc.). This may improve biocompatibility and/or user comfort because the at least a portion of the display unit housing 1205 that the user engages (e.g., grabs with their hands) includes the soft and/or flexible material.

A display unit housing 1205 in accordance with other forms of the present technology may be constructed from a soft, flexible, resilient material, such as silicone rubber.

In some forms, the display screen 1220 may project at least partially out of the display unit housing 1205. For example, unlike in a VR head-mounted display system 1000, the display screen 1220 in an AR (or MR) head-mounted display system 1000 may not be completely enclosed by the by the display unit housing 1205. The user may be able to directly view the display screen 1220, and may be able to look through the display screen 1220 (e.g., if the display screen 1220 is transparent or translucent).

In certain forms, the display unit housing 1205 may support sensors or other electronics described below. The display unit housing 1205 may provide protection to the electronics without substantially obstructing the user's view of the display screen 1220.

5.3.1.3 Interface Structure

As shown in FIGS. 5A and 5B, some forms of the present technology include an interfacing structure 1100 is positioned and/or arranged in order to conform to a shape of a user's face, and may provide the user with added comfort while wearing and/or using the head-mounted display system 1000.

In some forms, the interfacing structure 1100 is coupled to a surface of the display unit housing 1205.

In some forms, the interfacing structure 1100 in accordance with the present technology may be constructed from a biocompatible material.

In some forms, the interfacing structure 1100 in accordance with the present technology may be constructed from a soft, flexible, and/or resilient material.

In certain forms, the interfacing structure 1100 in accordance with the present technology may be constructed from silicone rubber and/or foam.

In some forms, the interfacing structure 1100 may contact sensitive regions of the user's face, which may be locations of discomfort. The material forming the interfacing structure 1100 may cushion these sensitive regions, and limit user discomfort while wearing the head-mounted display system 1000.

In certain forms, these sensitive regions may include the user's forehead. Specifically, this may include the region of the user's head that is proximate to the frontal bone, like the Epicranius and/or the *glabella*. This region may be sensitive because there is limited natural cushioning from muscle and/or fat between the user's skin and the bone. Similarly, the ridge of the user's nose may also include little to no natural cushioning.

In some forms, the interfacing structure 1100 can comprise a single element. In some embodiments the interfacing structure 1100 may be designed for mass manufacture. For example, the interfacing structure 1100 can be designed to comfortably fit a wide range of different face shapes and sizes.

In some forms, the interfacing structure 1100 may include different elements that overlay different regions of the user's face. The different portions of the interfacing structure 1100 may be constructed from different materials, and provide the user with different textures and/or cushioning at different regions.

In some forms, the interface structure 1100 may include nasal pads (e.g., as used in eye-glasses) that may contact the lateral sides of the user's nose. The nasal pads may apply light pressure to the user's nose to maintain the position of the head-mounted display system 1000, but may not apply a force that causes significant discomfort (e.g., the nasal pads may not receive a posterior directed tensile force).

5.3.2 Positioning and Stabilizing Structure

As shown in FIGS. 5A to 5B, the display screen 1220 and/or the display unit housing 1205 of the head-mounted display system 1000 of the present technology may be held in position in use by the positioning and stabilizing structure 1300.

To hold the display screen 1220 and/or the display unit housing 1205 in its correct operational position, the positioning and stabilizing structure 1300 is ideally comfortable against the user's head in order to accommodate the induced loading from the weight of the display unit in a manner that minimise facial markings and/or pain from prolonged use. There is also need to allow for a universal fit without trading off comfort, usability and cost of manufacture. The design criteria may include adjustability over a predetermined range with low-touch simple set up solutions that have a low dexterity threshold. Further considerations include catering for the dynamic environment in which the head-mounted display system 1000 may be used. As part of the immersive experience of a virtual environment, users may communicate, i.e. speak, while using the head-mounted display system 1000. In this way, the jaw or mandible of the user may move relative to other bones of the skull. Additionally, the whole head may move during the course of a period of use of the head-mounted display system 1000. For example, movement of a user's upper body, and in some cases lower body, and in particular, movement of the head relative to the upper and lower body.

In one form the positioning and stabilizing structure 1300 provides a retention force to overcome the effect of the gravitational force on the display screen 1220 and/or the display unit housing 1205.

In one form of the present technology, a positioning and stabilizing structure 1300 is provided that is configured in a manner consistent with being comfortably worn by a user. In one example the positioning and stabilizing structure 1300 has a low profile, or cross-sectional thickness, to reduce the perceived or actual bulk of the apparatus. In one example, the positioning and stabilizing structure 1300 comprises at least one strap having a rectangular cross-section. In one example the positioning and stabilizing structure 1300 comprises at least one flat strap.

In one form of the present technology, a positioning and stabilizing structure 1300 is provided that is configured so as not to be too large and bulky to prevent the user from comfortably moving their head from side to side.

In one form of the present technology, a positioning and stabilizing structure 1300 comprises a strap constructed from a laminate of a textile user-contacting layer, a foam inner layer and a textile outer layer. In one form, the foam is porous to allow moisture, (e.g., sweat), to pass through the strap. In one form, a skin contacting layer of the strap is formed from a material that helps wick moisture away from the user's face. In one form, the textile outer layer comprises loop material to engage with a hook material portion.

In certain forms of the present technology, a positioning and stabilizing structure 1300 comprises a strap that is extensible, e.g. resiliently extensible. For example the strap may be configured in use to be in tension, and to direct a force to draw the display screen 1220 and/or the display unit housing 1205 toward a portion of a user's face, particularly proximate to the user's eyes and in line with their field of vision. In an example the strap may be configured as a tie.

In one form of the present technology, the positioning and stabilizing structure 1300 comprises a first tie, the first tie being constructed and arranged so that in use at least a portion of an inferior edge thereof passes superior to an otobasion superior of the user's head and overlays a portion of a parietal bone without overlaying the occipital bone.

In one form of the present technology, the positioning and stabilizing structure 1300 includes a second tie, the second tie being constructed and arranged so that in use at least a portion of a superior edge thereof passes inferior to an otobasion inferior of the user's head and overlays or lies inferior to the occipital bone of the user's head.

In one form of the present technology, the positioning and stabilizing structure 1300 includes a third tie that is constructed and arranged to interconnect the first tie and the second tie to reduce a tendency of the first tie and the second tie to move apart from one another.

In certain forms of the present technology, a positioning and stabilizing structure 1300 comprises a strap that is bendable and e.g. non-rigid. An advantage of this aspect is that the strap is more comfortable against a user's head.

In certain forms of the present technology, a positioning and stabilizing structure 1300 comprises a strap constructed to be breathable to allow moisture vapour to be transmitted through the strap, In certain forms of the present technology, a system is provided comprising more than one positioning and stabilizing structure 1300, each being configured to provide a retaining force to correspond to a different size and/or shape range. For example the system may comprise one form of positioning and stabilizing structure 1300 suitable for a large sized head, but not a small sized head, and another. suitable for a small sized head, but not a large sized head.

In some forms, the positioning and stabilizing structure 1300 may include cushioning material (e.g., a foam pad) for contacting the user's skin. The cushioning material may provide added wearability to the positioning and stabilizing structure 1300, particularly if positioning and stabilizing structure 1300 is constructed from a rigid or semi-rigid material.

5.3.2.1 Temporal Connectors

As shown in FIG. 5B, some forms of the positioning and stabilizing structure 1300 include temporal connectors 1250, each of which may overlay a respective one of the user's temporal bones in use. A portion of the temporal connectors 1250, in-use, are in contact with a region of the user's head proximal to the otobasion superior, i.e. above each of the user's ears.

The temporal connectors 1250 may be lateral portions of the positioning and stabilizing structure 1300, as each temporal connector 1250 is positioned on either the left or the right side of the user's head.

In some forms, the temporal connectors 1250 may extend in an anterior-posterior direction, and may be substantially parallel to the sagittal plane.

In some forms, the temporal connectors 1250 may be coupled to the display unit housing 1205. For example, the temporal connectors 1250 may be connected to lateral sides of the display unit housing 1205.

In some forms, the temporal connectors 1250 may be arranged in-use to run generally along or parallel to the Frankfort Horizontal plane of the head and superior to the zygomatic bone (e.g., above the user's cheek bone).

In some forms, the temporal connectors 1250 may be positioned against the user's head similar to arms of eyeglasses, and be positioned more superior than the anti-helix of each respective ear.

In some forms, the temporal connectors 1250 may have a generally elongate and flat configuration. In other words, each temporal connector 1250 is far longer and wider (direction from top to bottom in the paper plane) than thick (direction into the paper plane).

In some forms, the temporal connectors 1250 may each have a three-dimensional shape which has curvature in all three axes (X, Y and Z). Although the thickness of each temporal connector 1250 may be substantially uniform, its height varies throughout its length. The purpose of the shape and dimension of each temporal connector 1250 is to conform closely to the head of the user in order to remain unobtrusive and maintain a low profile (e.g., not appear overly bulky).

In some forms, the temporal connectors 1250 may be constructed from a rigid or semi-rigid material, which may include plastic, Hytrel (thermoplastic polyester elastomer), or another similar material. The rigid or semi-rigid material may be self-supporting and/or able to hold its shape without being worn. This can make it more intuitive or obvious for users to understand how to use the positioning and stabilizing structure 1300 and may contrast with a positioning and stabilizing structure 1300 that is entirely floppy and does not retain a shape. Maintaining the temporal connectors 1250 in the in-use state prior to use may prevent or limit distortion whilst the user is donning the positioning and stabilizing structure 1300 and allow a user to quickly fit or wear the head-mounted display system 1000.

In certain forms, the temporal connectors 1250 may be rigidizers, which may allow for a more effective (e.g., direct) translation of tension through the temporal connectors 1250 because rigidizers limit the magnitude of elongation or deformation of the arm while in-use.

In certain forms, the positioning and stabilizing structure 1300 may be designed so that the positioning and stabilizing structure 1300 springs 'out of the box' and generally into its in-use configuration. In addition, the positioning and stabilizing structure 1300 may be arranged to hold its in-use shape once out of the box (e.g., because rigidizers may be formed to maintain the shape of some or part of the positioning and stabilizing structure 1300). Advantageously, the orientation of the positioning and stabilizing structure 1300 is made clear to the user as the shape of the positioning and stabilizing structure 1300 is generally curved much like the rear portion of the user's head. That is, the positioning and stabilizing structure 1300 is generally dome shaped.

In certain forms, a flexible and/or resilient material may be disposed around the rigid or semi-rigid material of the temporal connectors 1250. The flexible material may be more comfortable against the user's head, in order to improve wearability and provide soft contact with the user's face. In one form, the flexible material is a textile sleeve at is permanently or removably coupled to each temporal connector 1250.

In one form, a textile may be over-moulded onto at least one side of the rigidizer. In one form, the rigidizer may be formed separately to the resilient component and then a sock of user contacting material (e.g., Breath-O-Prene™) may be wrapped or slid over the rigidizer. In alternative forms, the user contacting material may be provided to the rigidizer by adhesive, ultrasonic welding, sewing, hook and loop material, and/or stud connectors.

In some forms, the user contacting material may be on both sides of the rigidizer, or alternatively may only be on the user contacting side (e.g., the user contacting side) of the rigidizer to reduce bulk and cost of materials.

In some forms, the temporal connectors 1250 are constructed from a flexible material (e.g., a textile), which may be comfortable against the user's skin, and may not require an added layer to increase comfort.

Some forms of the positioning and stabilizing structure 1300 may include only temporal connectors 1250. The temporal connectors 1250 may be shaped like temples or arms of eye-glasses, and may rest against the user's head in a similar manner. For example, the temporal arms 3304 may provide a force directed into lateral sides of the user's head (e.g., toward the respective temporal bone).

5.3.2.2 Posterior Support Portion

As shown in FIG. 5B, some forms of the positioning and stabilizing structure 1300 may include a rear support, e.g. a posterior support portion 1350 for assisting in supporting the display screen 1220 and/or the display unit housing 1205 proximate to the user's eyes. The posterior support portion 1350 may assist in anchoring the display screen 1220 and/or the display unit housing 1205 to the user's head in order to appropriately orient the display screen 1220 proximate to the user's eyes.

In some forms, the posterior support portion 1350 may be coupled to the display unit housing 1205 via the temporal connectors 1250.

In certain forms, the temporal connectors 1250 may be directly coupled to the display unit housing 1205 and to the posterior support portion 1350.

In some forms, the posterior support portion 1350 may have a three-dimensional contour curve to fit to the shape of a user's head. For example, the three-dimensional shape of the posterior support portion 1350 may have a generally round three-dimensional shape adapted to overlay a portion of the parietal bone and the occipital bone of the user's head, in use.

In some forms, the posterior support portion 1350 may be a posterior portion of the positioning and stabilizing structure 1300. The posterior support portion 1350 may provide an anchoring force directed at least partially in the anterior direction.

In certain forms, the posterior support portion 1350 is the inferior-most portion of the positioning and stabilizing structure 1300. For example, the posterior support portion 1350 may contact a region of the user's head between the occipital bone and the trapezius muscle. The posterior support portion 1350 may hook against an inferior edge of the occipital bone (e.g., the occiput). The posterior support portion 1350 may provide a force directed in the superior direction and/or the anterior direction in order to maintain contact with the user's occiput.

In certain forms, the posterior support portion 1350 is the inferior-most portion of the entire head-mounted display system 1000. For example, the posterior support portion 1350 may be positioned at the base of the user's neck (e.g., overlaying the occipital bone and the trapezius muscle more inferior than the user's eyes) so that the posterior support portion 1350 is more inferior than the display screen 1220 and/or the display unit housing 1205.

In some forms, the posterior support portion 1350 may include a padded material, which may contact the user's head (e.g., overlaying the region between the occipital bone and the trapezius muscle). The padded material may provide additional comfort to the user, and limit marks caused by the posterior support portion 1350 pulling against the user's head.

5.3.2.3 Forehead Support

As shown in FIGS. 5A and 5B, some forms of the positioning and stabilizing structure 1300 may include a forehead support 1360 that can contact the user's head superior to the user's eyes, while in use. For example, the forehead support 1360 may overlay the frontal bone of the user's head. In certain forms, the forehead support 1360 may also be more superior than the sphenoid bones and/or the temporal bones. This may also position the forehead support 1360 more superior than the user's eyebrows.

In some forms, the forehead support 1360 may be an anterior portion of the positioning and stabilizing structure 1300, and may be disposed more anterior on the user's head than any other portion of the positioning and stabilizing structure 1300. The posterior support portion 1350 may provide a force directed at least partially in the posterior direction.

In some forms, the forehead support 1360 may include a cushioning material (e.g., textile, foam, silicone, etc.) that may contact the user, and may help to limit marks caused by the straps of the positioning and stabilizing structure 1300. The forehead support 1360 and the interfacing structure 1100 may work together in order to provide comfort to the user.

In some forms, the forehead support 1360 may be separate from the display unit housing 1205, and may contact the user's head at a different location (e.g., more superior) than the display unit housing 1205.

In some forms, the forehead support 1360 can be adjusted to allow the positioning and stabilizing structure 3000 to accommodate the shape and/or configuration of a user's face.

In some forms, the temporal connectors 1250 may be coupled to the forehead support 1360 (e.g., on lateral sides of the forehead support 1360). The temporal connectors 1250 may extend at least partially in the inferior direction in order to couple to the posterior support portion 1350.

In certain forms, the positioning and stabilizing structure 1300 may include multiple pairs of temporal connectors 1250. For example, one pair of temporal connectors 1250 may be coupled to the forehead support 1360, and one pair of temporal connectors 1250 may be coupled to the display unit housing 1205.

In some forms, the forehead support 1360 can be presented at an angle which is generally parallel to the user's forehead to provide improved comfort to the user. For example, the forehead support 1360 may position the user in an orientation that overlays the frontal bone, and is substantially parallel to the coronal plane. Positioning the forehead support substantially parallel to the coronal plane can reduce the likelihood of pressure sores which may result from an uneven presentation.

In some forms, the forehead support 1360 may be offset from a rear support that contacts a posterior region of the user's head (e.g., an area overlaying the occipital bone and the trapezius muscle). In other words, an axis along a rear strap would not intersect the forehead support 1360, which may be disposed more inferior and anterior than the axis along the rear strap. The resulting offset between the forehead support 1360 and the rear strap may create moments that oppose the weight force of the display screen 1220 and/or the display unit housing 1205. A larger offset may create a larger moment, and therefore more assistance in maintaining a proper position of the display screen 1220 and/or the display unit housing 1205. The offset may be increased by moving the forehead support 1360 closer to the user's eyes (e.g., more anterior and inferior along the user's head), and/or increasing the angle of the rear strap so that it is more vertical.

5.3.2.4 Adjustable Straps

Portions of the positioning and stabilizing structure 1300 may be adjustable, in order to impart a selective tensile force on the display screen 1220 and/or the display unit housing 1205 in order to secure a position of the display screen 1220 and/or the display unit housing 1205.

In some forms, the display unit housing 1205 may include at least one loop or eyelet 1254, and at least one of the temporal connectors 1250 may be threaded through that loop, and doubled back on itself. The length of a strap of the positioning and stabilizing structure 1300 threaded through the respective eyelet 1254 may be selected by the user in order to adjust the tensile force. For example, threading a greater length through the eyelet 1254 may supply a greater tensile force.

In some forms, at least one of the temporal connectors 1250 may include an adjustment portion 1256 and a receiving portion 1258. The adjustment portion 1256 may be positioned through the eyelet 1254 on the display unit housing 1205, and may be coupled to the receiving portion 1258 (e.g., by doubling back on itself). The adjustment portion 1256 may include a hook material, and the receiving portion 1258 may include a loop material (or vice versa), so that the adjustment portion 1256 may be removably held in the desired position. In some examples, the hook material and the loop material may be Velcro.

In certain forms, the strap may be constructed at least partially from a flexible and/or resilient material, which may conform to a shape of the user's head and/or may allow the adjustment portion to be threaded through the eyelet 1254. For example, the adjustment portion(s) 1256 may be constructed from an elastic textile, which may provide an elastic, tensile force. The remained of the temporal connectors 1250 may be constructed from the rigid or semi-rigid material described above (although it is contemplated that additional sections of the temporal connectors 1250 may also be constructed from a flexible material).

5.3.2.4.1 Top Strap Portion

In some forms, the positioning and stabilizing structure 3000 may include a top strap portion 1340, which may overlay a superior region of the user's head.

In some forms, the top strap portion 1340 may extend between an anterior portion of the head-mounted display system 1000 and a posterior region of the head-mounted display system 1000.

In some forms, the top strap portion 1340 may be constructed from a flexible material, and may be configured to compliment the shape of the user's head.

In certain forms, the top strap portion 1340 may be connected to the display unit housing 1205. For example, the top strap portion 1340 may be coupled to the superior face 1230. The top strap portion 1340 may also be coupled to the display housing 3528 proximate to a posterior end of the display unit housing 1205.

In certain forms, the top strap portion 1340 may be coupled to the forehead support 1360. For example, the top strap portion 1340 may be coupled to the forehead support 1360 proximate to a superior edge. The top strap portion 1340 may be connected to the display unit housing 1205 through the forehead support 1360.

In some forms, the top strap portion 1340 may be connected to the posterior support portion 1350. For example, the top strap portion 1340 may be connected proximate to a superior edge of the posterior support portion 1350.

In some forms, the top strap portion 1340 may overlay the frontal bone and the pariental bone of the user's head.

In certain forms, the top strap portion 1340 may extend along the sagittal plane as it extends between the anterior and posterior portions of the head-mounted display system 1000.

In certain forms, the top strap portion 1340 may apply a tensile force oriented at least partially in the superior direction, which may oppose the force of gravity.

In some forms, the top strap portion 1340 may be adjustable in order to impart a selective tensile force on the display screen 1220 and/or the display unit housing 1205 in order to secure a position of the display screen 1220 and/or the display unit housing 1205.

In certain forms, the display unit housing 1205 and/or the forehead support 1360 may include at least one loop or eyelet 1254, and the top strap portion 1340 may be threaded through that eyelet 1254, and doubled back on itself. The length of the top strap portion 1340 threaded through the eyelet 1254 may be selected by the user in order to adjust the tensile force provided by the positioning and stabilizing structure 1300. For example, threading a greater length of the top strap portion 1340 through the eyelet 1254 may supply a greater tensile force.

In some forms, the top strap portion 1340 may include an adjustment portion and a receiving portion. The adjustment portion may be positioned through the eyelet 1254, and may be coupled to the receiving portion (e.g., by doubling back on itself). The adjustment portion may include a hook material, and the receiving portion may include a loop material (or vice versa), so that the adjustment portion may be removably held in the desired position. In some examples, the hook material and the loop material may be Velcro.

5.3.2.5 Rotational Control

In some forms, the display unit housing 1205 and/or the display screen 1220 may pivot relative to the user's face while the user has donned the positioning and stabilizing structure 1300. This may allow the user to see the physical environment without looking through the head-mounted display unit 1200 (e.g., without viewing computer generated images). This may be useful for users who want to take a break for viewing the virtual environment, but do not wish to doff the positioning and stabilizing structure 1300.

In certain forms, the pivot connection 1260 may be coupled to the temporal connectors 1250. The head-mounted display unit 1200 may be able to pivot about an axis extending between the temporal connectors 1250 (e.g., a substantially horizontal axis that may be substantially perpendicular to the Frankfort horizontal, in use).

In certain forms, the display screen 1220 and/or the display unit housing 1205 includes a pair of arms 1210, which extend away from the display screen 1220 (e.g., in a cantilevered configuration), and may extend in the posterior direction, in use.

In certain forms, the pair of arms 1210 may extend at least partially along the temporal connectors 1250, and may connect to the temporal connectors 1250 at the pivot connection 1260.

In some forms, the pivot connection 1260 may be a ratchet connection, and may maintain the display unit housing 1205 in a raised position without additional user intervention.

In some forms, the display screen 1220 and/or the display unit housing 1205 may include a neutral position (see e.g., FIG. 5B; substantially horizontal in use) and a pivoted position (e.g., pivoted relative to the horizontal axis, in use).

In certain forms, the display screen 1220 and/or the display unit housing 1205 may pivot between approximately 0° and approximately 90° relative to the temporal connectors 1250. In certain forms, the display screen 1220 and/or the display unit housing 1205 may pivot between approximately 0° and approximately 80° relative to the temporal connectors 1250. In certain forms, the display screen 1220 and/or the display unit housing 1205 may pivot between approximately 0° and approximately 70° relative to the temporal connectors 1250. In certain forms, the display screen 1220 and/or the display unit housing 1205 may pivot between approximately 0° and approximately 60° relative to the temporal connectors 1250. In certain forms, the display screen 1220 and/or the display unit housing 1205 may pivot between approximately 0° and approximately 50° relative to the temporal connectors 1250. In certain forms, the display screen 1220 and/or the display unit housing 1205 may pivot between approximately 0° and approximately 45° relative to the temporal connectors 1250. At least at its maximum pivotal position, the display screen 1220 may be more superior than the user's eyes, so that the user does not have to look through the display screen 1220 to view the physical environment.

5.3.3 Controller

As shown in FIG. 6, some forms of the head-mounted display system 1000 include a controller 1270 that can be engagable by the user in order to provide user input to the virtual environment and/or to control the operation of the head-mounted display system 1000. The controller 1270 can be connected to the head-mounted display unit 1200, and provide the user the ability to interact with virtual objects output to the user from the head-mounted display unit 1200.

5.3.3.1 Handheld Controller

In some forms, the controller 1270 may include a handheld device, and may be easily grasped by a user with a single hand.

In certain forms, the head-mounted display system 1000 may include two handheld controllers. The handheld controllers may be substantially identical to one another, and each handheld controller may be actuatable by a respective one of the user's hands.

In some forms, the user may interact with the handheld controller(s) in order to control and/or interact with virtual objects in the virtual environment.

In some forms, the handheld controller includes a button that may be actuatable by the user. For example, the user's fingers may be able to press the button while grasping the handheld controller.

In some forms, the handheld controller may include a directional control (e.g., a joystick, a control pad, etc.). The user's thumb may be able to engage the directional control while grasping the handheld controller.

In certain forms, the controller 1270 may be wirelessly connected to the head-mounted display unit 1200. For example, the connector 1270 and the head-mounted display unit 1200 may be connected via Bluetooth, Wi-Fi, or any similar means.

In certain forms, the controller 1270 and the head-mounted display unit 1200 may be connected with a wired connection.

5.3.3.2 Fixed Controller

In some forms, at least a portion of the controller 1270 may be integrally formed on the display unit housing 1205.

In some forms, the controller 1270 may include control buttons that are integrally formed on the display unit housing 1205. For example, the control buttons may be formed on the superior face 1230 and/or the inferior face 1232, so as to be engageable by the user's fingers when holding the user's palm rests against the lateral left or right face 1234, 1236 of the display unit housing 1205. Control buttons may also be disposed on other faces of the display unit housing 1205.

In some forms, the user may interact with the control buttons in order to control at least one operation of the head-mounted display system 1000. For example, the control button may be an On/Off button, which may selectively control whether the display screen 1220 is outputting an image to the user.

In certain forms, the control buttons and the head-mounted display unit 1200 may be connected with a wired connection.

In some forms, the head-mounted display system 1000 may include both the handheld controller and the control buttons.

In some forms, having only control button(s) may be preferable in an AR or MR device. While wearing the AR or MR head-mounted display system 1000, the user may be interacting with their physical environment (e.g., walking around, using tools, etc.). Thus, the user may prefer to keep their hands free of controllers 1270.

5.3.4 Speaker

As shown in FIG. 6, some forms of the head-mounted display system 1000 includes a sound system or speakers 1272 that may be connected to the head-mounted display unit 1200 and positionable proximate to the user's ears in order to provide the user with an auditory output.

In some forms, the speakers 1272 be positionable around the user's ears, and may block or limit the user from hearing ambient noise.

In certain forms, the speakers 1272 may be wirelessly connected to the head-mounted display unit 1200. For example, the speakers 1272 and the head-mounted display unit 1200 may be connected via Bluetooth, Wi-Fi, or any similar means.

In some forms, the speaker 1272 includes a left ear transducer and a right ear transducer. In some forms, the left and right ear transducers may output different signals, so that the volume and or noise heard by the user in one ear (e.g., the left ear) may be different than the volume and or noise heard by the user in the other ear (e.g., the right ear).

In some forms, the speaker 1272 (e.g., the volume of the speaker 1272) may be controlled using the controller 1270.

5.3.5 Power Source

As shown in FIG. 6, some forms of the head-mounted display system 1000 may include an electrical power source 1274 can provide electrical power to the head-mounted display unit 1200 and any other electrical components of the head-mounted display system 1000.

In certain forms, the power source 1274 may include a wired electrical connection that may be coupled to an external power source, which may be fixed to a particular location.

In certain forms, the power source 1274 may include a portable battery that may provide power to the head-mounted display unit 1200. The portable battery may allow the user greater mobility than compared to a wired electrical connection.

In certain forms, the head-mounted display system 1000 and/or other electronic components of the head-mounted display system 1000 may include internal batteries, and may be usable without the power source 1274.

In some forms, the head-mounted display system 1000 may include the power source 1274 in a position remote from the head-mounted display unit 1200. Electrical wires may extend from the distal location to the display unit housing 1205 in order to electrically connect the power source 1274 to the head-mounted display unit 1200.

In certain forms, the power source 1274 may be coupled to the positioning and stabilizing structure 1300. For example, the power source 1274 may be coupled to a strap of the positioning and stabilizing structure 1300, either permanently or removably. The power supply 1274 may be coupled to a posterior portion of the positioning and stabilizing structure 1300, so that it may be generally opposite the display unit housing 1205 and/or the head-mounted display unit 1200. The weight of the power source 1274, and the weight head-mounted display unit 1200 and the display unit housing 1205 may therefore be spread throughout the head-mounted display system 1000, instead of concentrated at the anterior portion of the head-mounted display system 1000. Shifting weight to the posterior portion of the display interface may limit the moment created at the user's face, which may improve comfort and allow the user to wear the head-mounted display system 1000 for longer periods of time.

In certain forms, the power source 1274 may be supported by a user distal to the user's head. For example, the power source 1274 may connected to the head-mounted display unit 1200 and/or the display unit housing 1205 only through an electrical connector (e.g., a wire). The power source 1274 may be stored in the user's pants pocket, on a belt clip, or a similar way which supports the weight of the power source 1274. This removes weight that the user's head is required to support, and may make wearing the head-mounted display system 1000 more comfortable for the user.

5.3.6 Control System

In some forms, the control system 1276 may be powered by the power source 1274 (e.g., at least one battery) used for powering components of the control system 1276. For example, sensors of the control system 1276 may be powered by the power source 1274.

In some forms, the at least one battery of the power source 1274 may be a low power system battery 1278 and a main battery 7008.

In certain forms, the low power system battery 1278 may be used to power a real time (RT) clock 1282 of the control system 1276.

5.3.6.1.1 Integrated Power Support Portion

In some forms, a battery support portion 1288 may support the low power system battery 1278 and/or the main battery 7008. The battery support portion 1288 may be directly supported on the head-mounted display system 1000.

In some forms, the battery support portion 1288 may be disposed within the display unit housing 1205.

In some forms, the battery support portion 1288 may be disposed on the positioning and stabilizing structure 1300. For example, the battery support portion 1288 may be coupled to the posterior support portion 1350. The weight of the head-mounted display system 1000 may be better balanced around the user's head.

5.3.6.1.2 Remote Power Support Portion

In some forms, a battery support portion 1288 may support the low power system battery 1278 and/or the main battery 1280. The battery support portion 1288 may be coupled to the user independently of the positioning and stabilizing structure 1300 and/or the display unit housing 1205 (e.g., it may be coupled via a belt clip). The battery support portion 1288 also may be supported remote from the user's body (e.g., if the head-mounted display system 1000 receives power from a computer or video game console). A tether may couple the battery support portion 1288 to the control system 1276 and/or other electronics. The positioning of the battery support portion may improve comfort for the user, since the weight of the low power system battery 1278 and/or the main battery 7008 are not supported by the user's head.

5.3.6.2 Orientation Sensor

In some forms, the control system 1276 includes an orientation sensor 1284 that can sense the orientation of the user's body. For example, the orientation sensor 1284 may sense when the user rotates their body as a whole, and/or their head individually. In other words, the orientation sensor 1284 may measure an angular position (or any similar parameter) of the user's body. By sensing the rotation, the sensor 1284 may communicate to the display screen 1220 to output a different image.

In some examples, an external orientation sensor may be positioned in the physical environment where the user is wearing the head-mounted display system 1000. The external position sensor may track the user's movements similar to the orientation sensor 1284 described above. Using an external orientation sensor may reduce the weight required to be supported by the user.

5.3.6.2.1 Camera

In some forms, the control system 1276 may include at least one camera, which may be positioned to view the physical environment of the user.

In some forms, the orientation sensor 1284 is a camera, which may be configured to observe the user's physical environment in order to measure and determine the orientation of the user's head (e.g., in what direction the user's head has tilted).

In some forms, the orientation sensor 1284 includes multiple cameras positioned throughout the head-mounted display system 1000 in order to provide a more complete view of the user's physical environment, and more accurately measure the orientation of the user's head.

5.3.6.3 Eye Sensor

In some forms, the control system 1276 may include an eye sensor that can track movement of the user's eyes. For example, the eye sensor may be able to measure a position of at least one of the user's eyes, and determine which direction at least one of the user's eyes are looking.

In some forms, the control system 1276 may include two eye sensors. Each sensor may correspond to one of the user's eyes.

In some forms, the eye sensors may be disposed in or proximate to the lenses 1240.

In some forms, the eye sensors may measure an angular position of the user's ears in order to determine the visual output from the display screen 1220.

In some forms, the user's eye may act as a controller, and the user may move their eyes in order to interact with virtual objects. For example, a virtual cursor may follow the position of the user's eyes. The eye sensor may track and measure the movement of the user's eyes, and communicate with a processing system 1286 (described below) in order to move the virtual cursor.

5.3.6.4 Processing System

In some forms, the control system 1276 includes a processing system 1286 (e.g., a microprocessor) that may receive the measurements from the various sensors of the control system 1276.

In some forms, the processing system 1286 may receive measurements recorded by the orientation sensor 1284 and/or the eye sensors. Based on these measured values, the processor can communicate with the display screen 1220 in order to change the image being output. For example, if the users eyes and/or the user's head pivots in the superior direction, the display screen 1220 may display a more superior portion of the virtual environment (e.g., in response to direction from the processing system 1286).

5.4 Head-Mounted Display Systems which May Comprise Separate Battery Packs

FIGS. 7A-7C, 8, 9, 21A-21E, 23A-23D, 28A-28E, 31A-31B, 32A-32C and 33 show examples of head-mounted display systems 1000. In these particular examples the head-mounted display systems 1000 are configured for use as virtual reality (VR) headsets. The head-mounted display system 1000 in each of these examples comprises a head-mounted display unit 1200 and a battery pack 1500. The head-mounted display unit 1200 may comprise a display configured for VR. The battery pack 1500 is configured for powering the head-mounted display system 1000. While various features are described herein in the context of a head-mounted display system 1000 comprising a battery pack 1500 separate from a head-mounted display unit 1200, it is to be understood that, unless the context requires otherwise, each feature may also be applied in head-mounted display system 1000 which does not comprise a battery pack 1500 separate from a head-mounted display unit or which includes a battery pack 1500 located elsewhere than posterior to the user's head.

Each head-mounted display system 1000 comprises a positioning and stabilising structure 1300 configured to hold the head-mounted display unit 1200 anterior to a user's eyes such that the display is viewable by the user in use. The head-mounted display unit 1200 may also be configured to hold the battery posterior to the user's head in use.

The positioning and stabilizing structure 1300 comprises a posterior support portion 1350 configured to engage a posterior portion of a user's head, the posterior support portion 1350 in these examples comprising a parietal strap portion 1310 configured to overlie the parietal bones of the user's head in use and an occipital strap portion 1320 configured to overlie or lie below an occipital bone of the user's head in use.

In these examples, the positioning and stabilizing structure 1300 further comprises a pair of lateral strap portions 1330 configured to connect between the posterior support portion 1350 and the head-mounted display unit 1200, each configured to be located on a respective lateral side of the user's head in use.

The positioning and stabilizing structure 1300 may further comprise a top strap portion 1340 configured to connect between the battery pack 1500 and the head-mounted display unit 1200. The top strap portion 1340 may be configured to overlie a superior portion of the user's head in use.

5.4.1 Parietal Strap Portion

In the examples shown in FIGS. 7A-7C, 8, 9, 21A-21E, 23A-23D, 28A-28E, 31A-31B, 32A-32C and 33, the position of the parietal strap portion 1310 is moveable with respect to the top strap portion 1340 in the anterior and posterior directions. That is, the user is able to move the parietal strap portion 1310 through a range of positions on their head without also moving the top strap portion 1340. The ability to move the parietal strap portion 1310 may advantageously allow the user to spread the parietal strap portion 1310 and occipital strap portion 1320 apart without moving the top strap portion 1340. Spreading the parietal strap portion 1310 and occipital strap portion 3120 may advantageously create hoop stress within the loop formed by these two portions, providing for a secure fit to the posterior surfaces of the user's head. In particular, an angle between the parietal strap portion 1310 and the occipital strap portion 1320 may be able to be adjusted by the user.

The parietal strap portion 1310 passes underneath the top strap portion 1340 in this example. By passing underneath, the parietal strap portion 1310 may advantageously be able to engage the user's head securely (e.g. sufficiently tightly) without limiting the ability of the top strap portion 1340 to be moved in the anterior-posterior directions.

As shown in particular in FIGS. 7B and 7C, the top strap portion 1340 may pass through a buckle 1312 connected to the parietal strap portion 1310. The buckle 1312 may be configured to limit lateral movement of the top strap portion 1340, which may advantageously keep the top strap portion 1340 centred on the user's head in use. In this example, the buckle 1312 is located in the sagittal plane of the user's head in use. In this example the buckle 1312 is substantially rigid and may be formed from a thermoplastic material, for example. The buckle 1312 could alternatively be formed from a flexible material, such as a textile material.

In other examples the parietal strap portion 1310 may be immovable with respect to the top strap portion 1340. In some examples the parietal strap portion 1310 is fixedly connected to the top strap portion 1340.

5.4.2 Top Strap Portion

As shown in FIGS. 7A and 7B in particular, the top strap portion 1340 is connected to the occipital strap portion 1320 in this example.

In this example, the top strap portion 1340 is adjustable in length. This may advantageously allow a user to achieve a more secure, stable and/or comfortable fit when wearing the head-mounted display system 1000. The top strap portion 1340 may be adjustable in length between the head-mounted display unit 1200 and the battery pack 1500. Alternatively or additionally, the top strap portion 1320 may be adjustable in length between the head-mounted display unit 1200 and the occipital strap portion 1320.

In this example, the top strap portion 1340 is connected to the head-mounted display unit 1200 through an eyelet 1202 connected to the head-mounted display unit 1200 and looped back and secured to itself. An end portion of the top strap portion 1340 may secure to another portion of the top strap portion 1340 with a hook-and-loop fastener connection.

In the examples shown in FIGS. 7A and 8, an outer layer 1341 of the top strap portion 1340 is configured to be passed through the eyelet 1202 and looped back and secured to itself. However, a user-facing layer 1344 does not pass through the eyelet. The user-facing layer 1344 remains in contact with the user's head. The top strap portion 1340 may be substantially inextensible.

As shown in FIG. 7A and FIG. 8, the top strap portion 1340 comprises a layered construction. That is, the top strap portion 1340 may be formed from a plurality of layers. The top strap portion 1340 comprises a substantially inextensible layer 1343 in these examples, which may prevent the top strap portion 1340 from extending in length (optionally along with other components or layers which may also prevent the top strap portion 1340 from extending in length). As shown in FIG. 7A and FIG. 8, an anterior end of the substantially inextensible layer 1343 is spaced along the length of the top strap portion from the head-mounted display unit. This may advantageously allow the length of the top strap portion 1340 to be adjusted without the head-mounted display unit 1200 interfering with the substantially inextensible layer 1343.

In these examples, the top strap portion comprises a textile user-facing layer 1344. That is, the user-facing layer 1344 may be formed from a textile material. Additionally or alternatively, the top strap portion 1340 may comprise a textile outer layer 1341.

In the examples shown in FIGS. 7A-7C and FIG. 8, the top strap portion 1340 comprises a power cable 1510 connecting the battery pack 1500 to the head-mounted display unit 1200 to provide power from the battery pack to the head-mounted display unit 1200 in use. The battery pack 1500 may power the display and other electronic components. In these examples, the power cable 1510 is internal to the top strap portion 1340.

Figure 21A:
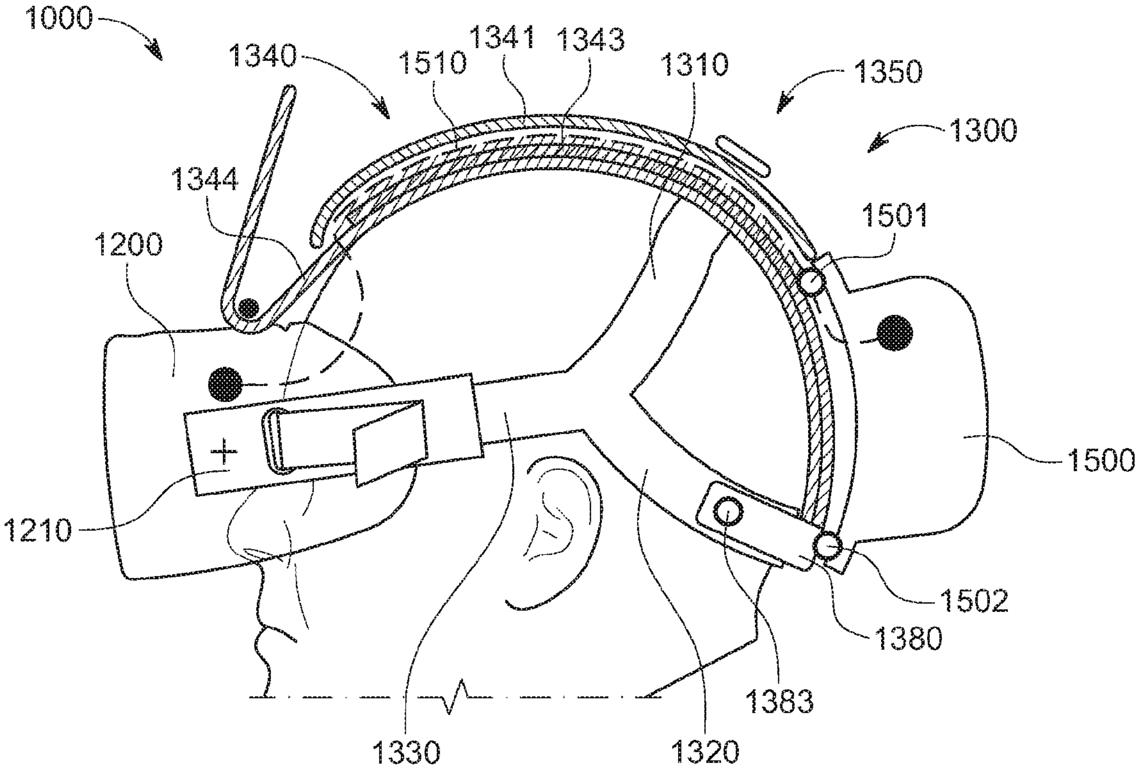
Figure 21B:
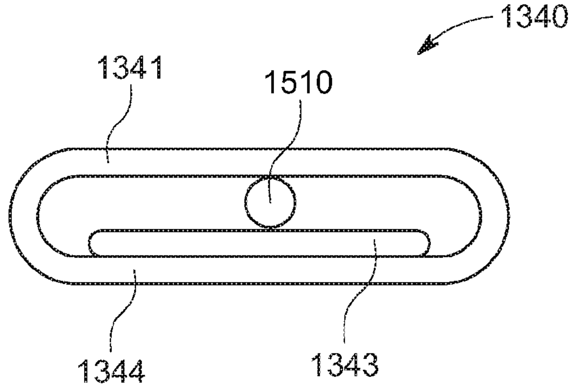
Figure 21C:
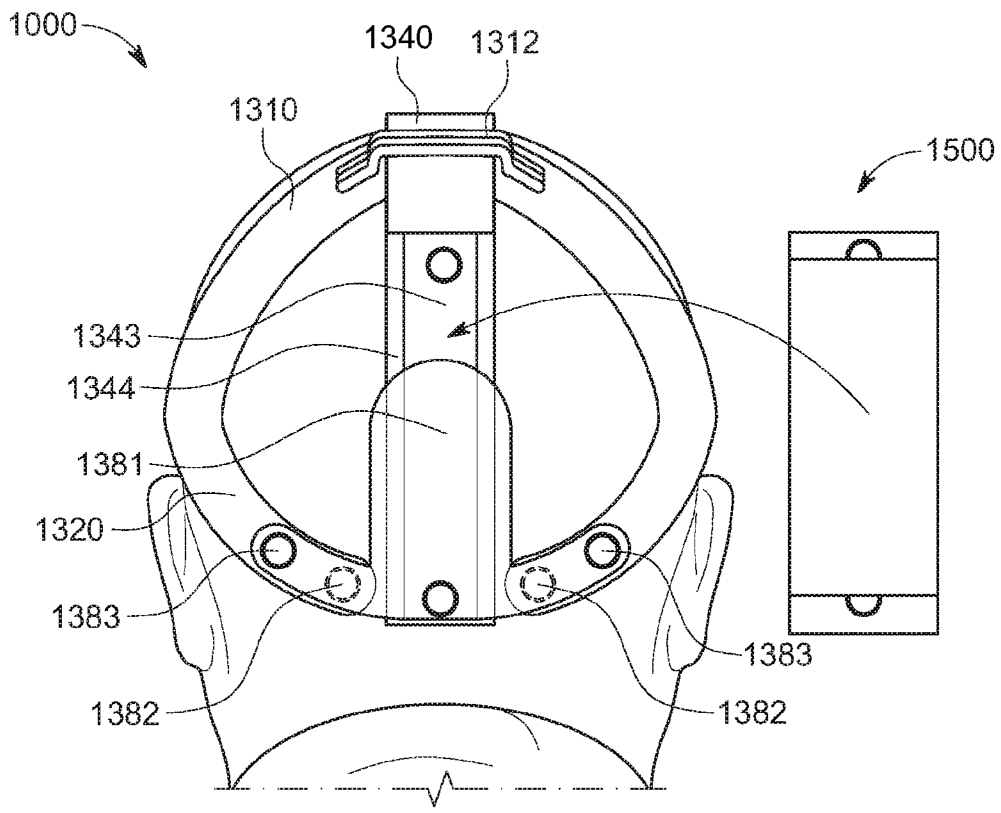

FIG. 22A-22D shows another example of the present technology in which the power cable 1510 is internal to the top strap portion 1340. In this example, the power cable 1510 is insertable through an interior of the top strap portion 1340 by the user. In particular, the power cable 1510 is insertable through the top strap portion 1340 between the substantially inextensible layer 1343 and the outer layer 1341. FIG. 21E shows the positioning and stabilising structure 1300 in a disassembled state and FIGS. 21A and 21C show the head-mounted display system 100 assembled. FIG. 21B is a cross section view showing the interior of the top strap portion 1340 with internal power cable 1510 visible.

5.4.3 Anterior and Posterior Portions of Top Strap Portion

FIG. 33 shows another example of the present technology. In this example the top strap portion 1340 comprises an anterior portion 1345 and a posterior portion 1346. The posterior portion 1346 is configured to engage the user's head in use. However, the anterior portion 1345 is configured to not engage the user's head in use. The anterior portion 1345 is spaced from the user's head. Advantageously, the spacing partially or fully avoids the anterior portion 1345 compressing, impinging or otherwise interfering with the user's hair on the user's head in the area over which the anterior portion 1345 lies in use.

Excessive compression of or interference with the user's hair may result in a lack of comfort during use or embarrassment when the user doffs the head-mounted display system. The top strap portion 1340 with an anterior portion 1345 which does not engage the user's head (e.g. does not press against the user's head) in use may at least partially address these problems or concerns. The amount of contact the anterior portion 1345 may make with a particular user's hair will depend on the length and style of the user's hair. The anterior portion 1345 may not engage the user's head but, if a user has a sufficiently long hair length and/or style, the user's hair may nevertheless contact the anterior portion 1345. However, as the anterior portion 1345 does not engage the user's head, it may not overly compress, interfere with or mess up the user's hair.

The anterior portion 1345 may not engage the user's head by, for example, not being in contact with the user's head (e.g. if it would not be in contact with the user's skin even if the user had no hair), by not pressing, wrapping and/or fitting against and/or exerting force on the user's head. The posterior portion 1346 may engage the user's head by being in contact with the user's head (e.g. if it would be in contact with the user's skin if the user had no hair), by pressing, wrapping and/or fitting against and/or exerting force on the user's head.

As shown in FIG. 33, in this particular example the top strap portion 1340 comprises a shape having a bend between the posterior portion 1346 and the anterior portion 1345. The top strap portion 1340 may be shaped to follow a curvature of the user's head in the posterior portion 1346 of the top strap portion 1340 and deviate from the curvature of the user's head in the anterior portion 1345 of the top strap portion 1340. In some examples, the top strap portion 1340 is rigidised to support the anterior portion 1345 in spaced relation to the user's head. The anterior portion 1345 may be spaced superiorly from a fringe, forehead and/or frontal bone region of the user's head.

As shown in FIG. 33, the anterior portion 1345 curves inferiorly towards the head-mounted display unit 1200. Additionally, the anterior portion 1345 of the top strap portion 1340 may extend in a partially superior direction from the posterior portion 1346 of the top strap portion 1340 (e.g. extends from an anterior end 1347 of the posterior portion 1346).

The anterior portion 1345 of the top strap portion 1340 may be connected to the posterior portion 1346 of the top strap portion 1340 at an anterior end 1347 of the posterior portion 1346.

The anterior end 1347 of the posterior portion 1346 may be located in a number of different locations with respect to the user's head, in various examples of the present technology. The anterior end 1347 may be located posteriorly to a fringe region of the user's head. For example, the anterior end 1347 may be located between a fringe region and the coronal suture of the user's head in use. In some examples the anterior end 1347 is located posteriorly to the frontal bone of the user's head in use. In some examples the anterior end 1347 is located proximate a coronal plane of the user's head in use, the coronal plane aligned with each otobasion superior of the user's head. In some examples the anterior end 1347 is located posterior to the coronal plane aligned with each otobasion superior of the user's head in use. In some examples the anterior end 1347 of the posterior portion 1346 may be located proximate a parietal strap portion 1310 of the positioning and stabilising structure 3300 in use. As described above, the top strap portion 1340 may comprise a bend. The bend may be located at or proximate the anterior end 1347 of the posterior portion 1346, for example as shown in FIG. 33.

As shown in FIG. 33, the top strap portion 1340 connects between the head-mounted display unit 1200 and a battery pack 1500 for powering the head-mounted display system 1000. The battery pack 1500 may be located against a posterior surface of the user's head in use. The top strap portion 1340 may advantageously transfer the downwards weight force of the battery pack 1500 to an upwards supportive force on the head-mounted display unit 1200 countering a downwards weight force of the head-mounted display unit 1200.

The top strap portion 1340 may be adjustable in length. As shown in FIG. 33, the top strap portion 1340 is configured to be connected to the head-mounted display unit 1200 through an eyelet 1202 connected to a display unit housing 1205 of the head-mounted display unit 1200 and looped back and secured to itself (for example with a hook-and-loop fastening or a buckle). In particular, a user-facing layer 1344 of the top strap portion 1340 is configured to be passed through the eyelet 1202 and looped back and secured to itself (e.g. with a hook-and-loop fastening, buckle or the like). In this particular example, no outer layer of the top strap portion 1340 passes through the eyelet 1202.

A user-facing layer 1344 may be user-contacting (e.g. it may be a user-contacting layer) or non-user-contacting (e.g. it may be a non-user-contacting layer). Some or all of the user-facing layer 1344 may contact the user (e.g. against their hair/head). At least some of the user-facing layer 1344 may not contact the user and/or may not engage the user's head. For example, in the FIG. 33 positioning and stabilising structure 1300, a portion of the user-facing layer 1344 (e.g. the anterior portion 1345) does not contact the user (e.g. it is spaced from the user's head). Additionally, in the FIG. 33 example, a portion of the user-facing layer 1344 (e.g. the posterior portion 1346) contacts the user (e.g. it is in contact with the user's hair/head).

The top strap portion 1340 (e.g. both the anterior portion 1345 and posterior portion 1346) may be substantially inextensible and may comprise a layered construction. In the example shown in FIG. 33, the top strap portion 1340 comprises a substantially inextensible layer 1343. In this example the substantially inextensible layer 1343 at least partially rigidises the top strap portion 1340. The substantially inextensible layer in some examples (e.g. the FIG. 33 example and in other examples) may function as a rigidiser. For example, the substantially inextensible layer 1343 may rigidise the top strap portion 1340 by imparting a shape to the top strap portion 1340. It is to be understood that a rigidised strap may still be bendable, but may be rigidised in the sense that it is self-supporting or more rigid than a floppy strap portion. The substantially inextensible layer 1343 extends along both the anterior portion 1345 and the posterior portion 1346. The substantially inextensible layer 1343 may rigidise the anterior portion 1345 to support the anterior portion 1345 in spaced relation to the user's head. That is, the anterior portion 1345 may be rigidised such that it is supported off the user's head so that it does not engage the user's head in use. As illustrated in FIG. 33, an anterior end of the substantially inextensible layer 1343 is spaced along the length of the top strap portion 1340 from the head-mounted display unit 1200. For example, there is a gap between an anterior end of the substantially inextensible layer 1343 and the head-mounted display unit 1200. In some examples the top strap portion 1340 comprises a textile user-facing layer 1344. In some examples the top strap portion 1340 comprises a textile outer layer, for example covering the substantially inextensible layer 1343.

In some examples a top strap portion 1340 comprising an anterior portion 1345 that does not engage the user's head comprises a power cable 1510 (not shown in FIG. 33) for connecting the battery pack 1500 to the head-mounted display unit 1200 to provide power from the battery pack 1500 to the head-mounted display unit 1200 in use. The power cable 1510 may be internal to the top strap portion 1340. For example, the power cable 1510 may be insertable through an interior of the top strap portion 1340 by the user. In some examples the power cable 1510 is insertable through the top strap portion 1340 between the substantially inextensible layer 1343 and a textile outer layer.

The substantially inextensible layer 1343 may be a portion of an adjustment rigidiser 1380. Adjustment rigidisers 1380 are described below, the features of which may be applied to an adjustment rigidiser forming the substantially inextensible layer 1343 of the positioning and stabilising structure 1300 shown in FIG. 33.

It is to be understood that the top strap portion 1340 described with reference to FIG. 33 (e.g. a top strap portion 1340 having an anterior portion 1345 that does not engage the user's head in use) may have any one or more of the features described with reference to any of the other exemplary top strap portions described herein. Likewise, a top strap portion 1340 having an anterior portion 1345 that does not engage the user's head may be applied to any of the other head-mounted display systems 1000 described herein.

5.4.4 Battery Pack

As shown by way of example in FIG. 7A, the battery pack 1500 in some examples of the present technology is connected to the top strap portion 1340 at a superior location 1501 and an inferior location 1502. In other examples the battery pack 1500 may be connected to the top strap portion 1340 at only one of these locations and/or or to a different component.

The positioning and stabilising structure 1300 may be configured to hold the battery pack 1500 (or other counterweight) in a low position on the user's head. In some examples, the positioning and stabilising structure 1300 is configured to hold the battery pack 1500 in a location overlying the occipital bone of the user's head in use. In some examples of the present technology, the positioning and stabilising structure 1300 is configured to hold the battery pack 1500 in a location proximate the occipital bone of the user' head and at or proximate a vertical axis of rotation of the user's head. Supporting the battery pack 1500 at a low position on the user's head may allow the battery pack 1500 to be located close to an axis of rotation of the user's head given the posterior surface of the user's head curves inwardly (anteriorly and inferiorly) towards the user's spine. The axis of rotation may be at or proximate the user's spine. Supporting the battery pack as close as possible to the axis of rotation of the user's head may advantageously keep disruptive forces on the battery pack low when the user moves rotates or moves their head vigorously, e.g. during gaming.

In the FIG. 7A example, the battery pack 1500 is removably connected to the top strap portion 1340. The battery pack 1500 may be connected to the top strap portion 1340 by a hook-and-loop connection. Alternatively, the battery pack 1500 may be connected via buttons, studs (e.g. domes) or the like. In this example the inferior location 1502 at which the battery pack 1500 connects to the top strap portion 1340 is proximate the occipital strap portion 1320.

Connecting the battery pack 1500 in this manner may advantageously allow the parietal strap portion 1310 and/or the occipital strap portion 1320 to engage the user's head unimpeded by the battery pack 1500.

The battery pack 1500 may comprise a concave inner surface configured to correspond approximately to a curvature of the user's head.

FIGS. 22A-22C show battery packs 1500 according to various examples of the present technology, suitable use in head-mounted display systems 1000 shown in FIGS. 7A-7C, 8, 9, 21A-21E, 23A-23D, 28A-28E, 31A-31B, 32A-32C and 33 for example. The posterior surface of a user's head is indicated by 1010 to illustrate an in-use position of each battery packs 1500 and its internals. As shown in each view, the battery pack 1500 comprises a battery pack housing 1505 and a plurality of cells 1502 contained within the housing 1505, in these examples. The cells 1502 may be spaced equidistantly in the battery pack housing 1505 from an anterior wall of the battery pack housing 1505, as shown in FIG. 22A. One of more of the cells 1502 may be spaced further from an anterior wall of the battery pack housing 1505 than another one or more of the cells 1502, as shown in FIG. 22B. Spacing the cells 1502 further posteriorly may advantageously enable the battery pack 1500 to create a larger moment to counter the weight of the head-mounted display unit 1200. Alternatively or additionally, each of the plurality of cells 1502 may be spaced from an anterior wall of the battery pack housing 1505, as shown in FIG. 22C.

The battery pack housing may contain a counterweight 1512 configured to contribute to a balance of weight between the battery pack 1500 and the head-mounted display unit 1500, as show in FIG. 22C. In the FIG. 22C example, the battery pack housing 1505 is spaced from a posterior surface 1010 of the user's head (in this particular example by a pad 1511, which may be designed for comfort). The counterweight 1512 may be a dead-weight formed from metal, water, sand, or other dense material, in permanent or removable configuration. In some examples the battery pack 1500 may be replaced by a counterweight alone, for example if the battery is located in the head-mounted display unit 1200. The battery pack housing 1505 may also comprise supports to increase the offset distance from the posterior surface 1010 of the user's head.

FIG. 62A shows a head-mounted display system 1000 according to another example of the present technology. Like other examples disclosed herein it comprises a head-mounted display unit 1200 and positioning and stabilising structure 1300, the positioning and stabilising structure 1300 comprising a posterior support portion 1350 comprising a parietal strap portion 1310 and an occipital strap portion 1320 connected to a pair of lateral strap portions 1330 which are connected to arms 1210 of the head-mounted display unit 1200 at eyelets 1212. Also like other examples described herein the positioning and stabilising structure 1300 comprises a top strap portion 1340 and battery pack 1500. The top strap portion 1340 comprises a user-facing layer 1344 and a substantially inextensible layer 1343. In this example both the user-facing layer 1344 and the substantially inextensible layer 1343 of the top strap portion 1340 are connected to the head-mounted display unit 1200.

Also shown in FIG. 62A, the battery pack 1500 is in this example connected to the top strap portion 1340 at a superior side (e.g. a superior end) of the battery pack 1500 and is connected (or connectable) to the occipital strap portion 1320 at an inferior side of the battery pack 1500. This example is one example in which the top strap portion 1340 does not connect to the occipital strap portion 1320. In this example the battery pack 1500 is connected to the occipital strap portion 1320 by an inferior battery pack strap portion 1515. The inferior battery pack strap portion 1515 may releasably connect to the occipital strap portion 1320 with a hook-and-loop connection, press stud, magnetic clip or another suitable fastening. In other examples the inferior battery pack strap portion 1515 may be permanently connected to the occipital strap portion 1320.

In the FIG. 62A example, the head-mounted display system 100 comprises a pad 1511 configured to contact a posterior surface of the user's head, which may be a partially posterior-facing and partially superior-facing surface or, in some examples, a partially posterior-facing and partially inferior-facing surface. The battery pack housing 1505 is spaced from the posterior surface of the user's head by the pad 1511. The pad 1511 may be formed from silicone or foam, which may make the presence of the battery pack 1500 more comfortable to the user. In this example the battery pack housing 1505 rests against the pad which itself rests against the user's head. The pad 1511 may conform to the user's head and distribute forces exerted on the user's head by the batter pack 1500 evenly and over a large surface area.

5.4.4.1 Vertically Oriented Battery Pack

In some examples, such as those of the examples described with reference to FIGS. 7A-7C, 8, 21A-21E, 22A-22C, 28A-28E, 31A-33, 36A-36C, 39A-39C, 42C-42D, 46-53G and 62A, the positioning and stabilising structure 1300 is configured to hold the battery pack 1500 in a vertical orientation in use. The battery pack 1500 may have a length, a width and a depth. The length, width and depth may be substantially perpendicular to each other. It is to be understood that the battery pack 1500 may be curved along its length (e.g. as illustrated in FIG. 62A) and/or may not have a uniform width or depth, for example. The battery pack 1500 may be generally longer than it is wide or deep.

As illustrated in many of the drawings referenced above, the positioning and stabilising structure is configured to hold the battery pack 1500 in an orientation in which the length of the battery pack 1500 is aligned substantially vertically in use. The length of the battery pack may be aligned with the sagittal plane of the user's head in use. As much of the weight of the battery pack 1500 is supported in use by the top strap portion 1340, a battery pack 1500 which is longer than it is wide and which is oriented with the length axis substantially vertical, may advantageous provide for a stable fit as more weight of the battery pack 1500 is aligned directly below the connection to the top strap portion than on either side of it.

5.4.4.2 Horizontally Oriented Battery Pack

In FIG. 62A and in many other illustrated examples of the present technology described herein the parietal strap portion 1310 is configured to overlie the parietal bones at a posterior and also superior location on the user's head. That is, the parietal strap portion 1310 is configured such that in use it passes through the sagittal plane of the user's head at a location spaced from the junction between the parietal bones and the frontal bone (e.g. coronal suture) and also spaced from the junction between the parietal bones and the occipital bone (e.g. lambdoid suture). In such examples the parietal strap portion 1310 may extend posteriorly and superiorly from its connection to each lateral strap portion 1330 at an oblique angle with respect to the lateral strap portion 1330, for example at an angle of 45 degrees or thereabouts. The parietal strap portion 1310 may intersect the sagittal plane of the user's head at a location substantially equidistant from the coronal suture and lambdoid suture, in some examples.

However, in other examples of the present technology, such as the example shown in FIG. 62B, the parietal strap portion 1310 is configured to overlie a region of the user's head in use at or proximate a junction between the parietal bones and the occipital bone (e.g. at or proximate the lambdoid suture). For example, the parietal strap portion 1310 may lie proximate and superior to the lambdoid suture of the user's head in use. The parietal strap portion 1310 in this example may intersect the sagittal plane of the user's head at a posterior location rather than a posterosuperior location (as in the FIG. 62A example). As illustrated in FIG. 62B, the parietal strap portion 1310 and the lateral strap portions 1330 may be configured to lie in a common plane in use. The parietal strap portion 1310 may extend posteriorly from its connection to each lateral strap portion 1330 in a direction parallel to the lateral strap portion.

In the FIG. 62B example, the positioning and stabilising structure 1300 is configured to hold the battery pack 1500 in a horizontal orientation in use. As described above, the battery pack 1500 in various examples may have a length, a width and a depth, the length being longer than the width and the depth. In the FIG. 62B example, the positioning and stabilising structure 1300 is configured to hold the battery pack 1500 in an orientation in which the length of the battery pack 1500 is aligned substantially horizontally in use. As illustrated, the length of the battery pack 1500 may be aligned parallel to the parietal strap portion 1310 in use. The battery pack 1500 may be connected to the parietal strap portion 1310. For example, the battery pack 1500 is supported by the parietal strap portion 1310. In some examples the positioning and stabilising structure 1300 may comprise a further strap (e.g. a battery pack support strap) supporting the battery pack 1500, holding it against the back of the user's head. The further strap may connect to the lateral strap portions 1330 or parietal strap portions 1310 (for example) and may lie against a posterior surface of the battery pack 1500 or may connect to the sides or ends of the battery pack 1500.

5.4.4.3 Battery Pack Connections

As described elsewhere, the battery pack 1500 may be connected to the top strap portion 1340 of a positioning and stabilising structure 1300 at a superior location 1501 and an inferior location 1502. As shown in the FIG. 7A, in some examples of the present technology the inferior location 1502 is located at or proximate a posteroinferior end of the top strap portion 1340 and/or at or proximate an occipital strap portion 1320. FIGS. 68A and 68B show an alternative example of the present technology in which an inferior end of the top strap portion 1340 connects to the occipital strap portion 1320 and the inferior location 1502 at which the battery pack 1500 connects to the top strap portion 1340 is spaced superiorly from the occipital strap portion. As shown in FIG. 68B, the inferior portion of the top strap portion 1340 is then free to deform inwardly towards the patient's occipital region when the headgear is tightened, which provides for a stable fit. This deformation may occur then the head mounted display system 1000 is donned by the user and/or when the occipital strap portion 1320 or another strap portion of the positioning and stabilising structure 1300 is tightened.

FIGS. 68C and 68D show a further example of the present technology in which the battery pack 1500 is connected to the top strap portion 1340 at a pivot connection 1516 about which the battery pack 1500 is able to pivot about a horizontal axis. The battery pack 1500 is also connected to the top strap at a superior location 1501 and an inferior location 1502. In this example, the battery pack 1500 is connected to the top strap portion 1340 by spring elements at the superior location 1501 and inferior location 1502. The spring elements may be any connectors which elastically connect the battery pack 1500 to the top strap portion 1340. The top strap portion 1340 is rigidised (e.g. by a rigidising substantially inextensible layer 1343) but is able to elastically deform when straps of the positioning and stabilising structure 1300 are tightened or fitted to the user's head. The spring elements may lightly resist conformance of the top strap portion 1340 to the user's head in order to provide elastic tension in the straps. The ability of the top strap portion 1340 to elastically deform without being constrained to the shape of the battery pack 1500 may advantageously allow for the top strap portion 1340 to fit to range of head shapes and sizes. FIG. 68C shows the positioning and stabilising structure 1300 in the process of being fitted to a small size head while FIG. 68D shows the positioning and stabilising structure 1300 in the process of being fitted to a medium size head. The positioning and stabilising structure 1300 may deform less when fitting to a large size head than to a small size head. The battery pack 1500 (or other counterweight) may be held in a stable position by the pivot connection 1516 while the spring elements at the superior and inferior locations 1501 and 1502 stop it from rotating.

5.4.5 Rigidised Parietal and/or Occipital Strap Portions

Also with reference to the example shown in FIG. 62A, the parietal strap portion 1310 may comprise a layered construction. The parietal strap portion may be substantially inextensible. The parietal strap portion 1310 may be able to bend to conform to the shape of the user's head but may be inextensible to transfer forces along the parietal strap portion 1310. In the FIG. 62A example the parietal strap portion 1310 comprises a user-contacting layer 1318 and a substantially inextensible layer 1317. The user-contacting layer 1318 may be formed from a textile material and may be formed from the same material as the user-contacting layer 1344 of the top strap portion 1340 and/or lateral strap portions 1330. The substantially inextensible layer 1317 may be formed from a material that does not extend in length under the forces experienced in use of the head-mounted display system and may be formed from the same material as the substantially inextensible layer 1343 of the top strap portion 1340. As illustrated, an anterior end of the substantially inextensible layer 1317 of the parietal strap portion 1310 may be located at or proximate a junction between the parietal strap portion 1310 and the occipital strap portion 1320.

The occipital strap portion 1320 also may comprise a layered construction. The occipital strap portion 1320 may also be substantially inextensible. As illustrated, the occipital strap portion 1320 comprises a user-contacting layer 1328 and a substantially inextensible layer 1327. The user-contacting layer 1328 may be formed from a textile material. An anterior end of the substantially inextensible layer 1327 of the occipital strap portion 1320 may be located at or proximate a junction between the parietal strap portion 1310 and the occipital strap portion 1320.

The substantially inextensible layer 1317 of the parietal strap portion 1310 may be connected to the substantially inextensible layer 1327 of the occipital strap portion 1320 at one or both ends, for example by adhesive, overmoulding, welding, or by the substantially inextensible layers 1317 and 1327 of the two strap portions 1310 and 1320 being integrally formed with each other.

The substantially inextensible or "rigidised" parietal strap portion 1310 and occipital strap portion 1320 may provide for a stable posterior support portion 1350 as the parietal and occipital strap portions 1310, 1320 may be less likely to ride up or down on the user's head in use.

5.4.6 Elastic Strap Portion

In some examples of the present technology, the positioning and stabilising structure 1300 may comprise one or more elastic strap portions. The elastic strap portions may complement or replace any one or more of the strap portions of the positioning and stabilising structures 1300 described herein. FIG. 62C shows a head-mounted display system 1000 including the same features as the head-mounted display system 1000 shown in FIG. 62A. In addition, the positioning and stabilising structure 1300 shown in FIG. 62C comprises an elastic strap portion forming the lateral strap portions 1330. In this particular example the head-mounted display system 1000 comprises an arm 1210 connected to the head mounted display unit 1200 at a pivot point 1213. Connected to the arm 1210 and/or the head mounted display unit 1200 is a lateral strap portion 1330 formed from an elastic material. The elastic material may be knitted or braided, for example, and configured to extend in length under tension and have a tendency to return to an at rest length. In some examples the lateral strap portion 1330 is formed by both an elastic strap portion and a non-elastic strap portion, the elastic strap portion overlying the non-elastic strap portion. The non-elastic strap portion may connect to the parietal strap portion 1310 and occipital strap portion 1320.

In addition, the positioning and stabilising structure 1300 comprises a parietal elastic strap portion 1331 configured to be located in use overlying the parietal bones of the user's head. In this particular example a battery pack 1500 is located between the parietal elastic strap portion 1331 and the user's head (also separated by a pad 1511). The parietal elastic strap portion 1331 may help hold the battery pack 1500 against the user's head and/or help hold the head-mounted display unit 1200 against the patient's face.

Furthermore, the positioning and stabilising structure 1300 in this example comprises an occipital elastic strap portion 1333 configured to be located in use overlying the occipital bone of the user's head. The occipital strap portion 1333 may lie over the occipital strap portion 1320 and may help anchor the positioning and stabilising structure 1300 at the back of the user's head.

The positioning and stabilising structure 1300 may comprise a pair of guides on respective lateral sides of the user's head, for example located proximate and superior to the user's ear. Each guide may be located at or proximate a junction of the parietal strap portion 1310 and occipital strap portion 1320. The elastic strap portion may pass through the guide, which may advantageously hold the elastic strap portion superior to the user's ears. A junction between the parietal elastic strap portion 1331 and the occipital elastic strap portion 1333 may be located at or proximate the guide.

It is to be understood that in some examples the positioning and stabilising structure 1330 comprises elastic strap portions in only the lateral strap portions 1330, only the parietal elastic strap portions 1331, only the occipital elastic strap portions 1333 and/or any combination of these.

5.4.7 Alternative Top Strap Connection to Head-Mounted Display Unit

FIGS. 67A and 67B show a head-mounted display system 1000 according to another example of the present technology. In this example the positioning and stabilising structure comprises top strap arms 1365 connecting the top strap portion 1340 to the head-mounted display unit 1200. There are two top strap arms 1365 in this example. The top strap arms 1365 may be substantially rigid or at least sufficiently stiff that they are able to retain their shape in use and may support the weight of the head-mounted display unit 1200. That is the top strap arms 1365 may transfer weight of the head-mounted display unit 1200 to the top strap portion 1340. The top strap portion 1340 may resist the weight of the head-mounted display unit 1200 by anchoring to the back of the user's head or with a counterweight located posterior to the user's head, for example a battery pack 1500.

The top strap arms 1365 may be connected to the head-mounted display unit 1200 at pivot points 1213 and the head-mounted display unit 1200 may be able to pivot with respect to the top strap arms 1365. The top strap portion 1340 connecting to the head-mounted display unit 1200 at pivot points 1213 on either side thereof may advantageously avoid rotational forces on the head-mounted display unit 1200 when the top strap portion 1340 is tightened (e.g. if it's effective length is adjusted). As illustrated, the top strap arms 1365 may extend from the top strap portion 1340 anteriorly, laterally and inferiorly and connect to the lateral sides of the head-mounted display unit 1200.

As shown in FIGS. 67A and 67B, the positioning and stabilising structure 1300 may comprise lateral strap portions 1330 connecting to the head-mounted display unit 1200 at the pivot points 1213, in addition to the top strap arms 1365. In some examples the lateral strap portions 1330 are configured to extend elastically under tension. In other examples the lateral strap portions 1330 are substantially inextensible. In further examples the head-mounted display system 1000 may comprise arms 1210 to which lateral strap portions 1330 are connected. The arms 1210 may be as described in any example disclosed herein.

5.4.8 Power Cable Strap Portion

As described above, the head-mounted display system 1000 may comprise a power cable 1510 connected between the battery pack 1500 and the head-mounted display unit 1200. FIGS. 25A-25C and 26A-26B show such examples. The power cable 1510 may be located within the top strap portion 1340 in use (FIGS. 25B and 25C) or may be located alongside the top strap portion 1340 in use (FIG. 25A).

In the example shown in FIGS. 26A-26B, the power cable 1510 is attached to a power cable strap portion 1520 proximate the head-mounted display unit 1200. The power cable strap portion 1520 in this example is extendable in length. A serpentine portion of the power cable 1510 is attached to the power cable strap portion 1520 in a serpentine pattern, enabling the power cable strap portion 1520 and the serpentine portion of the power cable 1510 to extend in length. Further, in these examples, the power cable 1510 is attached to the parietal strap portion 1320.

5.4.9 Power Cable Management

FIGS. 27 and 28A-28E show further examples of the present technology in which a power cable 1510 connects a head-mounted display unit 1200 and a battery pack 1500. As described herein, the head-mounted display unit 1200 may comprise a display unit housing 1205 comprising a display, and an interfacing structure 3800 constructed and arranged to be in opposing relation with the user's face and engage the user's face.

As shown in FIG. 27, the power cable 1510 may enter the display unit housing 1205 outside of a periphery of the interfacing structure 3800. In this example, the display unit housing 1205 comprises a posterior-facing side (visible in FIG. 27) and an interfacing structure 3800 extending posteriorly from the posterior-facing side. The posterior-facing side may be larger than the periphery of the interfacing structure 3800 allowing the power cable 1510 to enter the display unit housing 1205 through an opening 1206 in the posterior-facing side of the display unit housing 1205.

In the FIG. 27 example, the opening 1206 is inside of a periphery of the display unit housing 1205. More particularly, the posterior facing side of the display unit housing 1205 in this example comprises a rectangular shape and the interfacing structure 3800 comprises a rounded shape. The opening 1206 in the posterior-facing side is located proximate a corner of the rectangular shape of the posterior-facing side.

FIGS. 58A and 58B show a portion of a head-mounted display 1200 in another example of the present technology. In this example the opening 1206 is provided at a periphery of the display unit housing 1205.

The head-mounted display unit 1200 may comprise one or more power cable retention features 1207, which may be configured to restrain position and/or orientation of the power cable 1510 within the display unit housing 1205. In the example shown in FIGS. 58A and 58B, the head-mounted display unit 1200 comprises two power cable retention features 1207. In other examples there may be one, three or more power cable retention features 1207. The power cable retention features 1207 may be annular shaped rigid portions through which the power cable 1510 passes. Each power cable retention features 1207 may be in the form of a closed ring through which the power cable 1510 has been threaded, or may be in the form of an open ring into which the power cable 1510 has been pressed such that the ring snaps around the power cable 1510. The power cable retention features 1207 may hold the power cable 1510 in position within the display unit housing 1205 and may absorb forces that may be exerted on the power cable 1510 to prevent those forces from being transmitted to the connection between the power cable 1510 and electronics within the head-mounted display 1200.

FIGS. 28A-28E show examples of head-mounted display systems 1000 having positioning and stabilising structures 1300 which comprise a posterior support portion 1350 comprising a parietal strap portion 1310 configured to overlie the parietal bones of the user's head in use and an occipital strap portion 1320 configured to overlie or lie below an occipital bone of the user's head in use. The positioning and stabilising structures 1300 further comprise a pair of lateral strap portions 1330 configured to connect between the posterior support portion 1350 and the head-mounted display unit 1200, each configured to be located on a respective lateral side of the user's head in use. Further, the positioning and stabilising structures 1300 comprise a top strap portion 1340 configured to connect between the battery pack 1500 and the head-mounted display unit 1200, the top strap portion 1340 configured to overlie a superior portion of the user's head in use.

In each of these examples, the power cable 1510 runs along (e.g. is attached to, otherwise secured at or aligned with) the top strap portion 1340 from the battery pack 1500 to the head-mounted display unit 1200 (as shown in FIG. 28A).

Figure 28B:
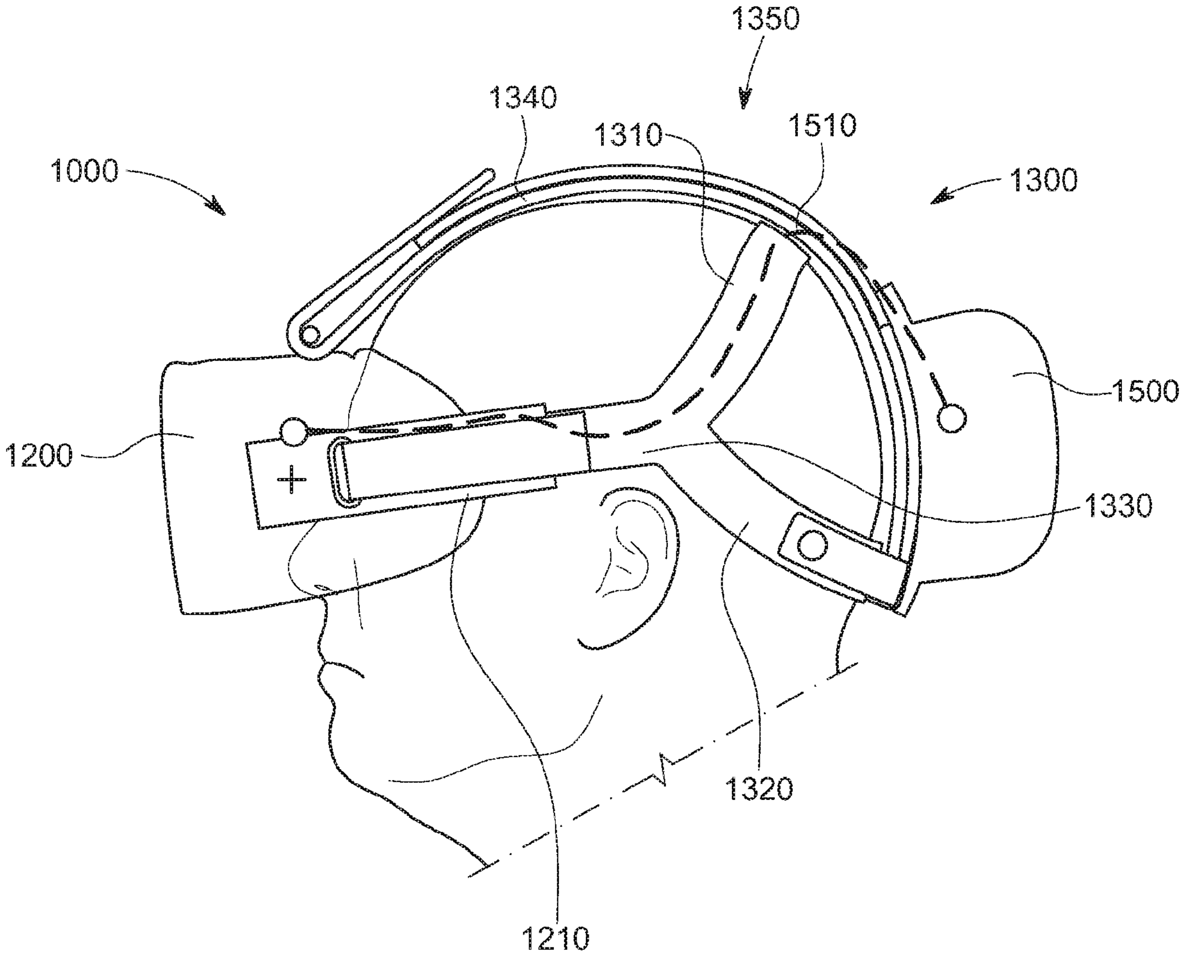
Figure 28C:
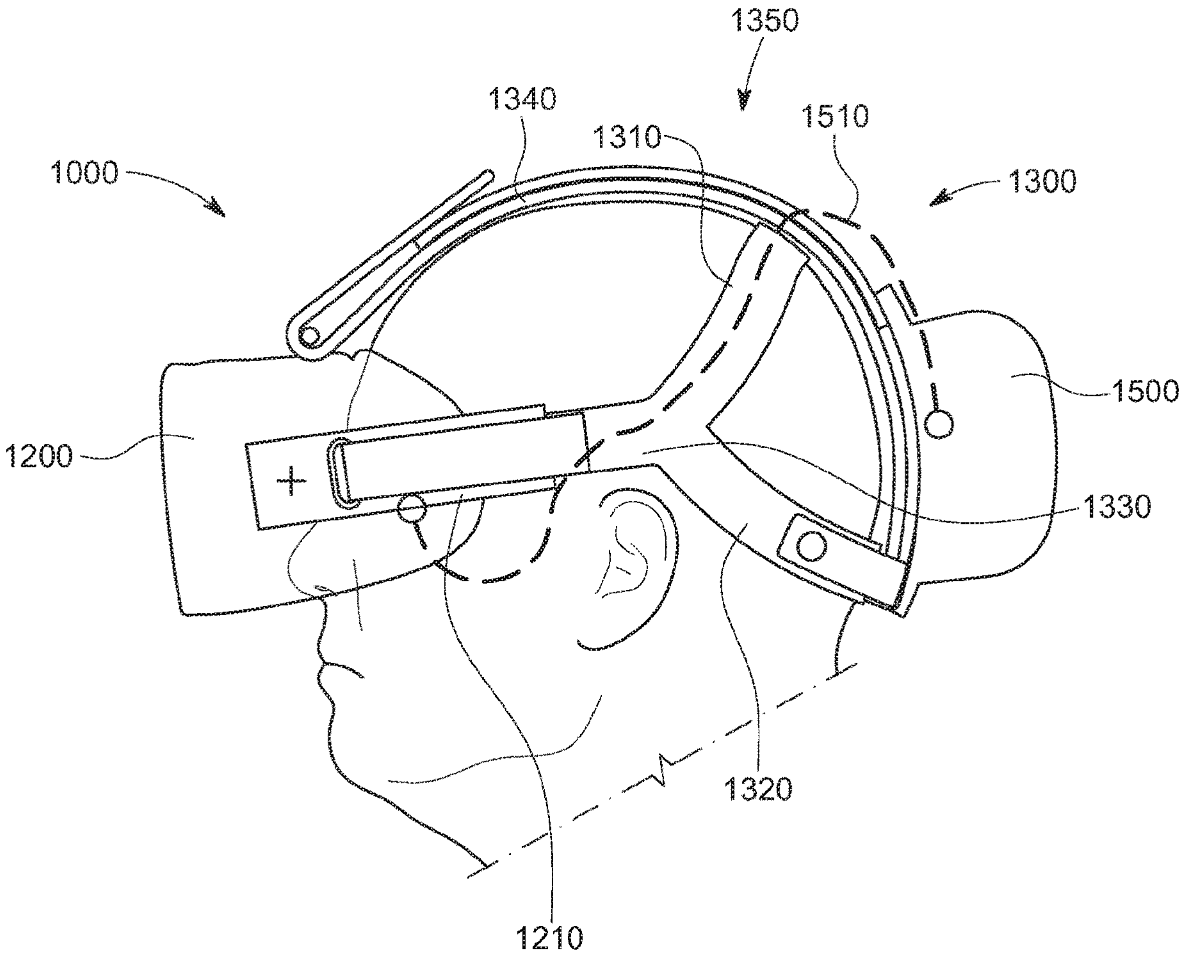

The power cable 1510 may run along the parietal strap portion 1310 and one of the lateral strap portions 1330 from the battery pack 1500 to the head-mounted display unit 1200 (as shown in FIGS. 28B and 28C). The power cable 1510 may connect to the head-mounted display unit at a laterally-facing side thereof (as shown in FIG. 28C).

Figure 28D:
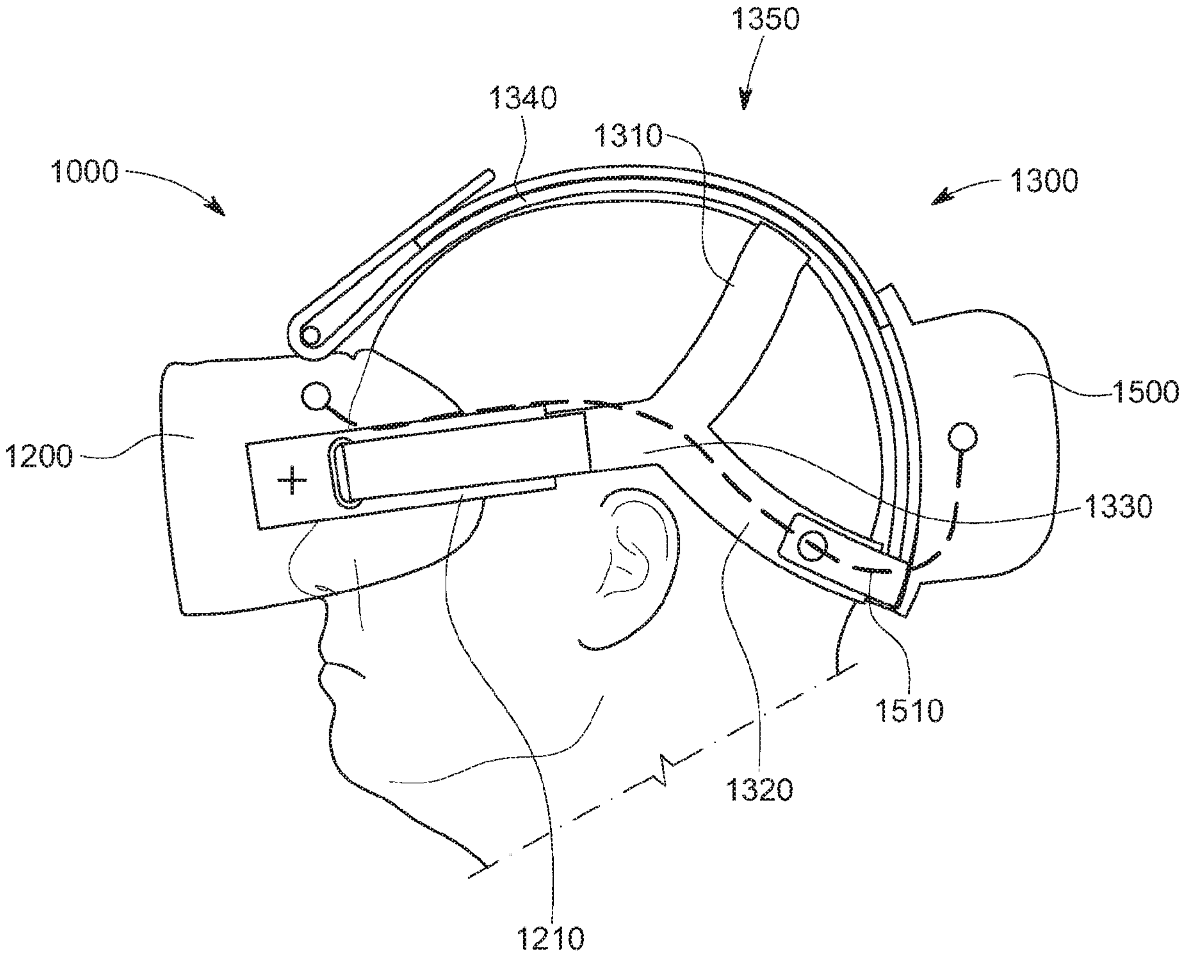
Figure 28E:
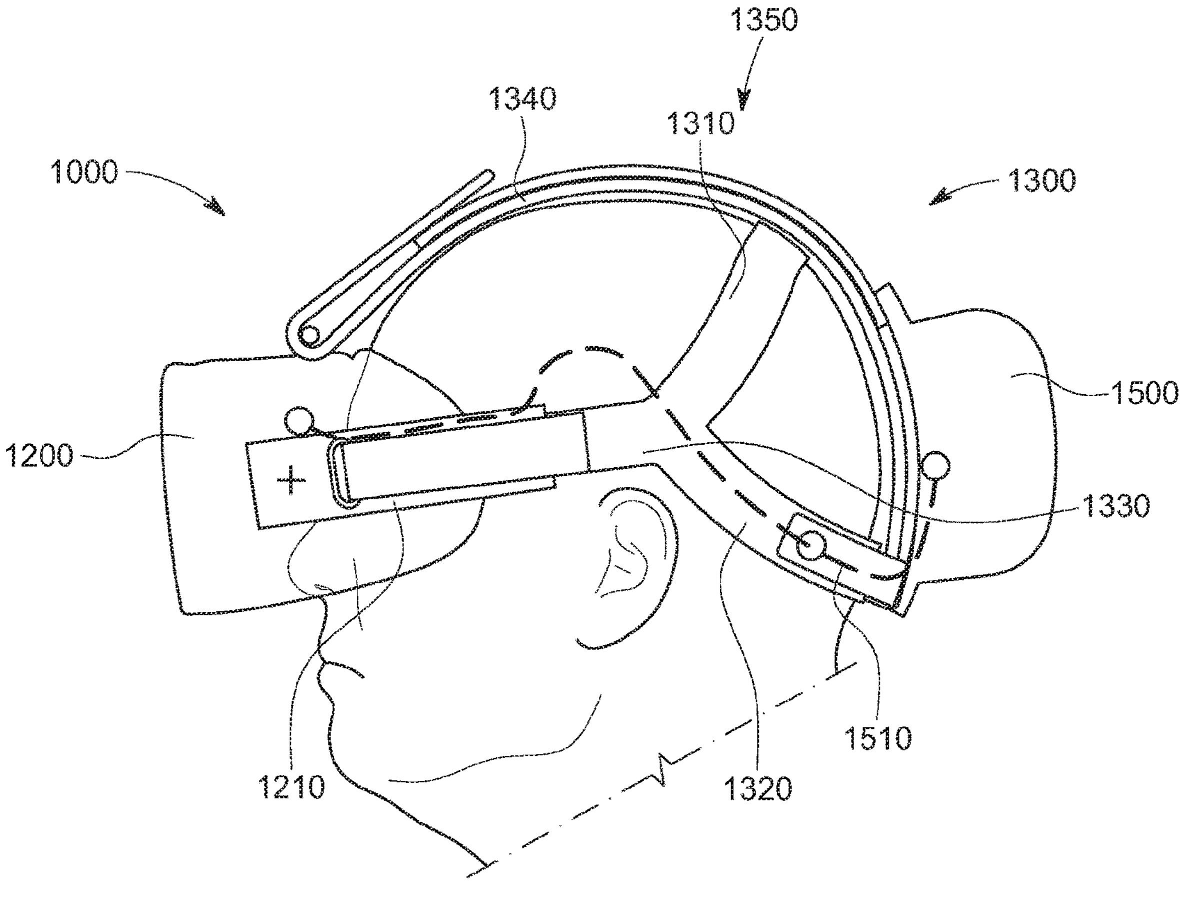

The power cable 1510 may run along the occipital strap portion 1320 and one of the lateral strap portions 1330 (as shown in FIG. 28D). The power cable 1510 may comprise a slack portion configured to tolerate movement between the head-mounted display unit 1200 and the battery pack 1500 (for example during active use, adjustment or transport, for example), as shown in each of FIGS. 28C and 28E.

5.4.10 Retractable Power Cable

In some examples of the present technology, such as the example shown in FIG. 8, a portion of the power cable 1510 is located within the battery pack 1500 and is able to be extended from and retracted into the battery pack 1500. This may advantageously allow the length of the top strap portion 1340 to be adjusted without affecting the location of the battery pack 1500 and/or the occipital strap portion 1320. A retractable power cable 1510 may also be incorporated into other examples, such as any of the other head-mounted display systems 1000 described herein.

One or more layers of the top strap portion 1340 may be partially located within the battery pack 1500 and may be able to be extended from and retracted into the battery pack 1500 together with the power cable 1510.

As shown in FIG. 8, the outer layer 1341 of the top strap portion 1340 is, in this example, located within the battery pack 1500 and is able to be extended from and retracted into the battery pack 1500 together with the power cable 1510. Additionally, the substantially inextensible layer 1343 of the top strap portion 1340 is located within the battery pack 1500 and is able to be extended from and retracted into the battery pack 1500 together with the power cable 1510. In other examples, such as the example shown in FIG. 7A, the substantially inextensible layer 1343 is located between the battery pack 1500 and the user's head. In this example (and also in the example shown in FIG. 7A) the user contacting layer 1344 of the top strap portion 1340 is located between the battery pack 1500 and the user's head.

The portion of the power cable 1510 located within the battery pack 1500 and the one or more layers of the top strap portion 1340 partially located within the battery pack 1500 may form a retractable portion of the top strap portion 1340 able to be extended from and retracted into the battery pack 1500 to adjust a length of the top strap portion 1340 between the battery pack 1500 and the head-mounted display unit 1200. That is, power cable 1510 and one or more layers of the top strap portion 1340 may form a retractable portion that the user can extend from and retracted into the battery pack 1500. The retractable portion may comprise the outer layer 1341, the power cable 1510, and the substantially inextensible layer 1343, for example. The user-facing layer 1344 may not form part of the retractable portion. The user-facing layer 1344 may be located between the battery pack 1500 and the user's head. The user-facing layer 1344 may split from one or more other layers of the top strap portion 1340. The battery pack 1500 may slide over the user-facing layer 1344 (and any other layers not located within the battery pack 1500), to enable adjustment of the length of the top strap portion 1340 between the battery pack 1500 and the head-mounted display unit 1200 and/or to enable the position of the battery pack 1500 on the user's head to be adjusted.

In some examples of the present technology, the retractable portion of the top strap portion 1340 is able to be moved between a plurality of predetermined positions with respect to the battery pack 1500 at which the position of the retractable portion is able to be fixed with respect to the battery pack 1500. For example, the retractable portion may be moveable with respect to the battery pack 1500 between three positions corresponding to Small, Medium and Large sizes. The user may adjust the top strap portion 1340 to a chosen one of these sizes. In some examples, the top strap portion 1340 may be fixed to the head-mounted display unit 1200. In the example shown in FIG. 8, the top strap portion 1340 is adjustable at the head-mounted display unit 1200 in that a user is able to pull more or less of the top strap portion 1340 (or at least an end portion of the outer layer 1341 thereof) through the eyelet 1202. The user may make course adjustments to a length of the top strap portion 1340 by changing the amount of the top strap portion 1340 within the battery pack, and may make fine adjustments with by changing the amount of the top strap portion 1340 pulled through the eyelet 1202. The positioning and stabilizing structure 1300 may therefore provide for two mechanisms of adjustment of a length of the top strap portion 1340, which may include a coarse adjustment mechanism and a fine adjustment mechanism.

In other examples, the retractable portion of the top strap portion 1340 is able to be moved continuously within a range of possible positions with respect to the battery pack 1500. The retractable portion may be held in place by a locking mechanism (e.g. a spring loaded buckle or other catch) or may be held in place in use by the tension in the top strap portion 1340.

5.4.11 Arms

As shown in FIG. 7A, FIG. 8 and FIG. 9, the head-mounted display unit 1200 comprises a display unit housing 1205 and a pair of arms 1210 extending from the display unit housing 1205. In each example, the lateral strap portions 1330 of the positioning and stabilizing structure 1300 each connect to a respective one of the arms 1210. Features of arms described herein may also be incorporated into other examples, such as any of the other head-mounted display systems 1000 described herein.

As shown in each of FIG. 7A, FIG. 8 and FIG. 9, each lateral strap portion 1330 connects to a posterior end of a respective one of the pair of arms 1210. As shown in FIG. 7A, FIG. 8, in this example, each lateral strap portion 1330 passes through an eyelet 1212 at the posterior end of the respective arm 1210 and is fastened back onto itself.

As shown in FIG. 9, in this example, each lateral strap portion 1330 connects to a respective one of the pair of arms 1210 proximate an anterior end of the arm 1210. In particular, each lateral strap portion 1330 passes through an eyelet 1214 at or proximate the posterior end of the respective arm 1210 and through a hole 1216 proximate the anterior end of the arm and is fastened to the arm 1210. As illustrated, in this example, each lateral strap portion 1330 is fastened to a laterally facing side of the respective arm 1210. As shown in FIG. 9, an end portion 1332 of each lateral strap portion 1330 is secured to the arm 1210. The lateral strap portion 1330 may fasten to the respective arm 1210 with a hook and loop fastening arrangement, by one or more of a series of domes, or by another suitable mechanism. In other examples, the arm 1210 may comprise a spring loaded buckle or other catch that prevents retraction of the lateral strap portion 1330 through the hole 1216.

In each of the examples shown in FIG. 7A, FIG. 8 and FIG. 9, each of the pair of arms 1210 is able to pivot with respect to the display unit housing 1205. Each of the arms 1210 may be covered with a textile material. Each arm 1210 may be sheathed by a tubular textile material.

Figure 21D:
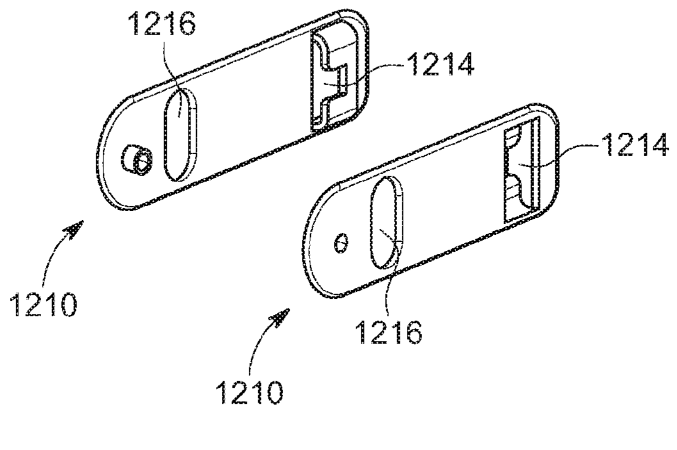
Figure 21E:
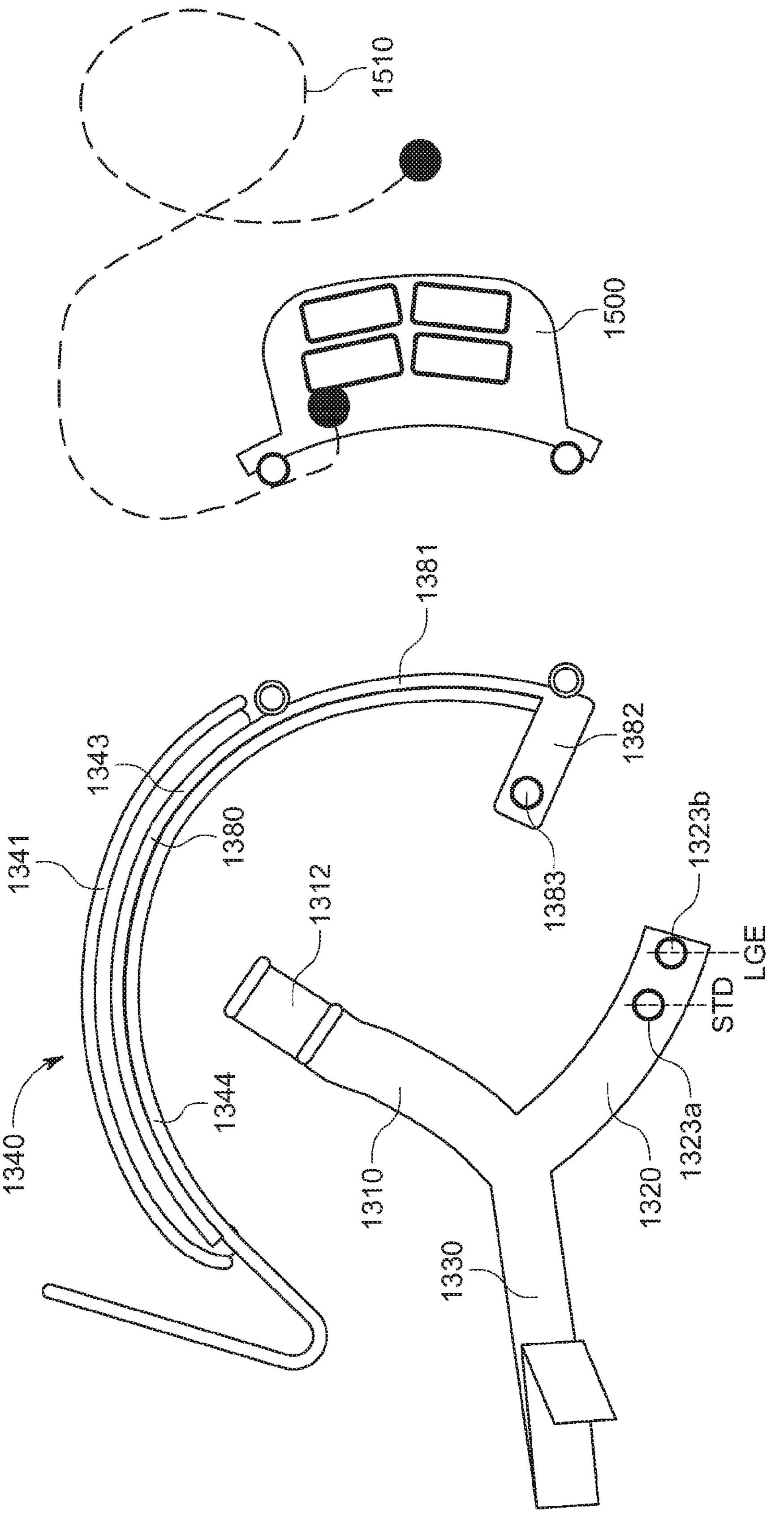

FIG. 21D shows a pair of arms 1210 according to another example of the present technology. Each arm 1210 has an eyelet 1214 (in this example in the form of an open slot into which a strap portion can be slipped) and a hole 1216 through which a strap portion can be pulled through and fastened back on itself or on another portion configured for attachment.

Figure 29A:
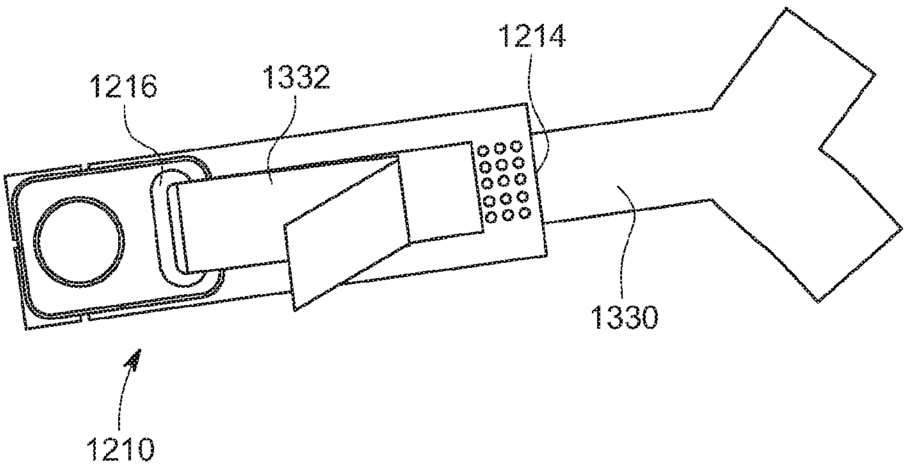
Figure 29B:
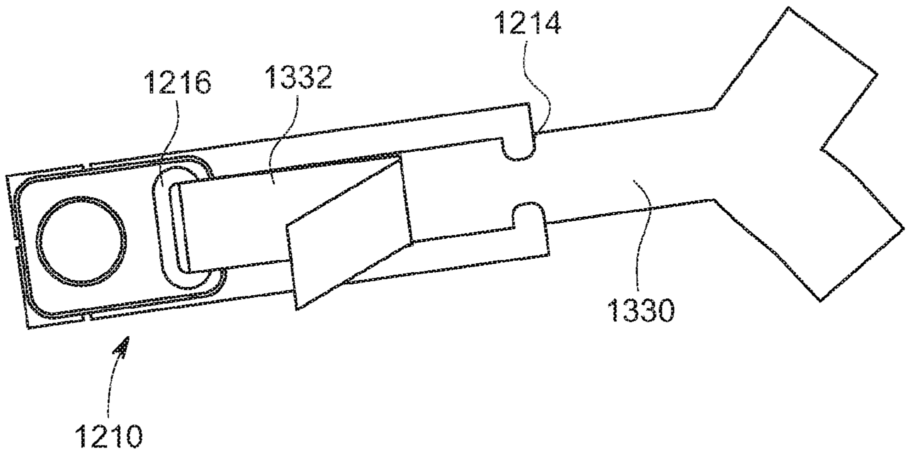
Figure 29C:
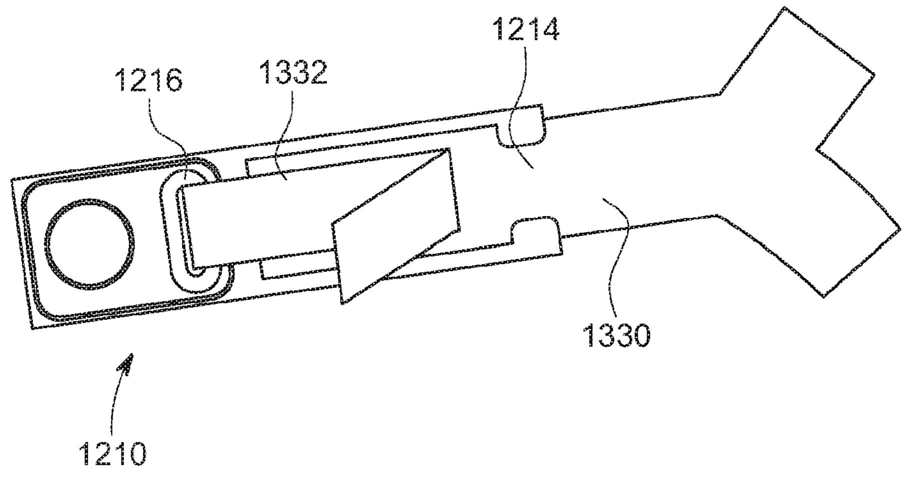
Figure 29D:
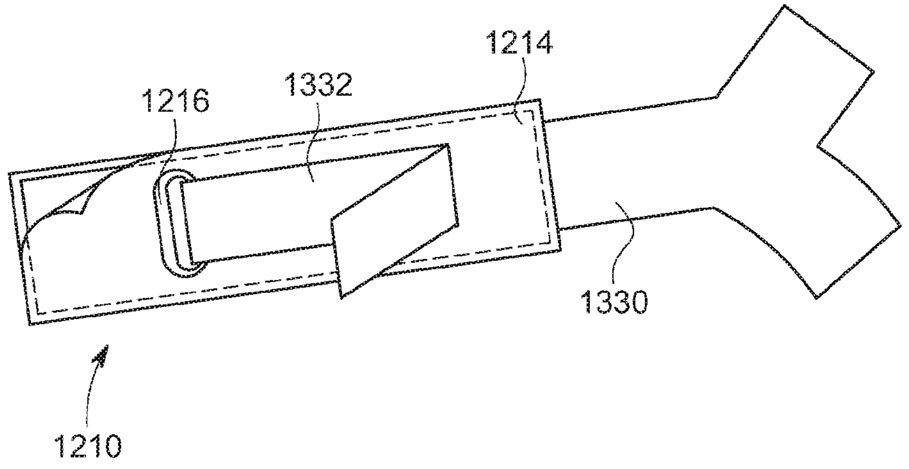

FIGS. 29A-29D show arms 1210 according to further examples of the present technology. Each lateral strap portion 1330 may be fastened to an exposed portion of itself within the arm 1210, as shown in FIGS. 29A, 29B and 29C. As shown in each of FIGS. 29A, 29B and 29C, end portions 1332 of the lateral strap portions 1330 are fastened back onto the lateral strap portions 1330. As shown in FIGS. 29B and 29C, the eyelet 1214 at or proximate the posterior end of the arm 1210 is partially open allowing the strap 1330 to move in a transverse direction with respect to the strap 1330 into/out of the eyelet 1214. In some examples, as depicted in FIG. 29D, each arm 1210 is covered in a sock, each lateral strap portion 1330 (e.g. the end portion 1332 thereof) being fastened to the sock (e.g. with a hook-and-loop type fastening).

As shown in FIGS. 30A and 30B, in some examples each arm 1210 comprises a substantially rigid portion 1217 overmoulded to a textile portion 1218. In these examples (or in other examples), the strap connecting to the arm 1210 may comprise a feature to prevent run-through of the strap, for example a widened portion of the strap.

5.4.12 Adjustment Rigidiser

FIGS. 21A-21E and FIGS. 23A-23E show head-mounted display systems 1000 according to further examples of the present technology, although share features with the examples shown in FIGS. 7A-7C, 8 and 9, not all of which will be repeated. The following description will focus on differences. FIGS. 24A, 24C and 24D show adjustment rigidisers 1380, which will be described below. FIG. 24B shows a positioning and stabilising structure 1300 having a parietal strap portion 1310, occipital strap portion 1320 and top strap portion 1340 configured for use with the adjustment rigidisers 1380. An adjustment rigidiser 1380 as described herein may also be applied to other examples, such as any of the other head-mounted display systems 1000 described herein.

In the examples shown in FIGS. 21A-21E and 23A-23D, the positioning and stabilising structures 1300 comprise lateral strap portions 1330 configured to connect to arms 1210. In other examples the positioning and stabilising structures 1300 may comprise elastic elements configured to connect to covers on arms 1210 and connect via a button connection and/or a hook-and-loop fastening.

With reference to FIGS. 21A-21E, 23A-23D and 24A-24D, the positioning and stabilising structure 1300 may comprise an adjustment rigidiser 1380 comprising a substantially inextensible member. In these examples the adjustment rigidiser 1380 is configured to connect to the occipital strap portion 1320. The adjustment rigidiser 1380 may be configured to reduce a length of the occipital strap portion 1320.

The occipital strap portion 1320 may comprise three or more occipital strap connection points 1323, the adjustment rigidiser 1380 being selectively connectable to a first pair of the occipital strap connection points 1323 and to a second pair 1323 of the occipital strap connection points 1323. When the adjustment rigidiser 1380 is connected to the first pair of the occipital strap connection points 1323, the occipital strap portion may have a first effective length (e.g. corresponding to a small size). When the adjustment rigidiser 1380 is connected to the second pair of the occipital strap connection points 1323, the occipital strap portion may have a second effective length longer than the first effective length. (e.g. corresponding to a large size). The different connection options allow an effective length of a strap portion to be varied by the user to achieve a good fit when using the head-mounted display system 1000.

In some examples, the adjustment rigidiser 1380 constrains the occipital strap portion 1320 to the first effective length when the adjustment rigidiser 1380 is connected to the first pair of the occipital strap connection points 1320.

As shown in FIGS. 24A, 24C and 24D, the adjustment rigidiser 1380 comprises a pair of adjustment rigidiser connection points 1383 configured to connect to the occipital strap connection points 1323. The occipital strap portion 1320 shown FIG. 24B comprises four occipital strap connection points 1323 (two points 1323*a* corresponding to a standard size and two points 1323*b* corresponding to a large size, in this example).

The second pair of occipital strap connection points 1323*b* may be located medially of the first pair of occipital strap connection points 1323*a*.

In other examples, the occipital strap portion 1320 may comprise a left portion separated from a right portion, the adjustment rigidiser 1380 being configured to connect the left portion and the right portion.

With reference again to FIGS. 21A-21E, 23A-23D and 45A-45D, the adjustment rigidiser 1380 in these examples comprises a medial rigidising portion 1381 and a pair of lateral rigidising portions 1382 extending laterally from the medial rigidising portion 1381, the adjustment rigidiser connection points 1383 being located on the lateral rigidising portions 1382. One adjustment rigidiser connection point 1383 is located on each lateral rigidising portion 1382 in these examples.

In these examples, the medial rigidising portion 1381 is configured to be located in use overlying the user's occipital bone and overlying a junction between the user's parietal bones. More particularly, the medial rigidising portion 1381 is configured to be located on the user's head at or proximate the user's frontal bone, overlying a junction between the user's parietal bones and connecting to the occipital strap portion 1320.

The adjustment rigidiser 1380 may form part of the top strap portion of the positioning and stabilising structure 1300, as illustrated. The adjustment rigidiser may form a substantially inextensible layer 1343 of the top strap portion 1340.

In the example shown in FIGS. 21A-21E, the adjustment rigidiser 1380 is permanently attached within the top strap portion 1340. In particular, the adjustment rigidiser 1380 is permanently attached to a user-facing layer 1344 of the top strap portion 1340. The top strap portion 1340 may be foldable, for example at a hinge region, for transport.

In each of the examples shown in FIGS. 21A-21E and 23A-23D, the battery pack is configured to connect to the adjustment rigidiser 1380. Additionally, a power cable 1510 is located in use between the adjustment rigidiser 1380 and an outer layer 1341 of the top strap portion 1340. The power cable 1510 is insertable between the adjustment rigidiser 1380 and the outer layer 1341 of the top strap portion 1340.

Figure 23A:
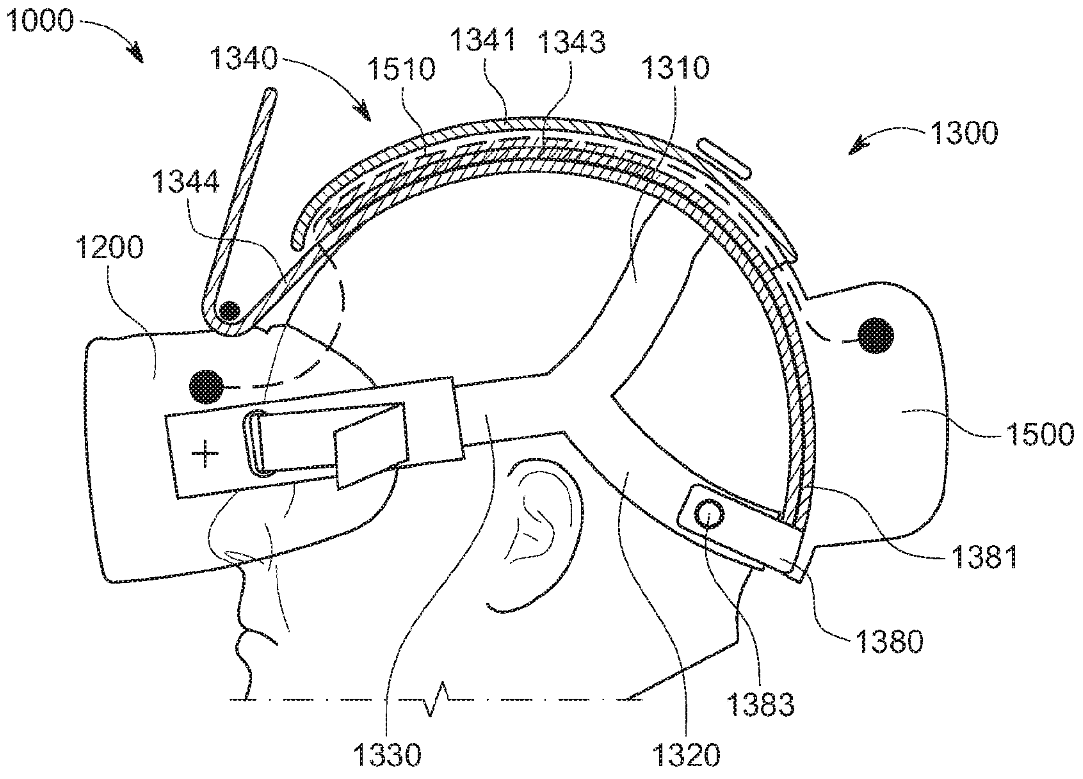
Figure 23B:
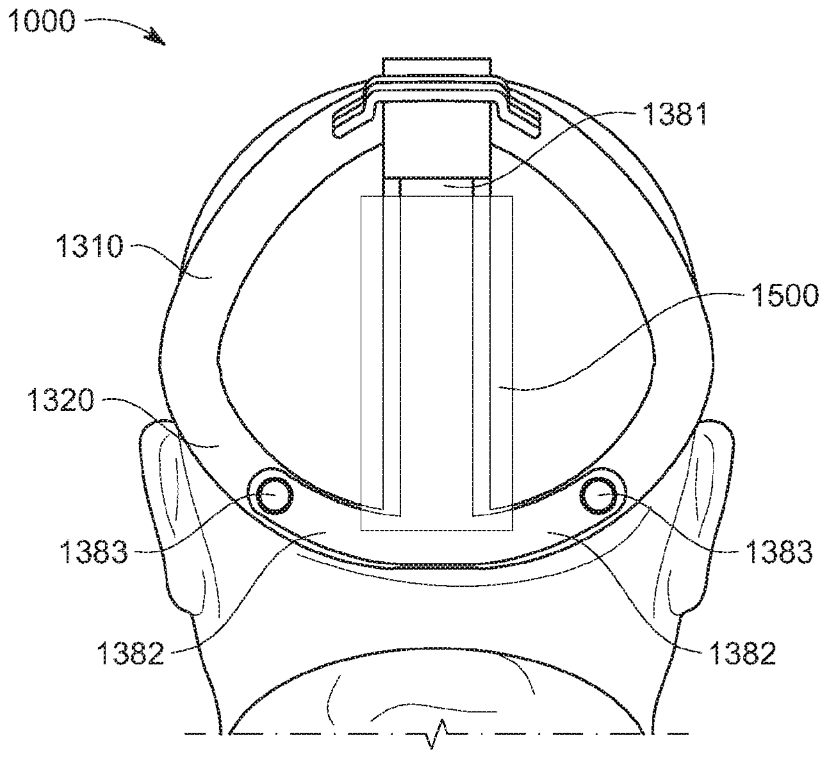
Figure 23C:
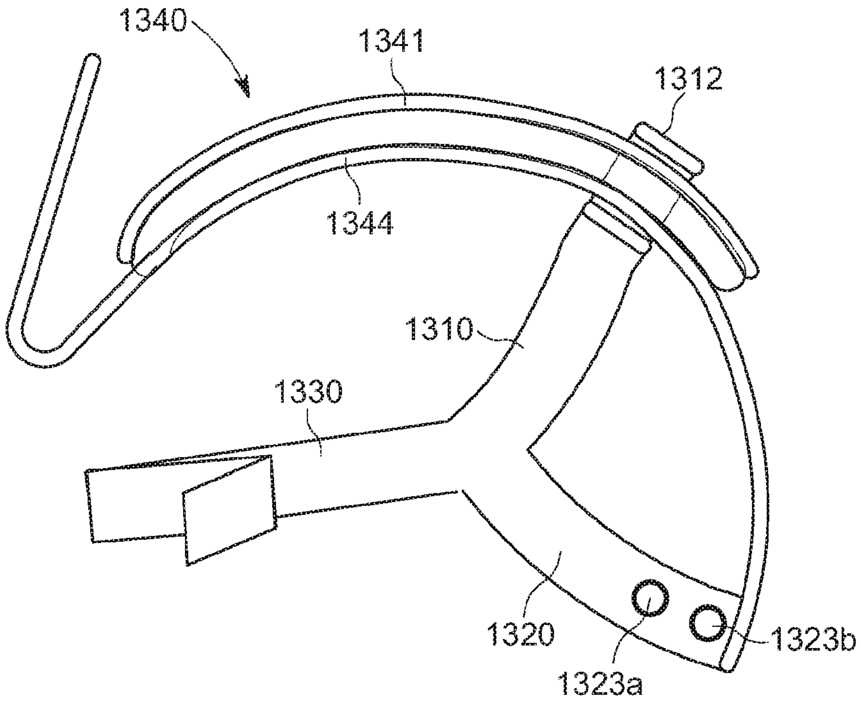
Figure 23D:
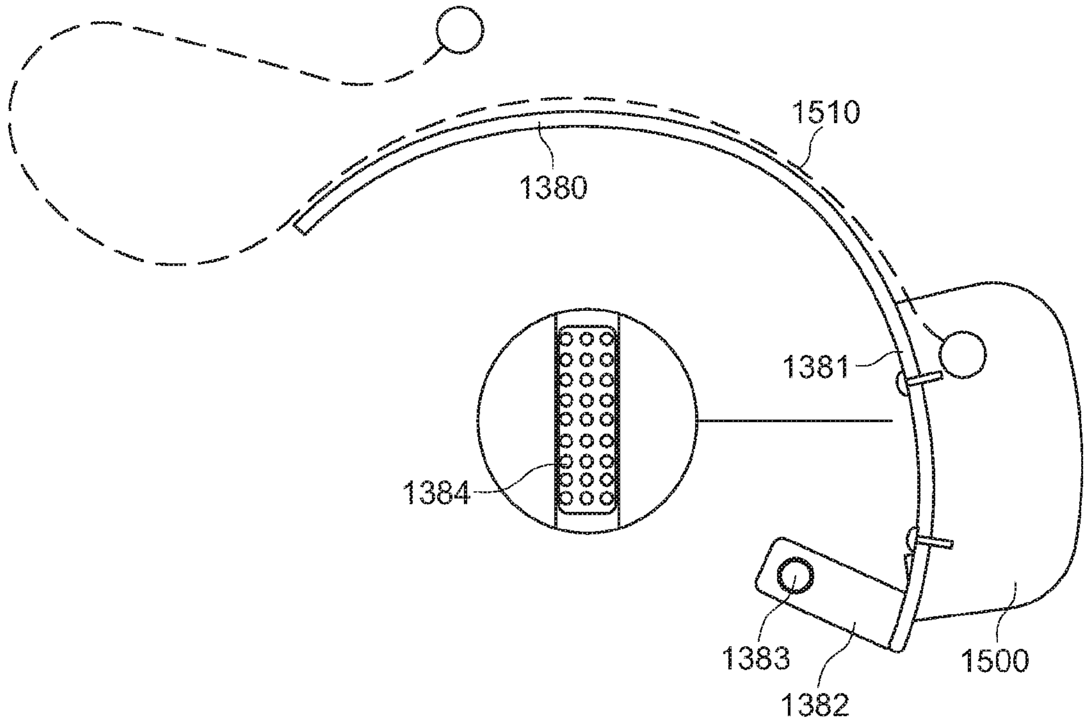
Figure 24A:
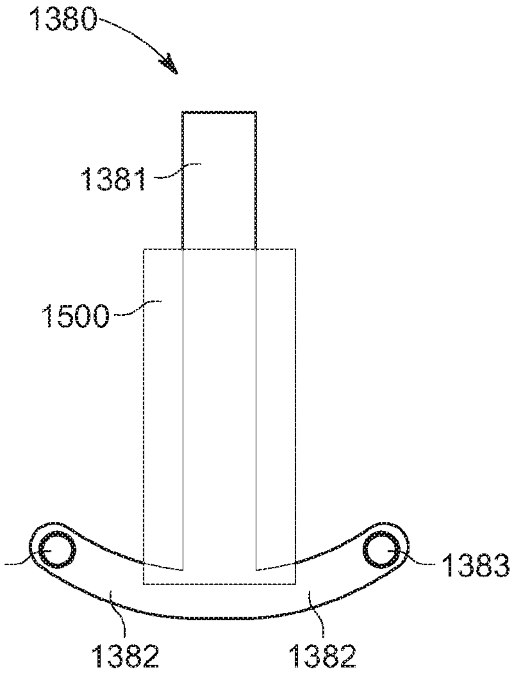
Figure 24B:
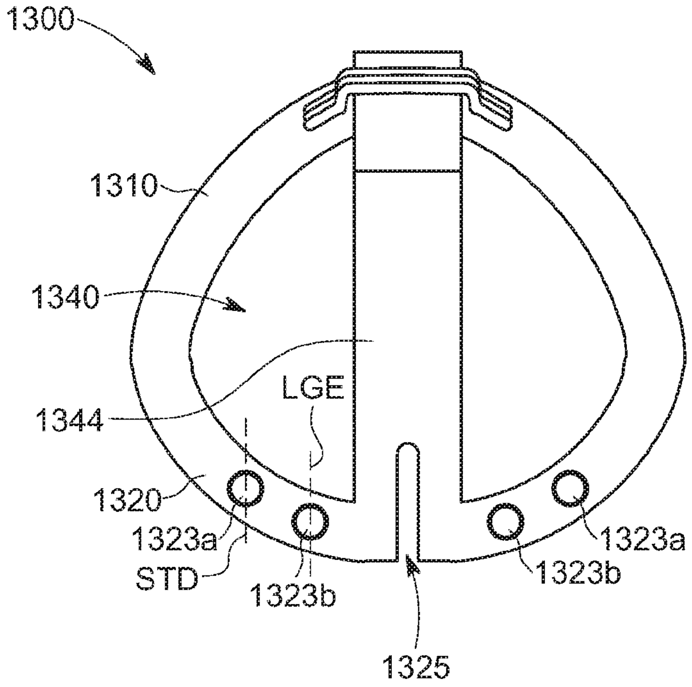
Figure 24C:
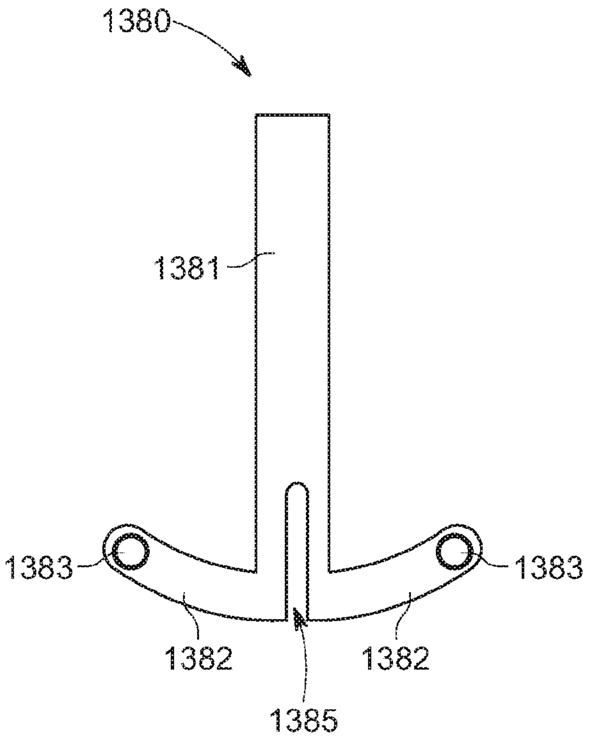
Figure 24D:
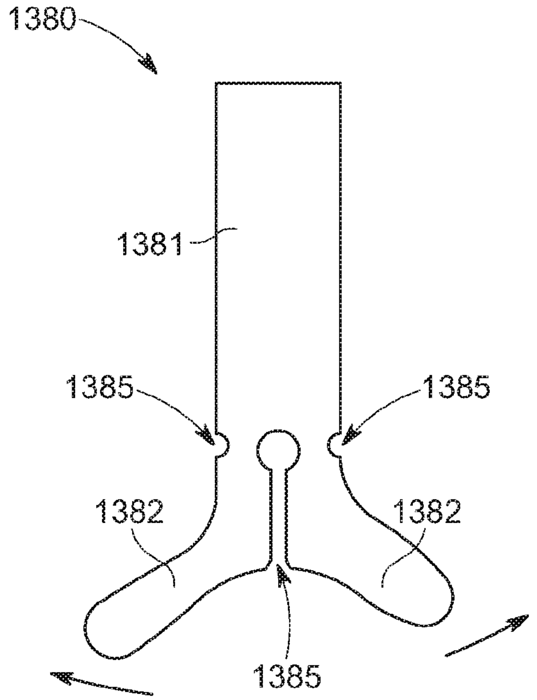

In the example shown in FIGS. 23A-23D, the adjustment rigidiser 1380 is separable from a user-facing layer 1344 of the top strap portion 1340, as illustrated in particular in FIG. 23D. In this example, the adjustment rigidiser 1380 is insertable between the user-facing layer 1344 and an outer layer 1341 of the top strap portion 1340. The adjustment rigidiser 1380 is configured to connect to the user-facing layer 1344. In particular the adjustment rigidiser 1380 comprises hook material 1384 configured to form a hook-and-loop connection to the user-facing layer 1344 of the top strap portion 1340. The adjustment rigidiser 1380 may be foldable, for example at a hinge region, for transport.

The power cable 1510 may be permanently attached to the adjustment rigidiser 1380, as illustrated in FIG. 23D. Additionally, the battery pack 1500 may be permanently attached to the adjustment rigidiser 1380 (for example with screws or an otherwise permanent attachment).

In the examples shown in FIGS. 24C and 24D, the adjustment rigidiser 1380 comprises an inferior cutout 1385 between the pair of lateral rigidising portions 1382 allowing the adjustment rigidiser 1380 to flex at or proximate the connection of the lateral rigidising portions 1382 to the medial rigidising portion 1381. The adjustment rigidiser 1380 shown in FIG. 24D also comprises lateral cutouts 1385 on opposing lateral sides of the medial rigidising portion 1381 proximate the lateral rigidizing portions 1382 allowing the adjustment rigidiser 1380 to flex proximate the lateral cutouts 1385. In the example shown in FIG. 24B, the user-facing layer 1344 of the top strap portion 1340 comprises a cutout 1325 corresponding to (e.g. aligned with) the inferior cutout 1385 in the adjustment rigidiser 1380. The cutouts 1385 and/or 1325 provide a flexing behaviour that allows the occipital strap portion 1320 (or other strap to which an adjustment rigidiser may be connected) to stretch. The stretch may advantageously provide for adapting to head size variation, or dynamic forces during use, by means of adaptation.

5.4.13 Lockable Extendable Connection Portions

FIGS. 31A, 31B and 32A-32H show head-mounted display systems 1000 according to further examples of the present technology, in these examples comprising lockable extendable connection portions 1335. Lockable extendable connection portions 1335 may also be provided to any of the other head-mounted display systems 1000 described herein.

In general, a positioning and stabilising structure 1300 may comprise a first strap portion and a second strap portion connected by a lockable extendable connection portion 1335, which may comprise both an elastically extendable connector strap portion 1338 and a substantially inextensible connector strap portion 1336. In some examples, the substantially inextensible connector strap portion 1336 is a portion of the first strap portion.

The elastically extendable connector strap portion 1338 may be configured to allow a predetermined amount of separation of the first strap portion from the second strap portion. That is, it may elastically extend to a predetermined extent to allow the first and second strap portions to separate (this may assist a user in donning the positioning and stabilising structure 1300). The substantially inextensible connector strap portion 1336 may be configured to releaseably attach the first strap portion to the second strap portion to prevent separation of the first strap portion from the second strap portion (or at least reduce the degree of possible separation). That is, when the substantially inextensible connector strap portion 1336 attaches the first and second strap portions, it prevents them from separating as the elastically extendable connector strap portion 1338 may otherwise allow (this may secure the positioning and stabilising structure 1300 on the user's head in use). The elastically extendable connector strap portion 1338 may also advantageously hold the head-mounted display system 1000 on the user's head with sufficient stability to enable the user to make adjustments to the fit prior to connection of the substantially inextensible connector strap portion 1336.

The user may don the head-mounted display system 1000 with the first and second strap portions unattached by the substantially inextensible connector strap portion 1336 (FIG. 31A). The elastically extendable connector strap portion 1338 may expand to allow the positioning and stabilising structure 1300 to fit over and/or around the user's head, after which the user may attach the first and second strap portions to each other with the substantially inextensible connector strap portion 1336 to hold them securely together for use of the head-mounted display system 1000 (FIG. 31B).

The substantially inextensible connector strap portion 1336 may be able to be adjusted in length. As shown in FIGS. 31A, 31B and 32D-32F the substantially inextensible connector strap portion 1336 comprises a clip 1339 having an eyelet through which a portion of the substantially inextensible connector strap portion 1336 is threaded and fastened back onto itself (for example with a hook-and-loop fastening), allowing for more or less of the strap to be pulled through the eyelet.

The substantially inextensible connector strap portion 1336 in these examples comprises a magnetic clip 1339 configured to magnetically attach to a connection point 1337 on the positioning and stabilising structure 1300.

In some examples, the elastically extendable connector strap portion 1338 may connect to the head-mounted display unit 1200 at an internal surface of an arm 1210, directly to a pivot point or to a side of the head-mounted display unit 1200.

In some examples, the positioning and stabilising structure 1300 comprises a lockable extendable connection portion 1335 in each lateral strap portion 1330. As shown in FIGS. 31A, 31B and 32F, the lockable extendable connection portion 1335 is provided to the lateral strap portion 1330. In this example the lockable extendable connection portion 1335 connects the lateral strap portion 1330 to a strap portion formed by the junction of a parietal strap portion 1310 and an occipital strap portion 1320.

Figure 32A:
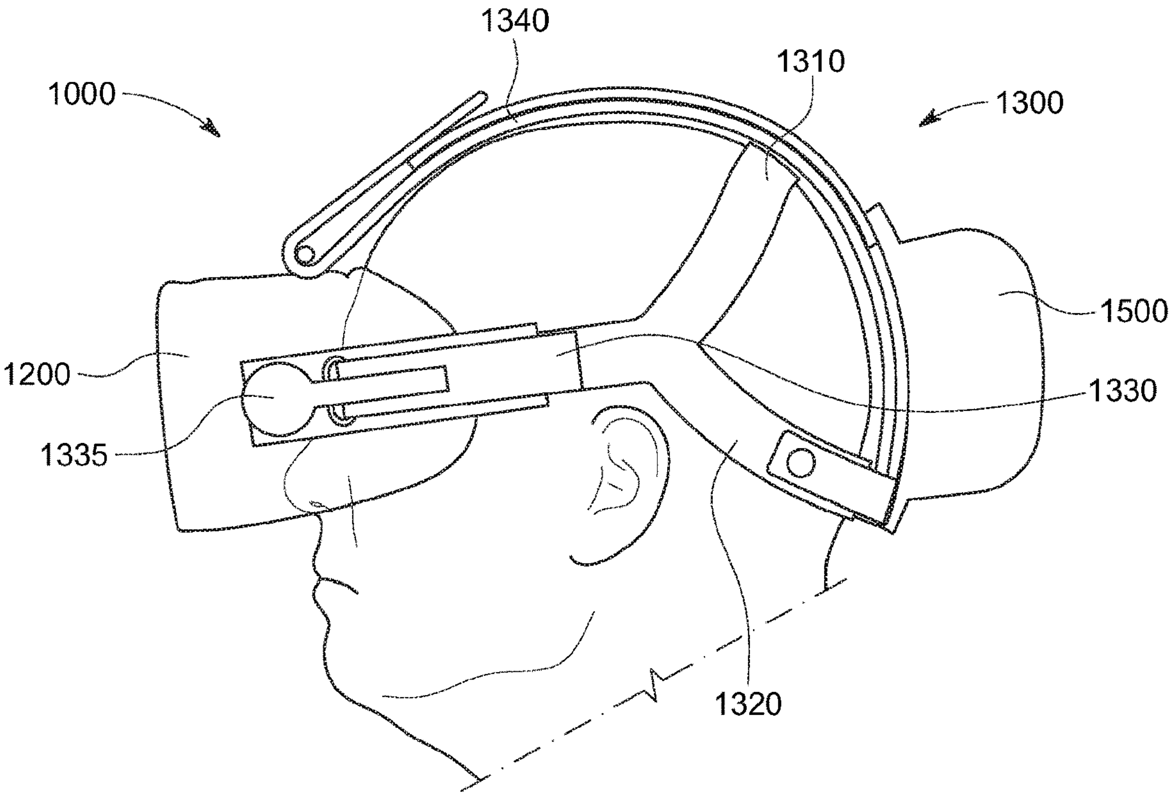

As shown in FIG. 32A, each lockable extendable connection portion 1335 may be located at an arm 1210, extending posteriorly from the head-mounted display unit 1200 (e.g. an arm as has been described herein). In some examples lockable extendable connection portions 1335 may connect directly to a connection point on the head-mounted display unit 1200 (e.g. there may be no arms 1210). In such an examples the lockable extendable connection portion 1335 may pivot about its connection to the head-mounted display unit 1200.

Figure 32B:
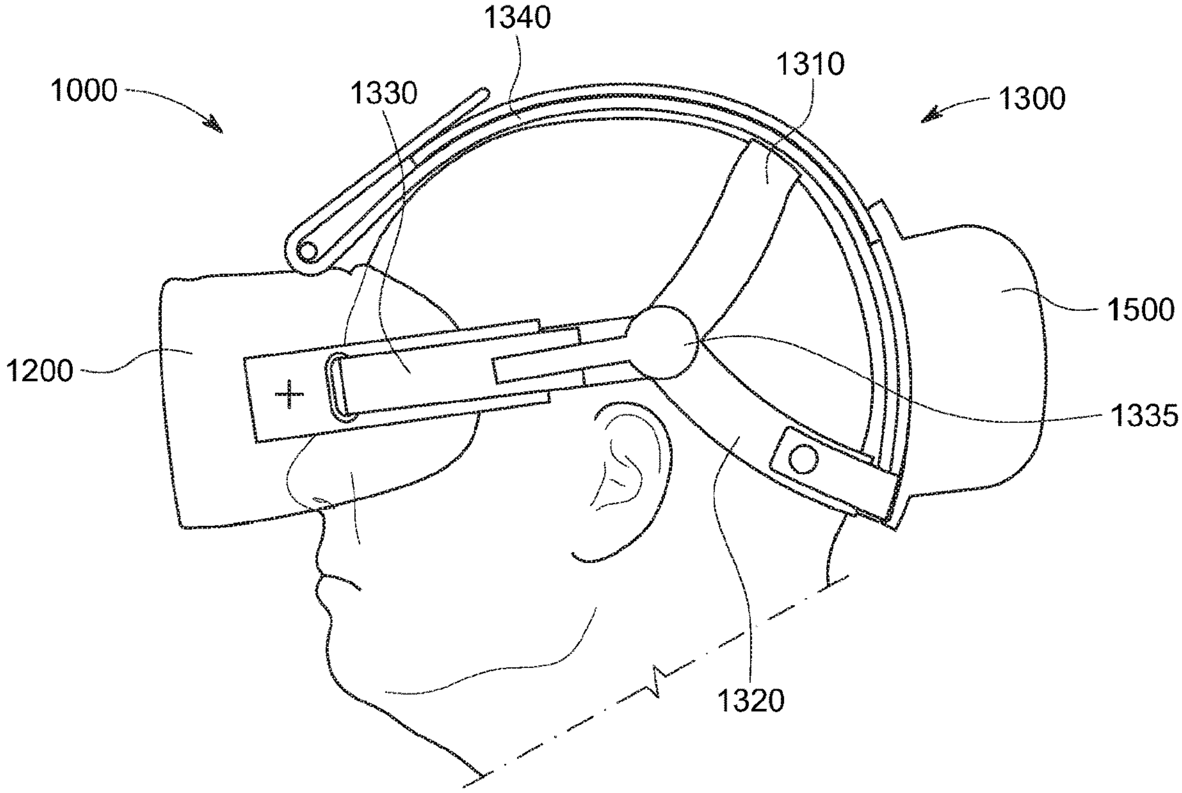

As shown in FIG. 32B, each lockable extendable connection portion 1335 may be located proximate a junction between each lateral strap portion 1330, the parietal strap portion 1310 and the occipital strap portion 1320.

Figure 32C:
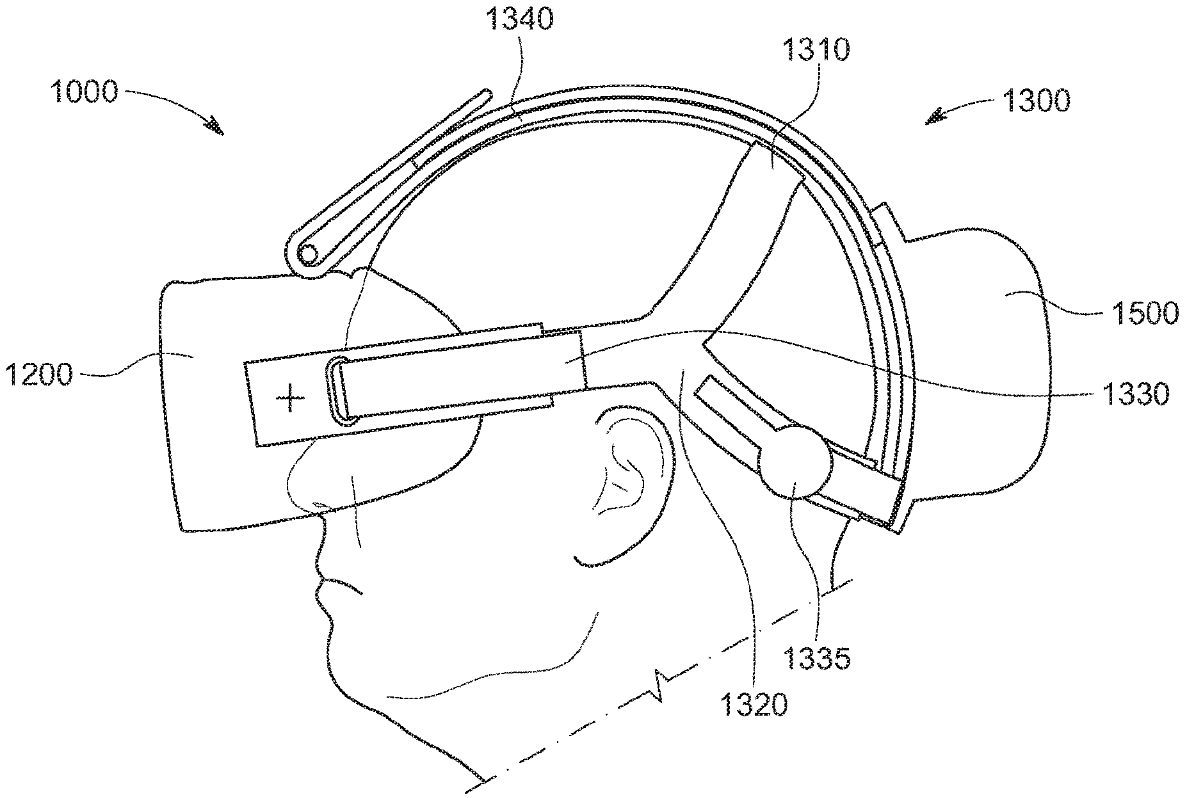
Figure 32D:
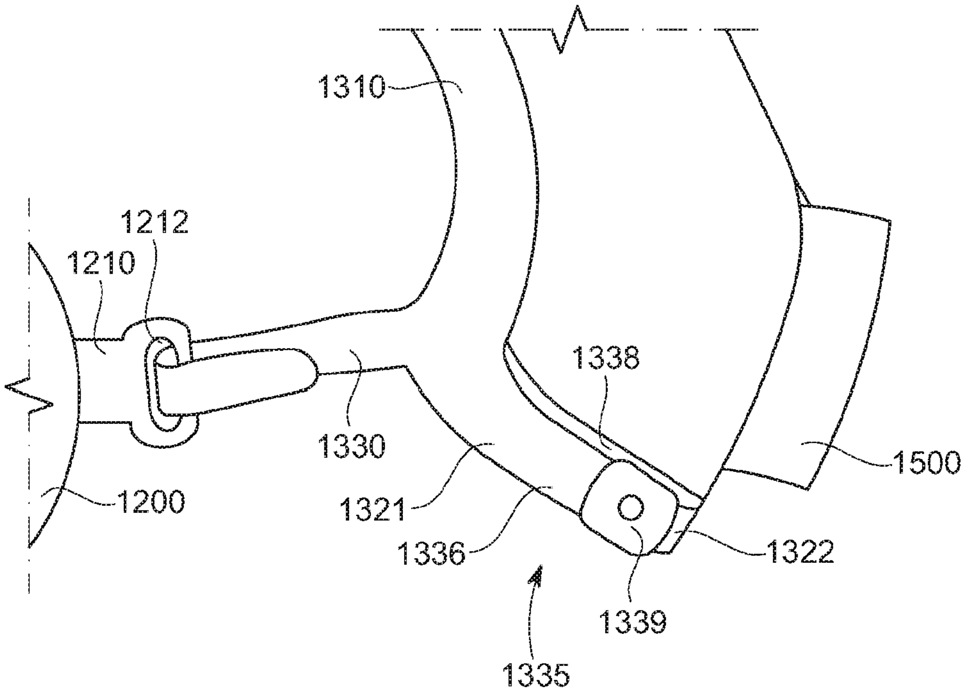
Figure 32E:
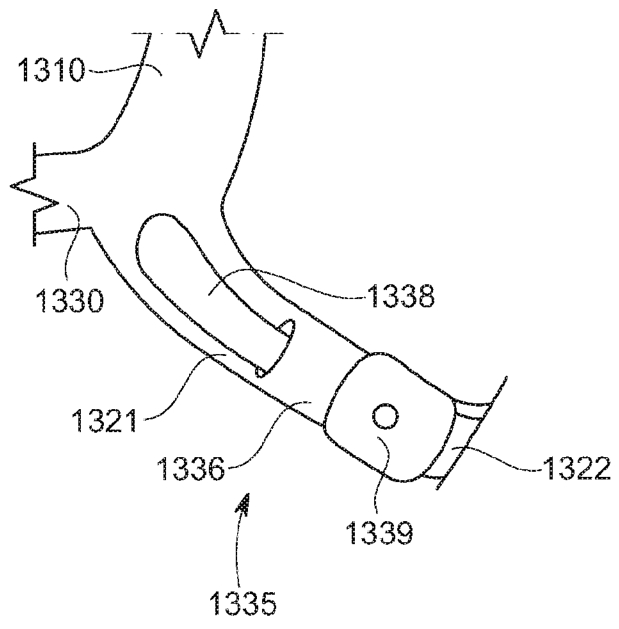
Figure 32F:
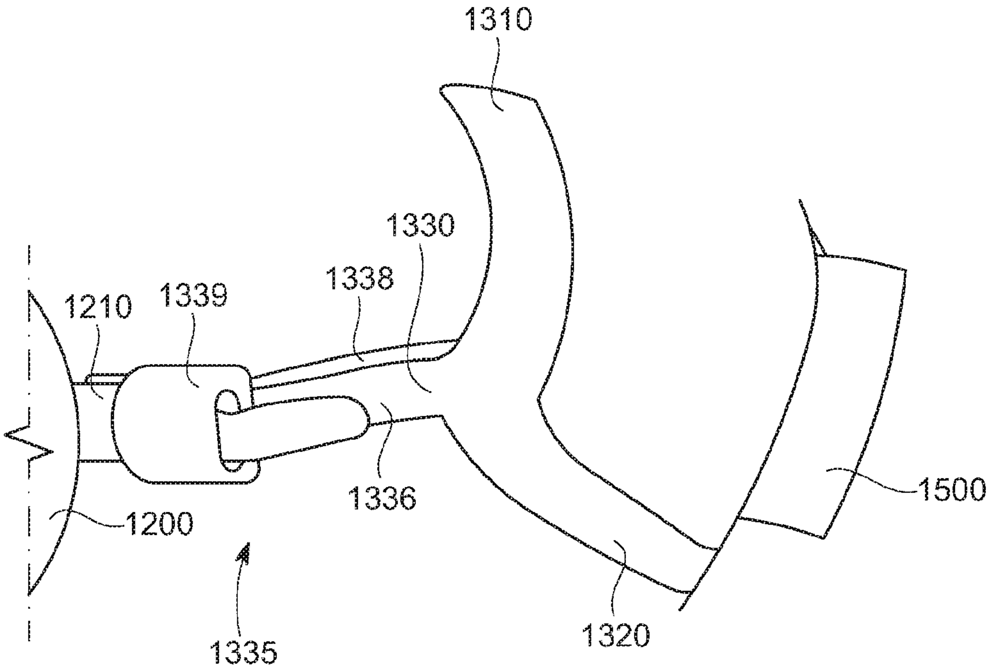

As shown in FIGS. 32C, 32D and 32E, the positioning and stabilising structure 1300 may comprise a lockable extendable connection portion 1335 in an occipital strap portion 1320. In some examples the lockable extendable connection portion 1335 may connect a portion of the occipital strap portion 1320 to an adjustment rigidiser 1380 at this location.

In the examples shown in FIGS. 32D and 32E, a lateral occipital strap portion 1321 forms the substantially inextensible connector strap portion 1336, which connects to a medial occipital strap portion 1322 via a magnetic clip 1339. An elastically extendable connector strap portion 1338 connects between the lateral occipital strap portion 1321 and the medial occipital strap portion 1322 to allow a predetermined amount of separation of the lateral occipital strap portion 1321 and the medial occipital strap portion 1322 when the lateral occipital strap portion 1321 is not attached to the medial occipital strap portion 1322 by the magnetic clip 1339. It is to be understood that in other examples of the present technology the clip of the substantially inextensible strap portion 1336 may not be magnetic. For example, it may be a mechanical clip, such as a buckle. It may be a hook configured to hook around a corresponding point of the positioning and stabilising structure 1300. In some examples the substantially inextensible connector strap portion 1336 may form a loop that fits over a corresponding lug on the positioning and stabilising structure 1300 or may connect via a hook-and-loop connection to a connection point on the positioning and stabilising structure 1300.

In the FIG. 32D example the elastically extendable connector strap portion 1338 connects between the medial occipital strap portion 1322 and a junction between the lateral occipital strap portion 1321 and the parietal strap portion 1310.

In the FIG. 32E example the elastically extendable connector strap portion 1338 connects between the lateral occipital strap portion 1321 and to a lateral portion of the lateral occipital strap portion 1321. The elastically extendable connector strap portion 1338 may pass through a hole in the lateral occipital strap portion 1321 and be attached to an outwardly-facing surface of the lateral occipital strap portion 1321. An advantage of this configuration is that less of the elastically extendable connector strap portion 1338 contacts the user's head. When the elastically extendable connector strap portion 1338 extends and contracts, any portions of it that do not touch the user's head may advantageously have no potentially undesirable effects on the user's head, such as frictional forces on the user's skin or bunching up. These effects could be potentially be uncomfortable and/or leave marks on the user's skin.

Furthermore, as the elastically extendable connector strap portion 1338 extends and contracts, if some or all of the elastically extendable connector strap portion 1338 is located on an exterior side of the substantially inextensible strap portion 1336, any friction acting on the elastically extendable connector strap portion 1338 will be lower than if it were sandwiched between the user's head and the substantially inextensible strap portion 1336. Low friction may advantageously facilitate extension without undue resistance. In some examples of the present technology the entire elastically extendable connector strap portion 1338 is located over an exterior (e.g. non-patient contacting) side of the inextensible strap portions.

Additionally, when at least a portion of elastically extendable connector strap portion 1338 does not contact the user's head, the elastically extendable connector strap portion 1338 may be formed from, for example, a plastic or metal spring, which may be less feasible options if the elastically extendable connector strap portion 1338 contacts the user's head. Similarly, the portions of the positioning and stabilising structure 1300 that do contact the head, such as the substantially inextensible strap portion 1336 and/or a portion of the elastically extendable connector strap portion 1338, can be formed from material configured for user comfort rather than extendibility. In some examples, the elastically extendable connector strap portion 1338 may comprise a user-contacting portion and a non-user contacting portion, the non-user contacting portion being more extendable than the user-contacting portion. The user-contacting portion may be configured for comfort and may be soft, while the non-user contacting portion may be configured for extension and may be less soft.

In some examples, the hole in the substantially inextensible strap portion 1336 through which the elastically extendable connector strap portion 1338 passes may be adjacent an end of the substantially inextensible strap portion 1336, e.g. adjacent the magnetic clip 1339.

In the FIG. 32F example the elastically extendable connector strap portion 1338 connects between an arm 1210 and a junction between a lateral strap portion 1330 and the parietal strap portion 1310. In this example the lateral strap portion 1330 forms the substantially inextensible connector strap portion 1336 of the lockable extendable connection portion 1335. The lateral strap portion 1330 connects to the arm 1210 via a magnetic clip 1339.

Figure 32G:
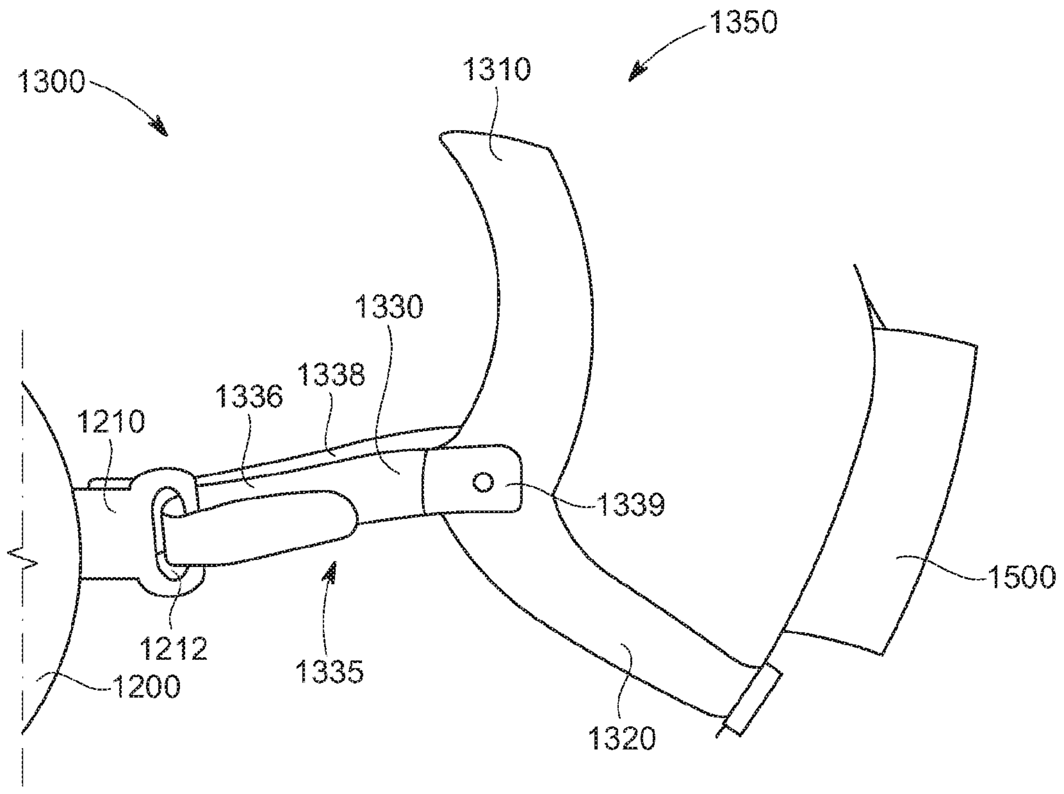

In the FIG. 32G example the elastically extendable connector strap portion 1338 connects between an arm 1210 and a junction between a parietal strap portion 1310 and an occipital strap portion 1320. That is, the elastically extendable connector strap portion 1338 connects between an arm and a posterior support portion 1350 in this example. In this example the substantially inextensible strap portion 1336 of the lockable extendable connection portion 1335 forms the lateral strap portion 1330 of the positioning and stabilising structure 1300. The substantially inextensible strap portion 1336 connects to the posterior support portion 1350 via a magnetic clip 1339 at a posterior end of the substantially inextensible strap portion 1336. The substantially inextensible strap portion 1336 connects at an anterior end to the arm 1210 by passing through an eyelet 1212 and securing back onto itself, for example with a hook-and-loop connection. When donning or doffing the head-mounted display system 1000 the user may disconnect the clip 1339. The elastically extendable connector strap portion 1338 then allows for a predetermined amount of separation of the arm 1210 from the posterior support portion 1350 as the user dons or doffs the head-mounted display system 1000. The connection between the substantially inextensible strap portion 1336 and the arm 1210 may also be adjusted, for example by passing more or less of the substantially inextensible strap portion 1336 through the eyelet 1212. The combination of adjustment at the arm 1210 and the magnetic clip 1339 provide for set-and-forget adjustment of the positioning and stabilising structure 1300 while also facilitating easy donning and doffing.

In other examples, the positioning and stabilising structure 1300 may comprise a lockable extendable connection portion 1335 elsewhere, such as in a parietal strap portion 1310, in a top strap portion 1340, or elsewhere.

5.4.14 Dial Adjuster

Figure 32H:
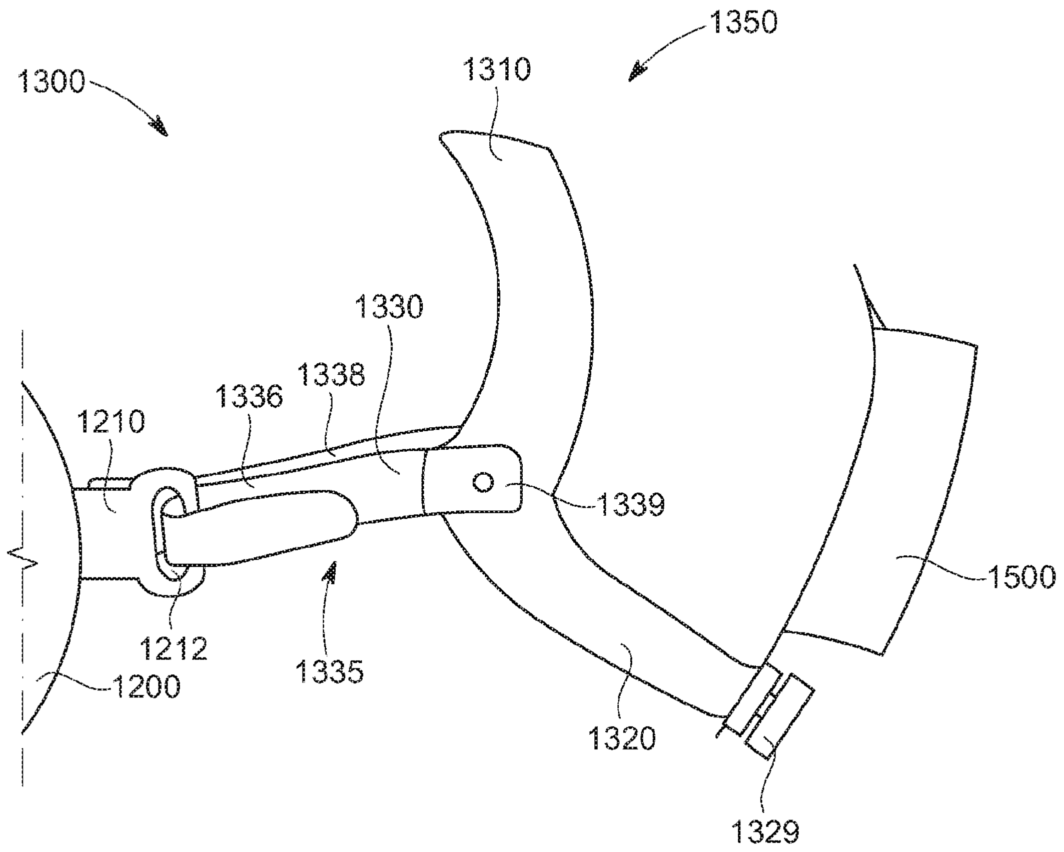

FIG. 32H shows a head-mounted display system 1000 according to another example of the present technology. This example includes all the features of the example shown in FIG. 32G. Although in other examples one or more of the features, such as the lockable extendable connection portion 1335, may be omitted and replaced with a lateral strap portion 1330. A difference from FIG. 32G is that the positioning and stabilising structure 1300 shown in FIG. 32H comprises a dial adjuster 1329. A dial adjuster 1329 may be configured to provide length adjustment of a strap portion. In the FIG. 32H example, the dial adjuster 1329 is configured to adjust a length of the occipital strap portion 1320. For example, the dial adjuster 1329 may comprise a dial configured to be rotated by the user in a first direction to reduce the length of the occipital strap portion 1320 and rotated by the user in a second direction opposite to the first direction to increase the length of the occipital strap portion 1320.

The dial adjuster 1329 may comprise a rack and pinion assembly. The occipital strap portion 1320 may be formed in two portions (e.g. halves) connected at the dial adjuster 1329. The dial adjuster 1329 may cause two portions of the occipital strap portion 1320 to move telescopically. The dial adjuster 1329 may comprise one or more rack portions provided to the occipital strap portion 1320, for example two rack portions each provided to a respective one of two halves of the occipital strap portion 1320. The rack portions may be configured to engage a pinion or cog connected to a dial rotatable by the user. Each of the rack portions and pinion may comprise teeth, ribs or the like configured to engage with one another. Rotating the dial in a first direction (e.g. clockwise) may pull the rack portions provided to the occipital strap portion 1320 together, increasing an overlap between the two rack portions, thereby reducing an effective length of the occipital strap portion 1320. Rotating the dial in a second direction (e.g. anti-clockwise) may push the rack portions apart, reducing an overlap between the rack portions and increasing an effective length of the occipital strap portion 1320. In some examples the dial adjuster 1329 may have static torque resistance, for example provided by static friction or corresponding features such as indentations, to provide for a minimum force required to lengthen the strap portion to which the dial adjuster 1329 is connected, to avoid unintentional lengthening of the strap portion. The rack portions may be rigid portions overmoulded to flexible portions of the occipital strap portions 1320.

The dial adjuster 1329 may provide for intuitive and easy adjustment of a strap portion, allowing the user to achieve a good fit. It is to be understood that the dial adjuster 1329 may be applied to any strap portion of a head-mounted display system 1000. The dial adjuster 1329 may facilitate the positioning and stabilising structure 1300 fitting a range of user head sizes. A head-mounted display system 1000 may comprise a dial adjuster 1329 on any one or more of the occipital strap portion 1320, parietal strap portion 1310, top strap portion 1340 and one or both of the lateral strap portions 1340. More generally, a head-mounted display system 1000 may comprise an adjustment mechanism on any one or more of the occipital strap portion 1320, parietal strap portion 1310, top strap portion 1340 and one or both of the lateral strap portions 1340, or on any other strap portion. The adjustment mechanism may be a dial adjuster 1329 having any one or more of the features described above, or may be another mechanism for adjusting a length of lengths of a strap portion.

5.4.15 Frontal Support Portion

FIGS. 19A and 19B show head-mounted display systems 1000 according to further examples of the present technology. Each comprises a head-mounted display unit 1200 comprising a display, and a positioning and stabilising structure 1300 configured to hold the head-mounted display unit 1200 in an operable position on a user's head in use.

In these examples, the positioning and stabilising structure 1300 comprises a posterior support portion 1350 configured to engage a posterior portion of a user's head. The positioning and stabilising structure 1300 also comprises a pair of lateral strap portions 1330 configured to connect between the posterior support portion 1350 and the head-mounted display unit 1200, each configured to be located on a respective lateral side of the user's head in use.

Each positioning and stabilising structure 1300 also comprises a frontal support portion 1360, which may also be identified as a forehead support, configured to engage the user's head at a location overlying a frontal bone of the user's head, in use. This is shown in FIGS. 19A and 19B.

The frontal support portion 1360 is connected to the head-mounted display unit 1200 in each example. The frontal support portion 1360 may be connected to the head-mounted display unit at one or more locations as will be described.

5.4.15.1 Frontal Support Portion Connects to Head-Mounted Display Unit

As shown in each of FIGS. 19A and 19B, the positioning and stabilising structure 1300 comprises a frontal connector 1362 connected between the frontal support portion 1360 and the head-mounted display unit 1200. In these examples, the frontal connector 1362 is located substantially in the sagittal plane of the user's head. In other examples, the positioning and stabilising structure 1300 may comprise two or more frontal connectors 1362, which may be spaced apart, for example symmetrically across the sagittal plane. The frontal connector 1362 may restrict (e.g. limit or prevent) downwards movement of the head-mounted display unit 1200 in use, especially when the user moves their head.

The frontal connector 1362 may be formed from a flexible material. In some examples the flexible material comprises a flexible inelastic material, such as a thermoplastic material. In other examples the flexible material may comprise an elastic material, such as one of silicone, TPE or an elastic textile strap. The frontal connector 1362 may advantageously hold the head-mounted display unit 1200 steady as the user moves. A frontal connector 1362 formed from elastic material may advantageously act as a shock-absorber during active movement of the user.

In other examples, the frontal connector 1362 is formed from a substantially rigid material, such as a thermoplastic material.

5.4.15.2 Frontal Support Portion Connects to Posterior Support Portion

The frontal support portion 1360 may additionally or alternatively be connected to the posterior support portion 1350.

With reference to FIG. 19A, the positioning and stabilising structure 1300 comprises a pair of lateral connectors 1364 each connected between the frontal support portion 1360 and the posterior support portion 1350. In this particular example, the posterior support portion 1350 comprises a parietal strap portion 1310 configured to overlie the parietal bones of the user's head in use and an occipital strap portion 1320 configured to overlie or lie below an occipital bone of the user's head in use. Each of the lateral connectors 1364 may be connected to a respective side of the posterior support portion 1350 proximate the occipital strap portion 1320, or connected to a respective side of the occipital strap portion 1320. In the illustrated example the positioning and stabilising structure 1300 also comprises lateral strap portions 1330 connecting the posterior support portion 1350 to the head-mounted display unit 1200. In other examples the lateral connectors 1364 may connect to respective lateral support straps 1330.

Each lateral connector 1364 may be elastically extendable. Alternatively, or additionally, each lateral connector may be adjustable in length.

Each lateral connector 1364 may be fixedly connected to the frontal support portion 1360 and releasably attachable to the posterior support portion 1350. Alternatively, each lateral connector 1364 may be releasably attachable to the frontal support portion 1360 and releasably attachable to the posterior support portion 1350. In further examples, each lateral connector 1364 may be releasably attachable to the frontal support portion 1360 and fixedly connected to the posterior support portion 1350. Each lateral connector 1364 may be connected to the posterior support portion 1350 and/or to the frontal support portion 1360 by a snap button, a clip or a hook-and-loop connection.

The lateral connectors 1364 connecting the frontal support portion 1360 to the posterior support portion 1350 (and to the occipital strap portion 1320 in this particular example) enables the frontal support portion 1360 to be held securely (e.g. sufficiently tightly) against the user's head overlying the frontal bone. In particular, this may advantageously allow the frontal support portion 1360 to support a large amount of the weight of the head-mounted display unit 1200, and hold the head-mounted display unit 1200 in position during active movement in use.

5.4.15.3 Arms

As illustrated in each of FIGS. 19A and 19B, the head-mounted display unit 1200 may comprise a display unit housing 1205 and a pair of arms 1210 extending from the display unit housing 1205. The lateral strap portions 1330 each connect to a respective one of the arms 1210, in these examples. In particular, each lateral strap portion 1330 connects to a posterior end of a respective one of the pair of arms 1210. As shown, each lateral strap portion 1330 passes through an eyelet 1212 at the posterior end of the respective arm 1210 and is fastened back onto itself. Each of the pair of arms 1210 is able to pivot with respect to the display unit housing 1205 in these examples.

5.4.15.4 Frontal Support Portion Connects to Arms

With reference to FIG. 19B, the positioning and stabilising structure 1300 in this example comprises a pair of lateral connectors 1364 each connected between the frontal support portion 1364 and a respective one of the pair of arms 1210.

Each lateral connector 1364 may be elastically extendable. Alternatively, or additionally, each lateral connector may be adjustable in length.

Each lateral connector 1364 may be fixedly connected to the frontal support portion 1360 and releasably attachable to a respective one of the arms 1210. Alternatively, each lateral connector 1364 may be releasably attachable to the frontal support portion 1360 and releasably attachable to a respective one of the arms 1210. In further examples, each lateral connector 1364 may be releasably attachable to the frontal support portion 1360 and fixedly connected to a respective one of the arms 1210. Each lateral connector 1364 may be connected to a respective one of the arms 1210 and/or to the frontal support portion 1360 by a snap button, a clip or a hook-and-loop connection.

Lateral connectors 1364 connecting the frontal support portion 1360 to the arms 1210 may enable the frontal support portion 1360 to support some or all of the weight of the head-mounted display unit 1200, via the arms, optionally in addition to the frontal connector 1362, and hold the head-mounted display unit 1200 in position during active movement in use.

5.4.16 Hair Strap Portion

FIGS. 20A and 20B show a head-mounted display system 1000 according to another example of the present technology. The head-mounted display system 1000 comprises a positioning and stabilising structure 1300 configured to hold a head-mounted display unit 1200 in an operable position on the user's head (as shown in FIGS. 20A and 20B in use).

In this example, the positioning and stabilising structure 1300 comprises a posterior support portion 1350 configured to engage a posterior portion of a user's head and one or more anterior support portions (in this example particular example a pair of lateral strap portions 1330 and a top strap portion 1340) configured to connect the posterior support portion 1350 and the head-mounted display unit 1200 in use. In other examples the top strap portion 1340 may be omitted, or the positioning and stabilising structure may have a pair of upper lateral strap portions and a pair of lower lateral strap portions, for example.

In this example, the positioning and stabilising structure 1300 comprises a hair strap portion 1370 connected to the posterior support portion 1350. The hair strap portion 1370 may be positionable in use between the user's head and hair descending from the posterior portion of the user's head. The hair strap portion 1370 may be able to be put under the user's hair, if the user has sufficiently long hair. The hair strap portion 1370 may anchor under the hair, e.g. between the hair and neck or hair and head, to provide further stability to the head-mounted display system 1000. FIG. 20B shows the hair strap portion 1370 under the user's hair.

As discussed above, in this example the one or more anterior support portions comprises a pair of lateral strap portions 1330 connecting the posterior support portion 1350 to the head-mounted display unit 1200.

As illustrated, the hair strap portion 1370 comprises a pair of ends 1371 and 1372 connected to respective lateral sides of the posterior support portion 1350. Each end of the hair strap portion 1370 is located proximate the Frankfort horizontal plane of the user's head in use. The hair strap portion 1370 may be removably attachable at one or both ends of the hair strap portion 1370 to the posterior support portion 1350.

In some examples, the hair strap portion 1370 comprises a left strap portion and a right strap portion removably attached to the left strap portion. The left strap portion may be removably attached to the right strap portion proximate a sagittal plane of the user's head in use. The user may separate the two strap portions and reconnect them under their hair when donning the head-mounted display system 1000.

In some examples, the hair strap portion 1370 is elastically extendable. In other examples, the hair strap portion 1370 is substantially non-extendable.

As shown in FIGS. 20A and 20B, in this illustrated example the posterior support portion 1350 comprises a parietal strap portion 1310 configured to overlie the parietal bones of the user's head in use and an occipital strap portion 1320 configured to overlie or lie below an occipital bone of the user's head in use. In particular, the hair strap portion 1370 is connected to the occipital strap portion in use. The hair strap portion 1370 may be connected to the occipital strap portion 1320 proximate ends of the occipital strap portion 1320.

A hair strap portion 1370 as described herein may be incorporated into any of the positioning and stabilising structures 1300, having an occipital strap portion, described herein.

5.4.17 Releasable Attachment of Posterior Portion

Figure 36A:
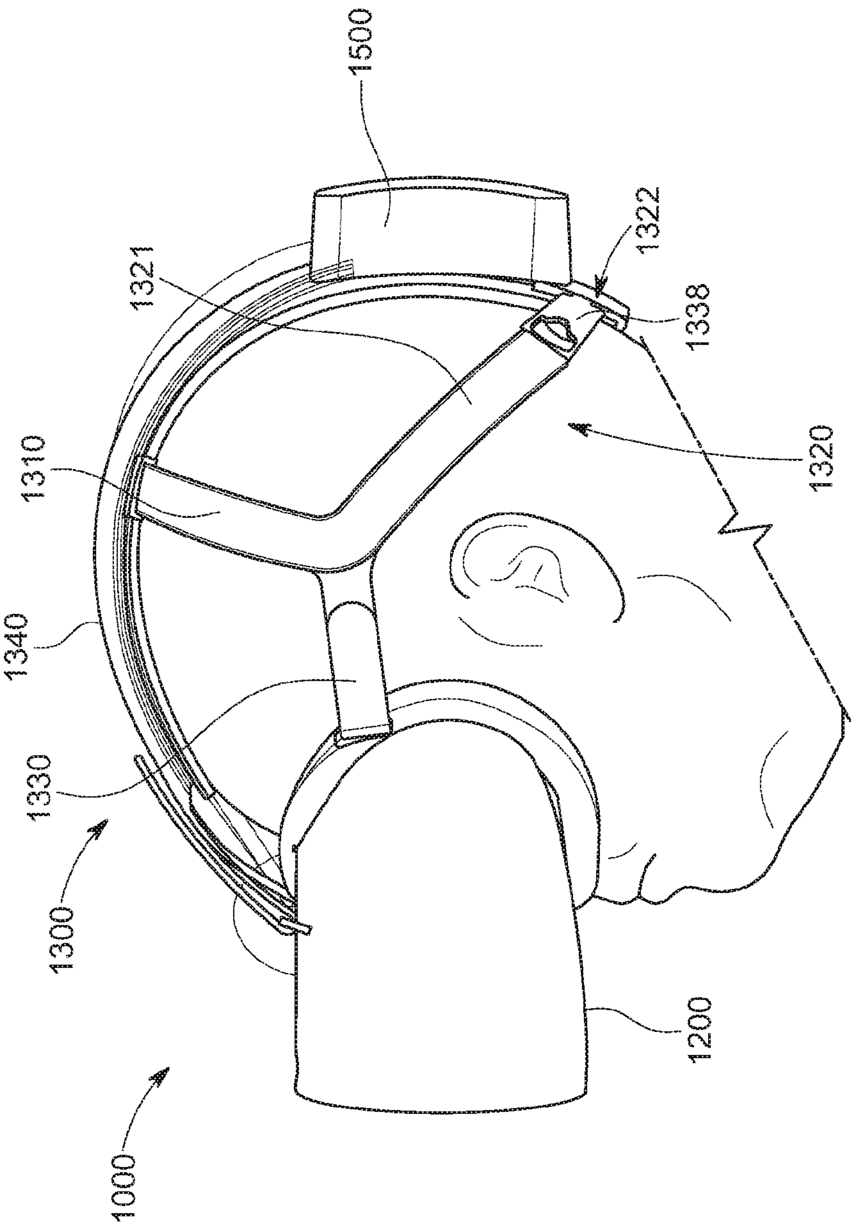
Figure 36B:
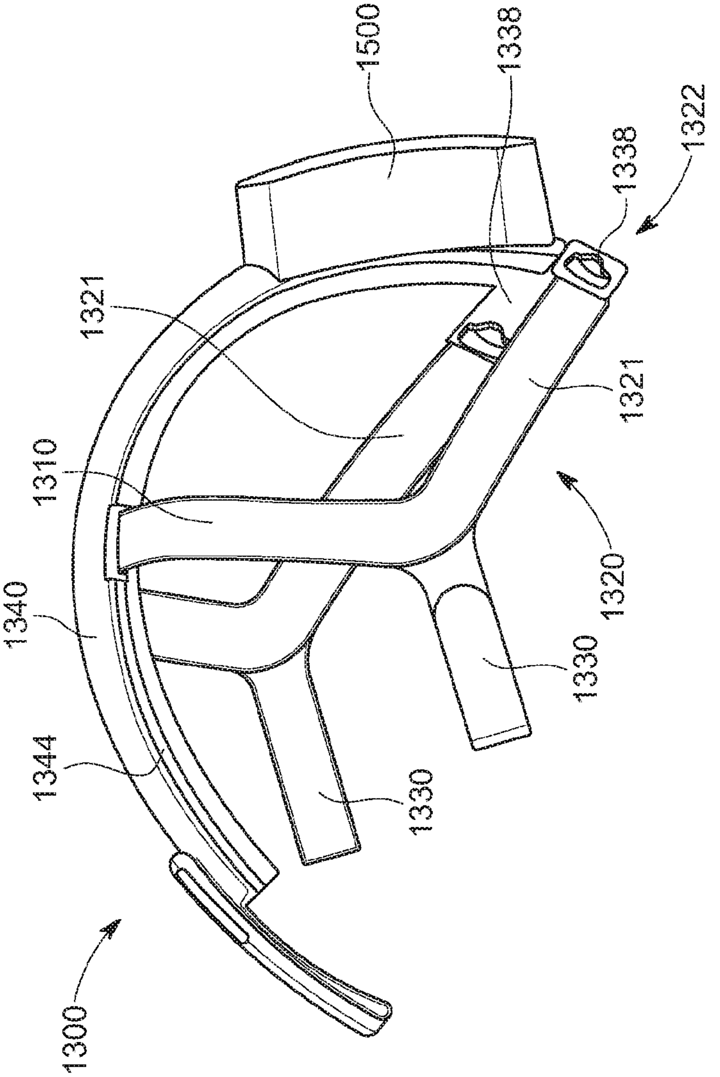
Figure 36C:
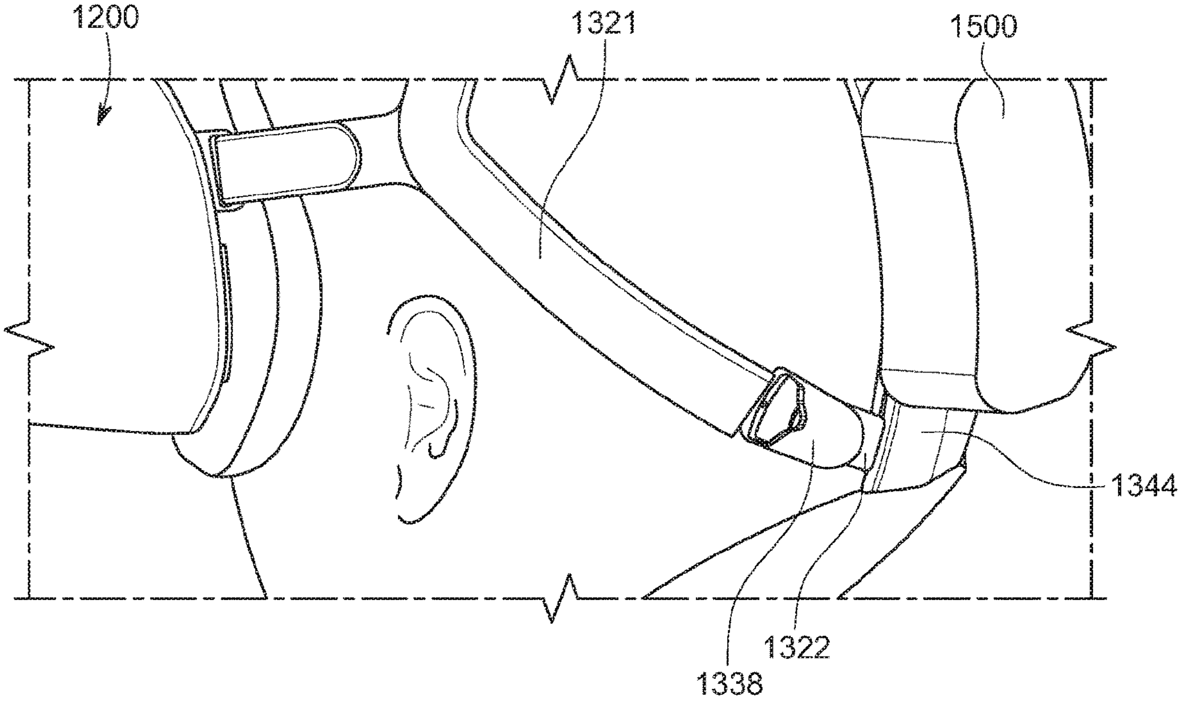

FIGS. 36A-36D show head-mounted display systems 1000 according to further examples of the present technology, although share features with the examples described elsewhere, not all of which will be repeated. FIGS. 36A and 36B show a positioning and stabilising structure 1300 having a parietal strap portion 1310, a pair of lateral strap portions 1330, and a top strap portion 1340.

The positioning and stabilising structure 1300 further has an occipital strap portion 1320 formed by a pair of lateral occipital strap portions 1321 extending from the parietal strap portion 1310, each of the lateral occipital strap portions 1321 releasably attached to a medial occipital portion 1322 configured to overlie or lie below an occipital bone of the user's head in use. In other examples the lateral occipital strap portions 1321 may not extend from a parietal strap portion 1310 and may instead extend (e.g. in a partially inferior and partially posterior direction) from another component of the positioning and stabilising structure 1300 or head-mounted display system 1000.

The parietal strap portion 1310, the medial occipital portion 1322 and the lateral occipital strap portions 1321 may form a posterior support portion 1350 configured to engage a posterior portion of a user's head in use. The parietal strap portion 1310 is configured to overlie the parietal bones of the user's head in use. The pair of lateral occipital strap portions 3122 are each configured to be located on a respective lateral side of the user's head in use. As shown in FIG. 36A for example, the positioning and stabilising structure 1300 may comprise a top strap portion 1340 configured to connect between the posterior support portion 1350 and the head-mounted display unit 1200.

In some examples the top strap portion 1340 connects directly to the posterior support portion 1350 (e.g. connecting directly to the parietal strap portion 1310 or occipital strap portion 1320). In other examples the top strap portion 1350 connects to the posterior support portion 1350 via another component, such as a battery pack 1500. That is, in some examples the top strap portion 1340 is connected to the posterior support portion 1350 by connecting to a battery pack 1500 which is connected to a component of the posterior support portion 1350, such as the occipital strap portion 1320.

The head-mounted display system 1000 may comprise a battery pack 1500 for powering the head-mounted display system 1000. The battery pack 1500 may be located posteriorly to the user's head in use. The battery pack 1500 may be configured to be connected to the top strap portion 1340 in use. Any features of a top strap portion 1340 and battery pack 1500 described elsewhere herein may be applied to the top strap portion 1340 and battery pack 1500 shown in FIGS. 36A-36D, unless context clearly requires otherwise.

In the example illustrated, the medial occipital portion 1322 is rigidised. The medial occipital portion 1322 may comprise an occipital rigidiser. In alternative examples the medial occipital portion 1322 may comprise a flexible strap, e.g. a medial occipital portion strap. In some examples, the medial occipital portion 1322 may form part of the top strap portion 1340. The medial occipital portion 1322 may be permanently attached within the top strap portion 1340, for example permanently attached to a user-facing layer. In some examples the medial occipital portion 1322 may be secured to the top strap portion 1340, for example stitched or welded in place to a user-facing layer 1344 of the top strap portion 1340. In alternative examples, the medial occipital portion 1322 may be secured in a similar manner as described elsewhere with reference to the adjustment rigidiser 1380.

In some examples, the positioning and stabilising structure 1300 comprises a releasable fastener between each of the pair of lateral occipital strap portions 1321 and the medial occipital portion 1322. Each releasable fastener may comprise a fastener portion configured to be attached to a corresponding connection point 1337. In the FIG. 36A-36D example, the medial occipital portion 1322 comprises a pair of connection points 1337 configured to connect to corresponding fastener portions provided to the respective lateral occipital strap portions 1321.

Figure 36D:
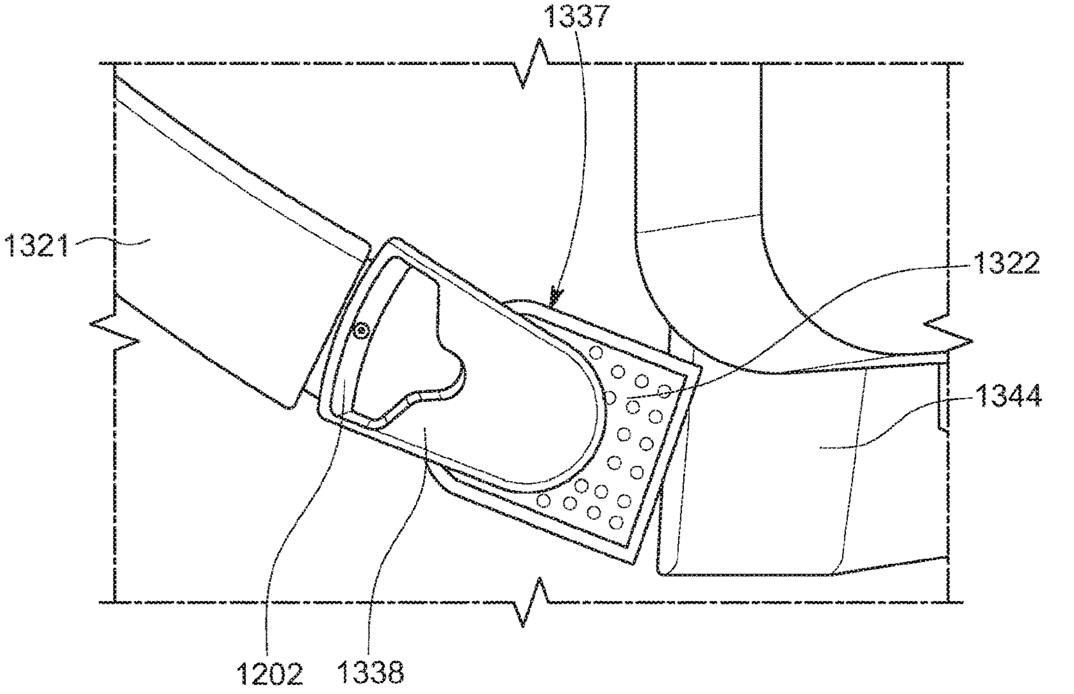

As shown in FIG. 36D, in some examples the releasable attachment is provided by a magnetic fastener. Each magnetic fastener may comprise a magnetic clip portion configured to magnetically attach to a respective one of the connection points 1337. As shown in FIG. 36D, a magnetic clip 1339 is secured to the lateral occipital strap portion 1321, the magnetic clip 1339 configured to magnetically attach to a connection point 1337 on the posterior occipital portion 1322.

In examples, the length of each of the lateral occipital strap portions 1321 may be adjustable. For example, each magnetic clip 1338 may have an eyelet 1202, and a portion of each of the pair of lateral occipital strap portions 1321 may be threaded through the eyelet and fastened back onto itself at a desired length.

5.4.18 Washable Portion of Positioning and Stabilising Structure

FIGS. 39A-39C show further illustrations of the positioning and stabilising structure 1300 shown in FIGS. 36A-36D described above. FIGS. 40A-40B, 41A-41B and 42A-42D show positioning and stabilising structures 1300 and components thereof according to further examples of the present technology. Many of the features described above in relation to other examples of the present technology will not be repeated here but are applicable in combination with the concepts described below. The positioning and stabilising structures 1300 shown in FIGS. 36A-36D, 39A-39C, 40A-40B, 41A-41B and 42A-42D also share some features with the examples shown in FIGS. 21A-21D and 23A-23D and with each other. Unless required otherwise, the features of each of these examples are to be understood to be applicable to each of the other examples as alternatives or in combination.

In each of the examples shown in FIGS. 36A-36D, 39A-39C, 40A-40B, 41A-41B and 42A-42D, the head-mounted display system 1000 comprises a battery pack 1500 for powering the head-mounted display system 1000, the battery pack 1500 configured to be located posteriorly to the user's head in use. The top strap portion 1340 of each positioning and stabilising structure 1300 is connected to the battery pack 1500 in use.

5.4.18.1 Outer Layer of Top Strap Portion Separable from User-Facing Layer

In the examples shown in FIGS. 39A-39C, 40A-40B and 41A-41B, the top strap portion 1340 comprises a user-facing layer 1344 and an outer layer 1341 (on an opposite side of the top strap portion 1340 to the user-facing layer 1344). In these examples, the user-facing layer 1344 of the top strap portion 1340, the parietal strap portion 1310, the occipital strap portion 1320 and lateral strap portions 1330 are separable from the outer layer 1341 of the top strap portion 1340. With respect to the FIG. 39A-39C example, FIG. 39B shows these components separated from the outer layer 1341 of the top strap layer 1340. FIG. 39C shows the separated outer layer 1341 of the top strap portion 1340 (in this example the outer layer 1341 is formed by an outer sleeve 1348, to be described below). FIGS. 42A-42D show components of the positioning and stabilising structure 1300 of FIG. 41A-41B in isolation.

An advantage of this type of configuration is that the user-facing layer 1344 of the top strap portion 1340, the parietal strap portion 1310, the occipital strap portion 1320 and lateral strap portions 1330 may form a washable portion (e.g. a washable subassembly) of the positioning and stabilising structure 1300 (washable portion shown in isolation in FIG. 39B). These components may be user-contacting parts of the positioning and stabilising structure 1300 and may all be formed from washable materials, e.g. textile materials, plastic materials, non-electronic components (machine-washable or otherwise easily washable materials). The washable portion can be separated from the outer layer 1341 of the top strap portion 1340 for washing by the user, for example periodically or when dirty as required. Additionally, as will be described below, the head-mounted display system 1000 comprises a power cable 1510 connecting the battery pack 1500 to the head-mounted display unit 1200. The washable portion can be separated from the power cable 1510 (and battery pack 1500) at the same time as it is separated from other non-user contacting components, without the user being required to manipulate the power cable 1510 (e.g. unplug it, withdraw it from a sleeve or otherwise consider the power cable 1510 when removing the washable parts of the positioning and stabilising structure 1300).

The outer layer 1341 of the top strap portion 1340 may be configured to connect to a head-mounted display unit 1200 of the head-mounted display system 1000. As shown in each of FIGS. 39A, 40A and 41A an anterior portion of the outer layer 1341 is able to be passed through a portion of the head-mounted display unit 1200 (not shown) such as an eyelet, lug or the like, looped back and secured to itself, for example with a hook-and-loop connection (or another suitable connection such as by a buckle or one of a series of press studs). This connection may be as described elsewhere herein.

As shown by way of example in FIGS. 42A-42D, the positioning and stabilising structure 1300 may comprise a buckle 1312 attached to the parietal strap portion 1310, similar to the buckle 1312 described above with reference to FIGS. 7B and 7C. In use a user-contacting portion 1342 (e.g. at least a user-facing layer 1344) may be located between the buckle 1312 and the parietal strap portion 1310. The buckle 1312 may be configured to limit lateral movement of the user-contacting portion 1342, which may advantageously keep the top strap portion 1340 centred on the user's head in use. In this example, the buckle 1312 is located in the sagittal plane of the user's head in use. In the FIGS. 42A-42D example the buckle 1312 is formed by a length of flexible material extending between two points along the parietal strap portion 1310 on opposing sides of the centre of the parietal strap portion (e.g. symmetrically opposed on either side of the sagittal plane of the user's head in use). The buckle 1312 may be stitched or welded to the parietal strap portion 1310 or connected in another suitable manner (e.g. glue, further buckles). FIG. 57 shows a further example of a buckle 1312.

5.4.18.2 Connection Between Occipital Strap Portion and Top Strap Portion

The occipital strap portion 1320 may be removably connected to the top strap portion 1340. In the FIG. 39A-39C example, the occipital strap portion 1320 comprises a pair of lateral occipital strap portions 1321 configured to connect between the parietal strap portion 1310 and the top strap portion 1340, each lateral occipital strap portion 1321 configured to be located on a respective lateral side of the user's head in use. In this example, each of the lateral occipital strap portions 1321 is adjustable in length. According, the length of the occipital strap portion 1320 is adjustable. In this example, the occipital strap portion 1320 connects to the top strap portion 1340 via a magnetic connection. In particular, each of the lateral occipital strap portions 1321 is configured to connect to the top strap portion 1340 via a magnetic fastener. As shown in FIGS. 39A and 39B, the occipital strap portion 1320 connects to the top strap portion 1340 via magnetic clips 1338.

In the FIGS. 40A-40B and 41A-41B examples the occipital strap portion 1320 removably connects to the top strap portion 1340, but in a manner in which the occipital strap portion 1320 is not length adjustable, which may advantageously make the positioning and stabilising structure 1300 more intuitive to set up.

Figure 42A:
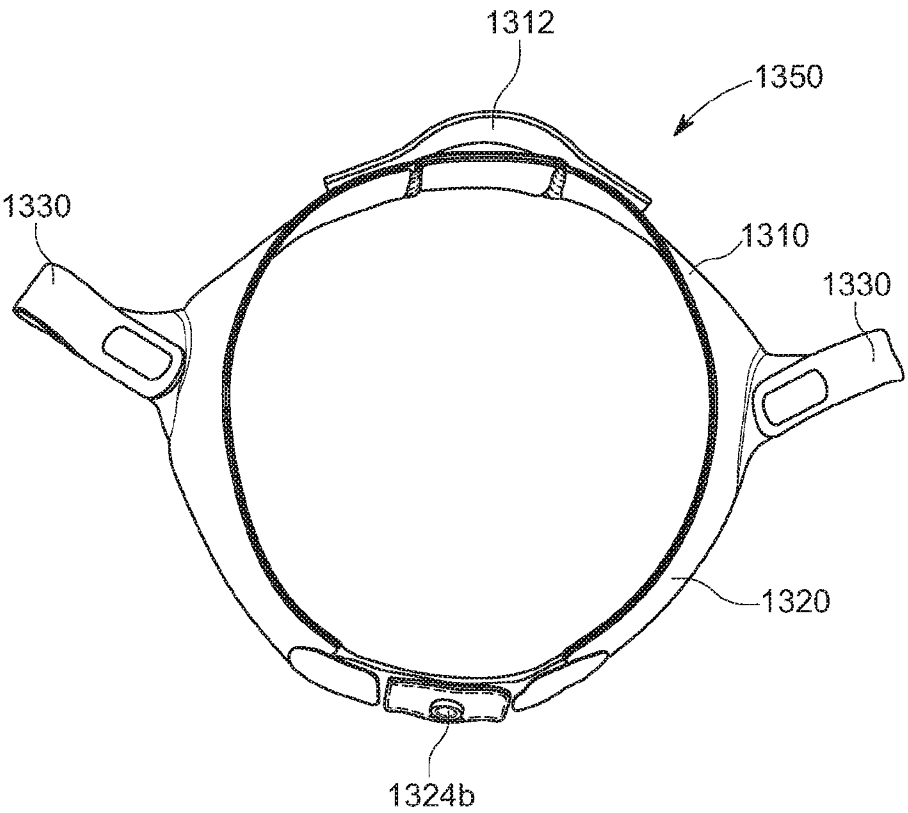
Figure 42B:
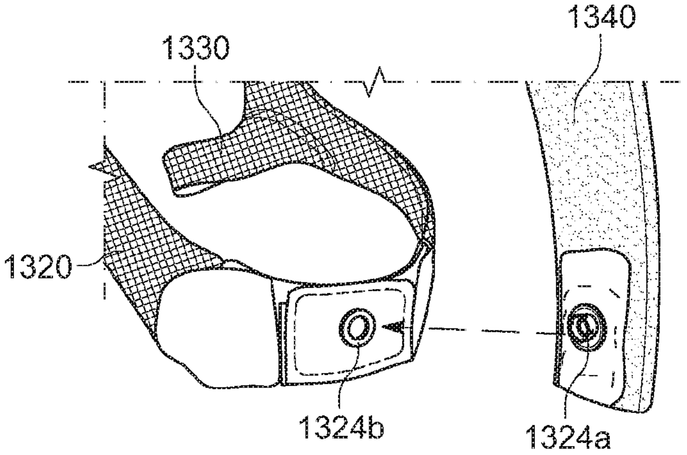

FIGS. 42A and 42B show the connection between the occipital strap portion 1320 and the top strap portion 1340 shown in FIGS. 41A-41B. The top strap portion 1340 is configured to connect to the occipital strap portion 1320 in this example via a pivotable connection. That is, the occipital strap portion 1320 is able to pivot with respect to the top strap portion 1340 (or vice versa), which may improve comfort. As shown in FIGS. 42A and 42B, the pivotable connection comprises a press stud connection. The press stud connection comprises a male press stud part 1324*a* and a female press stud part 1324*b*, configured to snap together during assembly of the top strap portion 1340 and occipital strap portion 1320. The male and female parts of the press stud connection may be reversed. In other examples, an occipital strap portion 1320 may connect to the top strap portion 1340 in this manner but may be length adjustable. In other examples, the top strap portion 1340 and occipital strap portion 1320 connect via an alternative mechanism, such as a hook-and-loop connection, magnetic clip or other suitable connection.

In some other examples of the present technology, the occipital strap portion 1320 is permanently connected to the top strap portion 1340, for example at the posterior end where the occipital strap portion 1320 removably connects to the top strap portion 1340 in the examples shown in FIG. 39A-39C.

FIGS. 56A-56C show another example of a connection between an occipital strap portion 1320 and a top strap portion 1340. In this example the occipital strap portion 1320 comprises an occipital connection tab 1326 and the top strap portion 1340 comprises an occipital connection tab hole 1351. The occipital connection tab 1326 may be configured to be passed through the occipital connection tab hole 1351 and secured to the top strap portion 1340. In some examples, the occipital connection tab 1326 is connectable to the top strap portion 1340 by a press stud connection. In some examples the occipital connection tab 1326 is connectable to the top strap portion 1340 by a hook-and-loop connection.

5.4.18.3 Outer Sleeve of Top Strap Portion

In each of the examples shown in FIGS. 39A-39C, 40A-40B, 41A-41B and 42A-42D, the top strap portion 1340 comprises an outer sleeve 1348. The outer sleeve 1348 forms the outer layer 1341 of the top strap portion 1340. In these examples, the outer sleeve 1348 is connected to the battery pack 1500. The outer sleeve 1348 may be removably connected to the battery pack 1500 or may be permanently connected (e.g. not configured for separation from the battery pack 1500 by the user). For example, the outer sleeve 1348 may be glued, heat staked, screwed, or connected to the battery pack 1500 in another suitable manner.

As described above, a head-mounted display system 1000 may comprise a power cable 1510 connected between the battery pack 1500 and the head-mounted display system 1000 in use. In the examples shown in FIGS. 39A-39C, 40A-40B, 41A-41B and 42A-42D, the head-mounted display systems 1000 comprise a power cable 1510 located within the outer sleeve 1348. The power cable 1510 is able to slide within the outer sleeve 1348 along a length of the outer sleeve 1348.

In these examples, the power cable 1510 is able to retract into and extend out of the battery pack 1500. The ability for the power cable 1510 to also slide within the outer sleeve 1348 enables the length of the outer sleeve 1348 and top strap portion 1340 to be adjusted without affecting the amount of slack in the power cable 1510. A power cable 1510 that can retract into and extend from the battery pack 1500 may also enable the power cable 1510 to be fixed with respect to the head-mounted display unit 1200. A power cable 1510 that does not retract into and extend from the head-mounted display unit 1200 may enable the head-mounted display unit 1200 to be kept to a small size (or at least smaller than would be required to accommodate a retractable power cable 1510). In other examples the power cable 1510 is fixed with respect to the outer sleeve 1348. In other examples the power cable 1510 does not retract into or extend from the battery pack 1500.

5.4.18.4 Hook-and-Loop Connections

The washable portion of the positioning and stabilising structure 1300 may be connected to other components of the positioning and stabilising structure 1300 by hook-and-loop connections. Advantageously, this may enable the washable portion to be "peelable" away from the other parts of the head-mounted display system 1000. For example, the washable portion of the positioning and stabilising structure 1300 may be connected to the outer sleeve 1348 by one or more hook-and-loop connections 1349. For example, the user-contacting layer 1344 (part of the washable portion, at least in some examples) of the top strap portion 1340 may connect to the outer sleeve 1348 by hook-and-loop connections 1349. In the example shown in FIG. 40B, the user-contacting layer 1344 connects to the outer sleeve 1348 via a hook-and-loop connection 1349 as illustrated.

In some examples, such as the example shown in FIGS. 41A-41B and 42A-42D, the positioning and stabilising structure 1340 comprises a user-contacting portion 1342, which will be described in more detail below. The user-contacting portion 1342 comprises the user-contacting layer 1344. The user-contacting portion 1342 connects to the outer sleeve 1348, for example with hook-and-loop connections or alternatively with press stud connections, bands or another suitable connection. As shown in FIG. 41A, the user-contacting portion 1342 connects to the outer sleeve 1348 by a hook-and-loop connection 1349.

Figure 42C:
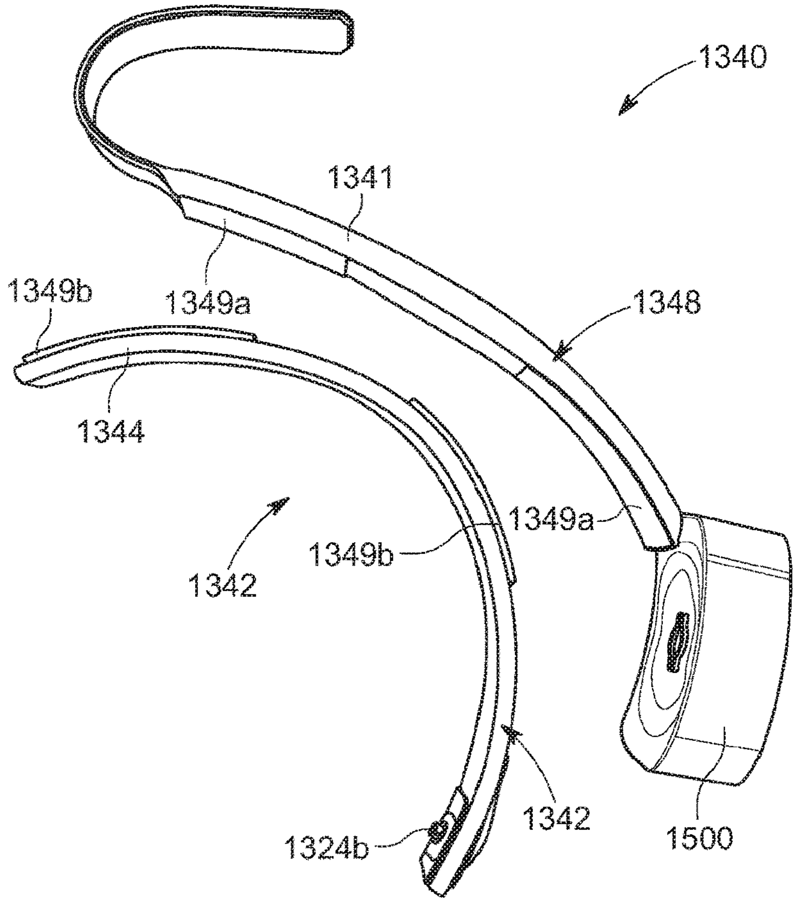

The outer sleeve 1348 may comprise one or more hook portions 1349*a*. In the example shown in FIG. 42C, the outer sleeve 1348 comprises a plurality of hook portion 1349*a*. In this example there are two hook portions 1349*a* while in other examples there may be one, three or more hook portions 1349*a*. In some examples the washable portion comprises a plurality of unbroken loop portions 1349*b* corresponding to hook portions 1349*a* and to which the hook portions 1349*a* are able to be attached. As shown in FIG. 42C, the user-contacting portion 1342 of the washable portion comprises a pair of unbroken loop portions 1349*b* corresponding to hook portions 1349*a* to form the hook-and-loop connections 1349.

In other examples of the present technology the washable portion, which may be a user-contacting portion 1342 or user-contacting layer 1344, for example, may comprise a surface formed from unbroken loop material to which one or more hook portions 1349*a* are able to be attached, forming hook-and-loop connections 1349. The outer sleeve 1348 or other portion of the top strap portion 1340 comprising hook portions 1349*a* may then connect directly to a surface of the washable portion of the positioning and stabilising structure 1300.

In other examples, the washable portion comprises hook portions 1349*a* and the outer sleeve 1348 or other part of the non-washable portion comprises unbroken loop portions 1349*b* or a surface formed from unbroken loop material.

5.4.18.5 Other Hook-and-Loop Connection Examples

The above concepts relating to hook-and-loop connections within a top strap portion 1340 may be applied in other examples of the present technology as well. In some examples, a head-mounted display system 1000 is provided comprising a head-mounted display unit 1200 comprising a display, and a positioning and stabilising structure 1300 configured to hold the head-mounted display unit 1200 in an operable position on the user's head in use, as described elsewhere herein.

With reference to FIGS. 41A-41C and 42A-42D for the purpose of illustrating a more generally applicable aspect of the present technology, the positioning and stabilising structure 1300 may comprise a posterior support portion 1350 configured to engage a posterior portion of a user's head, a pair of lateral strap portions 1310 configured to connect between the posterior support portion 1350 and the head-mounted display unit 1200 (each located on a respective lateral side of the user's head in use), and a top strap portion 1340 configured to connect between the posterior support portion 1350 and the head-mounted display unit 1200, the top strap portion 1340 configured to overlie a superior portion of the user's head in use, the top strap portion 1340 comprising a user-contacting portion 1342 and an outer layer 1341. As illustrated, in these examples the user-contacting portion 1342 of the top strap portion 1340 and the outer layer 1341 of the top strap portion 1340 are detachably connected by one or more hook-and-loop connections 1349.

The user-contacting portion 1342 and outer layer 1341 being separable from one another by hook-and-loop connections 1349 may advantageously enable the user-contacting portion 1342 to be washed separately from the outer layer 1341 and any electronics that may be connected to or form part of the outer layer 1341. Alternatively or additionally, one of the user-contacting portion 1342 or outer layer 1341 may be replaced separately of the other.

In some examples, the posterior support portion 1350 comprises a parietal strap portion 1310 configured to overlie the parietal bones of the user's head in use and an occipital strap portion 1320 configured to overlie or lie below an occipital bone of the user's head in use. However, the hook-and-loop connections between a user-contacting portion 1342 and outer layer 1341 may also be applied to other configurations of the positioning and stabilising structure 1300. The parietal strap portion 1310, the occipital strap portion 1320 and lateral strap portions 1330 may be separable from the outer layer 1341 of the top strap portion 1340 together with the user-contacting portion 1342 by separation of the hook-and-loop connections.

The top strap portion 1349 may comprise an outer sleeve 1348 forming the outer layer 1341 of the top strap portion 1340. The outer sleeve 1348 may be connected to a battery pack 1500 (in examples in which there is a battery pack 1500).

Any of the exemplary configurations of hook portions 1349*a*, unbroken loop portions 1349*b* and/or a surface formed from unbroken loop material may be applied to produce hook-and-loop connections 1349 between the outer sleeve 1348 and user-contacting portion 1342, or more generally between the outer layer 1341 and user-contacting portion 1342 or user-contacting layer 1341.

5.4.18.6 Substantially Inextensible Layer

The top strap portion 1340 in this example comprises a substantially inextensible layer 1343 (e.g. a rigidiser in some examples, being at least partially rigid in the sense that it is able to at least partially hold its shape under its own weight) located between the outer layer 1341 and the user-facing layer 1344 in use. The substantially inextensible layer 1343 may be identified as a rigidiser or rigidising layer in examples in which it makes the top strap portion 1340 more rigid than it would otherwise be without the substantially inextensible layer 1343. In some examples the substantially inextensible layer 1343 is inextensible but does not substantially increase the rigidity of the top strap portion 1340. The substantially inextensible layer 1343 may facilitate the top strap portion 1340 to transfer some or all of the weight of a rear-mounted battery pack 1500 or other counterweight into an upwards force on the head-mounted display unit 1200. This may advantageously result in the user perceiving the head-mounted display unit 1200 as lighter in weight. Additionally, less tension may be required in other headgear straps (e.g. the lateral strap portions 1330) as the head-mounted display unit 1200 may not need to be pulled against the user's face with as much force as may be required if the top strap portion 1340 and/or counterweight/battery pack 1500 did not take up some of the weight of the head-mounted display unit 1200. The substantially inextensible layer 1343, top strap 1340 as a whole and presence of a counterweight may each (independently or together, as the case may be) contribute to the head-mounted display system 1000 being comfortable to the user, while providing for stability on the user's head in use, even during vigorous movement.

The substantially inextensible layer 1343 may be formed from a thermoplastic material, in some examples. In examples in which there is no rear-mounted battery pack 1500 (e.g. in which any battery is in the head-mounted display unit 1200), the substantially inextensible layer 1343 may support the head-mounted display unit 1200 by anchoring it to the posterior support portion 1350. As described above, in the examples shown in FIGS. 39A-39C, 40A-40B, 41A-41B and 42A-42D, the head-mounted display system 1000 comprises a battery pack 1500 for powering the head-mounted display system 1000, the battery pack 1500 is configured to be located posteriorly to the user's head in use. The top strap portion 1340 is connected to the battery pack 1500 in use.

Figure 42D:
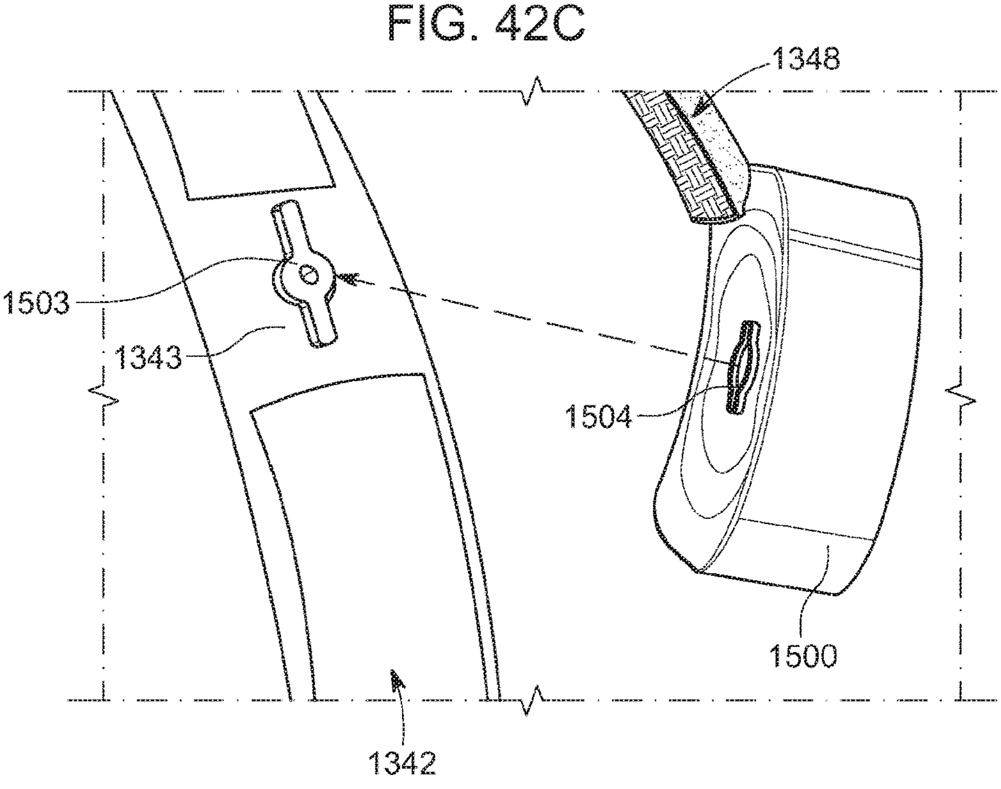

The battery pack 1500 may be removably connected to the substantially inextensible layer 1343. The substantially inextensible layer 1343 and the battery pack 1500 may comprise corresponding fastener portions (e.g. corresponding first and second fastener portions 1503, 1504) configured to removably connect the battery pack 1500 to the substantially inextensible layer 1343. For example, as shown in FIGS. 40A, 41A and 42D, the substantially inextensible layer 1343 comprises a first fastener portion 1503. The first fastener portion 1503 in these examples is located on a posteriorly facing surface of the top strap portion 1340 in use. As shown in FIG. 42D, the battery pack comprises a second fastener portion 1504 corresponding to the first fastener portion 1503. The first and second fastener portions 1503 and 1504 are configured to connect together to connect the battery pack 1500 to the substantially inextensible layer 1343 in use. The first and second fastener portions 1503 and 1504, in these examples, connect the substantially inextensible layer 1343 to the battery pack 1500 such that the substantially inextensible layer 1343 at least partially supports the weight of the battery pack 1500 in use, for example supporting a majority of the weight of the battery pack 1500.

The first and second fastener portions 1503 and 1504 may be configured to snap fit together. In other examples the battery pack 1500 may connect to the substantially inextensible layer 1343 via hook-and-loop connections, may fit into a pocket or may be connected directly or indirectly to the substantially inextensible layer 1343 in another suitable manner. In the example shown in FIG. 42D the first fastener portion 1503 is a male portion and the second fastener portion 1504 is a female portion. In other examples the first fastener portion 1503 may be a female portion configured to receive a male second fastener portion 1504.

In some examples the substantially inextensible portion 1343 is flat (as illustrated in FIG. 43B). In other examples, the substantially inextensible portion 1343 is curved in transverse cross section, as shown in FIG. 43D. The curvature may result in greater comfort for the user, for example by avoiding pressure points by matching the curvature to an expected curvature of the human head at the sagittal plane. In some examples, the substantially inextensible portion may be within the range of 1-3 mm thick, such as 1.5 mm-2 mm thick, for example 1.8 mm thick.

5.4.18.7 Washable Portion Separable from Substantially Inextensible Portion

The washable portion may be separable from the substantially inextensible layer 1343. As described above, the top strap portion 1340 comprises an outer sleeve 1348 forming the outer layer 1341. In the example shown in FIGS. 40A-40B, the substantially inextensible layer 1343 is located within the outer sleeve 1348. The outer sleeve 1348 is connected to the battery pack 1500, as shown in FIG. 39C.

In this example, when the washable portion is separated from the remainder of the positioning and stabilising structure 1300 for washing, the user-facing layer 1344 is separated from the outer sleeve 1348. The substantially inextensible layer 1343 remains within the outer sleeve 1348. The battery pack 1500 may or may not be disconnected from the substantially inextensible layer 1343, as there may be not be a need for the user to do so since the washable portion can now be washed. In some examples in which the substantially inextensible layer 1343 does not form part of the washable portion (e.g. in which the washable portion is separable from the substantially inextensible layer 1343), the battery pack 1500 may not be configured for disconnection from the substantially inextensible layer 1343 by the user.

5.4.18.8 Washable Portion Including Substantially Inextensible Portion

In other examples, the substantially inextensible layer 1343 forms part of the washable portion. In the example illustrated in FIGS. 41A-41B, 42A-42D and 43A-43D, the top strap portion 1340 comprises a user-contacting portion 1342 forming the user-facing layer 1344, as described above. The substantially inextensible layer 1343 in this example is provided to the user-contacting portion 1342. The user-contacting portion 1342 forms part of the washable portion and is separable from the outer sleeve 1348, such that the substantially inextensible layer 1343 forms part of the washable portion and is separable from the outer sleeve 1348.

In this example the user-contacting portion 1342 comprises a user-contacting sleeve 1342*a*. As shown in FIG. 41B the substantially inextensible layer 1343 is located within the user-contacting sleeve 1342*a*.

With reference to FIGS. 43A-43D, the user-contacting sleeve 1342 may comprise a rigidiser opening 1343*a* through which the substantially inextensible layer 1343 is able to be inserted. The rigidiser opening 1343*a* may be a slit or narrow hole within the material of the user-contacting sleeve 1342 and may be shaped and sized such that it corresponds to the shape and size of the cross section of the substantially inextensible layer 1343, to enable insertion of the substantially inextensible layer 1343. The rigidiser opening 1343*a* may be located at or proximate an end of the user-contacting sleeve 1342 to enable a first end of the substantially inextensible layer 1343 to be inserted into the interior of the user-contacting sleeve 1342 and may wrap over a second end of the substantially inextensible layer 1343 to substantially encapsulate the substantially inextensible layer 1343. The substantially inextensible layer 1343 may be removably inserted into the user-contacting sleeve 1342. Advantageously, this may enable the user-contacting sleeve 1342 to be replaced if necessary.

The user-contacting sleeve 1342 may comprise a fastener opening 1503*a* through which the battery pack 1500 is able to be removably attached to the substantially inextensible layer 1343. As described above, the substantially inextensible layer 1343 may comprise a first fastener portion 1503 configured to connect to a corresponding second fastener portion 1504 of the battery pack 1500. When assembled, the first fastener portion 1503 may extend through the first fastener opening 1503*a*, configured to connect to the second fastener portion 1504, thereby configured to connect the substantially inextensible layer 1343 to the battery pack 1500.

The battery pack 1500 may cover either or both of the rigidiser opening 1343*a* and the fastener opening 1503*a* in use. FIGS. 43A and 43C show an outline of the shape of the battery pack 1500. As illustrated, in use both the rigidiser opening 1343*a* and the fastener opening 1503*a* are within the perimeter/periphery of the battery pack 1500.

In the example shown in FIG. 56C the occipital strap portion 1320 comprises an occipital connection tab 1326, as discussed above. In this example, the occipital connection tab 1326 is configured to connect to the user contacting sleeve 1342 on a non-user-facing side of the user contacting sleeve 1342. The occipital connection tab 1326 may be configured to pass through a first user-contacting sleeve hole 1352 on a user-facing side of the user-contacting sleeve 1342 and through a second user-contacting sleeve hole 1353 on the non-user-facing side of the user-contacting sleeve 1342. The occipital connection tab 1326 is in this example configured to connect to the user-contacting sleeve 1342 with a hook-and-loop connection. In other examples it may be connected with a press stud connection or another suitable connection.

The user-contacting sleeve 1342a and/or outer sleeve 1348 may each be formed from a textile material and may be formed by cutting a textile sheet (e.g. by die cutting, ultrasonic cutting or RF cutting), folding it into a tubular shape and ultrasonically welding the seam along the length of the sleeve, along with any other edges. The sleeve may be turned inside out such that any sharp welded edge is provided on the inside and the outside is advantageously free of sharp edges that may result in discomfort in use or an unsightly appearance. Any other suitable manner of forming the user-contacting sleeve 1342a and outer sleeve 1348. Hook or loop portions for forming hook-and-loop connections may be welded or sewn onto the textile material. In other examples the textile material may be stitched to form a tubular shape. In other examples the substantially inextensible layer 1343 may not be encapsulated by a user-contacting sleeve and may instead be provided to the user-contacting portion 1342 by being secured to a user-facing layer 1344 (e.g. adhered, fastened by hook-and-loop connections, inset, overmoulded or otherwise connected).

The outer sleeve 1348 and/or user-contacting sleeve 1342a may be formed from a material that is elastic or inelastic, may be formed from a soft material that is comfortable if it contacts the user, is washable (e.g. machine-washable) and/or is formed from a material conducive to wicking moisture away from the user's face or head. In some examples the sleeves (i.e. outer sleeve 1348 and/or user-contacting sleeve 1342a) are formed from any one of elastane, TPE or nylon. The sleeves may be formed from an elastic material which, in the case of the user-contacting sleeve 1342a, facilitates insertion of the substantially inextensible layer 1343. The sleeves may be formed from a low-friction material (or a material having a low friction interior surface) which, in the case of the outer sleeve 1348, facilitates movement of a power cable 1510 within the outer sleeve 1348 during adjustment of the length of the outer sleeve 1348.

As described above, the head-mounted display system 1000 may comprise a power cable 1510 connected between the battery pack 1500 and the head-mounted display unit 1200. As shown in both the FIGS. 40B and 41B examples, the power cable may be located within the sleeve 1348 (e.g. in a manner described elsewhere herein).

FIGS. 69A and 69B show a battery pack housing 1505 having a second fastener portion 1504 and a substantially inextensible layer 1343 having a corresponding first fastener portion 1503, respectively, according to another example of the present technology. In this example the first fastener portion 1503 is configured to fit into a hole of the second fastener portion and slide in a direction parallel to the plane of the hole such that a post of the first fastener portion 1503 slides into a channel of the second fastener portion 1504. The second fastener portion 1504 may comprise a snap fit arm configured to resist sliding of the post of the first fastener portion 1503 out of the channel of the second fastener portion 1504.

FIGS. 70A and 70B show a battery pack housing 1505 having a second fastener portion 1504 and a substantially inextensible layer 1343 having a corresponding first fastener portion 1503, respectively, according to another example of the present technology. In this example the first fastener portion 1503 comprises a first cylindrical portion configured to be pressed between two corresponding second cylindrical portions of the second fastener portion 1504. The second fastener portion 1504 comprises relief cutouts in the battery pack housing 1505 configured to allow the second cylindrical portions of the second fastener portion 1504 to deform to receive the first cylindrical portion of the first fastener portion 1503 but to return towards undeformed positions to effect a snap fit of the first fastener portion 1503 to the second fastener portion 1504.

FIGS. 71A and 71B show a battery pack housing 1505 having a second fastener portion 1504 and a substantially inextensible layer 1343 having a corresponding first fastener portion 1503, respectively, according to another example of the present technology. In this example the first fastener portion 1503 comprises a male sliding portion configured to be slidingly received into a female sliding portion of the second fastener portion 1504. Both the male sliding portion and female sliding portion may be elongate. The first and second fastener portions 1503, 1504 may be orientated in use such that for disengagement to occur the female sliding portion on the battery pack housing 1505 would need to slide superiorly against the weight of the battery pack 1500 to be removed from the male sliding portion.

FIGS. 71A and 71B show a battery pack housing 1505 having a second fastener portion 1504 and a substantially inextensible layer 1343 having a corresponding first fastener portion 1503, respectively, according to another example of the present technology. In this example the first fastener portion 1503 comprises a male sliding portion configured to be inserted into an opening in the battery pack housing 1505 formed by the second fastener portion 1504 and sliding into a channel formed by the second fastener portion 1504. The second fastener portion may comprise relief cutouts on two sides of the channel such that an opening of the channel forms a snap fit connection with a corresponding portion of the first fastener portion 1503.

5.4.19 Battery Pack Construction

FIGS. 46-52B show various features of battery packs 1500 according to examples of the present technology. The battery pack 1500 may comprise a battery pack housing 1505 connected to a battery pack base 1525. The top strap portion 1340 may comprise a user-contacting portion 1342 forming the user-facing layer 1344, and the battery pack base 1525 may be configured to connect to the user-contacting portion 1342.

The battery pack 1500 may also comprise a cable guide 1530 configured to guide the power cable 1510. As shown in FIGS. 47A-48B, the cable guide 1530 may comprise an elongate portion 1531 through which the power cable 1510 is able to slide into and out of the battery pack housing 1505. The elongate portion 1531 may be rigid. Advantageously, the elongate portion 1531 may provide a long passage through which the power cable 1510 passes, which may support a corresponding long length of the power cable 1510, which may prevent the cable from biting into the walls of the cable guide 1530 when the power cable 1510 moves. The cable guide 1530 may comprise a cable guide mounting portion 1532 configured to be connected to the battery pack base 1525. The battery pack base 1525 in this example comprises a cable guide mount 1526 for the cable guide 1530, the cable guide mount 1526 configured to connect to the cable guide mounting portion 1532.

The cable guide 1530 may comprise one or more teeth 1533 configured to engage the top strap portion 1340, for example a plurality of teeth 1533. In this example the cable guide 1530 comprise three teeth 1533. As described above the top strap portion may comprise an outer sleeve 1348 forming the outer layer of the top strap portion 1340 and the outer sleeve 1348 may be connected to the battery pack 1500. The power cable 1510 may be located within the outer sleeve 1348 and may be able to slide within the outer sleeve 1348 along a length of the outer sleeve 1348. The teeth 1533 of the cable guide 1530 may be configured to engage the outer sleeve 1348 to fix the outer sleeve 1348 to the battery pack 1500. The teeth 1533 may be located on the elongate portion 1531 of the cable guide 1530 and may face outwardly with respect to the elongate portion 1531. The teeth 1533 of the cable guide 1530 may be configured to clamp the outer sleeve 1348 against the battery pack base 1525.

In some examples, at least a portion of the elongate portion 1531 of the cable guide 1530 is located within the outer sleeve 1348 in use. The cable guide mount 1526 of the battery pack base 1525 may comprise one or more teeth 1527 configured to engage the top strap portion 1340, as shown in FIG. 47B. In this particular example, the teeth 1527 of the cable guide mount 1526 are configured to engage the outer sleeve 1348 to fix the outer sleeve 1348 to the battery pack 1500. In particular, the teeth 1527 of the cable guide mount 1526 may clamp the outer sleeve 1348 against the cable guide 1530.

With reference to FIG. 49B, the battery pack base 1525 in this example comprises a base recess 1528 configured to receive an occipital strap portion connection tab 1326 configured to connect the occipital strap portion 1340 to the user-contacting portion 1342 of the top strap portion 1340. The occipital strap portion connection tab 1326 may reside in the base recess 1528. The base recess 1528 may advantageously accommodate the occipital strap portion connection tab 1326 while keeping the battery pack 1500 low profile. The battery pack base 1525 may also comprise a mounting structure configured to connect the battery pack base 1525 (and thereby the battery pack 1500) to the user-contacting portion 1342, as described elsewhere herein.

The battery pack 1500 in the example shown in FIGS. 46-50 comprises a cable stop 1540 fixed to the power cable 1519 inside the battery pack 1500, the cable stop 1540 configured to limit the extent to which the power cable 1510 is able to be extended from the battery pack 1500. The cable stop 1540 in this example, is annularly shaped (although may comprise a different shape in other examples) and comprises an adjustment screw 1542 configured to allow a diameter of the cable stop 1540 to be reduced to engage the power cable 1510. The cable stop 1540 may clamp onto the power cable 1510 and may be fixed in position with respect to the power cable 1510. The cable stop 1540 may comprise an internal thread 1541 configured to engage the power cable 1510.

As shown in FIGS. 47A-52B, the battery pack housing 1505 in this example comprises a power cable opening 1506. The power cable opening 1506 is therefore also a power cable opening 1506 of the battery pack 1500. The cable guide 1530 may extend out of the battery pack 1500, for example through the power cable opening 1506.

Figure 51B:
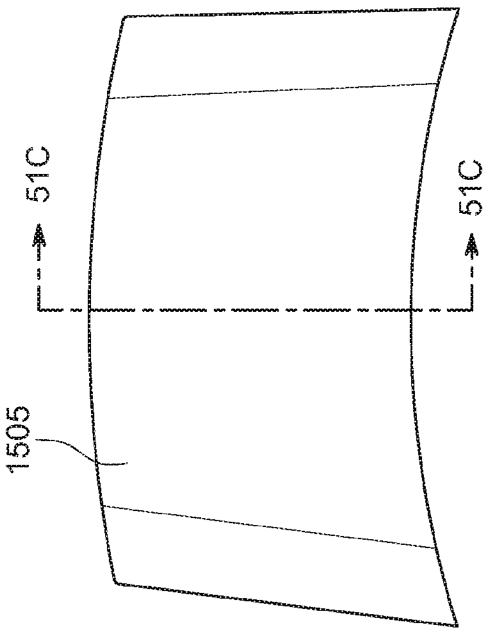
Figure 51A:
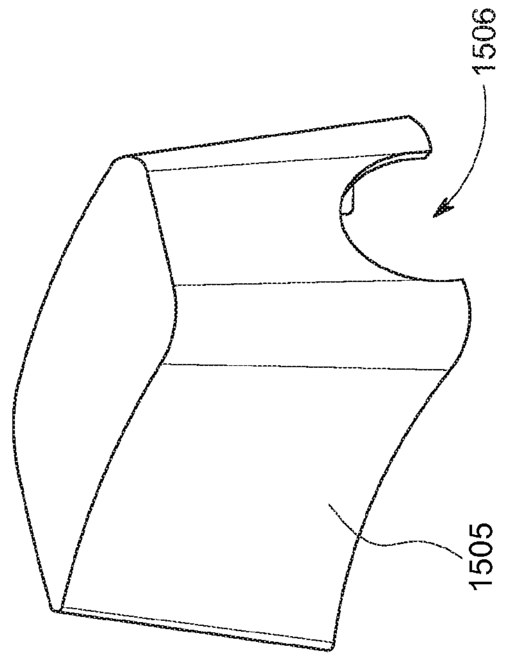
Figure 51D:
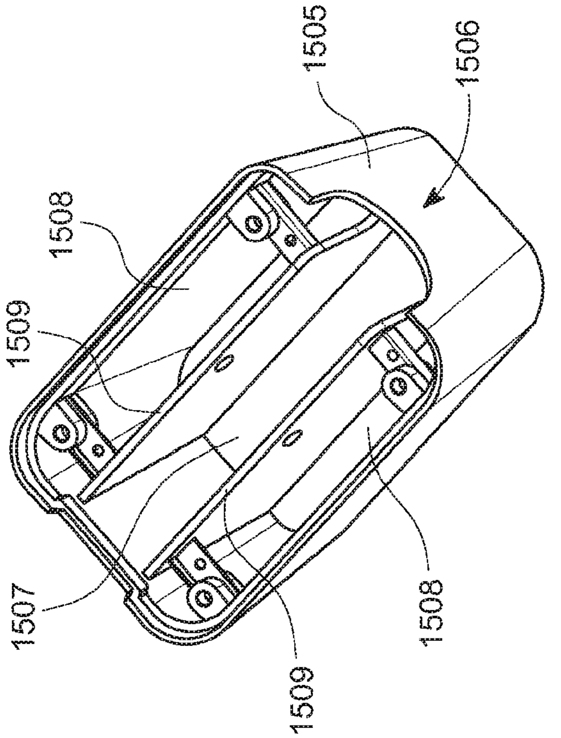
Figure 51C:
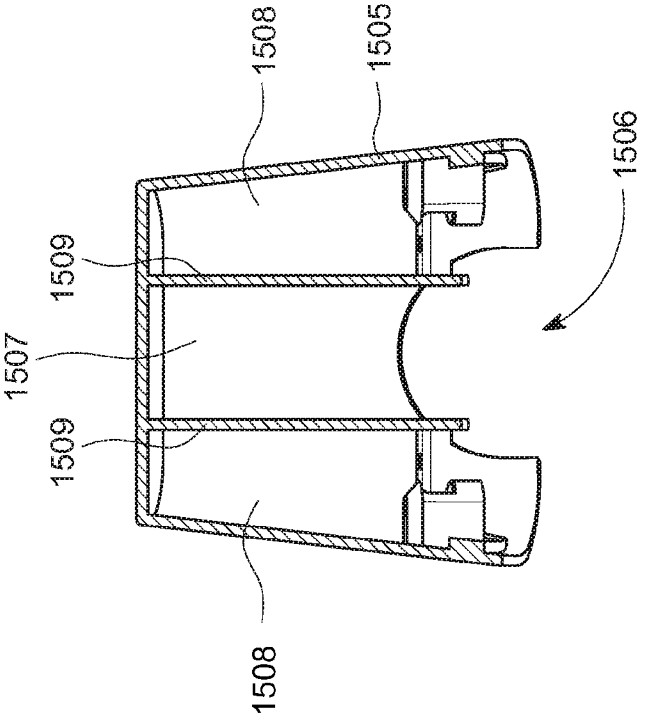

As shown in FIGS. 51C and 51D, the battery pack housing 1505 may comprise a power cable partition 1507 configured to house a portion of the power cable 1510 and one or more cell partitions 1508 configured to house battery cells 1502. The battery pack housing 1505 may comprise one or more partition walls 1509 separating the power cable partition 1507 from the one or more cell partitions 1508. The power cable opening 1506 is aligned with the power cable partition 1507 in this example. In the illustrated example the battery pack 1500 comprises two cell partitions 1508. The power cable partition 1507 is located between the two cell partitions 1508. The battery pack 1500 comprises cells 1502 oriented vertically and aligned in series along a left-right axis in use. In the example shown in FIG. 52B the cells 1502 are canted inwardly at a posterior side of the battery pack 1500. In this example there are four battery cells 1502 but in other examples there may be one, two, three or more than four cells 1502. The cells 1502 may also be oriented horizontally in other examples.

With reference to FIGS. 53A-53F, the power cable 1510 may comprise a service loop 1513 inside of the battery pack 1500. The service loop 1513 may be configured to provide for extension from and retraction into the battery pack 1500 of the power cable 1510. Retraction and extension of a power cable 1510 with respect to the battery pack 1500 is described in more detail elsewhere herein, but in head-mounted display systems 1000 in which a power cable 1510 is provided within a headgear strap, for example a top strap portion 1340 of a positioning and stabilising structure 1300, a retractable and extendable power cable 1510 may advantageously provide for easy adjustment of the length of the top strap portion 1340 and power cable 1510 (for example to achieve a good fit to the user's head).

Figure 53B:
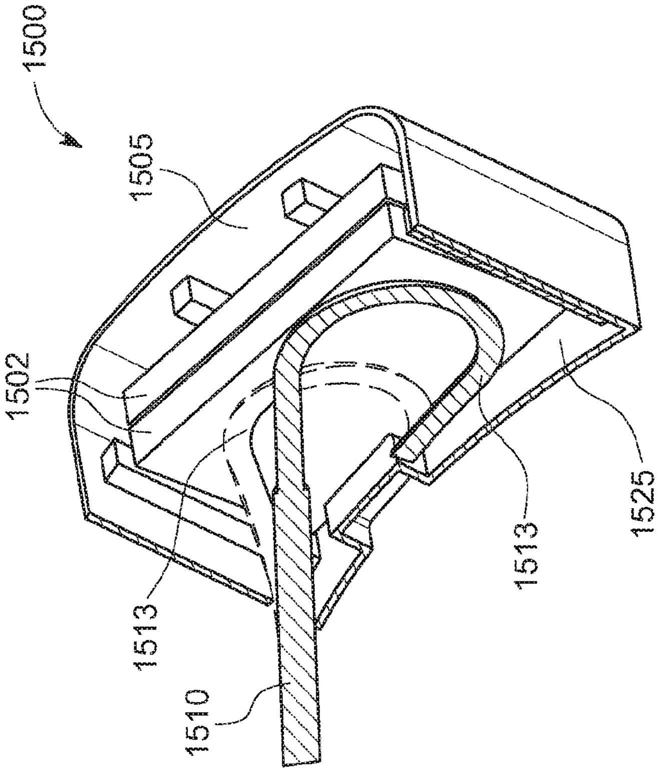
Figure 53A:
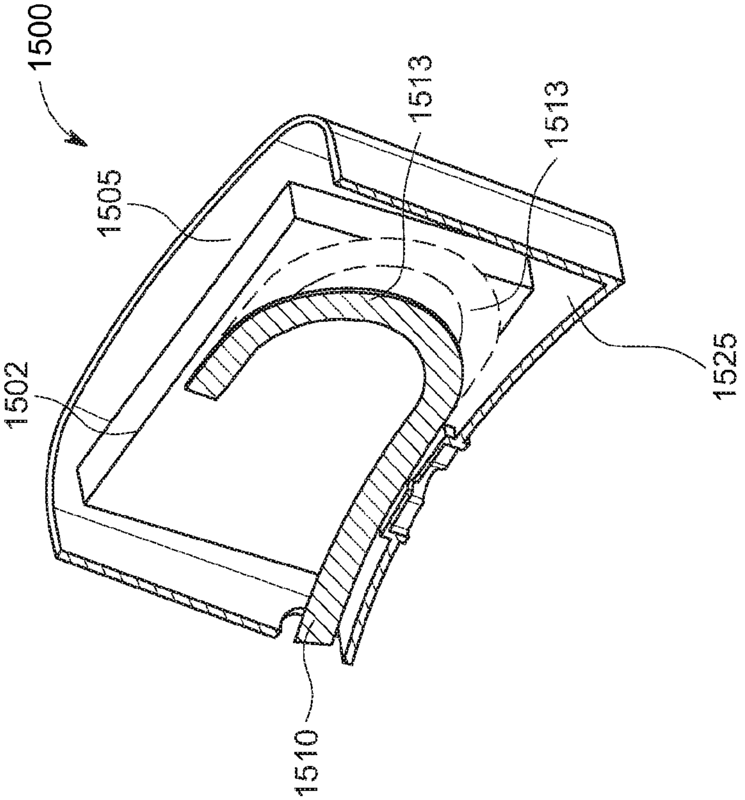

As shown in FIG. 53A, the power cable 1510 may enter the battery pack 1500 in a direction substantially parallel to the battery pack base 1525 and curves away from the battery pack base 1525 to form the service loop 1513. The power cable 1510 may enter the battery pack 1500 in a direction substantially parallel/tangent to the curvature of the user's head. In other examples, such as shown in FIG. 53B, the power cable 1510 enters the battery pack 1500 in a direction oblique to the battery pack base 1525 and curves towards the battery pack base 1525 to form the service loop 1513.

Figure 53D:
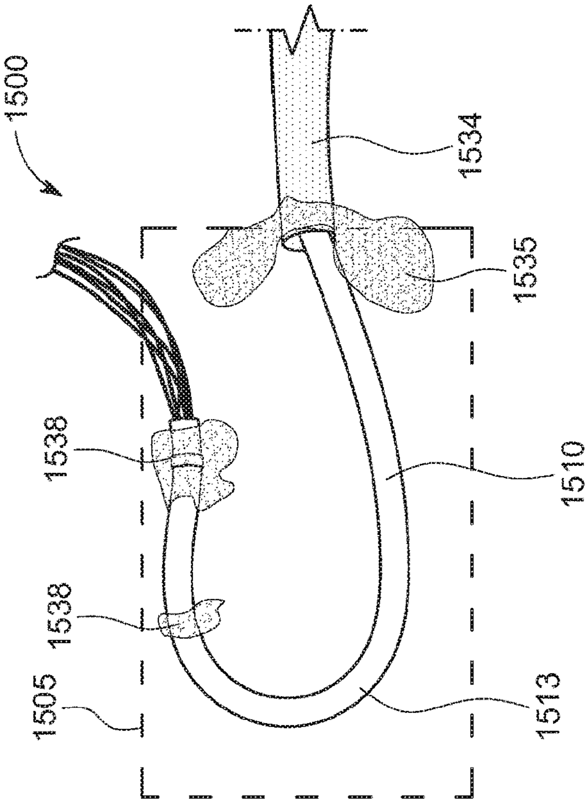
Figure 53C:
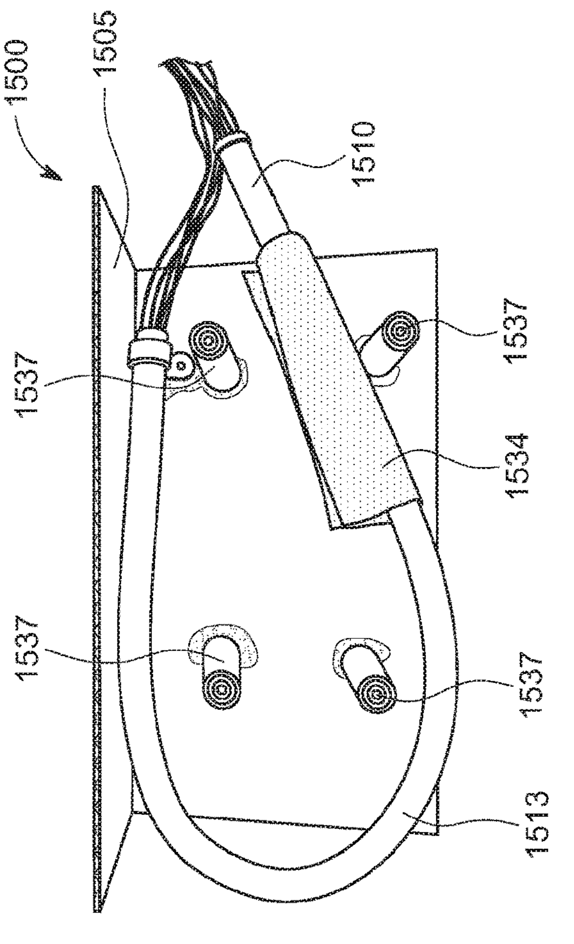
Figure 53E:
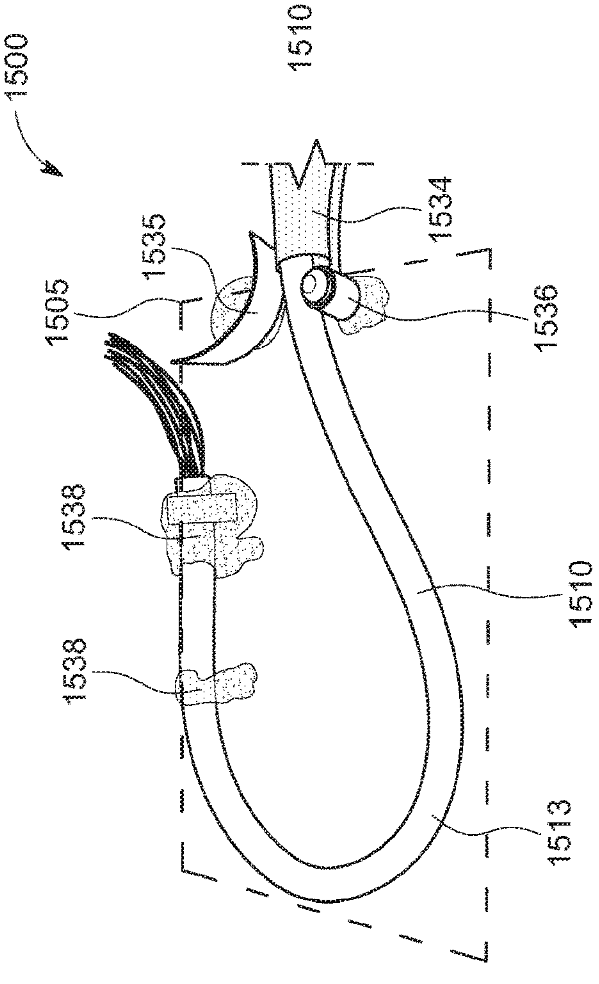
Figure 53F:
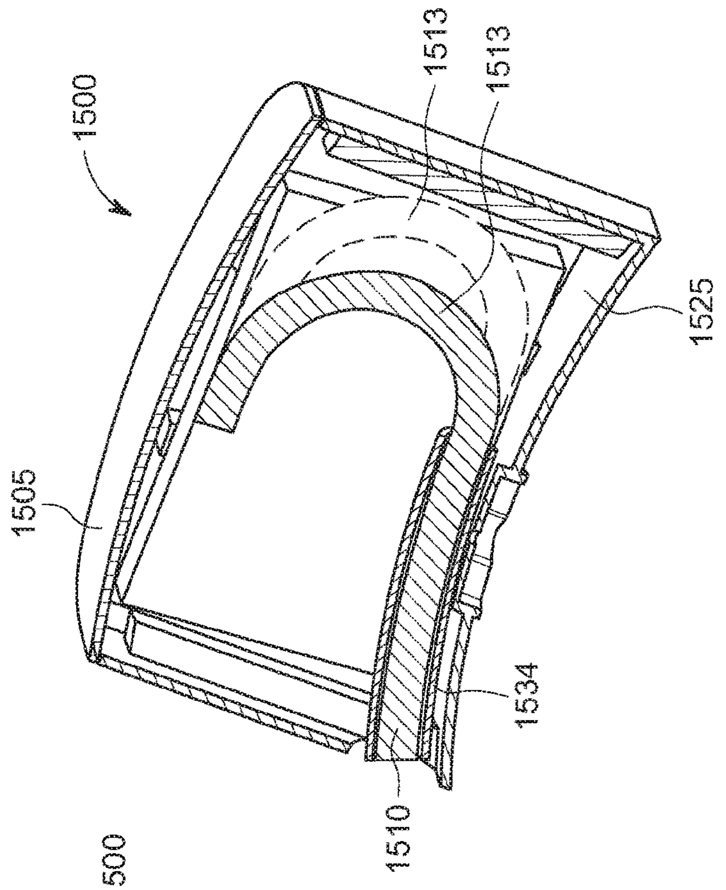
Figure 53G:
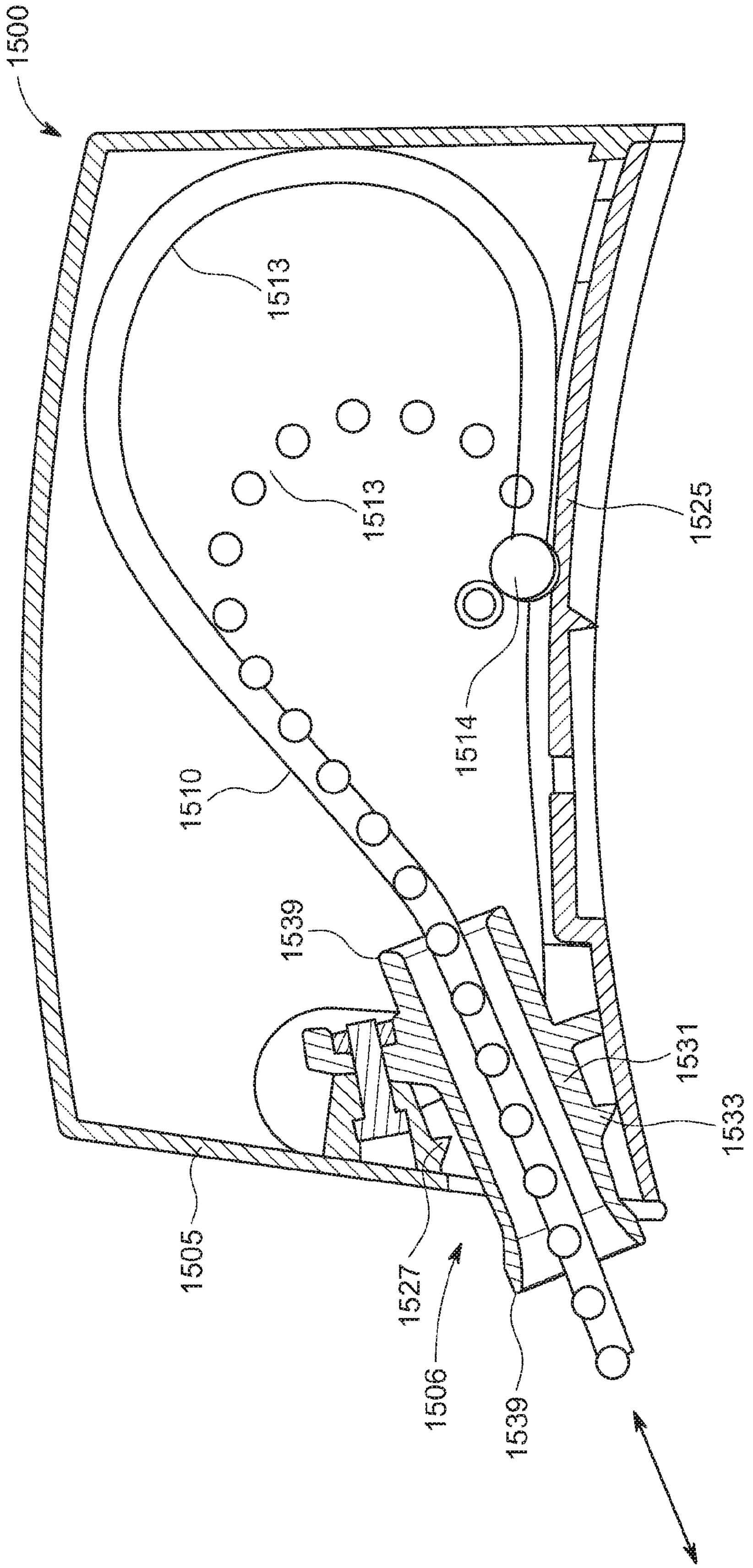

FIG. 53G shows a cross section view of the battery pack 1500 according to another example of the present technology. The power cable 1510 is secured within the battery pack 1500 at a fixed end 1514. In this example the power cable 1510 is fixed to the battery pack base 1525 at the fixed end 1514. The fixed end 1514 may be fixed with adhesive or a fastener, for example. The power cable 1510 is shown in a retracted configuration and, in phantom, in an extended configuration. As illustrated, the length of the service loop 1513 is reduced when the power cable 1510 is in the extended configuration. The configuration of the service loop 1513, fixed end 1514 and cable guide 1530 in this example may advantageously exert low resistance to extension/retraction of the power cable 1510. The power cable 1510 in this arrangement extends and retracts by a "rolling" motion. Advantageously there is no elasticity required of the power cable 1510. The power cable 1510 changes radius by a small amount as it extends/retracts. The power cable 1510 is bent to differing amounts during extension/retraction. The elongate portion 1531 may comprise a long aspect ratio (e.g. long length in comparison to width). The length of the elongate portion may be within the range of 20-40 mm, for example 25-35 mm, 28-32 mm or about 30 mm long. The internal diameter of the elongate portion may be within the range of 5-10 mm, for example 6.5 mm-8.5 mm, or about 7.5 mm.

Also as illustrated in FIG. 53G, the elongate portion 1531 of the cable guide 1530 comprises one or more rounded ends 1539. In particular, the cable guide 1530 comprises a rounded end 1539 at a first or interior end of the elongate portion 1531 and a rounded end 1539 at a second or exterior end of the elongate portion 1531, which may advantageously provide for low friction on the power cable 1510 and may present a low risk of the power cable 1510 catching on the end of the elongate portion 1531. In examples of the present technology the cable guide 1530 may comprise a rounded end 1539 at neither, either or both of the ends of the elongate portion 1531. Each rounded end 1539 may comprise a radiused edge around an opening into the elongate portion 1531, on one or both of the inside or outside. Additionally, or alternatively, each rounded end 1539 may comprise an outwardly flared portion of the cable guide 1530, for example an outwardly flared portion of the elongate portion 1531.

In some examples, the cable guide 1530 comprises a fabric sleeve 1534, as shown in FIGS. 53C-53F. The fabric sleeve 1534 may comprise a low-friction material configured to provide low resistance to movement of the power cable 1510 through the fabric sleeve 1534. In some examples the fabric sleeve 1534 may be stretchable. The cable guide 1530 may comprise one or more lead-in features 1535 configured to guide the power cable 1510 into the fabric sleeve 1534. The cable guide 1530 may comprise one lead-in feature 1535 as shown in FIG. 53E or two lead-in features 1535 as shown in FIG. 53D, for example one on each side of the power cable 1535. The lead-in features may comprise curved surfaces. As shown in FIG. 53E, in some examples the cable guide 1530 may comprise one or more rollers 1536 configured to reduce friction acting on the power cable 1510 at an entrance to the fabric sleeve 1534.

As shown in FIGS. 53C and 53F, the fabric sleeve 1534 may be located interior of the battery pack 1500 in some examples. In other examples, such as shown in FIGS. 53D and 53E, the fabric sleeve 1534 may be located exterior to the battery pack 1500. In some examples the fabric sleeve 1534, or more generally the cable guide 1530 in whatever form it may take, may be located partially interior and partially exterior to the battery pack 1500, fully interior or fully exterior to the battery pack 1500. In some examples, the fabric sleeve 1534 may be a portion of an outer sleeve 1348 of the top strap portion 1340. That is, the outer sleeve 1348 of the top strap portion may extend into the interior of the battery pack 1500 to form a fabric sleeve 1534 portion of the cable guide 1530.

With reference to FIG. 53C, in some examples the battery pack 1500 comprises one or more standoffs 1537 configured to restrain shape and/or movement of the power cable 1510 within the battery pack 1500. In some examples, the standoffs 1537 may limit the amount by which the power cable 1510 can be extended from the battery pack 1500 by placing a lower limit on the bend radius of the service loop 1513 of the power cable 1510. The standoffs 1537 may take the form of posts within the battery pack 1500, for example extending from one side of the battery pack housing 1505, or from one side of a power cable partition 1507, to another side. In some examples the standoffs 1537 may support battery cells 1502.

In some examples, one or more portions of the power cable 1510 between the service loop 1513 and one or more battery cells 1502 to which the power cable is connected are fixed in place within the battery pack 1500, for example with an adhesive or a bracket fixed to the battery pack base 1525, battery pack housing 1505 or other component of or within the battery pack 1500. As shown in FIG. 53E, the power cable 1510 in this example is fixed at locations 1538 by adhesive.

As shown in FIGS. 53D and 53E, the service loop 1513 of the power cable 1510 may be shaped in a curve with a bend radius sufficiently small that the service loop 1513 does not experience frictional contact with the battery pack housing 1505 radially outward of the curve. For example, in a fully retracted position of the power cable 1510 (e.g. shown in FIG. 53E), the service loop 1513 may not contact or may have only a small amount of contact with internal wall(s) within the battery pack 1500. The bend radius of the service loop 1513 may sufficiently small that, when moving from the fully retracted position to an extended position (e.g. shown in FIG. 53D) the service loop 1513 may not contact any internal walls within the battery pack 1500, such that the service loop 1513 does not experience frictional contact with the battery pack 1500. Advantageously, this may make it easier for the user to extend or retract the power cable 1510 and thereby adjust the head-mounted display system 1000.

FIGS. 53A, 53B and 53F each simultaneously shows two configurations of the service loop 1513, one showing the service loop 1513 and power cable 1510 in a retracted position and one showing the service loop 1513 and power cable 1510 in an extended position.

5.5 Arms Inside of Head-Mounted Display Unit Periphery

While in some examples of the present technology, arms 1210 of a head-mounted display unit 1200 may extend from an outside of a display unit housing, in some examples of the present technology, arms 1210 may extend from inside of a head-mounted display unit 1200.

As shown in FIGS. 34A-34I, a head-mounted display system 1000 may comprise a head-mounted display unit 1200 and a positioning and stabilising structure 1300 (not shown in FIGS. 34A-34I) structured and arranged to hold the head-mounted display unit 1200 in an operational position over a user's face in use (e.g. in the position shown in FIG. 34A). The positioning and stabilising structure 1300 may comprise a posterior support portion 1350 configured to engage a posterior portion of a user's head, and a pair of lateral strap portions 1330 configured to connect between the posterior support portion 1350 and the head-mounted display unit 1200, each configured to be located on a respective lateral side of the user's head in use. The head-mounted display unit 1200 may comprise a display unit housing 1205 comprising a display, and an interfacing structure 3800 configured to contact the user's face in use.

The head-mounted display unit 1200 may further comprise a pair of arms 1210, as shown in FIG. 34A for example. Each arm 1210 may extend posteriorly from the display unit housing 1205, the arms 1210 each being configured for attachment to a respective one of the lateral strap portions 1330 of the positioning and stabilising structure 1300.

In the example shown in FIGS. 34A-34I, the display unit housing 1205 has a posterior side having a periphery (e.g. an outermost periphery). Each of the arms 1210 extend from the display unit housing 1205 from within the periphery of the posterior side of the display unit housing 1205. Arms 1210 extending from inside of the periphery of the display unit housing may reduce the overall width of the head-mounted display unit 1200 and/or may facilitate closer to optimal headgear force vectors (e.g. closer to parallel with the anterior-posterior axis).

As shown in FIGS. 34A-34C in particular, the interfacing structure 3800 has a periphery, and each of the arms 1210 is located between the periphery of the posterior side of the display unit housing 1205 and the periphery of the interfacing structure 3800. The arms 1210 may each be located medially of an adjacent portion of the display unit housing 1205. Additionally, the arms 1210 may each be located laterally of an adjacent portion of the interfacing structure 3800. The lateral-most portions of the display unit housing 1205 may be lateral to some or all of the arms 1210. The lateral-most portions of the display unit housing 1205 may be located laterally of the connection between a respective one of the arms 1205 and the display unit housing 1205, for example.

Each of the arms 1210 may comprise an eyelet 1212 configured to receive a respective one of the lateral strap portions 1330 of the positioning and stabilising structure 1300. The eyelet 1212 of each arm may be located at or proximate a posterior end of the respective arm 1210.

5.5.1 Pivoting of Arms

Each of the pair of arms 1210 may be able to pivot with respect to the display unit housing 1205. FIGS. 34D-34G and 34I show a pivot point 1213 of each arm. The pivot point 1213 may be proximate the display within the display unit housing 1205 and may be located anterior to the user's face. Each of the arms 1210 may be configured to pivot about a horizontal axis perpendicular to the sagittal plane of the user's head in use. Each of the arms 1210 may be configured to pivot through an angular range A of at least 9 degrees (FIGS. 34F and 34G). In some examples the angular range A may be at least 19 degrees.

As shown in FIGS. 34D-34G and 34I, each arm 1210 in this example comprises a hub portion 1230 and an elongate portion 1231 extending away from the hub portion. The eyelet 1212 of the arm 1210 is formed at a distal (posterior) end of the elongate portion 1231. The hub portion 1230 is secured to the display unit housing 1205 (optionally via an arm mounting portion 1215, to be described below) at the pivot point 1213. The hub portion 1230 rotates about the pivot point 1213 and, as the elongate portion 1231 is rigidly connected to the hub portion 1230 (e.g. by being integrally formed with the hub portion 1230), the elongate portion 1231 rotates about the pivot point 1213 with the hub portion 1230.

In another example of the present technology, as shown in FIG. 34J, each arm 1210 is slidably connected to the display unit housing 1205 and configured to be slidably moved to pivot about a pivot point 1213. FIG. 34J shows one side of the head-mounted display only, but it is to be understood that where a feature of a singular arm is described, that feature may be applied to both arms 1210 of a head-mounted display.

In this example each pivot point 1213 is a theoretical/imaginary pivot point about which an arm 1210 rotates. The pivot points 1213 in this example are not points at which the arms 1213 are connected to the display unit housing 1205, but are points in space about which the arms 1210 rotate due to their connections to the display unit housing 1205 at other locations. In particular, each arm 1210 is slidably connected to the display unit housing 1205 at a location spaced from its respective pivot point 1213.

As shown in FIG. 34J, each arm 1210 is slidably connected to a respective one of a pair of guides 1219 (depicted by a broken line) of the display unit housing 1205 so as to slide along the respective guide 1219 and pivot about the respective pivot point. Each guide 1219 may be elongate to allow a respective arm 1210 to slide along it. Furthermore, each guide 1219 may be curved to force a pivoting motion of the arm 1210 during sliding. Accordingly, each guide 1219 may be elongate and curved. In this way, each arm 1210 is configured to pivot about a pivot point 1213 with respect to the display unit housing 1205 without the physical connection between the arm 1210 and the display unit housing 1205 being located at the pivot point 1213.

Each of the arms 1210 comprises an eyelet 1212 configured to receive a respective lateral strap portion 1330 of a positioning and stabilising structure 1300. In this example the eyelet 1212 of each arm 1210 is located at or proximate a posterior end of the respective arm 1212, as illustrated in FIG. 34J. In other examples the arms 1210 may connect with strap portions of the headgear 1300 in other suitable manners, such as clips (e.g. magnetic clips) or a hook and loop connection between a strap portion and each arm 1210.

In FIG. 34J, the anterior end of an arm 1210 hidden behind a portion of the display unit housing 1205 is shown in phantom. In this example, the arm 1210 does not need to be longer than required to span between an intended position for the eyelet 1212 and the guide 1219. As illustrated, an anterior end of the arm 1210 is located proximate the guide 1219. Further, the display unit housing 1205 has a pair of posterior-most points 1205*p*, the posterior-most points 1205*p* being located on respective lateral sides of the display unit housing 1205. In this example, each guide 1219 is located proximate a respective one of the posterior-most points 1205*p* of the display unit housing 1205.

The guides 1219 and arms 1210 may comprise any configuration which allows the arms 1210 to slide along the guides 1219 but restrains movement of the arms 1210 to pivoting/rotation about the pivot point 1213. The guides 1219 and arms 1210 may comprise complementary configurations. The guides 1219 and arms 1210 may connect in a complementary or male-female relationship, such as in the examples shown in FIGS. 34K and 34L. In some examples the guides 1219 each comprise a female portion configured to receive a male portion of a respective arm 1210. In other examples the arms 1210 each comprise a female portion that receives a male portion of a respective guide 1219 (such as is shown in FIG. 34M by way of example). In some examples the guides 1219 and arms 1210 are joined in an interlocking configuration that resists separation of the arm 1210 and guide 1219. For example, the arms 1210 and guides 1219 may comprise a dovetail connection (shown by way of example in FIG. 34K), an L-shaped connection, a T-shaped connection or another connection which both restrains the arms 1210 to pivoting motion about the pivot point 1213 and also prevents the arms 1210 from separating from the guides.

Alternatively, the connection between the arms 1210 and guides 1219 may not itself prevent separation of the arms 1210 from the guides 1219. FIG. 34L shows a configuration in which the guide 1219 is in the form of a slot which receives a projection of the arm 1210 and guides the arm 1210 to move along the slot, but the arm 1210 is prevented from separating from the guide 1219 by a portion of an arm mounting portion 1215 adjacent the arm rather than by the guide 1219 itself. The guide 1215 may be formed in an arm mounting portion 1215, in a portion of the display unit housing 1205 or in another component of the head-mounted display unit 1200. FIG. 34M shows an example in which the arm 1210 comprises a slot that receives a guide 1219 in the form of a projection configured to fit into the slot. In this example the arm 1210 may be prevented from separating from the guide 1219 by a portion of the arm mounting portion 1215 or by another component within the head-mounted display unit 1200.

The use of guides 1219 for the arms 1210 may advantageously allow the arms 1210 to be short, which may allow ample space for other components of the head-mounted display unit 1200 proximate the arms 1210.

The arms 1210 and head-mounted display unit 1200 of the examples of the present technology shown in FIG. 34J-34M may also include any of the other features described herein with reference to other examples of the present technology, including but not limited to the arms 1210 being between a periphery of the posterior side of the display unit housing 1205 and a periphery of the interfacing structure 3800, arm mounting portions 1215, pivoting range of motion of the arms 1210, predetermined resistance to pivoting motion, pivoting between predetermined incremental orientations and/or static torque resistance, for example.

5.5.2 Resistance of Arms to Pivotal Movement

In some examples, each of the arms 1210 has a predetermined resistance to pivotal movement with respect to the display unit housing 1205. As depicted in FIG. 34E, each of the arms 1210 may be configured to pivot between a plurality of predetermined incremental orientations (e.g. the arms 1210 may snap, fall or fit into place at a plurality of orientations). The predetermined resistance to pivotal movement being required to be overcome before the arms 1210 are able to pivot from one predetermined incremental orientation to another.

In some examples, each of the arms 1210 comprises one or more first engagement features 1232 configured to engage sequentially with a plurality of second engagement features 1233 of the head-mounted display unit 1200 (e.g. of the display unit housing 1205, of an arm mounting portion 1215 or of another component) during pivoting of the arms 1210 between the predetermined incremental orientations. FIGS. 34E and 38B-38N depict various such examples of the present technology.

Figure 38C:
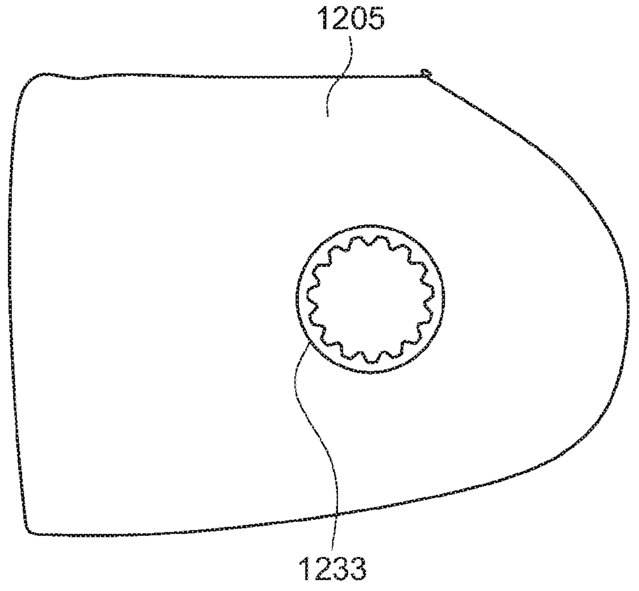
Figure 38D:
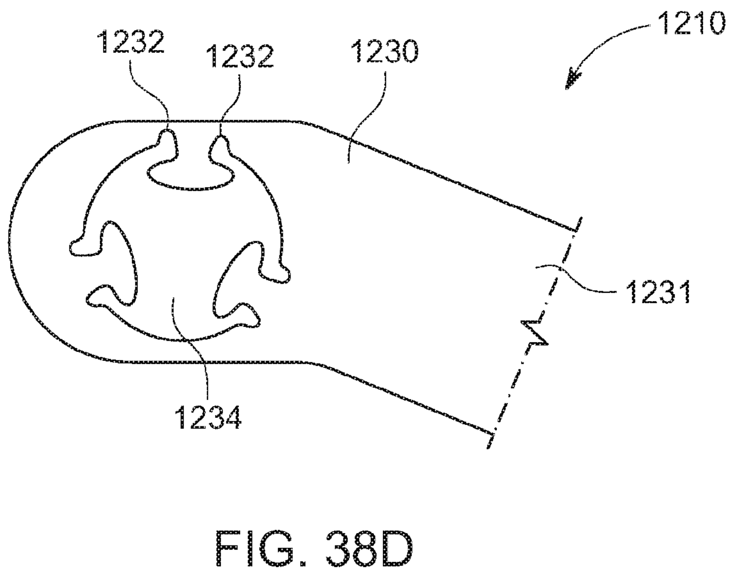
Figure 38E:
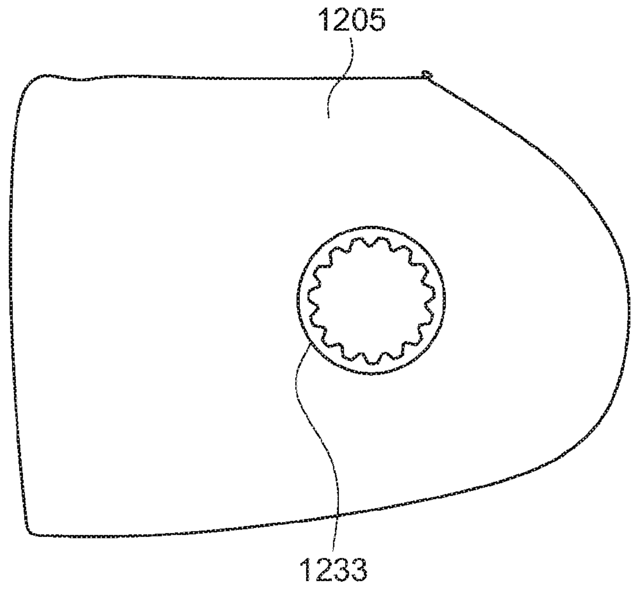
Figure 38F:
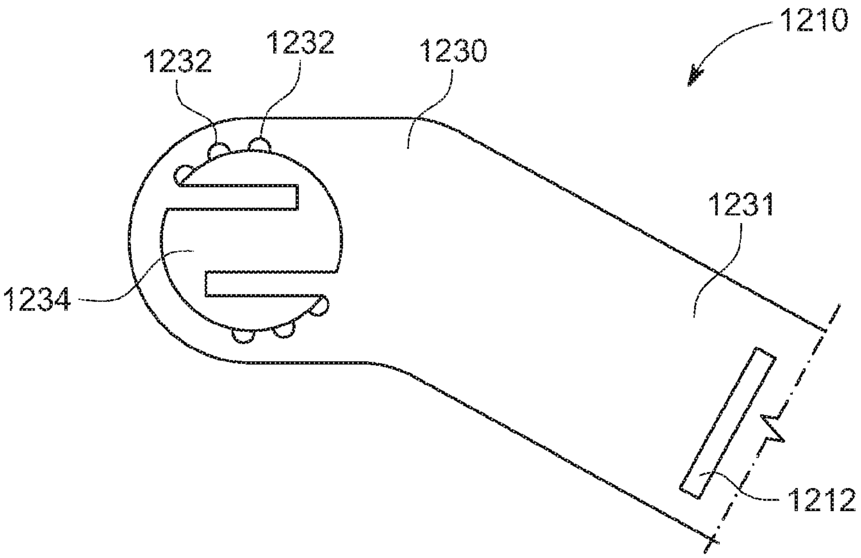
Figure 38G:
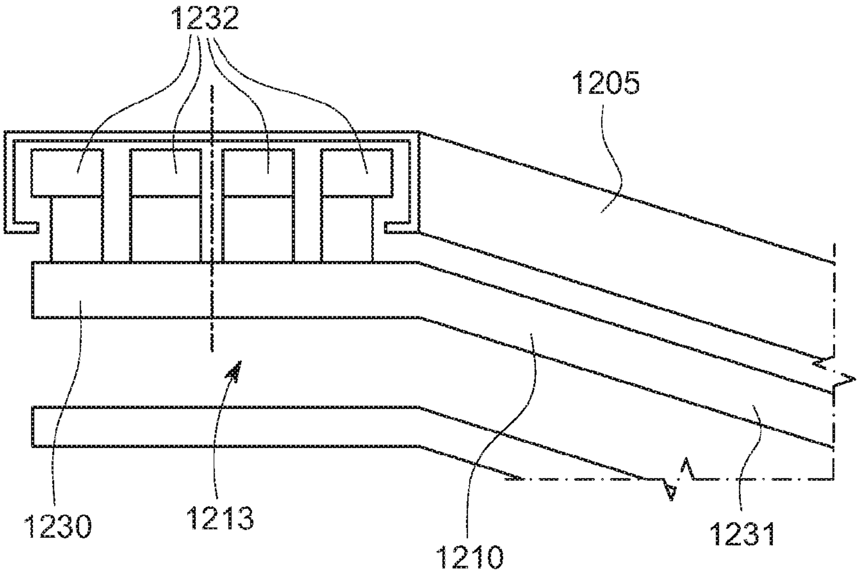
Figure 38H:
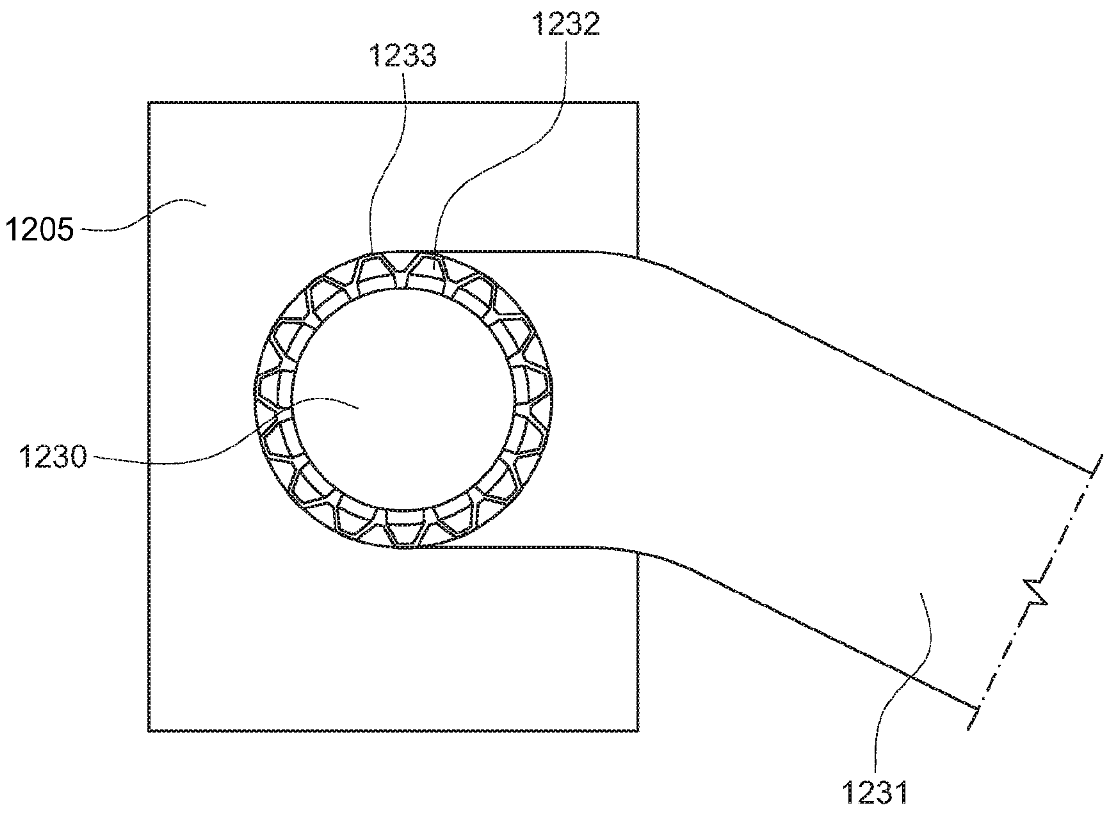
Figure 38I:
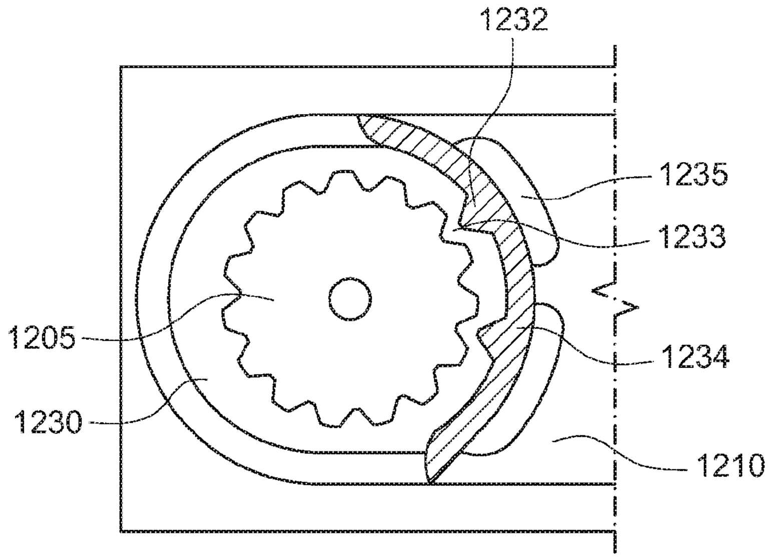
Figure 38J:
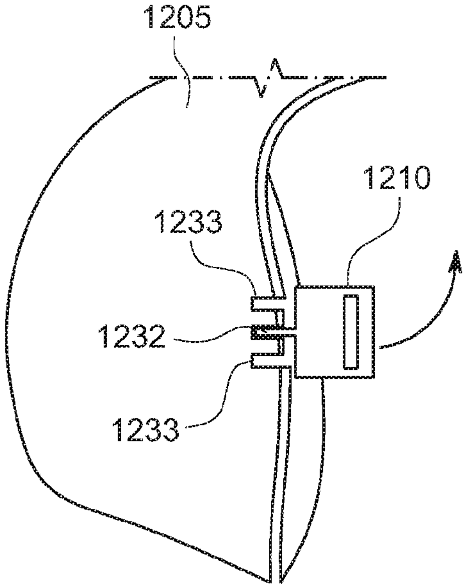
Figure 38K:
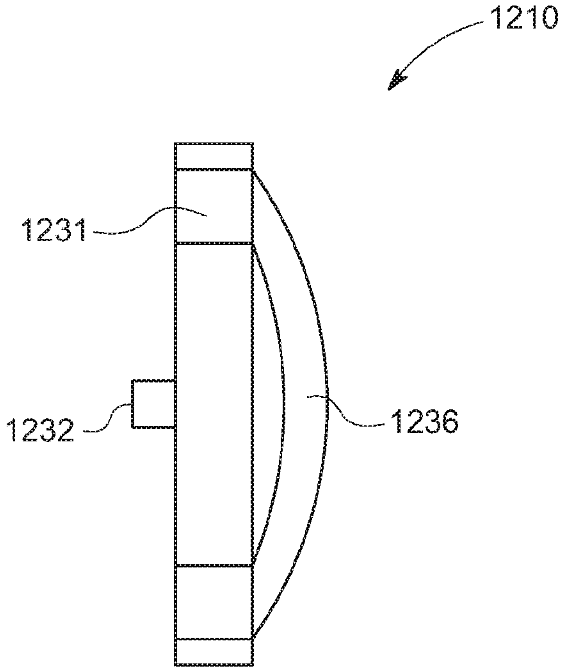

Each of the arms 1210 may comprise a single first engagement feature 1232, as shown in FIG. 34E or FIGS. 38J and 38K for example. Alternatively, each of the arms 1210 may comprise a plurality of first engagement features 1232, where each first engagement feature 1232 is configured to engage with a respective one of the second engagement features 1233 at a time and configured to move sequentially between the second engagement features 1233 during pivoting of the arms 1210. This type of configuration is shown in the examples of FIGS. 38B-38I, and 38L.

In some examples, each of the arms 1210 comprises a plurality of first engagement features 1232 configured to engage with one or more second engagement features 1233 of the head-mounted display unit 1200, the one or more second engagement features 1233 being configured to engage sequentially with the first engagement features 1232 during pivoting of the arms 1210 between the predetermined incremental orientations.

In some examples, the first engagement features 1232 are protrusions and the second engagement features 1233 are recesses. In other examples, the first engagement features 1232 are recesses and the second engagement features 1233 are protrusions. The first and second engagement features may be complementary, for example male and female features.

In some examples, each arm 1210 comprises a hub portion 1230 pivotably connected to the display unit housing 1205 (e.g. directly or via an arm mounting portion 1215) and an elongate portion 1231 extending from the hub portion 1230. In some examples, such as those shown in FIGS. 34E, 38J, 38K and 38L, the one or more first engagement features 1232 of each arm 1210 are provided to the elongate portion 1231 of the arm 1210.

The display unit housing 1205 in the FIG. 34E example comprises a plurality of second engagement features 1233 (e.g. recesses formed by a plurality of bumps) corresponding to the predetermined incremental orientations. Additionally, each of the arms 1210 comprises a first engagement feature 1232 configured to fit to each of the second engagement features 1233. A predetermined force (e.g. predetermined resistance to pivotal movement) may be required to move each arm 1210 from one second engagement feature 1233 to another.

In some examples, each arm 1210 is configured to deform to allow the one or more first engagement features 1232 to move sequentially between the second engagement features 1233 during pivoting of the arms 1210, as depicted in FIG. 38J.

In some examples, each arm 1210 comprises a spring 1236 configured to bias the elongate portion 1231 of the arm 1210 towards the second engagement features 1233 such that the one or more first engagement features 1231 are biased into engagement with the second engagement features 1232. In FIG. 38K, the arm 1210 comprises a spring 1236 in the form a leaf spring. The spring 1236 may be compressed against a portion of the display unit housing 1205 or arm mounting portion 1215, for example.

Figure 38L:
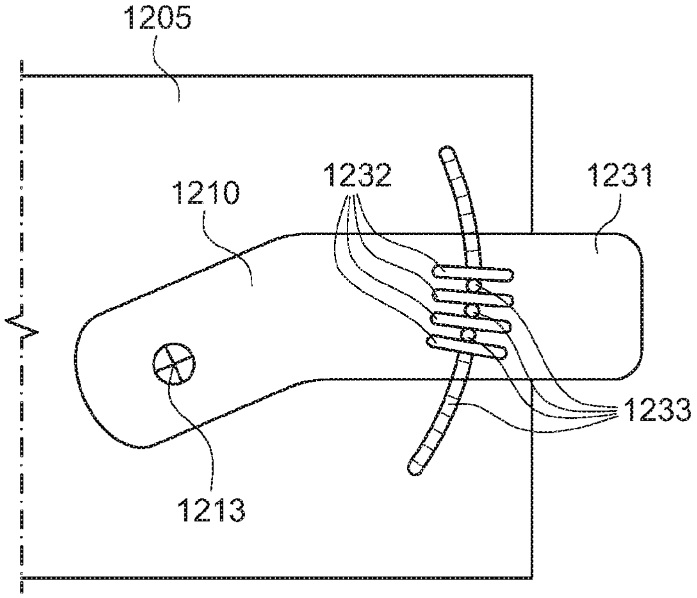

In the example shown in FIG. 38L, the arm comprises a plurality of first engagement features 1232 configured to engage with the second engagement features 1233.

In some examples, such as those shown in FIGS. 38B, 38C-38D, 38E-38F, 38G-38H, 38I, 38M and 38N, the first engagement features 1232 of each arm 1210 are provided to the hub portion 1230 of the arm 1210 in a circular arrangement and configured to rotate with the hub portion 1230 about a pivot point 1213 of the arm 1210. In the examples shown in FIGS. 38B, 38C-38D, 38E-38F, 38G-38H, and 38I, the first engagement features 1232 of each arm 1210 face radially away from the pivot point 1213, and the second engagement features 1233 face radially towards the pivot point 1213. In other examples, the first engagement features 1232 of each arm 1210 face radially towards the pivot point 1213, and the second engagement features 1233 face radially away from the pivot point 1213.

The first engagement features 1232 in some examples are provided to a deformable portion of the hub portion 1230, the deformable portion being configured to deform to allow the first engagement features 1232 to move sequentially between second engagement features 1233 when the arm 1210 is pivoted. As shown in FIGS. 38B, 38C-38D, 38E-38F and 38I, the hub portion 1230 may comprise a raised portion 1234 being raised with respect to the arm 1210 and comprising the deformable portions and the first engagement features 1232. The raised portion 1234 may comprise a hole 1235 adjacent each deformable portion, the holes 1235 allowing the deformable portions and first engagement features 1232 to deform towards the holes 1235 to allow the first engagement features 1232 to move sequentially between second engagement features 1233 when the arm 1210 is pivoted. The absence of material in the holes 1235 may allow the arm 1210 to be flexible enough in the deformable portion to deform sufficiently to allow the arm 1210 to rotate through the predetermined increments.

In some examples, such as shown in FIGS. 38C-38D and 38E-38F, each deformable portion comprises one or more cantilever arm portions having at least one of the first engagement features 1232 thereon, the cantilever arm portions configured to deform to allow the first engagement features 1232 to move sequentially between second engagement features 1233 when the arm 1210 is pivoted. Each cantilever arm portion may have a single first engagement feature 1232 at the end thereof, as shown in FIGS. 38C-38D or may have multiple first engagement features thereon, as shown in FIGS. 38E-38F. In some examples the raised portion 1234 has an S-shape, as shown in FIG. 38F.

In some examples, the first engagement features 1232 of the arm 1210 form a snap-fit connection to the head-mounted display unit 1200 to connect the arm 1210 to the head-mounted display unit 1200, as shown in FIGS. 38G and 38H. In this example, each first engagement feature 1232 is able to deform radially inwardly. The first engagement features 1232 snap-fit to the second engagement features 1233.

Figure 38M:
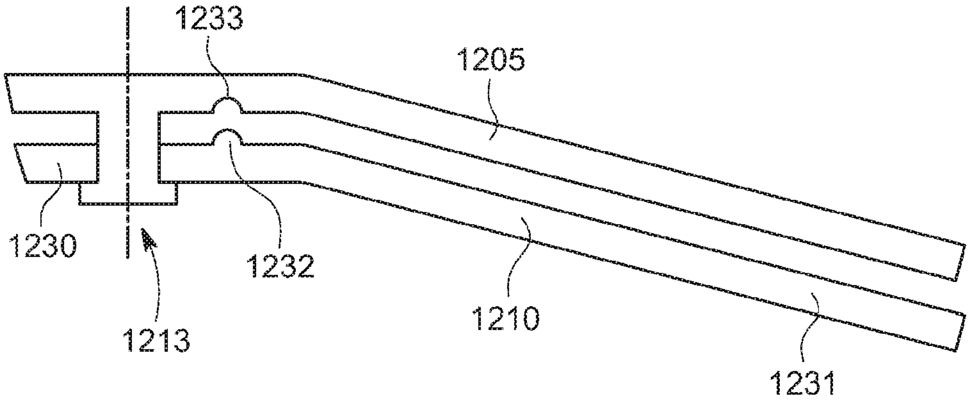
Figure 38N:
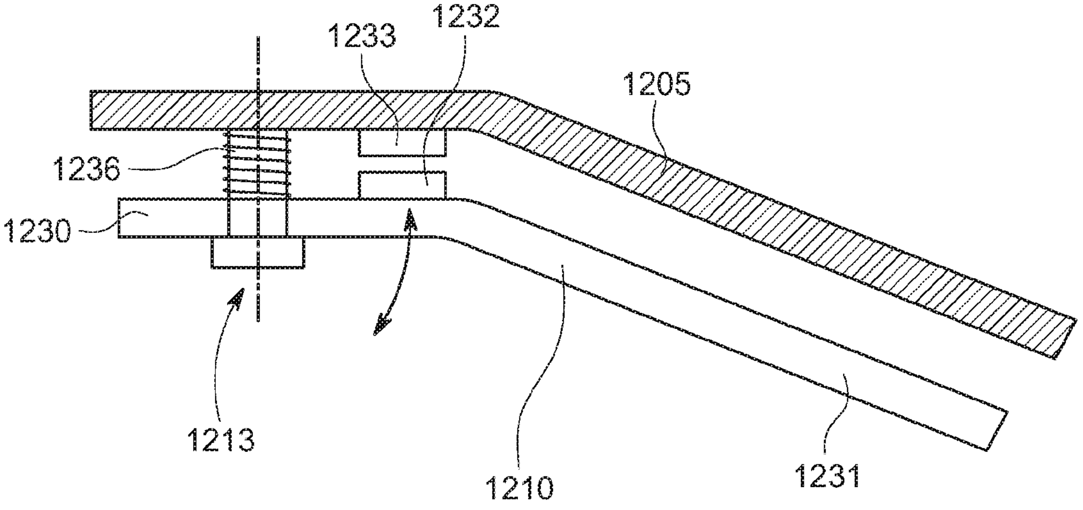

In some examples, the first engagement features 1232 face away from the hub portion 1230 of the arm 1210 and towards the second engagement features 1233 in a direction parallel to the axis of rotation of the arm 1210 (e.g. an axis through the pivot point 1213), as shown in FIGS. 38M and 38N. The first engagement features 1232 may be located on or in a face of the hub portion 1230 as opposed to at sides. The hub portion 1230 may be configured to move parallel to the axis of rotation of the arm 1210 to move away from the second engagement features 1233 to allow the first engagement features 1232 to move sequentially between second engagement features 1233 when the arm 1210 is pivoted. In the example shown in FIG. 38N, the hub portion 1230 is biased towards the second engagement features 1233 by a spring 1236. The spring may be a coil spring provided around a pin, bolt or screw that connects the arm 1210 to the display unit housing 1205, for example.

5.5.2.1 Static Torque Resistance

In another example, each of the arms 1210 is connected to the display unit housing 1205 such that a predetermined static torque resistance is required to be overcome for each arm 1210 to pivot with respect to the display unit housing 1205. In some examples, the predetermined static torque resistance is provided by static friction. The static friction may act between each arm 1210 and a respective portion of the display unit housing 1205 or respective arm mounting portion 1215 (to be described below).

In some examples, the head-mounted display system 1000 comprises a pair of friction rings 1220 (e.g. O-rings, washers or the like). FIG. 38A shows a schematic cross section view through the pivot point 1213 of an arm 1210, and FIG. 54 shows a schematic cross section view through the pivot point 1213 of an arm 1210 according to another example of the present technology. Each friction ring 1220 may be mounted in contact with a respective one of the arms 1210 and with an adjacent surface within the head-mounted display unit 1200 (which may be a surface of an arm mounting portion 1215. The friction rings 1220 provide static friction required to be overcome for each arm 1210 to pivot with respect to the display unit housing 1205.

As shown in FIG. 38A, each friction ring 1220 may be received in a correspondingly shaped recess within the arm 1210. This may hold the friction ring 1220 in place without the friction ring 1220 occupying excessive space within the head-mounted display unit 1200. As shown in FIG. 54, each of the friction rings 1220 may be located within a friction ring cavity defined partially by the respective arm 1210 and partially by a portion of the head-mounted display unit 1200 to which the arm 1210 is mounted. In these examples, each arm 1210 is attached to a respective one of a pair of arm mounting portions 1215.

The friction ring 1220 may be attached to or received in the hub portion 1230 of the arm 1210. In this example a bolt 1221 and nut 1222 secure the arm 1210 to the arm mounting portion 1215. The nut 1222 may be received in or attached to the hub portion 1230 of the arm 1210. A portion of the bolt 1221 may extend through the hub portion 1230 of the arm 1210 and may define the pivot point 1213. The friction rings 1220 may be formed from a high-friction material and/or clamped to result in the desired friction and predetermined static torque resistance.

The arms 1210 may have a length such that the posterior end of each arm 1210 is located proximate a respective one of the user's ears.

5.5.3 Arm Mounting Portions

As shown in FIGS. 34B, 34C, 34H and 34I in particular, each of the arms 1210 is attached to a respective one of a pair of arm mounting portions 1215, in this particular example. The display unit housing 1205 may comprise a pair of lateral portions 1207 on opposing lateral sides of the display unit housing 1205, each of the arm mounting portions 1215 being attached to a medial side of a respective one of the lateral portions 1207. In this example, each of the arms is located between a respective arm mounting portion 1215 and a respective lateral portion 1207 of the display unit housing 1205. Each arm 1210 may be pivotably connected to a respective arm mounting portion 1215. In other examples, each arm mounting portion 1215 is attached to or is integrally formed with the display unit housing 1205 or other component, such as a lens plate.

5.5.4 Arm Orientation

As shown in FIGS. 37A and 37B, in some examples each of the arms 1210 has a transverse cross sectional shape comprising a major axis MA and a minor axis MN. Each arm 1210 is larger in the major axis MA than in the minor axis MN in this example (e.g. the arms 1210 each have a flat shape, which may be rectangular for examples). In some examples of the present technology, the major axis MA is aligned parallel to the sagittal plane of the user's head in use along the length of the arm 1210. FIG. 37A shows a cross section of the arm 1210 having a vertical orientation (e.g. aligned with the sagittal plane). One drawback of this arrangement is that the arm 1210 may be limited in how much it can pivot before interfering with the display unit housing 1205 (as depicted in FIG. 37A). Accordingly, in some examples of the present technology, at a point along the length of each arm 1210 located interior to the display unit housing (e.g. where interference may occur), the major axis MA is oriented at an oblique angle O to the sagittal plane of the user's head in use (equal to an angle O with a vertical axis VA), as depicted in FIG. 37B. The angular range through which the arm 1210 may be able to be pivoted may be increased in this example in comparison to the FIG. 37A example with no or only a small amount of extra space occupied by the arm 1210 and associated surrounding components.

In some examples, at the point along the length of each arm 1210 located interior to the display unit housing 1205, the major axis MA of the transverse cross sectional shape has a superomedial-inferolateral orientation in use. This is the orientation shown in FIG. 37B.

In some examples, each of the arms 1210 is shaped such that the major axis MA of the transverse cross section changes orientation along the length of the arm 1210. For example, the shape or cross sectional orientation of each arm 1210 may have one orientation inside of the head-mounted display unit 1200 (e.g. a major axis MA having a superomedial-inferolateral orientation) and another orientation outside of the head-mounted display unit 1200 (e.g. a vertical orientation). In some examples, at a point along the length of each arm 1210 located exterior to the display unit housing 1205, the major axis MA is oriented substantially parallel to the sagittal plane of the user's head in use.

A head-mounted display system 1000 having arms 1200 as described with reference to FIGS. 34A-34I may have any one or more of the other features described in herein (such as a top strap portion 1340), unless the context clearly requires otherwise).

5.5.5 Electronics Volume

In some examples of the present technology, the head-mounted display unit 1200 comprises a pair of electronics volumes 1203. FIG. 55C shows a schematic view of one side of a head-mounted display unit 1200 comprising electronics volumes 1203. Each electronics volume 1203 may be located on a respective side of the head-mounted display unit 1200 and proximate a respective one of the arms 1210. Each electronics volume 1203 may comprise one or more electronic components. The electronics volumes 1203 may be volumes of space within the head-mounted display unit 1200 containing one or more electronic components.

As shown in FIG. 55C, each arm comprises a hub portion 1230 pivotably connected to the display unit housing 1205 at a pivot point 1213 and an elongate portion 1231 extending from the hub portion 1230. In this example, the elongate portion 1231 is curved to avoid interference with the electronics volume 1203. The elongate portion 1231 may comprise curved portions and straight portions, but may be elongate overall. Each arm 1210 may comprise an eyelet 1213 for connection with a lateral strap portion 1330, also as illustrated in FIG. 55C. The elongate portion 1231 of each arm 1210 may comprise an offset portion 1237. The offset portion 1237 may be offset from an axis 1238 through/between the eyelet 1213 and the pivot point 1238. The offset portion 1237 may increase the range of rotation of the arm 1210 without interference with the electronics volume 1203. Curvature of the arm 1210 and/or an offset portion 1237 may advantageously allow the electronics volume 1203 to be located proximate (for example, below) the arm 1210 without the arm 1210 interfering with the electronics volume 1203. Additionally, locating the electronics volume 1203 as posteriorly as possible within the head-mounted display unit 1200 may advantageously provide a more favourable weight balance within the head-mounted display unit 1200 than if the electronics volume 1203 was located further forward (e.g. away from the user's head). Furthermore, by shaping the arm to avoid the electronics volume 1203, the pivot point 1213 and eyelet 1212 may advantageously be located in optimum positions.

In some examples the electronics volume 1203 comprises an audio speaker. In other examples the electronics volume may alternatively or additionally contain one or more of a sensor, a battery and processor.

5.6 Elastic Connector Elements Between Arms and Lateral Strap Portions

With reference to FIGS. 55A and 55B, in some examples the head-mounted display system comprises a positioning and stabilising structure 1300 comprising a pair of lateral strap portions 1330 configured to connect between the posterior support portion 1350 and a head-mounted display unit 1200, each configured to be located on a respective lateral side of the user's head in use. The head-mounted display unit 1200 may comprise a display unit housing 1205 comprising a display, an interfacing structure 3800 configured to contact the user's face in use and a pair of arms 1210. As shown in FIG. 55B in particular, each arm 1210 may be configured for releasable direct attachment to a respective one of the lateral strap portions 1330.

The head-mounted display unit 1200 may also comprise a pair of elastic connectors 1250. Each elastic connector 1250 may be configured to form an elastic connection connecting a respective one of the lateral strap portions 1330 to a respective one of the arms 1210. The elastic connectors 1250 may be configured to stretch during donning and doffing of the head-mounted display system 1000 when the lateral strap portions 1330 are not directly attached to the arms 1210 while maintaining the elastic connection between the lateral strap portions 1330 and the arms 1210. Advantageously, this may enable the head-mounted display system 1000 to be donned and doffed without the lateral strap portions 1330 becoming completely disconnected from the head-mounted display unit 1200. The stretchable nature of the elastic connectors 1250 may enable some tension to be maintained in the positioning and stabilising structure 1300 during donning and doffing, which may advantageously hold the head-mounted display unit 1200 on the user's head while the user tightens headgear straps, and may avoid the positioning and stabilising structure 1300 from slipping, falling or otherwise coming out of position unintentionally.

With reference to FIGS. 55A and 55B, each arm 1210 comprises a hub portion 1230 and an elongate portion 1231. The elastic connector 1250 is in this example connected to the elongate portion 1231 at an elastic connector connection point 1251. As illustrated in FIG. 55B, each arm 1210 comprises an eyelet 1213 at a posterior end of the arm 1210 configured to connect to a respective lateral strap portion 1330. The elastic connector connection point 1251 may be located anterior to the eyelet 1213. In some examples the elastic connector 1250 is permanently connected to the respective arm 1210. In other examples the elastic connector 1250 may be removably connected to the arm 1210, for example by a hook-and-loop connection or a press stud connection. In some examples the elastic connector 1250 may be removably attached to the lateral strap portion 1330, for example by a hook-and-loop connection or a press stud connection, or may be permanently attached.

5.7 Headgear Buckle Integrated into Interface Structure

With reference to FIGS. 35A and 35B, in some examples the head-mounted display unit 1200 comprises a display unit housing 1205 and an interfacing structure 3800. The interfacing structure 3800 may be constructed and arranged to be in opposing relation with the user's face. The interface structure 3800 may comprise a face-engaging portion 3810 configured to engage the user's face in use, and a chassis 3802 connected to the face-engaging portion 3810 and further connected to the display unit housing 1205 to attach the interfacing structure 3800 to the display unit housing 1205.

FIGS. 35A and 35B are schematic cross section views of a superior portion of the interfacing structure 3800 and display unit housing 1205 aligned with the sagittal plane of the user's head.

In the FIGS. 35A and 35B examples, the chassis 3802 of the interfacing structure 3800 is configured for attachment to a top strap portion 1340 of a positioning and stabilising structure 1300 for holding the head-mounted display unit 1200 in an operable position on a user's head in use. The positioning and stabilising structure 1300 may further comprise a posterior support portion 1350 configured to engage a posterior portion of a user's head, and a pair of lateral strap portions 1330 configured to connect between the posterior support portion 1310 and the head-mounted display unit 1205, each configured to be located on a respective lateral side of the user's head in use. Features of top strap portions 1340 and positioning and stabilising structures 1300 are described elsewhere herein.

As shown in FIGS. 35A and 35B, the chassis 3802 may comprise an eyelet 3812 through which the top strap portion 1340 is able to be looped back and secured to itself. In the FIG. 35A example, the eyelet 3812 is formed by both the chassis 3802 and the display unit housing 1205 such that the top strap portion 1340 is able to be looped around both a portion of the chassis 3802 and a portion of the display unit housing 1205. In the FIG. 35B example, the eyelet 3812 is formed in a superiorly projecting portion 3814 of the chassis 3802. As illustrated, the superiorly projecting portion 3814 may project through an opening in the display unit housing 1205.

The top strap portion 1340 may pass through the eyelet 3812, loop back and secure to itself, e.g. with a hook-and-loop fastening, a buckle, a magnetic connection or the like.

The chassis 3802 may be a substantially rigid portion and may be formed from a thermoplastic material or an elastomer, such as a high durometer elastomer.

5.8 Interfacing Structure

In some embodiments, two or more of the chassis, support structure and face engaging surfaces of the interfacing structure can be integrally formed as a single component comprising varying thicknesses and finishes thereacross so as to provide the desired level of rigidity at the chassis or desired level of cushioning effect at the face engaging surfaces. For example, in some such embodiments, the interfacing structure can be formed from a singular silicone body. For example, FIGS. 10A to 10C show an interfacing structure 3100 comprising a support structure in the form of a support flange 3102, supporting an integral face engaging flange 3106 having a face engaging surface 3108. In further embodiments, additional components may be provided to the interfacing structure 3100. In alternative embodiments, the interfacing structure can be integrally formed as a single component from a foam or an elastomeric material.

In some forms of the present technology, an interfacing structure may comprise a face engaging portion constructed from a flexible and resilient material (for example, an elastomer such as silicone), supported by a more rigid support portion (for example, constructed from a plastics material). In embodiments the rigid support portion may comprise a chassis.

For example, with reference to FIG. 11A, the interfacing structure 3200 may comprise a rigid support portion 3202 to which a flexible and resilient face engaging portion 3204 may be provided. The face engaging portion 3204 may be curved in cross-section, having a support flange 3206 and an integral face engaging flange 3208 having a face engaging surface 3210. An overlapping portion 3212 of the face engaging portion 3204 may be secured to the rigid support portion 3202.

In a further example, with reference to FIG. 11B, the rigid support portion 3202 may comprise a locating portion, for example recess 3214. The face engaging portion 3204 may comprise a biasing portion, for example spring 3216, received within the recess 3214 and configured to provide a biasing force to the face engaging portion 3204 in the direction of the user's face.

In a further example, with reference to FIG. 11C, the face engaging portion 3204 may comprise a concertina section 3218 between the rigid support portion 3202 and the face engaging flange 3208. The concertina section 3218 comprises one or more folds, and may provide a higher degree of flexibility or increased movement to assist with compliance against the user's face.

In some forms of the present technology, the interfacing structure may comprise a foam portion supported by the resilient and flexible face engaging portion, wherein the foam portion provides the face engaging surface.

For example, with reference to FIG. 12A, the interfacing structure 3300 may comprise a rigid support portion 3302 to which a flexible and resilient face engaging portion 3304 may be provided, in a configuration similar to that described with reference to FIG. 11A. The face engaging portion 3304 has a support flange 3306 and an integral face engaging flange 3308, with an overlapping portion 3310 secured to the rigid support portion 3302. A foam cushion 3312 having a face engaging surface 3314 is provided to a user facing side of the face engaging flange 3308. In examples the foam cushion 3312 may be permanently attached to the face engaging flange 3308. In alternative embodiments the foam cushion 3312 may be releasably attached to the face engaging flange 3308. In the example of FIG. 12A, the foam cushion 3312 may comprise a textile-foam composite (e.g. a foam core with a textile outer layer). In the example of FIG. 12B, the foam cushion 3312 may comprise a flocked foam. In the example of FIG. 12C, the foam cushion 3312 may comprise a raw foam.

In some forms of the present technology, the interfacing structure may comprise a textile layer provided to the resilient and flexible face engaging portion, wherein the textile layer provides the face engaging surface.

For example, with reference to FIG. 13A, the interfacing structure 3400 may comprise a rigid support portion 3402 to which a flexible and resilient face engaging portion 3404 may be provided, in a configuration similar to that described with reference to FIG. 11A. The face engaging portion 3404 has a support flange 3406 and an integral face engaging flange 3408, with an overlapping portion 3410 secured to the rigid support portion 3402. A textile layer 3412 having a face engaging surface 3414 is provided to a user facing side of the face engaging flange 3408. In the example of FIG. 13A the textile layer 3412 is releasably attached to the face engaging portion 3404 using retaining means 3416. In one example the retaining means 3416 may be a rigid element clipping the textile layer 3412 in place. In another example the retaining means 3416 may be elasticised, fitting over the face engaging portion 3404 to hold it in place. In an alternative embodiment, with reference to FIG. 13B, the textile layer 3412 may be permanently attached to the face engaging flange 3308. It is envisaged that in this embodiment, the surface area of the textile layer 3412 may be smaller in comparison with that of FIG. 13A, as the textile layer 3412 may be delimited to the region likely to contact the user's skin—i.e. does not need to extend as far around the exterior of the face engaging portion 3404. This may also have the effect of reducing the impact of the textile layer 3412 on spring properties of the exposed region of the support flange 3406.

In some forms of the present technology, an interfacing structure may comprise a face engaging portion supported by a more rigid support portion (for example, constructed from a plastics material), wherein the face engaging portion comprises a foam cushion and an elastomeric cover over the foam cushion.

Figure 14A:
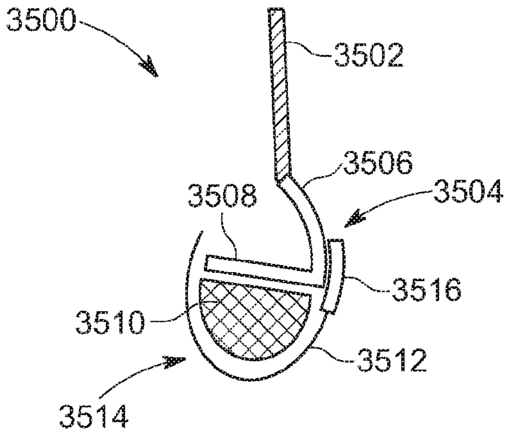

For example, with reference to FIG. 14A, the interfacing structure 3500 may comprise a rigid support portion 3502 to which a flexible and resilient face engaging portion 3504 may be provided. The face engaging portion 3504 may have a support flange 3506, and a cushion support flange 3508 extending from the support flange 3506. A foam cushion 3510 is provided on cushion support flange 3508. A cushion cover 3512 (made of, for example, an elastomer) extends over the foam cushion 3510 and provides a face engaging surface 3514 in use. In this example, the cushion cover 3512 is releasably attached, for example using securing means 3516. The free edge of the cushion cover 3512 extends beyond the cushion support flange 3508.

Figure 14B:
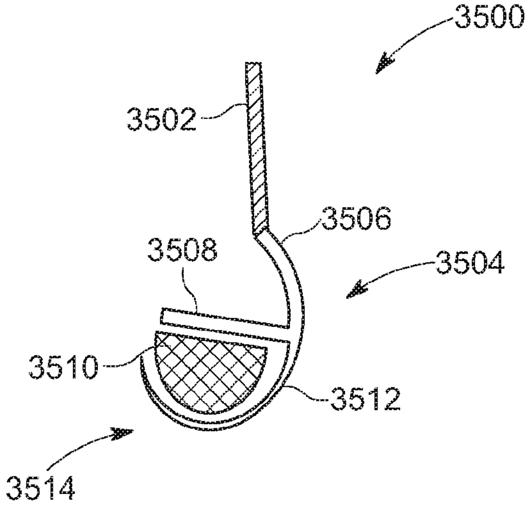

In another example, with reference to FIG. 14B, the cushion cover 3512 is permanently attached to the support flange 3506 and cushion support flange 3508 (for example, being integrally formed). In the example of FIG. 14B the cushion cover 3512 does not extend around the foam cushion 3512 so far as to reach the cushion support flange 3508.

Figure 14C:
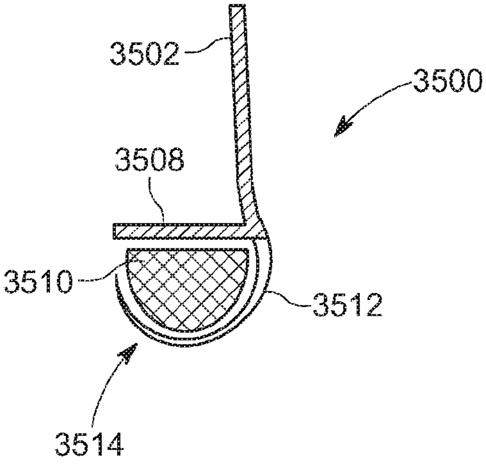

FIG. 14C shows an example in which the cushion support flange 3508 extends from the rigid support portion 3502, and is made of a more rigid material than the cushion cover 3012.

Figure 14D:
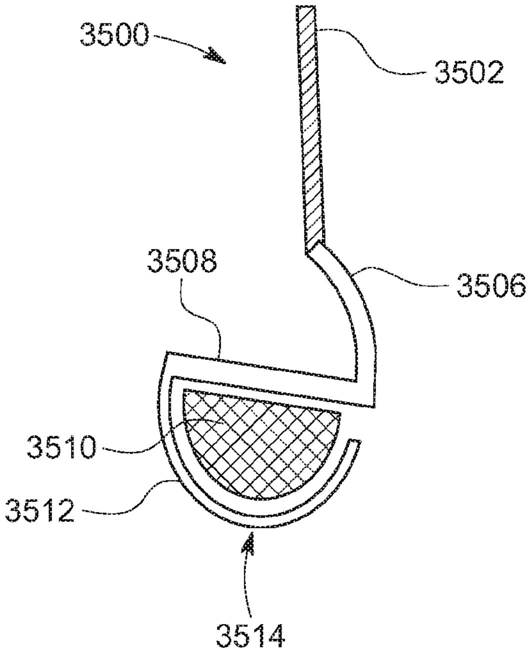

In examples, such as that illustrated in FIG. 14D, the cushion cover 3512 may extend from a position on the cushion support flange 3508 proximal to the user's face in use. In such an example, the exposure of the foam cushion 3510 may be considered to be "outward" facing, in comparison with an "inward" facing exposure of the foam cushion 3510 in the example of FIG. 14B.

Figure 14E:
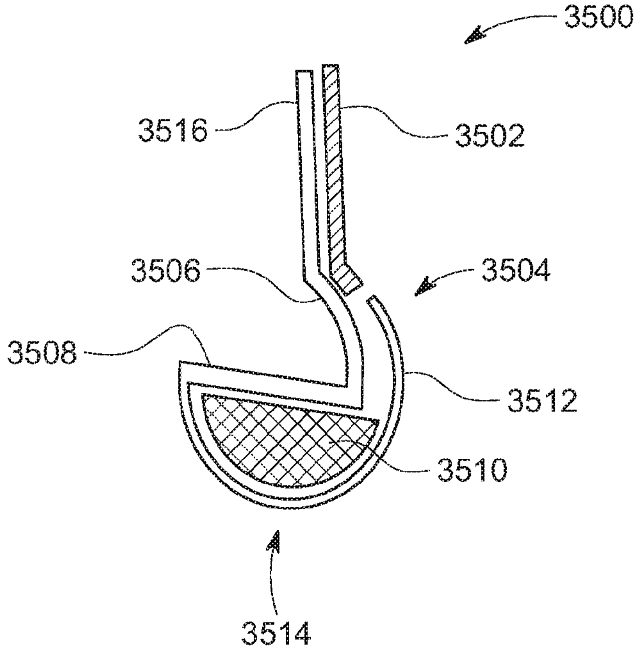
Figure 15A:
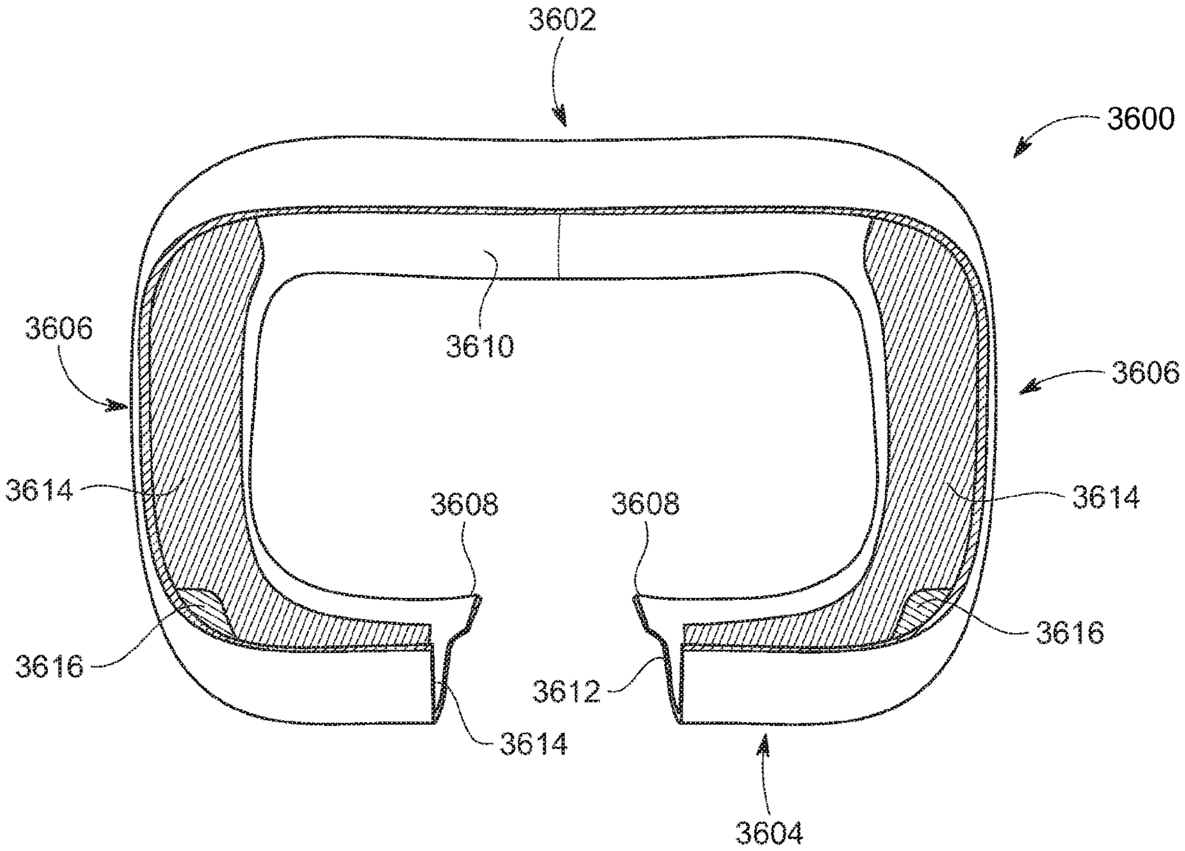
Figure 15B:
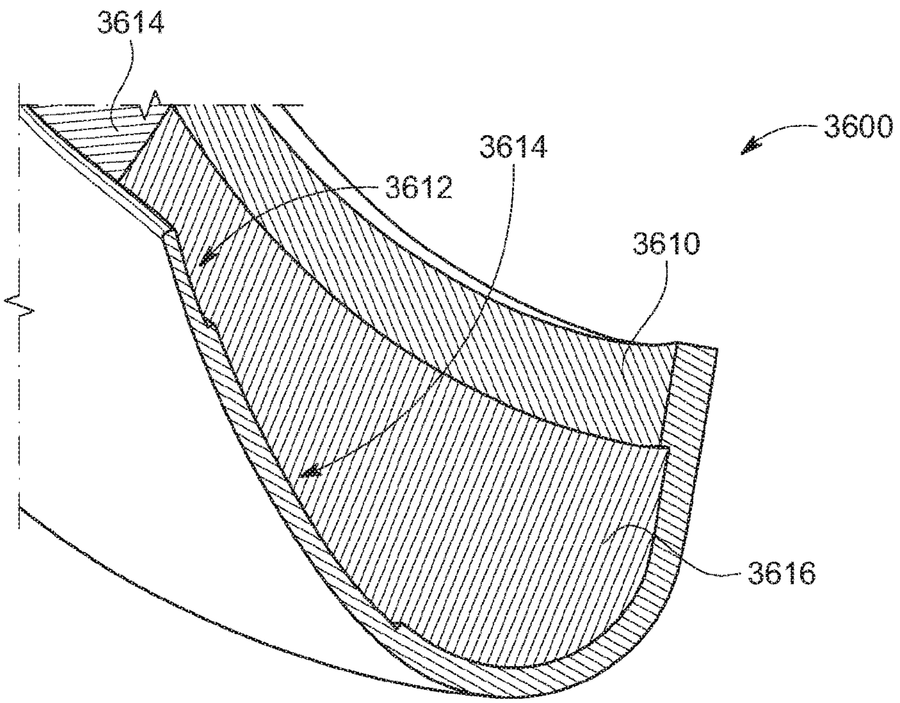
Figure 15C:
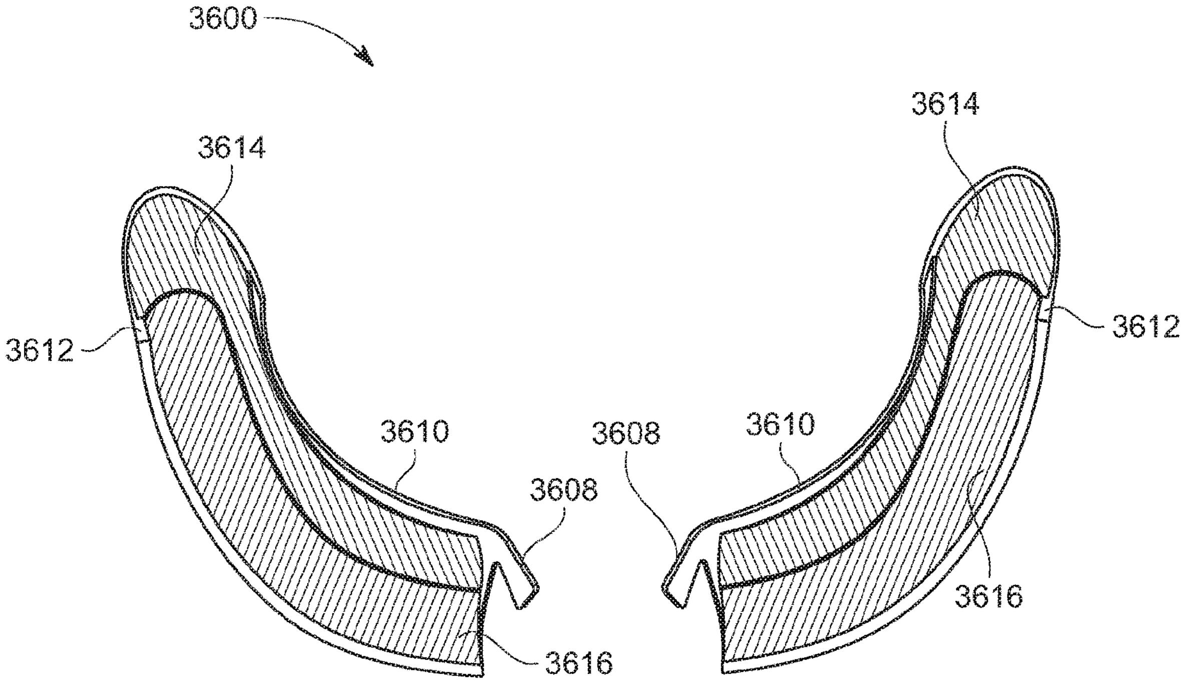
Figure 15D:
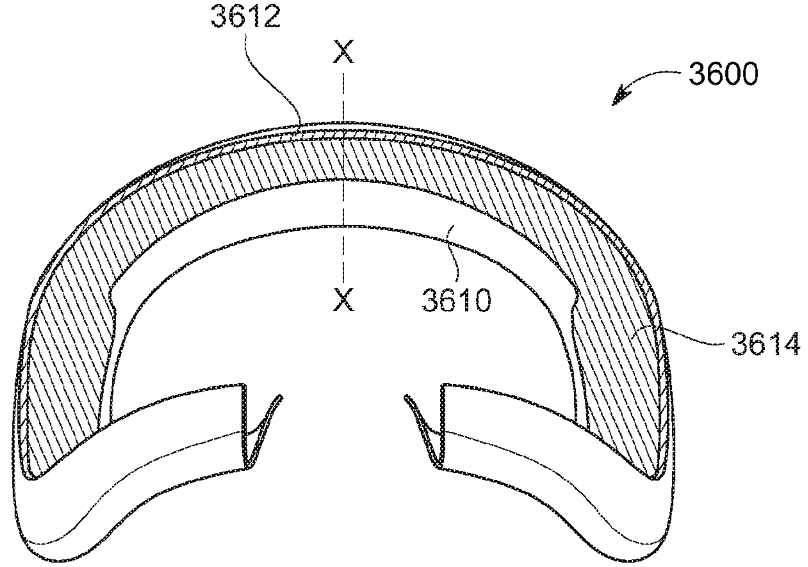
Figure 15E:
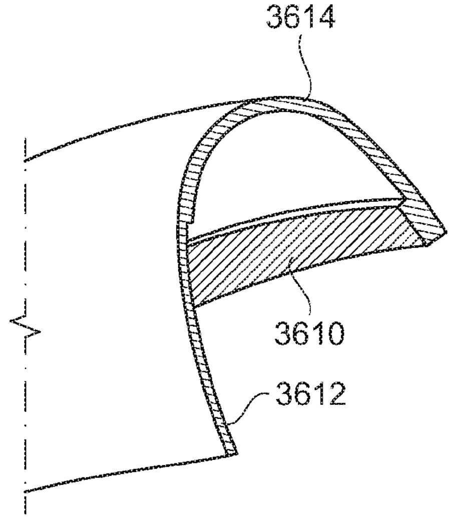
Figure 15F:
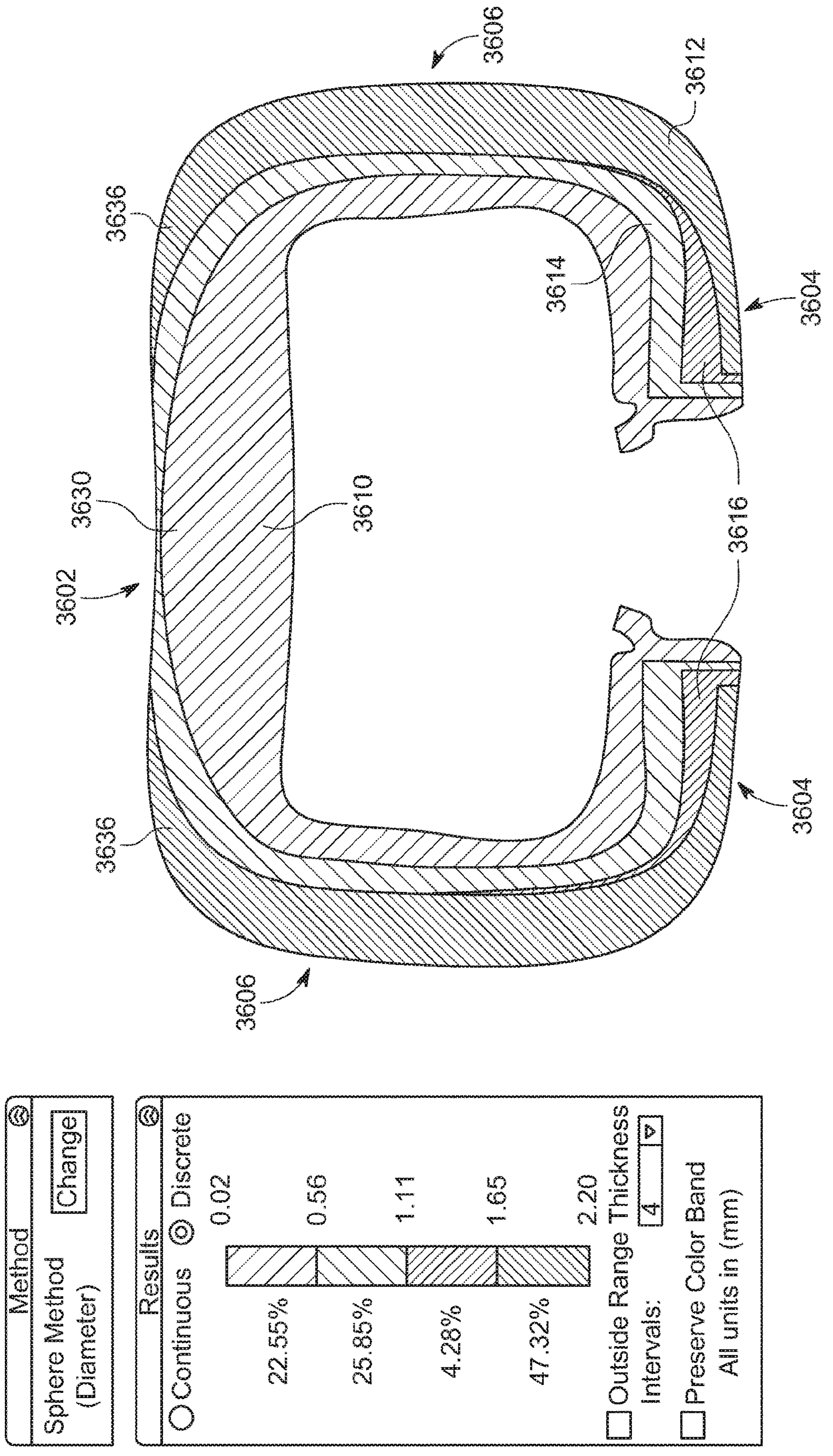
Figure 15G:
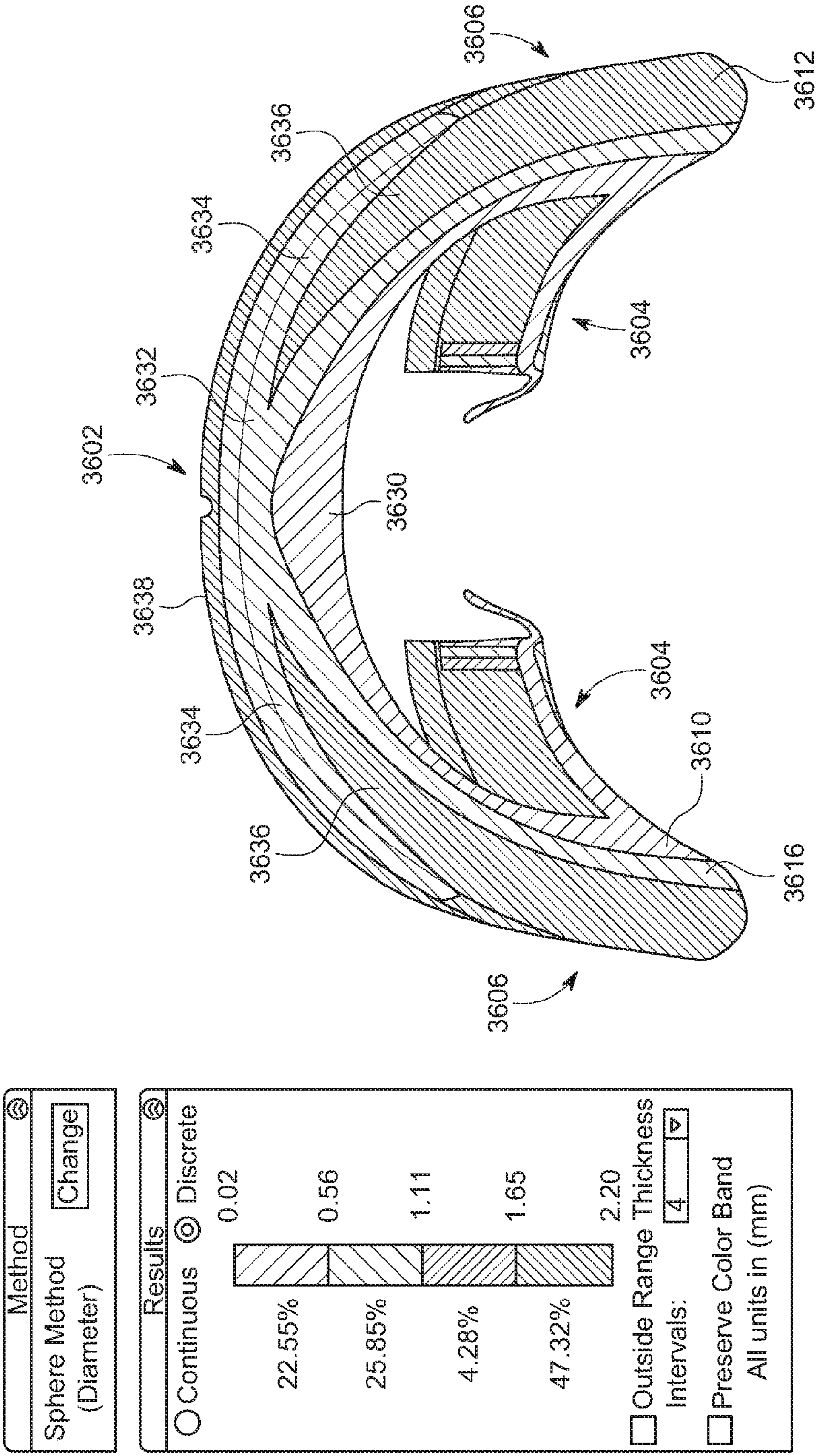
Figure 15H:
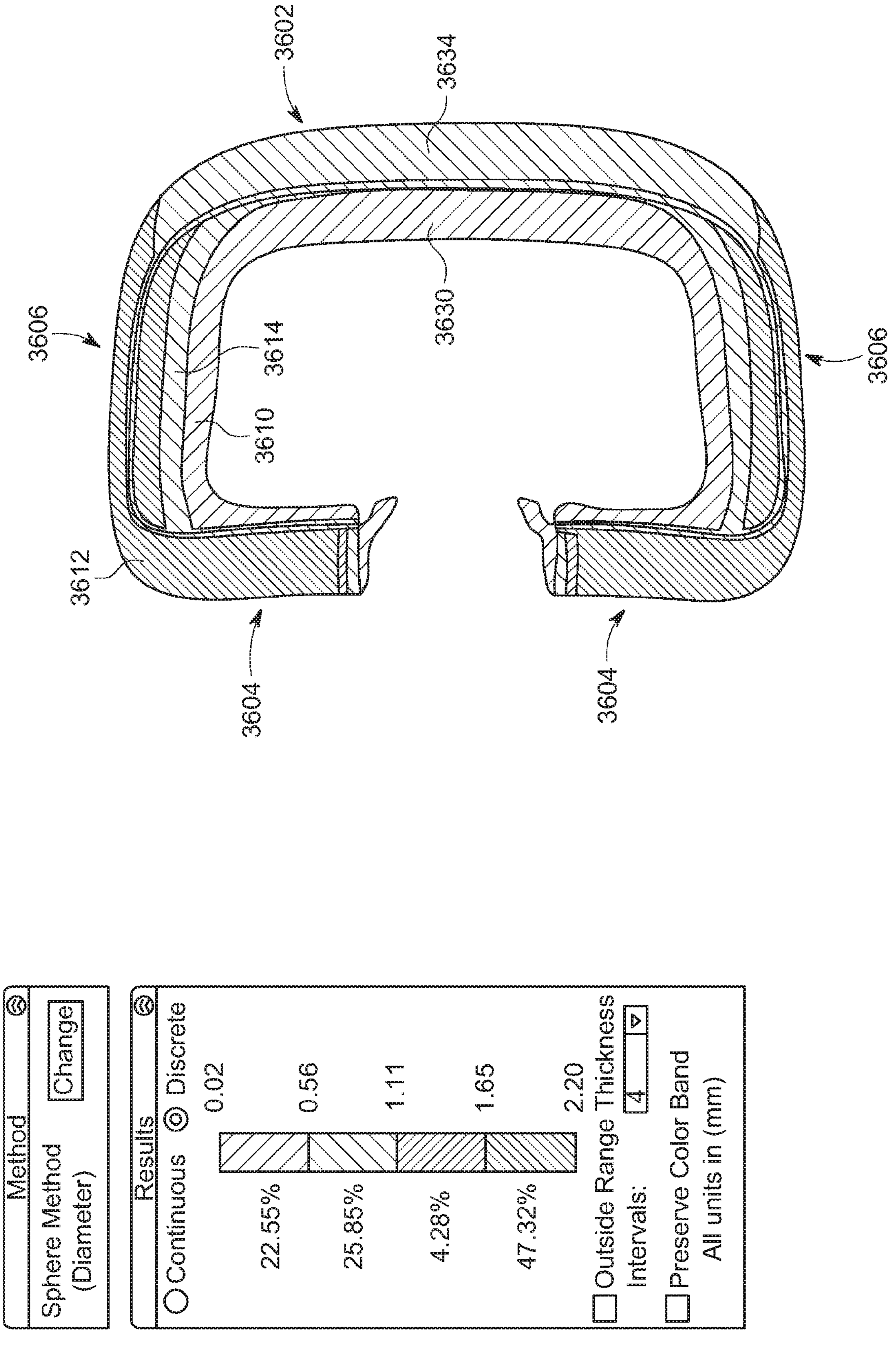
Figure 15I:
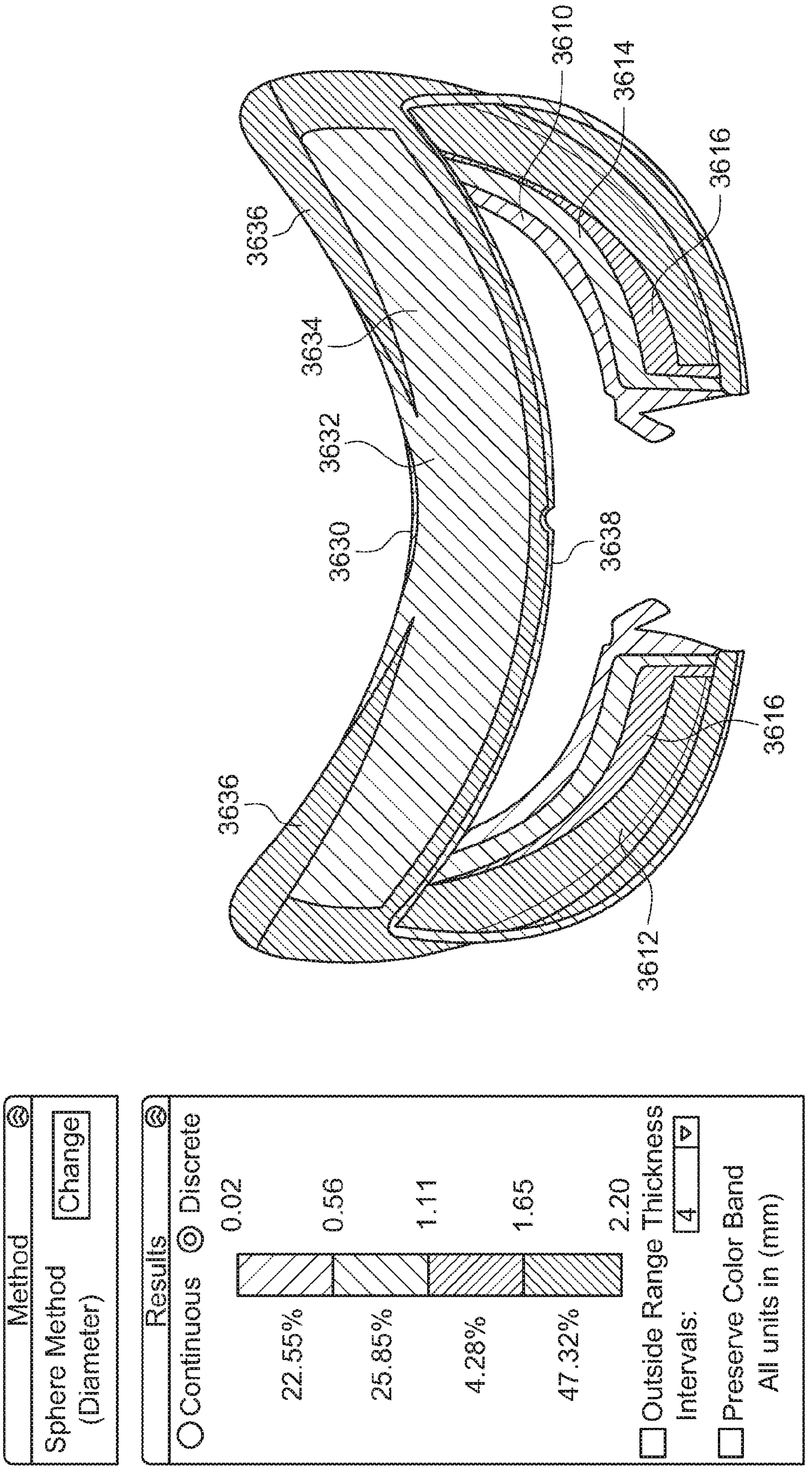
Figure 15J:
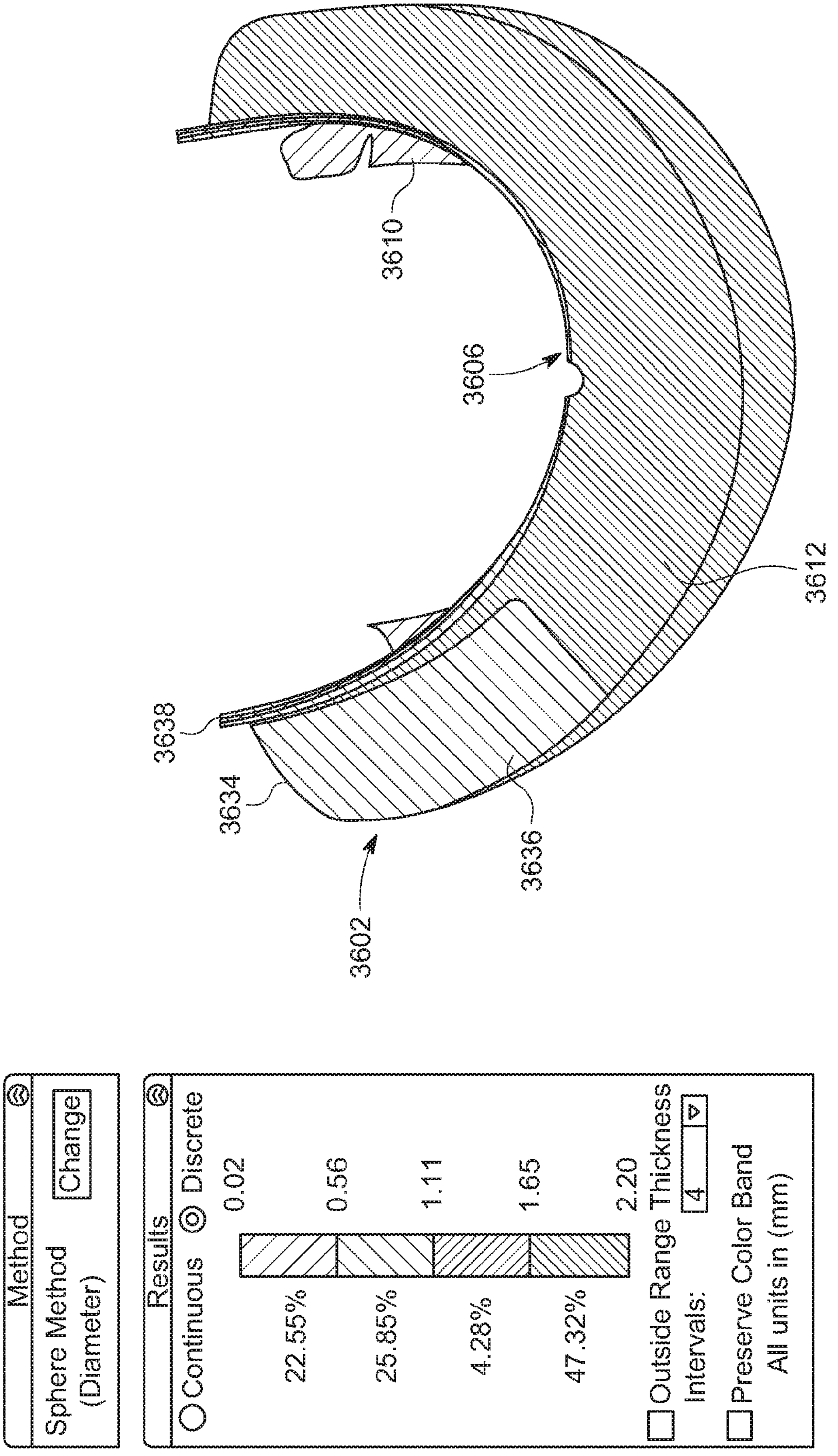
Figure 15K:
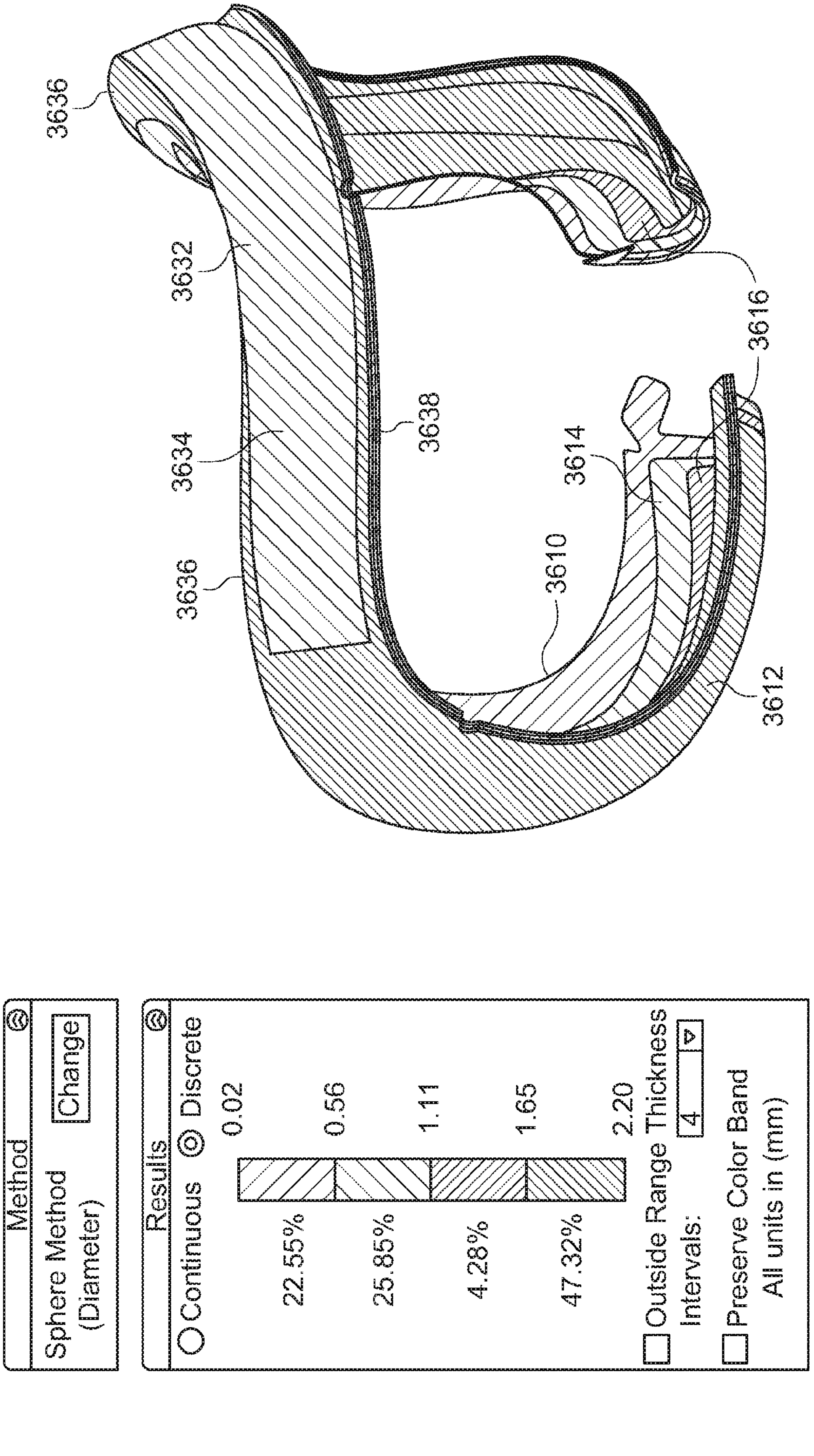

In another example, with reference to FIG. 14E, the face engaging portion 3504 comprises an overlapping portion 3516 secured to the rigid support portion 3502. The cushion cover 3512 may overlay the foam cushion 3510 and at least a portion of the support flange 3506. In an example, the edge of the cushion cover 3512 may sit proximal to the rigid support portion 3502. In alternative examples, the cushion cover 3512 may be connected to the rigid support portion 3502.

In some forms of the present technology, an interfacing structure may be provided in which support structure and face engaging portions of the interfacing structure may be integrally formed as a single component comprising varying thicknesses so as to provide the desired levels of rigidity and/or cushioning effect at the face engaging surfaces.

For example, FIGS. 15A to 15E show an integrally formed interfacing structure 3600 generally comprising a forehead portion 3602, two cheek portions 3604, and two side portions 3606 proximate the user's sphenoid regions in use and connecting the forehead portion 3602 to the respective cheek portions 3604. A tab 3608 extends from a free end of each cheek portion 3604. The interfacing structure 3600 comprises a plurality of regions of varying thickness. A first region 3610 extends around the inner periphery of the interfacing structure 3600—i.e. the edge of the interfacing structure 3600 closest to the user's face. A second region 3612 extends around the outer periphery of the interfacing structure 3600. A third region 3614 extends around the inner periphery of the interfacing structure 3600, positioned between the first region 3610 and the second region 3612. Fourth regions 3616 are provided in each cheek portion 3604, bounded by the first region 3610 and the third region 3614. In this example, the first region 3610 has a greater thickness (for example about 2 mm) than the fourth regions 3616 (for example about 1.5 mm). The fourth regions 3616 have a greater thickness than the third region 3614 (for example about 1 mm). The third region 3614 has a greater thickness than the second region (for example about 0.7 mm).

FIGS. 15F to 15K show another example of an integrally formed interfacing structure 3600. The first region 3610 comprises a posterior forehead portion 3630 in the forehead portion 3602, extending in a superior direction from the inner periphery of the interfacing structure 3600. The third region 3614 comprises a superior forehead portion 3632 in the forehead portion 3602, extending over the centre of the forehead portion 3602 into an anterior forehead portion 3634. The second region 3612 comprises superior lateral portions 3636, each extending from a respective side portion 3606 towards the superior forehead portion 3632, and an outer periphery forehead portion 3628 which in use is secured relative to a more rigid support (for example, a chassis). The relative thicknesses of the regions may be seen from the coded scale provided.

In the example shown in FIGS. 15A to 15E, the width of the first region 3610 is wider through the forehead portion 3602 than at the cheek portions 3604, or side portions 3606. Further, the width of the second region 3612 is greater through the forehead portion 3602 than at the cheek portions 3604.

In some forms of the present technology, an interfacing structure may be provided in which the face engaging portion of the interfacing structure is configured to be biased towards engagement with a user's face, in use. In embodiments, only selected regions of the face engaging portion may be biased towards engagement with a user's face. In embodiments, the interfacing structure may be shaped such that, when unloaded, regions of the face engaging portion extend towards the user at an angle non-parallel to the surface of the user's face with which the face engaging portion is intended to engage. With reference to FIG. 16A, the interfacing structure 3700 comprises a support flange 3702, supporting an integral face engaging flange 3704 engaging the user's face 3706 in use. At least a portion of the cross-section of the interfacing structure 3700 may be shaped to be "pre-loaded"—i.e. biased towards the user's face when brought into engagement. For example, a resting position (indicated by dashed line 3708) of the face engaging flange 3704 may be such that the face engaging flange 3704 is non-parallel with the user's face (indicated by dashed line 3710), angled towards the user. This may assist with encouraging engagement with the user's face, and friction between the interfacing structure 3700 and the user.

In embodiments it may be desirable to provide such "pre-loading" in select regions. Referring to FIG. 16B, a first region 3712 of the user's face may typically be recessed. Such recessed areas may be prone to permitting light to enter through gaps between the user's face and the interfacing structure 3700. As such, a corresponding first interface region 3714 of the interfacing structure 3700 may be shaped to bias the face engaging flange 3704 towards engagement with the user's face in the first region 3712. Conversely, a second region 3716 of the user's face may typically protrude and be prone to discomfort cause by pressure from the interfacing structure 3700. A corresponding second interface region 3718 of the interfacing structure 3700 may be shaped to avoid biasing the face engaging flange 3704 towards engagement with the user's face in the first region 3712, or at least to a reduced extent in comparison with the first interface region 3714.

5.9 Airflow Through Interfacing Structure

In some forms of the present technology, an interfacing structure may comprise a chassis configured to permit airflow into, and from, the space between the interfacing structure and the user. Heat may be generated during use, for example, as the result of user activity, and/or emitted from the electronic components of the head-mounted display unit 1200. This heat may build up within this space and cause discomfort to the user. Enabling airflow to and from this space may assist with providing a cooling effect for the user.

In an example, with reference to FIG. 17A, the interfacing structure 3800 may comprise a chassis 3802 comprising a main chassis portion 3804 configured to extend laterally across the user's face in use, and side chassis portions 3806 configured to extend a generally posterior direction. The chassis 3802 comprises an opening 3808 (i.e. a chassis airflow port) between the main chassis portion 3804 and each side chassis portion 3806. A face engaging portion 3810 is provided to the chassis 3802.

Referring to FIG. 17B, a display unit 3820 having a display unit housing 3822 is shown being worn by the user.

Air may flow through the opening 3808 and between the display unit housing 3822 and face engaging portion 3810.

In examples, reinforcing may be provided between the main chassis portion 3804 and each side chassis portion 3806. For example, as shown in FIG. 17C, the chassis 3802 may comprise one or more reinforcing members span between the main chassis portion 3804 and side chassis portion 3806.

FIGS. 17D and 17E show another example of a display unit 3820 having an interfacing structure 3800 comprising a chassis 3802 configured to permit airflow into the space between the interfacing structure 3800 and the user. In this example, the chassis 3802 is configured to be secured to a mounting plate 3824 of the display unit 3820, the mounting plate 3284 having a generally flat configuration and extending laterally across the user's face in use. Side chassis portions 3806 extend in a generally posterior direction from the mounting plate 3824, towards the sides of the user's head.

A face engaging portion 3810 is provided to the chassis 3802. In an example, the face engaging portion 3810 may be a singular structure, such as described with reference to FIGS. 15A to 15E, constructed from a flexible and resilient material such as an elastomer, while the chassis may be constructed of a more rigid material.

In examples, the face engaging portion 3810 may be integral with the chassis 3802 to provide a singular component. The singular component comprising the face engaging portion 3810 and the chassis 3802 may be releasably fastened to the display unit 3820, such as to the mounting plate 3284. For example, a releasable fastening arrangement may be provided comprising one or more of: hook-and-loop fastening means, magnetic fastening means, and clips or retainers that allow a friction, interference, snap or other mechanical fixing arrangement.

The chassis 3802 comprises a lateral opening 3808 in each side chassis portion 3806. One or more gaps between the housing of the display unit 3820 and the interfacing structure 3800 permit air to flow through the lateral openings 3808 to and from the external environment (as indicated by the dashed arrows in FIG. 17D and FIG. 17E).

In examples, one or more superior openings may be provided in the chassis 3802, permitting airflow between the external environment and the space within the interfacing structure 3800. In examples, one or more inferior openings may be provided in the chassis 3802, permitting airflow between the external environment and the space within the interfacing structure 3800. In examples, the chassis 3802 may comprise one or more of: a lateral opening 3808, a superior opening, and an inferior opening.

5.10 Inwardly Biased Interfacing Structure

FIG. 18A shows an interfacing structure 3800 according to another example of the present technology. Similarly to the interfacing structure 3800 described above with reference to FIGS. 17A-17C, the interfacing structure 3800 comprises a chassis comprising a main chassis portion 3804 configured to extend laterally across the user's face in use, and side chassis portions 3806 configured to extend in a generally posterior direction. Each side chassis portion 3806 extends in a generally posterior direction from a respective lateral side of the main chassis portion 3804. The interfacing structure 3800 further comprises a face engaging portion 3810 connected about at a periphery of the chassis 3804, the face engaging portion 3810 configured to contact the user's face in use.

In this example, each of the side chassis portions 3806 is biased medially towards the user's head to bias the face engaging portion 3810 into contact with the user's head on each side of the user's head at or proximate the user's sphenoid bone. That is, the side chassis portions 3806 are biased inwards to cause the face engaging portion 3810 to engage lateral-facing surfaces of the user's head lateral to eyes (e.g. at or proximate the user's sphenoid bone).

The chassis 3802 may be flexible (e.g. as a whole or having particular flexible portions) allowing the side chassis portions 3806 to be spread laterally to a splayed configuration by the user's head and biased medially towards an unsplayed configuration in use. The side chassis portions 3806 may be flexible so as to flex or pivot with respect to the main chassis portion 3804 allowing the side chassis portions 3806 to be spread laterally to a splayed configuration by the user's head and biased medially towards an unsplayed configuration in use.

In some examples, the side chassis portions 3806 are able to flex or pivot with respect to the main chassis portion 3804 allowing the side chassis portions 3806 to be spread laterally to a splayed configuration by the user's head and biased medially towards an unsplayed configuration in use, each side chassis portion 3806 biased medially by a biasing component.

The biasing component may comprise a spring element configured to pull each side chassis portion 3806 medially. In other examples, the biasing component comprises a spring element configured to push each side chassis portion 3806 medially.

The face engaging portion 3810 may have one of the configurations described herein in relation to a portion of an interfacing structure which engages the user's face. The face engaging portion 3810 may comprise a face engaging flange. The face engaging flange may curve inwardly from the chassis 3804. The face engaging flange is formed from silicone.

In some examples, the chassis 3802 comprises at least one opening 3808 between the main chassis portion 3804 and each side chassis portion 3806. In some examples the head-mounted display unit 1200 comprises a display unit housing, and an air pathway is provided between the interfacing structure 3800 and the display unit housing through the at least one opening 3808.

5.11 Positioning and Stabilising Structure that Connects to Interfacing Structure In some examples of the present technology, a head-mounted display system 1000 comprises a positioning and stabilising structure 1300 (e.g. one or more straps) that connects to an interfacing structure 3800 of the head-mounted display unit 1200 of the head-mounted display system 1000 (e.g. straps connect to the interfacing structure 3800 instead of a display unit housing 1205).

FIGS. 18B-18C show a positioning and stabilising structure 1300 for a head-mounted display system 1000 connected to an interfacing structure configured to contact the user's face in use. The positioning and stabilising structure 1300 in this example comprises a posterior support portion 1350 configured to engage a posterior portion of a user's head and a pair of strap portions 1332, 1334 connected to the posterior support portion 1350 and configured to connect to the interfacing structure 3800 of a head-mounted display unit. FIG. 18D shows an example in which lateral strap portions 1330 connect to an interfacing structure 3800.

5.12 Positioning and Stabilising Structure that Pulls Sides Inwards

FIGS. 18B-18C show head-mounted display systems 1000 (with most components of the head-mounted display unit 1200 not shown save for the interfacing structure 3800)

according to examples of the present technology. In each example the interfacing structure 3800 comprises a chassis 3802 comprising a main chassis portion 3804 configured to extend laterally across the user's face in use, and a pair of side chassis portions 3806 each configured to extend in a generally posterior direction from a respective lateral side of the main chassis portion 3804. A face engaging portion 3810 is connected about a periphery of the chassis 3802, the face engaging structure 3810 configured to contact the user's face in use.

The head-mounted display systems 1000 each further comprise a positioning and stabilising structure 1300 comprising a posterior support portion 1350 configured to engage a posterior portion of a user's head, and a pair of lateral strap portions configured to connect the posterior support portion 1350 and the head-mounted display unit 1200 in use. In the example shown in FIGS. 18B and 18C, the pair of lateral strap portions comprises a pair of upper lateral strap portions 1332 and a pair of lower lateral strap portions 1334. In the example shown in FIG. 18D, the pair of lateral strap portions comprises a lateral strap portion 1330 on each side of the user's head.

In each example, the positioning and stabilising structure 1300 is connected to the head-mounted display unit 1200 such that in use the side chassis portions 3806 are urged medially towards the user's head by the lateral strap portions, to urge the face engaging portion 3810 into contact with the user's head on each side of the user's head at or proximate the user's sphenoid bone.

As illustrated, each lateral strap portion may be configured to connect to a respective one of the side chassis portions 3806. Each lateral strap portion may be configured to pull the respective side chassis portion 3806 rearwardly causing the side chassis portion 3806 to flex or pivot medially to urge the face engaging portion 3810 into contact with the user's head at or proximate the user's sphenoid bone.

In other examples, each lateral strap portion may be configured to push the respective side chassis portion 3806 medially causing the side chassis portion 3806 to flex or pivot medially to urge the face engaging portion 3810 into contact with the user's head at or proximate the user's sphenoid bone. For example, each lateral strap portion may be configured to push the respective side chassis portion 3806 medially via a substantially rigid member (e.g. an arm) or a portion of the side chassis portion 3806 in contact with the lateral strap portion.

As shown in FIG. 18D, the posterior support portion 1350 may comprise a parietal strap portion 1310 configured to overlie the parietal bones of the user's head in use and an occipital strap portion 1320 configured to overlie or lie below an occipital bone of the user's head in use. In some examples. the posterior support portion 1350 comprises a loop strap portion having a superior portion overlying the parietal bones of the user's head and an inferior portion overlying the occipital bone of the user's head.

As shown in FIGS. 18B and 18C, as described above, the pair of lateral strap portions comprises a pair of upper lateral strap portions 1332 each configured to connect between the posterior support portion 1350 and the head-mounted display unit 1200 (only the interfacing structure 3800 thereof visible) on a respective side of the user's head in use and a pair of lower lateral strap portions 1334 each configured to connect between the posterior support portion 1350 and the head-mounted display unit 1200 (only the interfacing structure 3800 thereof visible) on a respective side of the user's head in use. In this example, the upper lateral strap portions 1332 are each configured to apply a force to the head-mounted display unit 1200 having both a superior and posterior component. In some examples, the lower lateral strap portions 1334 are each configured to be removably connected to a respective side chassis portion 3806 with a magnetic connection.

5.13 Interfacing Structure Comprising Two or More Components

In some forms of the present technology, an interfacing structure may comprise a chassis, wherein one or more of a support portion and/or a face engaging portion of the interfacing structure, or portions thereof, may be releasably attached to the chassis.

It is envisaged that the ability to releasably attach the support portion and/or face engaging portion may assist with one or more of: cleaning of the interfacing structure, replacement of components thereof, and/or selection of characteristics of the components (for example, level of hardness or softness, surface finish or material, shape, and/or size).

In an example, the releasably attached portion of the interfacing structure may be provided at discrete locations to the chassis, i.e. may not extend along the entire periphery of the chassis. For example, the releasably attached portion(s) may be provided in one or more of: a forehead region, and/or one or more cheek regions, of the interfacing structure. In alternative examples the releasably attached portion of the interfacing structure may be provided to the entire periphery of the chassis, or at least a substantial portion thereof.

In examples, a releasably attached portion of the interfacing structure may be made of one or more of: a foam material, an elastomeric material, a textile material, or a composite material.

In an example, the interfacing structure may comprise at least one elastomeric portion, and at least one foam portion. In an example, the at least one foam portion may be attached to the interfacing structure such that the elastomeric portion covers the foam portion to provide a face engaging surface. In an example, the at least one foam portion may be attached to the chassis, the elastomeric portion, or both the chassis and the elastomeric portion.

In examples, a portion of the support portion and/or face engaging portion of the interfacing structure may be permanently attached to the chassis (e.g. integrally moulded) at select locations. Spaces may be provided in which the removeable portions may be positioned and attached relative to the chassis.

5.14 Interfacing Structure Comprising Foam Components

In some forms of the present technology, an interfacing structure may comprise a face engaging portion supported by a more rigid support portion, wherein the face engaging portion comprises a first foam portion and the support portion comprises a second foam portion.

Figure 44C:
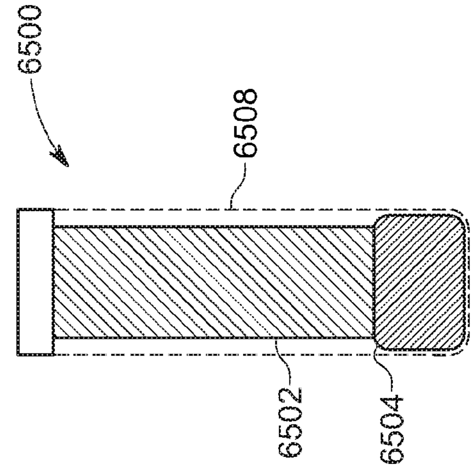
Figure 44B:
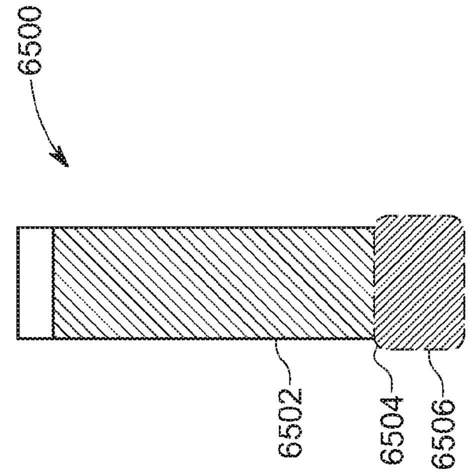
Figure 44A:
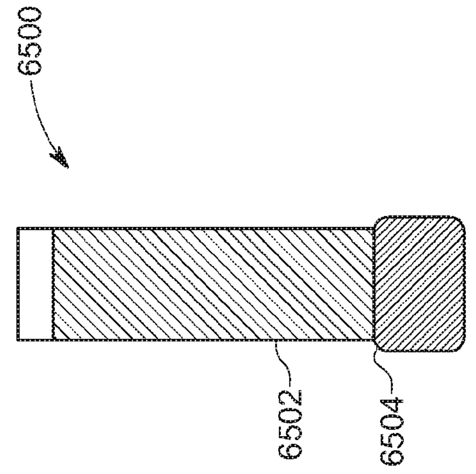

For example, with reference to FIG. 44A, the interfacing structure 6500 may comprise a support portion 6502, made of a first foam, to which a face engaging portion 6504 may be provided—the face engaging portion 6504 being made of a second foam. The first foam may be configured to provide greater rigidity than the second foam, with the support portion 6502 acting to maintain the position of the softer face engaging portion 6504, which provides a comfortable point of contact to the user.

In examples, the first foam and the second foam may be made of the same material, but at different densities. In examples the first foam may have a first density, and the second foam may have a second density lower than the first density. In examples, the foam may be a viscoelastic foam or polyurethane foam.

In examples the face engaging portion 6504 may comprise a raw foam. In examples, e.g. as illustrated by FIG. 44B the face engaging portion 6504 may comprise a textile-foam composite (e.g. a foam core with a textile outer layer 6506), or a flocked foam, to provide a soft point of contact for the user's skin.

Figure 44D:
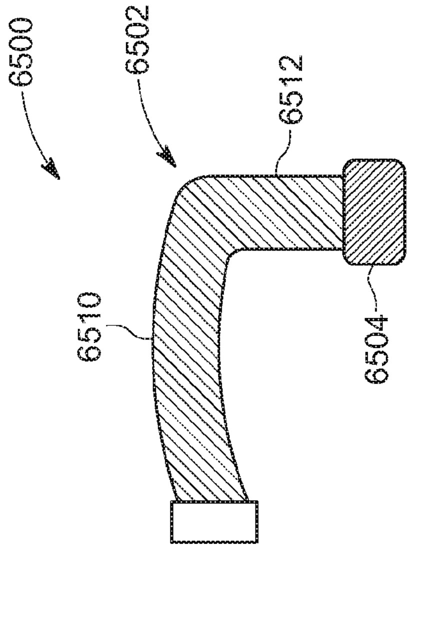

In examples, as shown in FIG. 44D, the support portion 6502 may include a first support portion 6510 extending in a first direction, and a second support portion 6512 extending from the first support portion 6510 in a second direction. For example, the first support portion 6510 may extend in a generally radial direction across the face of the user, while the second support portion 6512 may extend in a generally posterior direction towards the face of the user.

In some forms of the present technology, an interfacing structure may comprise a support portion and a face engaging portion integrally formed as a single component, the support portion and the face engaging portion being made of a foam material.

For example, with reference to FIG. 45A, the interfacing structure 6600 may comprise a support portion 6602 from which a curved face engaging portion 6604 extends. In the example illustrated, a recurve transition between the support portion 6602 and the face engaging portion 6604 produces a generally hook shaped cross-section.

In examples, the integral form of the support portion 6602 and the face engaging portion 6604 may be thermoformed.

In examples the interfacing structure 6600 may comprise a raw foam. In alternative examples, e.g. as illustrated by FIG. 45B the interfacing structure 6600 may comprise a textile-foam composite (e.g. a foam core with a textile outer layer 6606), or a flocked foam, to provide a soft point of contact for the user's skin.

5.15 Interfacing Structure Comprising at Least One Closed Loop Portion

In some forms of the present technology an interfacing structure may comprise a flexible and resilient face engaging portion, the face engaging portion having a curved cross-section, wherein the face engaging portion comprises at least one closed loop portion having an enclosed cross-section.

Figure 59A:
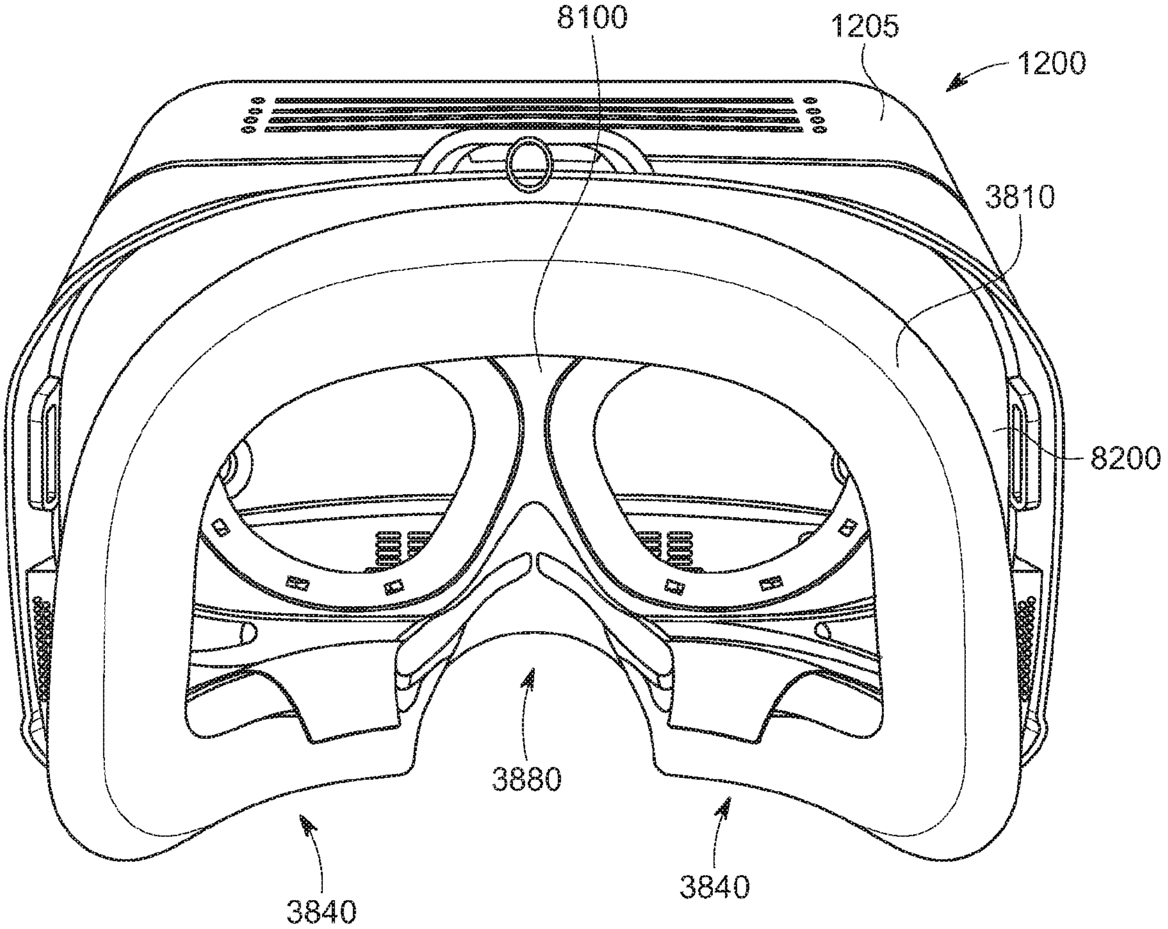
Figure 59B:
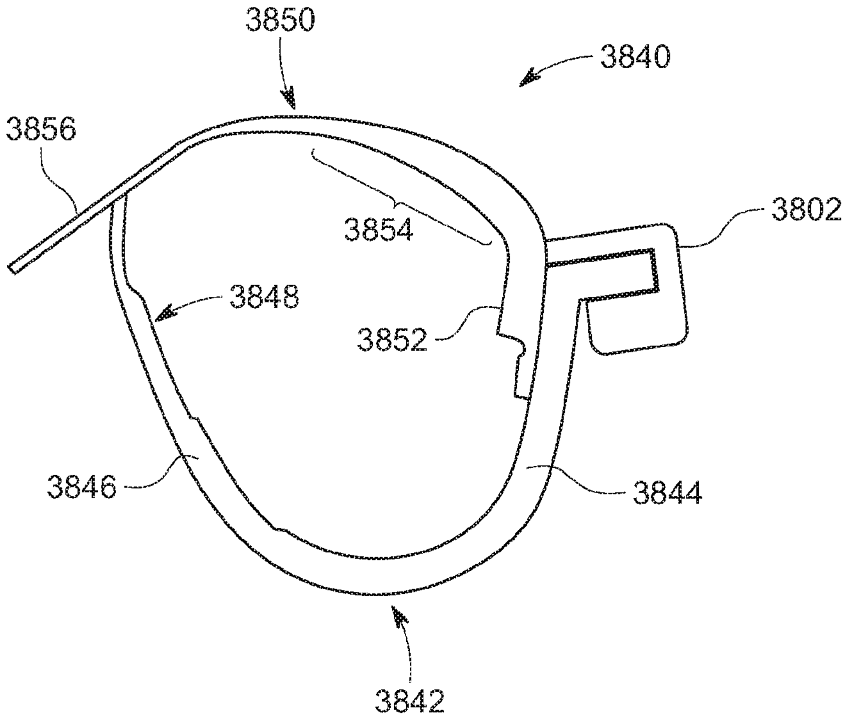

For example, with reference to FIG. 59A and FIG. 50B, the face engaging portion 3810 comprises cheek portions 3840, provided on respective sides of the user's nose in use. The cheek portions 3840 comprise a base portion 3842, having an anterior portion 3844 connected to chassis 3802, which curves around into a posterior portion 3846 that provides a user contact surface.

The cheek portions 3840 further comprise a loop portion 3850. In this example, the loop portion 3850 comprises an anterior loop portion 3852, which is secured to the anterior portion 3844 of the base portion 3842 (for example, using an adhesive). The loop portion 3850 further comprises an arcuate portion 3854 extending in the posterior direction from the anterior loop portion 3852. The loop portion 3850 further comprises a loop flange 3856 extending from the arcuate portion 3854 in the posterior direction. The cross-section of the arcuate portion 3854 tapers off between the arcuate portion 3854 and the loop flange 3856. While not illustrated, the loop flange 3856 is inserted into the base portion 3842, and secured to the anterior facing surface 3848 of the anterior portion 3846. In doing so, the loop flange 3856 overlaps the base portion 3842 to provide a closed loop.

In the example illustrated, the base portion 3842 and the loop portion 3842 are manufactured as separate parts and are secured together via anterior loop portion 3852. In an alternative example the anterior loop portion 3852 may be integrally formed with the base portion 3842 (i.e. the loop portion 3850 would extend from the base portion 3842).

5.16 Interfacing Structure Comprising a Light-Blocking Nasal Portion

In some forms of the present technology an interfacing structure may comprise a face engaging portion, wherein the face engaging portion comprises a light-blocking nasal portion spanning between cheek portions of the face engaging portion.

Figure 59C:
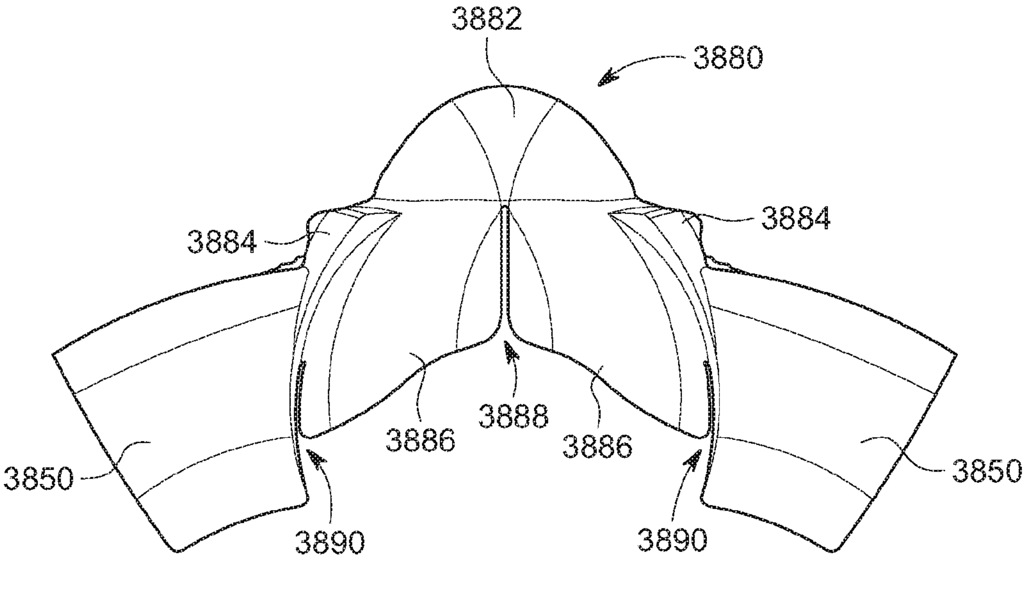
Figure 59D:
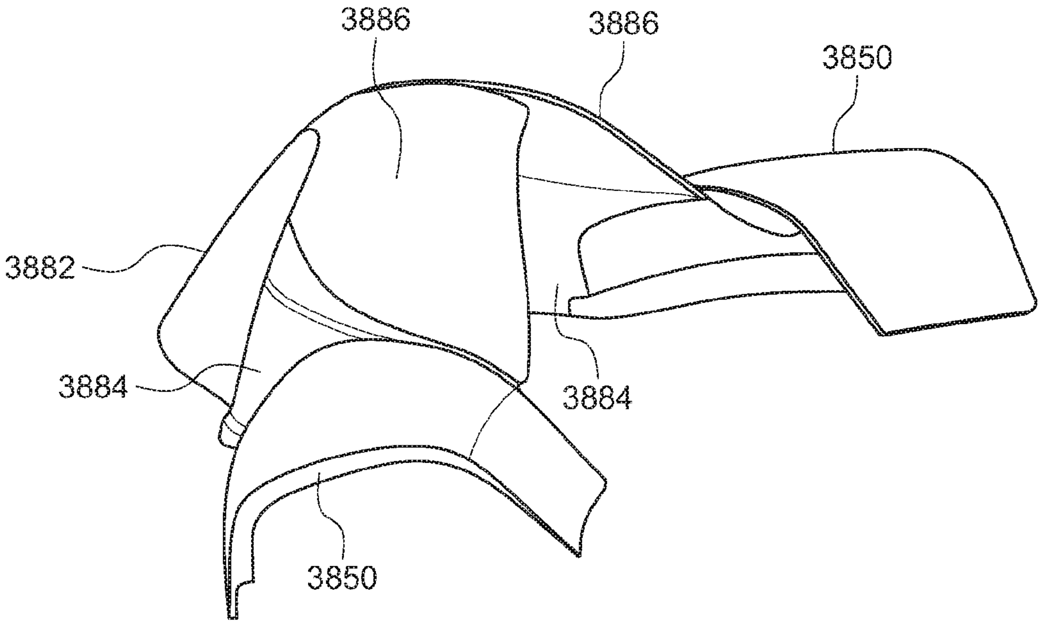

For example, with reference to FIG. 59A, FIG. 59C, and FIG. 59D, the face engaging portion 3810 comprises a nasal portion 3880 spanning between cheek portions 3840. The nasal portion 3880 comprises a pronasale portion 3882 extending radially and in a superior direction over the pronasale of the user's nose, in use. In this example, the pronasale portion 3882 is connected to the loop portions 3850 by ala portions 3884.

The nasal portion 3880 comprises a first and second bridge portions 3886 extending in a superior direction from the pronasal portion 3882. A central slot 3888 extends between the bridge portions 3886 from a posterior edge of the nasal portion 3880 towards the pronasale portion 3882. Outer slots 3890 are provided between the bridge portions 3886 and the loop portions 3850, extending to the ala portions 3884. As a result, the bridge portions 3886 act like flaps, and rest on the sides of the user's nose bridge in use. Lifting of the bridge portions 3886, when resting on the user, encourages overlapping of the bridge portions to encourage the light blocking effect.

5.17 Interfacing Structure Releasably Attached Relative to Head-Mounted Display Unit In some forms of the present technology an interfacing structure may comprise a face-engaging portion configured to engage the user's face in use, and a chassis connected to the face-engaging portion, the chassis releasably attached to a chassis mounting portion of the head-mounted display unit.

For example, with reference to FIGS. 59E-59H, a chassis 8000 comprises a main body 8001 having a forehead portion 8002, cheek portions 8004, side portions connecting the forehead portion 8002 and the cheek portions 8004, and a nasal portion 8008 bridging between the cheek portions 8004 in an anterior direction. Each side portion 8006 of the chassis 8000 comprises a chassis catch portion 8010.

Figure 59E:
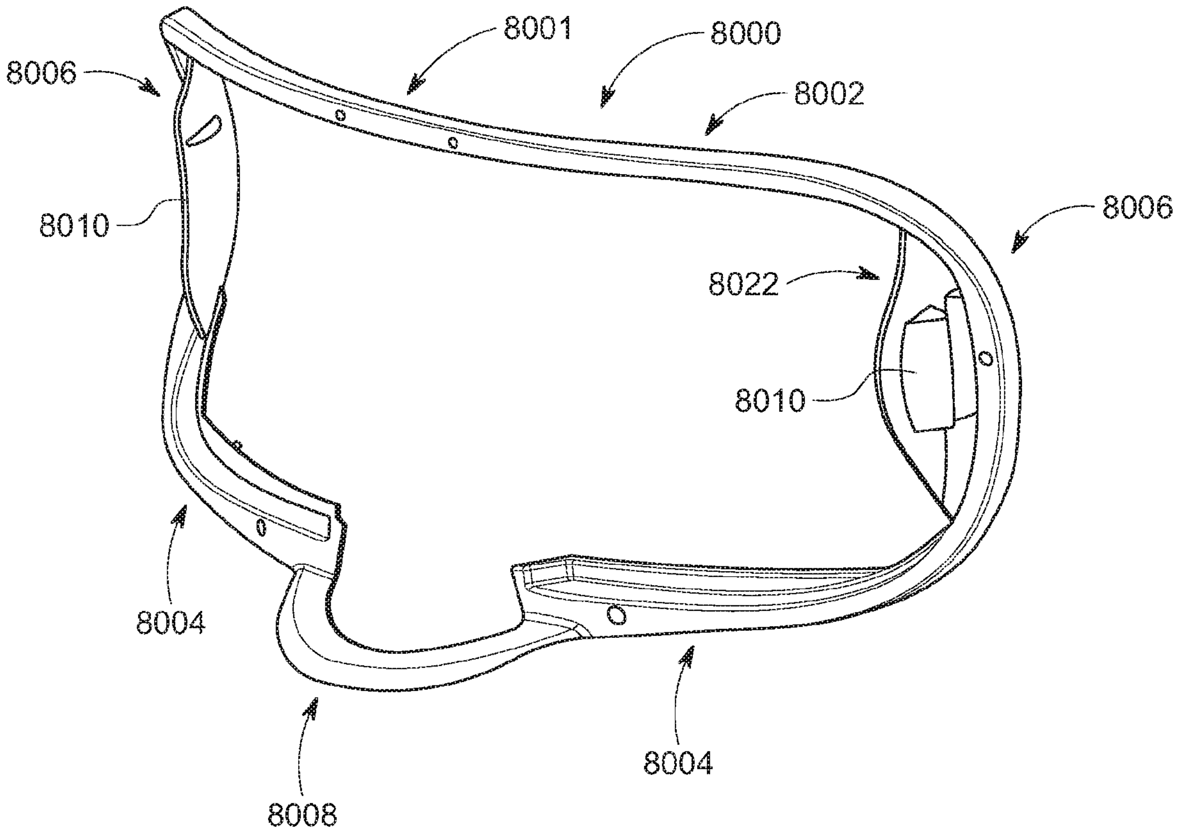
Figure 59F:
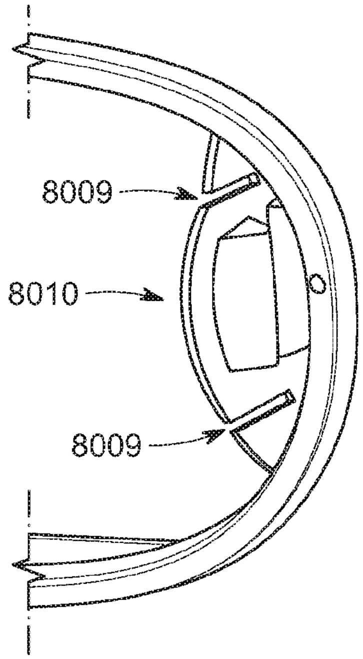
Figure 59G:
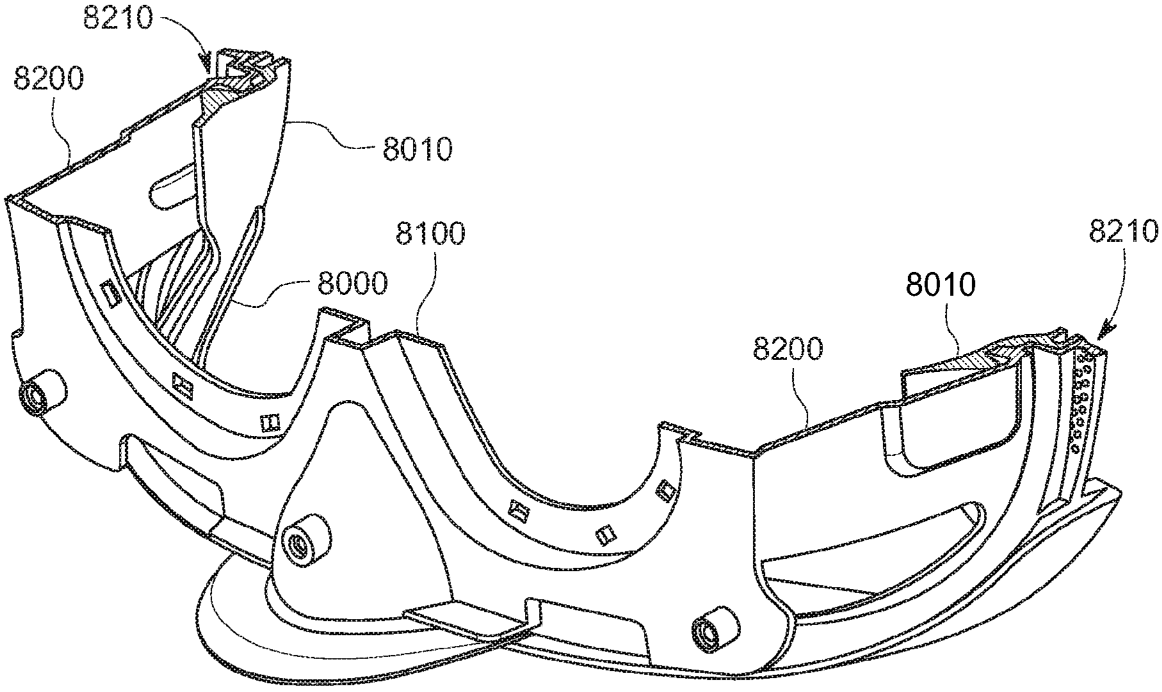

Referring to FIG. 59E, in this example a catch flange 8022 of the chassis catch portion 8010 extends substantially the distance between the forehead portion 8002 and cheek portion 8004 in the superior-inferior direction, connected. In an alternative example, as shown in FIG. 59F, the catch flange 8022 may only extend a part of this span (as indicated by slots 8009).

In the example illustrated, the head-mounted display unit 1200 comprises a mounting plate 8100 having an integral chassis mounting portion 8200 extending in a posterior direction. In alternative examples, the chassis mounting portion 8200 may be provided as a separate part, secured to the mounting plate 8100. The chassis mounting portion 8200 comprises mounting catch portions 8210 configured to engage the chassis catch portions 8010 to releasably attach the chassis 8000 to the chassis mounting portion 8200.

Figure 59H:
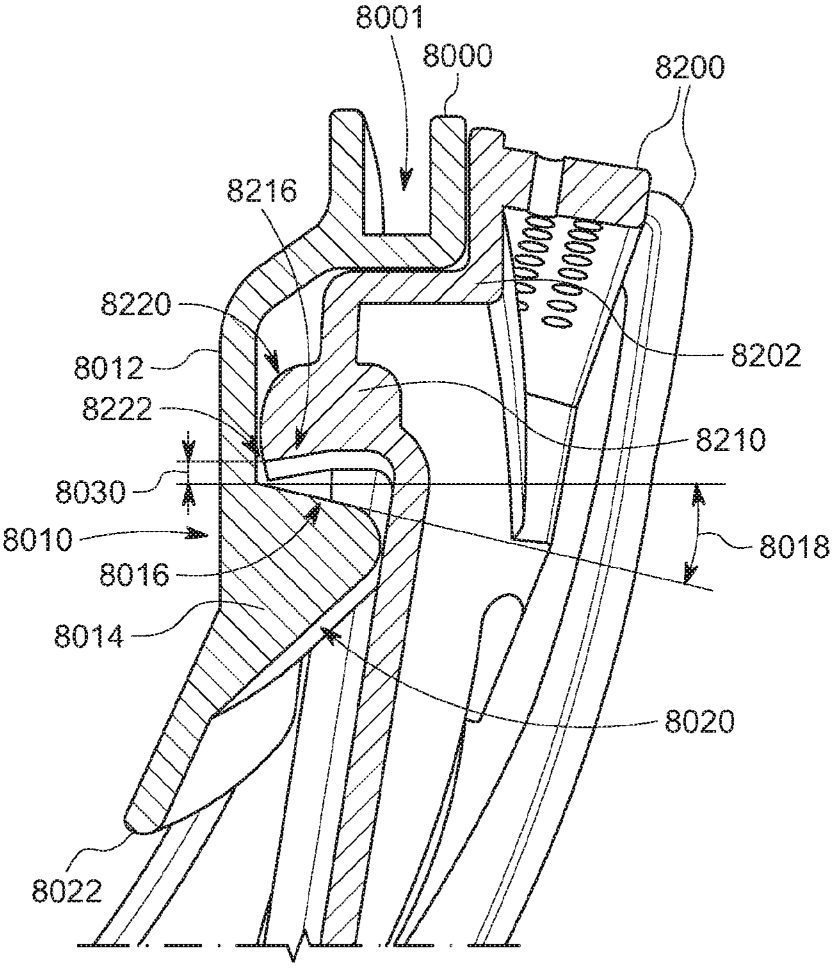
Figure 60A:
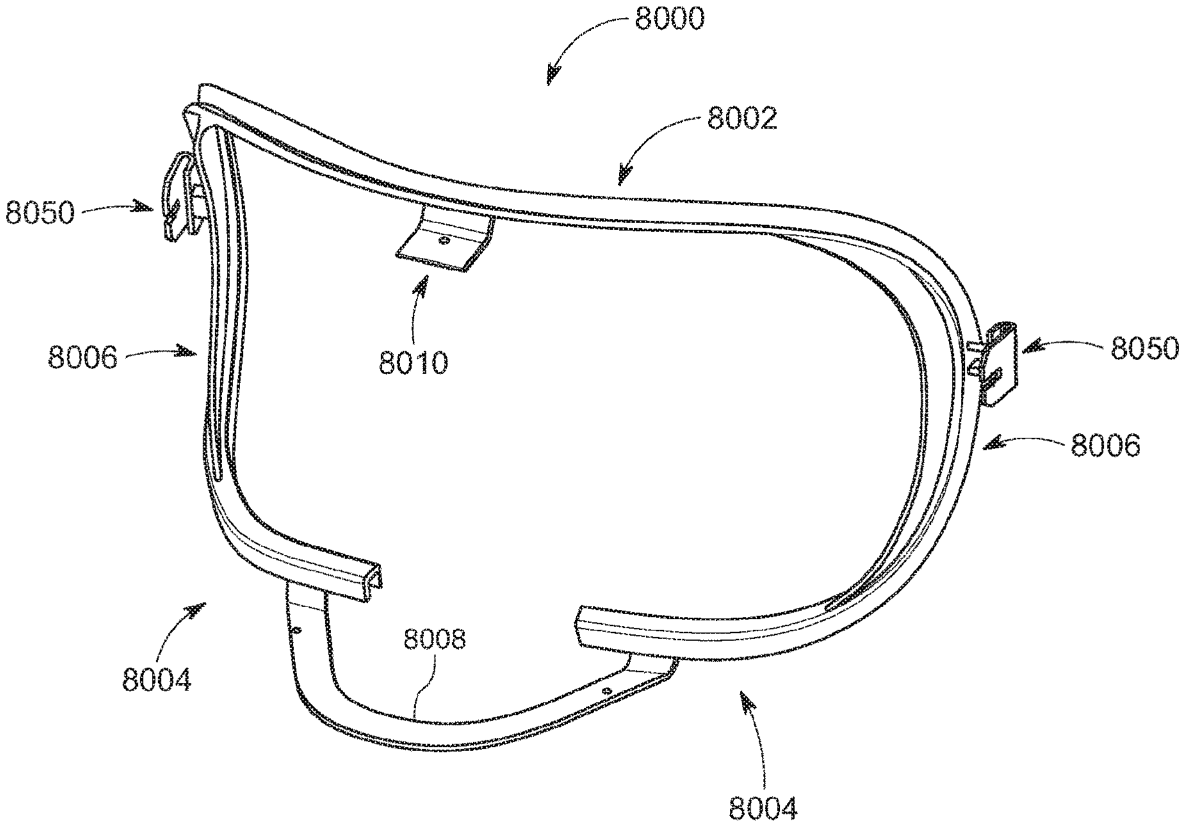
Figure 60B:
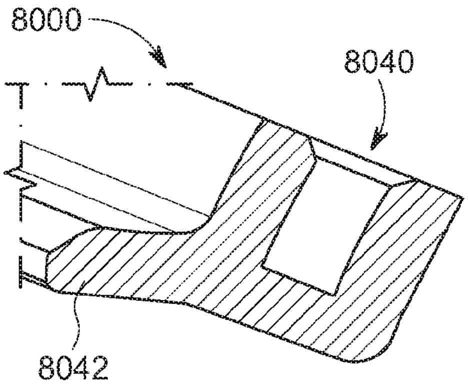
Figure 60C:
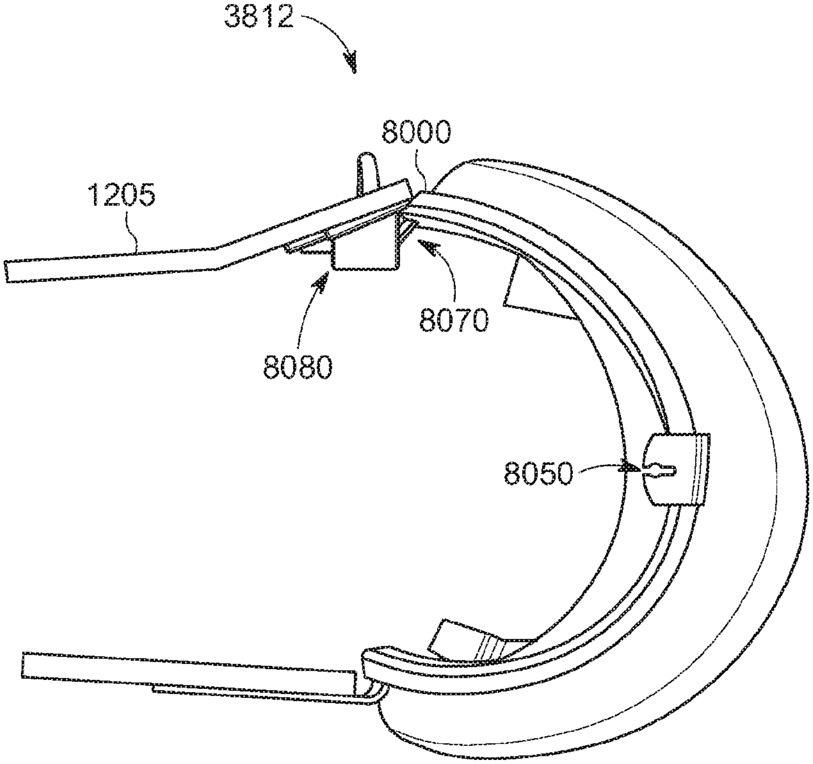
Figure 60D:
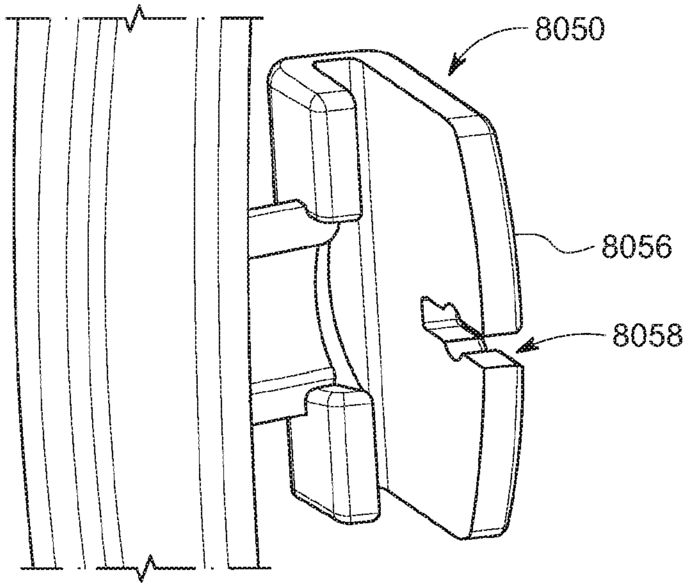
Figure 60E:
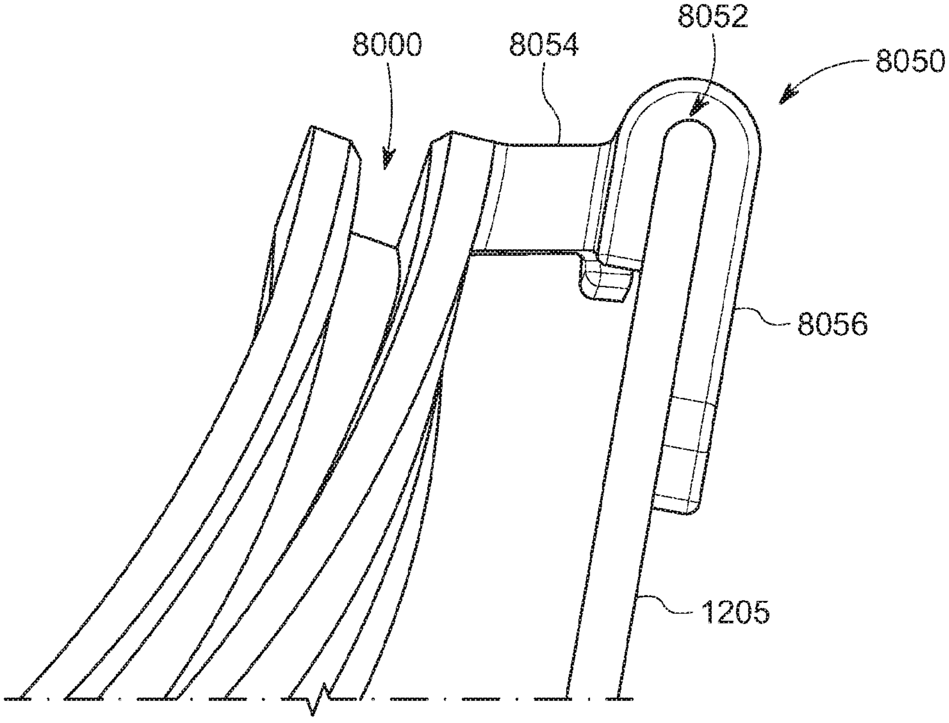
Figure 60F:
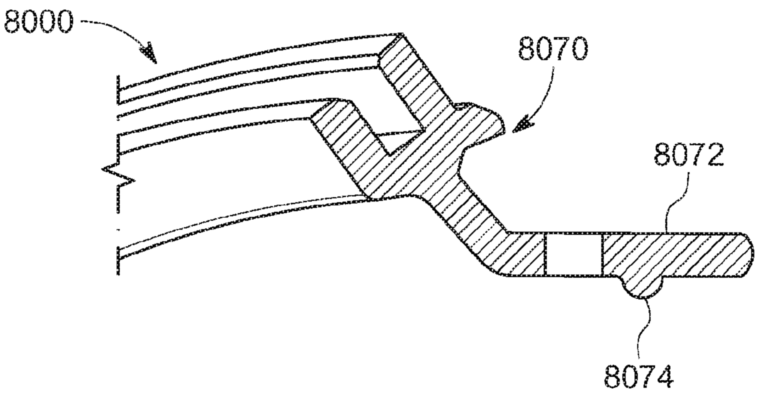
Figure 60G:
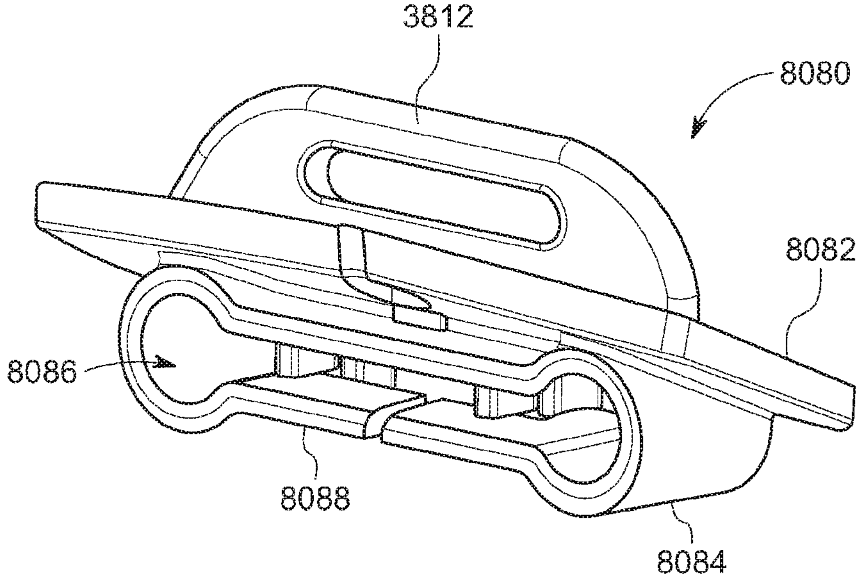
Figure 60H:
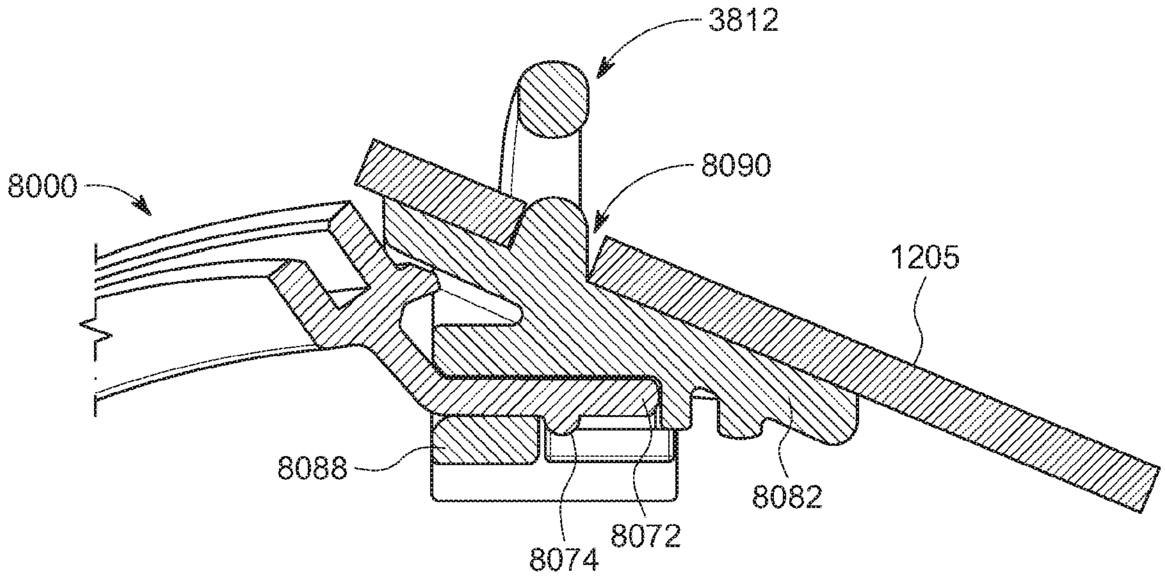

As shown in FIG. 59H, the main body 8001 of the chassis 8001 has a "U" channel cross-section. The chassis mounting portion 8200 comprises a chassis receiving portion in the form of "L" channel 8202. In use, the main body 8001 is inserted into channel 8202.

The chassis catch portion 8010 comprises a catch projection 8014. A catch arm extends from the main body 8001 to the catch projection 8014. The catch projection 8014 comprises a posterior facing catch surface 8016. The posterior facing catch surface 8016 is angled in a radially outward anterior direction (indicated by reference numeral 8018). The catch projection 8014 further comprises an anterior facing guide surface 8020, angled in a radially inward anterior direction from the posterior facing catch surface 8016. The catch flange 8022 extends in a radially inward anterior direction from the catch projection 8010.

The mounting catch portion 8210 comprises an anterior facing catch surface 8216, angled in a radially inward anterior direction. The mounting catch portion 8210 further comprises a posterior facing guide surface 8220, and a transition surface 8222 between the posterior facing guide surface 8220 and the anterior facing catch surface 8216. The transition surface 8222 is angled in a radially inward posterior direction from the anterior facing catch surface 8216, with an acute angle therebetween providing a catch edge 8222.

In use, the chassis 8000 is inserted into the chassis mounting portion 8200 in the anterior directions, with the anterior facing guide surface 8020 bearing against the posterior facing guide surface 8220 and causing the catch projection 8014 to ride over the mounting catch portion 8210 until the catch projection 8014 passes the transition surface 8222.

A gap 8030 is provided between the posterior facing catch surface 8016 and the anterior facing catch surface 8216 in the posterior-anterior direction, when the chassis 8000 is fully inserted into the chassis mounting portion 8200. The anterior facing catch surface 8216 (more particularly catch edge 8222) acts against the posterior facing catch surface 8016 to resist inadvertent release of the chassis 8000.

When the user desires to remove the chassis 8000, force may be applied to the catch flange 8022 in a radially inward direction and the chassis 8000 pulled in the posterior direction. The angle 8018 of posterior facing catch surface 8016, in conjunction with the force applied to the catch flange, encourages the catch projection 8014 to ride over the catch edge 8222 and release the chassis 8000.

FIGS. 60A-60G illustrate an alternative example of securing the chassis. In the example illustrated, the chassis 8000 comprises side connector portions 8050, and a forehead connector portion 8070. Portions of the chassis 8000 comprise a main body channel 8040, from which an external web 8042 extends.

In this example, the chassis 8000 is secured to the display unit housing 1205. The side connector portions 8050 comprise a receiver slot 8052 in which an edge of the display unit housing 1205 is received, with a standoff member 8054 maintaining a desired spacing between the chassis 8000 and the display unit housing 1205. An external flange 8056 of the side connector portions 8050 comprises a locating feature 8058 configured to interact with a compatible feature (not illustrated) of the display unit housing 1205.

The forehead connector portion 8070 is configured to interact with a forehead locator 8080 having a locator body member 8082 with a tab receiving portion 8084. The tab receiving portion 8084 comprises a receiving slot 8086 and an inferior slot member 8088. The forehead connector portion 8070 comprises a tab 8072 having a tab locating feature 8074. In use, the tab 8072 is inserted into the receiving slot 8086, with the inferior slot member 8088 acting against the tab locating feature 8074 to resist inadvertent withdrawal.

In this example, the forehead locator 8080 comprises an eyelet 3812, and the display unit housing 1205 comprises an eyelet slot 8090. The forehead locator 8080 is located relative the display unit housing 1205 by insertion of the eyelet 3812 through the eyelet slot 8090, and the chassis 8000 secured through insertion of the tab 8072 into the receiving slot 8086.

5.18 Ventilation of Interfacing Structure Via Tortuous Path

In some forms of the present technology a tortuous airflow path may be provided between an interior of the interfacing structure and an exterior of the head-mounted display unit, wherein the tortuous airflow path passes between an exterior of the interfacing structure and an interior of the display unit housing. As noted above, enabling airflow to and from the space within the interior of the interfacing structure may assist with providing a cooling effect for the user.

For example, with reference to FIGS. 61A-61G, posterior facing side gaps 8300 (i.e. chassis mounting ports) may be provided between the display unit housing 1205 and a chassis mounting portion 8200. The chassis mounting portion 8200 comprises radially facing airports 8210, opening into the space between the chassis mounting portion 8200 and the display unit housing 1205. This provides a tortuous airflow path between side gaps 8300 and the interior of the chassis mounting portion 8200—i.e. a circuitous path through which air may flow, but light is prevented from passing directly. Further light-blocking features are shown in the form of superior light blocking flange 8202 and inferior light blocking flange 8204, extending in a posterior direction to overlap the chassis 8000 in the cheek portions.

Alternative or additional airflow paths are also contemplated. For example, referring to FIG. 61E and FIG. 61F, a forehead gap 8302 may be provided into a forehead region 8304 between the display unit housing 1205 and the chassis mounting portion 8200. Forehead airports 8212 in the chassis mounting portion 8200 may encourage airflow along this path (and/or through side gaps 8300).

Figure 61A:
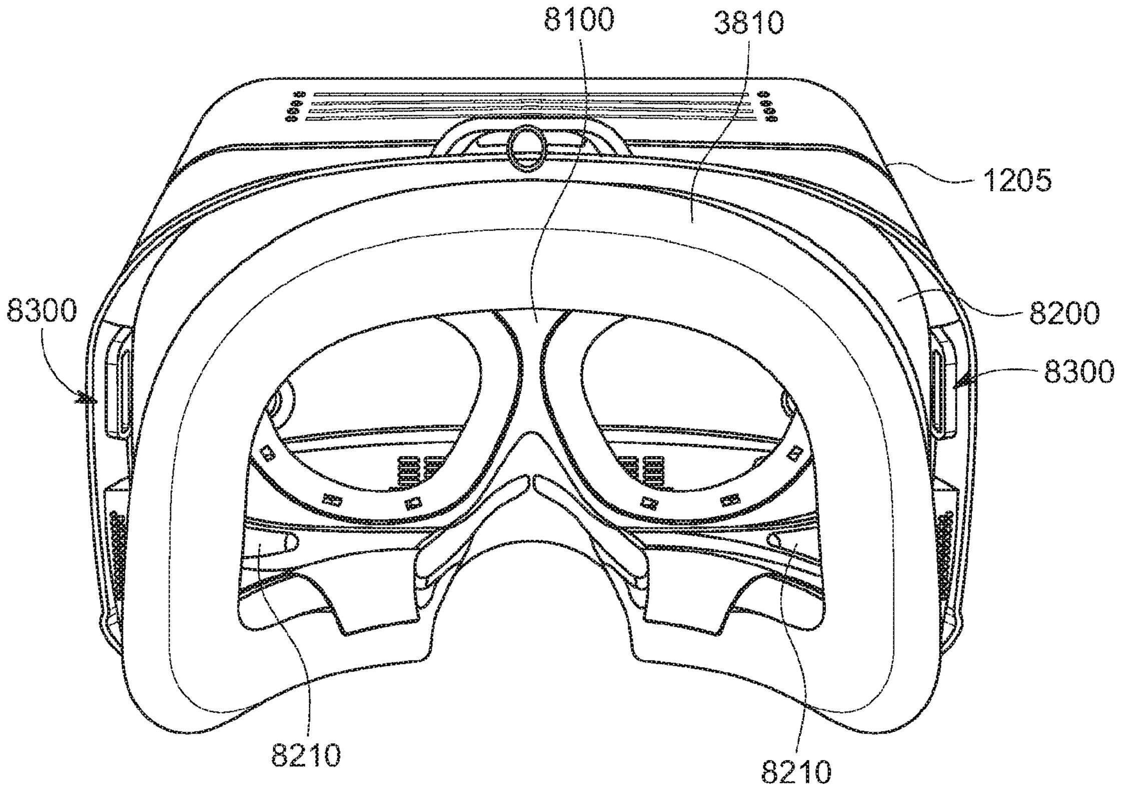
Figure 61B:
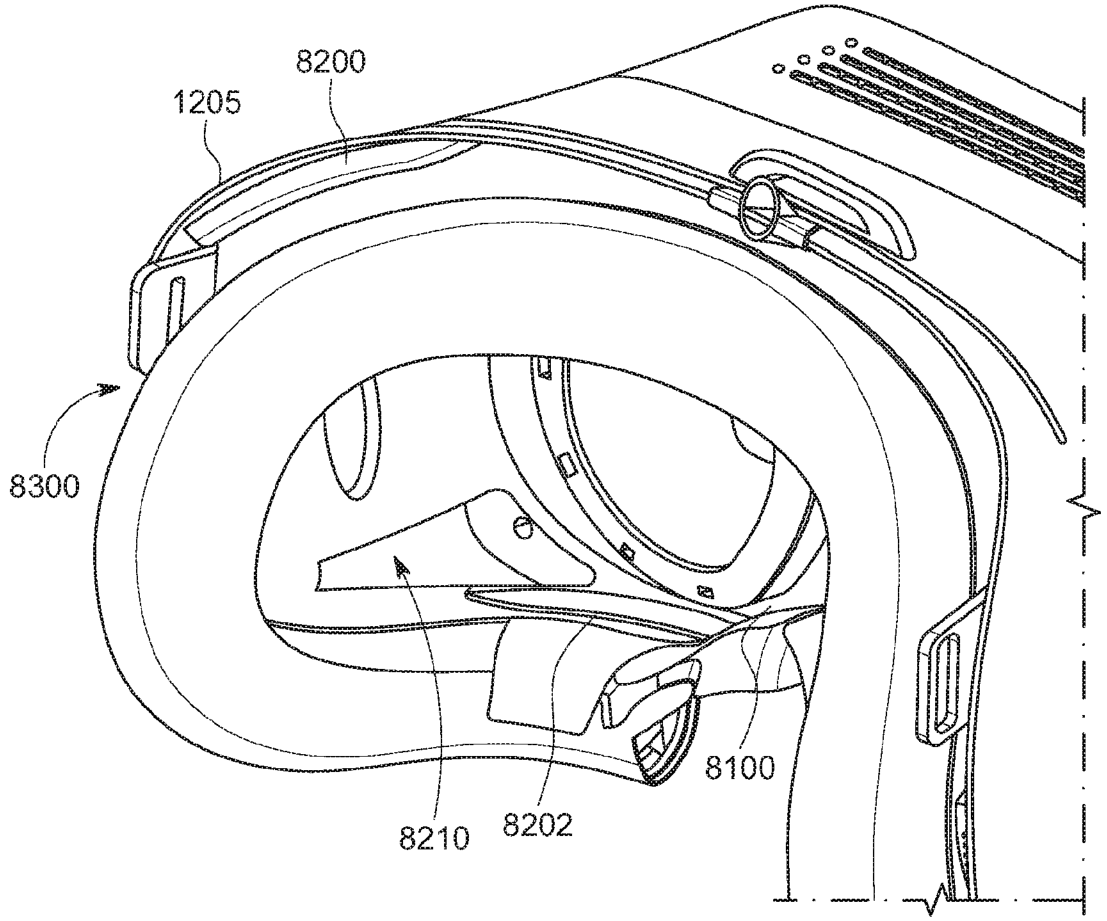
Figure 61C:
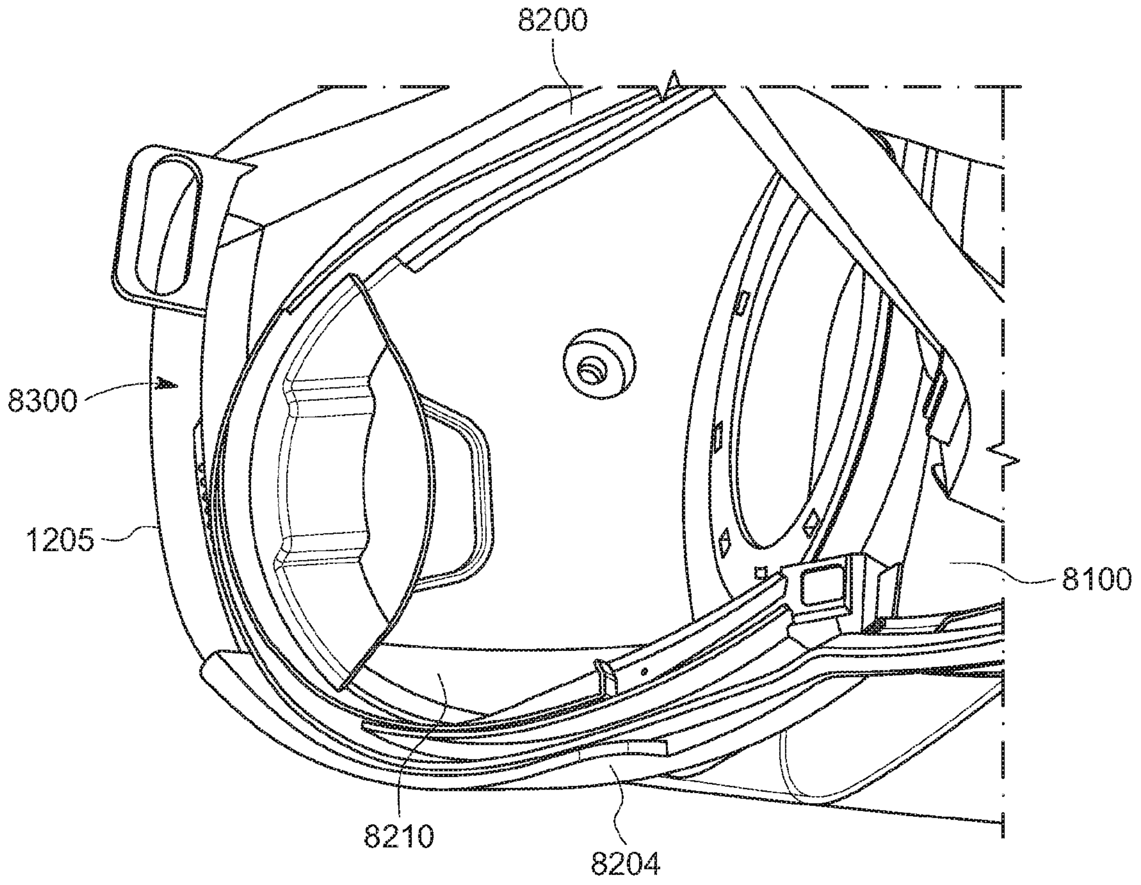
Figure 61D:
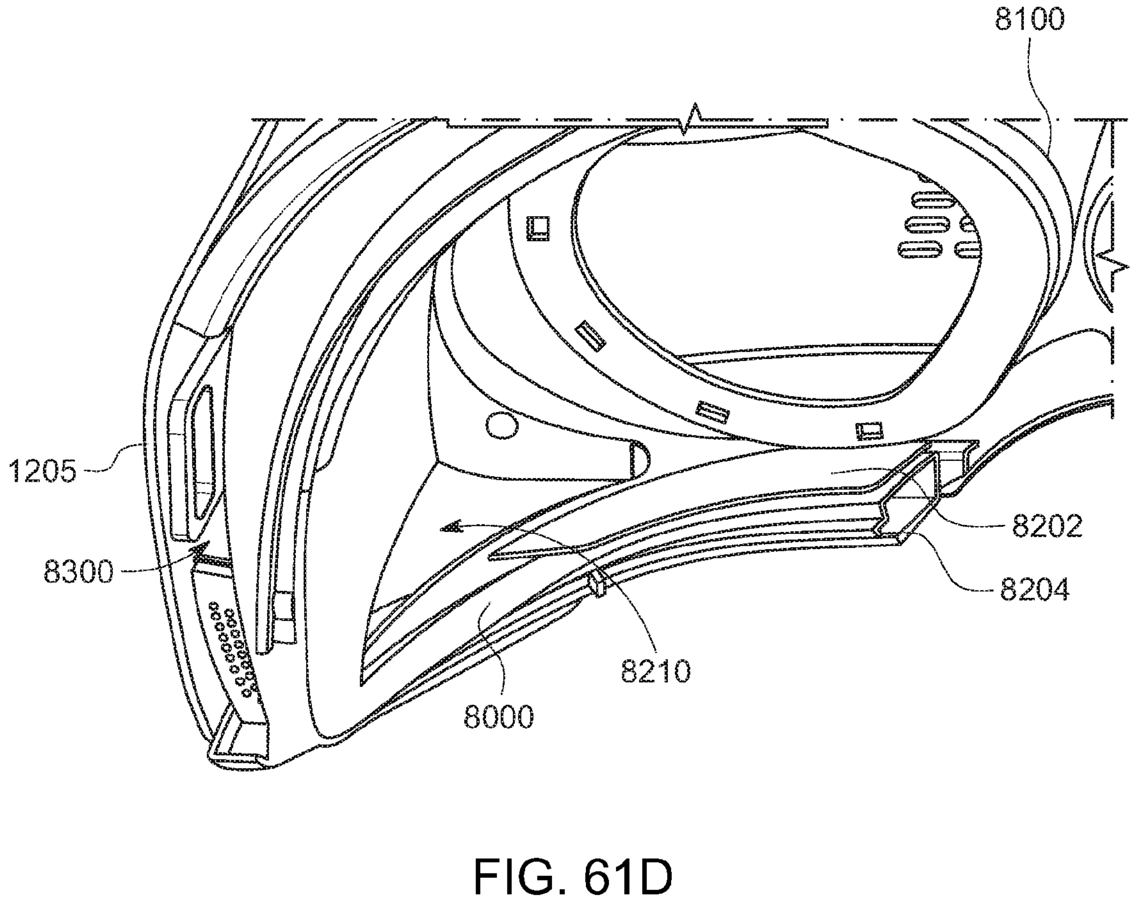
Figure 61E:
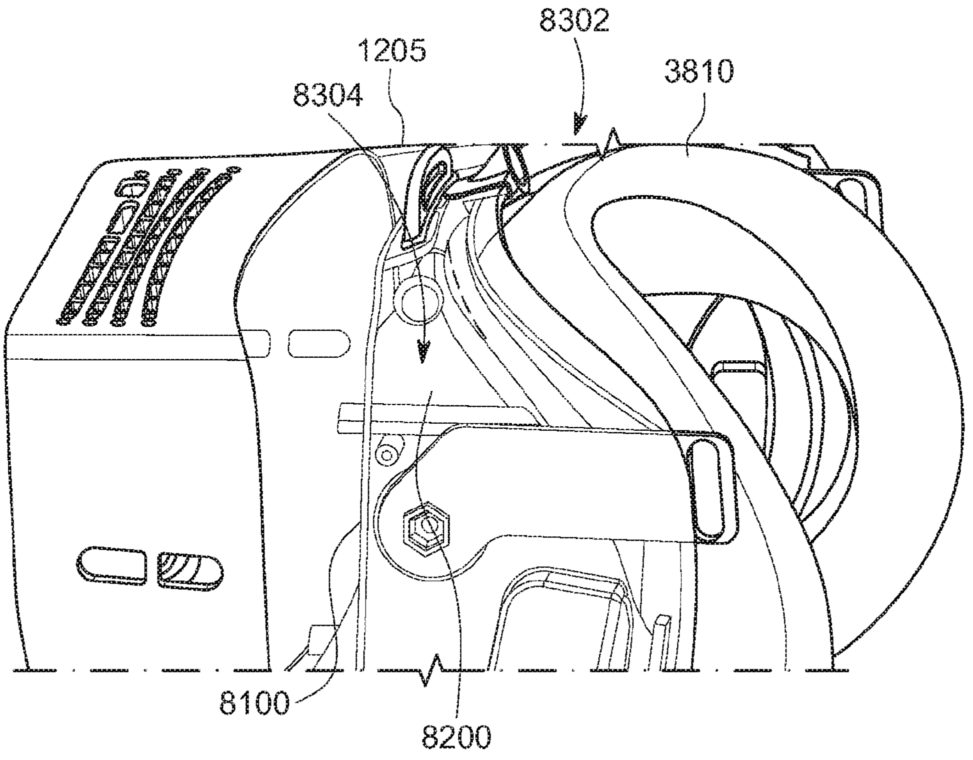
Figure 61F:
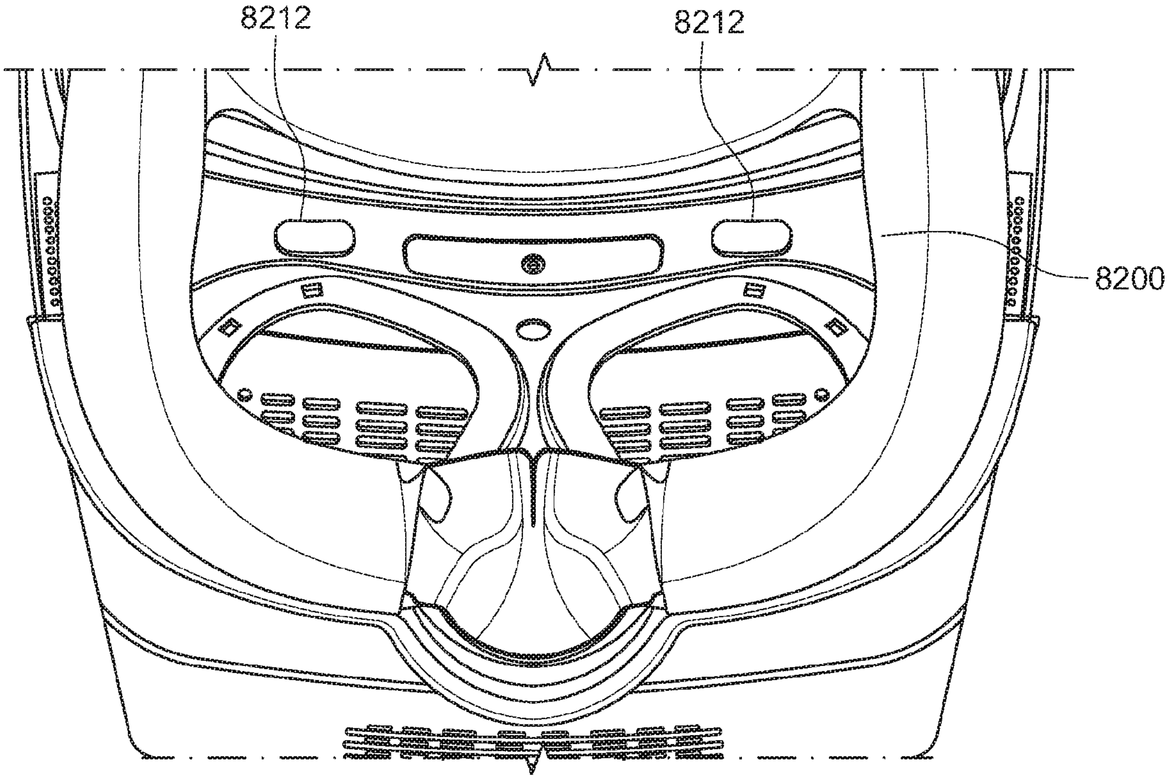
Figure 61G:
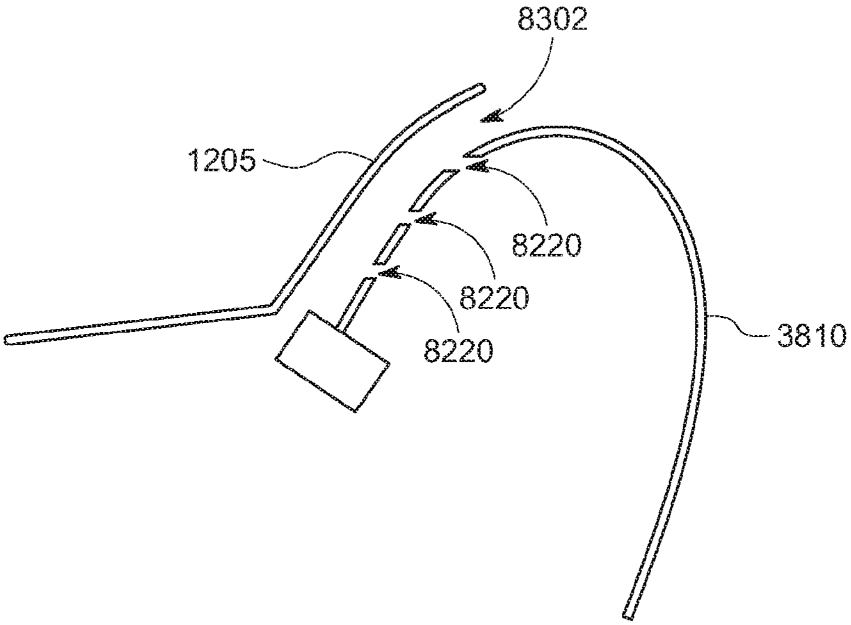

In some forms of the present technology, as shown in FIG. 61G, the face engaging portion 3810 of the interfacing structure may comprise one or more interface airports 8220 in an anterior facing portion. In FIG. 61G the one or more interface airports 8220 are provided in a superior portion of the face engaging portion 3810—i.e. that is proximal to the user's forehead in use. Air may flow through the interface airports 8220 and forehead gap 8302, with the overlap of the display unit housing 1205 (which extends in a posterior direction over the interface airports 8220) creating a tortuous path providing a light-blocking effect.

In examples, one or more interface airports 8220 may be provided in one or more inferior portions of the face engaging portion 3810—i.e. the cheek portions proximal to the user's cheeks in use. In examples, one or more interface airports 8220 may be provided in one or more inferior portions of the face engaging portion 3810 and the superior portion of the face engaging portion 3810.

In examples, one or more interface airports 8220 may be provided in at least one side portion of the face engaging portion 3810—i.e. the portions proximate the user's sphenoid regions in use. It should be appreciated that interface airports 8220 may be provided in the at least one side portion in place of, or in addition to, interface airports 8220 in the superior portion and/or inferior portion.

5.19 Further Examples of Head-Mounted Display Systems 5.19.1 Head-Mounted Display System without Battery Pack FIG. 63 shows a head-mounted display system 1000 with many of the same features as other head-mounted display systems 1000 described herein. Head-mounted display system 1000 does not have a battery pack 1500 located posterior to the user's head. The positioning and stabilising structure 1300 comprises a top strap 1340 connected between a head-mounted display unit 1200 and an occipital strap portion 1320. The top strap portion 1340 comprises a user-facing layer 1344 which contacts the patient's head along at least a majority of its length, a substantially inextensible or rigidising layer 1343 and an outer layer 1341. These layers may be as described elsewhere herein. In this example the outer layer 1341 connects to the substantially inextensible layer 1343 at a location over the user's parietal bones in use. The outer layer 1341 may connect to the substantially inextensible layer 1343 proximate the buckle 1312. The length of the top strap portion 1340 may be adjusted by pulling more or less of the outer layer 1341 through an eyelet or around a lug on the head-mounted display unit 1200, as described elsewhere herein.

5.19.2 Further Head-Mounted Display Systems which May be Particularly Configured to Tolerate Long Hair FIG. 64A shows a head-mounted display system 1000 comprising a battery pack 1500 located posterior to the user's head. The positioning and stabilising structure 1300 comprises a parietal strap portion 1310, occipital strap portion 1320, lateral strap portions 1330 and top strap portion 1340, which may be as described elsewhere herein. The top strap portion 1340 and lateral strap portions 1330 are connected to a head-mounted display unit 1200 as described elsewhere herein. The battery pack 1500 is this example may be supported by the top strap portion 1340 and/or parietal strap portion 1330. A difference in this example in comparison to other examples is that the battery pack 1500 is not connected to the occipital strap portion 1320 either directly or by a portion of the top strap portion 1340. That is, there is an opening which intersects the sagittal plane of the user's head in use between the battery pack 1500 and the occipital strap portion. In some examples this opening may be configured (e.g. shaped and sized) to allow the user's hair (e.g. long hair) to be passed through, for example in a ponytail or otherwise collected and tied up and/or back. This may advantageously enable the occipital strap portion 1320 to better anchor against the user's head in the occipital region and may advantageously reduce adverse effects on the user's hair (e.g. making the user's hair appear messy, e.g. matted, dishevelled or the like).

FIGS. 64B and 64C show head-mounted display systems 1000 with positioning and stabilising structures 1300 similar to that shown in FIG. 64A, however the occipital strap portion 1320 is formed in two portions 1320a and **1320*b* each at least partially located on a respective lateral side of the sagittal plane of the user's head in use. The two portions 1320*a* and 1320*b* are releasably attachable to each other at a pair of connection points 1337. Each connection point 1337 may be provided to a respective one of the two portions 1320*a*, 1320*b* of the occipital strap portion 1320. Each connection point 1337 may be located at or proximate the sagittal plane of the user's head in use when the two portions 1320*a* and 1320*b* of the occipital strap portion 1320 are connected to each other. The connection points 1337 may comprise press studs, magnetic clips, hook-and-loop fasteners or the like, or may be connected by a buckle or the like. An occipital strap portion 1320 formed in two releasably attachable portions 1320*a* and 1320*b* may advantageously make it easier for a user with long hair to don the head-mounted display system 1000 as instead of threading their long hair or pony tail over the occipital strap portion 1320, they can connect the two portions of the occipital strap portion 1320** under their long hair (e.g. between their long hair and neck).

FIG. 64D shows a variation on the positioning and stabilising structure 1300 shown in FIGS. 64B and 64C in that the connection points 1337 are offset from the sagittal plane of the user's head. The connection points 1337 may in use when the user has donned the head-mounted display system 1000 be spaced laterally of the sagittal plane when the two portions of the occipital strap portion are connected to each other. A first portion **1320*a* of the occipital strap portion 1320 may be longer than a second portion 1320*b* of the occipital strap portion 1320 so that the first portion 1320*a* connects to the second portion 1320*b* at a lateral posterior location of the user's head in use. This arrangement may be less likely to snag a user's hair in use or during donning/doffing of the head-mounted display system 1000**.

FIGS. 64E and 64G show a further variation in which the occipital strap portion 1320 is formed in two portions **1320*a* and 1320*b*. Battery packs 1500 in this example are provided to or supported on the occipital strap portion 1320. In particular, two battery packs 1500*a* and 1500*b* are provided to or supported on respective portions 1320*a* and 1320*b* of the occipital strap portion 1320. In other examples only one battery pack 1500 is provided to the occipital strap portion 1320 or one of two portions 1320*a* and 1320*b* thereof. In the example shown in FIGS. 64E and 64G the battery packs 1500*a* and 1500*b* are spaced apart to allow the two portions 1320*a* and 1320*b* of the occipital strap portion 1320 to connect to each other at or proximate the sagittal plane of the user's head in use. Power cables 1510 may connect each battery to the head-mounted display unit 1200 and may run along the two portions 1320*a* and 1320*b* of the occipital strap portion 1320 and the lateral strap portions 1330. In some examples one battery pack 1500*a* may be electrically connected to the other battery pack 1500*b* which may then connect both battery packs 1500*a* and 1500*b* by a single power cable 1510 to the head-mounted display unit 1200. In some examples the head-mounted display system 1000 may comprise one, two, three or more battery packs 1500. The positioning and stabilising structure 1300 may still comprise a top strap portion 1340 even if the battery pack(s) 1500 are provided to the occipital strap portion 1320. In some examples battery packs 1500 are provided instead (or additionally) to the parietal strap portion 1310, lateral strap portions 1330 and/or other strap portions. An advantage of providing a battery pack 1500 or battery packs to an occipital strap portion is that they are provided closer to the axis of rotation of the user's head, meaning lower stabilising forces may be required to counter disruptive forces (e.g. when the user quickly turns their head in use) than if the battery pack 1500 is provided further from the axis of rotation. Additionally, two or more battery packs 1500 may more widely distribute weight of the battery packs in comparison to a single battery pack 1500**, for the same total weight of battery cells.

FIG. 64F shows a further example in which a pair of battery packs **1500*a* and 1500*b* are provided to respective portions 1320*a* and 1320*b* of an occipital strap portion 1320. In this example the occipital strap portions 1320*a* and 1320*b* are not connected to each other. The occipital strap portion 1320, formed by the two portions 1320*a* and 1320*b* leaves a gap in the sagittal plane of the user's head. This may advantageously leave some room for the user's hair, for example a pony tail. Medial ends of the portions 1320*a* and 1320*b* of the occipital strap portion 1320 may be spaced apart from each other and may each be spaced laterally from the sagittal plane. The spacing between the two portions 1320*a* and 1320*b*** may be within the range of 20 mm-60 mm, for example in the range of 30 mm-50 mm or it may be 40 mm. The occipital strap portion 1320, e.g. the two portions 1320*a* and 1320*b* thereof, may be rigidised, for example to anchor behind the user's head. The occipital strap portion 1320 may be at least partially rigidised by the battery packs 1500. Other strap portions such as the lateral strap portions 1330 and/or the parietal strap portion 1310 may also be rigidised in this example.

5.19.3 Further Adjustability in Positioning and Stabilising Structures

FIG. 65A shows a further example of a head-mounted display system 1000 having a positioning and stabilising structure 1300 that is able to be adjusted. The parietal strap portion 1310, occipital strap portion 1320, lateral strap portions 1330 and top strap portion 1340 may be as described elsewhere. However, in this example the top strap portion 1340 is able to be selectively connected to the head-mounted display unit 1200 at a plurality of locations on the top strap portion 1340 to adjust the effective length of the top strap portion 1340. The top strap portion 1340 may be selectively connected to the head-mounted display unit 1200 at one of three connection points 1337*a*, 1337*b* and 1337*c* on the top strap portion 1340. The user may select a connection point 1337 to adjust the effective length of the top strap portion 1340 to achieve a good fit. Each connection point 1337 may comprise hook and loop material, a press stud or any other suitable feature for attaching to the head-mounted display unit 1200. In some examples excess length of the top strap portion 1340 may be fed into the display unit housing 1205, may lie over an upper surface of the display unit housing 1205 or may be looped back and fastened to an outer surface of the top strap portion 1340. It is to be understood that selective adjustment of the top strap portion 1340 may be applied to any other example of the present technology disclosed herein.

FIG. 65B shows another head-mounted display system 1000. In this example at least a portion of the occipital strap portion 1320 is able to pivot about a pair of pivot points 1213. The pivot points 1213 may be located at ends of the occipital strap portion 1320 and may each be located at or proximate a junction between the occipital strap portion 1320, lateral strap portion 1330 and parietal strap portion 1310. In other examples the pivot points 1213 may be located along the occipital strap portion 1320 such that only a portion of the occipital strap portion 1320 pivots at the pivot points 1213. In some examples the occipital strap portion 1320 may be rigidised and able to pivot about pivot points 1213. A pivotable occipital strap portion 1320 may advantageously help the occipital strap portion 1320 lie in a position that is optimal, e.g. for comfort and stability. The occipital strap portion 1320 may be selectively pivotable (e.g. adjustable by the user) or may naturally pivot into a stable position when the user dons the head-mounted display system 1000.

FIG. 66 summarises some adjustability options in head-mounted display systems 1000 according to examples of the present technology. As illustrated, in some examples the lateral strap portions 1330 may pivot with respect to the head-mounted display unit 1200, for example about pivot points 1213. In other examples arms 1210 of a head-mounted display unit 1200 may pivot with respect to a display unit housing 1205. The length of the lateral strap portions 1330 may also be selectively adjustable or may extend when in tension (e.g. the lateral strap portions 1330 may be elastic). In some examples the length of an occipital strap portion 1320 may be selectively adjustable or may extend and contract due to elasticity. In the example of FIG. 66 the occipital strap portion 1320 is connected to a frontal support portion 1360. The occipital strap portion 1320 and the frontal support portion 1360 may form a band around the user's head. In some examples, the top strap portion 1340 is selectively adjustable in length or may be elastic.

5.20 Cleaning

In some forms, the head-mounted display system 1000 or at least a portion thereof, is designed to be used by a single user, and cleaned in a home of the user, e.g., washed in soapy water, without requiring specialised equipment for disinfection and sterilisation. Specifically, the positioning and stabilizing structure 1300 and the interfacing structure 1100 are designed to be cleaned, as they are both in direct contact with the user's head.

In some other forms, the components of the positioning and stabilizing structure 1300 and interfacing structure 1100 are used in labs, clinics and hospitals wherein a single head-mounted display may be reused on multiple persons or used during medical procedures. In each of the labs, clinics and hospitals the head-mounted displays, or relevant components thereof, can be reprocessed and be exposed to, for example, processes of thermal disinfection, chemical disinfection and sterilisation. As such, the design of the positioning and stabilizing structure and interfacing structure may need to be validated for disinfection and sterilisation of the mask in accordance with ISO17664.

Materials may be chosen to withstand reprocessing. For example, robust materials may be used in the positioning and stabilizing structure 1300 to withstand exposure to high level disinfection solutions and agitation with a brush. Further, some components of the positioning and stabilizing structure are separable, and in-use may be disconnected to improve the reprocessing efficacy.

In some examples, the interfacing structure 1100 may, in use, be in contact with the user's head and therefor may become dirty (e.g., from sweat). The interfacing structure 1100 may be designed to be removed from the display unit housing 1205, to provide the ability to remove it for cleaning and/or replacement. It may be desirable to wash the interfacing structure 1100 while not getting the positioning and stabilizing structure 1300 wet. Alternatively or in addition, the positioning and stabilizing structure 1300 may be dirty from contact with the user's head, and may be removed for cleaning and/or replacement independently of the interfacing structure 1100. In either case, this may be facilitated by allowing these components to disconnect for such a purpose.

In some examples, a cover (e.g., constructed from a textile, silicone, etc.) may be removably positioned over the interfacing structure and can be removed to be cleaned and/or replaced after each use. The cover may allow the interface structure 3400 to remain fixed to the display unit housing 1205, and still provide a surface that can be easily cleaned after being used.

5.21 External Computer

In some forms, the head-mounted display system 1000 (e.g., VR, AR, and/or MR) may be used in conjunction with a separate device, like a computer or video game console. For example, the display interface may be electrically connected to the separate device.

In some forms, at least some processing for the head-mounted display system 1000 may be performed by the separate device. The separate device may include a larger and/or more powerful processor than could be comfortably supported by the user (e.g., the processor of the separate device may be too heavy for the user to comfortably support on their head).

6 GLOSSARY

For the purposes of the present technology disclosure, in certain forms of the present technology, one or more of the following definitions may apply. In other forms of the present technology, alternative definitions may apply.

6.1 General

Ambient: In certain forms of the present technology, the term ambient will be taken to mean (i) external of the display interface and/or user, and (ii) immediately surrounding the display interface and/or user.

For example, ambient light with respect to a display interface may be the light immediately surrounding the user, e.g. the light in the same and/or adjacent room as a user, and/or natural light from the sun.

In certain forms, ambient (e.g., acoustic) noise may be considered to be the background noise level in the room where a user is located, other than for example, noise generated by the display device or emanating from speakers connected to the display device. Ambient noise may be generated by sources outside the room.

Leak: The word leak will be taken to be an unintended exposure to light. In one example, leak may occur as the result of an incomplete seal between a display unit and a users' face.

Noise, radiated (acoustic): Radiated noise in the present document refers to noise which is carried to the user by the ambient air. In one form, radiated noise may be quantified by measuring sound power/pressure levels of the object in question according to ISO 3744.

User: A person operating the display interface and/or viewing images provided by the display interface. For example, the person may be wearing, donning, and/or doffing the display interface.

6.1.1 Materials

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240

Polycarbonate: a thermoplastic polymer of Bisphenol-A Carbonate.

6.1.2 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

- 'Soft' materials may include silicone or thermo-plastic elastomer (TPE), and may, e.g. readily deform under finger pressure.
- 'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions. The inverse of stiffness is flexibility.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use. An example of such a use may be setting up and maintaining a user interface in sealing relationship.

As an example, an I-beam may comprise a different bending stiffness (resistance to a bending load) in a first direction in comparison to a second, orthogonal direction. In another example, a structure or component may be floppy in a first direction and rigid in a second direction.

6.2 Materials

Closed-cell foam: Foam comprising cells that are completely encapsulated, i.e. closed cells.

Elastane: A polymer made from polyurethane.

Elastomer: A polymer that displays elastic properties. For example, silicone elastomer.

Ethylene-vinyl acetate (EVA): A copolymer of ethylene and vinyl acetate.

Fiber: A filament (mono or poly), a strand, a yarn, a thread or twine that is significantly longer than it is wide. A fiber may include animal-based material such as wool or silk, plant-based material such as linen and cotton, and synthetic material such as polyester and rayon. A fiber may specifically refer to a material that can be interwoven and/or interlaced (e.g., in a network) with other fibers of the same or different material.

Foam: Any material, for example polyurethane, having gas bubbles introduced during manufacture to produce a lightweight cellular form.

Neoprene: A synthetic rubber that is produced by polymerization of chloroprene. Neoprene is used in trade products: Breath-O-Prene.

Nylon: A synthetic polyamide that has elastic properties and can be used, for example, to form fibres/filaments for use in textiles.

Open-cell foam: Foam comprising cells, i.e. gas bubbles that aren't completely encapsulated, i.e. open cells.

Polycarbonate: a typically transparent thermoplastic polymer of Bisphenol-A Carbonate.

Polyethylene: A thermoplastic that is resistant to chemicals and moisture.

Polyurethane (PU): A plastic material made by copolymerizing an isocyanate and a polyhydric alcohol and, for example, can take the form of foam (polyurethane foam) and rubber (polyurethane rubber).

Semi-open foam: Foam comprising a combination of closed and open (encapsulated) cells.

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240.

Spacer Fabric: A composite construction comprised of two outer textile substrates joined together and kept apart by an intermediate layer of monofilaments.

Spandex: An elastic fibre or fabric, primarily comprised of polyurethane. Spandex is used in trade products: Lycra.

Textile: A material including at least one natural or artificial fiber. In this specification, a textile may refer to any material that is formed as a network of interwoven and/or interlaced fibers. A type of textile may include a fabric, which is constructed by interlacing the fibers using specific techniques. These include weaving, knitting, crocheting, knotting, tatting, tufting, or braiding. Cloth may be used synonymously with fabric, although may specifically refer to a processed piece of fabric. Other types of textiles may be constructed using bonding (chemical, mechanical, heat, etc.), felting, or other nonwoven processes. Textiles created through one of these processes are fabric-like, and may be considered synonymous with fabric for the purposes of this application.

Thermoplastic Elastomer (TPE): Are generally low modulus, flexible materials that can be stretched at room temperature with an ability to return to their approximate original length when stress is released. Trade products that use TPE include: Hytrel, Dynaflex, Medalist Thermoplastic Polyurethane (TPU): A thermoplastic elastomer with a high durability and flexibility.

6.3 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

- 'Soft' materials may include silicone or thermo-plastic elastomer (TPE), and may, e.g. readily deform under finger pressure.
- 'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use.

- As an example, an I-beam may comprise a different bending stiffness (resistance to a bending load) in a first direction in comparison to a second, orthogonal direction. In another example, a structure or component may be floppy in a first direction and rigid in a second direction.

6.4 Anatomy

Figure 1A:
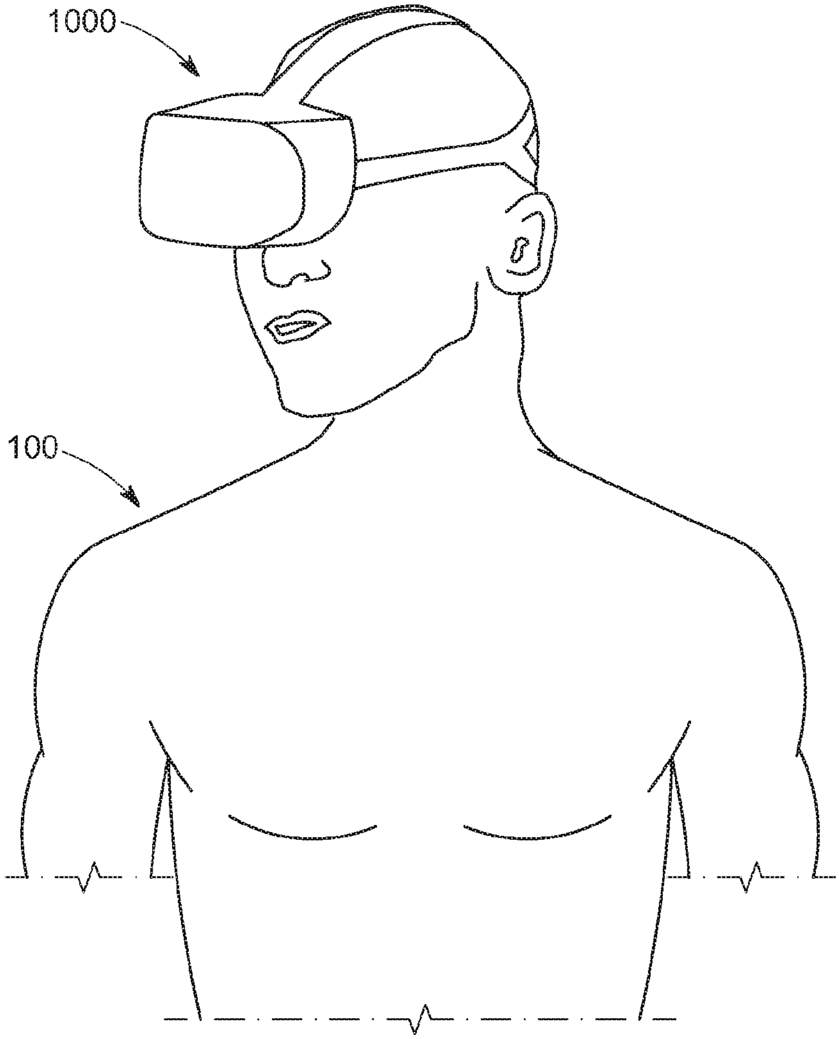
FIG. 1A shows a system including a user 100 wearing a head-mounted display system 1000, in the form of a face-mounted, virtual reality (VR) headset, displaying various images to the user 100. The user is standing while wearing the head-mounted display system 1000.
Figure 1B:
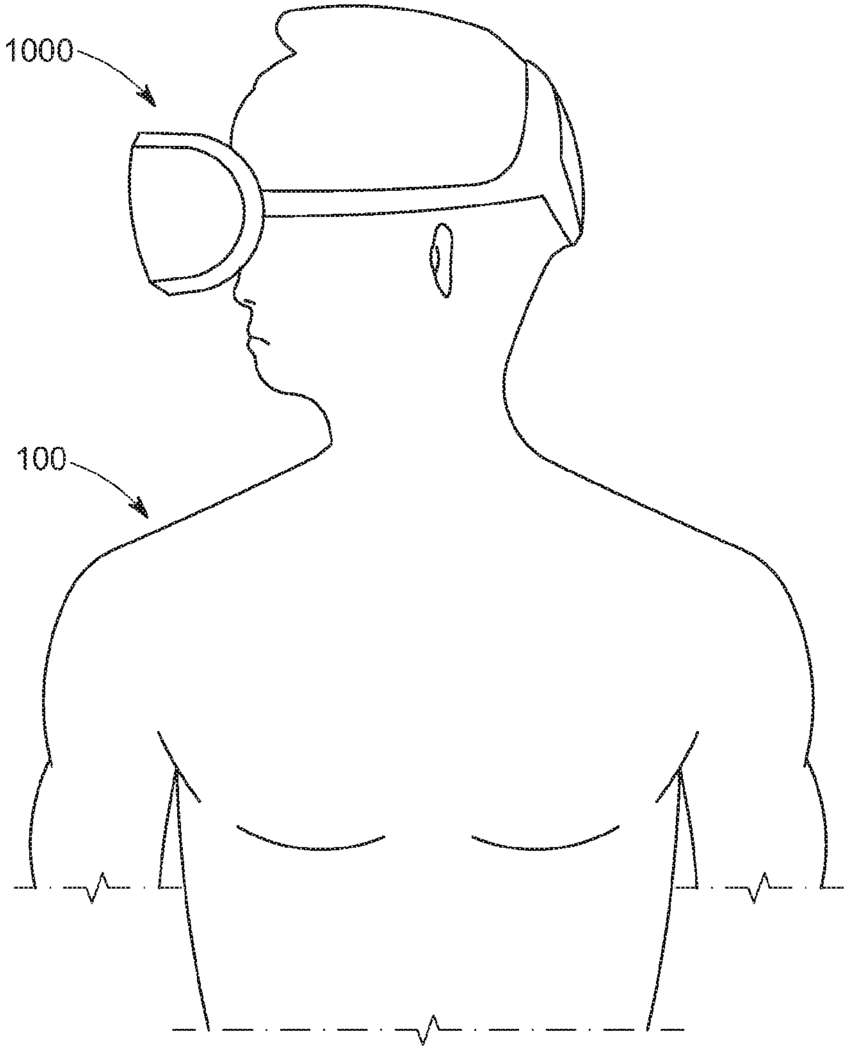
FIG. 1B shows a system including a user 100 wearing a head-mounted display system 1000, in the form of a floating virtual reality (VR) headset, displaying various images to the user. The user is sitting while wearing the display interface 100.
Figure 1C:
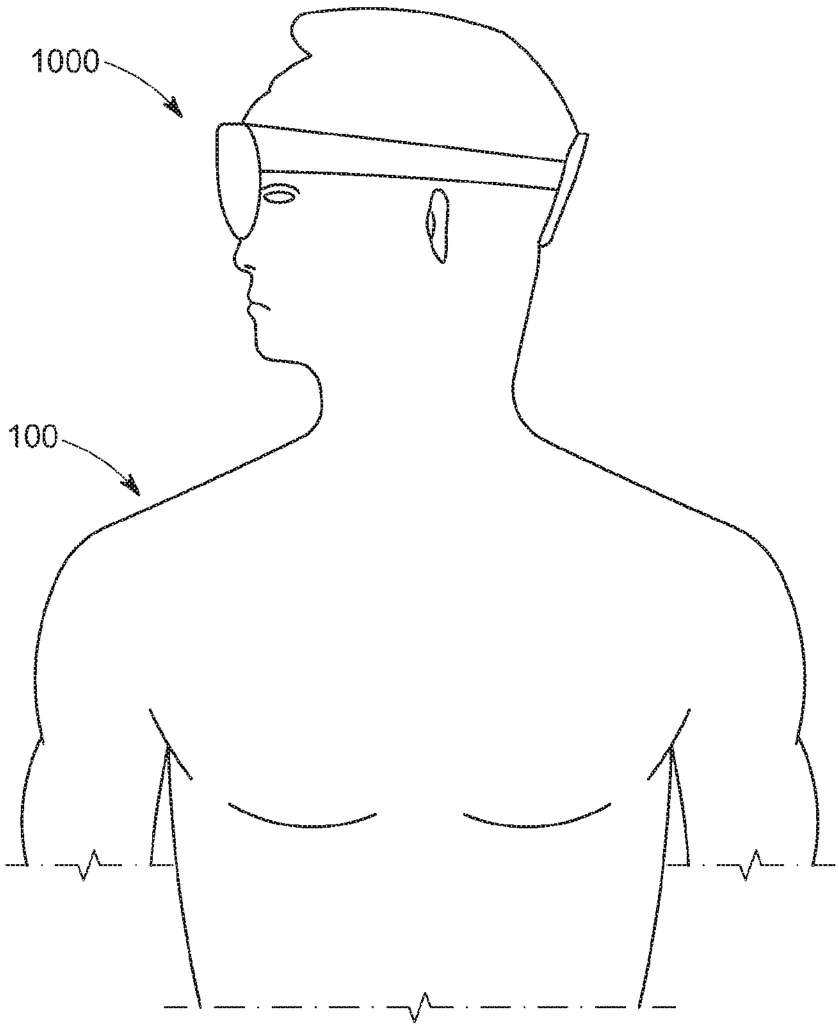
FIG. 1C shows a system including a user 100 wearing a head-mounted display system 1000, in the form of a floating augmented reality (AR) headset, displaying various images to the user. The user is standing while wearing the head-mounted display system 1000.

The following definitions correspond references identified in FIGS. 1-2.

6.4.1 Anatomy of the Face

Ala: the external outer wall or "wing" of each nostril (plural: alar)

Alare: The most lateral point on the nasal ala.

Alar curvature (or alar crest) point: The most posterior point in the curved base line of each ala, found in the crease formed by the union of the ala with the cheek.

Auricle: The whole external visible part of the ear.

(nose) Bony framework: The bony framework of the nose comprises the nasal bones, the frontal process of the maxillae and the nasal part of the frontal bone.

Bridge (nasal): The nasal bridge is the midline prominence of the nose, extending from the Sellion to the Pronasale.

(nose) Cartilaginous framework: The cartilaginous framework of the nose comprises the septal, lateral, major and minor cartilages.

Cheilion: A point located at the corner of the mouth.

Columella: the strip of skin that separates the nares and which runs from the pronasale to the upper lip.

Columella angle: The angle between the line drawn through the midpoint of the nostril aperture and a line drawn perpendicular to the Frankfort horizontal while intersecting subnasale.

Endocanthion: The point at which the upper and lower eyelids meet, proximal to the Sellion.

Epicranius: The Epicranius, or frontal belly, refers to structures that cover the cranium.

External occipital protuberance: A protuberance on the outer surface of the occipital bone.

Frankfort horizontal plane: A line extending from the most inferior point of the orbital margin to the left tragion. The tragion is the deepest point in the notch superior to the tragus of the auricle.

*Glabella*: Located on the soft tissue, the most prominent point in the midsagittal plane of the forehead.

Interpupillary Distance: The distance between the centres of the pupils of the eyes.

Lateral nasal cartilage: A generally triangular plate of cartilage. Its superior margin is attached to the nasal bone and frontal process of the maxilla, and its inferior margin is connected to the greater alar cartilage.

Lip, inferior (labrale inferius): A point on the face between the mouth and supramenton, lying in the median sagittal plane.

Lip, superior (labrale superius): A point on the face between the mouth and nose, lying in the median sagittal plane.

Greater alar cartilage: A plate of cartilage lying below the lateral nasal cartilage. It is curved around the anterior part of the naris. Its posterior end is connected to the frontal process of the maxilla by a tough fibrous membrane containing three or four minor cartilages of the ala.

Nares (Nostrils): Approximately ellipsoidal apertures forming the entrance to the nasal cavity. The singular form of nares is naris (nostril). The nares are separated by the nasal septum.

Naso-labial sulcus or Naso-labial fold: The skin fold or groove that runs from each side of the nose to the corners of the mouth, separating the cheeks from the upper lip.

Naso-labial angle: The angle between the columella and the upper lip, while intersecting subnasale.

Otobasion inferior: The lowest point of attachment of the auricle to the skin of the face.

Otobasion superior: The highest point of attachment of the auricle to the skin of the face.

Pronasale: the most protruded point or tip of the nose, which can be identified in lateral view of the rest of the portion of the head.

Philtrum: the midline groove that runs from lower border of the nasal septum to the top of the lip in the upper lip region.

Pogonion: Located on the soft tissue, the most anterior midpoint of the chin.

Ridge (nasal): The nasal ridge is the midline prominence of the nose, extending from the Sellion to the Pronasale.

Sagittal plane: A vertical plane that passes from anterior (front) to posterior (rear). The midsagittal plane is a sagittal plane that divides the body into right and left halves.

Sellion: Located on the soft tissue, the most concave point overlying the area of the frontonasal suture.

Septal cartilage (nasal): The nasal septal cartilage forms part of the septum and divides the front part of the nasal cavity.

Subalare: The point at the lower margin of the alar base, where the alar base joins with the skin of the superior (upper) lip.

Subnasal point: Located on the soft tissue, the point at which the columella merges with the upper lip in the midsagittal plane.

Supramenton: The point of greatest concavity in the midline of the lower lip between labrale inferius and soft tissue pogonion.

Superciliary arch: A protuberance of the frontal bone above the eye.

Temporalis muscle: A muscle in the temporal fossa that serves to raise the lower jaw.

Temporomandibular joint: A freely moveable joint between the temporal bone and mandible that allows for the opening, closing, protrusion, retraction, and lateral movement of the mandible.

Vermillion, upper: A red part of the lips covered with stratified squamous epithelium which is in continuity with the oral mucosa of the gingivolabial groove.

6.4.2 Anatomy of the Skull

Frontal bone: The frontal bone includes a large vertical portion, the squama *frontalis*, corresponding to the region known as the forehead.

Lateral cartilage: Portion of cartilage lateral of the Septal cartilage and inferior to the Nasal bones.

Mandible: The mandible forms the lower jaw. The mental protuberance is the bony protuberance of the jaw that forms the chin.

Masseter minor: A lower portion of the Masseter muscle of which raises the lower jaw.

Maxilla: The maxilla forms the upper jaw and is located above the mandible and below the orbits. The frontal process of the maxilla projects upwards by the side of the nose, and forms part of its lateral boundary.

Nasal bones: The nasal bones are two small oblong bones, varying in size and form in different individuals; they are placed side by side at the middle and upper part of the face, and form, by their junction, the “bridge” of the nose.

Nasion: The intersection of the frontal bone and the two nasal bones, a depressed area directly between the eyes and superior to the bridge of the nose.

Occipital bone: The occipital bone is situated at the back and lower part of the cranium. It includes an oval aperture, the foramen magnum, through which the cranial cavity communicates with the vertebral canal. The curved plate behind the foramen magnum is the squama occipitalis.

Orbit: The bony cavity in the skull to contain the eyeball.

Parietal bones: The parietal bones are the bones that, when joined together, form the roof and sides of the cranium.

Septal cartilage: Cartilage of the nasal septum.

Sphenoid bone: A wedge shaped bone of the base of the cranium.

Supraorbital foramen: An opening in the inferior bone of the orbit for the passage of the Supraorbital nerve, artery and vein.

Temporal bones: The temporal bones are situated on the bases and sides of the skull, and support that part of the face known as the temple.

Trapezius minor: A triangular-shaped superficial muscle of the upper back.

Zygomatic bones: The face includes two zygomatic bones, located in the upper and lateral parts of the face and forming the prominence of the cheek.

6.5 User Interface

Frame: Frame will be taken to mean a display housing unit that bears the load of tension between two or more points of connection with a headgear and/or a hoop. The frame may seal against the user’s face in order to limit and/or prevent the ingress and/or egress of light.

Hoop: Hoop will be taken to mean a form of positioning and stabilizing structure designed for use on a head. For example the hoop may comprise a collection of one or more struts, ties and stiffeners configured to locate and retain a user interface in position on a users’ face for holding a display unit in an operational position in front of a user’s face. Some ties are formed of a soft, flexible, elastic material such as a laminated composite of foam and fabric/textile. In some forms, the term headgear may be synonymous with the term hoop.

Membrane: Membrane will be taken to mean a typically thin element that has, preferably, substantially no resistance to bending, but has resistance to being stretched.

Seal: May be a noun form (“a seal”) which refers to a structure, or a verb form (“to seal”) which refers to the effect. Two elements may be constructed and/or arranged to ‘seal’ or to effect ‘sealing’ therebetween without requiring a separate ‘seal’ element per se.

Shell: A shell will be taken to mean a curved, relatively thin structure having bending, tensile and compressive stiffness. For example, a curved structural wall of a mask may be a shell. In some forms, a shell may be faceted. In some forms a shell may be airtight. In some forms a shell may not be airtight.

Stiffener: A stiffener will be taken to mean a structural component designed to increase the bending resistance of another component in at least one direction.

Strut. A strut will be taken to be a structural component designed to increase the compression resistance of another component in at least one direction.

Swivel (noun): A subassembly of components configured to rotate about a common axis, preferably independently, preferably under low torque. In one form, the swivel may be constructed to rotate through an angle of at least 360 degrees. In another form, the swivel may be constructed to rotate through an angle less than 360 degrees.

Tie (noun): A structure designed to resist tension.

6.6 Shape of Structures

Products in accordance with the present technology may comprise one or more three-dimensional mechanical structures, for example a mask cushion or an impeller. The three-dimensional structures may be bounded by two-dimensional surfaces. These surfaces may be distinguished using a label to describe an associated surface orientation, location, function, or some other characteristic. For example a structure may comprise one or more of an anterior surface, a posterior surface, an interior surface and an exterior surface. In another example, a seal-forming structure may comprise a face-contacting (e.g. outer) surface, and a separate non-face-contacting (e.g. underside or inner) surface. In another example, a structure may comprise a first surface and a second surface.

To facilitate describing the shape of the three-dimensional structures and the surfaces, we first consider a cross-section through a surface of the structure at a point, p. See FIG. 3A to FIG. 3E, which illustrate examples of cross-sections at point p on a surface, and the resulting plane curves. FIGS. 3A to 3E also illustrate an outward normal vector at p. The outward normal vector at p points away from the surface. In some examples we describe the surface from the point of view of an imaginary small person standing upright on the surface.

6.6.1 Curvature in One Dimension

The curvature of a plane curve at p may be described as having a sign (e.g. positive, negative) and a magnitude (e.g. 1/radius of a circle that just touches the curve at p).

Positive curvature: If the curve at p turns towards the outward normal, the curvature at that point will be taken to be positive (if the imaginary small person leaves the point p they must walk uphill). See FIG. 3A (relatively large positive curvature compared to FIG. 3B) and FIG. 3B (relatively small positive curvature compared to FIG. 3A). Such curves are often referred to as concave.

Zero curvature: If the curve at p is a straight line, the curvature will be taken to be zero (if the imaginary small person leaves the point p, they can walk on a level, neither up nor down). See FIG. 3C.

Negative curvature: If the curve at p turns away from the outward normal, the curvature in that direction at that point will be taken to be negative (if the imaginary small person leaves the point p they must walk downhill). See FIG. 3D (relatively small negative curvature compared to FIG. 3E) and FIG. 3E (relatively large negative curvature compared to FIG. 3F). Such curves are often referred to as convex.

6.6.2 Curvature of Two Dimensional Surfaces

A description of the shape at a given point on a two-dimensional surface in accordance with the present technology may include multiple normal cross-sections. The multiple cross-sections may cut the surface in a plane that includes the outward normal (a "normal plane"), and each cross-section may be taken in a different direction. Each cross-section results in a plane curve with a corresponding curvature. The different curvatures at that point may have the same sign, or a different sign. Each of the curvatures at that point has a magnitude, e.g. relatively small. The plane curves in FIGS. 3A to 3E could be examples of such multiple cross-sections at a particular point.

Principal curvatures and directions: The directions of the normal planes where the curvature of the curve takes its maximum and minimum values are called the principal directions. In the examples of FIG. 3A to FIG. 3E, the maximum curvature occurs in FIG. 3A, and the minimum occurs in FIG. 3E, hence FIG. 3A and FIG. 3E are cross sections in the principal directions. The principal curvatures at p are the curvatures in the principal directions.

Region of a surface: A connected set of points on a surface. The set of points in a region may have similar characteristics, e.g. curvatures or signs.

Saddle region: A region where at each point, the principal curvatures have opposite signs, that is, one is positive, and the other is negative (depending on the direction to which the imaginary person turns, they may walk uphill or downhill).

Dome region: A region where at each point the principal curvatures have the same sign, e.g. both positive (a "concave dome") or both negative (a "convex dome").

Cylindrical region: A region where one principal curvature is zero (or, for example, zero within manufacturing tolerances) and the other principal curvature is non-zero.

Planar region: A region of a surface where both of the principal curvatures are zero (or, for example, zero within manufacturing tolerances).

Edge of a surface: A boundary or limit of a surface or region.

Path: In certain forms of the present technology, 'path' will be taken to mean a path in the mathematical—topological sense, e.g. a continuous space curve from f(0) to f(1) on a surface. In certain forms of the present technology, a 'path' may be described as a route or course, including e.g. a set of points on a surface. (The path for the imaginary person is where they walk on the surface, and is analogous to a garden path).

Path length: In certain forms of the present technology, 'path length' will be taken to mean the distance along the surface from f(0) to f(1), that is, the distance along the path on the surface. There may be more than one path between two points on a surface and such paths may have different path lengths. (The path length for the imaginary person would be the distance they have to walk on the surface along the path).

Straight-line distance: The straight-line distance is the distance between two points on a surface, but without regard to the surface. On planar regions, there would be a path on the surface having the same path length as the straight-line distance between two points on the surface. On non-planar surfaces, there may be no paths having the same path length as the straight-line distance between two points. (For the imaginary person, the straight-line distance would correspond to the distance 'as the crow flies'.)

6.6.3 Space Curves

Space curves: Unlike a plane curve, a space curve does not necessarily lie in any particular plane. A space curve may be closed, that is, having no endpoints. A space curve may be considered to be a one-dimensional piece of three-dimensional space. An imaginary person walking on a strand of the DNA helix walks along a space curve. A typical human left ear comprises a helix, which is a left-hand helix, see FIG. 3M. A typical human right ear comprises a helix, which is a right-hand helix, see FIG. 3N. FIG. 3O shows a right-hand helix. The edge of a structure, e.g. the edge of a membrane or impeller, may follow a space curve. In general, a space curve may be described by a curvature and a torsion at each point on the space curve. Torsion is a measure of how the curve turns out of a plane. Torsion has a sign and a magnitude. The torsion at a point on a space curve may be characterised with reference to the tangent, normal and binormal vectors at that point.

Tangent unit vector (or unit tangent vector): For each point on a curve, a vector at the point specifies a direction from that point, as well as a magnitude. A tangent unit vector is a unit vector pointing in the same direction as the curve at that point. If an imaginary person were flying along the curve and fell off her vehicle at a particular point, the direction of the tangent vector is the direction she would be travelling.

Unit normal vector: As the imaginary person moves along the curve, this tangent vector itself changes. The unit vector pointing in the same direction that the tangent vector is changing is called the unit principal normal vector. It is perpendicular to the tangent vector.

Binormal unit vector: The binormal unit vector is perpendicular to both the tangent vector and the principal normal vector. Its direction may be determined by a right-hand rule (see e.g. FIG. 3L), or alternatively by a left-hand rule (FIG. 3K).

Osculating plane: The plane containing the unit tangent vector and the unit principal normal vector. See FIGS. 3K and 3L.

Torsion of a space curve: The torsion at a point of a space curve is the magnitude of the rate of change of the binormal unit vector at that point. It measures how much the curve deviates from the osculating plane. A space curve which lies in a plane has zero torsion. A space curve which deviates a relatively small amount from the osculating plane will have a relatively small magnitude of torsion (e.g. a gently sloping helical path). A space curve which deviates a relatively large amount from the osculating plane will have a relatively large magnitude of torsion (e.g. a steeply sloping helical path). With reference to FIG. 3O, since T2>T1, the magnitude of the torsion near the top coils of the helix of FIG. 3O is greater than the magnitude of the torsion of the bottom coils of the helix of FIG. 3O With reference to the right-hand rule of FIG. 3M, a space curve turning towards the direction of the right-hand binormal may be considered as having a right-hand positive torsion (e.g. a right-hand helix as shown in FIG. 3O). A space curve turning away from the direction of the right-hand binormal may be considered as having a right-hand negative torsion (e.g. a left-hand helix).

Equivalently, and with reference to a left-hand rule (see FIG. 3K), a space curve turning towards the direction of the left-hand binormal may be considered as having a left-hand positive torsion (e.g. a left-hand helix). Hence left-hand positive is equivalent to right-hand negative.

6.6.4 Holes

A surface may have a one-dimensional hole, e.g. a hole bounded by a plane curve or by a space curve. Thin structures (e.g. a membrane) with a hole, may be described as having a one-dimensional hole. See for example the one dimensional hole in the surface of structure shown in FIG. 3F, bounded by a plane curve.

A structure may have a two-dimensional hole, e.g. a hole bounded by a surface. For example, an inflatable tyre has a two dimensional hole bounded by the interior surface of the tyre. In another example, a bladder with a cavity for air or gel could have a two-dimensional hole. In a yet another example, a conduit may comprise a one-dimension hole (e.g. at its entrance or at its exit), and a two-dimension hole bounded by the inside surface of the conduit. See also the two dimensional hole through the structure shown in FIG. 3H, bounded by a surface as shown.

6.7 Other Remarks

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

The invention claimed is:

1. A head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a resilient and flexible face engaging portion having a curved cross-section, wherein the face engaging portion comprises an anterior portion extending in a radially outward posterior direction, curving around into a posterior portion extending in a radially inward posterior direction, wherein a posterior facing surface of the posterior portion provides a user contact surface, wherein the face engaging portion comprises at least one closed loop portion having an enclosed cross-section, and wherein:

the face engaging portion comprises a first closed loop portion and a second closed loop portion;

the first closed loop portion and the second closed loop portion are provided on respective sides of the user's nose in use; and the first closed loop portion and the second closed loop portion are provided proximate the user's cheeks in use.

2. The head-mounted display system of claim 1, wherein the face engaging portion is configured such that the posterior portion is biased towards engagement with the user's face, in use.

3. The head-mounted display system of claim 1, wherein the face engaging portion bends around and overlaps itself to provide the at least one closed loop portion.

4. The head-mounted display system of claim 1, wherein the face engaging portion comprises a plurality of regions, each of the plurality of regions having a respective cross-sectional thickness, and wherein the face engaging portion comprises a forehead portion, two cheek portions, and two side portions proximate the user's sphenoid regions in use and connecting the forehead portion to the respective cheek portions.

5. The head-mounted display system of claim 4, wherein the plurality of regions of the face engaging portion comprises:

a first region extending around an inner periphery of the face engaging portion;

a second region extending around an outer periphery of the face engaging portion;

a third region extending around the inner periphery of the face engaging portion, positioned between the first region and the second region;

fourth regions in each cheek portion, bounded by the first region and the third region.

6. The head-mounted display system of claim 5, wherein the first region comprises a posterior forehead portion in the forehead portion, extending in a superior direction from the inner periphery of the face engaging portion.

7. The head-mounted display system of claim 5, wherein the third region comprises a superior forehead portion in the forehead portion, extending over a centre of the forehead portion into an anterior forehead portion.

8. The head-mounted display system of claim 7, wherein the second region comprises superior lateral portions, each extending from a respective side portion towards the superior forehead portion, and/or wherein the second region comprises an outer periphery forehead portion.

9. The head-mounted display system of claim 5, wherein the first region has a greater thickness than the fourth regions, the fourth regions have a greater thickness than the third region, and/or the third region has a greater thickness than the second region.

10. The head-mounted display system of claim 5, wherein a width of the first region in an anterior-posterior direction is greater through the forehead portion than at the cheek portions or the side portions, and/or wherein a width of the second region in an anterior-posterior direction is greater through the forehead portion than at the cheek portions.

11. A head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a resilient and flexible face engaging portion having a curved cross-section, wherein the face engaging portion comprises an anterior portion extending in a radially outward posterior direction, curving around into a posterior portion extending in a radially inward posterior direction, wherein a posterior facing surface of the posterior portion provides a user contact surface, wherein the face engaging portion comprises at least one closed loop portion having an enclosed cross-section, and wherein the face engaging portion comprises a base portion and a loop portion comprising a loop flange, wherein the loop flange overlaps the base portion to provide the closed loop portion.

12. The head-mounted display system of claim 11, wherein:

the loop portion extends from an anterior position to a posterior position;

a cross-section of the loop portion tapers off between the anterior position and the posterior position; and the loop portion includes an arcuate portion between the anterior position and the loop flange.

13. The head-mounted display system of claim 11, wherein the loop flange overlaps an anterior facing surface of the base portion.

14. The head-mounted display system of claim 11, wherein the loop flange is secured to the base portion.

15. The head-mounted display system of claim 11, wherein the base portion and the loop portion are integrally formed as a single component.

16. A head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a resilient and flexible face engaging portion having a curved cross-section, wherein the face engaging portion comprises an anterior portion extending in a radially outward posterior direction, curving around into a posterior portion extending in a radially inward posterior direction, wherein a posterior facing surface of the posterior portion provides a user contact surface, wherein the interfacing structure comprises a light-blocking nasal portion spanning between cheek portions of the face engaging portion, wherein the light-blocking nasal portion comprises a pronasale portion extending radially and in a superior direction over the pronasale of the user's nose, and wherein the light-blocking nasal portion further comprises a first bridge portion and a second bridge portion extending in a superior direction from the pronasal portion, the first bridge portion and the second bridge portion having a slot therebetween, the slot extending from a posterior edge of the light-blocking nasal portion towards the pronasale portion, and wherein the first bridge portion and the second bridge portion are configured to rest on respective sides of the user's nose bridge in use.

17. A head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a resilient and flexible face engaging portion having a curved cross-section, wherein the face engaging portion comprises an anterior portion extending in a radially outward posterior direction, curving around into a posterior portion extending in a radially inward posterior direction, wherein a posterior facing surface of the posterior portion provides a user contact surface, wherein the interfacing structure comprises a foam cushion, wherein the posterior portion extends over the foam cushion, and wherein the face engaging portion comprises a cushion support flange extending from a radially inwardly facing surface of the face engaging portion, and wherein the foam cushion is provided between the cushion support flange and the posterior portion.

* * * * *